US011228880B2

(12) United States Patent
Aldana et al.

(10) Patent No.: US 11,228,880 B2
(45) Date of Patent: Jan. 18, 2022

(54) METHODS AND DEVICES FOR VEHICULAR RADIO COMMUNICATIONS

(71) Applicant: Intel Corporation, Santa Clara, CA (US)

(72) Inventors: Carlos Aldana, Santa Clara, CA (US); Dave Cavalcanti, Portland, OR (US); Debabani Choudhury, Thousand Oaks, CA (US); Jong-Kae Fwu, Sunnyvale, CA (US); Bertram Gunzelmann, Koenigsbrunn (DE); Nageen Himayat, Fremont, CA (US); Ingolf Karls, Feldkirchen (DE); Duncan Kitchin, Beaverton, OR (US); Markus Dominik Mueck, Unterhaching (DE); Harry Skinner, Beaverton, OR (US); Christopher Stobart, Nuremberg (DE); Shilpa Talwar, Cupertino, CA (US); Zhibin Yu, Unterhaching (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/618,217

(22) PCT Filed: Jun. 28, 2018

(86) PCT No.: PCT/US2018/039889

§ 371 (c)(1),
(2) Date: Nov. 29, 2019

(87) PCT Pub. No.: WO2019/010049

PCT Pub. Date: Jan. 10, 2019

(65) Prior Publication Data

US 2020/0120458 A1 Apr. 16, 2020

Related U.S. Application Data

(60) Provisional application No. 62/528,047, filed on Jul. 1, 2017.

(51) Int. Cl.
*H04W 4/00* (2018.01)
*H04W 4/40* (2018.01)
(Continued)

(52) U.S. Cl.
CPC .............. *H04W 4/40* (2018.02); *H04W 4/80* (2018.02); *H04W 8/005* (2013.01);
(Continued)

(58) Field of Classification Search
CPC ... H04W 4/40; H04W 12/0609; H04W 8/005; H04W 72/048; H04W 48/16;
(Continued)

(56) References Cited

U.S. PATENT DOCUMENTS

| | | | |
|---|---|---|---|
| 9,693,264 | B2 | 6/2017 | Kim et al. |
| 2007/0042786 | A1 | 2/2007 | Chillariga et al. |

(Continued)

FOREIGN PATENT DOCUMENTS

| | | | |
|---|---|---|---|
| EP | 3089541 | A1 | 11/2016 |
| WO | 2014129870 | A1 | 8/2014 |

(Continued)

OTHER PUBLICATIONS

International Search Report based on Application No. PCT/US2018/039889, dated Nov. 27, 2018, 16 pages (for reference purpose only).

(Continued)

*Primary Examiner* — Marceau Milord
(74) *Attorney, Agent, or Firm* — Viering, Jentschura & Partner MBB

(57) ABSTRACT

A communication device for a vehicular radio communications includes one or more processors configured to identify a plurality of vehicular communication devices that form a cluster of cooperating vehicular communication devices, determine channel resource allocations for the plurality of vehicular communication devices that includes channel
(Continued)

resources allocated for a first vehicular radio communication technology and channel resources allocated for a second vehicular radio communication technology, and transmit the channel resource allocation to the plurality of vehicular communication devices.

21 Claims, 155 Drawing Sheets

(51) Int. Cl.
*H04W 4/80* (2018.01)
*H04W 8/00* (2009.01)
*H04W 28/22* (2009.01)
*H04W 36/00* (2009.01)
*H04W 36/08* (2009.01)
*H04W 48/16* (2009.01)
*H04W 72/04* (2009.01)
*H04W 12/069* (2021.01)

(52) U.S. Cl.
CPC ......... *H04W 12/069* (2021.01); *H04W 28/22* (2013.01); *H04W 36/0088* (2013.01); *H04W 36/08* (2013.01); *H04W 48/16* (2013.01); *H04W 72/042* (2013.01); *H04W 72/048* (2013.01)

(58) Field of Classification Search
CPC . H04W 36/0088; H04W 4/80; H04W 72/042; H04W 36/08; H04W 28/22
USPC .......................................................... 370/329
See application file for complete search history.

(56) References Cited

U.S. PATENT DOCUMENTS

2009/0068969 A1 3/2009 Lindoff et al.
2010/0309869 A1 12/2010 Kim et al.
2013/0163575 A1 6/2013 Pak et al.
2013/0219431 A1* 8/2013 Hong ............. H04N 21/234327 725/54
2014/0161018 A1* 6/2014 Chang .................. H04B 7/0452 370/312
2015/0181459 A1 6/2015 Zhu
2015/0215237 A1 7/2015 Finn et al.
2015/0288427 A1* 10/2015 Wang ................ H04W 72/1284 370/329
2015/0365981 A1 12/2015 Thanayankizil et al.
2017/0150490 A1 5/2017 Chen et al.
2018/0343588 A1* 11/2018 Sadek ..................... H04L 5/006
2018/0368191 A1* 12/2018 Vutukuri ............... H04W 76/15
2019/0086938 A1* 3/2019 Shattil .................... G05D 1/104
2019/0182840 A1* 6/2019 Feng ....................... H04W 4/44
2019/0313375 A1* 10/2019 Loehr ................... H04W 72/04
2019/0364492 A1* 11/2019 Azizi ................ H04W 52/0264
2020/0092685 A1* 3/2020 Fehrenbach ......... H04B 7/2606
2020/0184334 A1* 6/2020 Glafkides .............. G06N 3/082
2020/0195389 A1* 6/2020 Basu Mallick ........... H04L 1/08
2020/0280827 A1* 9/2020 Fechtel .................. H04W 4/80

FOREIGN PATENT DOCUMENTS

WO 2018031458 A1 2/2018
WO 2019006085 A1 1/2019

OTHER PUBLICATIONS

Samsung, Interlaced transmissions for co-existence with DSRC, 3GPP TSG RAN WG1 Meeting #85, R1-164792, May 23-27, 2016, 6 pages, 3GPP, Nanjing.
Samsung, DSRC co-existence with V2V, 3GPP TSG RAN WG1 Meeting #84bis, Apr. 11-15, 2016, 3 pages, R1-162702, 3GPP, Busan Korea.
Khadige Abboud et al., Interworking of DSRC and Cellular Network Tchnologies for V2X Communications: A survey, IEEE Transactions On Vehicular Technology, vol. 65, No. 12, Dec. 2016, 14 pages.
Zinan Tang et al., A Cluster-Based Multichannel MAC Protocol for throughput sensitive applicaitons in VANETs, 2015, 5 pages, IEEE.
Extended European Search Report (eESR) for European Patent Application No. 18 828 108.3, dated Jan. 13, 2021, 12 pages (for reference purposes only).
PEPLINK; "Unbreakable Cellular Bonding"; 3 pages; 2017; retrieved on Mar. 26, 2018; https://www.peplink.com/technology/unbreakable-cellular-bonding/.
Leymann, N. et al.; "GRE Notifications for Hybrid Access"; 37 pages; Jan. 14, 2015; retrieved on Mar. 26, 2018; https://tools.ietf.org/html/draft-lhwxz-gre-notifications-hybrid-access-01.
Lockyer, D. et al.; "Coupled dipole arrays as reconfigurable frequency selective surfaces"; pp. 1258-1259, vol. 30, Issue 16; Aug. 4, 1994; IET Institute of Engineering and Technology.
Antonopoulos, C. et al.; "Multilayer frequency-selective surfaces for millimetre and submillimetre wave applications"; pp. 415-420, vol. 144, No. 6; Dec. 6, 1997; IEE Proceedings—Microwaves, Antennas and Propagation.
Shaker, J. et al.; "Some novel designs to minimize the angular sensitivity of FSS structures"; pp. 683-686; 1994; Antenna Technology and Applied Electromagnetics (ANTEM).
Archer, M.J. et al.; "Subdomain basis-function model for the ring element in FSS arrays"; pp. 786-787, vol. 32, No. 9; Apr. 25, 1996; Electronics Letters.
"Directive 2014/53/EU of the European Parliament and of the Council"; Apr. 16, 2014; 45 pages; Official Journal of the European Union.
International Search Report based on Application No. PCT/US2018/039941, dated Oct. 30, 2018, 3 pages (for reference purpose only).
Indian Examination Report issued for IN Patent Application No. 201947049436, dated Jan. 29, 2021, 7 pages (for informational purposes only).

* cited by examiner

7500

14200

14250

14706

METHODS AND DEVICES FOR VEHICULAR RADIO COMMUNICATIONS

CROSS-REFERENCE TO RELATED APPLICATIONS

This application is a national stage entry under 35 U.S.C. §§ 365 and 371 of International Application Serial No. PCT/US2018/039889, filed on Jun. 28, 2018, which claims priority to U.S. Provisional Patent Application Ser. No. 62/528,047, filed on Jul. 1, 2017. The disclosures of each of the foregoing documents are incorporated herein by reference in their entirety and for all purposes.

TECHNICAL FIELD

Various embodiments relate generally to methods and devices for vehicular radio communications.

BACKGROUND

Several different vehicular radio communication technologies including Dedicated Short Range Communications (DSRC) and Long Term Evolution (LTE) Vehicle-to-Vehicle (V2V) and Vehicle-to-Everything (V2X), have been proposed as potential candidates for communicating with and between vehicular communication devices. These vehicular radio communication technologies target both autonomous driving use cases and delivery of user data to connected vehicles.

DSRC builds on the existing Institute of Electrical and Electronics Engineers (IEEE) 802.11p physical (PHY) and medium access control (MAC) layers, while LTE V2V/V2X develops on top of the 3$^{rd}$ Generation Partnership Project (3GPP) LTE standard. While both DSRC and LTE V2V/V2X are considered as candidates for future 5G and autonomous driving uses, these vehicular radio communication technologies exhibit differences, in particular with respect to spectrum access management. Similar to its underlying IEEE 802.11p origins, DSRC uses a contention-based channel access scheme where vehicular communication devices and supporting network access nodes, known as Roadside Units (RSUs), compete for access to a shared channel in a distributed manner. In the context of this application, DSRC is not limited to tolling systems in the 5.8 GHz frequency range, and instead refers to existing and not-yet-developed short-range vehicular radio communication technologies based on the IEEE 802.11p PHY and MAC layers (also known as Intelligent Transport Systems-G5 (ITS-G5).

In contrast, LTE V2V/V2X uses deterministic scheduling in which a central control entity such as an LTE base station selectively assigns radio resources for transmission and reception. Accordingly, the base station may assign specific subcarriers and symbol slots (where each subcarrier and symbol slot constitutes a Resource Element (RE)) to uplink and downlink transmissions to obtain channel resource allocations. The base station may then transmit the channel resource allocations to its served vehicular communication devices, which can then transmit uplink communications on their respectively assigned uplink channel resources and receive downlink communications on their receptively assigned downlink channel resources. This deterministic scheduling can thus avoid collisions by assigning different channel resources to different transmissions. It is also noted that LTE V2V/V2X provides an alternate scheduling mode to this deterministic scheduling mode in which the base station defines a resource block for vehicular communication devices to use contention to acquire specific channel resources.

Various other radio communication technologies are also being considered for vehicular radio communication use cases. For example, the 3GPP has introduced narrowband cellular-based communication technologies for Internet of Things (IoT) uses, in particular including LTE Machine-Type Communications (MTC) and Narrowband IoT (NB-IoT). LTE MTC (commonly known as Category M1 (CAT-M1) is based on an evolution of the existing legacy Category 0 (CAT-0) LTE system, while NB-IoT is a non-backward compatible technology that is specifically optimized to satisfy the requirements of typical IoT solutions (commonly known CAT-NB1). These technologies target coverage for IoT devices even when located in deep coverage conditions, and are developed to maximize coverage levels through repetition for delay-tolerant applications.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 119 shows an exemplary network scenario for beamforming at vehicular communication devices to avoid an obstacle based on surrounding data according to some aspects;

FIG. 120 shows an example of selection between different candidate beams based on surrounding data according to some aspects;

FIG. 121 shows an example of the use of machine learning algorithmic to select beams according to some aspects;

FIG. 122 shows an exemplary internal configuration of a vehicular communication device and placement of antennas and data acquisition equipment around the vehicular communication device according to some aspects;

FIG. 123 shows an exemplary internal configuration of a controller configured to generate antenna beams according to some aspects;

FIG. 124 shows an exemplary internal configuration of a vehicular communication device configured to perform analog/RF beamforming based on surrounding data according to some aspects;

FIG. 125 shows an exemplary internal configuration of a vehicular communication device configured to perform digital beamforming based on surrounding data according to some aspects;

FIG. 126 shows a first exemplary method for performing beamforming based on surrounding data according to some aspects;

FIG. 127 shows a second exemplary method for performing beamforming based on surrounding data according to some aspects;

FIG. 128 shows an exemplary configuration for using a software reconfigurable chip to replace integrated circuits according to some aspects;

FIG. 129 shows an exemplary block diagram for replacement of various baseband and/or RF components with a software reconfigurable chip according to some aspects;

FIG. 130 shows an exemplary method for reconfiguring a communication device according to some aspects;

Figure 131:
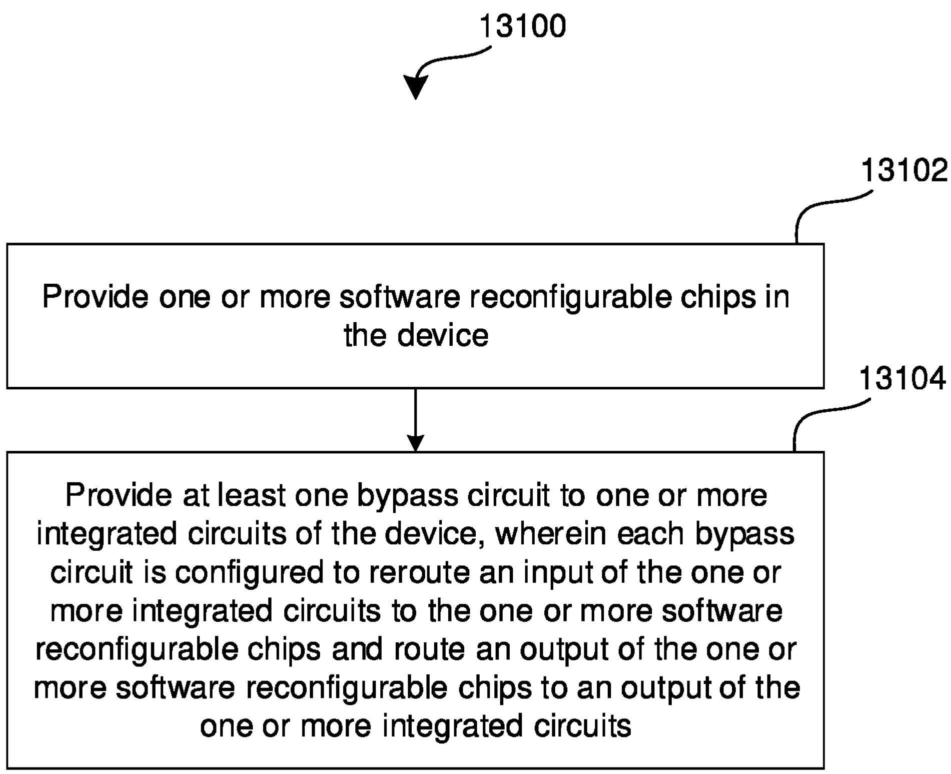
Figure 132:
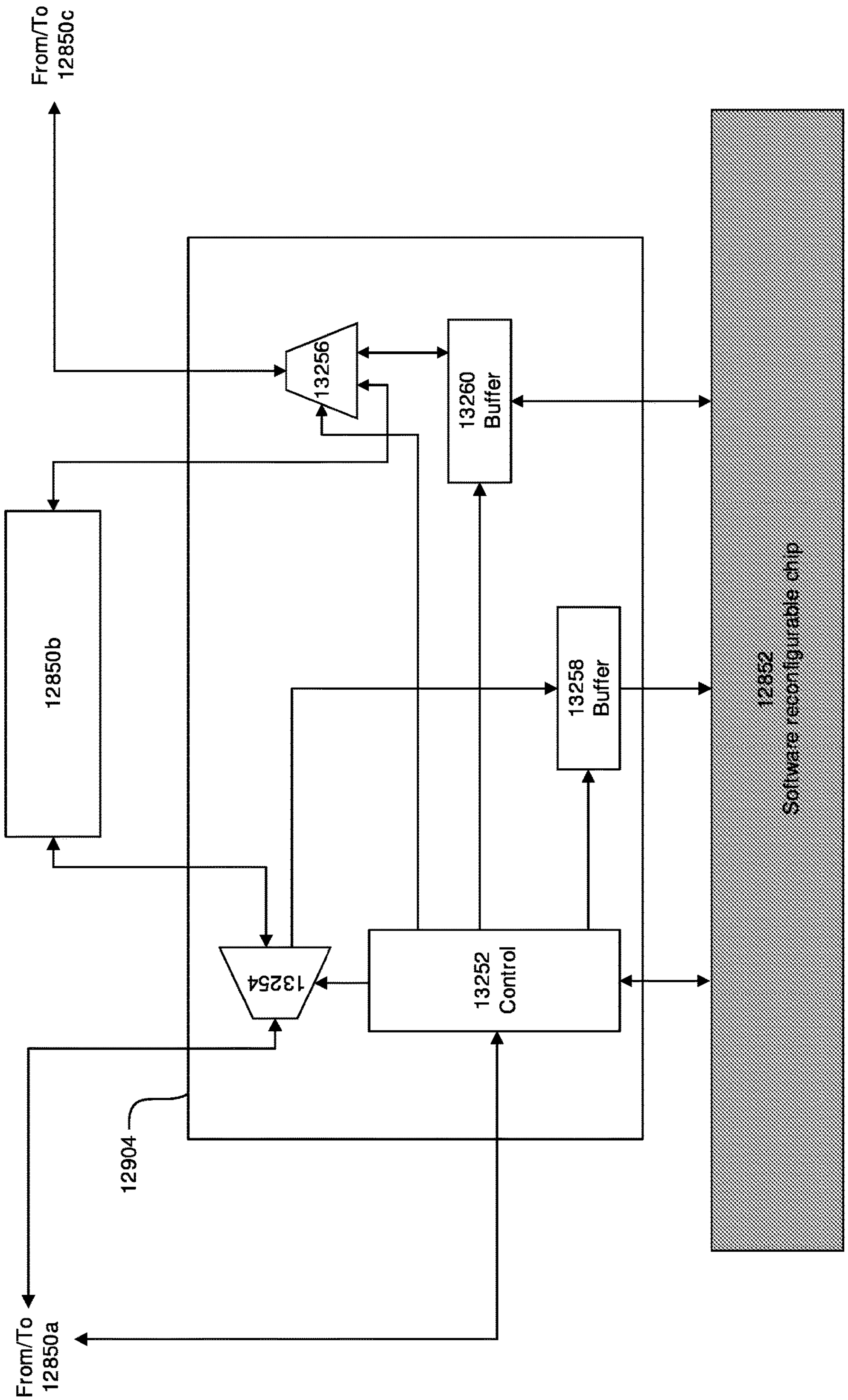
Figure 133:
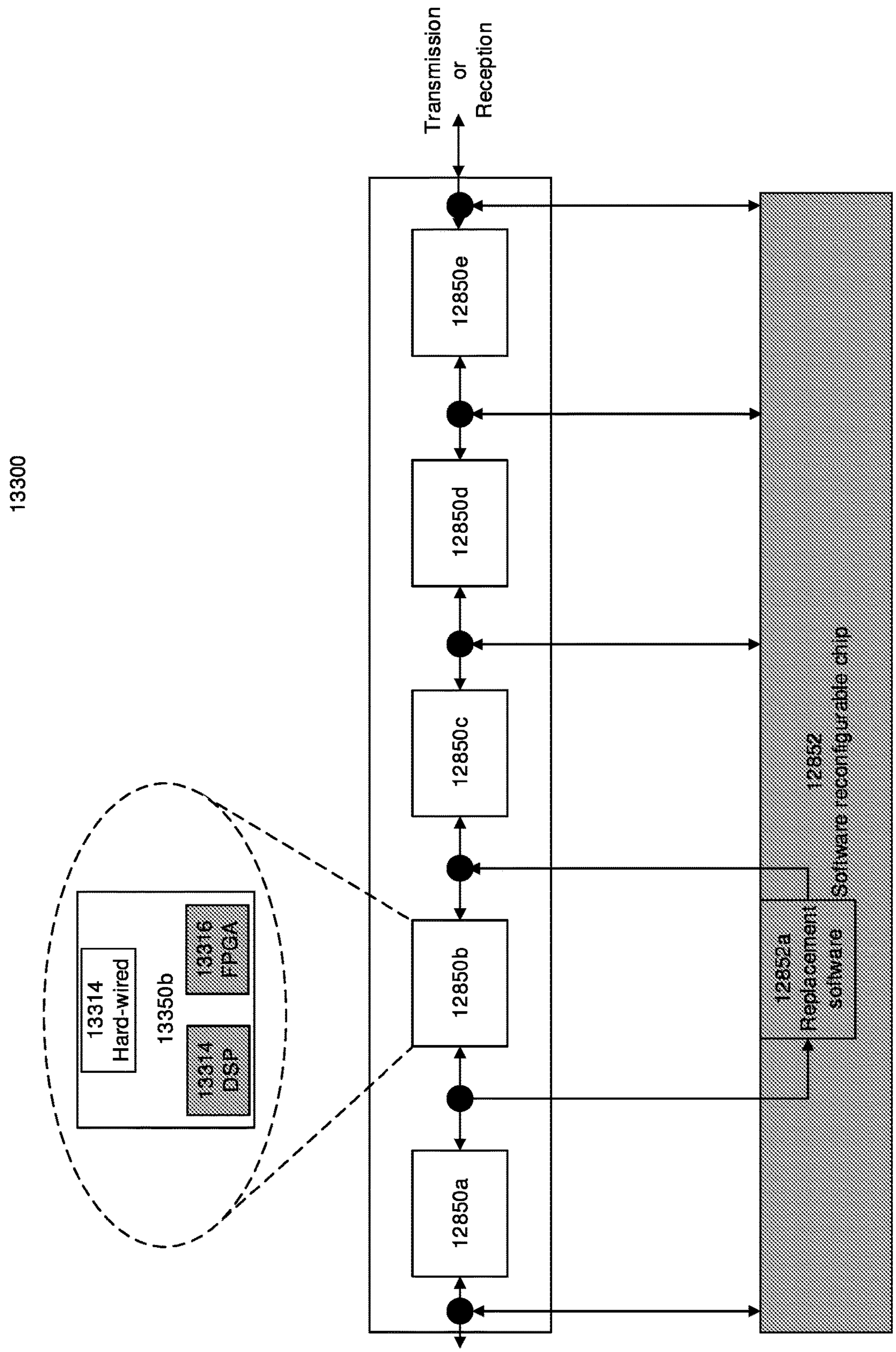
Figure 134:
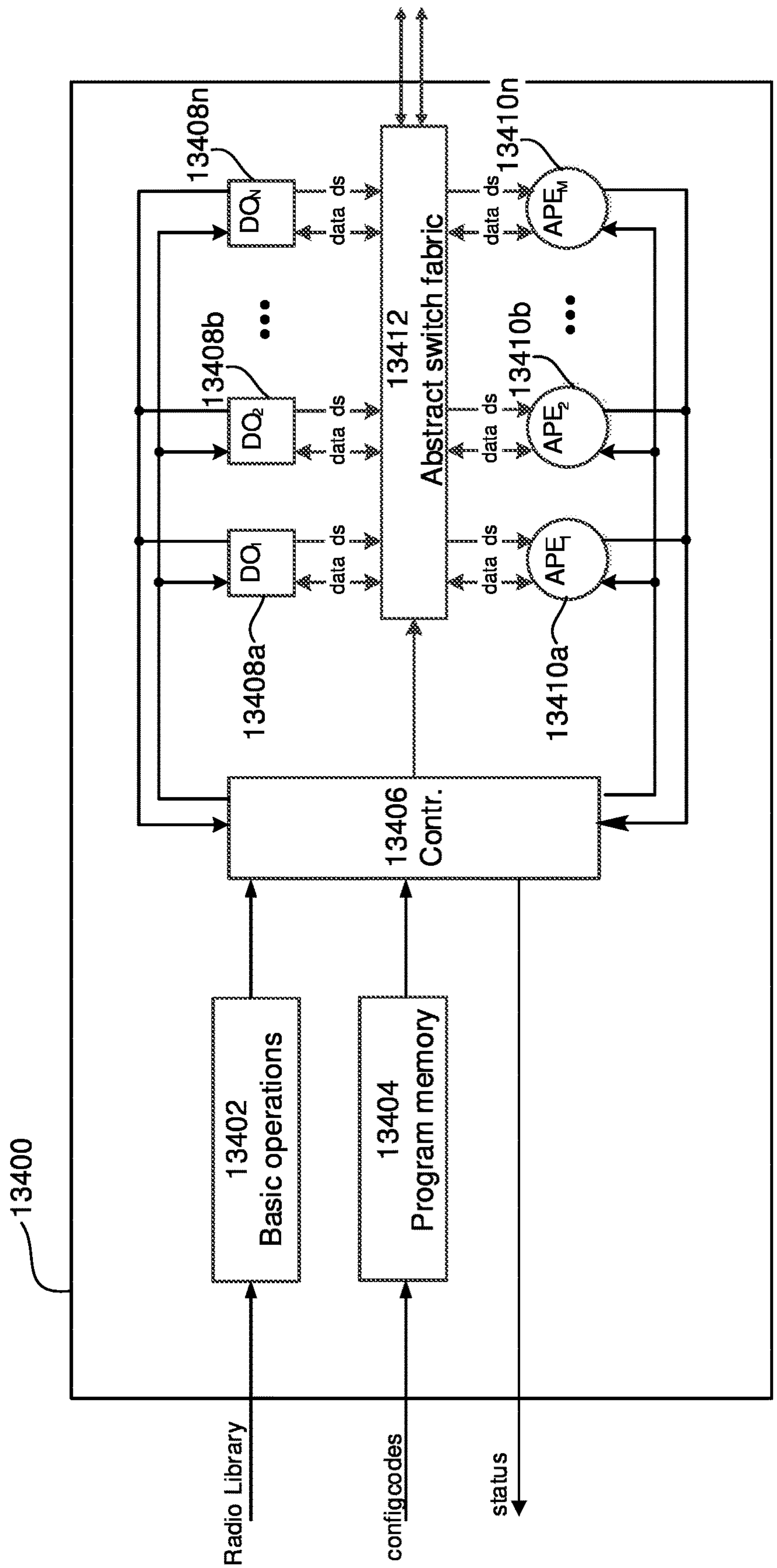
Figure 135:
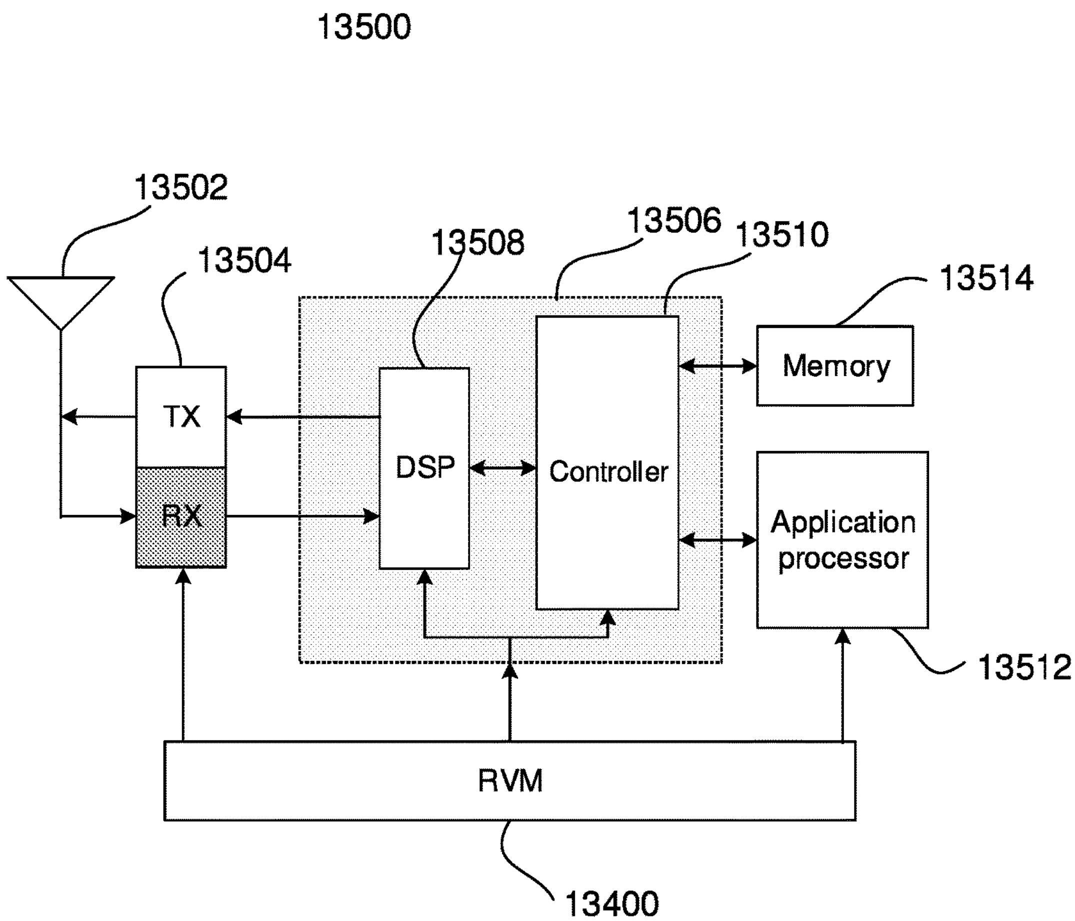
Figure 136:
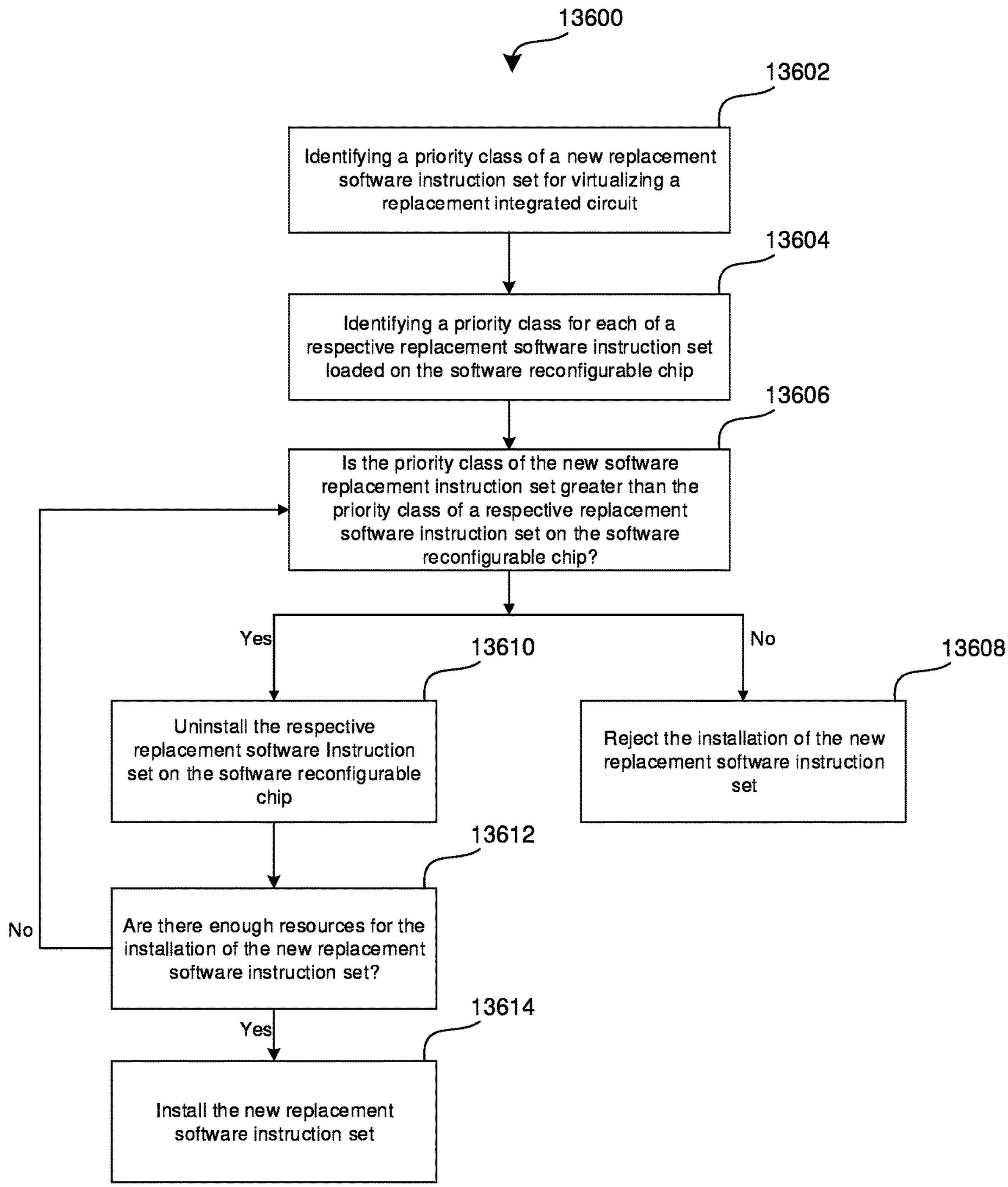
Figure 137:
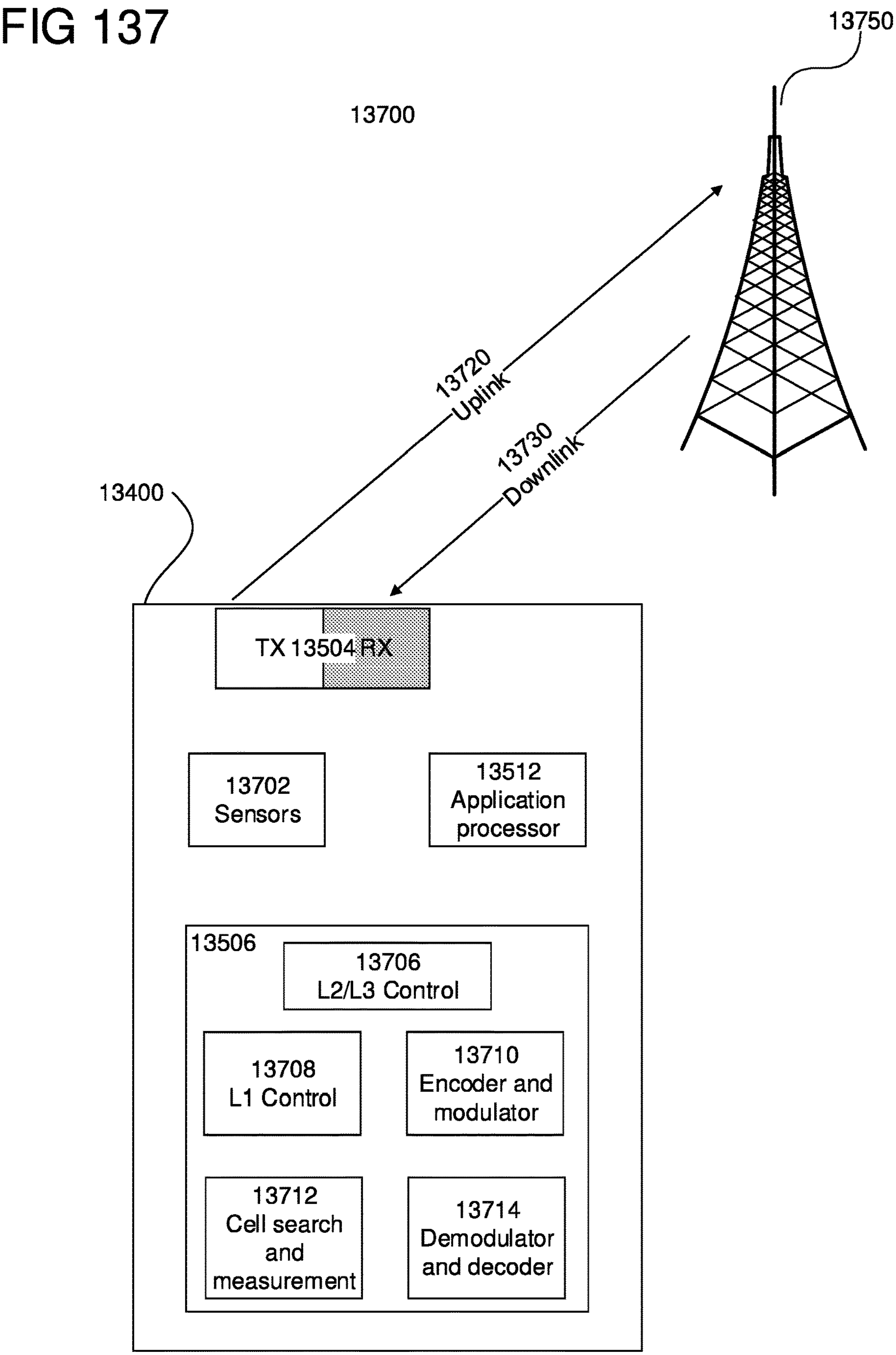
Figure 138:
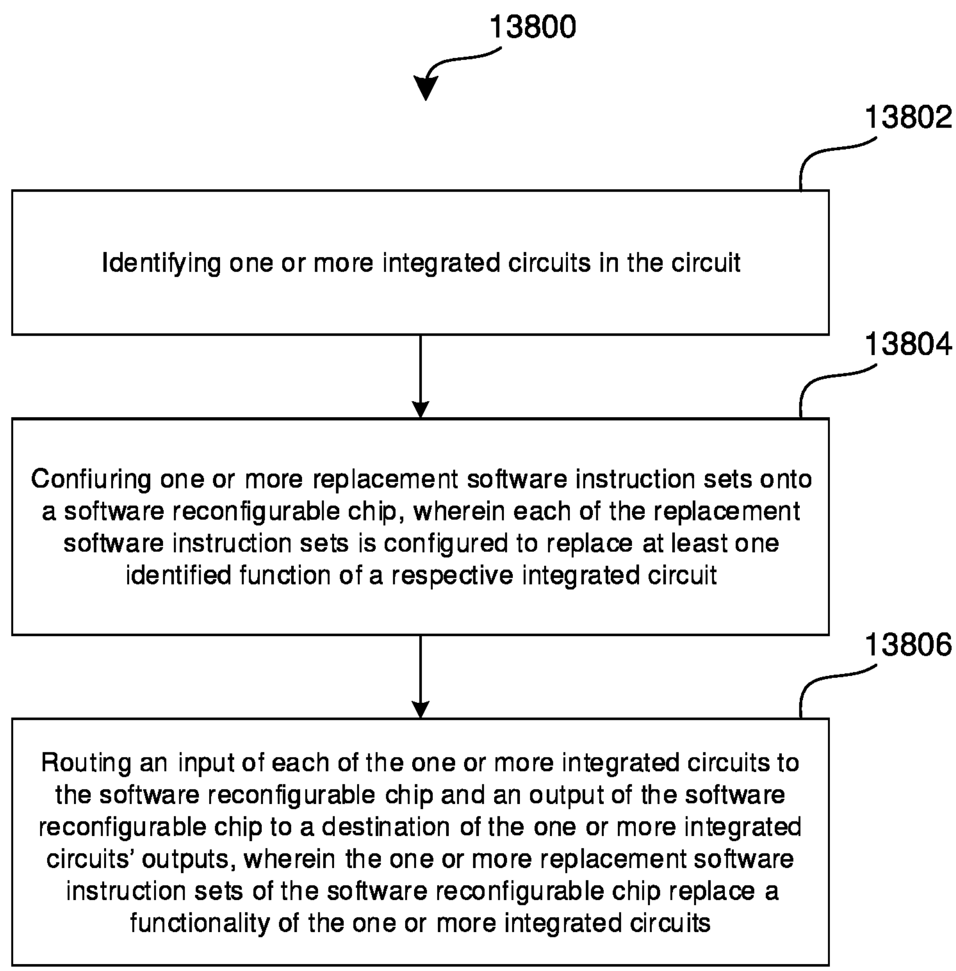
Figure 139:
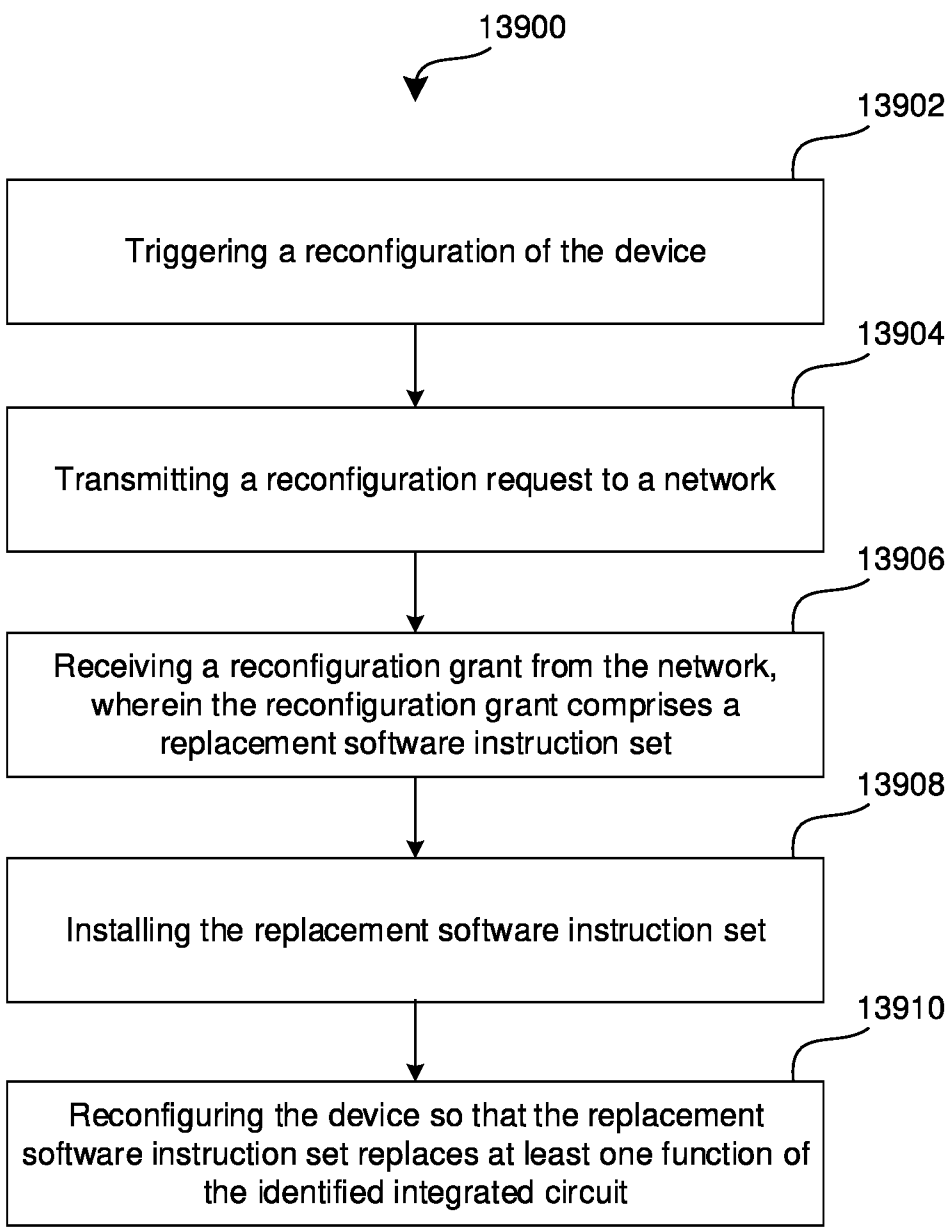
Figure 140:
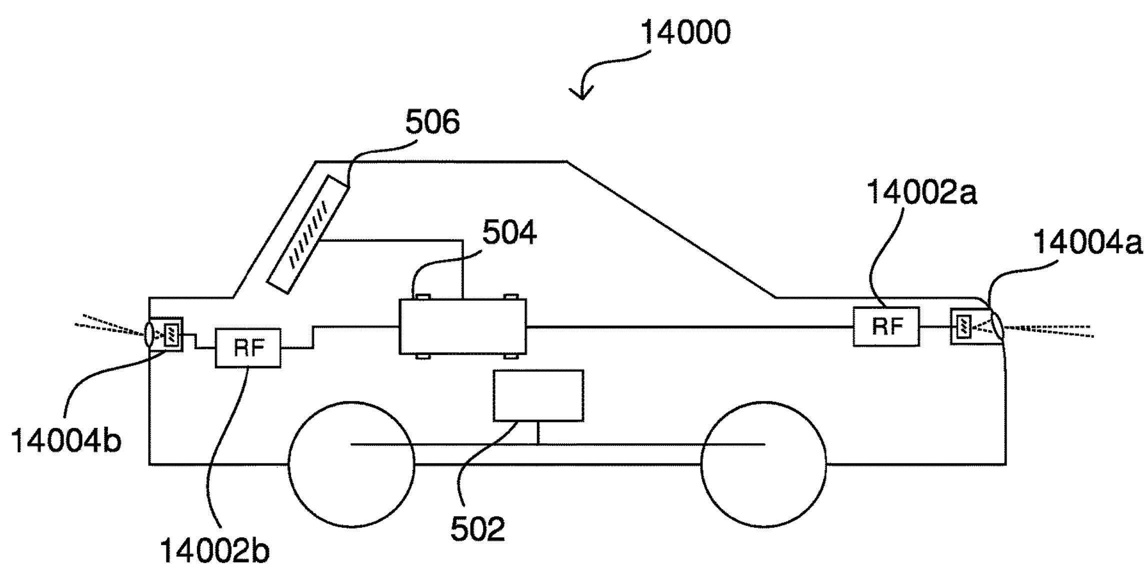
Figure 141A:
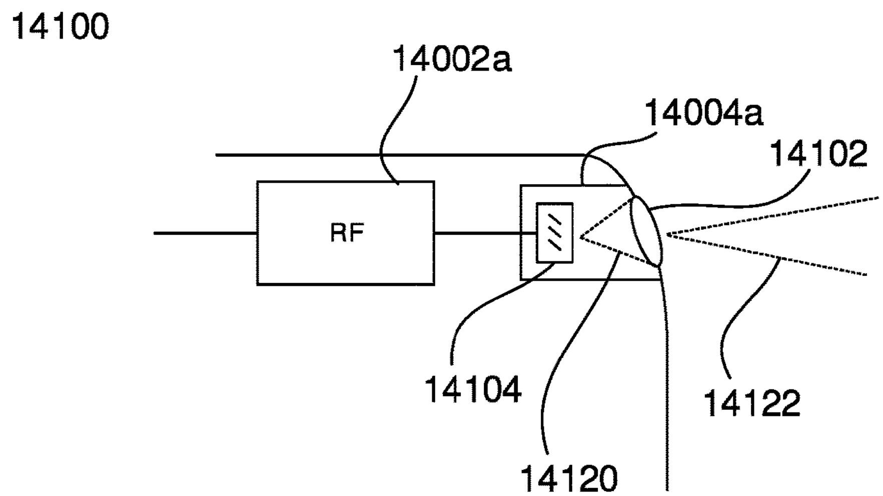
Figure 141B:
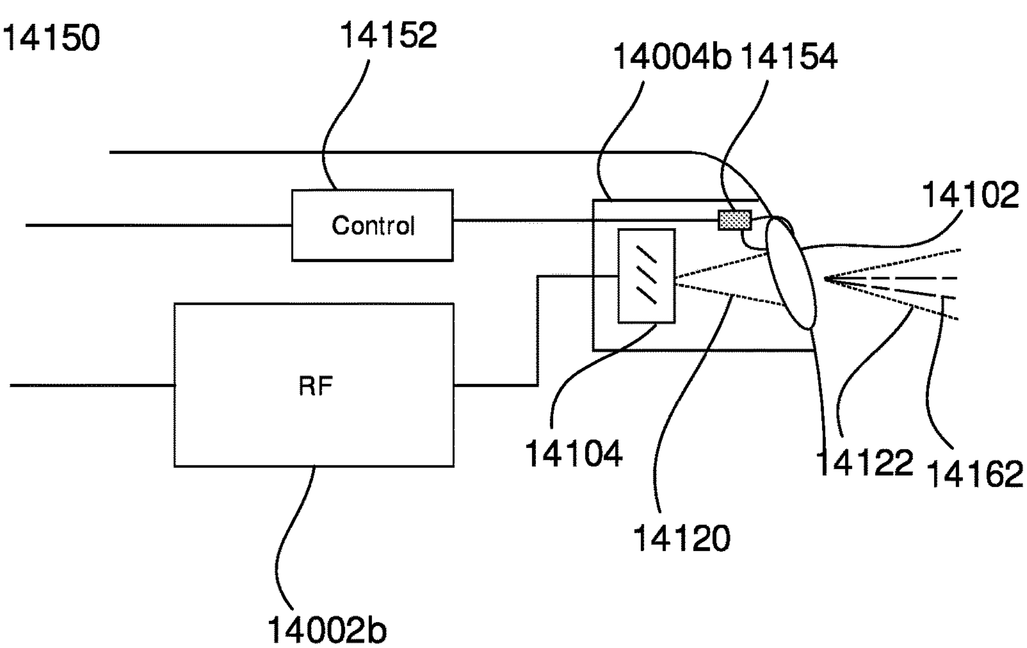
Figure 142:
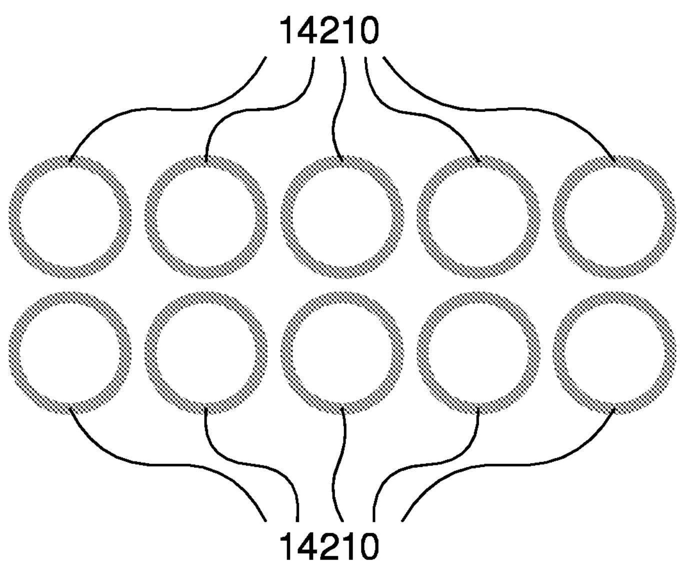
Figure 142:
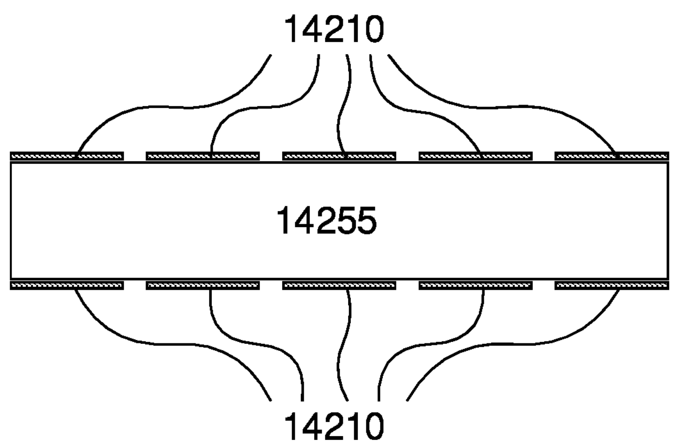
Figure 143:
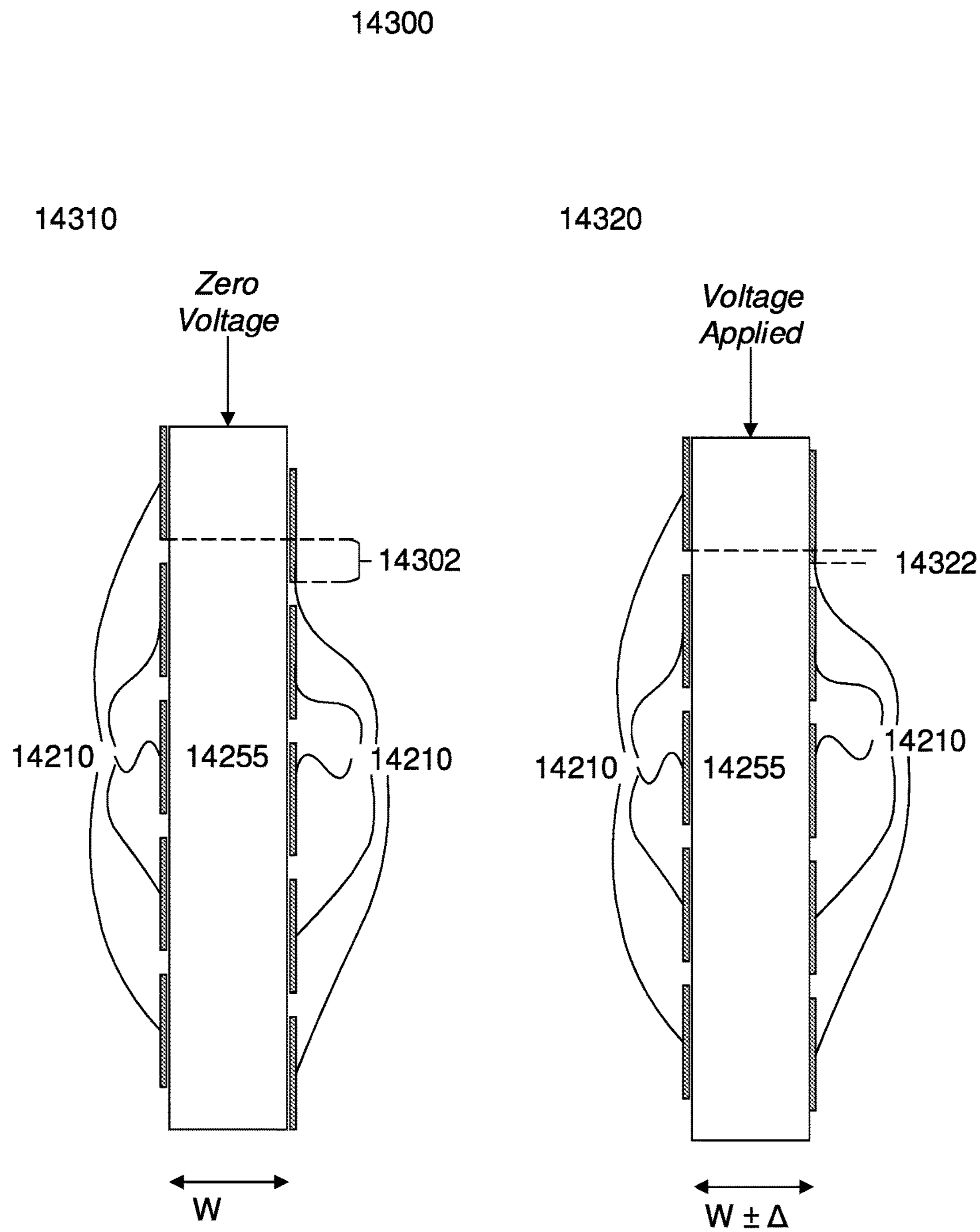
Figure 144:
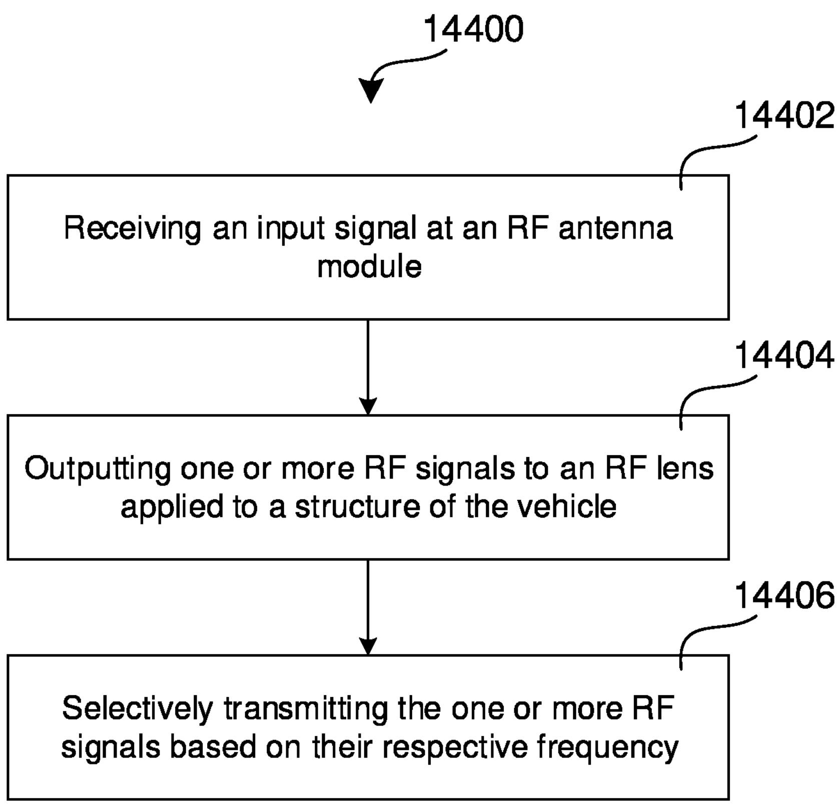
Figure 145:
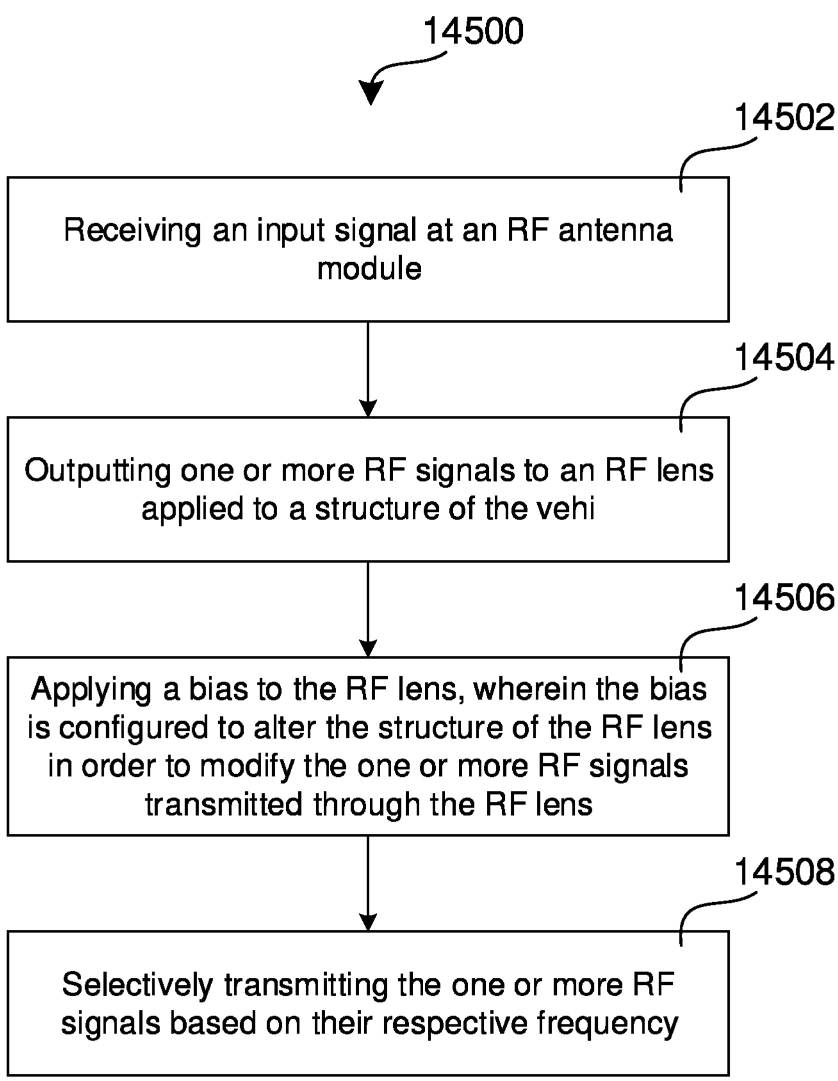
Figure 146:
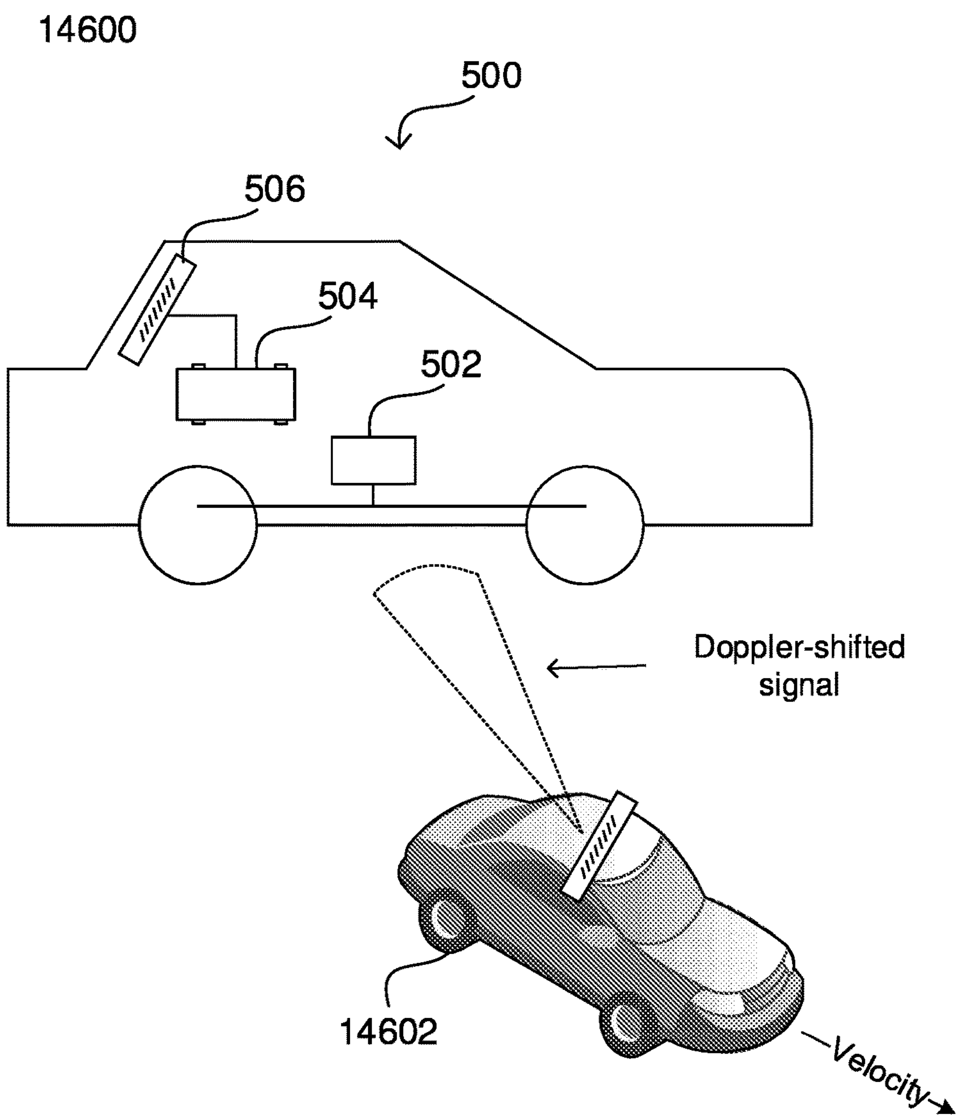
Figure 147:
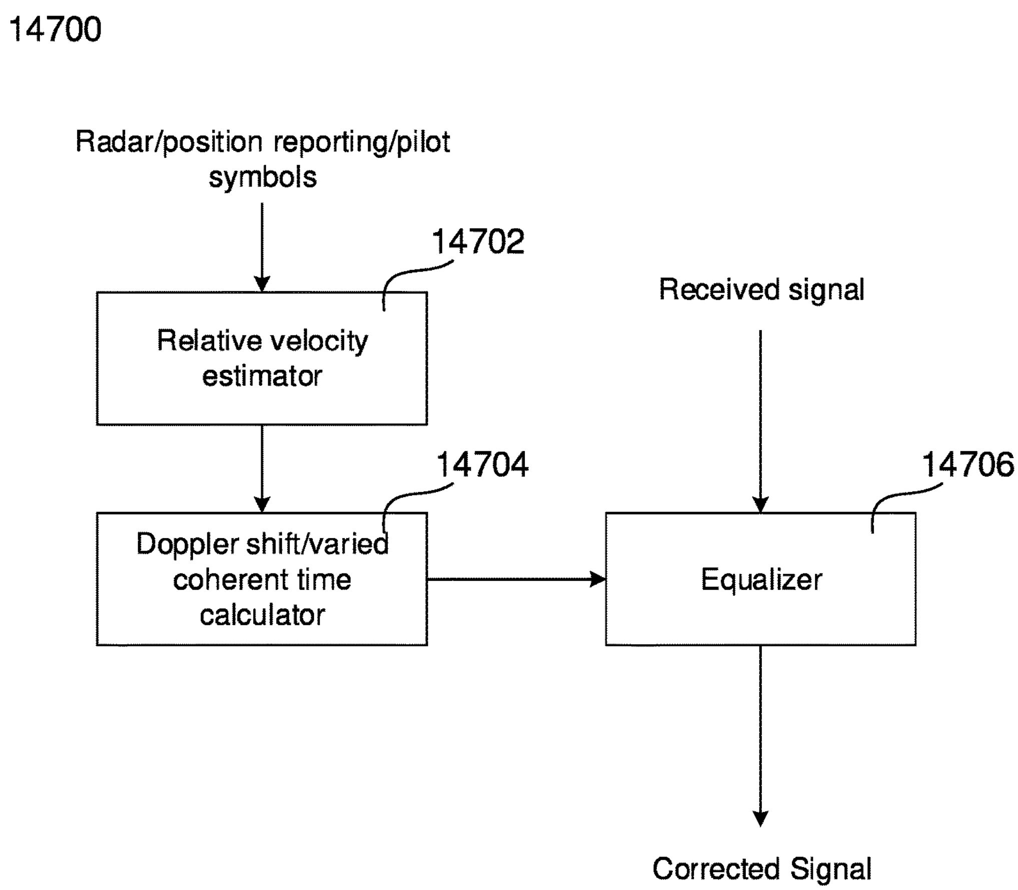
Figure 148:
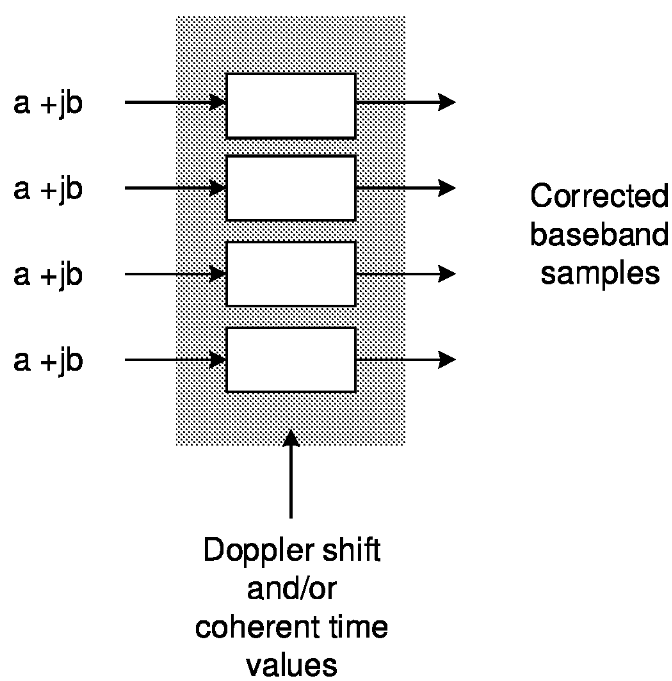
Figure 149:
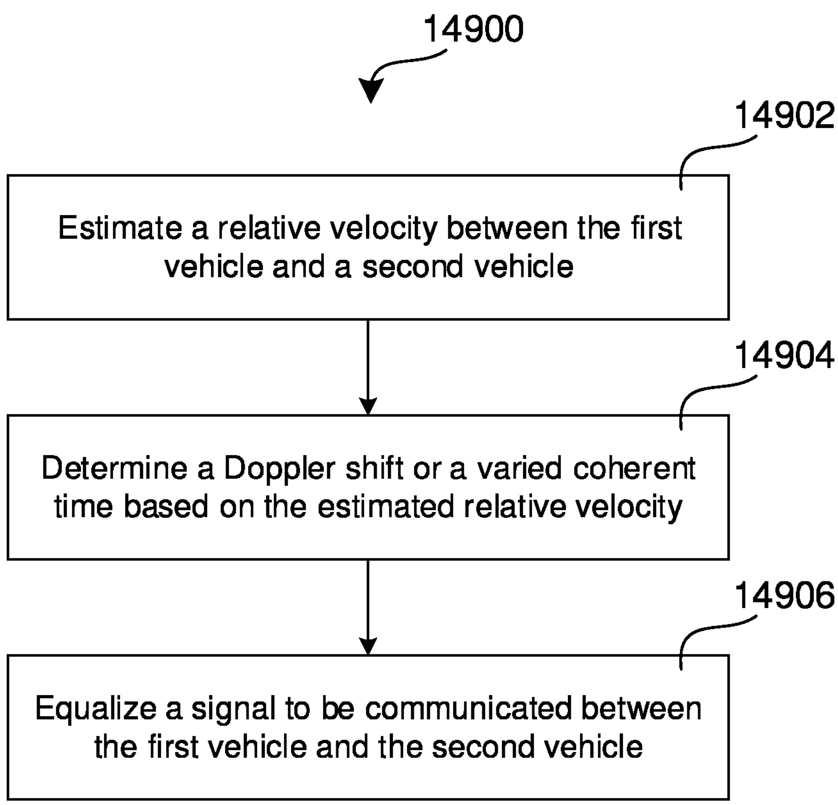
Figure 150:
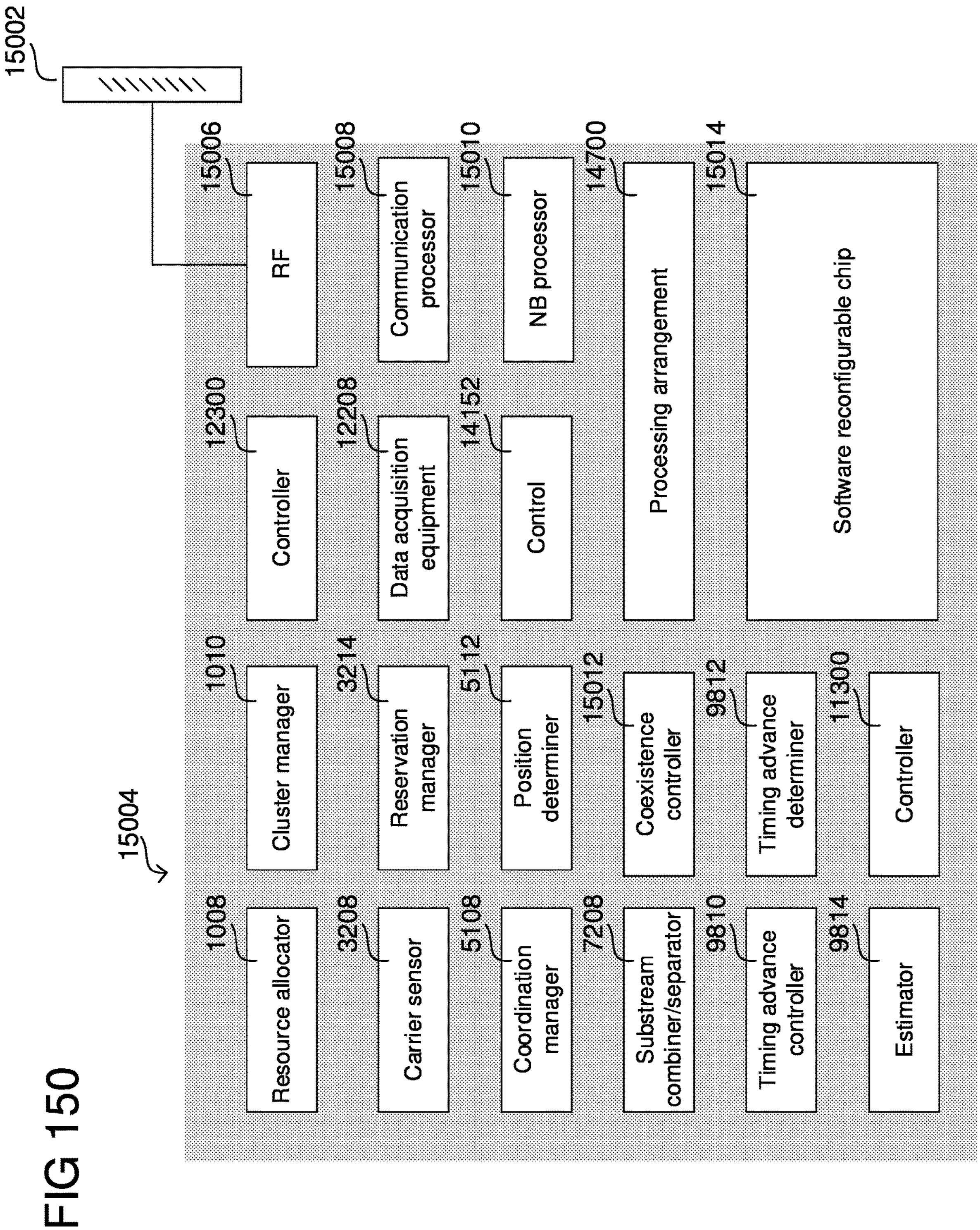
Figure 151:
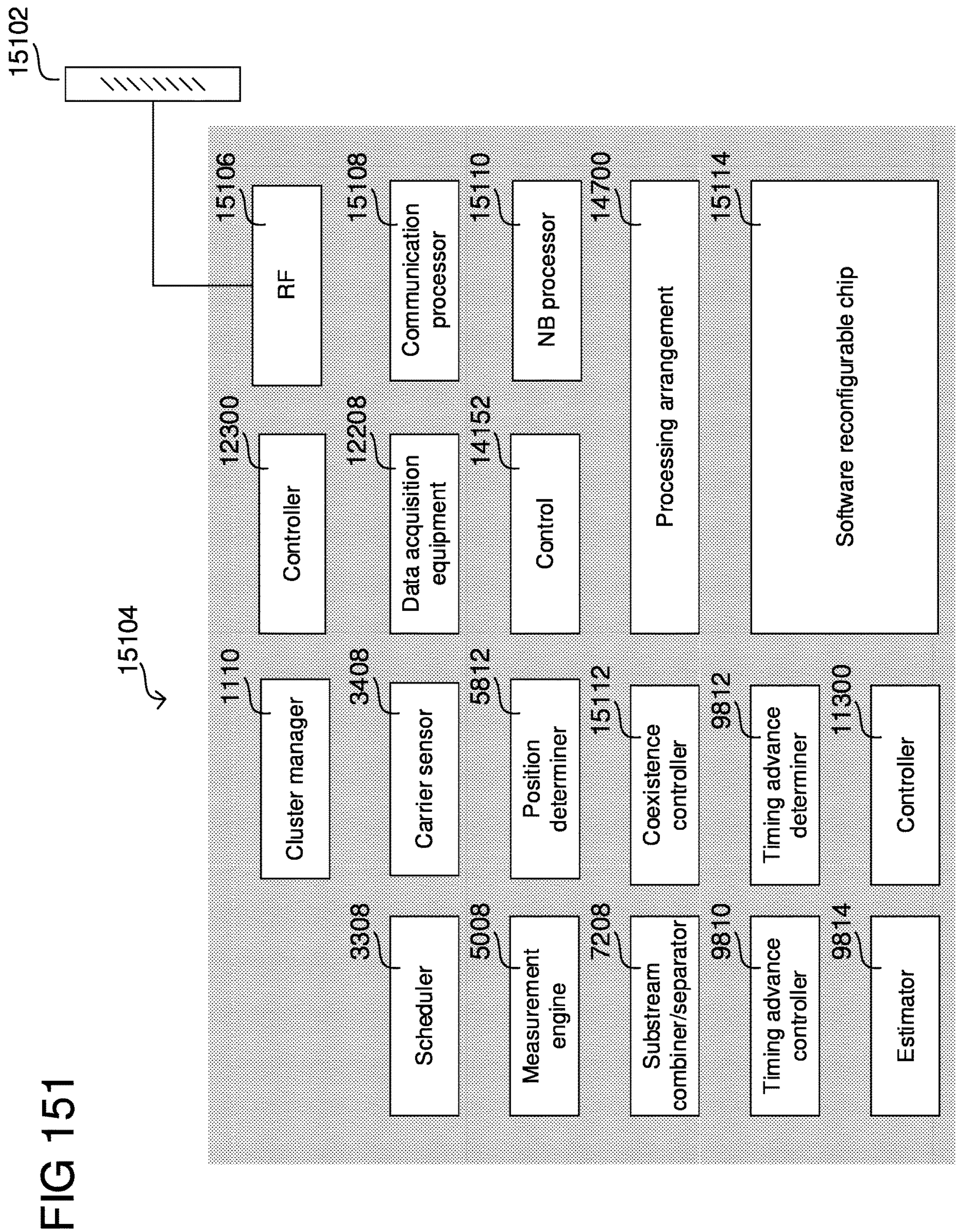
Figure 152:
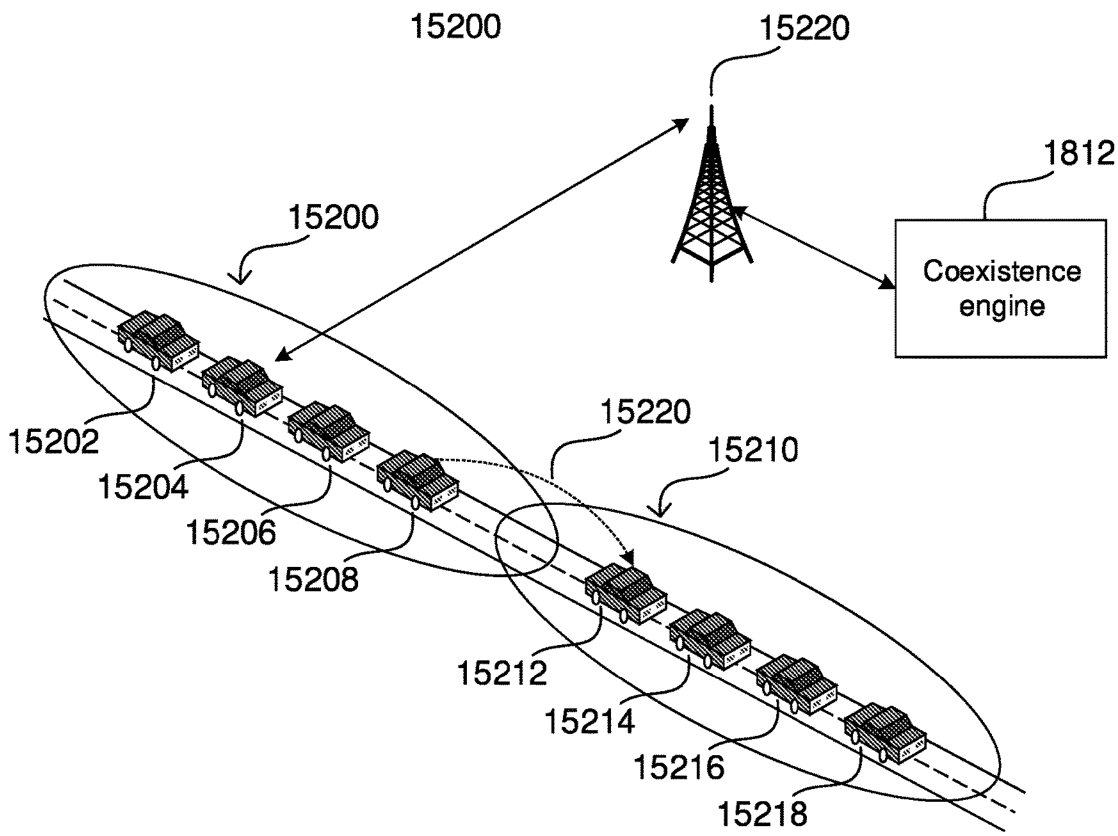
Figure 153:
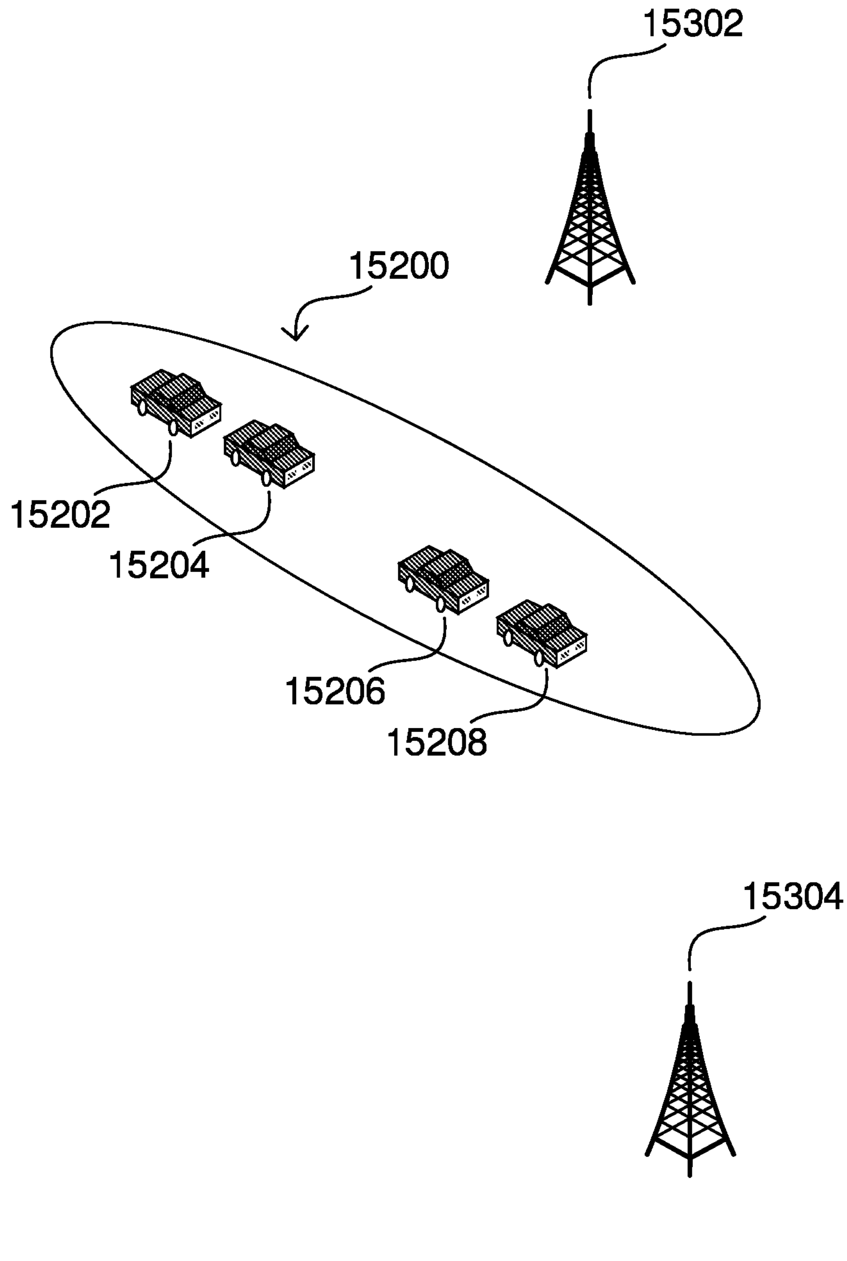
Figure 154:
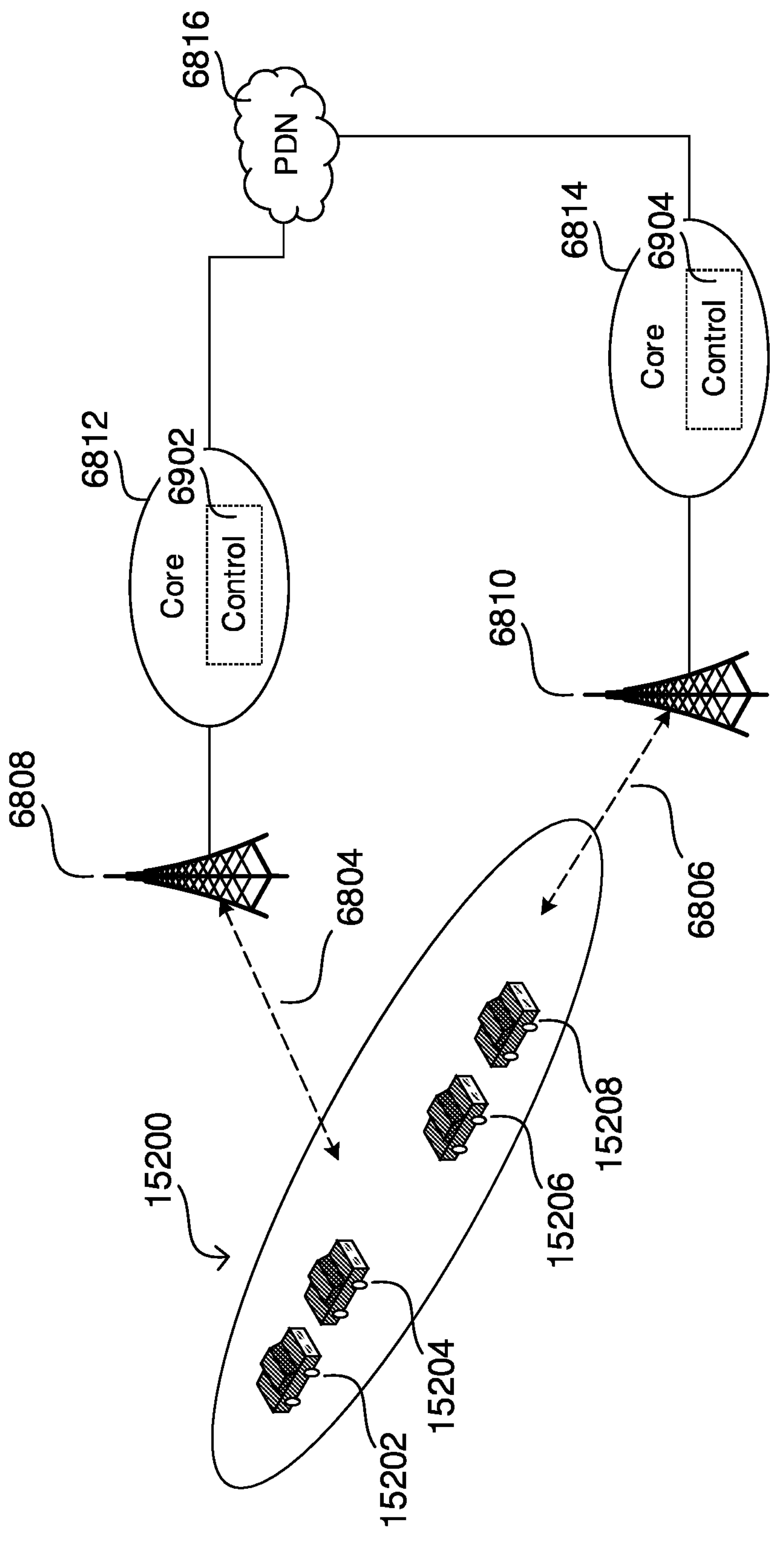
Figure 155:
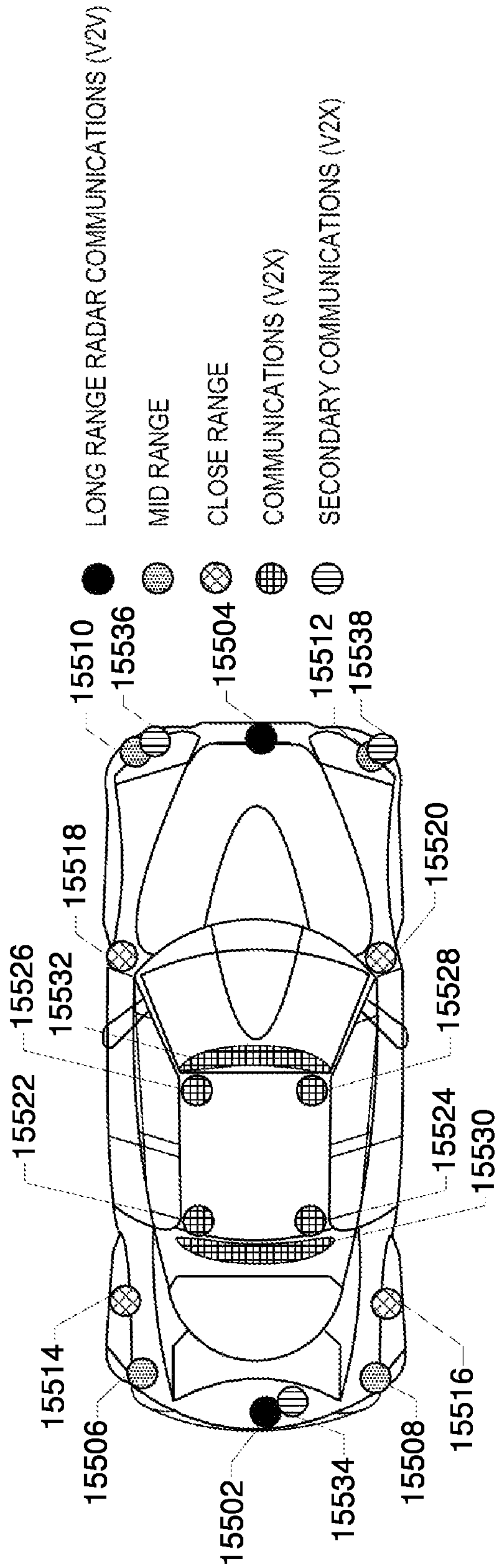

FIG. 131 shows an exemplary method for producing a communication device according to some aspects;

FIG. 132 shows an exemplary internal configuration of bypass circuits for replacing integrated circuits according to some aspects;

FIG. 133 shows an exemplary block diagram describing reassignment of resources according to some aspects;

FIG. 134 shows an exemplary internal configuration of an RVM for replacement of integrated circuits with a software reconfigurable chip according to some aspects;

FIG. 135 shows an exemplary internal configuration of a terminal device with an RVM for replacement of integrated circuits according to some aspects;

FIG. 136 shows an exemplary procedure for prioritizing replacement software according to some aspects;

FIG. 137 shows an exemplary block diagram including integrated circuits component eligible for replacement by a software reconfigurable chip according to some aspects;

FIG. 138 shows an exemplary procedure for replacing an integrated circuit with a software reconfigurable chip according to some aspects;

FIG. 139 shows an exemplary procedure for triggering software reconfiguration of a device according to some aspects;

FIG. 140 shows an exemplary internal configuration of a vehicular communication device configured for RF lensing according to some aspects;

FIGS. 141A and 141B show detailed illustrations of RF lensing configurations of a vehicular communication device according to some aspects;

FIG. 142 shows an exemplary RSS layer arrangement for RF lensing according to some aspects;

FIG. 143 shows an exemplary configuration of an active RF lens according to some aspects;

FIG. 144 shows an exemplary use case for Doppler correction of signals at vehicular communication devices according to some aspects;

FIG. 145 shows an exemplary internal configuration of a processing arrangement for Doppler correction according to some aspects;

FIG. 146 shows an exemplary internal configuration of an equalizer for Doppler correction according to some aspects;

FIG. 147 shows an exemplary method of using RF lensing to transmit signals according to some aspects;

FIG. 148 shows an exemplary method of using active RF lensing to transmit signals according to some aspects;

FIG. 149 shows an exemplary method of Doppler correction for vehicular communications according to some aspects;

FIG. 150 shows an exemplary internal configuration of a cluster head according to some aspects;

FIG. 151 shows an exemplary internal configuration of a cluster member according to some aspects;

FIG. 152 shows an exemplary network architecture of cluster-based communication with centralized spectrum allocation according to some aspects;

FIG. 153 shows an exemplary network architecture of cluster-based communication with radio measurement coordination according to some aspects;

FIG. 154 shows an exemplary network architecture of cluster-based communication with inter-operator carrier aggregation according to some aspects; and FIG. 155 shows an exemplary diagram of antenna placement on a vehicular communication device according to some aspects.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" are understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component comprising one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components, that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, mobile cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices.

The term "vehicular communication device" refers to any type of mobile machine or device or system that can communicate with other communication devices or systems. Vehicular communication devices may include dedicated communication components (for example in the manner of a terminal device, network access node, and/or relay node), that are configured to communicate with other communication devices such as terminal devices, network access nodes, and other vehicular communication devices. Vehicular communication devices can be terrestrial vehicles (e.g., automobiles, cars, trains, motorcycles, bicycles, utility vehicles, terrestrial drones or robots, or other land-based vehicles), aerospace vehicles (e.g., airplanes, helicopters, aerial drones, rockets, spacecraft, satellites, or other aeronautic or astronautic vehicles), and/or aquatic or sub-aquatic vehicles (e.g., boats, submarines, or other water/fluid-based vehicles). Vehicular communication devices may or may not transport passengers or cargo.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the aspects described herein may utilize include, but are not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication arrangement/Extended Total Access Communication arrangement (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication arrangements such as Intelligent-Transport-Systems, and other existing, developing, or future radio communication technologies. As used herein, a first radio communication technology may be different from a second radio communication technology if the first and second radio communication technologies are based on different communication standards.

Aspects described herein may use such radio communication technologies according to various spectrum management schemes, including, but not limited to, dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies), and may be use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, aspects described herein can also employ radio communication technologies on a secondary basis on bands such as the TV White Space bands (typically below 790 MHz) where in particular the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, aspects described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. Aspects described herein can also use radio communication technologies with different Single Carrier or OFDM flavors (CP-OFDM, SC-FDMA, SC-OFDM, filter bank-based multicarrier (FBMC), OFDMA, etc.) and in particular 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network" and "wireless network" as utilized herein encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Introductory Description

Figure 1:
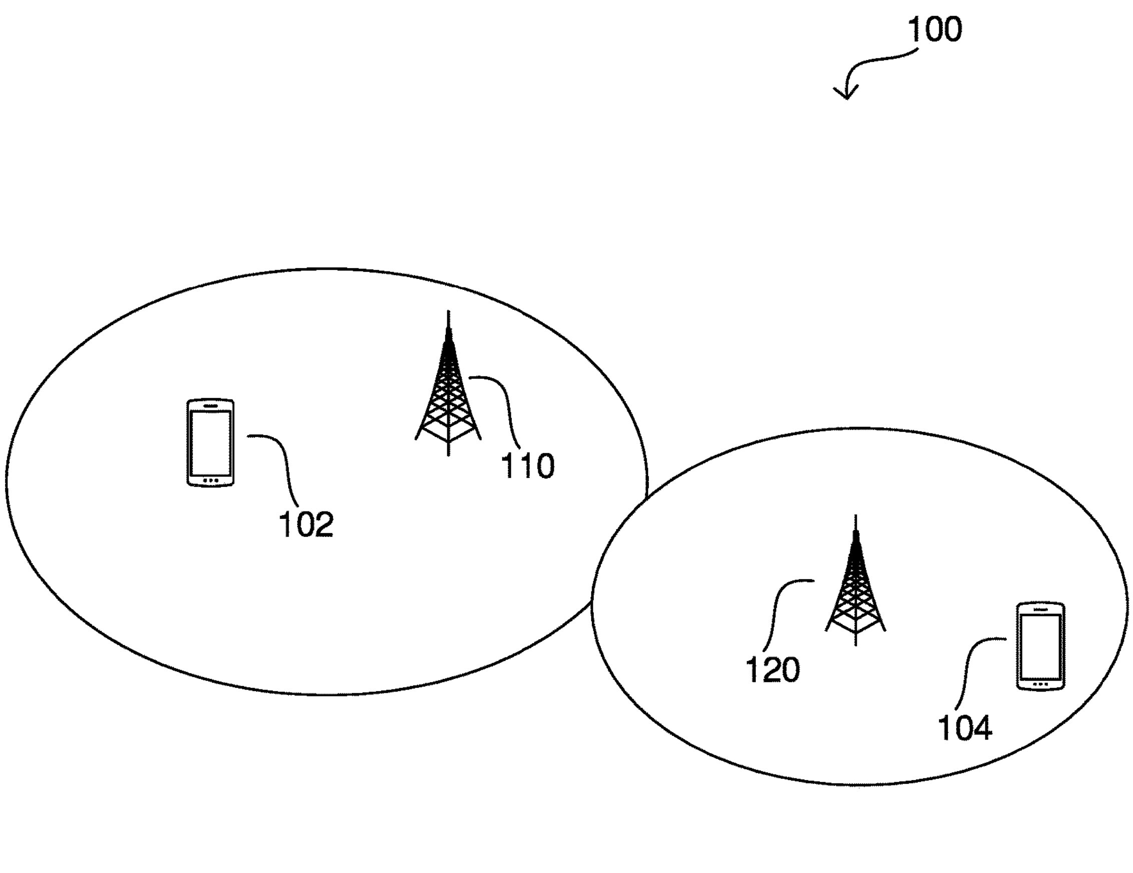
FIG. 1 shows an exemplary network architecture of a radio access network according to some aspects.

FIG. 1 shows exemplary radio communication network 100 according to some aspects, which may include terminal devices 102 and 104 in addition to network access nodes 110 and 120. Radio communication network 100 may communicate via network access nodes 110 and 120 with terminal devices 102 and 104 via various mechanisms.

In an exemplary cellular context, network access nodes 110 and 120 may be base stations (e.g., base stations, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 122 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control servers, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by radio communication technology protocols (or, equivalently, standard) that can vary depending on the specifics of radio communication network 100. Such radio communication technology protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined radio communication technology protocols to transmit and receive data over the radio access network domain of radio communication network 100, while the core network may follow the defined radio communication technology protocols to route data within and outside of the core network. Exemplary radio communication technology protocols include LTE, UMTS, GSM, WiMAX, Bluetooth, WiFi, mmWave, etc., any of which may be applicable to radio communication network 100.

Figure 2:
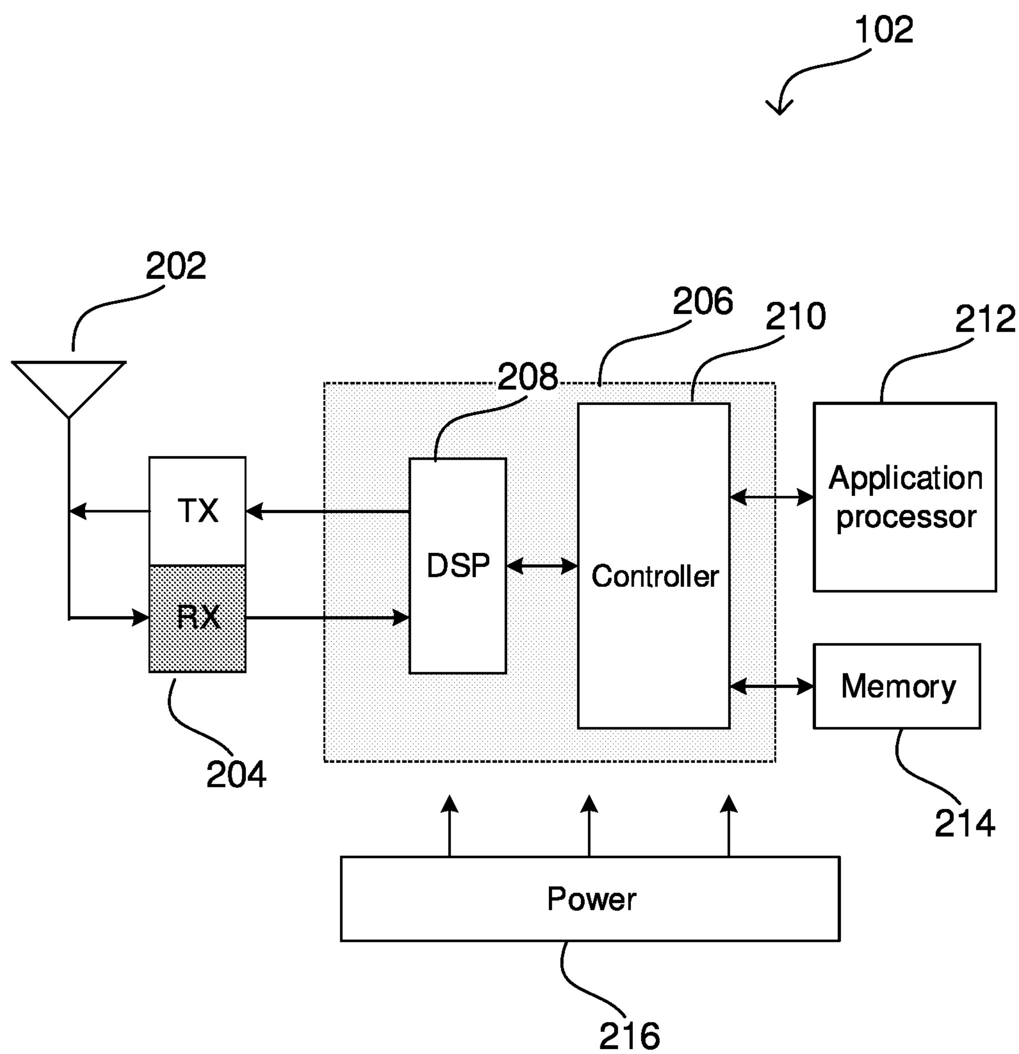
FIG. 2 shows an exemplary internal configuration of a terminal device according to some aspects.

FIG. 2 shows an exemplary internal configuration of terminal device 102 according to some aspects, which may include antenna system 202, radio frequency (RF) transceiver 204, baseband modem 206 (including digital signal processor 208 and controller 210), application processor 212, memory 214, and power supply 216. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to baseband samples. In the transmit (TX) path, RF transceiver 204 may receive baseband samples from baseband modem 206 and perform analog and digital RF front-end processing on the baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by controller 210 for transmission via RF transceiver 204, and, in the receive path, prepare incoming received data provided by RF transceiver 204 for processing by controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancellation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that algorithmically defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions. The one or more processors of digital signal processor 208 may offload certain processing tasks to these dedicated hardware circuits, which are referred to herein as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer (e.g., Layer 1/PHY) processing functions of the radio communication technologies, while controller 210 may be responsible for upper-layer protocol stack functions (e.g., Data Link Layer/Layer 2 and Network Layer/Layer 3). Controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Controller 210 may be structurally embodied as a protocol processor configured to execute protocol software (retrieved from a controller memory) and subsequently control the radio communication components of terminal device 102 to transmit and receive communication signals in accordance with the corresponding protocol control logic defined in the protocol software. Controller 210 may include one or more processors configured to retrieve and execute program code that algorithmically defines the upper-layer protocol stack logic for one or more radio communication technologies, which can include Data Link Layer/Layer 2 and Network Layer/Layer 3 functions. Controller 210 may be configured to perform both user-plane and control-plane functions to facilitate the transfer of application layer data to and from terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 210 may include executable instructions that algorithmically defines these functions.

In some aspects, terminal device 102 may be configured to transmit and receive data according to multiple radio communication technologies. Accordingly, in some aspects one or more of antenna system 202, RF transceiver 204, digital signal processor 208, and controller 210 may include separate components or instances dedicated to different radio communication technologies and/or unified components that are shared between different radio communication technologies. For example, in some aspects controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies. Accordingly, while antenna system 202, RF transceiver 204, digital signal processor 208, and controller 210 are shown as individual components in FIG. 2, in some aspects antenna system 202, RF transceiver 204, digital signal processor 208, and/or controller 210 can encompass separate components dedicated to different radio communication technologies.

Terminal device 102 may also include application processor 212, memory 214, and power supply 216. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce baseband samples, which digital signal processor may provide to RF transceiver 204. RF transceiver 204 may then process the baseband samples to convert the baseband samples to analog radio signals, which RF transceiver 204 may wirelessly transmit via antenna system 202. In the receive path, RF transceiver 204 may receive analog radio signals from antenna system 202 and process the analog radio signals to obtain baseband samples. RF transceiver 204 may provide the baseband samples to digital signal processor 208, which may perform physical layer processing on the baseband samples. Digital signal processor 208 may then provide the resulting data to controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface. Although shown separately in FIG. 2, in some aspects controller 210 and application processor 212 may be implemented as one or more processors that execute program code defining both protocol stack and application layer functions. The depiction of FIG. 2 thus shows the functional separation between the protocol stack and application layer without limiting implementations to being separate or unified.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, and other storage uses.

Power supply 216 may be an electrical power source that provides power to the various electrical components of terminal device 102. Depending on the design of terminal device 102, power supply 216 may be a 'definite' power source such as a battery (e.g., rechargeable or disposable) or an 'indefinite' power source such as a wired electrical connection. Operation of the various components of terminal device 102 may thus pull electrical power from power supply 216.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area (one or more of which can be overlapping or mutually exclusive), terminal devices 102 and 104 may be configured to select and re-select between the available network access nodes to maintain a suitable radio access connection with the radio access network of radio communication network 100. For example, terminal device 102 may establish a radio access connection with network access node 110 while terminal device 104 may establish a radio access connection with network access node 114. In the event that the current radio access connection degrades, terminal devices 104 or 106 may seek a new radio access connection with another network access node of radio communication network 100. For example, terminal device 104 may move from the coverage area of network access node 114 into the coverage area of network access node 110. As a result, the radio access connection with network access node 114 may degrade, which terminal device 104 may detect via radio measurements such as signal strength or signal quality measurements of network access node 114. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover, are established in the various network protocols and may be employed by terminal devices and the radio access network to maintain suitable radio access connections between each terminal device and the radio access network across any number of different radio access network scenarios.

Figure 3:
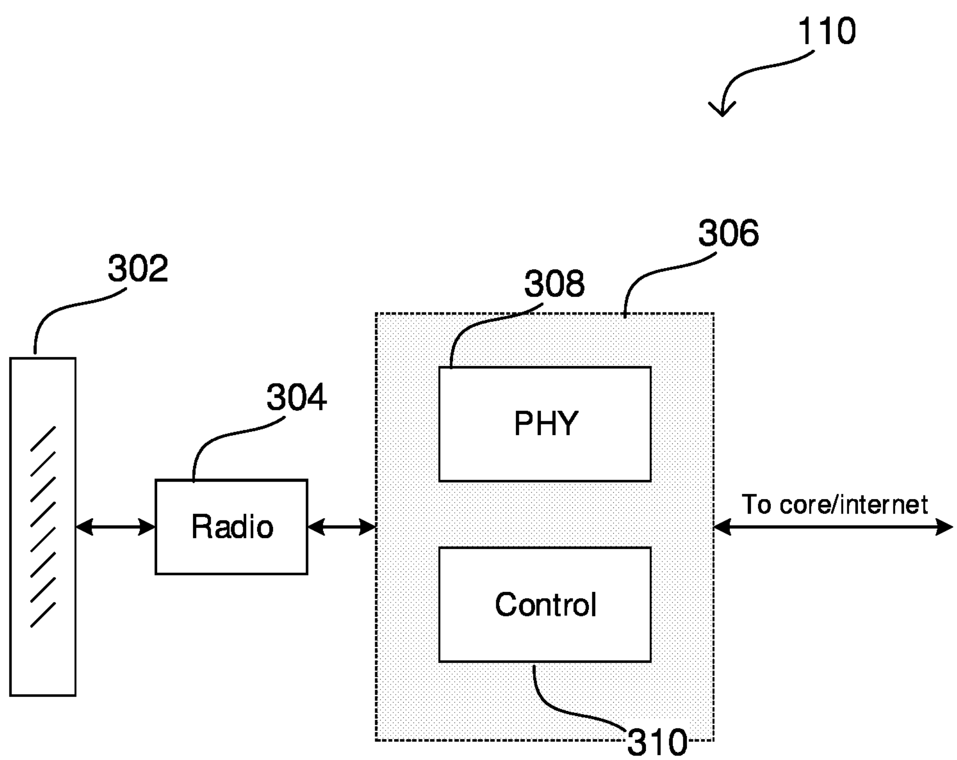
FIG. 3 shows an exemplary internal configuration of a network access node according to some aspects.

FIG. 3 shows an exemplary internal configuration of a network access node, such as network access node 110, according to some aspects. As shown in FIG. 3, network access node 110 may include antenna system 302, radio transceiver 304, and baseband subsystem 306 (including physical layer processor 308 and controller 310). In an abridged overview of the operation of network access node 110, network access node 110 may transmit and receive wireless signals via antenna system 302, which may be an antenna array including multiple antennas. Radio transceiver 304 may perform transmit and receive RF processing to convert outgoing baseband samples from baseband subsystem 306 into analog radio signals to provide to antenna system 302 for radio transmission and to convert incoming analog radio signals received from antenna system 302 into baseband samples to provide to baseband subsystem 306. Physical layer processor 308 may be configured to perform transmit and receive PHY processing on baseband samples received from radio transceiver 304 to provide to controller 310 and on baseband samples received from controller 310 to provide to radio transceiver 304. Controller 310 may control the communication functionality of network access node 110 according to the corresponding radio communication technology protocols, which may include exercising control over antenna system 302, radio transceiver 304, and physical layer processor 308. Each of radio transceiver 304, physical layer processor 308, and controller 310 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. In some aspects, radio transceiver 304 may be a radio transceiver including digital and analog radio frequency processing and amplification circuitry. In some aspects, radio transceiver 304 may be a software-defined radio (SDR) component implemented as a processor configured to execute software-defined instructions that specify radio frequency processing routines. In some aspects, physical layer processor 308 may include a processor and one or more hardware accelerators, wherein the processor is configured to control physical layer processing and offload certain processing tasks to the one or more hardware accelerators. In some aspects, controller 310 may be a controller configured to execute software-defined instructions that specify upper-layer control functions. In some aspects, controller 310 may be limited to radio communication protocol stack layer functions, while in other aspects controller 310 may also be configured for transport, internet, and application layer functions.

Network access node 110 may thus provide the functionality of network access nodes in radio communication networks by providing a radio access network to enable served terminal devices to access communication data. For example, network access node 110 may also interface with a core network, one or more other network access nodes, or various other data networks and servers via a wired or wireless backhaul interface.

Figure 4:
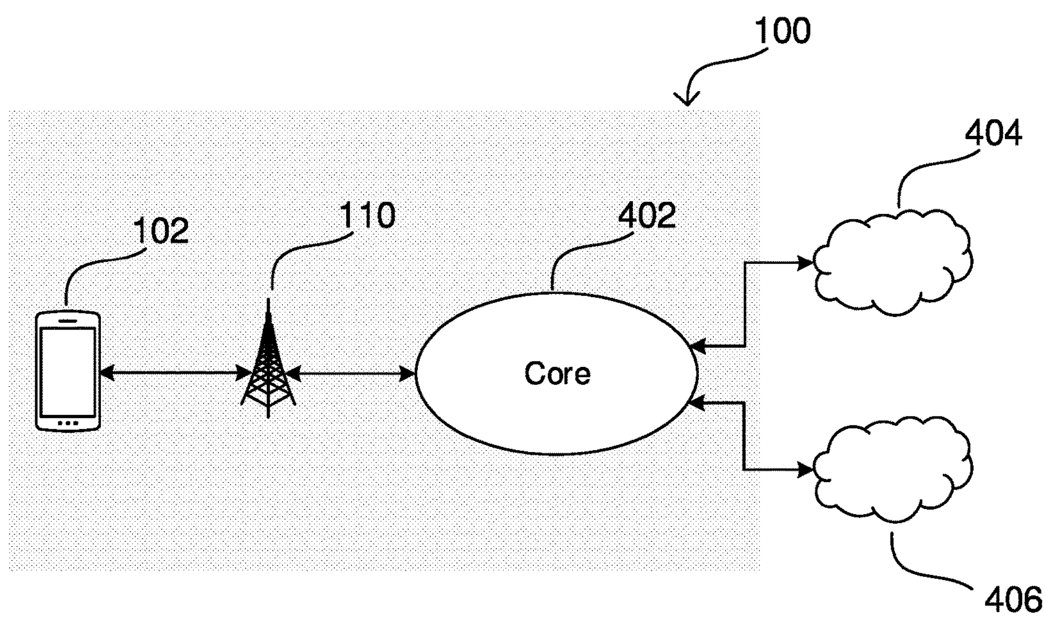
FIG. 4 shows an exemplary network architecture of a radio access network, core network, and external data networks according to some aspects.

As previously indicated, network access nodes 112 and 114 may interface with a core network. FIG. 4 shows an exemplary configuration in accordance with some aspects where network access node 110 interfaces with core network 402, which may be, for example, a cellular core network. Core network 402 may provide a variety of functions to manage operation of radio communication network 100, such as data routing, authenticating and managing users/subscribers, interfacing with external networks, and various other network control tasks. Core network 402 may therefore provide an infrastructure to route data between terminal device 104 and various external networks such as data network 404 and data network 406. Terminal device 104 may thus rely on the radio access network provided by network access node 110 to wirelessly transmit and receive data with network access node 110, which may then provide the data to core network 402 for further routing to external locations such as data networks 404 and 406 (which may be packet data networks (PDNs)). Terminal device 104 may therefore establish a data connection with data network 404 and/or data network 406 that relies on network access node 110 and core network 402 for data transfer and routing.

Figure 5:
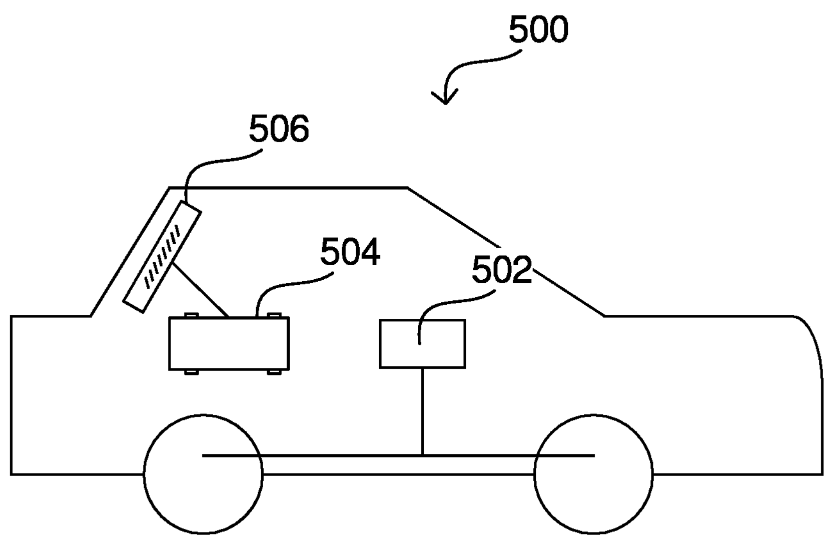
FIG. 5 shows an exemplary internal configuration of a vehicular communication device according to some aspects.

Terminal devices may in some cases be configured as vehicular communication devices. FIG. 5 shows an exemplary internal configuration of a vehicular communication device 500 according to some aspects. As shown in FIG. 5, vehicular communication device 500 may include steering and movement system 502, radio communication arrangement 504, and antenna system 506. The internal components of vehicular communication device 500 may be arranged around a vehicular housing of vehicular communication device 500, mounted on or outside of the vehicular housing, enclosed within the vehicular housing, or any other arrangement relative to the vehicular housing where the internal components move with vehicular communication device 500 as it travels. The vehicular housing, such as an automobile body, plane or helicopter fuselage, boat hull, or similar type of vehicular body dependent on the type of vehicle that vehicular communication device 500 is. Steering and movement system 502 may include components of vehicular communication device 500 related to steering and movement of vehicular communication device 500. In some aspects where vehicular communication device 500 is an automobile, steering and movement system 502 may include wheels and axles, an engine, a transmission, brakes, a steering wheel, associated electrical circuitry and wiring, and any other components used in the driving of an automobile. In some aspects where vehicular communication device 500 is an aerial vehicle, steering and movement system 502 may include one or more of rotors, propellers, jet engines, wings, rudders or wing flaps, air brakes, a yoke or cyclic, associated electrical circuitry and wiring, and any other components used in the flying of an aerial vehicle. In some aspects where vehicular communication device 500 is an aquatic or sub-aquatic vehicle, steering and movement system 502 may include any one or more of rudders, engines, propellers, a steering wheel, associated electrical circuitry and wiring, and any other components used in the steering or movement of an aquatic vehicle. In some aspects, steering and movement system 502 may also include autonomous driving functionality, and accordingly may also include a central processor configured to perform autonomous driving computations and decisions and an array of sensors for movement and obstacle sensing. The autonomous driving components of steering and movement system 502 may also interface with radio communication arrangement 504 to facilitate communication with other nearby vehicular communication devices and/or central networking components that perform decisions and computations for autonomous driving.

Radio communication arrangement 504 and antenna system 506 may perform the radio communication functionalities of vehicular communication device 500, which can include transmitting and receiving communications with a radio communication network and/or transmitting and receiving communications directly with other vehicular communication devices and terminal devices. For example, radio communication arrangement 504 and antenna system 506 may be configured to transmit and receive communications with one or more network access nodes, such as, in the exemplary context of DSRC and LTE V2V/V2X, RSUs and base stations.

Figure 6:
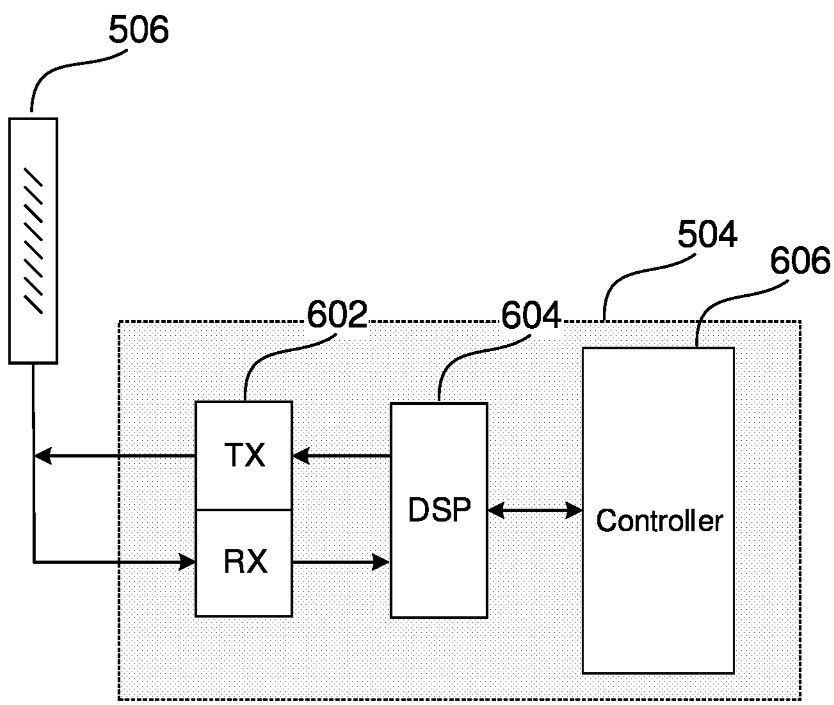
FIG. 6 shows an exemplary internal configuration of an antenna system and communication arrangement of a vehicular communication device according to some aspects.

FIG. 6 shows an exemplary internal configuration of antenna system 506 and radio communication arrangement 504 according to some aspects. As shown in FIG. 6, radio communication arrangement 504 may include RF transceiver 602, digital signal processor 604, and controller 606. Although not explicitly shown in FIG. 6, in some aspects radio communication arrangement 504 may include one or more additional hardware and/or software components (such as processors/microprocessors, controllers/microcontrollers, other specialty or generic hardware/processors/circuits, etc.), peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Controller 606 may be responsible for execution of upper-layer protocol stack functions, while digital signal processor 604 may be responsible for physical layer processing. RF transceiver 602 may be responsible for RF processing and amplification related to transmission and reception of wireless radio signals via antenna system 506.

Antenna system 506 may be a single antenna or an antenna array that includes multiple antennas. Antenna system 506 may additionally include analog antenna combination and/or beamforming circuitry. In the receive (RX) path, RF transceiver 602 may receive analog radio signals from antenna system 506 and perform analog and digital RF front-end processing on the analog radio signals to produce baseband samples (e.g., In-Phase/Quadrature (IQ) samples) to provide to digital signal processor 604. In some aspects, RF transceiver 602 can include analog and digital reception components such as amplifiers (e.g., a Low Noise Amplifiers (LNAs)), filters, RF demodulators (e.g., RF IQ demodulators)), and analog-to-digital converters (ADCs), which RF transceiver 602 may utilize to convert the received radio signals to baseband samples. In the transmit (TX) path, RF transceiver 602 may receive baseband samples from digital signal processor 604 and perform analog and digital RF front-end processing on the baseband samples to produce analog radio signals to provide to antenna system 506 for wireless transmission. In some aspects, RF transceiver 602 can include analog and digital transmission components such as amplifiers (e.g., Power Amplifiers (PAs), filters, RF modulators (e.g., RF IQ modulators), and digital-to-analog converters (DACs) to mix the baseband samples received from baseband modem 206, which RF transceiver 602 may use to produce the analog radio signals for wireless transmission by antenna system 506.

Digital signal processor 604 may be configured to perform physical layer (PHY) transmission and reception processing to, in the transmit path, prepare outgoing transmit data provided by controller 606 for transmission via RF transceiver 602, and, in the receive path, prepare incoming received data provided by RF transceiver 602 for processing by controller 606. Digital signal processor 604 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. Digital signal processor 604 may include one or more processors configured to retrieve and execute program code that algorithmically defines control and processing logic for physical layer processing operations. In some aspects, digital signal processor 604 may execute processing functions with software via the execution of executable instructions. In some aspects, digital signal processor 604 may include one or more hardware accelerators, where the one or more processors of digital signal processor 604 may offload certain processing tasks to these hardware accelerators. In some aspects, the processor and hardware accelerator components of digital signal processor 604 may be realized as a coupled integrated circuit.

While digital signal processor 604 may be responsible for lower-layer physical processing functions, controller 606 may be responsible for upper-layer protocol stack functions. Controller 606 may include one or more processors configured to retrieve and execute program code that algorithmically defines the upper-layer protocol stack logic for one or more radio communication technologies, which can include Data Link Layer/Layer 2 and Network Layer/Layer 3 functions. Controller 606 may be configured to perform both user-plane and control-plane functions to facilitate the transfer of application layer data to and from radio communication arrangement 504 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 606 may include executable instructions that define the logic of such functions.

In some aspects, controller 606 may be coupled to an application processor, which may handle the layers above the protocol stack including transport and application layers. The application processor may act as a source for some outgoing data transmitted by radio communication arrangement 504 and a sink for some incoming data received by radio communication arrangement 504. In the transmit path, controller 606 may therefore receive and process outgoing data provided by the application processor according to the layer-specific functions of the protocol stack, and provide the resulting data to digital signal processor 604. Digital signal processor 604 may then perform physical layer processing on the received data to produce baseband samples, which digital signal processor may provide to RF transceiver 602. RF transceiver 602 may then process the baseband samples to convert the baseband samples to analog radio signals, which RF transceiver 602 may wirelessly transmit via antenna system 506. In the receive path, RF transceiver 602 may receive analog radio signals from antenna system 506 and process the analog RF signal to obtain baseband samples. RF transceiver 602 may provide the baseband samples to digital signal processor 604, which may perform physical layer processing on the baseband samples. Digital signal processor 604 may then provide the resulting data to controller 606, which may process the resulting data according to the layer-specific functions of the protocol stack and provide the resulting incoming data to the application processor.

In some aspects, radio communication arrangement 504 may be configured to transmit and receive data according to multiple radio communication technologies. Accordingly, in some aspects one or more of antenna system 506, RF transceiver 602, digital signal processor 604, and controller 606 may include separate components or instances dedicated to different radio communication technologies and/or unified components that are shared between different radio communication technologies. For example, in some aspects controller 606 may be configured to execute multiple protocol stacks, each dedicated to a different radio communication technology and either at the same processor or different processors. In some aspects, digital signal processor 604 may include separate processors and/or hardware accelerators that are dedicated to different respective radio communication technologies, and/or one or more processors and/or hardware accelerators that are shared between multiple radio communication technologies. In some aspects, RF transceiver 602 may include separate RF circuitry sections dedicated to different respective radio communication technologies, and/or RF circuitry sections shared between multiple radio communication technologies. In some aspects, antenna system 506 may include separate antennas dedicated to different respective radio communication technologies, and/or antennas shared between multiple radio communication technologies. Accordingly, while antenna system 506, RF transceiver 602, digital signal processor 604, and controller 606 are shown as individual components in FIG. 6, in some aspects antenna system 506, RF transceiver 602, digital signal processor 604, and/or controller 606 can encompass separate components dedicated to different radio communication technologies.

Figure 7:
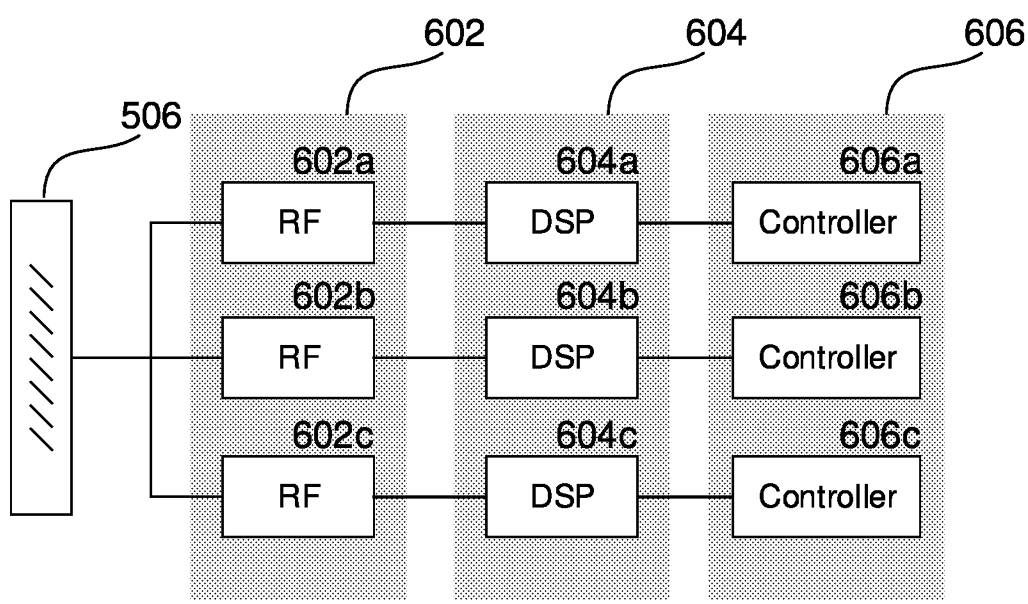
FIG. 7 shows an exemplary internal configuration of a multi-mode communication arrangement according to some aspects.

FIG. 7 shows an example in which RF transceiver 602 includes RF transceiver **602*a* for a first radio communication technology, RF transceiver 602*b* for a second radio communication technology, and RF transceiver 602*c* for a third radio communication technology. Likewise, digital signal processor 604 includes digital signal processor 604*a* for the first radio communication technology, digital signal processor 604*b* for the second radio communication technology, and digital signal processor 604*c* for the third radio communication technology. Similarly, controller 606 may include controller 606*a* for the first radio communication technology, controller 606*b* for the second radio communication technology, and controller 606*c* for the third radio communication technology. RF transceiver 602*a*, digital signal processor 604*a*, and controller 606*a* thus form a communication arrangement (e.g., the hardware and software components dedicated to a particular radio communication technology) for the first radio communication technology, RF transceiver 602*b*, digital signal processor 604*b*, and controller 606*b* thus form a communication arrangement for the second radio communication technology, and RF transceiver 602*c*, digital signal processor 604*c*, and controller 606*c* thus form a communication arrangement for the third radio communication technology. More or less radio communication technologies may be implemented. While depicted as being logically separate in FIG. 7**, any components of the communication arrangements may be integrated into a common component or set of common components.

Figure 8:
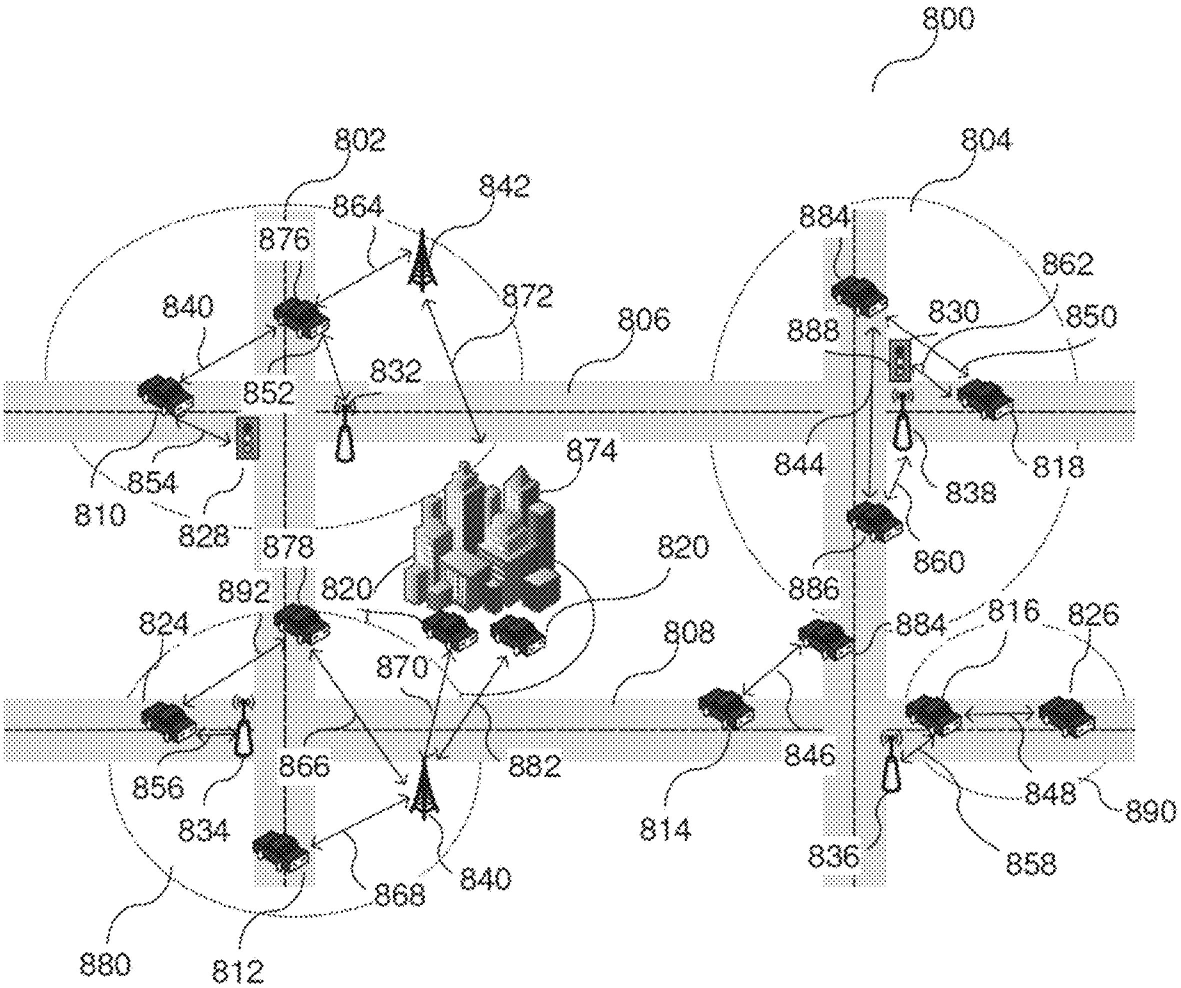
FIG. 8 shows an exemplary network scenario including various terminal devices, network access nodes, and infrastructure using different vehicular radio communication technologies according to some aspects.

FIG. 8 shows an exemplary network scenario including various vehicular radio communication technologies according to some aspects. As shown in FIG. 8, vehicular communication devices 810 and 876 may operate in broadband network 802, which may use, for example, any type of cellular radio communication technology. Vehicular communication devices 810 and 876 may communicate with each other using sidelink channel 840, such as using DSRC, LTE V2V, LTE D2D, or another vehicular radio communication technology for sidelink communications. Vehicular communication device 810 may communicate with infrastructure 828 (e.g., a traffic light, camera, lane marker, street light, traffic signs, parking meters) over channel 854 using a cellular radio communication technology, while vehicular communication device 876 may communicate with network access node 842 (e.g., LTE base station) over channel 864. Vehicular communication device 876 may also communicate with RSU 832 over channel 852, which may use a short-range radio communication technology, such as DSRC. Network access node 842 may interface with IoT/narrowband network 874 over backhaul link 872. Vehicular communication device 810 may travel on road 806.

Vehicular communication devices 824, 878, and 812 may operate in broadband network 880, which may use the same or a different cellular radio communication technology from broadband network 802. As shown in FIG. 8, vehicular communication devices 878 and 824 may communicate over sidelink channel 892. Vehicular communication devices 812 and 878 may communicate with network access node 840 over channels 866 and 868, respectively. Vehicular communication device 824 may communicate with RSU 834 over channel 856. Network access node 840 may interface with vehicular communication devices 820 and 822 located in IoT/narrowband network 874 over channels 870 and 882. Vehicular communication device 824 may travel on road 808.

Vehicular communication devices 884, 886, and 818 may operate in short-range/unlicensed network 805, which may use any type of short-range radio communication technology, for example, DSRC or WiFi. Vehicular communication devices 884 and 818 may communicate with each other on sidelink channel 850, while vehicular communication devices 884 and 886 may communicate with each other on sidelink channel 844. Vehicular communication device 818 may communicate with infrastructure 888 on sidelink channel 862, and vehicular communication device 886 may communicate with RSU 838 on channel 860.

Vehicular communication devices 816 and 826 may operate in short-range/unlicensed network 890, where vehicular communication device 826 may communicate with vehicular communication device 816 on sidelink channel 848 and vehicular communication device 816 may communicate with RSU 836 on channel 858.

Vehicular communication devices 884 and 814 may be located outside of network coverage, and may use radar sensing over channel 846 to detect each other.

Distributed Coexistence Management

Due to the simultaneous development of multiple radio communication technologies, such as vehicular radio communication technologies, coexistence is expected to play an important role once deployment is widespread. Vehicular communication devices operating with DSRC may therefore be expected to coexist with vehicular communication devices operating with, for example, LTE V2V/V2X, and vice versa. The potential introduction and deployment of other vehicular radio communication technologies may also be considered in the future for coexistence purposes. However, as DSRC and LTE V2V/V2X are expected to both develop separately and use separate supporting architectures, centralized coexistence schemes may provide deployment challenges without substantial coordination and integration between the competing technologies.

According to various aspects of this disclosure, vehicular communication devices may arrange to form a cluster of vehicular communication devices that can coordinate to manage access to channel resources in a distributed manner. For example, a vehicular communication device may assume the role of a cluster head, and may organize one or more other vehicular communication devices to form a cluster that coordinate to efficiently manage access to shared channel resources. The cluster head may perform tasks such as initial formation of the cluster, management of the cluster during operation, and termination of the cluster.

Figure 9:
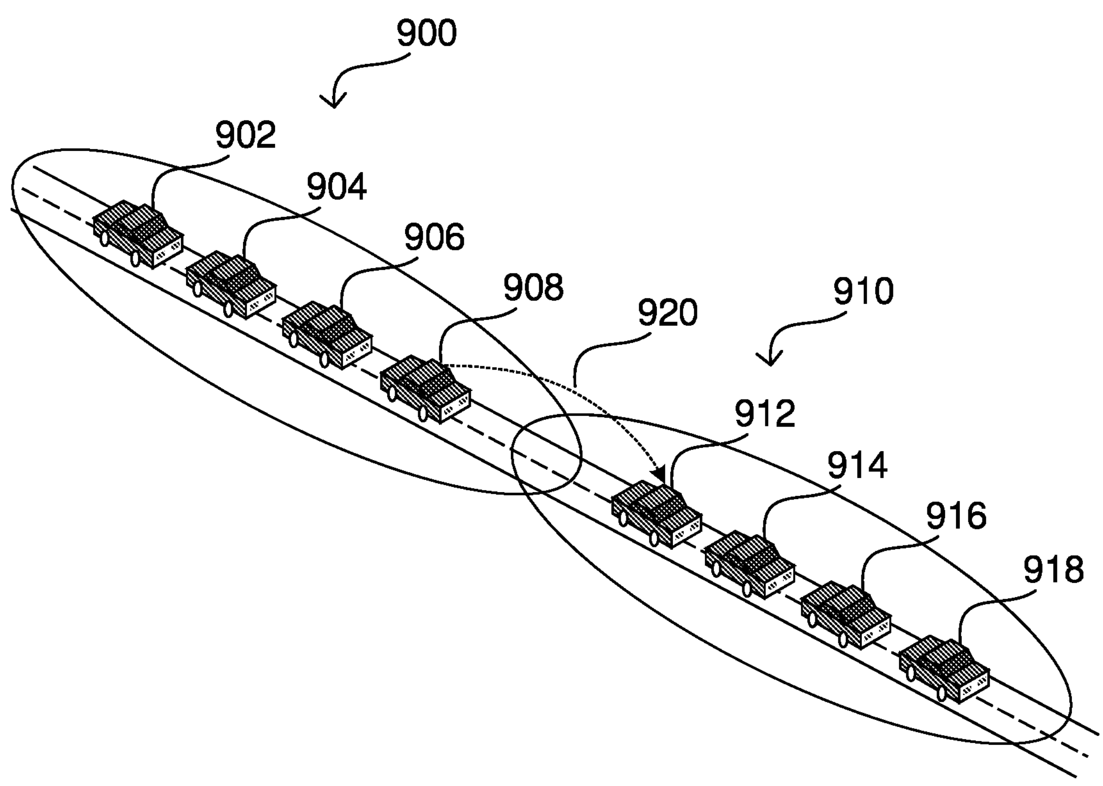
FIG. 9 shows an exemplary scenario illustrating clusters of vehicular communication devices according to some aspects.

FIG. 9 shows an exemplary illustration of this cluster-based distributed channel access according to some aspects. As shown in FIG. 9, cluster 900 may include vehicular communication devices 902, 904, 906, and 908, while cluster 910 may include vehicular communication device 912, 914, 916, and 918. The vehicular communication devices of clusters 900 and 910 may coordinate to manage access to channel resources that can be shared between multiple vehicular radio communication technologies, such as DSRC, LTE V2V/V2X, and any other vehicular radio communication technologies. In certain cases, this cluster-based distributed channel access approach can facilitate efficient management and sharing of channel resources even when no central or coordinated infrastructure is available to perform. Although shown as the same type of vehicular communication device (e.g., automobiles) in FIG. 9, this is exemplary and vehicular communication devices 902, 904, 906, and 908 and vehicular communication device 912, 914, 916, and 918 may be the same or may be different types of vehicular communication device.

Figure 10:
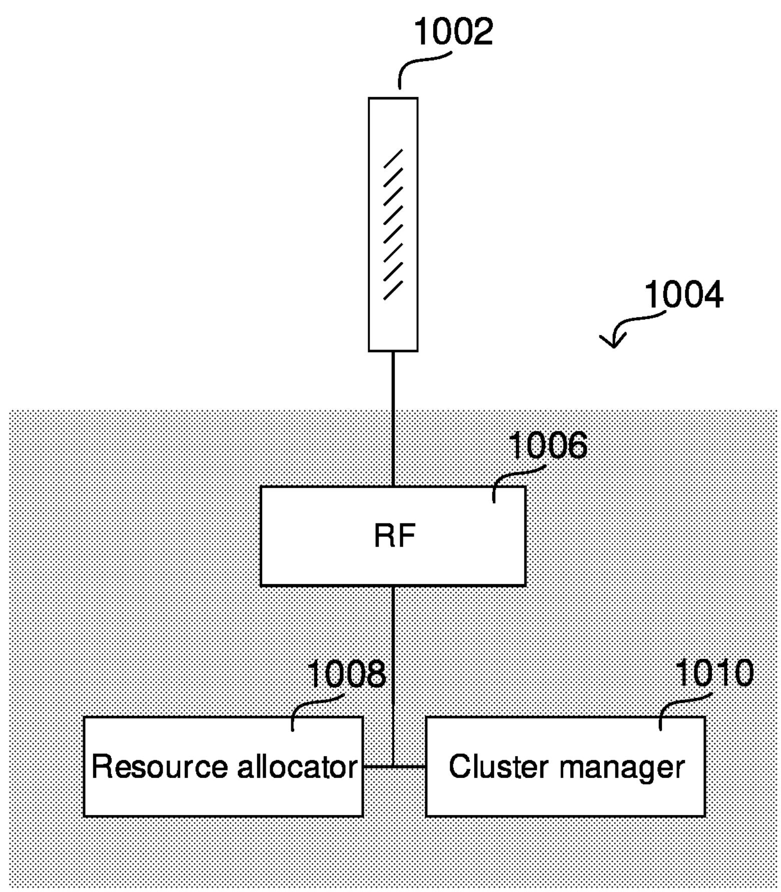
FIG. 10 shows an exemplary internal configuration of an antenna system and communication arrangement of a cluster head according to some aspects.
Figure 11:
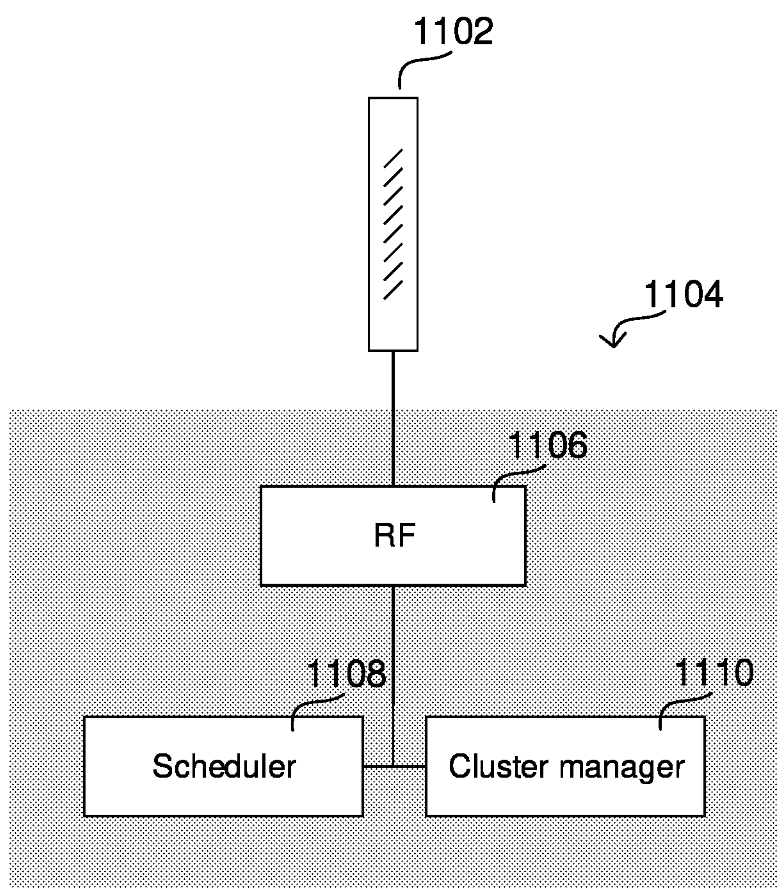
FIG. 11 shows an exemplary internal configuration of an antenna system and communication arrangement of a cluster member according to some aspects.

FIG. 10 shows an exemplary internal configuration of a vehicular communication device acting as a cluster head, while FIG. 11 shows an exemplary internal configuration of a vehicular communication device that is a member of a cluster. As shown in FIG. 10, a cluster head may include antenna system 1002 and communication arrangement 1004. Antenna system 1002 may be configured in the manner of antenna system 506 as shown and described for vehicular communication device 500 in FIG. 5. Accordingly, in the transmit direction antenna system 1002 may be configured to receive electrical radio signals from communication arrangement 1004 and to transmit the electrical radio signals as wireless radio signals. In the receive direction, antenna system 1002 may be configured to receive and transduce wireless radio signals to obtain electrical radio signals, which antenna system 1002 may provide to communication arrangement 1004 for further processing.

As shown in FIG. 10, communication arrangement 1004 may include RF transceiver 1006, resource allocator 1008, and cluster manager 1010. Communication arrangement 1004 may correspond to communication arrangement 504 as previously shown and described for vehicular communication device 500 in FIGS. 5 and 6. RF transceiver 1006 may therefore be configured in the manner of RF transceiver 602, and, in the transmit direction, may process baseband samples to produce radio signals for transmission by antenna system 1002 and, in the receive direction, may process radio signals to produce baseband samples. Resource allocator 1008 and cluster manager 1010 may be physical layer, protocol stack, or application layer components, and, although not specifically limited to any particular implementation, may be part of one or more of a digital signal processor or controller of communication arrangement 1004 (e.g., as in digital signal processor 604 and controller 606 of vehicular communication device 500).

Resource allocator 1008 may be a processor configured to retrieve (e.g., from a local memory) and execute program code that algorithmically defines the allocation of channel resources for members of a cluster in the form of executable instructions. For example, the program code executed by resource allocator 1008 may be an allocation subroutine. The allocation subroutine may define a procedure for identifying an overall pool of channel resources (e.g., all of the channel resources that are available for use by the vehicular communication devices of a cluster), identifying the vehicular communication devices of the cluster, determining which channel resources should be allocated to which vehicular communication device, and other allocation-related functions described herein. In some aspects, the allocation subroutine may consider other information such as the past channel resource usage (e.g., the total amount of spectrum used, the total amount of transmissions, and/or the total amount of data transferred in a time window) of the vehicular communication devices, and may allocate more channel resources to vehicular communication devices that use more channel resources (e.g., use more spectrum, perform more transmissions, and/or transfer more data). In some aspects, the allocation subroutine may then select channel resources (e.g., specific subcarriers in specific time slots) for the vehicular communication devices, and may generate a channel resource allocation (e.g., a message in a predefined format) that specifies the channel resources allocated to the vehicular communication devices. In some aspects, resource allocator 1008 can be a protocol stack component, such as a Media Access Control (MAC) scheduler of a controller of the cluster head.

Cluster manager 1010 may be a processor configured to retrieve (e.g., from a local memory) and execute program code that algorithmically defines the management of vehicular communication devices in a cluster in the form of executable instructions. For example, the program code executed by cluster manager 1010 may be a cluster management subroutine. The cluster management subroutine may define the procedure for generating and terminating clusters, adding and removing vehicles from clusters, communicating with other clusters, generation and transmission of cluster signaling to other vehicular communication devices in the cluster, and other cluster management-related functions described herein. The program code may be updatable, such as wirelessly or by a manual install. In some aspects, cluster manager 1010 may be an application layer component, and may be part of a controller of the cluster head.

FIG. 11 shows an exemplary internal configuration of a vehicular communication device that is a member of a cluster (e.g., a cluster member). As shown in FIG. 11, the vehicular communication device may include antenna system 1102, which may be configured in the manner of antenna system 506 as shown and described for vehicular communication device 500 in FIG. 5. Accordingly, in the transmit direction antenna system 1102 may be configured to receive electrical radio signals from communication arrangement 1104 and to transmit the electrical radio signals as wireless radio signals. In the receive direction, antenna system 1102 may be configured to receive and transduce wireless radio signals to obtain electrical radio signals, which antenna system 1102 may provide to communication arrangement 1104 for further processing.

As shown in FIG. 11, communication arrangement 1104 may include RF transceiver 1106, scheduler 1108, and cluster manager 1110. Communication arrangement 1104 may correspond to communication arrangement 504 as previously shown and described for vehicular communication device 500 in FIGS. 5 and 6. RF transceiver 1106 may therefore be configured in the manner of RF transceiver 602, and, in the transmit direction, may process baseband samples to produce radio signals for transmission by antenna system 1102 and, in the receive direction, may process radio signals to produce baseband samples. Scheduler 1108 and cluster manager 1110 may be physical layer, protocol stack, or application layer components, and, although not specifically limited to any particular implementation, may be part of one or more of a digital signal processor or controller of communication arrangement 1104 (e.g., as in digital signal processor 604 and controller 606 of vehicular communication device 500).

Scheduler 1108 may be a processor configured to retrieve (e.g., from a local memory) and execute program code that algorithmically defines transmission and reception with channel resources specified in a channel resource allocation. For example, the program code executed by scheduler 1108 may be a scheduling routine. The scheduling routine may define the procedure for receiving channel resource allocations from a cluster head, reading the channel resource allocations to determine the specific channel resources allocated to the vehicular communication device, controlling transmission and reception of data on the allocated channel resources, and other scheduling-related functions described herein. The program code may be updatable, such as wirelessly or by a manual install. In some aspects, scheduler 1108 can be a protocol stack component, such as a Media Access Control (MAC) scheduler of a controller of the cluster head.

Cluster manager 1110 may be a processor configured to retrieve (e.g., from a local memory) and execute program code that algorithmically defines the cluster behavior of the vehicular communication device in the form of executable instructions. The program code may be updatable, such as wirelessly or by a manual install. For example, the program code executed by cluster manager 1110 may be a cluster management subroutine. The cluster management subroutine may define the procedure for joining and exiting clusters, selecting cluster heads, transmitting and receiving cluster signaling with a cluster head and other members of the cluster, and other cluster management-related functions described herein. In some aspects, cluster manager 1110 may be an application layer component, and may be part of a controller of the vehicular communication device.

In some aspects, cluster heads and members of a cluster may be configured to transmit and receive radio signals representing communication data according to one or more vehicular radio communication technologies, such as DSRC and/or LTE V2V/V2X, for example. With continued reference to the example of FIG. 9, in some aspects, all of vehicular communication devices 902-908 and 912-918 may be configured to operate according to multiple vehicular radio communication technologies (e.g., both DSRC and LTE V2V/V2X), while in some aspects one or more of vehicular communication devices 902-908 and 912-918 may be configured to operate according to only one vehicular radio communication technology (e.g., only one of DSRC or LTE V2V/V2X). In some aspects where, for example, a cluster head or cluster member is configured to operate on DSRC and LTE V2V/V2X, the antenna system and communication arrangement (e.g., antenna system 1002/1102 and communication arrangement 1004/1104) may be arranged in the configuration as shown in FIG. 7, where an RF transceiver 602*a*, digital signal processor 604*a*, and controller 606*a* may be configured to transmit and receive communications according to DSRC and an RF transceiver 602*b*, digital signal processor 604*b*, and controller 606*b* may be configured to transmit and receive communications according to LTE V2V/V2X.

In scenarios where at least some of vehicular communication devices 902-908 and 912-918 are using different vehicular radio communication technologies, interference may occur between the different vehicular radio communication technologies. For example, a first vehicular communication device may be using DSRC, and accordingly may compete for channel resources with other transmitters according to contention-based channel access. A second vehicular communication device may be using LTE V2V/V2V, and accordingly may utilize channel resources as assigned by the radio access network (e.g., a network access node). This may result in collisions, such as when the second vehicular communication device begins transmitting according to its assigned channel scheduling on the same channel resources that the first vehicular communication device has already seized via contention-based channel access. These collisions can degrade transmission and reception performance.

Accordingly, vehicular communication devices may be configured to organize into a cluster, where the vehicular communication devices of a given cluster may coordinate with each other to manage access to shared channel resources. The vehicular communication devices of a cluster may coordinate with one another via exchange of cluster signaling. As used herein, a cluster of devices may be any logical association of devices which devices can join, generate, leave, or terminate, and exchange data specific to the cluster with each other.

Figure 12:
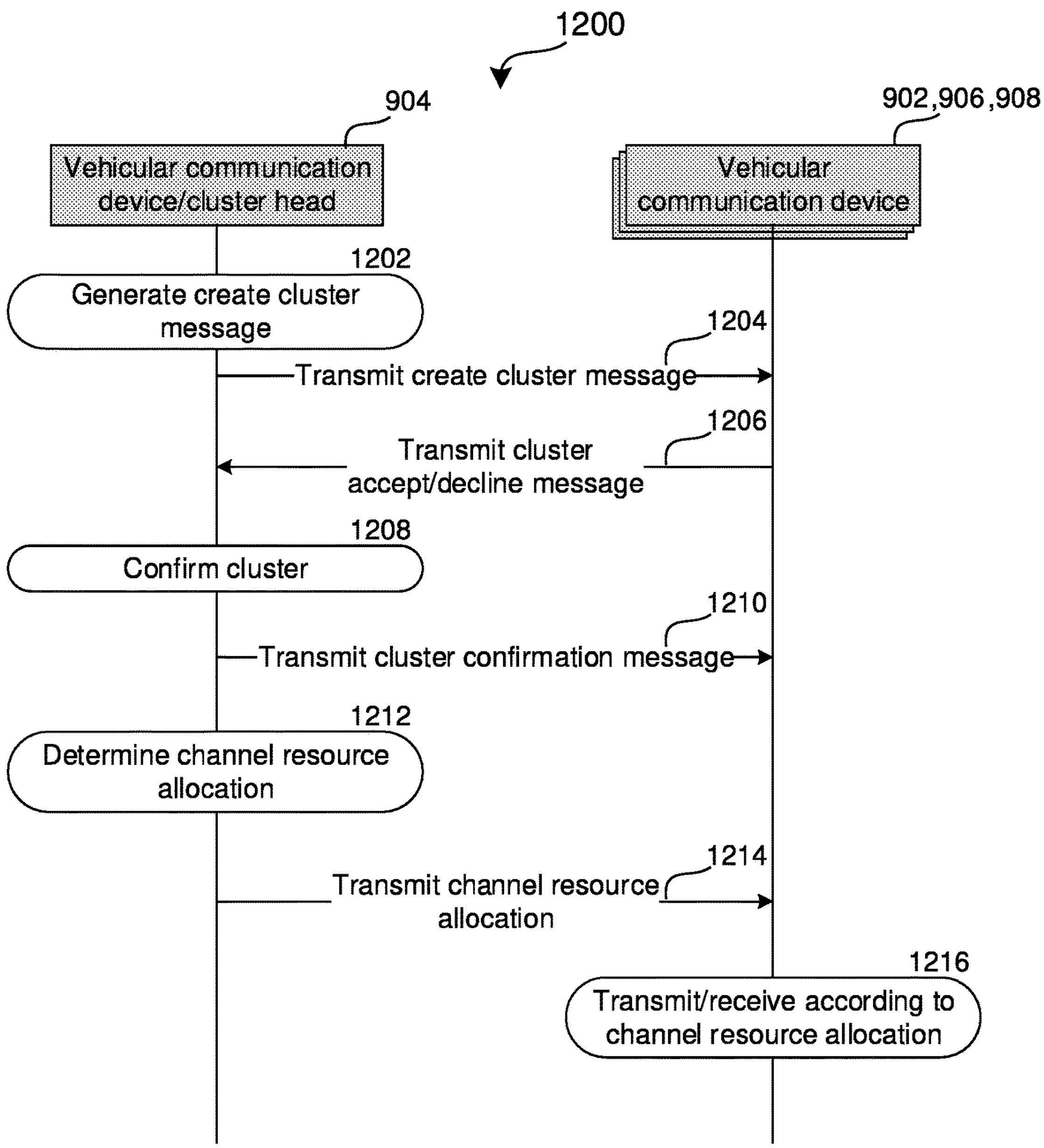
FIG. 12 shows an exemplary message sequence chart describing a procedure for generating clusters and managing channel resource allocations according to some aspects.

In some aspects, clusters of vehicular communication devices may dynamically organize a cluster autonomously, while in other aspects clusters of vehicular communication devices may organize a cluster based on an external instruction, such as from a radio access network (e.g., from a network access node). For example, in the exemplary case of cluster 900, a vehicular communication device such as vehicular communication device 904 may assume the role of cluster head and autonomously trigger initiation of a cluster with one or more nearby vehicular communication devices. FIG. 12 shows exemplary message sequence chart 1200 illustrating this procedure according to some aspects. As shown in FIG. 12, vehicular communication device 904, or cluster head 904, may first generate a cluster create message at stage 1202 (e.g., with cluster manager 1010) by generating the cluster create message according to a predefined format (e.g., generating the data for the cluster create message and generating the resulting cluster create message to include the data according to the predefined format). Cluster head 904 may then transmit the cluster create message at stage 1204 (e.g., with cluster manager 1110), which vehicular communication devices 902, 906, and 908 may receive and identify as a cluster create message.

In some aspects, cluster head 904 may generate and transmit the cluster create message in stages 1202 and 1204 with only one vehicular radio communication technology, e.g., one of DSRC or LTE V2V/V2X. Alternatively, in some aspects cluster head 904 may generate and transmit the cluster create message in stages 1202 and 1204 with multiple vehicular radio communication technologies, such as concurrently with both DSRC and LTE V2V/V2X. In some cases, it can be advantageous for cluster head 904 to generate and transmit the cluster create message with multiple vehicular radio communication technologies, as this may enable vehicular communication devices that are only configured to operate with a single vehicular radio communication technology to receive the cluster create message.

Vehicular communication devices 902, 906, and 908 may then receive the cluster create message transmitted by cluster head 904 (e.g., with their respective cluster managers 1110). In some aspects, vehicular communication devices 902, 906, and 908 may receive the cluster create message directly from cluster head 904, while in other aspects one or more of vehicular communication devices 902, 906, and 908 may receive the cluster create message indirectly from cluster head 904 after another of vehicular communication devices 902, 906, or 908 relays the cluster create message. For example, in some aspects a vehicular communication device, such as vehicular communication device 906, that receives a cluster create message may extend the range of the cluster create message by relaying the cluster create message. Accordingly, even if another vehicular communication device, such as vehicular communication device 908, does not receive the original transmission of the cluster create message from vehicular communication device 902, vehicular communication device 908 may receive the cluster create message in relayed form after it is relayed by vehicular communication device 906.

In some aspects, cluster head 904 may generate the cluster create message to specify a maximum number of hops, which gives the number of relay links in a row that can be used in the cluster. Accordingly, when vehicular communication device 906 receives the cluster create message, vehicular communication device 906 may check (e.g., at cluster manager 1110) whether a hop counter specified in the cluster create message has reached the maximum number of hops. If the hop counter has reached the maximum number of hops, vehicular communication device 906 may determine that the cluster cannot contain any further relay links and may therefore refrain from relaying the cluster create message. If the hop counter has not reached the maximum number of hops, vehicular communication device 906 may determine that the cluster can contain further relay links, and may therefore proceed to increment the hop counter (e.g., increase the value by one) and relay the cluster create message by re-transmitting the cluster create message (with the incremented hop counter).

After receiving the cluster create message, either directly or via relaying, vehicular communication devices 902, 906, and 908 may respond to cluster head 904 by generating and transmitting a cluster accept message (if the vehicular communication device accepts the invitation to join the cluster; e.g., with their respective cluster managers 1110) or by generating and transmitting a cluster decline message (if the vehicular communication device declines the invitation to join the cluster). In some aspects, instead of transmitting a cluster decline message, a vehicular communication device may decline to join the cluster by not responding to the cluster create message.

If a vehicular communication device receives the cluster create message via relaying, such as vehicular communication device 908, the vehicular communication device may transmit the cluster accept/decline message in stage 1206 via the reverse path of the same relay link. For example, vehicular communication device 908 may transmit its cluster accept/decline message in stage 1206 to vehicular communication device 906, which may then relay the cluster/decline message to cluster head 904. As vehicular communication device 906 received the cluster create message directly from cluster head 904 in stage 1204, vehicular communication device 906 may transmit its cluster accept/decline message directly to cluster head 904 in stage 1206. In the exemplary case of FIG. 9, vehicular communication device 902 may also receive the cluster create message directly from cluster head 904 in stage 1204 and may accordingly transmit its cluster accept/decline message directly to cluster head 904.

After receiving the cluster accept/decline messages from vehicular communication devices 902, 906, and 908, cluster head 904 may confirm the cluster in stage 1208. This can include generating and locally retaining cluster state data at cluster manager 1010 that indicates which vehicular communication devices are members of the cluster. In some aspects, the cluster accept/decline message provided by vehicular communication devices 902, 906, and 908 may indicate their characteristics, such as by specifying which vehicular radio access technologies are supported by each vehicular communication device and/or identifying other vehicular communication devices which each vehicular communication device is using as a relay link for receiving messages from the cluster head. Cluster head 904 may include such information in the cluster state data. In some aspects, vehicular communication devices 902, 906, and 908 may locally generate a cluster device ID (e.g., randomly and/or based on a universal device ID assigned to the respective vehicular communication devices 902, 906, and 908) and propose the cluster device ID to cluster head 904 in a cluster accept message (e.g., transmitted by cluster manager 1010). Cluster head 904 may then use the proposed cluster device ID as the cluster device ID and store the cluster device ID in the cluster state data, or may determine a new cluster device ID if conflicts occur between the cluster device IDs proposed by two or more vehicular communication devices. In some aspects, cluster head 904 may generate the cluster device IDs for the vehicular devices that join the cluster. In addition to cluster device IDs, in various aspects the cluster state data can also include universal device IDs, supported vehicular radio communication technologies, descriptions of relaying links (e.g., which other devices in the cluster are part of the relaying link), and other information relevant to the cluster members.

Cluster head 904 may then transmit a cluster confirmation message in stage 1210 to the vehicular communication devices that accepted the invitation to join the cluster (via transmission of a cluster accept message), such as vehicular communication devices 902, 906, and 908. The cluster confirmation message may specify cluster device IDs, identify one or more other vehicular communication devices (by cluster device ID) that form a relay link for certain vehicular communication devices, specify the vehicular radio communication technologies supported by the other vehicular communication devices in the cluster, and any other information relevant to the status and operation of the cluster. In some aspects, vehicular communication devices 902, 906, and 908 may use their respective cluster device IDs when sending subsequent cluster signaling, which can enable other vehicular communication devices to identify the source of the cluster signaling.

If any of the vehicular communication devices of the cluster are using relaying links to communicate with the cluster head, the cluster confirmation message may therefore identify the other vehicular communication devices of the cluster that are participating in the relaying link. In some aspects, cluster head 904 may determine relaying links for the cluster based on the relaying links used to exchange the cluster create message and cluster accept/decline message, such as by using the same sequence of vehicular communication devices (assuming all accepted the invitation to join the cluster) used for these initial relaying links. In some aspects, cluster head 904 may periodically update the relaying links (e.g., by changing the sequence and/or vehicular communication devices used in a given relaying link), such as based on whether any of the vehicular communication devices involved in a particular relaying link move to a location that is not compatible with the relaying link (e.g., if vehicular communication device 906 moved in front of vehicular communication device 908).

Figure 13A:
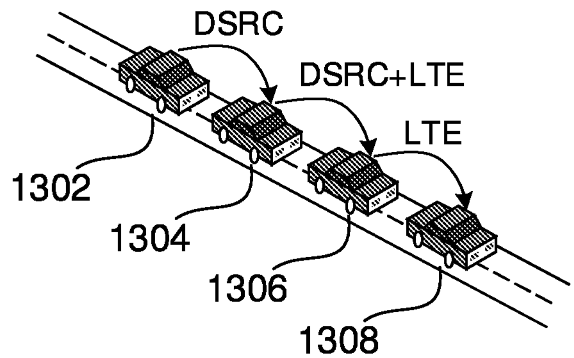
FIGS. 13A and 13B show examples of relaying links used for cluster-based communication according to some aspects.
Figure 13B:
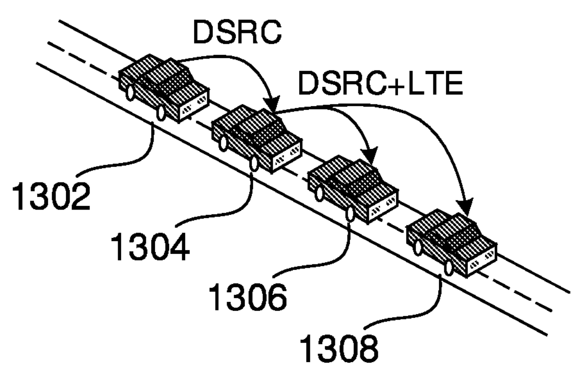

In some aspects, relaying links between vehicular communication devices and the cluster head may include relaying across multiple technologies, such as heterogenous DSRC/LTE relaying. FIGS. 13A and 13B show examples of relaying variations according to some aspects that use multiple vehicular radio communication technologies. In the exemplary scenario of FIG. 13A, cluster head 1302 may transmit cluster signaling (e.g., a cluster create message or any other signaling for the cluster) using a first vehicular radio communication technology, such as DSRC. Vehicular communication device 1304, which may support both the first vehicular radio communication technology and a second vehicular radio communication technology, such as LTE V2V/V2X, may then relay the cluster signaling using both the first vehicular radio communication technology and the second vehicular radio communication technology. Vehicular communication device 1306, which may support at least the second vehicular radio communication technology optionally in addition to the first vehicular radio communication technology, may then receive the cluster signaling according to either the first or second vehicular radio communication technology and relay the cluster signaling with the second vehicular radio communication technology. Vehicular communication device 1308, which may support the second vehicular radio communication technology, may then receive the cluster signaling according to the second vehicular radio communication technology.

In the exemplary scenario of FIG. 13B, cluster head 1302 may transmit cluster signaling using a first vehicular radio communication technology, such as DSRC. Vehicular communication device 1304, which may support both the first vehicular radio communication technology and a second vehicular radio communication technology, such as LTE V2V/V2X, may then relay the cluster signaling using both the first vehicular radio communication technology and the second vehicular radio communication technology. Vehicular communication device 1306, which may support the first vehicular radio communication technology, may then receive the cluster signaling according to the first vehicular radio communication technology. Vehicular communication device 1308, which may support the second vehicular radio communication technology, may then receive the cluster signaling according to the second vehicular radio communication technology. This heterogenous vehicular radio communication technology relaying may therefore enable a cluster head to communicate with other vehicular communication devices that do not necessarily all support the same vehicular radio communication technology.

In some aspects, heterogenous vehicular radio communication technology relaying may also be employed in the reverse direction to transmit cluster signaling to the cluster head. Additionally, in some aspects multiple vehicular radio communication technologies may be used for redundancy to improve reception performance, such as where vehicular communication device 1306 of FIG. 13A receives the relayed cluster signaling from vehicular communication device 1304 according to both the first and second vehicular radio communication technologies. In some aspects, the cluster head may determine the sequence of vehicular radio communication technologies used for each relaying link and specify such information in the cluster confirmation message. The vehicular communication devices may then relay cluster signaling along the relaying link according to the sequence of vehicular radio communication technologies specified in the cluster confirmation message. Any variations of such relaying links, including both homogenous and heterogenous relaying links, may be employed by clusters.

After generating the cluster in stages 1202-1210, cluster head 904 may then use the cluster to manage access to shared channel resources. In contrast to an uncoordinated case where vehicular communication devices access channel resources independently and without cooperation between different vehicular radio communication technologies, the use of a cluster to manage access to shared channel resources may help avoid collisions and enable more efficient usage of the shared channel resources.

Accordingly, cluster head 904 may determine a channel resource allocation (e.g., with its resource allocator 1008) in stage 1212 that allocates the available channel resources between the vehicular communication devices of the cluster, such as vehicular communication devices 902, 906, and 908. The channel resource allocation may assign specific channels (blocks of spectrum or sets of subcarriers, e.g., 10 MHz channels for DSRC and LTE V2V/V2X, which may be on the same or different bands) over a particular time slot or slots to an individual vehicular communication device of the cluster. The channel resource allocation may also specify a particular vehicular radio access technology that an individual vehicular communication device of the cluster is assigned to use for the assigned channel and time slots. After determining the channel resource allocation in stage 1212, cluster head 904 may transmit the channel resource allocation to vehicular communication devices 902, 906, and 908 in stage 1214 (directly and/or via relaying links). Vehicular communication devices 902, 906, and 908 may receive the channel resource allocation and transmit and/or receive according to the channel resource allocation in stage 1216, such as by transmitting or receiving on the assigned channel during the assigned time slots with the assigned vehicular radio communication technology.

For example, cluster head 904 may assign a first set of time slots to vehicular communication device 902 to use on a given channel in the channel resource allocation, and may assign a different second set of time slots to vehicular communication device 906 to use on the same channel in the channel resource allocation. The channel resource allocation may also specify that vehicular communication device 902 use a first vehicular radio communication technology, such as DSRC, and that vehicular communication device 906 use a second vehicular radio communication technology, such as LTE V2V/V2X. Accordingly, even if vehicular communication devices 902 and 906 transmit on the same channel, the fact that the first set of time slots are different from the second set of time slots will help prevent collisions. Vehicular communication devices 902 and 906 may also be able to utilize different vehicular radio communication technologies, which would normally in the uncoordinated case lead to collisions due to the lack of support for any cooperation. In another variation, the channel resource allocation determined by cluster head 904 in stage 1212 may assign vehicular communication device 902 to use a given channel during a first set of time slots and assign vehicular communication device 906 to use a different channel during the same first set of time slots, where the differing channels will similarly prevent collisions on the shared channel resources. Any variation of such channel resource allocations can be used in the same manner. In some aspects, cluster head 904 and vehicular communication devices 902, 906, and 908 may periodically repeat stages 1212-1216, such as to allocate channel resources during each of a sequence of transmission intervals (e.g., subframes or a similar type of transmission interval).

Cluster head 904 may continually manage the vehicular communication devices in the cluster over time, such as by retrieving (e.g., from a local memory) and executing a cluster management subroutine at cluster manager 1010 that defines the cluster management functionality as executable instructions. As vehicular communication devices 902-908 may move relative to each other, in some aspects cluster head 904 may add or remove vehicular communication devices to and from the cluster based on the positioning of vehicular communication devices 902-908 and the presence of any nearby vehicular communication devices. For example, if vehicular communication device 908 moves too far in front of cluster head 904, and is also out of range of all other vehicular communication devices in the cluster, cluster head 904 may remove vehicular communication device 908 from the cluster via transmission of a cluster removal message to vehicular communication device 908. Other reasons for unilaterally removing a vehicular communication device from a cluster can include inactivity (e.g., lack of radio activity for a period of time) or failure to follow channel resource allocations. In some aspects, the cluster removal message may indicate the reason why the cluster head is removing the vehicular communication device. In some aspects, vehicular communication devices may also be able to voluntarily exit the cluster, such as by transmitting a cluster exit message to the cluster head. Exemplary reasons for voluntarily exiting a cluster can include finding another cluster that is closer or preferred for some other reason, or when entering a period of radio inactivity. The cluster exit message can similarly indicate a reason for exiting the cluster.

In some aspects, cluster head 904 may be configured to invite other vehicular communication devices to join the cluster, such as by triggering transmission of another cluster create message (or a different cluster invitation message). For example, cluster head 904 may generate and transmit another cluster create message, which may be received (directly or by relaying link) by another vehicular communication device that is not currently in the cluster. The vehicular communication device may respond with a cluster accept message, after which cluster head 904 may add the vehicular communication device to the cluster by updating cluster state data and transmitting a cluster configuration message to the vehicular communication device. Cluster head 904 may then include the vehicular communication device in subsequent channel resource allocations to manage access to the shared channel resources by the vehicular communication device.

In some aspects, cluster head 904 may decide to leave the cluster. For example, if cluster head 904 moves relative to vehicular communication devices 902, 906, and 908 to a position incompatible with being in the cluster (e.g., out of range), cluster head 904 may leave the cluster by transmitting a cluster leave message to the vehicular communication devices in the cluster. Vehicular communication devices 902, 906, and 908 may acknowledge recipe of the cluster leave message in response. In some aspects, vehicular communication devices 902, 906, and 908 may then select a new cluster head to continue operation of the cluster. For example, in some cases a vehicular communication device may unilaterally assume the cluster head role, and transmit cluster signaling to the other vehicular communication devices of the cluster that asserts its new role as the cluster head. In other cases, the remaining vehicular communication devices of the cluster may negotiate with each other to select the new cluster head. For example, the vehicular communication devices may exchange cluster signaling to determine the relative locations and supported vehicular radio communication technologies of each vehicular communication device. The vehicular communication devices may then select the new cluster head based on which vehicular communication device is in a central location, based on which vehicular communication device has the greatest transmission range, and/or based on which vehicular communication device supports the most vehicular radio communication technologies (e.g., both DSRC and LTE V2V/V2X). The selected cluster head may then confirm the cluster and manage the cluster in the manner described above for stages 1208-1216 in FIG. 12. In some aspects, the vehicular communication devices organizing a cluster may be initially configured in the manner shown and described for a cluster member in FIG. 11, and their respective cluster managers 1110 may be configured to communicate with each other via cluster signaling. Once a cluster head has been selected, one or more processors of the cluster head may retrieve and begin executing an allocation subroutine and a cluster management subroutine for a cluster head, and may therefore be configured in the manner of the cluster head as shown and described for FIG. 10.

In some aspects, the vehicular communication devices of a cluster may be configured to periodically re-select the cluster head, such as according to a fixed period and/or based on conditions that indicate that the current cluster head is a sub-optimal choice. For example, if cluster head 904 moves relative to vehicular communication devices 902, 906, and 908 to a non-central position, such as behind of or in front of vehicular communication devices 902, 906, and 908, cluster head 904 and vehicular communication devices 902, 906, and 908 may be configured to select a new cluster head, such as based on which vehicular communication device is in a central location (e.g., according to the least aggregate distance to the other cluster members), based on which vehicular communication device has the greatest transmission range (e.g., as defined as a characteristic of their RF transceiver and antenna system), and/or based on which vehicular communication device supports the most vehicular radio communication technologies. The selected cluster head may then confirm the cluster and manage the cluster in the manner described above for stages 1208-1216 in FIG. 12. In some aspects, one or more of vehicular communication devices 902-908 may include a position determiner, which may include a processor and/or dedicated hardware circuitry and a position sensor. The processor and/or dedicated hardware circuitry may be configured to receive sensor data from the sensor data to determine the position of the vehicular communication device and/or other vehicular communication devices. The position sensor may be, for example, a radar, a satellite-based positional system, radio sensing circuitry configured to measure signal strength and determine relative positions based thereon, a position report receiver (that may operate via the RF transceiver and antenna system) configured to receive position reports from other communication devices (e.g., other vehicular communication devices or network access nodes) or that specify their positions, or another positioning system that can determine positions of vehicular communication devices. In some aspects, one or more of vehicular communication devices 902-908 may include a position report transmitter (that may operate via the RF transceiver and antenna system) configured to transmit position reports specifying their own positions to other vehicular communication devices. Vehicular communication devices 902-908 may use the position determiner to determine their own positions and the positions of the other vehicular communication devices.

In some aspects, cluster head 904 may terminate the cluster, such as by transmitting a cluster terminate message to vehicular communication devices 902, 906, and 908. Vehicular communication devices 902, 906, and 908 may acknowledge receipt of the cluster terminate message in response, and then cease acting as part of the cluster. In some aspects, one of vehicular communication devices 902, 906, or 908 may then assume a cluster head role and create a new cluster role via transmission of a cluster create message. The new cluster head may then manage the cluster in the manner described in message sequence chart for cluster head 904.

In some aspects, cluster head 904 may manage the vehicular communication devices that are in the cluster based on other factors in addition to those described above (relative location and maximum direct/relaying communication range). For example, cluster head 904 may be configured to attempt to add vehicular communication devices to the cluster that are traveling in the same lane of a road, highway, or other aerial, aquatic, or terrestrial route as cluster head 904. For instance, cluster head 904 may identify the current lane that cluster head 904 is traveling in (e.g., based on external sensing from cameras or GPS, or external user input provided via a user interface system of cluster head 904 connected to its communication arrangement 1004), and specify the current lane in the cluster create message (the initial cluster create message and/or subsequent cluster create messages). Other vehicular communication devices that receive the cluster create message and are also traveling in the current lane specified in the cluster create message may then be prompted to join the cluster being managed by cluster head 904. Additionally or alternatively, vehicular communication devices may identify their current lane in the cluster accept/decline message, which cluster head 904 may reference against its current lane to determine which accepting vehicular communication devices are traveling in the same lane as cluster head 904. Cluster head 904 may then accept these vehicular communication devices into the cluster, optionally while declining to add vehicular communication devices traveling in other lanes to the cluster with a cluster reject message.

In some aspects, cluster head 904 may similarly manage the cluster based on a target destination or current travel route. For example, cluster head 904 may identify the target destination (e.g., city, zip code, street, address) or current travel route of cluster head 904 (e.g., via communication with a vehicle navigation program of cluster head 904), and may then attempt to add other vehicular communication devices that have the same or nearby target destination and/or are traveling on the same current route (optionally while declining to add other vehicular communication devices to the cluster with a cluster reject message).

In some aspects, cluster head 904 may similarly manage the cluster based on supported vehicular radio communication technologies. For example, cluster head 904 may invite other vehicular communication devices that support vehicular radio communication technologies that are also supported by some or all of the current members of the cluster (optionally while declining to add other vehicular communication devices to the cluster with a cluster reject message).

In some aspects, cluster head 904 may similarly manage the cluster based on the type of vehicular communication device. For example, some vehicular communication devices may be emergency vehicles (e.g., ambulances and fire trucks), some vehicular communication devices may be mass transit vehicles (e.g., buses), some vehicular communication devices may be hired driving vehicles (e.g., taxis), and some vehicular communication devices may be private vehicular communication devices. Cluster head 904 may attempt to invite vehicular communication devices that are the same type of vehicular communication device as cluster head 904 and/or the other vehicular communication devices currently in the cluster (optionally while declining to add other vehicular communication devices to the cluster with a cluster reject message).

In addition to relaying links, in some aspects cluster head 904 may be configured to arrange dual-path links between vehicular communication devices. For example, cluster head 904 may be able to communicate with one or more vehicular communication devices in both directly and by relaying link, such as vehicular communication device 908. In such cases, cluster head 904 may use both a direct link and a relaying link to communicate with the vehicular communication device 908. As the direct link between cluster head 904 and vehicular communication device 908 may be weaker than the relaying link due to the extended range of the direct link, the relaying link may be able to support a higher data rate than the direct link. Accordingly, in some aspects cluster head 904 may utilize the direct link as a low-latency and/or low data rate control link and the relaying link as a higher-latency and/or high data rate link. This can help avoid control loop oscillations in some cases. For example, cluster manager 1010 of cluster head 904 may be configured to identify characteristics of data intended for vehicular communication device 908, such as by identifying a latency specification and/or a data rate specification of the data. The latency specification or data rate specification may be associated with the data based on a bearer that is carrying the data (e.g., QoS requirements of the bearer), which cluster manager 1010 may have prior knowledge of by virtue of using the bearer. Additionally or alternatively, cluster manager 1010 may locally determine the latency specification and/or data rate specification of the data, such as by determining the latency specification based on a priority of the data (e.g., where high priority data has a lower latency specification, such as where control data has higher priority than user data) and/or a time validity of the data (e.g., where data that is less useful at a later time has a lower latency specification). Cluster manager 1010 may then compare the latency specification and/or the data rate specification to a latency threshold and/or a data rate threshold. If the latency specification is lower than the latency threshold, cluster manager 1010 may decide to transmit the data on the direct link. If the data rate specification is greater than the data rate threshold, cluster manager 1010 may decide to transmit the data on the relaying link. In some aspects, cluster manager 1010 may also evaluate data that is scheduled to be received from vehicular communication device 908 based on a data rate specification and/or latency specification, and instruct vehicular communication device 908 to transmit the data on the direct link or the relaying link based on the same decision process.

In some aspects, the direct link and the relaying link can be realized with carrier aggregation, where the direct link uses a first channel and the relaying link uses a different second channel. In some aspects, cluster head 904 can allocate a lower-frequency channel to the direct link than the relaying link due to the improved propagation characteristics of lower frequency channels.

In some aspects, a vehicular communication device, such as vehicular communication device 904, may initiate generation of a cluster autonomously. For example, vehicular communication device 904 may determine that there is no cluster available nearby (e.g., based on not receiving any cluster create messages and/or not detecting any other cluster signaling), and may then decide to initiate generation of a cluster via generation and transmission of a cluster create message. In another example, vehicular communication device 904 may initiate generation of a cluster because there are no suitable clusters nearby, such as by determining that there are no clusters nearby that contain vehicular communication devices of a similar type to vehicular communication device 904 (e.g., emergency vehicles, mass transit vehicles, hired driving vehicles, private vehicles, or some other vehicle type) or by determining that there are no cluster nearby that are serving the lane, target destination, or current route of vehicular communication device 904. In another example, vehicular communication device 904 may initially be a member of a cluster and may decide to generate a new cluster, such as a cluster of vehicular communication devices of a similar type to vehicular communication device, a cluster of vehicular communication devices traveling in the same lane, or a cluster of vehicular communication devices traveling to the same target destination or on the same route. Vehicular communication device 904 may retrieve and begin executing an allocation subroutine and a cluster management subroutine for a cluster head once becoming a cluster head.

In some aspects, a vehicular communication device, such as vehicular communication device 904, may initiate generation of a cluster based on an external trigger. For example, a network control entity may decide that a cluster should be generated in a particular area or along a particular route, and may transmit an instruction to vehicular communication device 904 to generate a cluster. For instance, in some aspects a core network server located in a core network, a network access node located in the radio access network, or an edge server may decide that a cluster should be generated and may transmit an instruction to vehicular communication device 904 to generate a cluster. Exemplary criteria that a core network server, network access node, or edge server can decide to trigger generation of a cluster based on can include traffic situation or density, bad weather, accidents, pedestrians/animals/obstacles in the road, high traffic areas, or when traffic efficiency is low. The triggering node may then transmit an instruction to vehicular communication device 904 (via control signaling delivered by the radio access network) that instructs vehicular communication device 904 to generate a cluster. In some aspects, the instruction to generate a cluster may also specify one or more parameters related to the members of or operation of the cluster. For instance, the instruction may specify a type of vehicular communication device that should be invited to the cluster, a lane in which the cluster should travel in, a target destination or current route that should the cluster should follow, and/or one or more vehicular radio communication technologies that the members of the cluster should support. The instruction may also specify one or more frequency bands, channels, or time slots that the cluster should use for transmission or other parameters related to channel resource scheduling.

In some aspects, the radio access network may transmit the cluster create message (as opposed to the cluster head as in the case of FIG. 12). For example, a triggering node such as a core network server, a network access node, or an edge server may determine that a cluster should be generated, and may then broadcast a cluster create message over the radio access network (e.g., by transmitting signaling to one or more network access nodes to broadcast the create cluster signaling). Vehicular communication devices may then receive the cluster create message and may then initiate generation of a cluster. For example, a vehicular communication device may assume the cluster head role and may proceed to generate the cluster under its own direction. In another example, multiple vehicular communication devices that receive the cluster generate message may then coordinate generation of the cluster, such as by selecting a cluster head and following the direction of the cluster head to operate the cluster.

In some aspects, cluster head 904 may manage communications with external nodes such as network access nodes and other cluster heads. For example, with continued reference to FIG. 9, cluster head 904 may utilize inter-cluster link 920 to communicate with cluster head 914 of cluster 910. This example shown in FIG. 9 uses a relaying link to facilitate the inter-cluster communication, where, for example, cluster head 904 communicates with vehicular communication device 908 via direct or relaying link, and vehicular communication device 908 then acts as relaying link to vehicular communication device 912 of cluster 910 to realize inter-cluster link 920. In other examples, cluster head 904 may communicate with cluster head 914 over an inter-cluster link that is direct, e.g., not having any relaying links. Vehicular communication device 912 may then communicate with cluster head 914 to complete the link between cluster heads 904 and 914. In cases where the inter-cluster link relies on relaying, cluster heads 904 and 914 may set up inter-cluster link 920 based on the vehicular radio communication technology supported by the vehicular communication devices being used for relaying. For example, if vehicular communication devices 908 and 912 both support a first vehicular radio communication technology, such as DSRC, then cluster heads 904 and 914 may use vehicular communication devices 908 and 912 for inter-cluster link 920. However, if vehicular communication devices 908 and 912 do not support the same vehicular radio communication technology, cluster heads 904 and 914 may set up inter-cluster link 920 using different vehicular communication devices that support the same vehicular radio communication technology, such as vehicular communication devices 906 and 912.

Any such variation of direct and relaying links between vehicular communication devices of different clusters can likewise be used to realize an inter-cluster link. Cluster heads such as cluster heads 904 and 914 may utilize an inter-cluster link to coordinate between clusters. This can include coordinating access to shared channel resources between the clusters where, for example, cluster head 904 can negotiate with cluster head 914 to determine separate channel resource allocations for their respective clusters that avoid inter-cluster interference. For instance, cluster heads 904 and 914 can negotiate with each other to identify mutually exclusive channels and/or time slots to use in their respective channel resource allocations, where each of cluster heads 904 and 914 may then distribute their respectively negotiated channels and/or time slots amongst the vehicular communication devices in their respective cluster by transmitting channel resource allocations that allocate channel resources on their respectively negotiated channels and/or time slots.

In some aspects, cluster heads may also use an inter-cluster link to transfer vehicular communication devices between clusters. For example, if cluster head 904 or cluster head 914 determines that vehicular communication device 908 has moved closer to cluster 910 than cluster 900, cluster heads 904 and 914 may agree (e.g., via bilateral exchange of inter-cluster signaling) that vehicular communication device 908 should be transferred to cluster 910. Cluster head 904 may then transmit a cluster transfer message to vehicular communication device 908 that instructs vehicular communication device 908 to transfer to cluster 910. Cluster head 914 may also transmit a cluster invite message to vehicular communication device 908 that invites vehicular communication device 908 to join cluster 910, which vehicular communication device 908 may accept to then join cluster 910.

In some aspects, cluster heads may also use an inter-cluster link to coordinate movement of the clusters. For example, if the vehicular communication devices of cluster 900 are moving along a current route and the vehicular communication devices of cluster 910 are blocking the path of the vehicular communication devices of cluster 900, cluster head 904 may transmit a request to cluster head 914 that requests for cluster 910 to move out of the way of cluster 900. Cluster head 914 may then transmit cluster signaling to vehicular communication devices 912, 916, and 918 with instructions to move out of the way of cluster 900. If the vehicular communication devices are autonomous vehicles, and accordingly have autonomous driving functionality as part of their steering and movement systems, the vehicular communication devices may respond to such a request by autonomously steering out of the way. If the vehicular communication devices are driver-operated, the vehicular communication devices may present a visual or audibly notification to the drive to move out of the way.

Figure 14:
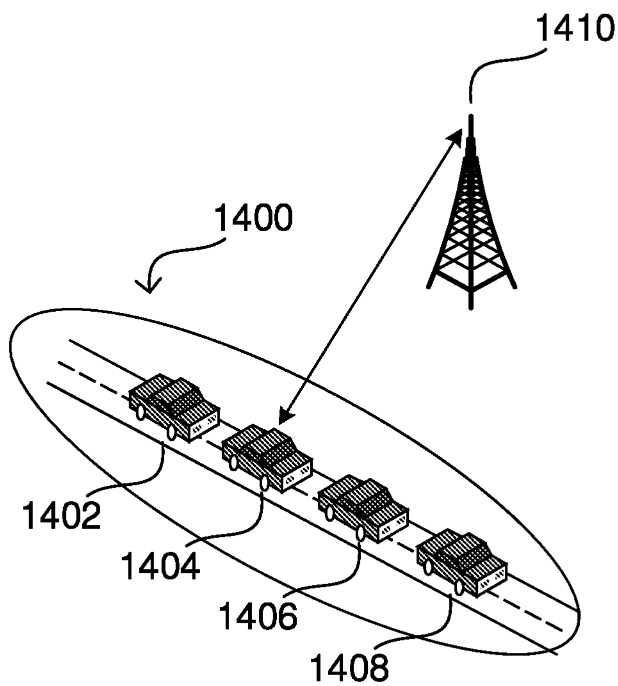
FIG. 14 show an example of communications between a cluster of vehicular communication devices and a network access node according to some aspects.

As shown in FIG. 14, in some aspects a cluster head, such as cluster head 1404, may also handle communication between a cluster 1400 and a network access node 1410. In various aspects, network access node 1410 may be a network access node for one or more vehicular radio communication technologies. For example, network access node 1410 may be a DSRC RSU, an LTE V2V/V2X base station, or a network access node that supports both DSRC and LTE V2V/V2X.

As cluster head 1404 is responsible for managing operation of vehicular communication devices 1402, 1406, and 1408 in cluster 1400, cluster head 1404 in some aspects may be primarily responsible for communicating with network access node 1410 (although one or more of vehicular communication devices 1402, 1406, and 1408 may optionally also be configured to communicate with network access node 1410). In some aspects, cluster head 1404 may be configured to determine channel resource allocations (e.g., as in stage 1212) based on negotiations with network access node 1410. For example, network access node 1410 may specify which channels and/or time slots are available to cluster head 1404 to allocate to the vehicular communication devices in cluster 1400. In some aspects, network access node 1410 may therefore interface with multiple cluster heads, and may specify different channels and/or time slots for each cluster head to allocate to the vehicular communication devices in their respective clusters. This coordination can help avoid inter-cluster interference.

In some aspects, cluster head 1404 may also act as a relay point, and may relay data from network access node 1410 to individual vehicular communication devices of cluster 1400 and/or relay data from individual vehicular communication devices of cluster 1400 to network access node 1410. This may include control data and/or user data. In some aspects, such as where one or more of vehicular communication devices 1402, 1406, or 1408 are configured with a vehicular radio communication technology that uses deterministic scheduling specified by a radio access network, cluster head 1404 may receive the deterministic scheduling assignments from network access node 1410 and relay the deterministic scheduling assignments to the vehicular communication devices that use deterministic scheduling.

In some aspects, vehicular communication devices may share channel resources in a distributed manner based on a greedy spectrum selection approach. The greedy spectrum selection approach may be used with or without clustering. In a greedy spectrum selection approach, vehicular communication devices may check for the least-used bands and access the least-used resources with a particular vehicular radio communication technology, such as DSRC or LTE V2V/V2X.

Figure 15:
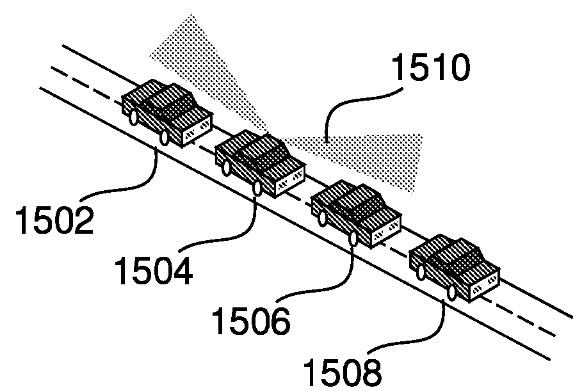
FIG. 15 shows an example of greedy spectrum selection by vehicular communication devices according to some aspects.

FIG. 15 shows an example of a greedy spectrum selection according to some aspects. As shown in FIG. 15, vehicular communication device 1504 may decide to communicate with neighboring vehicular communication devices and/or network access nodes using one or more vehicular radio communication technologies, such as DSRC or LTE V2X/V2X. Vehicular communication device 1504 may then identify a suitable channel on which to transmit and receive the communications. For example, vehicular communication device 1504 may perform radio sensing on multiple channels (e.g., with its scheduler 1108) to identify a channel that is available (e.g., that is not occupied according to a listen-before-talk (LBT) scheme) or that has minimal interference (e.g., with the least interference out of the multiple channels that are evaluated). Vehicular communication device 1504 may then broadcast signaling 1510 to neighboring vehicular communication devices 1502, 1506, and 1508 that specifies the selected channel that vehicular communication device 1504 intends to use for communications. In some aspects, vehicular communication device 1504 may also determine scheduling information that identifies the time slot(s) and/or vehicular radio communication technology(ies) for which vehicular communication device 1504 intends to access the selected channel. Vehicular communication device 1504 may then include such scheduling information in signaling 1510. Nearby vehicular communication devices, such as vehicular communication devices 1502, 1506, and 1508, may then receive signaling 1510 and consequently identify the scheduling and the vehicular radio communication technologies with which vehicular communication device 1504 intends to use the channel. In some aspects, vehicular communication devices 1502, 1506, and 1508 may then schedule or adjust their own radio communications based on the information in signaling 1510, such as to help avoid collisions and interference.

In some aspects where vehicular communication device 1504 intends to use the channel to communicate with other vehicular communication devices, vehicular communication device 1504 may base the channel and scheduling selection on the capabilities and scheduling of nearby vehicular communication devices. For example, since vehicular communication devices may exchange basic safety messages and other movement information with nearby vehicular communication devices, coordination in channel selection and scheduling may be useful in enabling all nearby vehicular communication devices to communicate with each other.

If there are multiple available channels and multiple available vehicular radio communication technologies, vehicular communication device 1504 may use signaling 1510 to coordinate selection of channel and/or vehicular radio communication technology with other nearby vehicular communication devices. For example, vehicular communication device 1504 may broadcast information in signaling 1510 that identifies a preferred channel and/or preferred vehicular radio communication technology (e.g., DSRC or LTE V2V/V2X). Vehicular communication devices 1502, 1506, and 1508 may receive signaling 1510 (e.g., assuming signaling 1510 is broadcast with a supported vehicular radio communication technology) and identify the preferred channel and/or preferred vehicular radio communication technology. Vehicular communication devices 1502-1508 may then negotiate via exchange of further signaling to agree on a channel and/or vehicular radio communication technology to communicate with each other on. For example, if vehicular communication device 1502 does not support the preferred vehicular radio communication technology indicated by vehicular communication device 1504 in signaling 1510, vehicular communication device 1502 may respond to signaling 1510 with further signaling that specifies an alternate vehicular radio communication technology that vehicular communication device 1502 does support. Vehicular communication devices 1502-1508 may then continue to exchange signaling until a vehicular radio communication technology is agreed upon. Similar negotiations can also be used for preferred and alternate channels. In some aspects, vehicular communication devices may broadcast signaling that indicates a ranked list of preferred channels and/or vehicular radio communication technologies, which may assist during the negotiation process in agreeing on a channel and/or vehicular radio communication technology that is supported by some or all negotiating vehicular radio communication devices. Vehicular communication devices 1502-1508 can then begin transmitting and receiving using the agreed channels and/or vehicular radio communication technologies. In some aspects, vehicular communication devices may also negotiate in this manner to agree on time slots allocated to each vehicular communication device on a given channel, which can provide fair access to the channel.

In some aspects, this greedy spectrum selection approach can be used in conjunction with cluster-based communications. For example, in the above example of FIG. 15, vehicular communication devices 1502-1508 may all be members of the same cluster. In some aspects, the cluster head, such as vehicular communication device 1504, may assume a primary role in the greedy spectrum selection approach. For example, when determining and transmitting a channel resource allocation to the cluster (e.g., in the manner of stages 1212-1214 of FIG. 12), cluster head 1504 may specify a set of channels and/or time slots that the members of the cluster, such as vehicular communication devices 1502, 1506, and 1508, can access using greedy spectrum selection. Accordingly, vehicular communication devices 1502, 1506, and 1508 may receive the channel resource allocation, identify the channels and/or time slots that are available, and then negotiate with each other to determine which vehicular communication devices can access which channels during which time slots with a particular vehicular radio communication technology (which cluster head 1504 may optionally also specify in the channel resource allocation). Accordingly, cluster head 1504 may have oversight of the overall pool of channel resources that are made available to the members of the cluster to access with greedy spectrum selection, while the members of the cluster may actually perform the greedy spectrum selection with the overall pool of channel resources as specified by cluster head 1504.

In some aspects, the cluster head, such as cluster head 904 in the case of FIG. 9, may communicate with a cluster head of another cluster, such as cluster head 914, to identify the overall pool of channel resources and/or vehicular radio communication technologies available for the members of its cluster to use for greedy spectrum selection. For example, cluster head 904 may negotiate with cluster head 914 (e.g., with their respective cluster managers 1010) via inter-cluster link 920 to identify the overall pool of channel resource available for each cluster to use for greedy spectrum selection. In some aspects, cluster head 904 and cluster head 914 may compete with each other using greedy spectrum selection to secure channel resources for their respective clusters to use.

Figure 16:
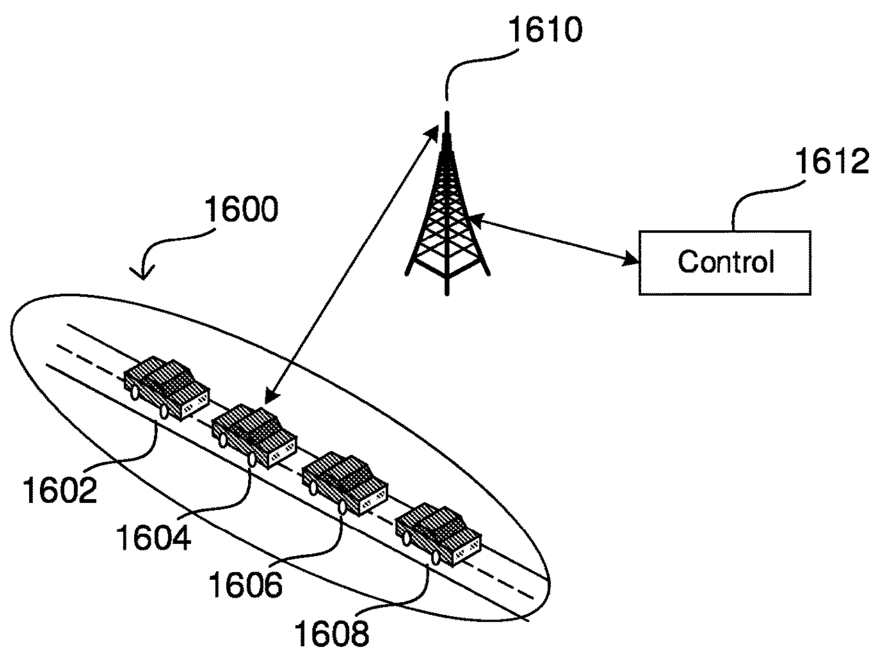
FIG. 16 shows an exemplary network architecture for managing channel resource allocations with a cluster and control server according to some aspects.

In some aspects, a central control entity such as a core network server, network access node, or edge server may interact with a cluster head to provide a greater degree of control over the channel resource allocations for a cluster. For example, FIG. 16 shows an example in which control server 1612 interfaces with network access node 1610. Cluster head 1604, which manages cluster 1600 including vehicular communication devices 1602, 1606, and 1608, may then interface with network access node 1610 over a radio link that consequently provides a signaling connection between cluster head 1604 and control server 1612. Control server 1612 may be any of a core network server (e.g., located in a core network behind network access node 1610), a network access node (e.g., an internal component of network access node 1610), or an edge server (e.g., an edge computing device placed between network access node 1610 and a core network). In some aspects, control server 1612 may be a server-type component, such as a computing element including one or more processors configured to retrieve (e.g., from a local memory) and execute program code that defines the control and algorithmic functions of control server 1612 as described herein in the form of executable instructions. The program code may be updatable, such as wirelessly or by a manual install.

In contrast to the cases described above where the cluster head exerts primary control over channel resource allocations, in some aspects of FIG. 16 control server 1612 may exert primary control over channel resource allocations. For example, cluster head 1604 may exchange signaling with control server 1612 (e.g., via its resource allocator 1008) in which control server 1612 specifies the channel resource allocations to cluster head 1604. Cluster head 1604 may then transmit the channel resource allocations (e.g., in the manner of stage 1214 of FIG. 12) to vehicular communication devices 1602, 1606, and 1608, which may then transmit and receive according to the channel resource allocations (e.g., in the manner of stage 1216 of FIG. 12).

In some aspects, cluster head 1604 may communicate with control server 1612 to identify the overall pool of channel resources and/or vehicular radio communication technologies available for the members of its cluster to use for greedy spectrum selection. For example, control server 1612 may transmit signaling to cluster head 1604 that identifies the overall pool of channel resources and/or vehicular radio communication technologies available for the members of cluster 1600 to use for greedy spectrum selection. Cluster head 1604 may then transmit the channel resource allocations to cluster 1600 according to the overall pool of channel resources specified by control server 1612.

In some aspects, control server 1612 may also assist in managing interference between different vehicular radio access technologies by acting as a database of network access nodes. For example, cluster head 1604 may document network access nodes that cluster 1600 observes during travel, and report the network access nodes to control server 1612. For instance, one or more of cluster head 1604 or vehicular communication devices 1602, 1606, and 1608 may detect various network access nodes during travel (e.g., via reception of discovery signaling), and may record the location, identity, and channel resource usage of the detected network access nodes. Cluster head 1604 may then report this information of the detected network access nodes to control server 1612. Control server 1612 may then use this information for the detected network access nodes to make decisions on channel resource allocations for cluster 1600 and/or other clusters. For example, if DSRC RSUs (e.g., deployed to cover critical intersections) are deployed in an area, vehicular communication devices that support DSRC can report the location and identities of the DSRC RSUs to control server 1612. Network access nodes that support LTE V2V/V2X can then access the information stored at control server 1612 to identify which DSRC RSUs are within their coverage area. As these DSRC RSUs could interfere with LTE V2V/V2X communications, the network access nodes that support LTE V2V/V2X can then attempt to avoid using the DSRC channels in those areas.

Accordingly, network access nodes can thus communicate with control server 1612, which may act as a database, to obtain location, identity, and channel resource usage information (e.g., the channels and time slots that network access nodes are using) for network access nodes supporting other vehicular radio communication technologies. Network access nodes can then use this information either with or without cluster-based channel access. For example, when using location and identity information from control server 1612 with cluster-based channel access, a network access node may provide the location, identity, and channel resource usage information to a cluster head. The cluster head may then determine channel resource allocations (e.g., in the manner of stage 1212 of FIG. 12) based on the information, such as by avoiding allocating channel resources to its cluster that are being used by nearby network access nodes. Alternatively, control server 1612 or the network access node may determine the channel resource allocations for a given cluster based on the information, and may then transmit the channel resource allocations to the cluster head of the cluster. When using location and identity information from control server 1612 without cluster-based channel access, network access nodes such as LTE V2V/V2X base stations may similarly determine channel resource allocations for individual vehicular communication devices based on the information, such as by avoiding allocating channel resources to vehicular communication devices that are being used by nearby network access nodes.

Alternatively, in some aspects network access nodes that support different vehicular radio communication technologies may interface directly to coordinate access to shared channel resources. For example, DSRC RSUs and LTE V2V/V2X base stations can negotiate with each other to coordinate access to shared channel resources. In some aspects, the negotiation can include exchanging channel information between network access nodes, where, for example, a first network access node can specify to a second network access node which channel resources it has allocated or is immediately planning to allocate for use. The second network access node can then make an independent decision to use different channel resources. In other aspects, network access nodes may utilize more elaborate coordination scheme, such as a request-response protocol. Accordingly, a first network access node may request the use of channel resources (e.g., a certain channel during certain time slots), and the second network access node may then respond with an acceptance, rejection, or counter-proposal. These negotiations can take place on the application layer (e.g., above transport/IP layers) over a software-level connection, where the underlying radio protocols differ according to the different vehicular radio communication technologies. In some aspects, the negotiations may attempt to target an optimum working point for coordination between different vehicular radio communication technologies. For example, contention-based channel access schemes may see a sizable drop in efficiency if the channel load reaches 60 percent or more. While this would therefore lead to excessive collisions for contention-based channel access schemes such as DSRC, this would not be a problem with deterministic scheduling shames such as LTE V2V/V2X. Accordingly, network access nodes that are negotiating may coordinate to obtain shared access in which contention-based channel access schemes such as DSRC have a channel load of less than 60 percent. In some aspects, these negotiations may occur through a central control entity, such as control server 1612.

In various aspects, the implementations described herein may be used across multiple bands. For example, the channel resource allocations described herein may apply to channels across multiple bands, such as channels on both the 3.4-3.8 GHz and 5.9 GHz bands. In some aspects, different band may use differing levels of coordination to manage access. For, example, clusters on some bands may use cluster-based coordination, while individual vehicular communication devices or clusters may use greedy spectrum selection on other bands. In some aspects, carrier aggregation may also be used, potentially also with differing levels of coordination on the separate carriers. For example, a cluster may use carrier aggregation, where individual vehicular communication devices of the cluster may compete for channel resources on a first band according to greedy spectrum selection while coordinating under the guidance of the cluster head to obtain channel resources on a second band.

Figure 17:
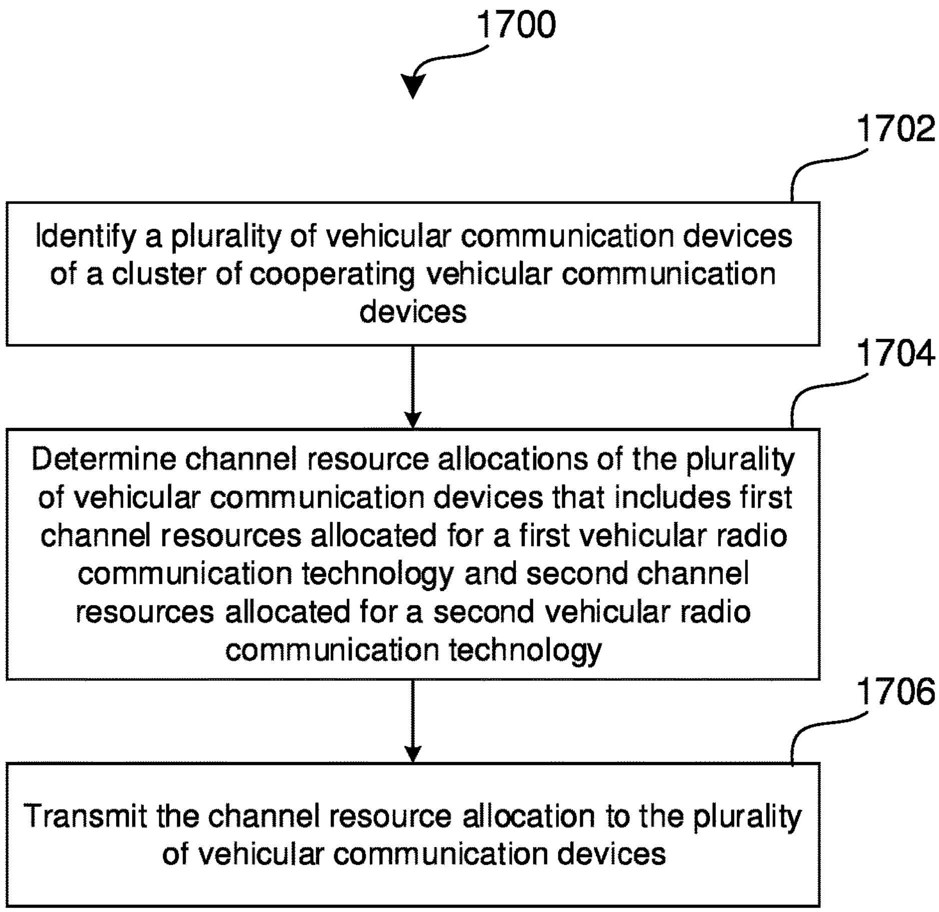
FIG. 17 shows an exemplary method of performing vehicular communications with distributed coexistence management according to some aspects.

FIG. 17 shows method 1700 of performing vehicular radio communications according to some aspects. As shown in FIG. 17, method 1700 includes identifying a plurality of vehicular communication devices of a cluster of cooperating vehicular communication devices (1702), determining channel resource allocations for the plurality of vehicular communication devices that includes first channel resources allocated for a first vehicular radio communication technology and second channel resources allocated for a second vehicular radio communication technology (1704), and transmitting the channel resource allocation to the plurality of vehicular communication devices (1706).

Centralized Spectrum Allocation

The aspects described above regarding distributed coexistence management for vehicular radio communication technologies may operate in a relatively decentralized manner. Coexistence between different vehicular radio communication technologies may additionally or alternatively be managed with more centralized approaches.

Accordingly, in some aspects a central control entity may assume the primary role in determining channel resource allocations between different vehicular radio communication technologies. As vehicular radio communication technologies such as DSRC and LTE V2V/V2X are independent and in many cases operated by different network operators, this central control entity may be a system-independent global controller. The central control entity may monitor channel resource usage by the vehicular radio communication technologies, determine channel resource allocations for the vehicular radio communication technologies, and broadcast the channel resource allocations to the various terminal devices and network access nodes using the vehicular radio communication technologies.

These aspects may also be used to manage migration between different radio communication technologies, including different vehicular radio communication technologies. For example, DSRC may prove easier to deploy in the near future than LTE V2V/V2X, potentially due in part to the fact that the distributed nature of DSRC allows deployment without substantial network coordination and support. However, while the initial deployment of LTE V2V/V2X may be slower than that of DSRC, LTE V2V/V2X may prove to be the more useful and widespread technology due to its favorable compatibility with 5G network architectures. Accordingly, initial heavy usage of DSRC may eventually migrate to LTE V2V/V2X, and channel resource usage of LTE V2V/V2X may therefore grow in proportion to that of DSRC over time. The central control entity may therefore be able to play a role in this transition (and other analogous transitions) by gradually allocating a greater proportion of channel resources to LTE V2V/V2X over time. The central control entity may similarly be able to handle migration between radio communication technologies over time (e.g., a third, a fourth, etc.), and is thus not limited to any particular two radio communication technologies.

Aspects as described herein can be generalized as RAN-supported or RAN-independent (in addition to hybrid combinations thereof). RAN-supported implementations may use support provided by the network access nodes of the radio access network to supply the central control entity with channel resource usage information and to transmit channel resource allocations to participating communication devices. RAN-independent implementations may use separate infrastructure, such as a network of remote nodes with radio-sensing capabilities, to supply channel resource usage information to the central control entity and to transmit channel resource allocations to participating vehicular communication devices.

Figure 18:
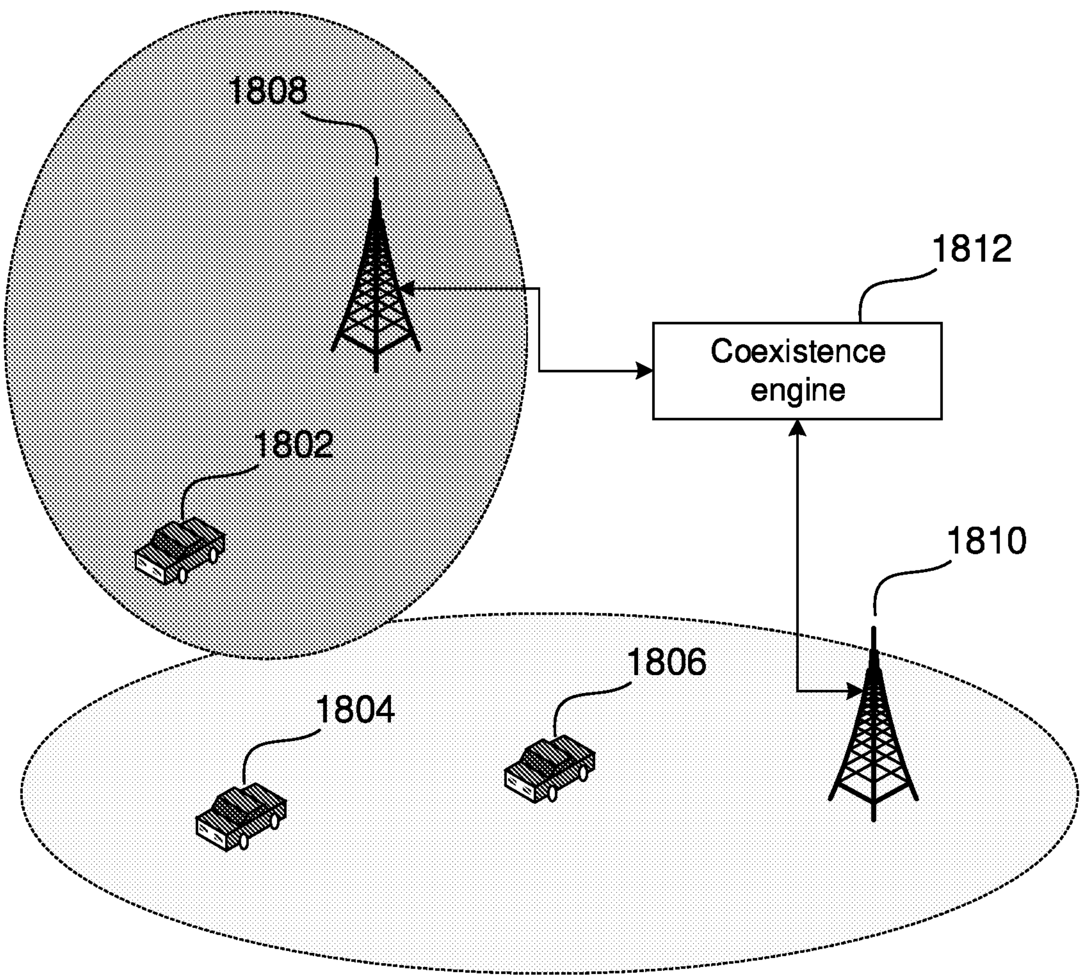
FIG. 18 shows an exemplary network architecture for RAN-supported centralized spectrum allocation according to some aspects.

FIG. 18 shows an example of a RAN-supported implementation according to some aspects. As shown in FIG. 18, network access node 1808 may serve vehicular communication device 1802, while network access node 1810 may serve vehicular communication devices 1804 and 1806. Network access node 1808 and vehicular communication device 1802 may be configured to support a first vehicular radio communication technology, such as DSRC, while network access node 1810 and vehicular communication devices 1804 and 1806 may be configured to support a second vehicular radio communication technology, such as LTE V2V/V2X. While examples may refer to first and second vehicular radio communication technologies, these examples can be scaled to any number of vehicular radio communication technologies.

Due to the lack of established coexistence between DSRC and LTE V2V/V2X, coexistence engine 1812 may function to coordinate channel resource usage between these different vehicular radio communication technologies, in addition to other communication technologies. In particular, coexistence engine 1812 may monitor channel resource usage and determine channel resource allocations for the different vehicular radio communication technologies. Coexistence engine 1812 may then provide the channel resource allocations to the participating communication devices via the radio access network.

Coexistence engine 1812 may be a server-type component, and may include one or more processors configured to retrieve (e.g., from a non-transitory computer readable medium) and execute program code that algorithmically defines the functionality of coexistence engine 1812 described herein. As shown in FIG. 18, coexistence engine 1812 may interface with network access nodes 1808 and 1810. In some aspects, coexistence engine 1812 may be located in the core network, such as a core network behind network access node 1808 or a core network behind network access node 1810. In some aspects, coexistence engine 1812 may be independently located outside of the network domain of both network access nodes 1808 and 1810. Coexistence engine 1812 may therefore interface with network access nodes 1808 and 1810 over a backhaul link, which may run through a core network or may interface directly between coexistence engine 1812 and network access nodes 1808 and 1810]. In some aspects, coexistence engine 1812 may be a RAN component that is locally positioned at network access node 1808 or 1810, and may interface with the other of network access nodes 1808 or 1810 via a backhaul link. Coexistence engine 1812 may transmit and receive data via a logical software-level connection, such as to and from a core network, network access nodes, and/or remote nodes over wired or wireless interfaces.

Figure 19:
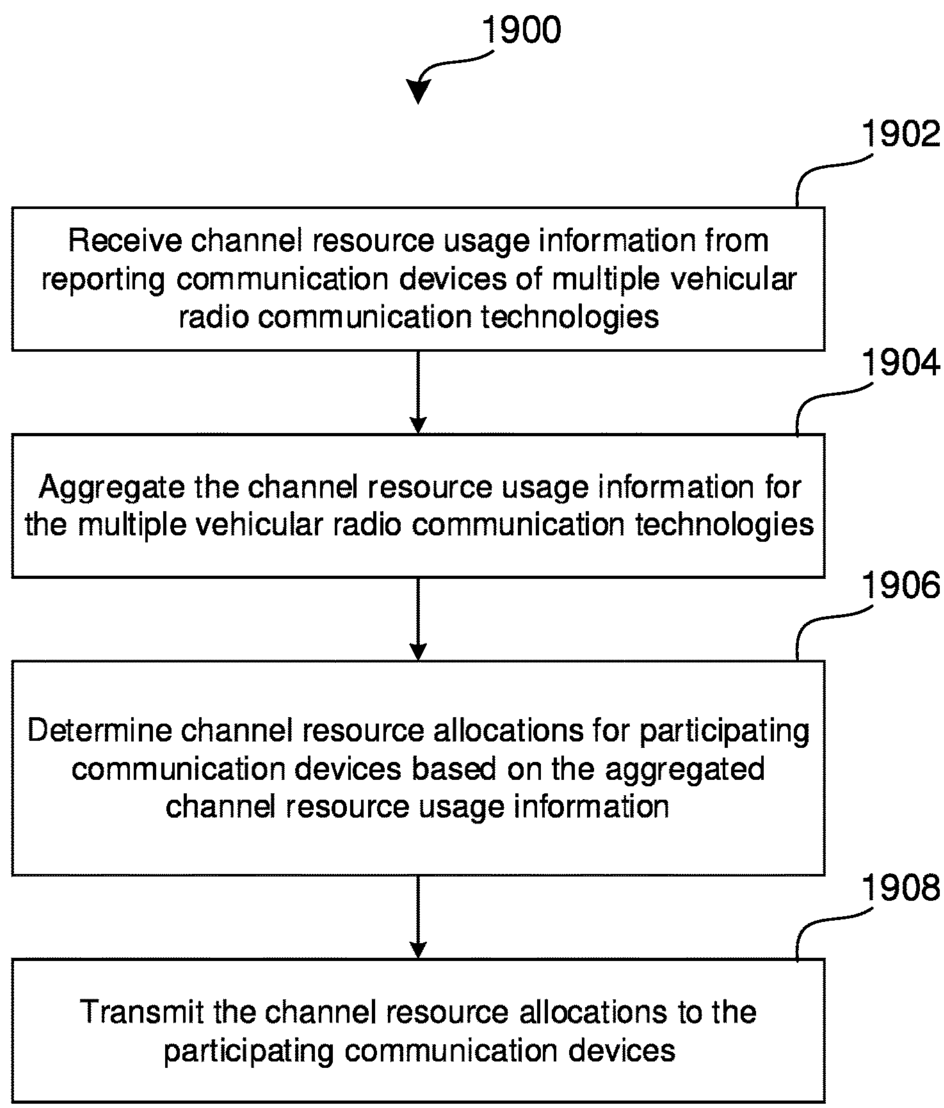
FIG. 19 shows an exemplary method for collecting channel resource usage information and managing channel resource allocations according to some aspects.

FIG. 19 shows method 1900 illustrating this process according to some aspects, which coexistence engine 1812 may perform via execution of software instructions at one or more processors. As shown in FIG. 19, coexistence engine 1812 may first receive channel resource usage information from reporting communication devices in stage 1902. In the exemplary case of FIG. 18, vehicular communication devices 1802-1806 may be within the coverage of network access nodes 1808 and 1810. For example, network access node 1808 may be a DSRC RSU within radio range of vehicular communication device 1802 while network access node 1810 may be an LTE V2V/V2X base station within radio range of vehicular communication devices 1804 and 1806. As vehicular communication devices 1802-1806 may be within the coverage of network access nodes 1808 and 1810, network access nodes 1808 and 1810 may be aware of their own channel resource usage and the channel resource usage of their served vehicular communication devices.

For example, if network access node 1810 is an LTE V2V/V2X base station (or other network access node that performs deterministic scheduling, including DSRC RSUs if later DSRC versions have centrally managed or deterministic scheduling), network access node 1810 may be responsible for scheduling uplink and downlink communications and may thus know the uplink and downlink channel resource usage information. For example, network access node 1810 may locally retain the channels used for uplink and downlink communications optionally in addition to the time slots during which the channels are used, transmission powers, spatial multiplexing layers (e.g., specific spatial multiplexing slots, such as MIMO transmission having tight angular restrictions), and other scheduling parameters. Network access node 1810 may also know the number of active users (e.g., terminal devices) that it is serving, and/or efficiency parameters such as the retransmission rate for its served users. The channel resource usage information may therefore include one or more of spectrum used, spectrum used per unit time (e.g., the total spectrum used in a given time period), spectrum used per unit time and spatial multiplexing layer (e.g., where each spatial multiplexing layer can duplicate the channel resource), spectrum used per unit time, spatial multiplexing layer, code (e.g., for code division multiplexing for overlaying codewords), polarization (e.g., horizontal vs. vertical polarization for separate data streams), and/or propagation channel orthogonality (e.g., one system sends in the deep frequency-domain fading sub-bands of a second system), a total airtime of transmissions (e.g., the cumulative duration of all transmitters in a given time period), a total number of active users, a total transmit power of transmissions (e.g., the cumulative transmit power for all transmissions in a given time period), a total amount of data transmitted (e.g., the cumulative number bytes in a given time period), a transmission efficiency (e.g., the retransmission rate), or one or more other metrics that indicate the load or usage of channel resources by network access node 1810 and the users it serves. Network access node 1810 may transmit this channel resource usage information to coexistence engine 1812, which coexistence engine 1812 may receive in stage 1902.

If network access node 1808 is a DSRC RSU (or other network access node that does not perform deterministic scheduling), network access node 1808 may not have direct knowledge of the uplink and downlink scheduling and may thus not locally retain channel resource usage information. In some aspects, network access node 1808 may perform sensing to obtain the channel resource usage information. For example, network access node 1808 may receive and process radio signals according to the first vehicular radio communication technology, which can include transmissions by vehicular communication device 1802 and any other vehicular communication devices or network access nodes with the first vehicular radio communication technology. This can include performing a frequency scan to detect which channels contain active transmissions. Network access node 1808 may thus determine which channels vehicular communication device 1802 is transmitting on, which time slots vehicular communication device 1802 is using the channels, which transmit powers vehicular communication device 1802 is using, which spatial multiplexing layer vehicular communication device 1802 is using, and other such scheduling parameters. As previously indicated, the channel resource usage information can include one or more of spectrum used, spectrum used per unit time, spectrum used per unit time and spatial multiplexing layer, spectrum used per unit time/spatial multiplexing layer/code/polarization/propagation channel orthogonality, a total airtime of transmissions, a total number of active users, a total transmit power of transmissions, a total amount of data transmitted, a transmission efficiency, or one or more other metrics that indicate the load or usage of channel resources by network access node 1810 and the users it serves. Network access node 1808 may thus determine this channel source usage information using radio sensing and then transmit this channel resource usage information to coexistence engine 1812, which coexistence engine 1812 may receive in stage 1902.

Additionally or alternatively, vehicular communication devices may perform this radio sensing to obtain the channel resource usage information in RAN-supported implementations. For example, vehicular communication device 1802 may receive and process radio signals according to the first vehicular radio communication technology, which can include transmissions by other vehicular communication devices and network access nodes with the first vehicular radio communication technology. This can include performing a frequency scan to detect which channels contain active transmissions. Vehicular communication device 1802 may then determine the channel resource usage information based on the received radio signals, and may report the channel resource usage information to network access node 1808. Network access node 1808 may then report the channel resource usage information to coexistence engine 1812, which coexistence engine 1812 may receive in stage 1902. Additionally or alternatively, vehicular communication device 1802 may relay the channel resource usage information to network access node 1808, such as through one or more other vehicular communication devices that act as a relaying link. Network access node 1808 may then send the channel resource usage information to coexistence engine 1812.

Coexistence engine 1812 may therefore receive the channel resource usage information from various reporting communication devices (e.g., terminal devices and network access nodes) in stage 1902, where the channel resource usage information may indicate channel resource usage from the first and the second radio communication technologies. This can similarly be scaled to any number of radio communication technologies. FIG. 18 shows a simplified case, and in various aspects the reporting communication devices may additionally or alternatively be spread across a wide geographic area and include the coverage areas of numerous network access nodes (as opposed to only two as shown in the example of FIG. 18).

Coexistence engine 1812 may then aggregate the channel resource usage information for the various different vehicular radio communication technologies in stage 1904. As coexistence engine 1812 may receive channel resource usage information from multiple reporting communication devices (e.g., multiple network access nodes or terminal devices), coexistence engine 1812 may aggregate the channel resource usage information together from the reporting communication devices of each vehicular radio communication technology. For example, in the exemplary context using DSRC and LTE V2V/V2X, coexistence engine 1812 may receive channel resource usage information from reporting communication devices that support DSRC and reporting communication devices that support LTE V2V/V2X.

Coexistence engine 1812 may then accumulate, such as by summing or other aggregation or averaging technique, the channel resource usage information from the reporting communication devices that support DSRC to obtain first aggregated channel resource usage information, and accumulate the channel resource usage information from the reporting communication devices that support LTE V2V/V2X to obtain second aggregated channel resource usage information. For example, if the channel resource usage information includes spectrum used per unit time, coexistence engine 1812 may sum the spectrum used per unit time provided by each reporting communication device that supports DSRC to obtain the first aggregated channel resource usage information, and may sum the spectrum used per unit time provided by each reporting communication device that supports LTE V2V/V2X to obtain the second aggregated channel resource usage information. Coexistence engine 1812 may similarly aggregate other types of channel resource usage information, where the aggregated channel resource usage information for each vehicular radio communication technology may indicate the relative usage by each vehicular radio communication technology. Accordingly, the channel resource usage information provided by reporting communication devices using different vehicular radio communication technologies may provide a basis for coexistence engine 1812 to evaluate the relative usage levels of the different vehicular radio communication technologies, such as by determining which vehicular radio communication technology has the higher usage level (e.g., which aggregated channel resource usage information is greater).

For example, if the first vehicular radio communication technology, e.g., DSRC, is using more channel resources than the second vehicular radio communication technology, e.g., LTE V2V/V2X, the aggregated channel resource usage information supplied by reporting communication devices configured for the first vehicular radio communication technology (e.g., network access node 1808, vehicular communication device 1802, and/or any other reporting communication devices) may include one or more of a larger amount of spectrum, a larger amount of spectrum per unit time, a larger amount of spectrum per unit time and spatial multiplexing layer, a larger amount of spectrum per unit time/spatial multiplexing layer/code/polarization/propagation channel orthogonality, a larger total airtime, a larger total number of active users, a larger total transmit power for transmissions, a larger total amount of data transmitted, and a lower transmission efficiency than the aggregated channel resource usage information supplied by the reporting communication devices configured for the second vehicular radio communication technology (e.g., network access node 1810, vehicular communication device 1804 and 1806, and/or any other reporting communication devices). Accordingly, coexistence engine 1812 may be able to evaluate the aggregated channel resource usage information for the different vehicular radio communication technologies to determine which vehicular radio communication technologies are using more channel resources.

Coexistence engine 1812 may then determine channel resource allocations for participating communication devices based on the aggregated channel resource usage information in stage 1906, where the participating communication devices may be the same as or different from the reporting communication devices. For example, in the exemplary context of FIG. 18, coexistence engine 1812 may determine channel resource allocations for one or more of vehicular communication devices 1802-1806 and network access nodes 1808 and 1810.

The channel resource allocations may specify the total amount of channel resources, such as channels, time slots, transmission power, and/or spatial multiplexing layer that are allocated to the first and second vehicular radio communication technologies, where the relative amounts of channel resources that coexistence engine 1812 allocates to each vehicular radio communication technology may depend on the relative proportion of the aggregated channel resource usage information. For example, if the aggregated channel resource usage information for the first vehicular radio communication technology is greater than (e.g., a larger amount of spectrum, a larger amount of spectrum per time, a larger amount of spectrum per time and spatial multiplexing layer, a larger amount of spectrum used per unit time/spatial multiplexing layer/code/polarization/propagation channel orthogonality, a larger total airtime, a larger total number of active users, a larger total transmit power for transmissions, a larger total amount of data transmitted, or a lower transmission efficiency) the aggregated channel resource information for the second vehicular radio communication technology, coexistence engine 1812 may allocate more channel resources (e.g., more channels, more time slots, more transmission power, and/or more spatial multiplexing layers) to the first vehicular radio communication technology than the second vehicular radio communication technology.

In some aspects, the relative amounts of channel resources that coexistence engine 1812 allocates to the first and second vehicular radio communication technologies may be proportional to the ratio between the first and second aggregated channel resource usage information. For example, if the first aggregated channel resource usage information is twice as large (e.g., twice the amount of spectrum, twice the amount of spectrum per unit time, twice the amount of spectrum per unit time and multiplexing layer, twice the amount of spectrum per unit time/spatial multiplexing layer/code/polarization/propagation channel orthogonality, twice the total airtime, twice the total number of active users, twice the total transmit power for transmissions, twice the amount of data transmitted, or half the transmission efficiency), coexistence engine 1812 may allocate twice the amount of channel resources to the first vehicular radio communication technology than the second vehicular radio communication technology. This ratio is exemplary and can be scaled to any value. Non-integer ratios can be used in the same manner.

In some aspects, coexistence engine 1812 may determine channel resource allocations for individual devices, such as by determining a specific channel (or set of channels) that an individual communication device can use. For example, if vehicular communication device 1802 is configured for DSRC communications, coexistence engine 1812 may select one or more 10 MHz DSRC channels for vehicular communication device 1802 to use (e.g., to use for contention-based channel access according to DSRC protocols), and specify the selected DSRC channels in the channel resource allocation for vehicular communication device 1802. If network access node 1810 is an LTE V2V/V2X base station, coexistence engine 1812 may select one or more LTE V2V/V2X channels for network access node 1810 to use (e.g., for uplink and downlink deterministic scheduling), and specify the selected LTE V2V/V2X channels in the channel resource allocation for network access node 1810. In some aspects, coexistence engine 1812 may also determine a time slot (or set of time slots), a transmit power, and/or one or more spatial multiplexing layers for an individual device to use.

In some aspects, coexistence engine 1812 may determine a channel resource allocation for multiple devices to use. For example, coexistence engine 1812 may determine a channel resource allocation for a plurality of communication devices to share, such as a set of vehicular communication devices using DSRC. Coexistence engine 1812 may select one or more channels (optionally in addition to one or more time slots, transmit powers, and/or spatial multiplexing layers) for all of the set of vehicular communication devices. The vehicular communication devices may then share the allocated channel resources with contention-based channel access according to DSRC. Coexistence engine 1812 may similarly determine a channel resource allocation for a set of devices by allocating channel resources to a network access node that uses deterministic scheduling, which may then schedule uplink and downlink communications with its served vehicular communication devices using the allocated channel resources. In particular where participating communication devices use contention-based channel access, in some aspects coexistence engine 1812 can therefore assign the same channel resources to communication devices even if they are within radio range of each other. For example, coexistence engine 1812 may assign the same channel resources to vehicular communication device 1802 as another vehicular communication device within radio range of vehicular communication device 1802, where both vehicular communication device and the other vehicular communication device use, for example, DSRC. Both vehicular communication device 1802 and the other vehicular communication device may then compete for the shared channel resources according to DSRC.

As the first and second vehicular radio communication technologies may coexist, in some aspects coexistence engine 1812 may determine channel resource allocations in stage 1906 that avoid interference or collisions between the first and second vehicular radio communication technologies. For example, coexistence engine 1812 may assign different channels to communication devices using the first vehicular radio communication technology than communication devices using the second vehicular radio communication technology. For instance, coexistence engine 1812 may determine a channel resource allocation for vehicular communication device 1802 that assigns different channels than the channel resource allocation for network access node 1810. In some aspects, coexistence engine 1812 may also use time-multiplexing to assign the same channel to the first and second vehicular radio communication technologies during differing time slots, such as by assigning vehicular communication device 1802 to use a first channel during a first set of time slots and by assigning network access node 1810 to use the first channel during a different second set of time slots. For example, in an exemplary context involving DSRC and LTE V2V/V2X, coexistence engine 1812 may determine resource allocations that assign different 10 MHz channels to DSRC communication devices than LTE V2V/V2X communication devices, that assign different time slots on the same 10 MHz channels to DSRC communication devices than LTE V2V/V2X communication devices, or that assign different spatial multiplexing layers to DSRC communication devices than LTE V2V/V2X communication devices on the same 10 MHz channels and same time slots.

In some aspects, coexistence engine 1812 may determine channel resource allocations that re-use channel resources over a geographic area. For example, a vehicular communication device using the first vehicular radio communication technology may not interfere with a vehicular communication device using the second vehicular radio communication technology if the second vehicular communication device is out of radio range even if allocated the same channel resources (e.g., same channel, time slot, and spatial multiplexing layer). Accordingly, in addition to helping to avoid interference through allocation of different channel resources, coexistence engine 1812 may help avoid interference by assigning the same channel resources to communication devices located in different geographic areas (e.g., out of radio range, or far enough to produce manageable levels of interference).

Similarly, in some aspects coexistence engine 1812 may determine the channel resource allocations specific to particular geographic areas. For example, coexistence engine 1812 can aggregate the channel resource usage information from reporting communication devices located in a first area, and separately aggregate the channel resource usage information from reporting communication devices located in a different second area. Coexistence engine 1812 may thus obtain first and second aggregated channel resource usage information for both the first area and second area. Coexistence engine 1812 may then separately determine the channel resource allocations for the first area and second area using the corresponding aggregated channel resource usage information. Accordingly, if the aggregated channel resource usage information for the first area indicates that the first vehicular radio communication technology using more channel resources than the second vehicular radio communication technology, coexistence engine 1812 may allocate more channel resource to the first vehicular radio communication technology in the first area than the second vehicular radio communication technology. Likewise, if the aggregated channel resource usage information for the second area indicates that the second vehicular radio communication technology is using more channel resources than the first vehicular radio communication technology, coexistence engine 1812 may allocate more channel resource to the second vehicular radio communication technology in the second area than the first vehicular radio communication technology. Coexistence engine 1812 may therefore vary the channel resource allocations over geographic area. If coexistence engine 1812 does not receive enough channel resource usage information for a given geographic area to accurately determine how much channel resources to allocate to the different vehicular radio communication technologies, coexistence engine 1812 may perform an extrapolation using channel resource usage information from nearby areas.

In some aspects, coexistence engine 1812 may also consider reported interference levels when determining channel resource allocations. For example, coexistence engine 1812 may also receive interference levels from one or more reporting communication devices that indicate how much interference the one or more reporting communication devices are experiencing. Coexistence engine 1812 may then allocate the available channel resources so that interference-friendly communication devices share the same or nearby channel resources (e.g., in frequency, time, spatial multiplexing layer, and/or geographic area). This can be similar to pairing in Multiple User MIMO (MU-MIMO). If certain communication devices are creating severe interference coexistence engine 1812 may separate dominant interferences spatially or in time (e.g., frequency- or time-duplexing, such as half of the time slots allocated for the first vehicular radio communication technology and the other half of the time slots allocated for the second vehicular radio communication technology), restricting channel resource access to dominant interferences only during certain times, and/or initiate beamforming based on geographic information to mitigate the interference.

Coexistence engine 1812 may therefore determine channel resource allocations in stage 1906 based on the channel resource usage information, where each channel resource allocation may allocate channel resources (e.g., channels, time slots, transmit power, and/or spatial multiplexing layer) to an individual communication device (e.g., network access node or vehicular communication device) or a set of communication devices. Coexistence engine 1812 may allocate overall available channel resources (e.g., all available channels, time slots, and spatial multiplexing layers) between the different vehicular radio communication technologies, which can include assigning different channel resources to communication devices of the first vehicular radio communication technology than to communication devices of the second vehicular radio communication technology. As previously indicated, coexistence engine 1812 may also re-use channel resources for both the first and second vehicular radio communication technologies by allocating the same channel resources in different geographic areas.

Coexistence engine 1812 may transmit the channel resource allocations to the participating communication devices in stage 1908. As coexistence engine 1812 may be using a RAN-supported implementation, coexistence engine 1812 may transmit the channel resource allocations for vehicular communication devices over the radio access network. For example, coexistence engine 1812 may send the channel resource allocations for vehicular communication devices to their respective current serving network access nodes, which may then transmit the channel resource allocations to the appropriate vehicular communication devices. Coexistence engine 1812 may transmit the channel resource allocations for network access nodes directly to the network access nodes. In some aspects, coexistence engine 1812 may generate a channel resource allocation message that specifies the channel resources (e.g., channels, time slots, transmit power, and/or spatial multiplexing layers) and destination communication devices (e.g., addressed by a device ID), and transmit the channel resource allocation message to the destination communication devices.

The participating communication devices may receive the channel resource allocations and subsequently transmit and/or receive communications according to the channel resource allocations. For example, in the exemplary case where network access node 1810 is an LTE V2V/V2X base station, network access node 1810 may then schedule uplink and downlink communications using one or more channel resources (e.g., channels, time slots, transmit power, and/or spatial multiplexing layer) specified in its channel resource allocation. In another example, in the exemplary case where vehicular communication device 1802 is a DSRC vehicular communication device, vehicular communication device 1802 may perform contention-based channel access using DSRC on the channel resources specified in its channel resource allocation.

Figure 20:
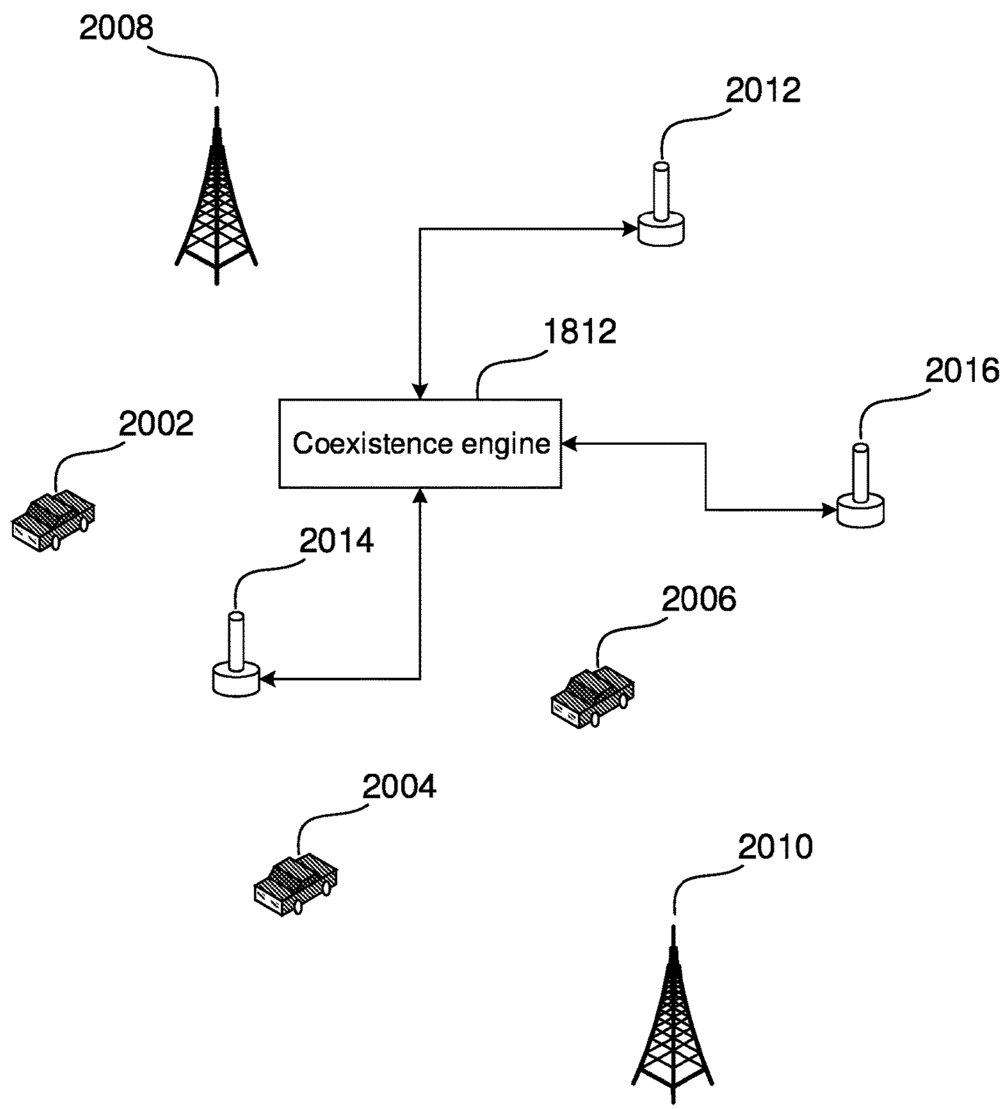
FIG. 20 shows an exemplary network architecture for RAN-independent centralized spectrum allocation according to some aspects.

As indicated above, aspects of centralized spectrum allocation for vehicular radio communication technologies may additionally or alternatively use RAN-independent implementations. FIG. 20 shows an exemplary example of a RAN-independent implementation according to some aspects. As shown in FIG. 20, coexistence engine 1812 may interface with remote nodes 2012, 2014, and 2016. Remote nodes 2012-2016 may include radio, physical layer, and control components (e.g., antennas, RF transceivers, DSP circuitry, and/or controllers) that are configured to receive and process radio signals to recover communication data, and to process communication data and transmit radio signals. Remote nodes 2012-2016 may be configured to support a first and second vehicular radio communication technology, such as DSRC and LTE V2V/V2X.

Remote nodes 2012-2016 may thus perform radio reception and transmission operations, and may be primarily controlled by coexistence engine 1812. Coexistence engine 1812 may be positioned in a core network or in a network-independent location (e.g., a server location outside of the network domain). Accordingly, as opposed to the exemplary case of a RAN-supported implementation as in FIG. 18 where coexistence engine 1812 interfaces with network access nodes, coexistence engine 1812 may interface with remote nodes 2012-2016 in the RAN-independent implementation of FIG. 20. Instead of receiving channel resource usage information and transmitting channel resource allocations through the radio access network, coexistence engine 1812 may receive channel resource usage information and transmit channel resource allocations via remote nodes 2012-2016.

Method 1900 of FIG. 19 can therefore also be employed by coexistence engine 1812 in a RAN-independent implementation. Accordingly, remote nodes 2012-2016 may perform dual-mode radio sensing to obtain channel resource usage information. For example, remote nodes 2012-2016 may perform a first frequency scan using the first vehicular radio communication technology, e.g., DSRC, and a second frequency scan using the second vehicular radio communication technology, e.g., LTE V2V/V2X. Remote nodes 2012-2016 may therefore determine the channel resource usage information for the first and second vehicular radio communication technologies, such as which channels are being used, which time slots are being used, which transmission power is being used, and/or which spatial multiplexing layers are being used. For example, in the exemplary case of FIG. 20, remote nodes 2012-2016 may determine the channel resource usage information for vehicular communication devices 2002-2006 and network access nodes 2008-2010.

Remote nodes 2012-2016 may then report the channel resource usage information to coexistence engine 1812. As remote nodes 2012-2016 may perform dual-mode radio sensing to obtain channel resource usage information for both the first and second vehicular radio communication technologies, coexistence engine 1812 may therefore receive channel resource usage information for the first and second vehicular radio communication technologies in stage 2004. Coexistence engine 1812 may then aggregate the channel resource usage information for the first and second vehicular radio communication technologies in stage 1904 in the manner described above for RAN-supported implementations, and may therefore obtain aggregated channel resource usage information that characterizes the channel resource usage by communication devices using the first vehicular radio communication technology and by communication devices using the second vehicular radio communication technology. As the aggregated channel resource usage information characterizes the relative proportion of channel resource usage between the first and second vehicular radio communication technologies, the aggregated channel resource usage information may indicate how much channel resources coexistence engine 1812 should allocate to the first vehicular radio communication technology relative to the second vehicular radio communication technology.

Coexistence engine 1812 may then determine the channel resource allocations for the participating communication devices in stage 1906, and may transmit the channel resource allocations to the participating communication devices in stage 1908. As coexistence engine 1812 does not interface with the radio access network in RAN-independent implementations, coexistence engine 1812 may use remote nodes 2012-2016 to transmit the channel resource allocations to the participating communication devices. Accordingly, coexistence engine 1812 may transmit the channel resource allocations to remote nodes 2012-2016 in stage 1908, which may then wirelessly transmit the channel resource allocations to the participating communication devices, e.g., vehicular communication devices 2002-2008 and network access nodes 2008-2010. In some aspects, coexistence engine 1812 (or, alternatively, remote nodes 2012-2016) may include a device ID in a channel resource allocation that identifies which communication device or set of communication devices each the channel resource allocation is addressed to. Remote nodes 2012-2016 (or, alternatively, the remote node of remote nodes 2012-2016 that is closest to the destination communication device) may then broadcast the channel resource allocations (e.g., using both the first and second vehicular radio communication technologies or, for each channel resource allocation, using the vehicular radio communication which the destination communication device supports).

Vehicular communication devices 2002-2008 and network access nodes 2008-2010 may then receive the broadcasted channel resource allocations and identify their respective channel resource allocations by matching their device ID to the device IDs in the broadcasted channel resource allocations. Vehicular communication devices 2002-2008 and network access nodes 2008-2010 may then transmit and receive communication data with their respective vehicular radio communication technologies according to their respectively assigned channel resource allocations.

In various aspects using RAN-supported or RAN-independent implementations, vehicular communication devices may leave the coverage area of the radio access network or remote nodes. For example, as DSRC RSUs may generally only be placed in limited areas of high traffic, there may be sizable gaps in DSRC coverage where vehicular communication devices are outside of the radio range of DSRC RSUs. LTE V2V/V2X vehicular communication devices may experience similar scenarios where there are not any LTE V2V/V2X base stations nearby. While both DSRC and LTE V2V/V2X support out-of-coverage scenarios, coexistence engine 1812 may use a different mechanism to receive channel resource usage information and/or transmit channel resource allocations to out-of-coverage vehicular communication devices.

For example, in some aspects coexistence engine 1812 may receive channel resource allocations after the vehicular communication devices have re-entered coverage and/or by relaying. For instance, with reference to the example of FIG. 18, vehicular communication device 1804 may leave the coverage area of network access node 1810 and enter an area in which vehicular communication device 1804 is out of coverage. Coexistence engine 1812 may therefore not be able to reach vehicular communication device 1804 via the radio access network. Vehicular communication device 1804 may continue to perform radio sensing to obtain channel resource usage information, such as channel resource usage information for other vehicular communication devices proximate to vehicular communication device 1804. Once vehicular communication device 1804 re-enters radio coverage, vehicular communication device 1804 may transmit the obtained channel resource usage information (which may also be geo-tagged to indicate the location at which the channel resource usage information was obtained) to a network access node, which may then forward the channel resource usage information to coexistence engine 1812. In RAN-independent implementations, vehicular communication devices may similarly retain channel resource usage information when out of radio range from the remote nodes, and may transmit the channel resource usage information to a remote node once back in radio coverage.

Additionally or alternatively, vehicular communication devices may use relaying when out-of-coverage to transmit channel resource usage information to coexistence engine 1812. For example, if vehicular communication device 1804 is out-of-coverage, vehicular communication device 1806 is within range of network access node 1810, and vehicular communication device 1806 is within relaying range of vehicular communication device 1804, vehicular communication device 1804 may transmit the channel resource usage information to vehicular communication device 1806, such as with a device-to-device (D2D) link. Vehicular communication device 1806 may then relay the channel resource usage information to network access node 1810, which may send the channel resource usage information to coexistence engine 1812. Such relaying chains may be scalable to any number of vehicular communication devices, and may enable vehicular communication devices to send channel resource allocations to coexistence engine 1812 even when not in the coverage area of the radio access network. These relaying chains can use D2D relaying concepts or an extended range relaying approach, such as Narrowband IoT (NB-IoT).

When a vehicular communication device is out-of-coverage in either a RAN-supported or RAN-independent implementation, coexistence engine 1812 may also not be able to transmit a channel resource allocation to the vehicular communication device due to the absence of a radio access network or remote node link. If a relaying link is available via one or more other vehicular communication devices, coexistence engine 1812 may transmit the channel resource allocation to the destination vehicular communication device via a relaying link. This can include first transmitting the channel resource allocation to a network access node or remote node, which may then transmit the channel resource allocation to the first vehicular communication device in the relaying link.

If no relaying link is available, coexistence engine 1812 may not be able to immediately transmit the channel resource allocation to the vehicular communication device. Accordingly, the vehicular communication device may continue using the most recent channel resource allocation supplied by coexistence engine 1812 until the vehicular communication device re-enters coverage or a relaying link becomes available. In some aspects, coexistence engine 1812 may provide the channel resource allocation as a channel map, which specifies the channel resources allocated across a geographic area and different channel resources are allocated in different areas. As the vehicular communication device moves, the vehicular communication device may reference the channel map with its current geographic location and use the channel resources allocated for this area. Coexistence engine 1812 may periodically update the channel map, which the vehicular communication device may obtain and use once it returns to radio coverage.

In some aspects, vehicular communication devices may also be used for sensing purposes in addition or alternative to remote nodes. For example, vehicular communication device 2002 may perform sensing according to the vehicular radio communication technology supported by vehicular communication device 2002, for example, the first vehicular radio communication technology. Vehicular communication device 2002 may thus obtain the channel resource usage information for the first vehicular radio communication technology in its vicinity, and may then report the channel resource usage information to coexistence engine 1812. If out of coverage when the channel resource usage information is obtained, vehicular communication device 2002 may report the channel resource usage information to coexistence engine 1812 once back in coverage (e.g., via remote nodes or the radio access network).

Furthermore, in some aspects vehicular communication devices may also be used in addition or alternative to remote nodes for transmitting channel resource allocations. For example, if a vehicular terminal is a dual-mode vehicular communication device, coexistence engine 1812 may task the vehicular communication device with broadcasting channel resource allocations for both the first and second vehicular radio communication technologies. For instance, coexistence engine 1812 may transmit channel resource allocations for various other vehicular communication devices to the vehicular communication devices via a relay. Coexistence engine 1812 may originate the relay either via a remote node, from the radio access network of the same vehicular radio communication technology to which the channel resource allocations relate (e.g., DSRC relaying DSRC channel resource allocations and/or LTE relaying LTE channel resource allocations), or from the radio access network of the other vehicular radio communication technology (e.g., DSRC relaying LTE channel resource allocations and/or LTE relaying DSRC channel resource allocations). After receiving the channel resource allocations, the vehicular communication device may then broadcast the channel resource allocations on both the first and second vehicular radio communication technologies, e.g., both DSRC and LTE V2V/V2X. The other vehicular communication devices may receive the channel resource allocations on their supported vehicular radio communication technologies and may transmit and receive communications accordingly.

Figure 21:
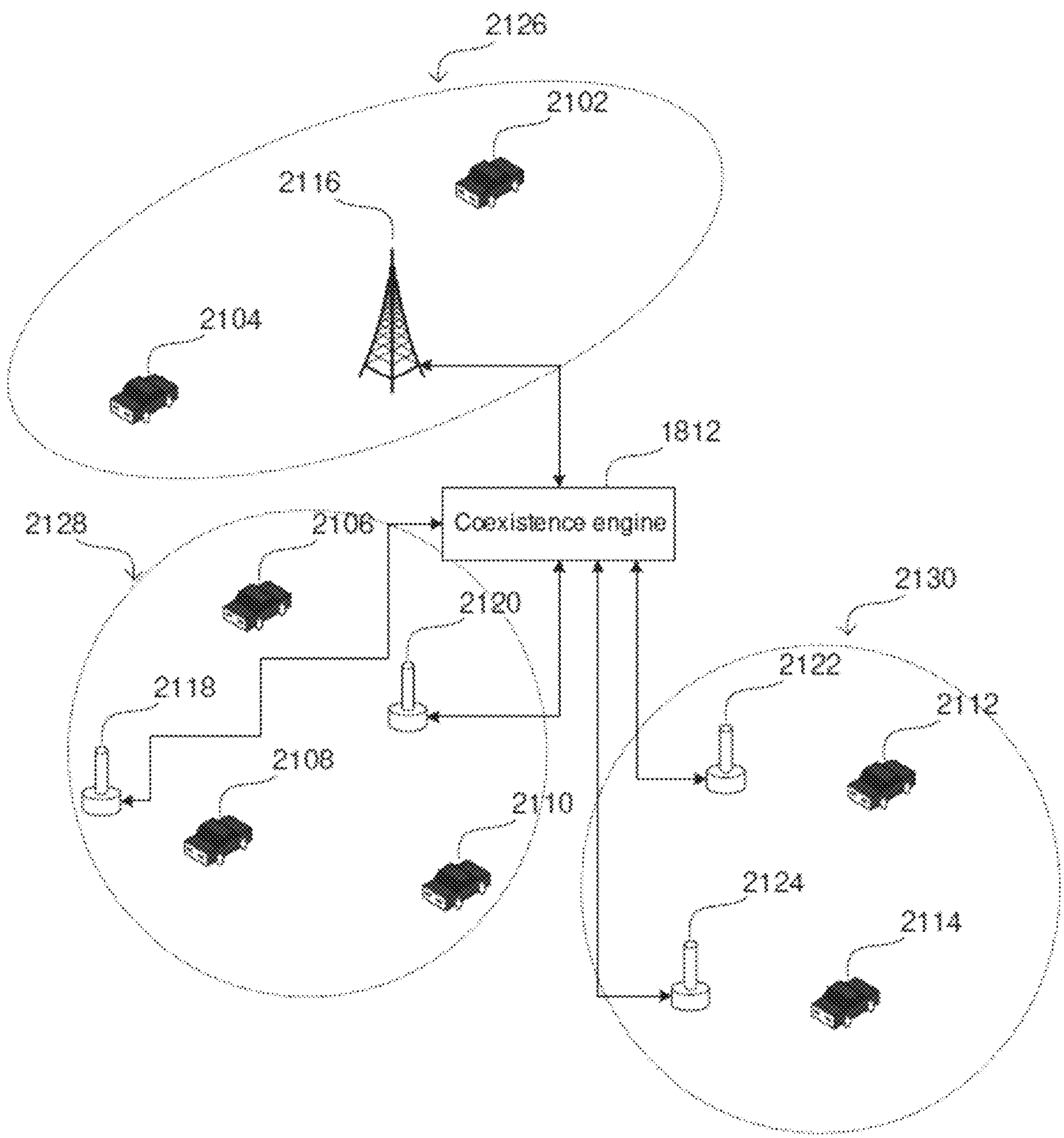
FIG. 21 shows an exemplary network architecture for hybrid RAN-supported/RAN-independent centralized spectrum allocation according to some aspects.

Aspects of centralized spectrum allocation may also use a hybrid implementation, where some geographic areas use RAN-supported implementations and other geographic areas use RAN-independent implementations. FIG. 21 shows an example of a hybrid RAN-supported/RAN-independent implementation. As shown in FIG. 21, coexistence engine 1812 may receive channel resource usage information from and provide channel resource allocations to communication devices in area 2126 through network access node 2116, i.e., using a RAN-supported implementation. Coexistence engine 1812 may also receive channel resource usage information from and provide channel resource allocations to communication devices in areas 2128 and 2130 using remote nodes 2118-2120 and 2122-2124, respectively, i.e., using a RAN-independent implementation. Accordingly, in various aspects coexistence engine 1812 may serve different geographic areas using RAN-supported and RAN-independent implementations. Vehicular communication devices 2102-2114 that leave the coverage areas of the radio access network or remote nodes may report channel resource usage information via relaying or waiting until back in coverage. Coexistence engine 1812 may transmit channel resource allocations to out-of-coverage vehicular communication devices via relaying, or out-of-coverage vehicular communication devices may use the most recent channel resource allocation or channel map.

Figure 22:
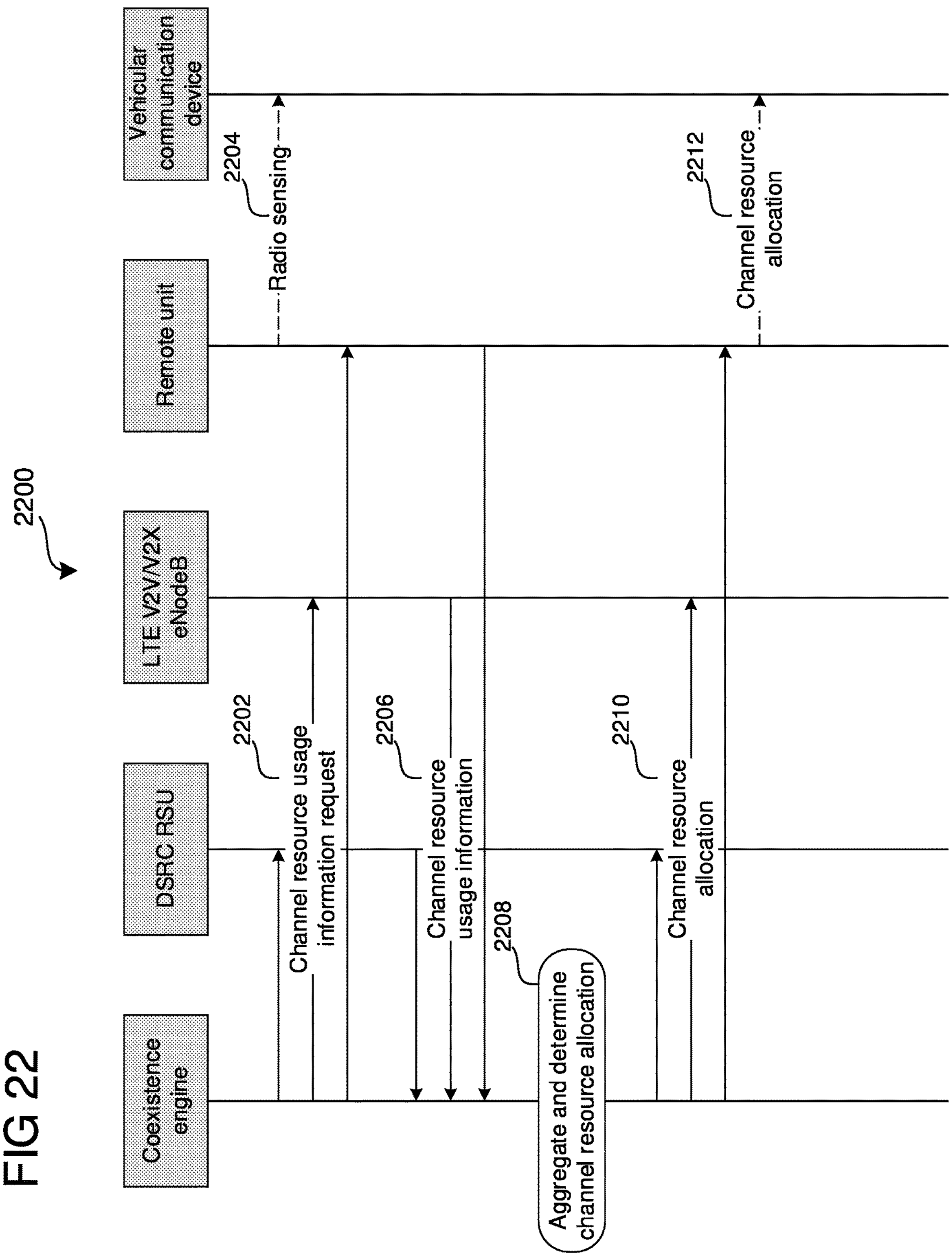
FIG. 22 shows an exemplary message sequence chart describing channel resource allocations using centralized spectrum allocation according to some aspects.

FIG. 22 shows exemplary message sequence chart 2200 illustrating centralized spectrum allocation for vehicular radio communication technologies according to some aspects. As shown in FIG. 22, coexistence engine 1812 may transmit a request for channel resource information in stage 2202 to various reporting communication devices, which can include network access nodes such as DSRC RSUs and LTE V2V/V2X base stations as well as remote nodes. The network access nodes, in particular if configured to perform deterministic scheduling, may locally retain channel resource usage information according to the uplink and downlink scheduling used by the network access nodes. The remote nodes may also perform radio sensing at stage 2204 to obtain channel resource usage information.

The various reporting communication devices may then respond to the request for channel resource usage information in stage 2206 with the channel resource usage information. Coexistence engine 1812 may then aggregate the channel resource usage information and determine the channel resource allocations in stage 2208. Coexistence engine 1812 may then transmit the channel resource allocations to the participating communication devices in stage 2210. This can include transmitting a channel resource allocation for a vehicular communication device to a remote node (or a network access node), which can then transmit the channel resource allocation to the vehicular communication device in stage 2212.

Coexistence engine 1812 may therefore have a variety of mechanisms to determine channel resource allocations and to provide the channel resource allocations to participating communication devices. Coexistence engine 1812 may dynamically adapt and refine the channel resource allocations to balance the channel resources allocated to different vehicular radio communication technologies. For example, in some cases channel resource usage could fluctuate randomly without a deterministic cause, where at certain times the first vehicular radio communication technology would be using more channel resources and at other times the second vehicular radio communication technology would be using more channel resources. In other cases, the fluctuations in relative channel resource usage could have a deterministic cause. For example, during the day there could be more private vehicles operating, which may generally have low-cost vehicular radio communication equipment such as DSRC, while at night there could be more professional trucking vehicles operating, which may use more advanced and higher-cost equipment such as LTE V2V/V2X.

Coexistence engine 1812 may react to both random and deterministic fluctuations in channel resource usage, and adapt the relative proportion of channel resources allocated to the different vehicular radio communication technologies accordingly. Similarly, as previously indicated the channel resource usage for the different vehicular radio communication technologies may also vary over geographic area, where the first vehicular radio communication technology may use more channel resources in a first geographic area and the second vehicular radio communication technology may use more channel resources in a second geographic area. Coexistence engine 1812 may therefore allocate more channel resources to the first vehicular radio communication technology in the first area, and to the second vehicular radio communication technology in the second area. This can then change over time, where the second vehicular radio communication technology may eventually use more channel resources in the first geographic area and coexistence engine 1812 may therefore allocate more channel resources to the first vehicular radio communication technology in the second area.

In some aspects, coexistence engine 1812 may also adapt to more long-term fluctuations in relative channel resource usage between different vehicular radio communication technologies. For example, DSRC may see widespread use during early deployment stages compared to LTE V2V/V2X, which may not be fully deployed and operation until months or years after DSRC. Accordingly, channel resource usage may initially be heavily slanted towards DSRC relative to LTE V2V/V2X. However, as LTE V2V/V2X is expected to better integrate into the 5G network architecture, LTE V2V/V2X may gradually catch up and eventually overtake DSRC in terms of channel resource usage.

This steady change may take place over the course of months or years as LTE V2V/V2X is becomes more widely used. As coexistence engine 1812 may continue to determine channel resource allocations based on the observed channel resource usage as indicated by channel resource usage information, coexistence engine 1812 may as a result adapt the channel resource allocations to gradually favor LTE V2V/V2X over DSRC.

Figure 23:
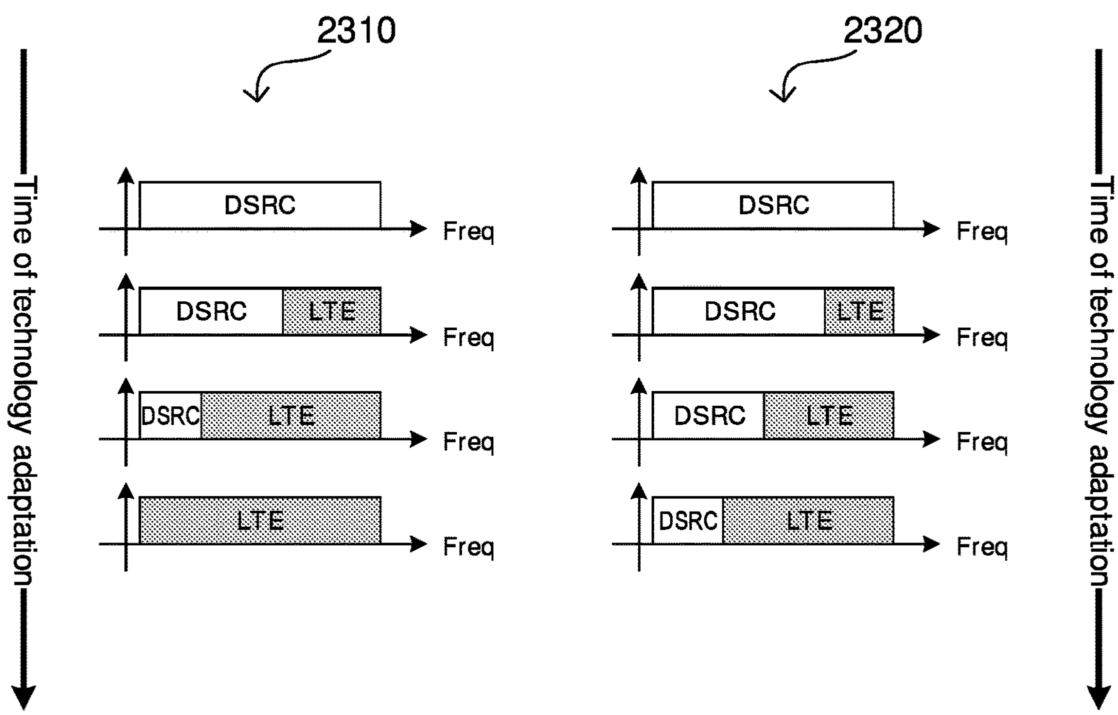
FIG. 23 shows examples of channel resource allocation between multiple radio communication technologies over time according to some aspects.

FIG. 23 shows two examples of long-term transitions in resource usage allocations between a first vehicular radio communication technology and second vehicular radio communication technology, such as for a transition from DSRC to LTE V2V/V2X. Both examples 2310 and 2320 assume a gradual and long-term (e.g., in the order of months or years) transition between widespread DSRC use to widespread LTE V2V/V2X use, and depict the relative amounts of spectrum allocated to DSRC and LTE V2V/V2X by coexistence engine 1812. As previously indicated, coexistence engine 1812 may detect this transition via evaluation of channel resource usage information reported by various reporting communication devices, which may steadily reflect an increasing level of channel resource usage by LTE V2V/V2X relative to DSRC over time. As coexistence engine 1812 determines the resource allocations based on the relative channel resource usage of DSRC and LTE V2V/V2X, coexistence engine 1812 may gradually allocate more channel resources to LTE V2V/V2X relative to DSRC over time.

As shown in FIG. 23, the transition in example 2310 is steeper than the transition of example 2320. Accordingly, if LTE V2V/V2X completely replaces DSRC as in the case of example 2310, coexistence engine 1812 may gradually allocate more channel resources to LTE V2V/V2X relative to DSRC over time until LTE V2V/V2X is allocated all of the channel resources for available vehicular radio communication technologies. In the case of example 2320, LTE V2V/V2X may not completely overtake DSRC in terms of channel resource usage (or may only overtake DSRC over a substantially long period of time). Accordingly, coexistence engine 1812 may slowly allocate more channel resources to LTE V2V/V2X relative to DSRC.

Coexistence engine 1812 may therefore react to overall and long-term changes in channel resource usage by different vehicular radio communication technologies by allocating more channel resource levels to some vehicular radio communication technologies relative to others. While the gradual trend may skew towards certain vehicular radio communication technologies that are using more channel resources, coexistence engine 1812 may still perform channel resource allocations dynamically over short-term bases. For example, even if coexistence engine 1812 is gradually allocating more channel resources to LTE V2V/V2X, if coexistence engine 1812 identifies that DSRC is using more channel resources than LTE V2V/V2X at a given point in time, coexistence engine 1812 may determine channel resource allocations that allocate more channel resources to DSRC. The gradual trend shown in FIG. 23 thus reflects a long-term trend, while the instantaneous channel resource allocations may dynamically fluctuate on a short-term basis. Likewise, if DSRC is using more channel resources than LTE V2V/V2X in certain areas, coexistence engine 1812 may determine channel resource allocations that allocate more channel resources to DSRC in these areas (while favoring LTE V2V/V2X in other areas where LTE V2V/V2X channel resource usage is higher).

In some aspects, coexistence engine 1812 may perform channel resource allocation dependent on reported channel resource usage information, while in other aspects coexistence engine 1812 may receive external configuration information that instructs coexistence engine 1812 to favor certain vehicular radio communication technologies over others. For example, if a network operator determines that a transition from a first vehicular radio communication technology to another vehicular radio communication technology should be accelerated, the network operator (e.g., a human actor) can input external configuration information into coexistence engine 1812 that instructs coexistence engine 1812 to allocate more channel resources to the first vehicular radio communication technology (e.g., more channel resources than would be justified if based solely on the reported channel resource usage information). As more channel resources will be allocated for the first vehicular radio communication technology, this can lead higher numbers of users toward the first vehicular radio communication technology and thus accelerate the transition. In other cases, some network operators may wish to delay the transition from the first vehicular radio communication technology to the second vehicular radio communication technology, and may input external configuration information into coexistence engine 1812 that instructs coexistence engine 1812 to allocate more channel resources to the second vehicular radio communication technology than would be justified if based solely on the reported channel resource usage information.

Coexistence engine 1812 is applicable for use in dynamic scheduling on short-term bases, and a long-term, gradual trend in channel resource usage by different vehicular radio communication technologies is only one exemplary long-term use.

Figure 24:
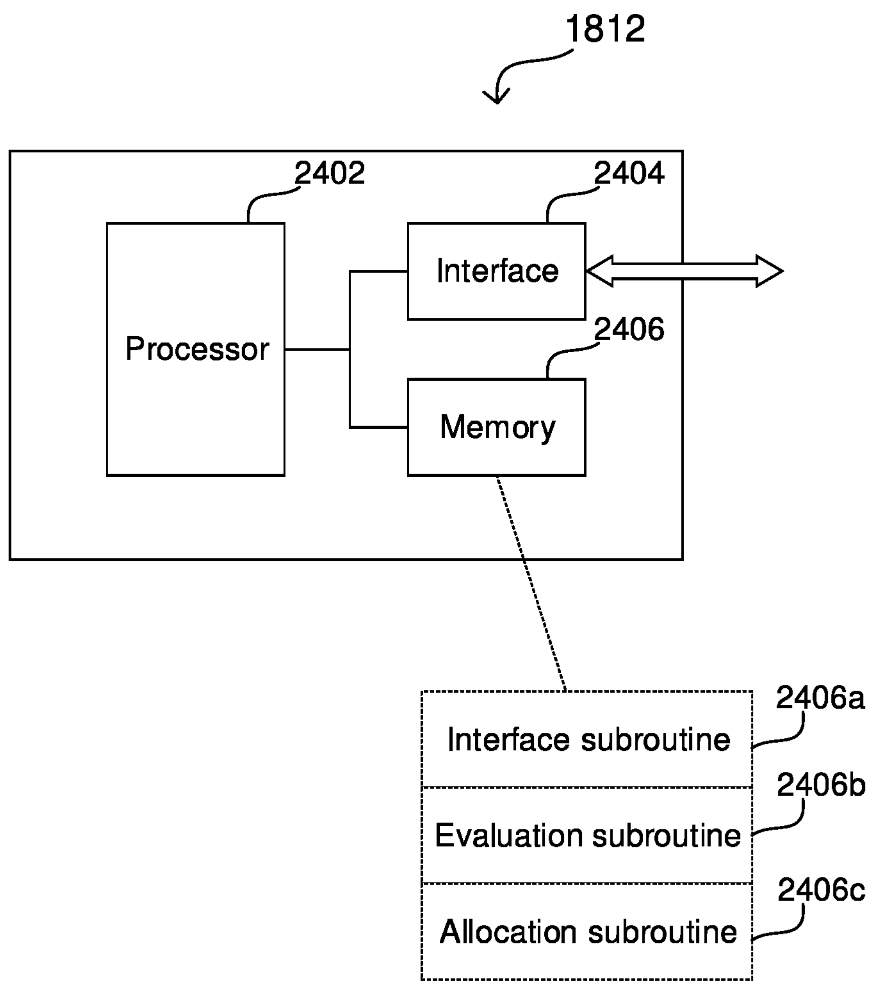
FIG. 24 shows an exemplary internal configuration of a coexistence engine for centralized spectrum allocation according to some aspects.

FIG. 24 shows an exemplary internal configuration of coexistence engine 1812 according to some aspects. As shown in FIG. 24, coexistence engine 1812 may include processor 2402, interface circuitry 2404, and memory 2406. Processor 2402 may be a single processor or multiple processors, and may be configured to retrieve (e.g., from a local memory) and execute program code to perform the transmission and reception, channel resource usage information evaluation, and channel resource allocation determination as described herein. The program code may be updatable, such as wirelessly or by a manual install. Memory 2406 may be a non-transitory computer readable medium storing instructions for interface subroutine 2406*a*, evaluation subroutine 2406*b*, and allocation subroutine 2406*c*.

Interface subroutine 2406*a*, evaluation subroutine 2406*b*, and allocation subroutine 2406*c* may each be an instruction set including executable instructions that, when retrieved and executed by processor 2402, perform the functionality of processor 2402 as described herein. In particular, processor 2402 may execute interface subroutine 2406*a* to transmit and receive communication data via interface circuitry 2404, which may be hardware circuitry that transmits and receives data over one or more wired connections between coexistence engine 1812 and various remote nodes, network access nodes, and/or core network components. Processor 2402 can therefore receive channel resource usage information and transmit channel resource allocations via interface circuitry 2404 by executing of interface subroutine 2406*a*.

Processor 2402 may execute evaluation subroutine 2406*b* to process and aggregate channel resource usage information received via interface circuitry 2404. Accordingly, evaluation subroutine 2406*b* may include instructions to identify channel resource usage information such as one or more of spectrum used, spectrum used per unit time, spectrum used per unit time and spatial multiplexing layer, spectrum used per unit time/spatial multiplexing layer/code/polarization/propagation channel orthogonality, a total airtime of transmissions, a total number of active users, a total transmit power of transmissions, a total amount of data transmitted, or a transmission efficiency provided by reporting communication devices, which can include processing received channel resource usage information to identify the type of channel resource usage information. Evaluation subroutine 2406*b* may also include instructions to aggregate channel resource usage information for different vehicular radio communication technologies, such as identifying the channel resource usage information for the first vehicular radio communication technology (e.g., that detail channel resource usage information of communication devices using the first vehicular radio communication technology) and identifying the channel resource usage information for the second vehicular radio communication technology (e.g., that detail channel resource usage information of communication devices using the second vehicular radio communication technology). Evaluation subroutine 2406*b* may include instructions that aggregate channel resource usage information by summing channel resource usage information from different devices, such as summing the spectrum used by a first communication device, the spectrum used by a second communication device, the spectrum used by a third communication device, and so forth with any type of channel resource usage information. This can produce aggregated channel resource usage information. Evaluation subroutine 2406*b* may also include instructions that aggregate different types of channel resource usage information, which can include using a weighting scheme where different types of channel resource usage information are weighted differently to obtain the aggregated channel resource usage information for each vehicular radio communication technology. Evaluation subroutine 2406*b* may therefore include executable instructions defining any evaluation functionality of coexistence engine 1812 as algorithmically described above in prose.

Allocation subroutine 2406*c* may include instructions to determine channel resource allocations based on the channel resource usage information. This can include instructions to allocate different relative amounts of channel resources to the first vehicular radio communication technology and the second vehicular radio communication technology, such as based on whether the first vehicular radio communication technology and the second vehicular radio communication technology uses more channel resources (which may be indicated by aggregated channel resource usage information obtained via execution of evaluation subroutine 2406*b*). Allocation subroutine 2406*c* may include instructions to generate channel resource allocations for participating communication devices that assign the participating communication devices different channel resources to use. The relative amount of channel resources assigned to the first vehicular radio communication technology (e.g., the total amount of channel resources assigned to participating communication devices using the first vehicular radio communication technology) and the second vehicular radio communication technology may thus depend on the aggregated channel resource usage information as obtained by evaluation subroutine 2406*b*. Allocations subroutine 2406*c* may therefore include executable instructions defining any channel resource allocation functionality of coexistence engine 1812 as algorithmically described above in prose.

Figure 25:
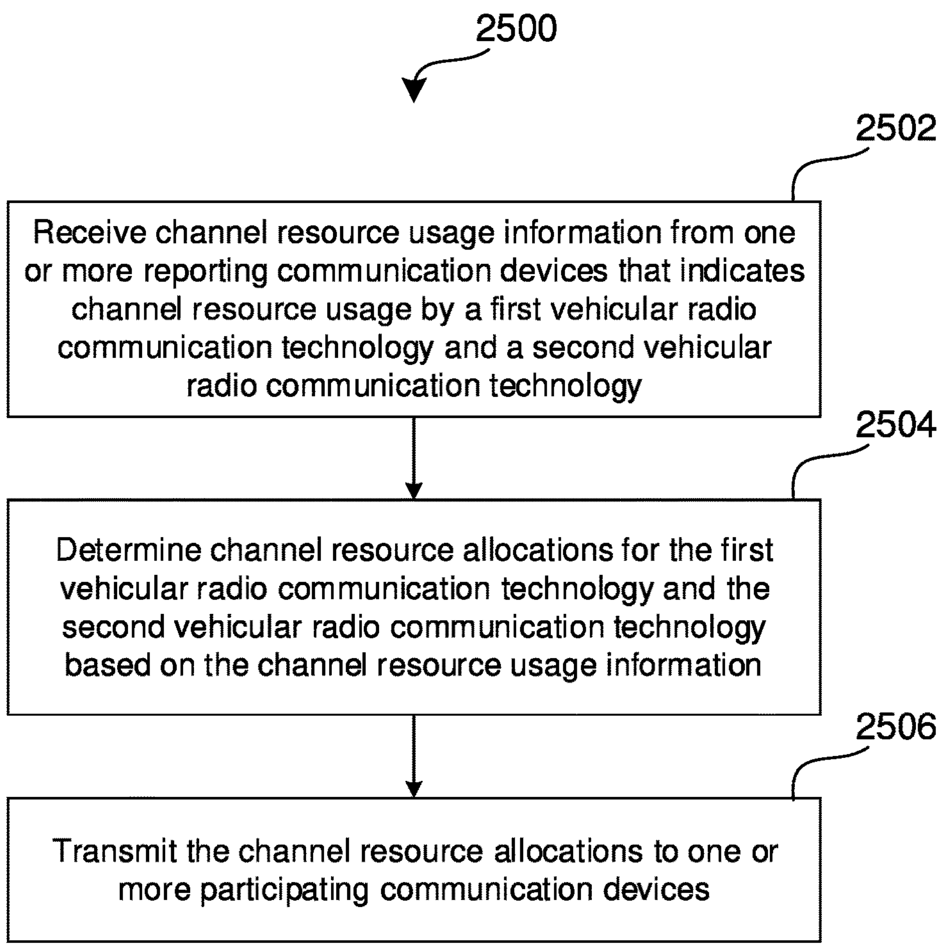
FIG. 25 shows a first exemplary method of performing wireless communications with centralized spectrum allocation according to some aspects.

FIG. 25 shows method 2500 of allocating channel resources to different vehicular radio communication technologies. As shown in FIG. 25, method 2500 includes receiving channel resource usage information from one or more reporting communication devices that indicates channel resource usage by a first vehicular radio communication technology and a second vehicular radio communication technology (2502), determining channel resource allocations for the first vehicular radio communication technology and the second vehicular radio communication technology based on the channel resource usage information (2504), and transmitting the channel resource allocations to one or more participating communication devices (2506).

Figure 26:
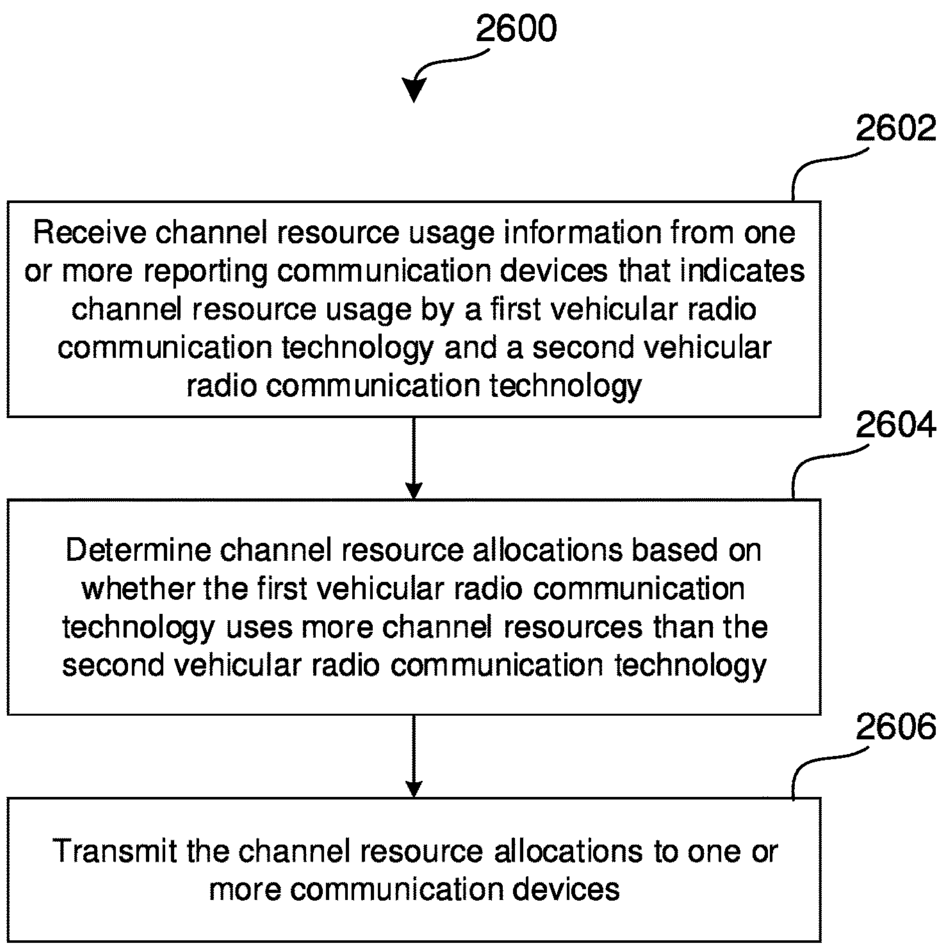
FIG. 26 shows a second exemplary method of performing wireless communications with centralized spectrum allocation according to some aspects.

FIG. 26 shows method 2600 of allocating channel resources to different vehicular radio communication technologies. As shown in FIG. 26, method 2600 includes receiving channel resource usage information from one or more reporting communication devices that indicates channel resource usage by a first vehicular radio communication technology and a second vehicular radio communication technology (2602), determining channel resource allocations based on whether the first vehicular radio communication technology uses more channel resources than the second vehicular radio communication technology (2604), and transmitting the channel resource allocations to one or more communication devices (2606).

In some aspects, centralized spectrum allocation can be integrated with distributed coexistence management as described above. For example, coexistence engine 1812 may determine channel resource allocations for a cluster of vehicular communication devices, which may be based on channel resource usage information provided by the cluster (e.g., via a network access node or remote node) and/or by vehicular communication devices or network access nodes that are using a vehicular radio communication technology supported by the cluster. Coexistence engine 1812 may then transmit the channel resource allocation to the cluster head, which may then assign channel resources for the cluster members to use based on the channel resource allocation.

Decision-Making Flow Chart

As network architectures become increasingly more complex, resources for managing the inter-relation of these technologies in an efficient manner may become more desirable. Various aspects described herein outline inefficiencies arising from several use cases. Referring back to FIG. 9, for instance, at least some of vehicular communication devices 902-908 and 912-918 may use different vehicular radio communication technologies in an uncoordinated manner. As a result, interference between different vehicular radio communication technologies has the potential to lead to collisions, which can severely degrade transmission and reception performance. Likewise, vehicular communication devices attempting to access in some contention-based channel access schemes, such as DSRC, may see a sizable drop in efficiency if the channel capacity surpasses a given threshold (e.g., 60 percent).

In contrast to an uncoordinated case where vehicular communication devices access channel resources independently and without cooperation between different vehicular radio communication technologies, the use of a cluster has been presented herein to manage access to reduce co-channel interference and enable more efficient usage of the shared channel resources. A resource allocation decision tree is provided to further optimize the assignment of channel resources. More specifically, the resource allocation decision tree provides a mechanism for the assignment of channel resources to at least one of a plurality of terminal devices for a given radio communication network (e.g., V2X, V2V, etc.). Through this interaction, interference may be reduced and resources may be more efficiently utilized over other approaches.

The resource allocation decision tree sets forth a network optimization framework. In some aspects, this framework may define a set of rules for the selection and allocation of radio communication technologies for a particular radio communication network. Following the principles outlined herein, resource selection and allocation may be tailored to a radio communication network based on radio communication technology selection criteria associated therewith.

Radio communication technology selection criteria may include a variety of types of information. For instance, radio communication technology selection criteria may include parameters based on one or more scenarios, conditions, actions, and/or behaviors of a radio communication network. These parameters may include Key Performance Indicators (KPI), such as those for Long Term Evolution (LTE) Radio Access Networks (RAN).

Depending upon the implementation, KPI may be grouped into several categories. KPI categories, for instance, may include accessibility, retainability, mobility, utilization, traffic, latency, integrity, security, efficiency, etc. Regardless of their specific classification, exemplary KPI may include packet loss information, throughput information, latency information, and/or one or more other types of information relating to the performance of a particular radio communication network or network device.

Radio communication technology selection criteria may include quality of service (QoS)-based parameters, such as those for maintaining a minimum QoS level to support a vertical application. QoS Class Identifiers (QCI), by way of example, may indicate QoS performance characteristics of each packet and control the packet forwarding treatment (e.g., scheduling weights, admission thresholds, queue management thresholds, link layer protocol configuration, etc.). For instance, a QCI may indicate whether or not a guaranteed bit rate (GBR) is set by the network. In this manner, a guaranteed bandwidth for traffic, such as uplink traffic (UL) or downlink traffic (DL), may be set. QCI may also be associated with a priority level, packet budget delay, packet error loss rate, and/or service type.

Radio communication technology selection criteria may further include content-based parameters. In some aspects, content-based parameters may indicate the degree of importance of the transmitted data. For instance, each information element or group of information elements may have criticality information applied to it. In this regard, a repeatable information element may have one common criticality information associated therewith or its own criticality information. Criticality information may also be applied to non-repeatable information elements. If an information element or group of information elements are not understood or missing, a receiving node may take different actions depending upon the value of the criticality information (e.g., reject, ignore and notify sender, or ignore).

Radio communication technology selection criteria may further include cluster-based parameters. In some aspects, cluster-based parameters may include the number of vehicular communication devices within a cluster. Cluster-based parameters may be derived or inferred from cluster state data. Cluster state data may indicate which vehicular communication devices are members of the cluster, any relay links therebetween, geographic position, relative position with respect to one another, and/or which member(s) is or has been designated a cluster head. It may further specify which radio access technologies are supported by each vehicular communication device and/or collectively supported.

Radio communication technology selection criteria may further include device-based parameters. In some aspects, device-based parameters may include a user equipment (UE) capability information. UE capability information may include a UE-Category, Feature Group Indicators, Carrier Aggregation Band Combination, LTE-related fields, WCDMA related fields, TDSCMA related fields, and/or GSM related fields. The UE-Category, for instance, may detail a combined UL and DL radio throughput for a UE.

Radio communication technology selection criteria may further include predictive coverage-based parameters. In some aspects, predictive coverage-based parameters may include any of above-described radio communication technology selection criteria associated with location information. Predictive coverage-based parameters may thus describe the expected evolution of the respective radio parameters for one or more vehicular communication devices based on one or more locations, points of interest, directions of movement, velocity indications, inferred routes, explicitly defined routes, route adaptations, weather indications, traffic indications, and/or utility information, etc. Predictive coverage-based parameters may, for instance, be provided from one or more nodes (e.g., vehicular communication devices).

In some aspects, a resource allocation decision tree may be implemented at one or more entities of the radio communication network. Resource allocation decision trees may be implemented in one or more of the vehicular communication devices of this disclosure. For example, one or more the vehicular communication devices 902-908 and 912-918 of FIG. 9 may implement the resource allocation decision tree. Additionally or alternatively, the resource allocation decision tree may be implemented outside of the one or more vehicular communication devices. For instance, the resource allocation decision tree may be implemented outside of the one or more vehicular communication devices 902-908 and 912-918.

As previously described in connection with FIG. 9, one or more of vehicular communication devices 902-908 and 912-918 may be configured in the manner of vehicular communication device 500 as shown and described for FIGS. 5 and 6. Thus, vehicular communication device 500 may be configured to operate according to DSRC and/or LTE V2V/V2X. For instance, RF transceiver 602, digital signal processor 604, and controller 606 may be configured to transmit and receive communications according to DSRC and/or LTE V2V/V2X.

In some aspects, the resource allocation decision tree may be implemented within a particular type of vehicular communication device. For instance, resource allocation decision tree may be implemented at one or more cluster heads (e.g., cluster head 904). According to one example with reference to FIG. 10, resource allocator 1008 of cluster head 904 may execute the resource allocation decision tree. Although the foregoing details one or more aspects in which the resource allocation decision tree is implemented at a particular type of vehicular communication device, the present disclosure is not specifically limited thereto.

The resource allocation decision tree may be implemented in a particular type of entity outside of the one or more vehicular communication devices. Resource allocation decision tree may, for example, be implemented at one or more control servers (e.g., control server 1612) and/or one or more coexistence engines (e.g., coexistence engine 1812). Although the foregoing details one or more aspects in which the resource allocation decision tree is implemented at a particular type of entity outside of the one or more vehicular communication devices, the present disclosure is not specifically limited thereto.

Referring to FIG. 16, resource allocation decision tree may be implemented at control server 1612. As previously mentioned, control server 1612 may be any of a core network server (e.g., located in a core network behind network access node 1610), a network access node (e.g., an internal component of network access node 1610), or an edge server (e.g., an edge computing device placed between network access node 1610 and a core network). In some aspects, control server 1612 may be a server-type component, such as a computing element including one or more processors configured to retrieve (e.g., from a local memory) and execute program code that defines the control and algorithmic functions of control server 1612 as described herein in the form of executable instructions. The program code may be updatable, such as wirelessly or by a manual install. According to one example, the one or more processors of control server 1612 may execute the resource allocation decision tree. For instance, executable program code in control server 1612 may include the resource allocation decision tree.

In some aspects, the resource allocation decision tree may be implemented within coexistence engine 1812 of FIG. 18. As noted with respect to FIG. 24, coexistence engine 1812 may include processor 2402, interface circuitry 2404, and memory 2406. Processor 2402 may be a single processor or multiple processors, and may be configured to retrieve (e.g., from a local memory) and execute program code to perform the transmission and reception, channel resource usage information evaluation, and channel resource allocation determination as described herein. Memory 2406 may be a non-transitory computer readable medium storing instructions for interface subroutine 2406*a*, evaluation subroutine 2406*b*, and allocation subroutine 2406*c*.

Interface subroutine 2406*a*, evaluation subroutine 2406*b*, and allocation subroutine 2406*c* may each be an instruction set including executable instructions that, when retrieved and executed by processor 2402, perform the functionality of processor 2402 as described herein. In particular, processor 2402 may execute interface subroutine 2406*a* to transmit and receive communication data via interface circuitry 2404, which may be hardware circuitry that transmits and receives data over one or more wired connections between coexistence engine 1812 and various remote nodes, network access nodes, and/or core network components. Processor 2402 can therefore receive channel resource usage information and transmit channel resource allocations via interface circuitry 2404 by executing of interface subroutine 2406*a*. According to one example, the processor of coexistence engine 1812 may execute the resource allocation decision tree. Referring to FIG. 24, for instance, allocation subroutine 2406*c* may include the resource allocation decision tree.

Any device or entity storing and/or implementing the resource allocation decision tree in whole or in part may be referred to as a deciding entity. By way of illustrative example, a deciding entity may be a roadside unit (RSU) connected via a LTE link, a device located on the cloud (e.g., backbone network), and/or a communication device (e.g., clustered vehicle) in the V2X or V2V environment, etc. In some aspects, one or more deciding entities may be configured to communicate with one or more vehicular communication devices for radio communication technology selection criteria. For instance, one or more deciding entities may transmit a request for radio communication technology selection criteria to one or more vehicular communication devices. The one or more deciding entities may, for example, poll one or more vehicular communication devices for radio technology selection criteria. For instance, one or more deciding entities may poll one or more vehicular communication devices for a use-based parameter (e.g., utility information). Additionally or alternatively, one or more vehicular communication devices may be configured to report information (e.g., periodically) to the one or more deciding entities.

While any vehicular communication device may be polled, some vehicular communication devices may be more capable than others to respond. For instance, one or more vehicular communication devices may be more capable to respond with respect to certain types of radio communication technology selection criteria. In some aspects, an ordered (e.g., prioritized) list of one or more vehicular communication devices capable of responding to a poll may be determined based on received radio communication technology selection criteria and stored by the one or more deciding entities and/or one or more of vehicular communication devices.

Communications for radio communication technology selection criteria may be addressed to one or more entities of a radio communication network. In some aspects, communications for radio communication technology selection criteria may be addressed to one or more vehicular communication devices. For instance, a request for radio communication technology selection criteria may be addressed to one or more vehicular communication devices (e.g., cluster head 904) of a cluster (e.g., cluster 900). Additionally or alternatively, communications for radio communication technology selection criteria may be addressed to one or more entities outside of the one or more vehicular communication devices. For example, a request for radio communication resources may be addressed to one or more control servers (e.g., network access node 1808) and/or one or more coexistence engines (e.g., coexistence engine 1812).

Although communications for radio communication technology selection criteria are, in some aspects, described as requests for radio communication technology selection criteria, the descriptions of the communications for radio communication technology selection criteria are also applicable to transmissions of radio communication technology selection criteria. For instance, descriptions of the communications for radio communication technology selection criteria may, in some aspects, relate to a response addressed to one or more deciding entities comprising radio communication technology selection criteria Communications for radio communication technology selection criteria may be sent based on one or more conditions. In some aspects, communications for radio communication technology selection criteria may occur at one or more times. These times may refer to point(s) and/or period (s) during which communications for radio communication technology selection criteria may occur. In some aspects, communications for radio communication technology selection criteria may be based on a predefined (e.g., scheduled, negotiated, periodic, etc.) condition. A deciding entity and/or a vehicular communication device may, for instance, include a timing controller as part of a digital signal processor, controller, and/or application processor. The timing controller may be configured to compare a value (e.g., clock) of the timing controller with a variable (e.g., scheduled timing, negotiated timing, periodic timing, etc.) from a memory (e.g., local memory) and determine whether a predefined condition is met based on the comparison. Additionally or alternatively, the timing of communications for radio communications for radio communication technology selection criteria may be determined implicitly. For instance, the timing of communications for radio communications for radio communication technology selection criteria may be based on one or more events.

An event may include one or more of the formation of a cluster (e.g., cluster 900), the formation of a neighboring cluster (e.g., cluster 910), location of a cluster, a change of location of a cluster, the relative location of one or more vehicular communication devices within a cluster, a geographic location of one or more vehicular communication devices within a cluster, one or more vehicular communication devices leaving the cluster, one or more vehicular communication devices leaving a neighboring cluster, one or more vehicular communication devices joining the cluster, one or more vehicular communication devices joining a neighboring cluster, a promotion of a vehicular communication device to a cluster head, proximity to a point of interest, proximity to a neighboring cluster, proximity to a deciding entity, dissolution of a cluster, dissolution of a neighboring cluster, weather indications, traffic indications, a change in a processing capability of a vehicular communication device, battery strength indication of a vehicular communication device, creation of the resource allocation decision tree, an update to the resource allocation decision tree, and/or expiry of predetermined duration, etc.

Regardless of form, a communication for radio communication technology selection criteria may indicate one or more parameters, parameter-types, and/or collection of parameter-types. In some aspects, communications for radio communication technology selection criteria may explicitly indicate one or more parameters, parameter-types, and/or collection of parameter-types. Additionally or alternatively, communications for radio communication technology selection criteria may implicitly indicate one or more parameters, parameter-types, and/or collection of parameter-types. Parameters may include one or more KPI-based parameters, QoS-based parameters, use-based parameters, cluster-based parameters, device-based parameters, and/or predictive-coverage parameters.

In some aspects, a parameter, parameter-type, and/or collection of parameter-types may be associated with one or more vehicular communication devices. For instance, a parameter, parameter-type, and/or collection of parameter-type may be associated with a particular vehicular communication device (e.g., cluster head 904). Additionally or alternatively, a parameter, parameter-type, and/or collection of parameter-type may be associated with a plurality of vehicular communication devices (e.g., cluster 900).

A parameter, parameter-type, and/or collection of parameter-types may be associated with one or more vehicular communication devices in a variety of manners. One or more vehicular communication devices may store the parameter, parameter-type, and/or collection of parameter-types in a respective memory.

In some aspects, the parameter, parameter-type, and/or collection of parameter-types may be associated with a particular vehicular communication device. For instance, a vehicular communication device may utilize one or more components therein (e.g., digital signal processor 208) to perform a measurement of one or more parameters, parameter-types, and/or collection of parameter-types. For instance, a vehicular communication device may be configured to measure the signal-to-noise ratio (SNR) of a receive link and estimate the maximum link rate the vehicular communication device can support via the link. In some aspects, one or more vehicular communication devices may estimate the latency of one or more links (e.g., roundtrip delay for a packet) between the one or more vehicular communication devices and the one or more deciding entities. Other measurements may include the estimation of the power consumption of a "link" itself. By performing the measurement, a parameter, parameter-type, and/or collection of parameter types may be associated with the vehicular communication device.

Additionally or alternatively, the parameter, parameter-type, and/or collection of parameter-types may be associated with a plurality of vehicular communication devices. For example, a plurality of vehicular communication device may utilize one or more respective components (e.g., digital signal processor 208) to perform a measurement of one or more parameters, parameter-types, and/or collection of parameter-types. One or more vehicular communication devices may, for instance, be configured to report one or more measured parameters, parameter-types, and/or collection of parameter-types. For example, one or more vehicular communication devices may be able to associate one or more parameters, parameter-types, and/or collection of parameter-types with the measured parameters, parameter-types, and/or collection of parameter-types in a report to one or more deciding entities. For instance, a vehicular communication device may report the estimated maximum link rate and corresponding modulation and coding scheme (MCS) to the one or more deciding entities.

One or more deciding entities may store radio communication technology selection criteria upon receipt. In some aspects, one or more parameters, parameter-types, and/or collection of parameter-types of the radio communication technology selection criteria may be stored in a respective memory of the one or more vehicular communication devices.

In some aspects, one or more deciding entities may analyze the received radio communication technology selection criteria upon receipt. For instance, one or more deciding entities may make a determination from the received radio communication technology selection criteria. For instance, one or more deciding entities may be configured to determine the relative degree (e.g., low or high) latency required for the one or more vehicular communication devices, which sent the radio communication technology selection criteria. If it is determined that low latency is required from the radio communication technology selection criteria, then one or more radio communication technology resource may be incremented, weighted, and/or selected. If it is determined that high latency is required from the radio communication technology selection criteria, then one or more radio communication technology resource may be incremented, weighted, and/or selected.

Other determinations from the received radio communication technology selection criteria are possible. For instance, one or more deciding entities may be configured to determine the required data class (e.g., Quality Control Indicator (QCI) or another type of Quality of Service-related parameter) for the one or more vehicular communication devices, which sent the radio communication technology selection criteria. Similarly, one or more deciding entities may be configured to determine the number of vehicular communication devices in the cluster. Likewise, resources of the plurality of vehicular communication devices may be determined from the radio communication technology selection criteria. Furthermore, the expected evolution of parameters, parameter-types, and/or collection of parameter-types (e.g., future SNR or the like) may be determined from the of the radio communication technology selection criteria.

One or more parameters, parameter-types, and/or collection of parameter-types of the radio communication technology selection criteria may in some instances comprise a combination (e.g., average, mean, median, etc.) of one or more measurements. For example, a plurality of vehicular communication devices may report a signal-to-noise ratio measurement to a vehicular communication device (e.g., cluster head) of the plurality of the vehicular communication devices. In some aspects, the cluster head may store a combined measurement for the cluster in memory and/or transmit the combined measurement to one or more deciding entities. Additionally or alternatively, one or more deciding entities may be configured to perform a measurement, a calculation (e.g., average, mean, median, etc.), an estimation, and/or prediction (e.g., extrapolation from stored information) based on the radio communication network selection criteria. In some aspects, utility information of one or more vehicular communication devices and/or one or more deciding entities may be combined to make a determination. For instance, the available resources to one or more vehicular communication devices may be determined therefrom.

Figure 27:
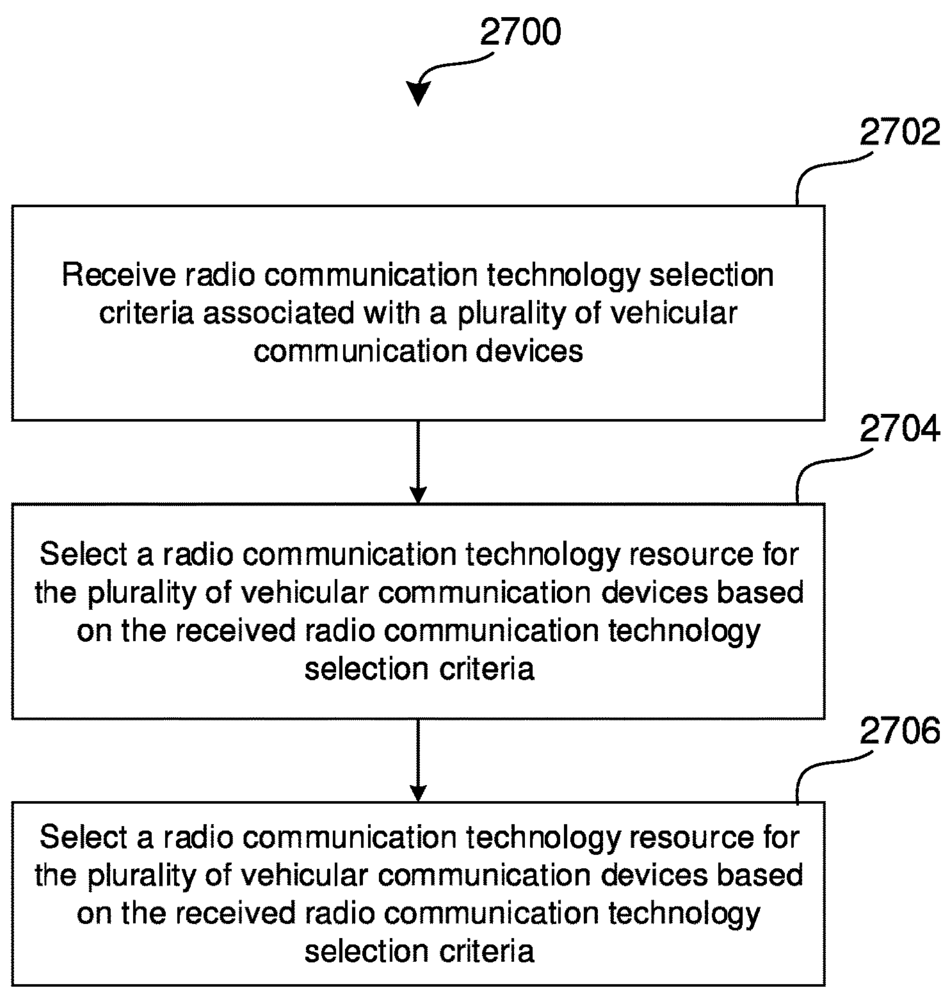
FIG. 27 shows a third exemplary method of performing wireless communications with centralized spectrum allocation according to some aspects.

One or more deciding entities may be responsible for creating, updating, and/or carrying out processes of the dynamic decision tree. FIG. 27 shows a non-limiting example of the resource allocation decision tree according to some aspects of the disclosure. In some aspects, coexistence engine 1812 may be configured to perform the procedure of process 2700, such as by retrieving (e.g., from a local memory) and executing program code that defines the procedure of process 2700 in the form of executable instructions. In, some aspects, a terminal device, network access node, or a vehicular communication device may be configured to perform the procedure of process 2700, such as by retrieving (e.g., from a local memory) and executing program code at one or more processors, where the program code defines the procedure of process 2700 in the form of executable instructions. In some aspects, a cluster head may be configured to perform the procedure of process 2700, such as with a resource allocator (e.g., resource allocator 1008 of FIG. 10), which may retrieve (e.g., from a local memory) and execute program code that defines the procedure of process 2700 in the form of executable instructions. The program code may be updatable, such as wirelessly or by a manual install.

In process 2700 for selecting a radio communication technology resource, the method comprises: receiving radio communication technology selection criteria associated with a plurality of vehicular communication devices in stage 2702; selecting a radio communication technology resource for the plurality of vehicular communication devices based on the received radio communication technology selection criteria in stage 2704 (e.g., in the manner of stage 1212 of FIG. 12); and transmitting a configuration message to at least one vehicular communication device of the plurality of vehicular communication devices (e.g., in the manner of stage 1214 of FIG. 12), where the configuration message includes the selected radio communication technology resource for the plurality of vehicular communication devices in stage 2706.

Upon receipt of the configuration message, the at least one vehicular communication device of the plurality of vehicular communication devices may store the selected radio communication technology resource in a memory (e.g., local memory) and communicate in accordance with the selected radio communication technology resource. Additionally or alternatively, the at least one vehicular communication device of the plurality of vehicular communication devices may forward the configuration message to one or more of the plurality of vehicular communication devices.

In some aspects, selecting a radio communication technology resource for the plurality of vehicular communication devices based on the received radio communication technology selection criteria in stage 2704 may comprise comparing the received radio communication technology selection criteria to one or more predetermined thresholds, and selecting the radio communication technology resource based on the comparison of the received radio communication technology selection criteria to the one or more predetermined thresholds.

A selected radio communication technology resource for the plurality of vehicular communication devices may be implemented in one or more forms. In some aspects, a selected radio communication technology resource for the plurality of vehicular communication devices may include one or more radio communication technology resource candidates for the plurality of vehicular communication devices. As detailed herein, a selected radio communication technology resource for the plurality of vehicular communication devices may indicate a frequency channel, time slot, and/or radio communication technology, for each of the plurality of vehicular communication devices. Likewise, the radio communication technology resource for the plurality of vehicular communication devices may specify a duration for which the selected radio communication technology resource is valid.

In some aspects, a selected radio communication technology resource may comprise specific subcarriers and symbol slots (where each subcarrier and symbol slot constitutes a Resource Element (RE)) to uplink and downlink transmissions to obtain channel resource allocations for one or more vehicular communication devices of a cluster. Additionally or alternatively, a selected radio communication technology resource may include specific channels (blocks of spectrum or sets of subcarriers, e.g., 10 MHz channels for DSRC and LTE V2V/V2X, which may be on the same or different bands) over one or more time slot(s) and/or channels to one or more vehicular communication devices of a cluster. Additionally or alternatively, a selected radio communication technology resource may comprise one or more vehicular radio access technologies that one or more vehicular communication devices of a cluster are assigned to use for the channel(s) and time slot(s). In some aspects, a selected radio communication technology resource may be exclusive to a particular vehicular communication device of a cluster, whereas a selected radio communication technology resource may be shared among a plurality of vehicular communication devices of a cluster in other aspects.

In some aspects, a selected radio communication technology may be exclusive to a particular vehicular communication device based on the radio communication technology selection criteria associated with the particular vehicular communication device. For instance, the radio communication technology selection criteria associated with the particular vehicular communication device may indicate a minimum QoS level to support a vertical application, one or more radio access technologies are supported by the particular vehicular communication device and/or user preference, etc. Thus, the selected radio communication technology may be exclusive to the particular vehicular communication device to provide the minimum QoS level to support the vertical application, and/or to provide a frequency channel, time slot, and/or radio communication technology supported and/or requested by the particular vehicular communication device, etc.

In some aspects, process 2700 may further comprise identifying a plurality of radio communication technology resources available to the plurality of vehicular communication devices. This identification may, for instance, be based on a communication from one or more of the plurality of radio communication devices. Furthermore, selecting a radio communication technology resource for the plurality of vehicular communication devices based on the received radio communication technology selection criteria in stage 2704 may comprise selecting the radio communication technology resource from the identified plurality of radio communication technology resources available to the plurality of vehicular communication devices.

In some aspects, process 2700 may further comprise estimating an effect of the selected radio communication technology resource on the plurality of vehicular communication devices based on the received radio communication technology selection criteria. For instance, one or more deciding entities may be configured to estimate whether one or more of the plurality of radio communication technology candidates has the potential to improve over an existing radio communication technology resource allocation to one or more of the plurality of vehicular communication devices. By evaluating whether one or more of the plurality of radio communication technology candidates has the potential to improve the communication performance of the plurality of vehicular communication devices (e.g., cluster), optimization may be achieved. Process 2700 may further comprise assigning a weighting factor to each of the plurality of radio communication technology resource candidates based on the respective estimated communication performance effect on the plurality of vehicular communication devices.

In some aspects, process 2700 may further comprise estimating a communication performance effect, for each of the plurality of radio communication technology resource candidates, on the plurality of vehicular communication devices based on the received radio communication technology selection criteria. Process 2700 may further comprise assigning a weighting factor to each of the plurality of radio communication technology resource candidates based on the respective estimated communication performance effect on the plurality of vehicular communication devices. By way of illustrative example, the respectively assigned weighting factors may reflect an estimated communication performance effect (e.g., improvement, deterioration, etc.) that each of the plurality of radio communication technology resource candidates has over the existing radio communication technology resource allocation to the one or more of the plurality of vehicular communication devices. Process 2700 may further comprise ranking each of the plurality of radio communication technology resource candidates based on the respective assigned weighting factors, where the configuration message includes the plurality of radio communication technology resource candidates in an order based on the respective rankings associated therewith.

In some aspects, one or more vehicular communication devices of the plurality of vehicular communication devices may be configured to receive and store the one or more configuration messages comprising a plurality of resource candidates in an order based on the respective rankings associated therewith. The one or more vehicular communication devices of the plurality of vehicular communication devices may be configured to aggregate, arrange, and/or re-rank each of the radio communication technology resource candidates based on the respective rankings associated therewith. The one or more vehicular communication devices of the plurality of vehicular communication devices may be configured to select one or more radio communication technology resource candidates based the aggregation, arrangement, and/or re-ranking of each of the radio communication technology resource candidates, and communicate in accordance therewith (e.g., in the manner of stage 1216 of FIG. 12).

In some aspects, a first parameter of the received radio communication technology selection criteria may have a first weighting factor associated therewith, whereas a second parameter of the received radio communication technology selection criteria may have a second weighting factor associated therewith. A weighting factor may influence which of the one or more selected radio communication technology resources for a plurality of vehicular communication devices are prioritized or transmitted to at least one of the plurality of vehicular communication devices. In this fashion, parameters, parameter-types, and/or collection of parameter-types which are more indicative of optimized performance of the plurality of vehicular communication devices may receive a higher weighting factor than those that are less indicative.

In some aspects, process 2700 may further comprise transmitting a request for the radio communication technology selection criteria associated with the plurality of vehicular communication devices. For instance, the transmitted request for the radio communication technology selection criteria includes a request that at least one vehicular communication device of the plurality of vehicular communication devices perform a measurement.

In some aspects, process 2700 may further comprise receiving a radio communication technology resource candidate for the plurality of vehicular communication devices. Furthermore, selecting a radio communication technology resource for the plurality of vehicular communication devices based on the received radio communication technology selection criteria in stage 2704 may comprise selecting the radio communication technology resource for the plurality of vehicular communication devices based on the received radio communication technology selection criteria and the received radio communication technology resource candidate.

In some aspects, process 2700 may further comprise identifying an expected change in communication performance for at least one of the plurality of vehicular communication devices based on the received radio communication technology selection criteria. The expected change in communication performance may, for instance, be based upon a predictive coverage-based parameter. Process 2700 may further comprise modifying at least one parameter within the received radio communication technology selection criteria based on the expected change in communication performance. Furthermore, selecting a radio communication technology resource for the plurality of vehicular communication devices based on the received radio communication technology selection criteria in stage 2704 may comprise selecting the radio communication technology resource based on the at least one modified parameter.

In some aspects, a plurality of deciding entities may collaborate to execute the resource allocation decision tree. For instance, the plurality of deciding entities may execute respective portions of the resource allocation decision tree. In some aspects, the plurality of deciding entities may store the resource allocation decision tree in whole or in part in a memory. These respective portions may include a set of instructions that are common among each of the plurality of deciding entities, a set of instructions that are different from those of each of the plurality of deciding entities, and/or a set of instructions that are different in part from those of each of the plurality of deciding entities.

For example, a first deciding entity may be configured to retrieve radio communication technology selection criteria associated with a first parameter from a memory, compare the radio communication technology selection criteria associated with the first parameter to one or more threshold values and/or ranges, and select one or more radio communication technology resources for a plurality of vehicular communication devices based on the comparison of the radio communication technology selection criteria. Likewise, a second deciding entity may be configured retrieve radio communication technology selection criteria associated with a second parameter from a memory, compare the radio communication technology selection criteria associated with the second parameter to one or more threshold values and/or ranges, and select one or more radio communication technology resources for a plurality of vehicular communication devices based on the comparison of the radio communication technology selection criteria. And a third deciding entity may be configured to receive the selected one or more radio communication technology resources from the first and second deciding entities and generate a configuration message comprising one or more of the selected radio communication technology resources based on respective weighting factors associated therewith.

As previously described, the use of a cluster has been presented herein to manage access to reduce co-channel interference and enable more efficient usage of the shared channel resources. Provided the resource allocation decision tree introduced herein, interference may be reduced and resources may be more efficiently utilized.

Centralized Channel Access Control

Contention-based access schemes, such as WiFi and IEEE 802.11-based standards like DSRC, may use a listen-before-talk (LBT) procedure known as Carrier-Sense Multiple Access with Collision Avoidance (CSMA/CA) to control when devices can access a channel. As used herein, CSMA/CA refers to any multiple access protocol where transmitters use carrier sensing to determine that a channel is free and avoid collisions by transmitting only when the channel is determined to be free. CSMA/CA thus includes standards such as those in or derived from the IEEE 802.11 family but is not exclusively limited to any one particular standard.

Accordingly, when a transmitter has a pending transmission, a transmitter using CSMA/CA may perform carrier sensing to determine whether the channel is busy or free. The transmitter may therefore listen to the channel for a predefined sensing interval (e.g., a Distributed Coordination Function (DCF) Inter-Frame Space (DIFS)). If the transmitter does not detect any other transmissions on the channel during the sensing interval, the transmitter may conclude that the channel is free and immediately transmit on the channel. However, if the transmitter detects any other transmission during the sensing interval, the transmitter may conclude that channel is busy and consequently perform a backoff procedure before attempting to transmit again.

In particular, the transmitter may randomly select a backoff counter (within a predefined range of backoff counter values) for the backoff procedure. The transmitter may continue listening to the channel until the detected transmission ends. Once the detected transmission ends, the transmitter may listen to the channel again for a sensing interval. If the transmitter does not detect any further transmissions during the sensing interval, the transmitter may begin decrementing the backoff counter while continuing to listen to the channel. Each time the transmitter detects a transmission on the channel, the transmitter may pause the backoff counter, wait until the detection transmission ends, listen to the channel for a sensing interval, and continue decrementing the counter following the conclusion of the sensing interval.

Once the backoff counter reaches zero, the transmitter may perform the transmission on the channel. If another transmitter transmits at the same time as the transmitter (either after the initial sensing interval or after expiry of the backoff counter), the transmitter may choose a larger backoff counter (e.g., double length of the previous backoff counter) and restart the backoff procedure again with the new backoff counter.

The detection of other transmissions via carrier sensing may thus govern when CSMA/CA transmitters can access the channel. Various implementations of CSMA/CA may utilize different types of carrier sensing, such as physical and virtual carrier sensing. In physical carrier sensing using energy detection, a transmitter may measure the radio energy in the channel (which can be radio energy from other RATs, noise, interference, corrupted transmissions, etc.) and, if the measured radio energy is above a threshold, determine that the channel is busy. As the transmitter may not specifically identify the source of the measured radio energy when using energy detection, the transmitter may continue listening to the channel until the measured radio energy falls below a threshold before concluding that the channel is free. In physical carrier sensing using preamble detection, the transmitter may process signals received on the channel to determine if the channel contains any recognizable preambles, which may generally be preambles of the same RAT that the transmitter is using that are therefore readable by the transmitter. If the transmitter detects any recognizable preambles, the transmitter may conclude that the channel is busy for the entirety of the current frame.

Accordingly, in contrast to energy detection where the transmitter will continue to listen to the channel until the measured radio energy falls, the transmitter may conclude that the channel will not be free until at least the current frame is over and thus may opt to conserve battery power by discontinuing carrier sensing until the end of the current frame.

In virtual carrier sensing, a transmitter may read information from detected transmissions that indicate a duration of the detected transmission. The transmitter may then set a reservation counter based on the duration of the detected transmission, and may opt to discontinue carrier sensing until the reservation counter expires. For example, other transmitters may use a handshake procedure, such a Request to Send (RTS)/Clear to Send (CTS) handshake, by exchanging a transmission request (e.g., RTS) and a transmission grant (e.g., CTS), that specify a reservation period (e.g., a Network Allocation Vector (NAV)) of the upcoming transmission. If the transmitter detects such a handshake procedure by receiving and reading a transmission request or transmission grant, the transmitter may assume that the channel will be busy until the reservation period expires, initiate a reservation counter equal to the reservation period, and resume carrier sensing once the reservation counter expires. Other transmissions may also indicate a reservation period, such as WiFi preambles that include a Signal Field specifying a reservation period. A transmitter that detects such information in a detected transmission may likewise assume that the channel will be busy until the reservation period is over.

Devices operating with contention-based schemes such as CSMA/CA may therefore use such carrier sensing techniques to determine when they are permitted to transmit on a channel. In contrast to these contention-based protocols, transmitters that share a channel with deterministic scheduling may receive channel resource allocations from a central control entity that specifies which channel resources (e.g., time-frequency resources) that each transmitter is assigned to use (e.g., which time slots and on which subcarriers each transmitter is assigned to transmit). The central control entity, such as a base station, may help prevent collisions by the transmitters by allocating different channel frequency resources to each transmitter.

As previously introduced above in the exemplary case of coexistence between LTE V2V/V2X and DSRC, operation of contention-based and deterministic scheduling systems on the same channel resources may lead to performance degradation. In particular, while contention-based devices may generally be able to detect ongoing transmissions by the deterministic scheduling devices and consequently avoid collisions, certain deterministic scheduling devices may not have a mechanism to detect transmissions by the contention-based devices. This can therefore lead to collisions when deterministic scheduling devices transmit while contention-based devices are already occupying the channel.

Accordingly, aspects of this disclosure provide a coexistence engine that directly manages access to the same channel resources by both contention-based and deterministic scheduling devices. In comparison to the aspects previously described for centralized spectrum allocation that allow for undisturbed operation of contention-based and deterministic scheduling systems on separately allocated channel resources, centralized channel access control may directly intervene to control access to a channel.

Figure 28:
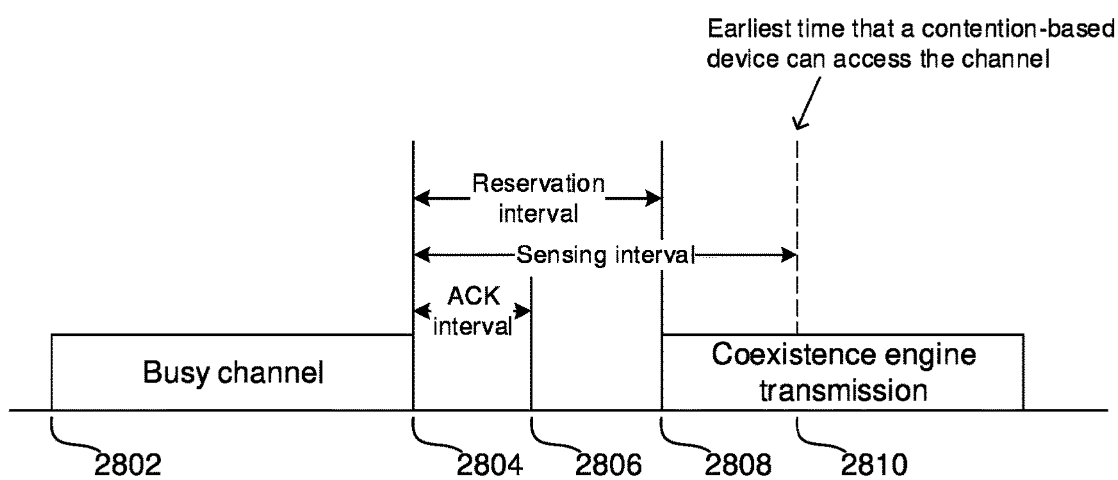
FIG. 28 shows an example of CSMA operation according to some aspects.
Figure 29:
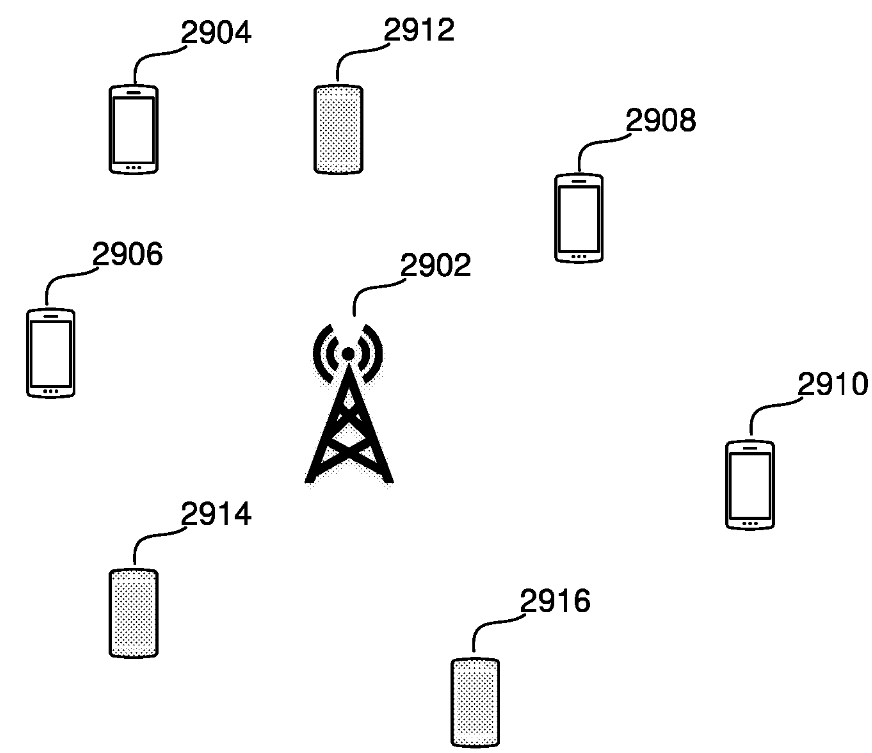
FIG. 29 shows an exemplary network architecture for a coexistence engine and various terminal devices according to some aspects.

FIG. 28 shows an example of centralized channel access control according to some aspects. The example of FIG. 28 relates to a scenario where a channel is shared between both contention-based and deterministic scheduling devices, such as the exemplary scenario depicted in FIG. 29 where contention-based communication devices 2912-2916 may operate on the same channel as deterministic scheduling communication devices 2904-2910. Although depicted as terminal devices in the exemplary context of FIG. 29, communication devices 2904-2916 can be any type of communication device including terminal devices or network access nodes and the like. In some aspects, one or more of communication devices 2904-2916 can be vehicular communication devices, such as contention-based vehicular communication devices using DSRC and/or deterministic scheduling vehicular communication devices using LTE V2V/V2X.

Coexistence engine 2902 may be configured to control channel access by communication devices 2904-2916. As previously described regarding CSMA/CA, contention-based communication devices 2912-2916 may use carrier sensing to determine when the channel is free, namely by monitoring the channel for a sensing interval and only proceeding to immediately transmit if the channel is free for the sensing interval. For example, as shown in FIG. 28, the channel may initially be busy starting at time 2802, such as due to an ongoing transmission by one of communication devices 2904-2916. As contention-based communication devices are configured to only determine that the channel is free if no transmissions are detected in a sensing interval, the earliest possible time that one of contention-based communication devices 2912-2916 could begin a new transmission is at time 2810 (e.g., once a full sensing interval has passed since the end of the transmission at time 2804).

Accordingly, coexistence engine 2902 can control access to the channel by using a reservation interval less than the sensing interval to govern its own use of the channel. As shown in the example of FIG. 28, coexistence engine 2902 may listen to the channel for the duration of this reservation interval and, if no transmissions are detected, may begin its own new transmission at time 2808. As the reservation interval is less than the sensing interval, coexistence engine 2902 may occupy the channel before any of contention-based communication devices 2912-2916 can occupy the channel. Although depicted as a network access node in the example of FIG. 29, in some aspects coexistence engine 2902 may be a terminal device, such as a terminal device acting as a master device to manage spectrum sharing between other terminal devices (e.g., in D2D use cases). Furthermore, in some aspects, coexistence engine 2902 may be a vehicular communication device that manages spectrum sharing for other vehicular communication devices (e.g., in a V2V case).

In some aspects, contention-based communication devices such as contention-based communication devices 2912-2916 may use an acknowledgement scheme in which a receiving device transmits an acknowledgement (ACK) at an ACK interval following successful receipt of a transmission. These ACK intervals (e.g., Short Inter-Frame Spaces (SIFSs)) are shorter than the sensing intervals, thus enabling the receiving device to transmit the ACK prior to another device beginning a new transmission. Accordingly, in some aspects the reservation interval used by coexistence engine 2902 may be longer than the ACK interval used by contention-based communication devices 2912-2916. FIG. 28 shows an example in which the ACK interval expires at time 2806. If coexistence engine 2902 detects an ACK when planning to occupy the channel, coexistence engine 2902 may reset the reservation interval or, alternatively, can begin the new transmission immediately after the ACK.

In some aspects, coexistence engine 2902 may utilize the reservation interval to occupy and reserve the channel for use by deterministic scheduling communication devices 2904-2910. For example, as contention-based communication devices 2912-2916 will not begin a new transmission until the channel has been free for at least a sensing interval, coexistence engine 2902 and deterministic scheduling communication devices 2904-2910 may continue to occupy the channel after time 2808 by ensuring that there are no transmission breaks longer than the sensing interval.

As contention-based communication devices 2912-2916 will refrain from transmission as long as no such transmission breaks will occur, deterministic scheduling communication devices 2904-2910 may use the channel for deterministic scheduling communications. In some aspects, coexistence engine 2902 and deterministic scheduling communication devices 2904-2910 may continue to occupy and use the channel for a reservation window (e.g., a period of time during which access to the channel by contention-based communication devices is controlled or prevented). Once the reservation window is over, coexistence engine 2902 and deterministic scheduling communication devices 2904-2910 may return the channel back to contention-based communication devices 2912-2916 by discontinuing further transmissions on the channel. Contention-based communication devices 2912-2916 may then resume using the channel after determining that the channel is free again with carrier sensing (e.g., after a sensing interval and/or backoff procedure).

In some aspects, coexistence engine 2902 may repeatedly reserve the channel in this manner, and can therefore control the periods of time in which the channel is reserved for deterministic-scheduling communication, i.e., reservation windows, and when the channel is available for contention-based communication, i.e., open windows. The direct intervention by coexistence engine 2902 into communications on the channel using a reservation interval shorter than the sensing interval may thus provide coexistence engine 2902 with a high degree of control over access to the channel by both contention-based and deterministic scheduling devices.

In some aspects, coexistence engine 2902 may be responsible for determining the channel resource allocations used for the deterministic scheduling of deterministic scheduling communication devices 2904-2910 during the reservation period. For example, coexistence engine 2902 may be the network access node that is serving deterministic scheduling communication devices 2904-2910, or, alternatively, may be a terminal device or vehicular communication device responsible for determining channel resource allocations for other terminal devices or vehicular communication devices. Accordingly, after reserving the channel for use by deterministic scheduling communication devices 2904-2910, coexistence engine 2902 may determine and specify a channel resource allocation to deterministic scheduling communication devices 2904-2910 that assigns channel resources of the channel to deterministic scheduling communication devices 2904-2910. Deterministic scheduling communication devices 2904-2910 may then access the channel according to their respectively assigned channel resource allocations. Coexistence engine 2902 and deterministic scheduling communication devices 2904-2910 may perform this channel resource allocation process over one or more allocation periods before ending the reservation window. Coexistence engine 2902 and deterministic scheduling communication devices 2904-2910 may then return the channel back to contention-based communication devices 2912-2916, which may use the channel during the open window.

Figure 30:
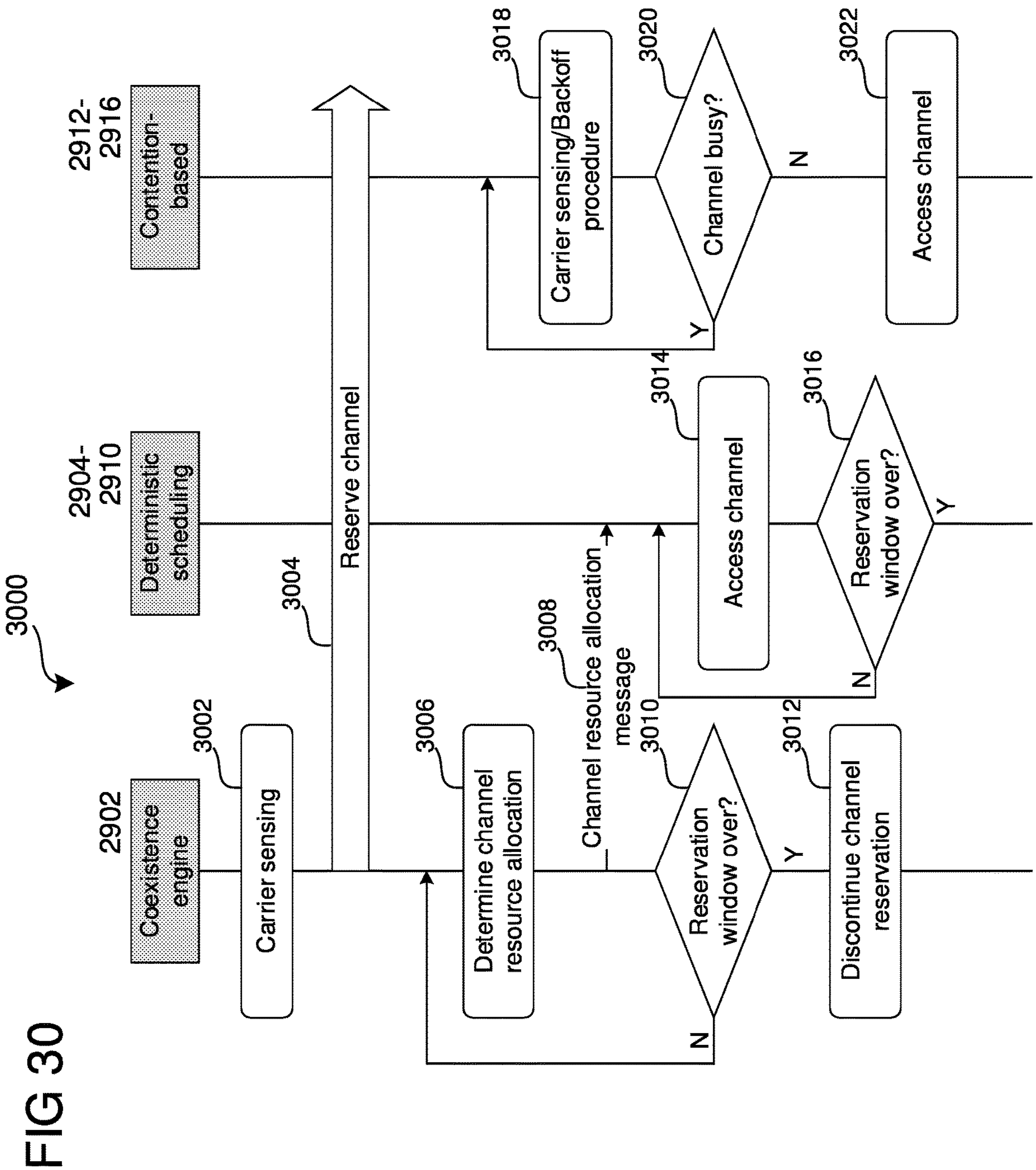
FIG. 30 shows an exemplary message sequence chart describing centralized channel access control according to some aspects.

FIG. 30 shows exemplary message sequence chart 3000 illustrating this procedure according to some aspects. As shown in FIG. 30, coexistence engine 2902 may first perform carrier sensing on the channel in stage 3002. For example, coexistence engine 2902 may monitor the channel for at least the duration of a reservation interval, where the reservation interval is shorter than the sensing interval used by contention-based communication devices 2912-2916. If coexistence engine 2902 does not detect any ongoing transmissions within the reservation interval, coexistence engine 2902 may conclude that the channel is free. If coexistence engine 2902 detects a transmission within the reservation interval, coexistence engine 2902 may continue monitoring the channel at least until the transmission ends. In some aspects, coexistence engine 2902 may not perform a backoff procedure when a transmission is detected, and may either wait until the channel has been free for at least the duration of a reservation interval (e.g., the duration of a reservation interval following the most recently detected transmission), immediately begin transmitting after the transmission is over, or wait until the channel has been free for at least the duration of an ACK interval used by contention-based communication devices 2912-2916 (e.g., the duration of an ACK interval following the most recently detected transmission).

After determining that the channel is free, coexistence engine 2902 may transmit a reserving transmission to reserve the channel in stage 3004. Contention-based communication devices 2912-2916 may detect the reserving transmission and, consequently, conclude that the channel is busy. For example, as previously indicated, contention-based devices may utilize physical and/or virtual carrier sensing to determine if a channel is busy, where physical carrier sensing involves concluding that the channel is busy if the measured radio energy is above a threshold and virtual carrier sensing involves concluding that the channel will be busy for a reservation period if a reservation period can be read from a transmission detected on the channel. Accordingly, coexistence engine 2902 may begin reserving the channel in stage 3004 by performing any reserving transmission of sufficient radio energy. For example, in some aspects coexistence engine 2902 may transmit dummy noise (e.g., noise that does not contain meaningful information) as the reserving transmission in stage 3004. Assuming the dummy noise is observable at contention-based communication devices 2912-2916 with radio energy above a physical carrier sensing threshold used by contention-based communication devices 2912-2916, any of contention-based communication devices 2912-2916 that are sensing the channel may conclude that it is busy.

In another example, coexistence engine 2902 may transmit a reservation message in a message format that is readable by deterministic-scheduling communication devices 2904-2910 as the reserving transmission in stage 3004. Deterministic-scheduling communication devices 2904-2910 may therefore be configured to listen for such reservation messages and, upon receipt, to determine that the reservation window has started. In some aspects, the reservation message may be in a message format that is not readable by contention-based communication devices 2912-2916, which may still cause contention-based communication devices 2912-2916 to determine that the channel is busy from physical carrier sensing.

In some aspects, coexistence engine 2902 may transmit a reservation message in stage 3004 as the reservation transmission that is in a signal format that is readable by contention-based communication devices 2912-2916. For example, coexistence engine 2902 may transmit a reservation message in the message format of the radio access technology used by deterministic scheduling communication devices 2904-2910. The reservation message may optionally also specify a reservation period, such as a preamble and/or a Request to Send (RTS) that includes a reservation period, which contention-based communication devices 2912-2916 may read and, as part of virtual carrier sensing, use to conclude that the channel will be occupied for the duration of the reservation period.

After reserving the channel with a reserving transmission in stage 3004, the reservation window may begin, and coexistence engine 2902 and deterministic scheduling communication devices 2904-2910 may begin using the channel for deterministic scheduling communications. As contention-based communication devices 2912-2916 may resume the channel if there is a transmission break (e.g., a lapse in transmission) for longer than a sensing interval, coexistence engine 2902 and deterministic scheduling communication devices 2904-2910 may continue to occupy the channel for the duration of the reservation window by preventing transmission breaks longer than the sensing interval used by contention-based communication devices 2912-2916 until the reservation window is over. This is described in further detail below for FIGS. 31A and 31B.

As previously indicated, in some aspects coexistence engine 2902 may be responsible for allocating channel resources to deterministic scheduling communication devices 2904-2910 during the reservation window, such as when coexistence engine 2902 is the network access node that serves deterministic scheduling communication devices 2904-2910. Accordingly, coexistence engine 2902 may determine a channel resource allocation for deterministic scheduling communication devices 2904-2910 in stage 3006. The channel resource allocation may allocate different channel resources to deterministic scheduling communication devices 2904-2910. The channel resource allocation may depend on the multiple access scheme that deterministic scheduling communication devices 2904-2910 are utilizing to share the channel. For example, if using a time-division multiple access (TDMA) scheme, coexistence engine 2902 may allocate the spectrum of the channel to each of deterministic scheduling communication devices 2904-2910 at different times over the course of an allocation period. If using a frequency-division multiple access (FDMA) scheme, coexistence engine 2902 may allocate different subcarriers of the channel to each of deterministic scheduling communication devices 2904-2910 over the course of an allocation period. If using an orthogonal frequency-division multiple access (OFDMA) scheme, coexistence engine 2902 may allocate different subcarriers at different times (e.g., different time-frequency resources known as Resource Elements (REs)) to each of deterministic scheduling communication devices 2904-2910 over the course of an allocation period. If using a code-division multiple access (CDMA) scheme, coexistence engine 2902 may allocate different spreading codes to each of deterministic scheduling communication devices 2904-2910 over the course of an allocation period. Coexistence engine 2902 may additionally or alternatively use other types of resource division to allocate different channel resources to each of deterministic scheduling communication devices 2904-2910, which can include allocating one or more different subcarriers, different time slots, different codes, different spatial multiplexing layers, different polarizations (e.g., horizontal vs. vertical), and/or different propagation channel orthogonality (e.g., a first system uses frequencies in the deep frequency-domain fading sub-bands of a second system) to each of deterministic scheduling communication devices 2904-2910. In some aspects, the channel resource allocation can be for uplink or downlink use of the channel, such as where uplink and downlink are duplexed using frequency division duplexing (e.g., a first subband of the channel for uplink and a second subband of the channel for downlink) or time division duplexing (e.g., a first subperiod of the allocation period for uplink and a second subperiod of the allocation period for downlink). For example, coexistence engine 2902 may determine a downlink channel resource allocation and an uplink channel resource allocation for deterministic scheduling communication devices 2904-2910 in stage 3006.

After determining the channel resource allocation in stage 3006, coexistence engine 2902 may transmit channel resource allocation messages that indicate the channel resource allocation to deterministic scheduling communication devices 2904-2910 in stage 3008. In some aspects, coexistence engine 2902 may transmit a unicast channel resource allocation message to each of deterministic scheduling communication devices 2904-2910 that specifies the respective channel resource allocation uniquely for the corresponding one of deterministic scheduling communication devices 2904-2910. In other aspects, coexistence engine 2902 may transmit a multicast channel resource message to some or all of deterministic scheduling communication devices 2904-2910 that specifies the channel resource allocation for some or all of deterministic scheduling communication devices 2904-2910. In some aspects, coexistence engine 2902 may perform stage 3006 prior to stage 3004 (e.g., may prepare the channel resource allocation prior to reserving the channel in stage 3004), and may transmit the channel resource allocation messages as the reserving transmission in stage 3004 (e.g., may reserve the channel by transmitting the channel resource allocation messages). Accordingly, coexistence engine 2902 may perform the process of stages 3004 and 3008 in a single stage, for example, where contention-based communication devices 2912-2916 may detect the channel resource allocation messages and conclude that the channel is busy.

In some aspects, coexistence engine 2902 may repeat the process of stages 3006 and 3008, such as by determining a channel resource allocation and transmitting channel resource allocation messages for each of a plurality of allocation periods, where coexistence engine 2902 allocates channel resources to deterministic scheduling communication devices 2904-2910 for each of the plurality of allocation periods. Accordingly, after transmitting the channel resource allocation messages in stage 3008, coexistence engine 2902 may determine if the reservation window is over in stage 3010. In some aspects, the length of the reservation window may be fixed, and coexistence engine 2902 may determine the length of the reservation window when (or before) reserving the channel in stage 3004 (and, optionally, may include the length of the reservation window in a reservation message transmitted to deterministic scheduling communication devices 2904-2910). In other aspects, the length of the reservation window may be floating, and coexistence engine 2902 may decide when to end the reservation window in a dynamic manner after reserving the channel. For example, for floating-length reservation windows coexistence engine 2902 may determine when to end the reservation window based on the amount of pending data for transmission at coexistence engine 2902 or deterministic scheduling communication devices 2904-2910 (e.g., by determining to end the reservation window when the amount of pending data reaches zero or falls below a threshold).

Coexistence engine 2902 may thus repeat the process of stages 3006 and 3008 until the reservation window ends. Coexistence engine 2902 may then discontinue the channel reservation in stage 3012. In some aspects, coexistence engine 2902 may discontinue the channel reservation by ceasing to transmit channel resource allocation messages to deterministic scheduling communication devices 2904-2910, which may consequently refrain from transmitting once no further channel resource allocation messages are provided. In some aspects, coexistence engine 2902 may transmit a termination message to deterministic scheduling communication devices 2904-2910 to indicate that the reservation window is over.

As shown in FIG. 30, deterministic scheduling communication devices 2904-2910 may access the channel in stage 3014 using the channel resources assigned by coexistence engine 2902 in the channel resource allocation messages. Deterministic scheduling communication devices 2904-2910 may continue to access the channel until deterministic scheduling communication devices 2904-2910 determine that the reservation window is over in stage 3016. In some aspects, deterministic scheduling communication devices 2904-2910 may determine that the reservation window is over if no channel resource allocation messages are received from coexistence engine 2902 within a predefined time period, if a fixed reservation window specified by coexistence engine 2902 expires, or if coexistence engine 2902 transmits a termination message.

Coexistence engine 2902 and deterministic scheduling communication devices 2904-2910 may thus continue to use the channel for the duration of the reservation window. If any of contention-based communication devices 2912-2916 attempt to access the channel during the reservation window, they will perform carrier sensing in stage 3018. If coexistence engine 2902 and deterministic scheduling communication devices 2904-2910 do not leave any transmission breaks longer than the sensing interval during the reservation window, contention-based communication devices 2912-2916 may determine that the channel is busy in stage 3020, and proceed back to stage 3018 to perform a backoff procedure before attempting to access the channel again. Contention-based communication devices 2912-2916 will not be permitted to access the channel for the duration of time which coexistence engine 2902 and deterministic scheduling communication devices 2904-2910 do not allow a transmission break of longer than the sensing interval. While it may be possible for contention-based communication devices 2912-2916 to improperly access the channel (e.g., incorrectly clearing the channel as being free, potentially due to the hidden node effect or other mistakes), these improper transmissions may generally be limited in nature.

Accordingly, in some aspects, the channel may remain occupied by coexistence engine 2902 and deterministic scheduling communication devices 2902-2904 for the duration of the reservation window. Once coexistence engine 2902 discontinues the channel reservation in stage 3012, contention-based communication devices 2912-2916 may resume using the channel in stage 3022 after at least a sensing interval has passed following the conclusion of the last transmission by coexistence engine 2902 and deterministic scheduling communication devices 2904-2910 in the reservation window.

In some aspects, coexistence engine 2902 and deterministic scheduling communication devices 2904-2910 may be configured to arrange their transmissions and receptions during the reservation window to avoid transmission breaks longer than a sensing interval. In doing so, coexistence engine 2902 and deterministic scheduling communication devices 2904-2910 may attempt to prevent contention-based communication devices 2912-2916 from accessing the channel, and thus may maintain the channel reservation for the duration of the reservation window FIGS. 31A and 31B show exemplary communication schedules that coexistence engine 2902 and deterministic scheduling communication devices 2904-2910 may use maintain the channel reservation for the duration of the reservation window according to some aspects.

Figure 31A:
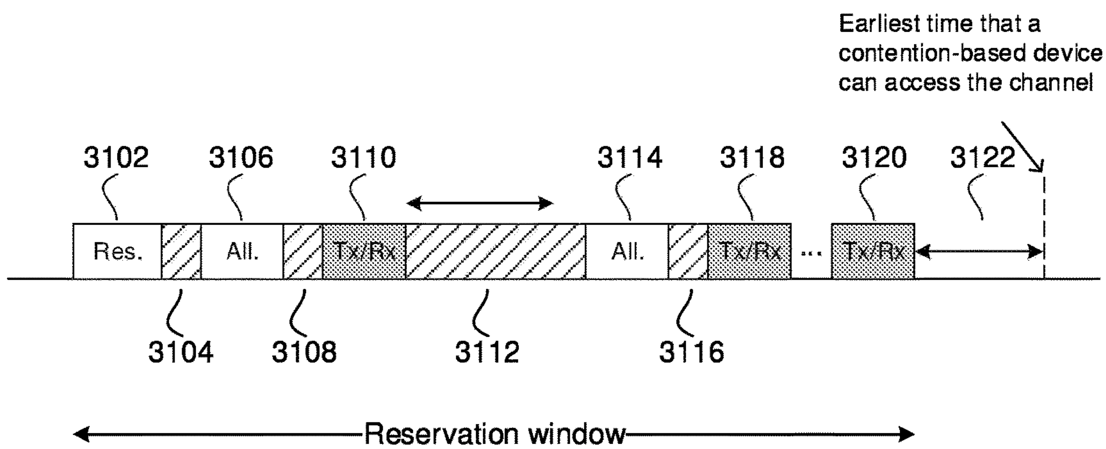
FIGS. 31A and 31B show exemplary transmission timing charts for centralized channel access control according to some aspects.
Figure 31B:
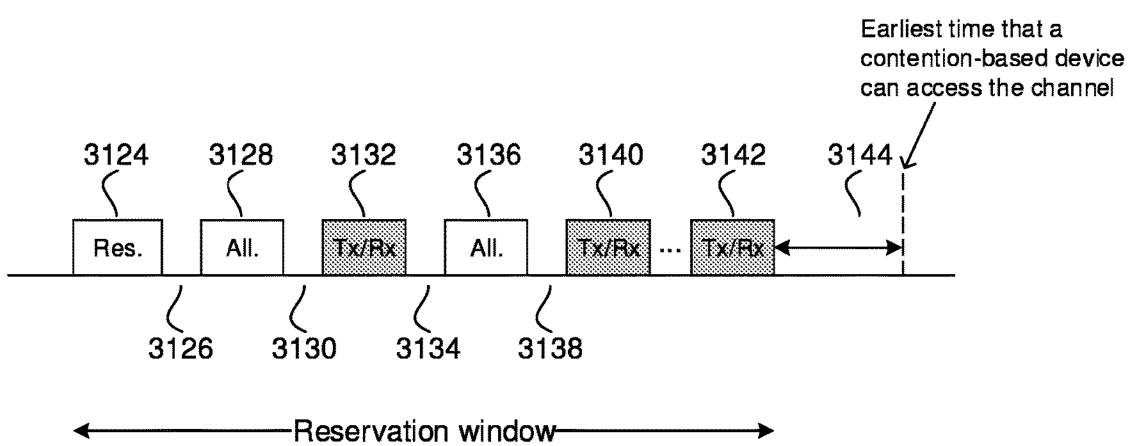

In the example of FIG. 31A, coexistence engine 2902 may be configured to transmit dummy noise during transmission breaks. As shown in FIG. 31A, coexistence engine 2902 may first reserve the channel at stage 3102 with an initial transmission (e.g., as in stage 3004 of FIG. 30). Coexistence engine 2902 may then begin determining the channel resource allocation for deterministic scheduling communication devices 2904-2910 (e.g., as in stage 3006 of FIG. 30), which may cause a lapse between the initial transmission at stage 3102 and the subsequent channel resource allocation messages at stage 3106.

As shown in FIG. 31A, coexistence engine 2902 may prevent a transmission break longer than the sensing interval by transmitting dummy noise on the channel in stage 3104, which may be any noise or random signaling that does not convey meaningful data. Contention-based communication devices 2912-2916 may detect such dummy noise as radio energy when performing physical carrier sensing, and thus conclude that the channel is busy.

Once coexistence engine 2902 has determined the channel resource allocation, coexistence engine 2902 may transmit the channel resource allocation messages to deterministic scheduling communication devices 2904-2910 in stage 3106. Coexistence engine 2902 may again transmit dummy noise in stage 3108, which may be the intervening period between when coexistence engine 2902 transmits the channel resource allocations and when deterministic scheduling communication devices 2904-2910 begin transmitting on the channel.

In some aspects, the channel resource allocation may allocate channel resources to deterministic scheduling communication devices 2904-2910 over an allocation period, which may be fixed (e.g., the same for each channel resource allocation) or floating (e.g., subject to change by coexistence engine 2902 for different channel resource allocations). In some aspects, the channel resource allocation may allocate both uplink and downlink channel resources to deterministic scheduling communication devices 2904-2910, such as according to time-division duplexing (TDD) or frequency-division duplexing (FDD). In some aspects, the allocation period may also include time allocated for transmission of ACK/NACKs.

After the allocation period expires at the end of stage 3110, coexistence engine 2902 may again transmit dummy noise during stage 3112. In the exemplary scenario of FIG. 31A, the transmission break during stage 3112 may be longer than the sensing interval used by contention-based communication devices 2912-2916. However, as coexistence engine 2902 transmits dummy noise during stage 3112, contention-based communication devices 2912-2916 may conclude that the channel is busy and refrain from transmitting. Coexistence engine 2902 and contention-based communication devices 2912-2916 may maintain the channel reservation. The scenario shown in FIG. 31A where the transmission break in stage 3112 is longer than the sensing interval is exemplary, and in various exemplary scenarios any of none, one, or more than one of the transmission breaks may be longer than the sensing interval.

In some aspects, coexistence engine 2902 may repeat the process of stages 3106-3112 for a plurality of allocation periods, and accordingly may provide a channel resource allocation to deterministic scheduling communication devices 2904-2910 during each of the plurality of allocation periods. Coexistence engine 2902 may continue to transmit dummy noise during transmission breaks to maintain the channel reservation. While FIG. 31A shows an example of aspects where coexistence engine 2902 transmits dummy noise during each transmission break, in some aspects coexistence engine 2902 may only transmit dummy noise during transmission breaks that are longer than the sensing interval. In some aspects, coexistence engine 2902 may know the length of the transmission break before the transmission break begins, and may thus know to transmit dummy noise during the transmission break if it is longer than the sensing interval. In some aspects, coexistence engine 2902 may not know the length of the transmission break before the transmission break begins, and, after monitoring radio energy during the transmission break, may begin transmitting dummy noise if the transmission break persists longer than sensing interval (or has persisted almost a sensing interval).

Once the reservation window expires at the end of stage 3120 (e.g., after coexistence engine 2902 has provided channel resource allocations to deterministic scheduling communication devices 2904-2910 during each of a plurality of allocation periods that compose the reservation window), coexistence engine 2902 and deterministic scheduling communication devices 2904-2910 may stop transmitting on the channel. Contention-based communication devices 2912-2916 may then resume using the channel, where the earliest time that one of contention-based communication devices 2912-2916 may access the channel may be after at least a sensing interval has passed following the last transmission by coexistence engine 2902 and deterministic scheduling communication devices 2904-2910 during the reservation window.

In a variation of the example of FIG. 31A, in some aspects coexistence engine 2902 may be configured to transmit signaling during transmission breaks (e.g., in stages 3104, 3108, 3112, 3116, etc.) that is readable by contention-based communication devices 2912-2916. For example, coexistence engine 2902 may be configured to transmit a preamble in the signal format of the radio access technology used by contention-based communication devices 2912-2916. As contention-based communication devices 2912-2916 may therefore be able to read the preamble, coexistence engine 2902 may be configured to provide information to contention-based communication devices 2912-2916 in the preamble. For example, in some aspects coexistence engine 2902 may be configured to specify the length of the reservation window (e.g., total length or remaining length) in the preamble, such as in a field of the preamble used for indicating a reservation period. If performing virtual carrier sensing, contention-based communication devices 2912-2916 may therefore set a reservation counter according to the remaining length of the reservation window and suspend carrier sensing on the channel until the reservation counter expires.

In some aspects, coexistence engine 2902 may transmit such a preamble in stage 3102 when initially reserving the channel. Any of contention-based communication devices 2912-2916 that are listening to the channel may thus determine that the channel will be occupied until the reservation window expires, and may suspend carrier sensing until the reservation window is over.

In some aspects where coexistence engine 2902 transmits a preamble specifying the reservation window, coexistence engine 2902 may still transmit dummy noise or additional preambles to ensure that there are no transmission breaks longer than the sensing interval. Even if some of contention-based communication devices 2912-2916 read the preamble and suspend carrier sensing until the end of the reservation window, it is possible that not all of contention-based communication devices 2912-2916 will be listening. Accordingly, while those of contention-based communication devices 2912-2916 that receive the preamble may know that the channel will be occupied, any other of contention-based communication devices 2912-2916 that do not receive the preamble may not be aware of the channel reservation. Transmission of dummy noise or additional preambles before the transmission break reaches the length of the sensing interval can therefore prevent any others of contention-based communication devices 2912-2916 that do not receive the preamble from accessing the channel during the reservation window.

In the example of FIG. 31B, coexistence engine 2902 may arrange the communication schedule where there are no transmission breaks longer than the sensing interval. Accordingly, coexistence engine 2902 may not transmit dummy noise or preambles in stages 3126, 3130, 3134, and 3138, as none of the transmission breaks may be long enough for contention-based communication devices 2912-2916 to determine that the channel is free.

The communication schedules of FIGS. 31A and 31B are exemplary, and other communication schedules are likewise within the scope of this disclosure. The order and duration of stages 3102-3144 may thus be different from as shown in FIGS. 31A and 31B, and the communication schedules are not exclusively limited to those shown.

Figure 32:
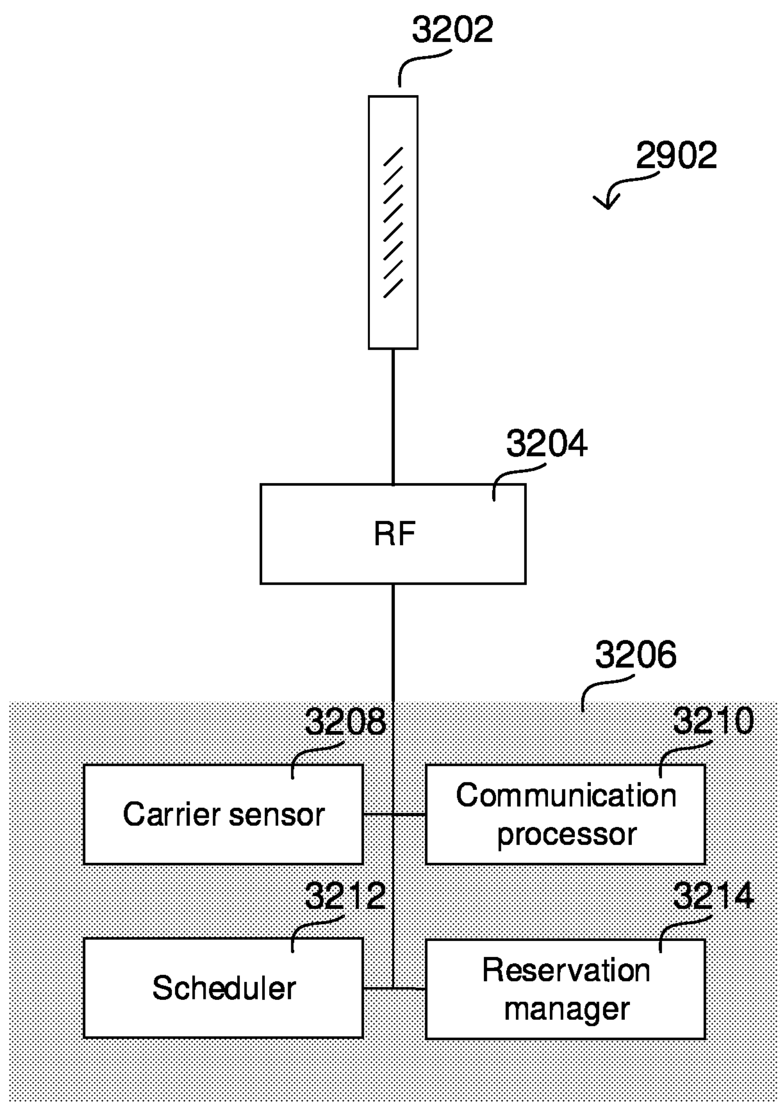
FIG. 32 shows an exemplary internal configuration of a coexistence engine according to some aspects.
Figure 33:
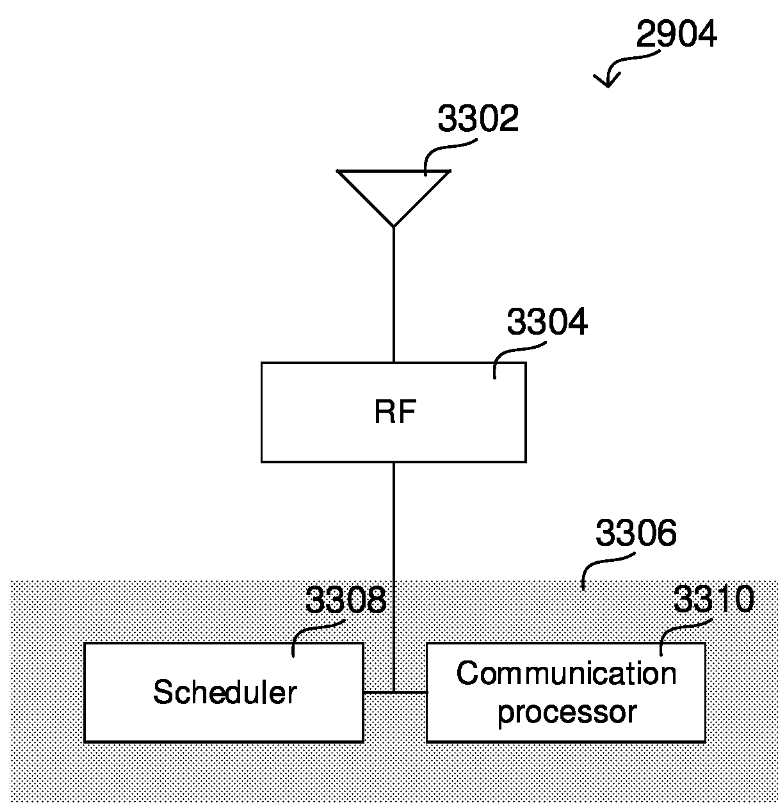
FIG. 33 shows an exemplary internal configuration of a deterministic scheduling communication device according to some aspects.
Figure 34:
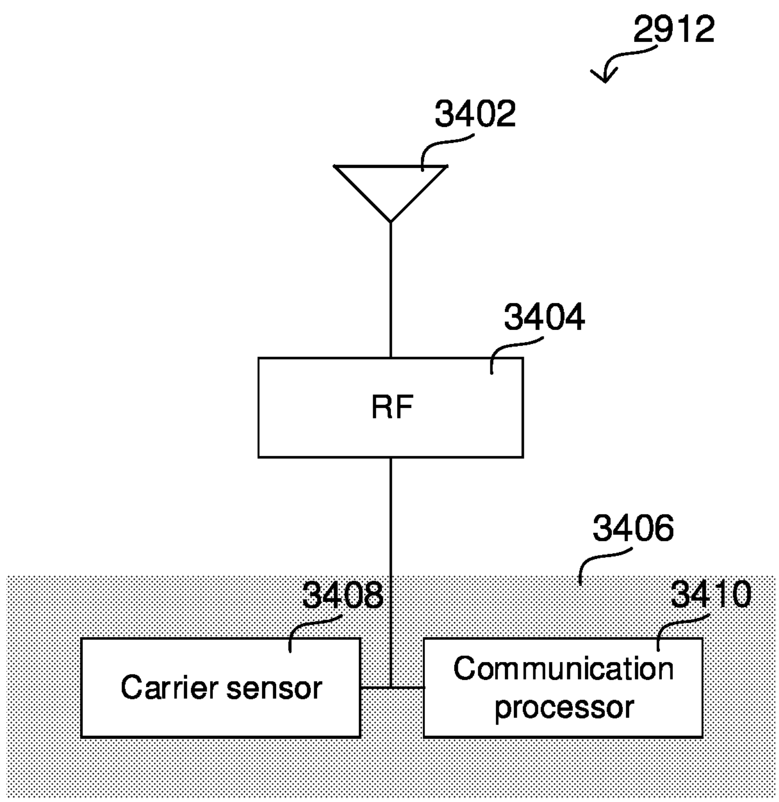
FIG. 34 shows an exemplary internal configuration of a contention-based communication device according to some aspects.

FIGS. 32-34 show exemplary internal configurations of coexistence engine 2902, deterministic scheduling communication devices 2904-2910, and contention-based communication devices 2912-2916.

FIG. 32 shows an exemplary internal configuration of coexistence engine 2902. As previously indicated, in some aspects coexistence engine 2902 may be a network access node, while in other aspects coexistence engine 2902 may be a terminal device or a vehicular communication device acting as a master device for other terminal devices or vehicular communication devices. In some aspects where coexistence engine 2902 is a vehicular communication device, coexistence engine 2902 may further include a steering and movement system (for example, in the manner of steering and movement system 502 of vehicular communication device 500 in FIG. 5) and be enclosed in a vehicular housing.

As shown in FIG. 32, coexistence engine 2902 may include antenna system 3202 and radio transceiver 3204, which may be configured in the manner of antenna system 302 and radio transceiver 304 shown and described for network access node 110 in FIG. 3. Antenna system 3202 and radio transceiver 3204 may be configured to transmit and receive according to both the deterministic scheduling radio communication technology used by deterministic scheduling communication devices 2904-2910 (e.g., LTE, LTE V2V/V2X, or another deterministic scheduling radio communication technology) and the contention-based radio communication technology used by contention-based communication devices 2912-2916 (e.g., WiFi, DSRC, another IEEE 802.11-based radio access technology, or another contention-based radio communication technology). In some aspects, antenna system 3202 and radio transceiver 3204 may be configured for dual operation on both the deterministic scheduling radio communication technology and the contention-based radio communication technology, while in other aspects antenna system 3202 and radio transceiver 3204 may be respectively composed of a first antenna system and first RF transceiver configured for the deterministic scheduling radio communication technology and a second antenna system and second RF transceiver configured for the contention-based radio communication technology. Radio transceiver 3204 may provide baseband samples to communication arrangement 3206 in the receive direction and may receive baseband samples from communication arrangement 3206 in the transmit direction.

Coexistence engine 2902 may further include communication arrangement 3206 including carrier sensor 3208, communication processor 3210, scheduler 3212, and reservation manager 3214. Carrier sensor 3208, communication processor 3210, scheduler 3212, and reservation manager 3214 may be components of a physical layer processor (e.g., physical layer processor 308 of network access node 110 in FIG. 3) or a controller (e.g., controller 310 of network access node 110) of coexistence engine 2902. Although shown as logically separate components in FIG. 32, this illustrates the functional separation between carrier sensor 3208, communication processor 3210, scheduler 3212, and reservation manager 3214, and does limit these components to being physically separate. Accordingly, in some aspects one or more of carrier sensor 3208, communication processor 3210, scheduler 3212, and reservation manager 3214 may be physically separate components, while in other aspects one or more of carrier sensor 3208, communication processor 3210, scheduler 3212, and reservation manager 3214 may be physically integrated components, such as a digitally-configured hardware arrangement including circuitry to perform multiple functions or a processor configured to execute multiple subroutines.

In some aspects, carrier sensor 3208 may be a processor or dedicated hardware component that is configured to perform carrier sensing to listen to a channel and determine whether the channel is busy or free. In some processor implementations, carrier sensor 3208 may be configured to retrieve (e.g., from a local memory) and execute program code that algorithmically defines the operations for receiving baseband samples from radio transceiver 3204, processing the baseband samples to determine whether the channel has radio energy above a threshold in a reservation interval (e.g., for physical carrier sensing), and processing the baseband samples to determine whether the channel contains preambles specifying a reservation period (e.g., for virtual carrier sensing). The program code may be updatable, such as wirelessly or by a manual install. Carrier sensor 3208 may optionally also include hardware accelerators configured to perform dedicated processing involved in these operations. In some hardware implementations, carrier sensor 3208 may be hardware circuitry that is configured with digital logic that defines the operations for receiving baseband samples from radio transceiver 3204, processing the baseband samples to determine whether the channel has radio energy above a threshold in a reservation interval, and processing the baseband samples to determine whether the channel contains preambles specifying a reservation period. In some aspects, carrier sensor 3208 may be a physical layer component, such as a component of a physical layer processor of coexistence engine 2902. With reference to FIG. 30, carrier sensor 3208 may be configured to perform the carrier sensing functionality of coexistence engine 2902 in stage 3002, and to notify reservation manager 3214 when the channel is free.

Communication processor 3210 may be a processor configured to control the transmit and receive operations of coexistence engine 2902, which can include providing received data to carrier sensor 3208 and scheduler 3212 and receiving data from carrier sensor 3208 and scheduler 3212 for transmission. Communication processor 3210 may be configured to retrieve (e.g., from a local memory) and execute a program code that algorithmically defines the processing involved for receiving and transmitting such data. The program code may be updatable, such as wirelessly or by a manual install. In some aspects, communication processor 3210 may be a physical layer and/or protocol stack component configured to transmit, receive, and process data according to the physical layer and protocol stack formatting. The program code executed by communication processor 3210 may therefore be physical layer and/or protocol stack software. As coexistence engine 2902 may be configured to transmit and receive data for both the deterministic scheduling radio communication technology and the contention-based radio communication technology, communication processor 3210 may be configured to execute the protocol stack for both the deterministic scheduling radio communication technology and the contention-based radio communication technology. In some aspects, communication processor 3210 may therefore be a dual-mode protocol processor or two separate protocol processors. Communication processor 3210 may be configured to receive baseband samples from radio transceiver 3204 that represent the wireless signals on the channel and provide the baseband samples to carrier sensor 3208 for processing, to receive the channel resource allocation messages from scheduler 3212 and provide the channel resource allocation messages to radio transceiver 3204 for transmission, and to perform transmission related to channel reservations.

Scheduler 3212 may be a processor configured to determine resource allocations for the deterministic scheduling communication devices served by coexistence engine 2902, such as deterministic scheduling communication devices 2904-2910. Accordingly, scheduler 3212 may retrieve (e.g., from a local memory) and execute program code that defines the procedure for identifying the deterministic scheduling communication devices that will be allocated channel resources, determining a channel resource allocation that allocates different channel resources to the deterministic scheduling communication devices (e.g., as in stage 3006 of FIG. 30), generating channel resource allocation messages (e.g., as in stage 3008 of FIG. 30), and providing the channel resource allocation messages to communication processor 3210 for transmission. The program code may be updatable, such as wirelessly or by a manual install. In some aspects, scheduler 3212 may be a protocol stack component, such as a Media Access Control (MAC) scheduler.

Reservation manager 3214 may be a processor responsible for obtaining and maintaining channel reservations. Carrier sensor 3208 may be configured to notify reservation manager 3214 when the channel is free, such as when there have not been any detectable transmissions on the channel for a reservation interval. Reservation manager 3214 may be configured to determine when to reserve the channel and to determine the duration of the reservation window. This can include determining the duration of fixed reservation windows prior to reserving the channel and/or deciding to end a floating reservation window after the channel is reserved. Reservation manager 3214 may therefore be configured to generate reservation and termination messages for transmission by communication processor 3210 via radio transceiver 3204. In some aspects where coexistence engine 2902 is configured to transmit dummy noise or preambles to maintain the channel reservation (e.g., to avoid transmission breaks longer than the sensing interval), reservation manager 3214 may be configured to trigger transmission of the dummy noise or preamble by instructing communication processor 3210 to transmit the dummy noise or preamble. In some aspects, carrier sensor 3208 may be configured to notify reservation manager 3214 when the channel has been free for almost a sensing interval, which may prompt reservation manager 3214 to trigger transmission of dummy noise or a preamble to prevent contention-based communication devices 2912-2916 from accessing the channel. Reservation manager 3214 may be configured to retrieve (e.g., from a local memory) and execute program code that defines this functionality in the form of executable instructions. The program code may be updatable, such as wirelessly or by a manual install. In some aspects, reservation manager 3214 may be a protocol stack component of coexistence engine 2902.

As previously indicated regarding FIGS. 31A and 31B, in some aspects coexistence engine 2902 may be configured to transmit dummy noise and/or preambles in transmission breaks would otherwise be longer than the sensing interval. This can thus avoid transmission breaks longer than the sensing interval, and may prevent contention-based communication devices 2912-2916 from accessing the channel during the reservation window.

In some aspects, carrier sensor 3208 may be configured to monitor the channel with carrier sensing, and to notify reservation manager 3214 when the channel is busy and when the channel is free. Reservation manager 3214 may then be configured to track (e.g., with a counter) how long each transmission break is in real-time. If reservation manager 3214 detects that an ongoing transmission break reaches a duration of a triggering interval, reservation manager 3214 may trigger a transmission on the channel (via radio transceiver 3204 and antenna system 3202). In some aspects, the triggering interval may have a duration that is less than the sensing interval (e.g., slightly less, such as 90-95% of the length of the sensing interval), and accordingly reservation manager 3214 may prevent ongoing transmission breaks from lasting longer than a sensing interval in duration. This can consequently prevent contention-based communication devices 2912-2916 from accessing the channel.

In some aspects, reservation manager 3214 may be configured to prevent transmission breaks from lasting a sensing interval by triggering transmissions based on a transmission schedule of coexistence engine 2902 and deterministic scheduling communication devices 2904-2910. For example, as previously described scheduler 3212 may be configured to determine channel resource allocations for uplink that specify when deterministic scheduling communication devices 2904-2910 are scheduled to transmit on the channel. In some aspects, scheduler 3212 may also determine channel resource allocations for downlink that specify when deterministic scheduling communication devices 2904-2910 are scheduled to receive on the channel, and by extension when coexistence engine 2902 is scheduled to transmit on the channel. Scheduler 3212 may provide the channel resource allocations for uplink and downlink to reservation manager 3214, which may then be able to identify uplink transmission time periods when deterministic scheduling communication devices 2904-2910 will transmit on the channel and downlink transmission time periods when coexistence engine 2902 will transmit on the channel.

Based on the uplink and downlink transmission time periods, reservation manager 3214 may then be configured to identify scheduled intervening periods that occur between subsequent transmissions. Reservation manager 3214 can then determine whether any of the scheduled intervening periods are longer in duration than the sensing interval. If any of the scheduled intervening periods are longer in duration than the sensing interval, reservation manager 3214 may trigger one or more transmissions during the scheduled intervening period to prevent the scheduled intervening period (and all resulting intervening periods between these transmissions and the scheduled uplink and downlink transmissions) from persisting longer than the sensing interval. As all resulting intervening periods will therefore be less than the sensing interval, contention-based communication devices 2912-2916 may not be able to access the channel.

FIG. 33 shows an exemplary internal configuration of deterministic scheduling communication device 2904 according to some aspects. Deterministic scheduling communication devices 2906-2910 may also be configured in the manner shown in FIG. 33. As shown in FIG. 33, deterministic scheduling communication device 2904 may include antenna system 3302 and RF transceiver 3304, which may be configured in the manner of antenna system 202 and RF transceiver 204 as previously shown and described for terminal device 102 of FIG. 2. Antenna system 3302 and RF transceiver 3304 may thus receive and process wireless signals to produce baseband samples for processing by communication arrangement 3306 in the receive direction, and may receive and process baseband samples provided by communication arrangement 3306 to generate and transmit wireless signals in the transmit direction.

Deterministic scheduling communication device 2904 may further include communication arrangement 3306 including scheduler 3308 and communication processor 3310. Scheduler 3308 and communication processor 3310 may be components of a digital signal processor (e.g., digital signal processor 208 of terminal device 102 in FIG. 2), a controller (e.g., controller 210 of terminal device 102), or an application processor (e.g., application processor 212 of terminal device 102) of deterministic scheduling communication device 2904. The depiction of FIG. 33 thus illustrates that while deterministic scheduling communication device 2904 may include scheduler 3308 and communication processor 3310, these components are not limited to being exclusively implemented as part of the physical layer, protocol stack, or application layer. Furthermore, although shown as logically separate components in FIG. 33, this illustrates the functional separation between scheduler 3308 and communication processor 3310 and does limit these components to being physically separate. Accordingly, in some aspects one or more of scheduler 3308 and communication processor 3310 may be physically separate components, while in other aspects one or more of scheduler 3308 and communication processor 3310 may be physically integrated components, such as a digitally-configured hardware arrangement including circuitry to perform multiple functions or a processor configured to execute multiple subroutines.

Scheduler 3308 may be configured to receive data from communication processor 3310 that includes channel resource allocation messages. Scheduler 3308 may be configured to read the channel resource allocation messages to determine the channel resource allocation assigned to deterministic scheduling communication device 2904, and to specify the channel resource allocation to communication processor 3310. In some aspects, scheduler 3308 may be a processor configured to retrieve (e.g., from a local memory) and execute program code that algorithmically defines the procedure for receiving a channel resource allocation message, interpreting the channel resource allocation message according to a predefined format for channel resource allocation messages, and determining the channel resource allocation assigned to deterministic scheduling communication device 2904. The program code may be updatable, such as wirelessly or by a manual install. For example, scheduler 3308 may receive data representative of the channel resource allocation message, and separate the data into corresponding fields according to the predefined format. Scheduler 3308 may then interpret the data in each field to obtain a value for the data (e.g., depending on the field type, such as numerical, text, or Boolean data). At least some of the fields may contain data identifying the channel resources assigned to deterministic scheduling communication device 2904, such as by identifying one or more of subcarriers, time slots, or other transmission or reception parameters that define the assigned channel resources based on the data in the fields. By identifying the channel resources, scheduler 3308 may identify the channel resource allocation assigned to deterministic scheduling communication device 2904, which may then transmit and/or receive using the assigned channel resources via its communication processor 3310. In some aspects, scheduler 3308 may be a protocol stack component of deterministic scheduling communication device 2904, such as a MAC scheduler.

Communication processor 3310 may be a processor configured to perform the transmit and receive operations of deterministic scheduling communication device 2904, including providing baseband samples to RF transceiver 3304 for wireless transmission in the transmit direction and receiving baseband samples from RF transceiver 3304 for reception processing in the receive direction. Communication processor 3310 may be configured to retrieve (e.g., from a local memory) and execute program code that algorithmically defines the processing for this transmission and reception. In some aspects, communication processor 3310 may be a protocol stack and/or physical layer component, and may control the transmission and reception of wireless signals from deterministic scheduling communication device 2904 according to physical layer and protocol stack formatting for the deterministic scheduling radio communication technology. For example, the program code may configure communication processor 3310 perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. The program code may additionally or alternatively configure communication processor 3310 to perform one or more of header compression and encapsulation, security, error checking and correction, channel multiplexing, scheduling and priority, and setup and maintenance of radio bearers, or any other protocol stack functions. The program code may be updatable, such as wirelessly or by a manual install. Communication processor 3310 may further be configured to receive the channel resource allocation from scheduler 3308, and to transmit and receive on the channel using the channel resources allocated to deterministic scheduling communication device 2904. This can include, in the transmit direction, identifying outgoing data intended for one or more destinations (e.g., other communication devices), and processing (e.g., according to physical layer processing functions) and mapping the outgoing data to be transmitted on the channel resources allocated for transmission by the channel resource allocation, and, in the receive direction, receiving data on channel resources allocated for reception by the channel resource allocation, and de-mapping and processing (e.g., according to physical layer processing functions) the data on the channel resources to recover the incoming data.

FIG. 34 shows an exemplary internal configuration of contention-based communication device 2912. In some aspects, contention-based communication devices 2914 and 2916 may be configured in the same manner as shown in FIG. 34. As shown in FIG. 34, contention-based communication device 2912 may include antenna system 3402 and RF transceiver 3404, which may be configured in the manner of antenna system 202 and RF transceiver 204 as previously shown and described for terminal device 102 of FIG. 2. Antenna system 3402 and RF transceiver 3404 may thus receive and process wireless signals to produce baseband samples for processing by communication arrangement 3406 in the receive direction, and may receive and process baseband samples provided by communication arrangement 3406 to generate and transmit wireless signals in the transmit direction.

Contention-based communication device 2912 may further include communication arrangement 3406 including carrier sensor 3408 and communication processor 3410. Carrier sensor 3408 and communication processor 3410 may be components of a digital signal processor (e.g., digital signal processor 208 of terminal device 102 in FIG. 2), a controller (e.g., controller 210 of terminal device 102), or an application processor (e.g., application processor 212 of terminal device 102) of contention-based communication device 2912. The depiction of FIG. 34 thus illustrates that while contention-based communication device 2912 may include carrier sensor 3408 and communication processor 3410, these components are not limited to being exclusively implemented as part of the physical layer, protocol stack, or application layer. Furthermore, although shown as logically separate components in FIG. 34, this illustrates the functional separation between carrier sensor 3408 and communication processor 3410 and does limit these components to being physically separate. Accordingly, in some aspects one or more of carrier sensor 3408 and communication processor 3410 may be physically separate components, while in other aspects one or more of carrier sensor 3408 and communication processor 3410 may be physically integrated components, such as a digitally-configured hardware arrangement including circuitry to perform multiple functions or a processor configured to execute multiple subroutines.

Carrier sensor 3408 may be configured to perform the carrier sensing functionality of contention-based communication device 2912, including listening to a channel to determine whether the channel is busy or free. In some aspects, carrier sensor 3408 may be a processor or dedicated hardware component. In some processor implementations, carrier sensor 3408 may be configured to retrieve (e.g., from a local memory) and execute program code that algorithmically defines the operations for receiving baseband samples from RF transceiver 3404, processing the baseband samples to determine whether the channel has radio energy above a threshold in a sensing interval (e.g., for physical carrier sensing), processing the baseband samples to determine whether the channel contains preambles specifying a reservation period (e.g., for virtual carrier sensing), and/or performing a backoff procedure if the channel is busy. The program code may be updatable, such as wirelessly or by a manual install. Carrier sensor 3408 may optionally also include hardware accelerators configured to perform dedicated processing involved in these operations. In some hardware implementations, carrier sensor 3408 may be hardware circuitry that is configured with digital logic that defines the operations for receiving baseband samples from RF transceiver 3404, processing the baseband samples to determine whether the channel has radio energy above a threshold in a sensing interval, processing the baseband samples to determine whether the channel contains preambles specifying a reservation period, and/or performing a backoff procedure if the channel is busy. In some aspects, carrier sensor 3408 may be a physical layer component, such as a component of a digital signal processor of contention-based communication device 2912. With reference to FIG. 30, carrier sensor 3408 may be configured to perform the carrier sensing and busy channel determination in stages 3018 and 3020, and may be configured to notify communication processor 3410 when the channel is busy and/or free.

Communication processor 3410 may be a processor configured to perform the transmit and receive operations of contention-based communication device 2912, including providing baseband samples to RF transceiver 3404 for wireless transmission in the transmit direction and receiving baseband samples from RF transceiver 3404 for reception processing in the receive direction. Communication processor 3410 may be configured to retrieve (e.g., from a local memory) and execute program code that algorithmically defines the processing for this transmission and reception. The program code may be updatable, such as wirelessly or by a manual install. In some aspects, communication processor 3410 may be a protocol stack and/or physical layer component, and may control the transmission and reception of wireless signals from contention-based communication device 2912 according to physical layer and protocol stack formatting for the contention-based radio communication technology. For example, the program code may configure communication processor 3410 perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. The program code may additionally or alternatively configure communication processor 3410 to perform one or more of header compression and encapsulation, security, error checking and correction, channel multiplexing, scheduling and priority, and setup and maintenance of radio bearers, or any other protocol stack functions. In connection with scheduling, the program code may configure communication processor 3410 to, in the transmit direction, identifying outgoing data intended for one or more destinations (e.g., other communication devices), and processing (e.g., according to physical layer processing functions) and mapping the outgoing data to be transmitted on the channel resources allocated for transmission, and, in the receive direction, receiving data on channel resources allocated for reception, and de-mapping and processing (e.g., according to physical layer processing functions) the data on the channel resources (e.g., according to the physical layer to recover the incoming data. Communication processor 3310 may further be configured to receive notifications from carrier sensor 3408 that indicate whether the channel is free or busy, and to transmit and receive on the channel as needed when the channel is free.

Various examples described above may relate to aspects where coexistence engine 2902 is a network access node that is serving deterministic scheduling communication devices 2904-2910, and thus handles the channel resource allocations for the deterministic scheduling of deterministic scheduling communication devices 2904-2910. In other aspects, coexistence engine 2902 may be separate from the network access node that is serving deterministic scheduling communication devices 2904-2910. For example, in some aspects coexistence engine 2902 may intervene into communications on the channel to reserve the channel for use by the deterministic scheduling system, and a separate network access node that is serving deterministic scheduling communication devices 2904-2910 may then generate and provide the channel resource allocations to deterministic scheduling communication devices 2904-2910.

Figure 35:
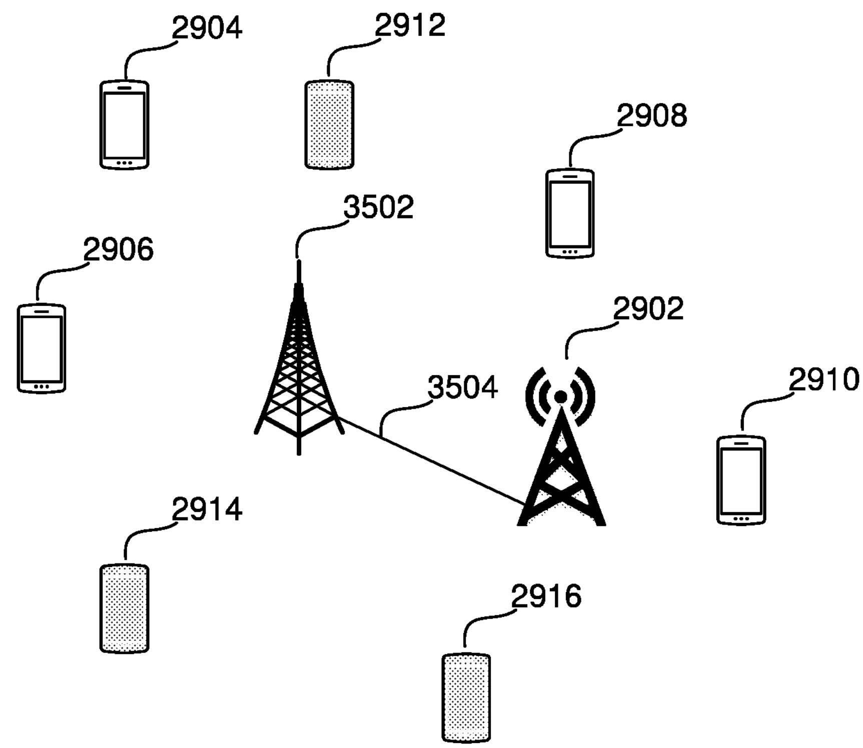
FIG. 35 shows an exemplary network architecture describing an example for use of a network access node by a coexistence engine for centralized channel access control according to some aspects.

FIG. 35 shows an example in which network access node 3502 may be the serving network access node for deterministic scheduling communication devices 2904-2910. Network access node 3502 may thus be configured to generate and provide channel resource allocations to deterministic scheduling communication devices 2904-2910 while coexistence engine 2902 may be configured to reserve the channel for use by network access node 3502 and deterministic scheduling communication device 2904-2910.

Figure 36:
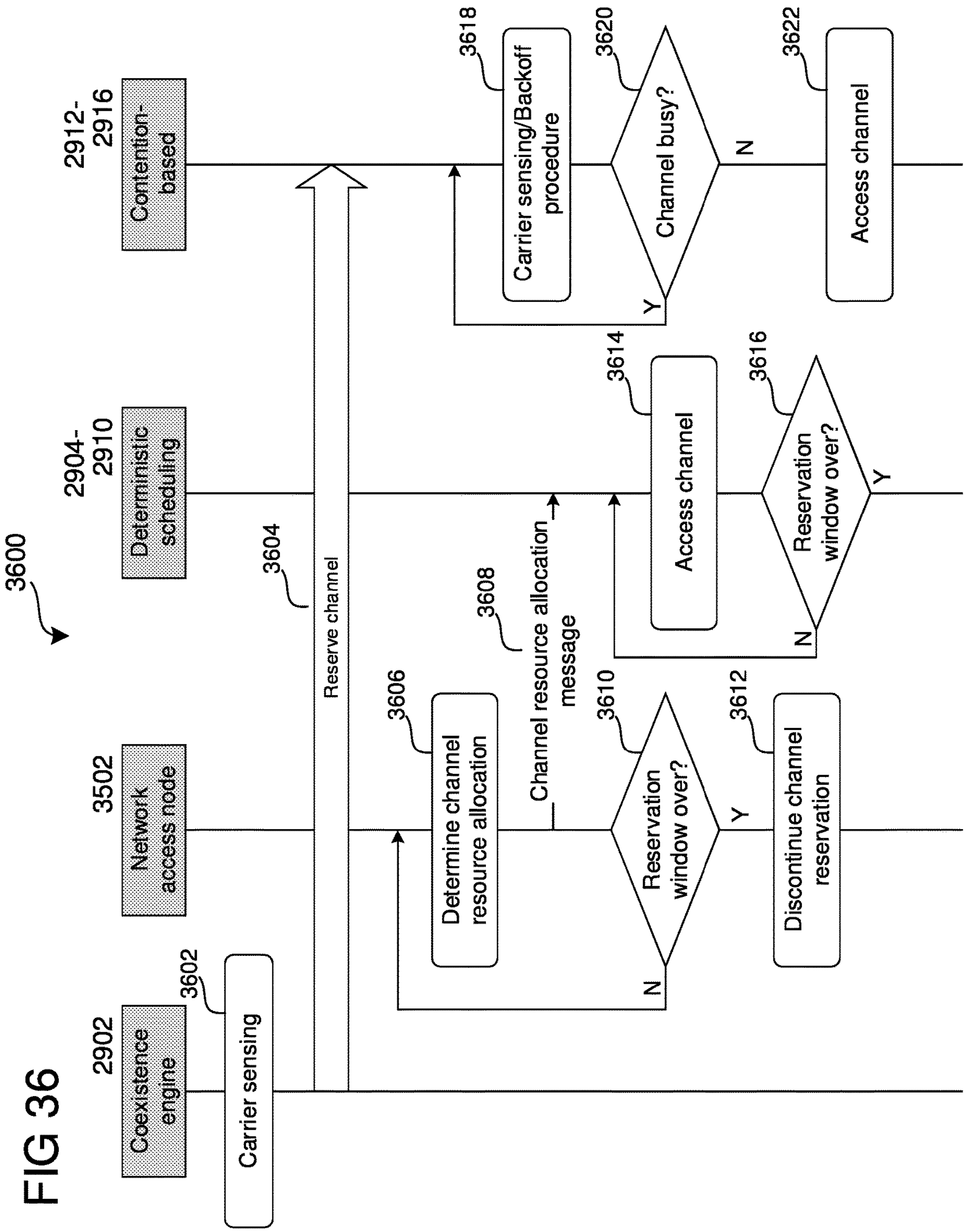
FIG. 36 shows an exemplary message sequence chart describing centralized channel access control with a coexistence engine and network access node according to some aspects.

FIG. 36 shows exemplary message sequence chart 3600, which shows the channel reservation and channel resource allocation procedure according to some aspects. As shown in FIG. 36, coexistence engine 2902 may perform carrier sensing in stage 3602 using the reservation interval to determine when the channel becomes free. Coexistence engine 2902 may then reserve the channel in stage 3604 by transmitting a reserving transmission. For example, in some aspects coexistence engine 2902 may transmit a reservation message as the reserving transmission to network access node 3502 and/or deterministic scheduling communication devices 2904-2910 that indicates that the channel is reserved, where transmission of the reservation message may reserve the channel against use by contention-based communication devices 2912-2916 for at least for the duration of a sensing interval. In some aspects, coexistence engine 2902 may wirelessly transmit the reservation message to network access node 3502, such as where reservation manager 3214 wirelessly transmits a reservation message (via communication processor 3210) that is wirelessly received by a counterpart reservation manager of network access node 2502. In other aspects, coexistence engine 2902 may use a wired interface, such as wired interface 3504 as shown in FIG. 35, with network access node 3502 to notify network access node 3502 that the channel is reserved. Reservation manager 194 may similarly transmit a reservation message over wired interface 3504 to a counterpart reservation manager of network access node 2502.

Network access node 3502 and deterministic scheduling communication devices 2904-2910 may then occupy the channel for a reservation window. Accordingly, network access node 3502 may determine channel resource allocation for deterministic scheduling communication devices

2904-2910 in stage 3606, and may then transmit channel resource allocation messages that specify the channel resource allocation to deterministic scheduling communication devices 2904-2910 in stage 3608. Deterministic scheduling communication devices 2904-2910 may receive the channel resource allocation messages and subsequently access the channel using the respectively assigned channel resource allocation in stage 3614.

In some aspects, network access node 3502 and deterministic scheduling communication devices 2904-2910 may repeat the procedure of stages 3606-3614 for a plurality of allocation periods, such as until the reservation window is over. In some aspects, coexistence engine 2902 may be configured to determine a fixed reservation window before reserving the channel, and indicate the reservation window to network access node 3502, such as in a reservation message. In some aspects, coexistence engine 2902 may use a floating reservation window, and may accordingly notify network access node 3502 once the reservation window has ended (e.g., via a wireless or wired transmission). In some aspects, network access node 3502 may be configured to determine a fixed reservation window prior to the channel reservation, or may be configured to use a floating reservation window to decide when to end the channel reservation.

Accordingly, network access node 3502 may determine that the reservation window is over at stage 3610, and may then discontinue the channel reservation at stage 3612. This can include transmitting a termination message to deterministic scheduling communication devices 2904-2910 or ceasing to send channel resource allocation messages to deterministic scheduling communication devices 2904-2910.

Network access node 3502 and/or coexistence engine 2902 may be configured to maintain the channel reservation by avoiding transmission breaks longer than the sensing interval used by contention-based communication devices 2912-2916. In some aspects, one or both of network access node 3502 and coexistence engine 2902 may be configured to transmit dummy noise and/or preambles to avoid transmission breaks longer than the sensing interval. In various aspects, this functionality can thus be handled by either coexistence engine 2902 or network access node 3502. For example, in some aspects coexistence engine 2902 may be responsible for maintaining the channel reservation by avoiding transmission breaks longer than the sensing interval, and may accordingly be configured to listen to the channel and, if a transmission break occurs that is about to exceed the duration of the sensing interval, may begin transmitting dummy noise or a preamble. In some aspects, network access node 3502 may perform this listening and transmission to maintain the channel reservation. In some aspects, network access node 3502 may manage the communication schedule with deterministic scheduling communication devices 2904-2910 (e.g., as shown and described for FIGS. 31A and 31B) to avoid transmission breaks longer than the sensing interval.

Accordingly, if any of contention-based communication devices 2912-2916 attempt to use the channel during the reservation window by performing carrier sensing in stage 3618, the contention-based communication device will detect a transmission by one of network access node 3502, deterministic scheduling communication devices 2904-2910, or coexistence engine 2902, and may determine that the channel is busy in stage 3620. The contention-based communication device may then perform a backoff procedure in stage 3618, and once again determine that the channel is busy in stage 3620. This may continue until the reservation window ends, after which contention-based communication devices 2912-2916 may access the channel at stage 3622 following the expiry of a sensing interval after the end of the last communication in the reservation window by network access node 3502, deterministic scheduling communication devices 2904-2910, or coexistence engine 2902. In some aspects, coexistence engine 2902 or network access node 3502 may transmit a preamble at one or more times during the reservation window that indicates the remaining duration of the reservation window, where the preamble is in a message format readable by contention-based communication devices 2912-2916. If any of contention-based communication devices 2912-2916 detect and read the preamble as part of virtual carrier sensing, the contention-based communication device may assume that the channel will be busy until at least the end of the reservation window and may suspend carrier sensing until the reservation window expires.

In some aspects related to FIG. 36, coexistence engine 2902 may be configured in the manner shown and described for FIG. 32 (optionally without scheduler 3212). Coexistence engine 2902 may thus determine when the channel is free with carrier sensor 3208 and determine when to trigger channel reservations and control maintenance of channel reservations with reservation manager 3214. Deterministic scheduling communication devices 2904-2910 may be configured in the manner shown and described for FIG. 33, and may receive the channel resource allocation messages from network access node 3502 instead of coexistence engine 2902.

In some aspects, coexistence engine 2902 may be configured where antenna system 3202 and radio transceiver 3204 are remote components, such as part of a network of remote nodes that serves coexistence engine 2902. Antenna system 3202 and radio transceiver 3204 may therefore be a single remote node out of a network of remote nodes that serve coexistence engine 2902. Coexistence engine 2902 may monitor the data provided by the remote nodes of the sensor network to determine when the channel is free. In some aspects, communication arrangement 2906 may be provided as a core network component that interfaces with remote nodes that are deployed in the operation area of deterministic scheduling communication devices 2904-2910 and contention-based communication devices 2912-2916 (e.g., in the coverage area of network access node 3502).

Figure 37:
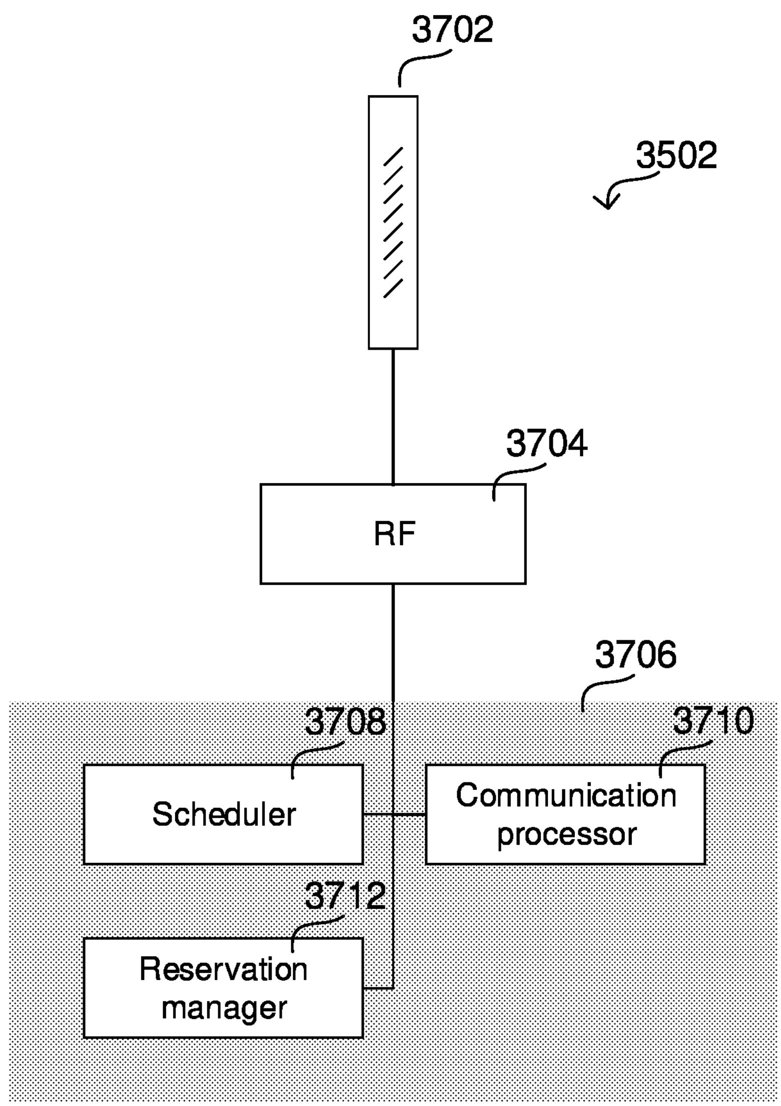
FIG. 37 shows an exemplary internal configuration of a network access node configured for centralized channel access control according to some aspects.

Network access node 3502 may be configured in the manner shown in FIG. 37, and accordingly may include antenna system 3702, radio transceiver 3704, and communication arrangement 3706. Antenna system 3702 and radio transceiver 3704 may be configured in the manner of antenna system 302 and radio transceiver 304 of network access node 110 in FIG. 3, and accordingly may be configured to receive and process wireless signals to obtain baseband samples for communication arrangement 3706 and to receive and process baseband samples provided by communication arrangement 3706 to produce wireless signals for transmission.

Communication arrangement 3706 may include scheduler 3708 and communication processor 3710, which may be configured in the manner of scheduler 3212 and communication processor 3210 as shown and described for coexistence engine 2902 in FIG. 32. Scheduler 3708 may therefore determine the channel resource allocation for deterministic scheduling communication devices 2904-2910 and generate channel resource allocation messages for communication processor 3710 to transmit.

Communication arrangement 3706 may also include reservation manager 3712, which may be configured to manage the channel reservation. Reservation manager 3712 may therefore be configured to determine when coexistence engine 2902 has triggered a channel reservation, such as by receiving a reservation message from coexistence engine 2902 via communication processor 3710. In aspects where network access node 3502 is configured control the duration of the reservation window, reservation manager 3712 may be configured to determine when to end the reservation window, and may accordingly provide a termination message to communication processor 3710 for transmission.

Reservation manager 3712 may act as a counterpart to reservation manager 3214 of coexistence engine 2902 and may transmit and receive messages with reservation manager 3214, such as reservation messages. Reservation manager 3214 may therefore notify reservation manager 3712 when the channel is reserved with a reservation message, which can optionally specify the length of a fixed reservation window. In some aspects, the reservation message may specify a reservation start time at which the channel is reserved. Reservation manager 3712 may then notify scheduler 3708 that the channel is reserved, and scheduler 3708 may determine a channel resource allocation and transmit corresponding channel resource allocation messages to deterministic scheduling communication devices 2904-2910 that allocate channel resources to deterministic scheduling communication devices 2904-2910 for a time period after the reservation start time. In some aspects, the reservation message may not explicitly specify a reservation start time, and reservation manager 3712 may assume that the channel is currently reserved. Reservation manager 3712 may then notify scheduler 3708 that the channel is reserved, and scheduler 3708 may determine a channel resource allocation and transmit corresponding channel resource allocation messages to deterministic scheduling communication devices 2904-2910 that allocate channel resources to deterministic scheduling communication devices 2904-2910 for a time period after the receipt of the reservation message.

In some aspects where floating reservation windows are used, reservation manager 3214 may be configured to decide when to end a floating reservation window and may notify reservation manager 3712 when the reservation window will end. For example, reservation manager 3214 may transmit a termination message to reservation manager 3712 that indicates that the reservation window will end at a specified reservation end time or that the reservation window has ended. Reservation manager 3712 may then notify scheduler 3708 that the reservation window will end at a specified reservation end time or has ended. Scheduler 3708 may then cease transmitting channel resource allocations to deterministic scheduling communication devices 2904-2910 immediately if the termination message indicates the reservation window has ended or may cease transmitting channel resource allocations to deterministic scheduling communication devices 2904-2910 once the reservation end time occurs (e.g., so that the last transmission in the reservation window finishes prior to the reservation end time).

In some aspects, reservation manager 3712 may be configured to decide when to end a floating reservation window, and may notify reservation manager 3214 when to end the reservation window by transmitting a termination message to reservation manager 3214. The termination message may instruct reservation manager 3214 to immediately terminate the reservation window, or to terminate the reservation at a reservation end time specified included in the termination message. Reservation manager 3214 may then cease to maintain the reservation of the channel for network access node 3502, such as by ceasing the transmission of dummy noise or preambles during transmission breaks that would otherwise exceed the sensing interval in duration.

Deployment of coexistence engine 2902 may therefore facilitate control over access to a channel by both contention-based and deterministic scheduling communication devices. As coexistence engine 2902 may use a reservation interval shorter than the sensing interval to initially access the channel, and may subsequently avoid transmission breaks longer than the sensing interval, coexistence engine 2902 may prevent contention-based communication devices from accessing the channel. Coexistence engine 2902 may thus initiate and maintain a channel reservation for deterministic scheduling communication devices.

In some aspects, coexistence engine 2902 may be configured to control access to the channel over a sequence of reservation windows and open windows, where the channel is reserved for use by deterministic scheduling communication devices during reservation windows and open for use by contention-based communication devices during open windows. In some aspects, coexistence engine 2902 may control the ratio of time allocated for deterministic scheduling and contention-based scheduling by controlling the cumulative duration of reservation windows versus the cumulative duration of open windows (e.g., the cumulative durations over a particular period of time). For example, if there are a large number of deterministic scheduling communication devices using the channel and a small number of contention-based communication devices using the channel, coexistence engine 2902 may be configured to control channel access to provide a larger cumulative duration of reservation windows (e.g., a higher frequency of reservation windows and/or a longer duration of reservation windows) compared to open windows.

In some aspects, coexistence engine 2902 may be configured to collect and evaluate channel resource usage information by deterministic scheduling and contention-based communication devices, such as in the manner of coexistence engine 1812 in aspects of centralized spectrum allocation shown and described in FIGS. 18-24. For example, coexistence engine 2902 may be configured to monitor channel resource usage information (e.g., with a sensor network and/or with antenna system 3202 and radio transceiver 3204) by deterministic scheduling and contention-based communication devices, aggregate the channel resource usage information, and evaluate the channel aggregated channel resource usage information to determine whether channel resource usage is greater for contention-based communication devices or deterministic scheduling communication devices. Coexistence engine 2902 may then be configured to control access to the channel based on whether the channel resource usage is greater for contention-based communication devices or deterministic scheduling communication devices, such as by providing a greater cumulative duration of reservation windows if the deterministic scheduling communication devices use more channel resources or providing a greater cumulative duration of open windows if the contention-based communication devices use more channel resources.

In some aspects, reservation manager 3214 may be configured to perform this functionality of coexistence engine 2902, and may therefore trigger channel reservations according to the ratio of time between reservation windows and open windows. In some aspects, reservation manager 3214 may be configured to determine a target ratio of reservation windows to open windows, and may attempt to control access to the channel where the ratio of the cumulative duration of reservation windows to the cumulative duration of open windows is close to the target ratio (e.g., within a tolerance range of the target ratio over a particular period of time). Reservation manager 3214 may then control the triggering of reservation windows and the duration of the triggered reservation windows in attempting to meet the target ratio.

Figure 38:
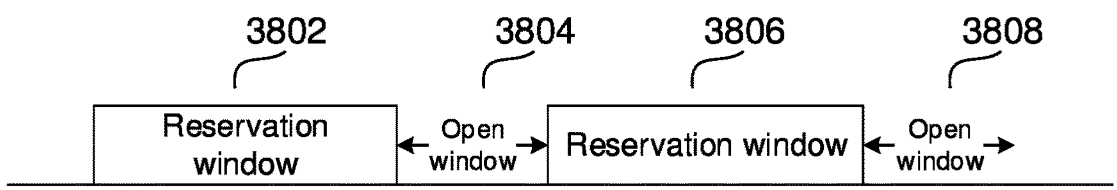
FIG. 38 shows an exemplary transmission timing chart with reservation windows for centralized channel access control according to some aspects.

FIG. 38 shows an example where reservation manager 3214 may use a target ratio of 2:1 according to some aspects. Reservation manager 3214 may arrange the reservation windows and open windows so the cumulative duration of reservation windows is, for example, twice the cumulative duration of open windows. In the example of FIG. 38, reservation manager 3214 may control access to the channel to produce reservation windows 3802 and 3806 to each be twice the duration of open windows 3804 and 3808. While reservation windows 3802 and 3806 and open windows 3804 and 3808 are shown to have uniform length in FIG. 38, reservation manager 3214 may utilize any order and arrangement of reservation windows and open windows that produces a ratio equal to the target ratio. The ratio of 2:1 in FIG. 38 is exemplary and can be scaled to any other ratio. In some aspects, reservation manager 3214 may be configured to increase the target ratio if the channel resource usage by deterministic scheduling communication devices increases (e.g., over an observation period) relative to the channel resource usage by contention-based communication devices, and/or to decrease the target ratio if channel resource usage by deterministic scheduling communication devices decreases (e.g., over an observation period) relative to the channel resource usage by contention-based communication devices.

In some aspects, coexistence engine 2902 may deliberately provide transmission breaks longer than the sensing interval inside of a reservation window. This can provide openings for contention-based communication devices to use the channel for a short period of time without completely terminating the reservation interval.

Figure 39A:
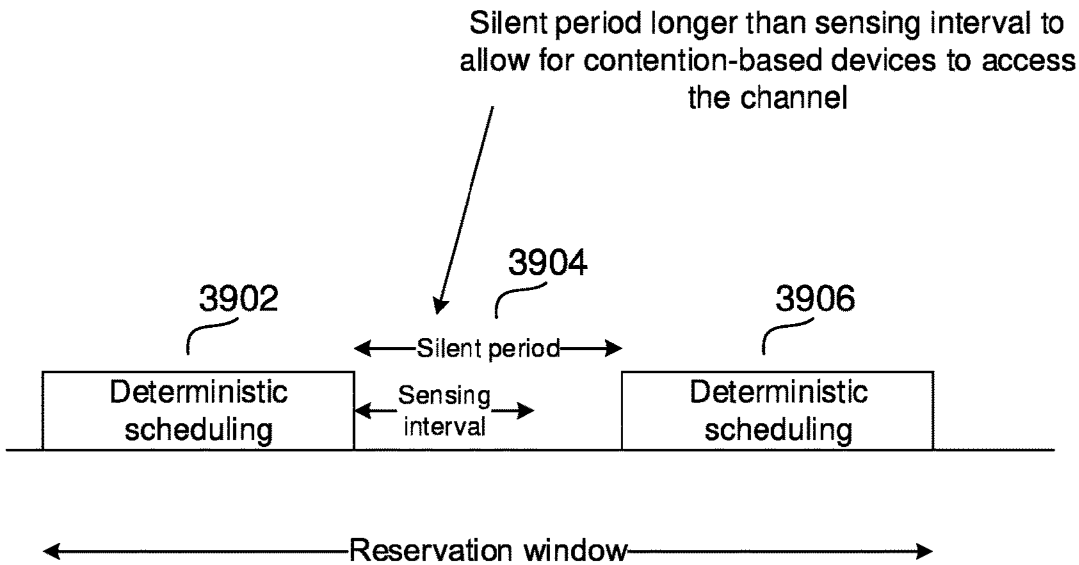
FIGS. 39A and 39B show exemplary transmission timing charts including silent periods for centralized channel access control according to some aspects.
Figure 39B:
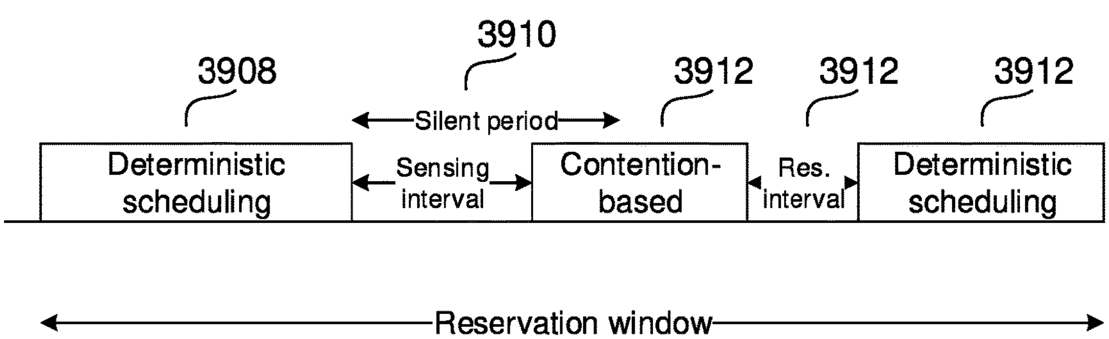

FIGS. 39A and 39B show exemplary timing charts according to some aspects. In the example of FIG. 39A, coexistence engine 2902 may use time period 3902 of a reservation window for deterministic scheduling (e.g., where a scheduler of coexistence engine 2902 or network access node 3502 allocates channel resources to deterministic scheduling communication devices 2904-2910). Instead of avoiding transmission breaks longer than the sensing interval, coexistence engine 2902 may deliberately provide silent period 3904 that is longer than the sensing interval. In some aspects, reservation manager 3214 of coexistence engine 2902 (or, alternatively, reservation manager of 3712 of network access node 3502) may control provision of silent period, such as by instructing scheduler 3212 to suspend channel resource allocations for the duration of the silent period and/or by refraining from transmitting dummy noise and/or preambles during transmission breaks.

As silent period 3904 is longer than the sensing interval used by contention-based communication devices 2912-2916, silent period 3904 may provide an opening for contention-based communication devices 2912-2916 to access the channel. In the example of FIG. 39A, none of contention-based communication devices 2912-2916 may access the channel during silent period 3904, and reservation manager 3214 may accordingly continue with deterministic scheduling in time period 3906.

In the example of FIG. 39B, one of contention-based communication devices 2912-2916 may determine that the channel is free during silent period 3910, and may use the channel for contention-based communications during time period 3912. In some aspects, reservation manager 3214 may be configured to permit only a single transmission by contention-based communication devices 2912-2916, and may re-occupy the channel immediately after a reservation interval 3912 has passed following the end of the transmission. In some aspects, reservation manager 3214 may be configured to permit multiple transmissions by contention-based communication devices 2912-2916, and may eventually re-occupy the channel at a subsequent time using the reservation interval. Reservation manager 3214 may then resume deterministic scheduling in time period 3912.

In some aspects, reservation manager 3214 may provide multiple silent periods in a reservation window, and may thus provide openings for contention-based communication devices 2912-2916 to use the channel during a reservation window. In some cases, this can reduce latency for contention-based communication devices 2912-2916, which may be able to transmit at an earlier point in time compared to waiting until the reservation window is over.

In some aspects, reservation manager 3214 may vary the frequency and/or duration of silent periods in a reservation window based on the channel resource usage of contention-based communication devices 2912-2916. For example, if reservation manager 3214 determines that the channel resource usage by contention-based communication devices 2912-2916 has increased, reservation manager 3214 may provide silent periods with a greater frequency and/or longer duration in reservation windows (and vice versa for decreasing channel resource usage). As previously described regarding centralized spectrum allocation, reservation manager 3214 may be configured to collect and evaluate channel resource usage information to determine whether channel resource usage is increasing or decreasing. Additionally or alternatively, in some aspects reservation manager 3214 may monitor whether the silent periods are used by any of contention-based communication devices 2912-2916. If the silent periods are not used by any of contention-based communication devices 2912-2916, reservation manager 3214 may be configured to conduct one or more shortening the duration, reducing the frequency, or completely suspending the silent periods. If the percentage of silent periods used by contention-based communication devices 2912-2916 increases and/or the number of contention-based communication devices 2912-2916 using silent periods increases, reservation manager 3214 may be configured to increase the duration and/or frequency of the silent periods. If the percentage of silent periods used by contention-based communication devices 2912-2916 decreases and/or the number of contention-based communication devices 2912-2916 using silent periods decreases, reservation manager 3214 may be configured to decrease the duration and/or frequency of the silent periods.

Accordingly, in various aspects reservation manager 3214 may be configured to vary the ratio of reservation windows to open windows and/or the amount of silent periods based on the channel resource usage by deterministic scheduling communication devices 2904-2910 and contention-based communication devices 2912-2916. Reservation manager 3214 may therefore be configured to balance the relative amount of time that the channel is reserved use by deterministic scheduling communication devices 2904-2910 and contention-based communication devices 2912-2916.

Similar to as described for coexistence engine 1812 for FIGS. 18-24, in some aspects coexistence engine 2902 may be configured to adjust the ratio of reservation windows to open windows and/or the occurrence silent periods according to both short-term and long-term bases. For example, if the channel resource usage by the deterministic scheduling radio communication technology increases relative to the channel resource usage by the contention-based radio communication technology over a long-term period (e.g., months or years), coexistence engine 2902 may be configured to gradually increase the ratio of reservation windows to open windows, and/or decrease the frequency and/or duration of silent periods. This can therefore provide the deterministic scheduling communication devices with a greater amount of access to the channel, which reflects the relative increase in channel resource usage by the deterministic scheduling radio communication technology relative to the channel resource usage by the contention-based radio communication technology. Accordingly, in an exemplary scenario with LTE V2V/V2X and DSRC, coexistence engine 2902 may gradually provide more access to the channel to deterministic scheduling communication devices (e.g., vehicular terminal devices using LTE V2V/V2X and LTE V2V/V2X base stations) than to contention-based communication devices (e.g., vehicular terminal devices using DSRC and DSRC RSUs) as LTE V2V/V2X gradually uses more channel resources than DSRC.

Figure 40:
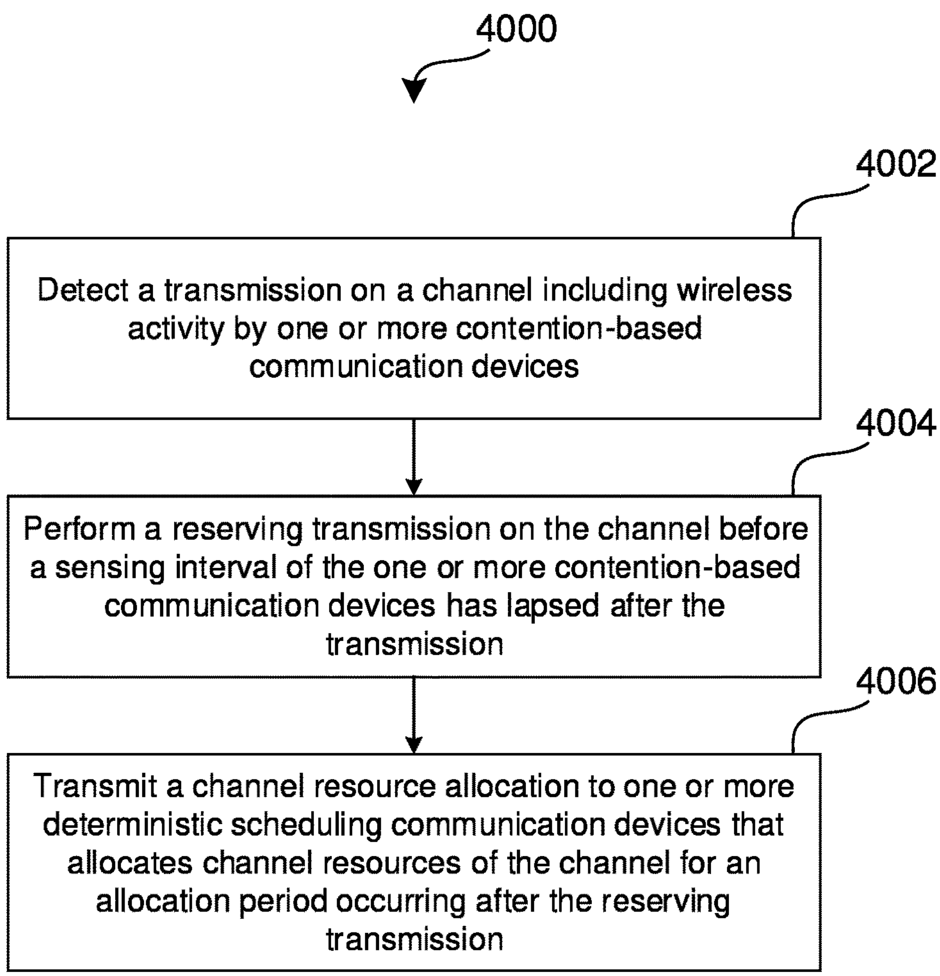
FIG. 40 shows a first exemplary method of performing wireless communications with centralized channel access control according to some aspects.

FIG. 40 shows exemplary method 4000 of performing radio communications according to some aspects. As shown in FIG. 40, method 4000 includes detecting a transmission on a channel including wireless activity by one or more contention-based communication devices (4002), performing a reserving transmission on the channel before a sensing interval of the one or more contention-based communication devices has lapsed after the transmission (4004), and transmitting a channel resource allocation to one or more deterministic scheduling communication devices that allocates channel resources of the channel for an allocation period occurring after the reserving transmission (4006).

Figure 41:
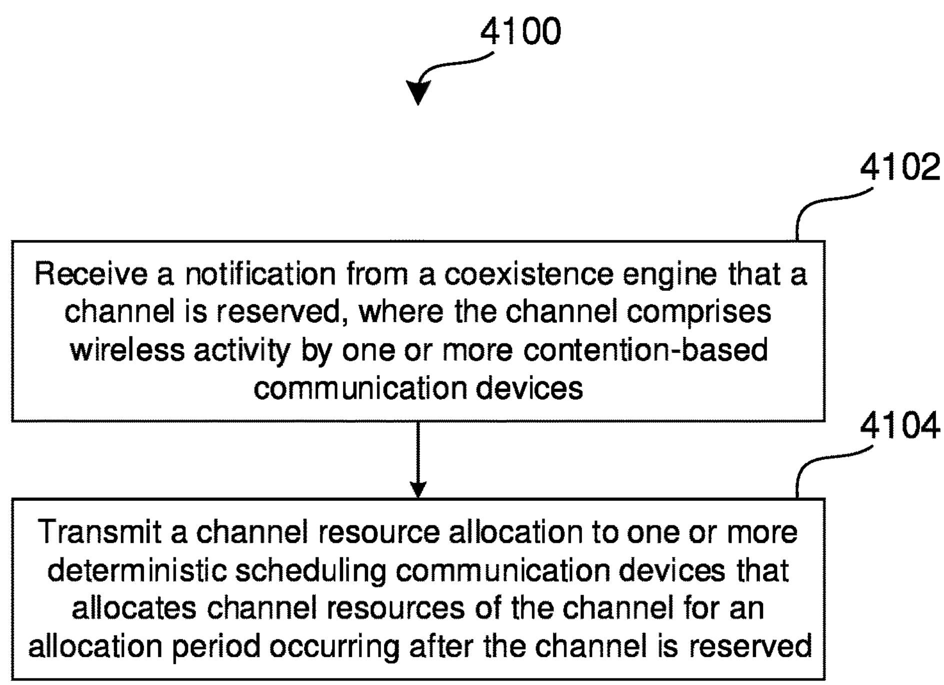
FIG. 41 shows a second exemplary method of performing wireless communications with centralized channel access control according to some aspects.

FIG. 41 shows exemplary method 4100 of performing radio communications according to some aspects. As shown in FIG. 41, method 4100 includes receiving a notification from a coexistence engine that a channel is reserved (4102), where the channel includes wireless activity by one or more contention-based communication devices, and transmitting a channel resource allocation to one or more deterministic scheduling communication devices that allocates channel resources of the channel for an allocation period occurring after the channel is reserved (4104).

Hybrid Multi-Radio Networks

The automotive industry is expected to undergo a transformation with vehicles gaining network and device-to-device connectivity as well as autonomous driving capabilities. To address complex situations, autonomous vehicular communication devices may use data from their own sensors and data from other vehicular communication devices to assist with and control autonomous driving. Cooperation among vehicular communication devices may therefore improve the data rate therebetween and accuracy of their respective transmissions.

Several radio communication technologies may present options for use in future 5G ecosystems. As described herein, DSRC is a standard for automotive communication, which builds on the IEEE 802.11p physical and medium access control layers. 3GPP LTE V2V/V2X may also be a key candidate in 5G ecosystems. Both standards, DSRC and 3GPP LTE V2V/V2X, are different in several respects. By way of example, DSRC uses contention based access, whereas 3GPP LTE V2V/V2X uses deterministic scheduling for an efficient usage of the resource.

As network architectures become increasingly more complex, resources for managing the inter-relation of these technologies in an efficient manner becomes more desirable. For instance, co-existence between radio communication technologies has the potential to introduce a number of challenges. Various aspects described herein outline inefficiencies arising from several use cases. In addition to coverage-based issues, interference between different vehicular radio communication technologies has the potential to lead to collisions, which can severely degrade transmission and reception performance. Likewise, vehicular communication devices attempting to access a channel in some contention-based channel access schemes, such as DSRC, may see a sizable drop in efficiency if the channel capacity surpasses a given threshold (e.g., 60 percent).

In contrast to an uncoordinated case where vehicular communication devices access channel resources independently and without cooperation between different vehicular radio communication technologies, the use of a cluster has been presented herein to manage access to reduce co-channel interference and enable more efficient usage of the shared channel resources. Various approaches are provided to further optimize the assignment of channel resources. As a result, interference may be reduced and resources may be more efficiently utilized over conventional approaches.

In particular, some aspects provide a hybrid multi-radio communication network to regulate radio communication technology coexistence. In some aspects, this hybrid multi-radio communication network may comprise a variety of radio communication technologies, including DSRC, 3GPP LTE V2X and/or 3GPP NB IoT. Following the principles outlined herein, the use of a specific radio communication technology may be tailored to one or more vehicular communication devices belonging to one or more clusters.

As previously described with respect to FIG. 8, radio communication system 800 may include a hybrid multi-radio communication network. Hybrid multi-radio communication network may include one or more static nodes and/or one or more mobile nodes. Static and mobile nodes may be conceptually arranged in a clustered architecture. In some aspects, static nodes may include network access nodes, RSUs, and/or sensors. As previously described, network access nodes may include base stations, such as eNBs, WLAN APs, DSRC RSUs, and vehicular communication devices configured with network access node capabilities. Mobile nodes may include various vehicular communication devices and terminal devices, such as vehicular communication device 810. Mobile nodes may, in some cases, include pedestrians carrying or wearing terminal devices. The use of specific radio communication technology for V2X communications, DSRC, 3GPP LTE V2X, and/or IoT may be restricted to vehicular communication devices belonging to specific clusters in various aspects.

A hybrid multi-radio communication network may be configured to support both DSRC and cellular technologies for V2X at the same time.

In various aspects, the architecture may be configured to:

i) enable data exchange and synchronization with vehicular communication devices (e.g., vehicular communication devices 810 to 826) in almost all situations;

ii) provide wider range through narrowband RAT(s);

iii) efficiently utilize available spectrum of terminal devices; and iv) prolong battery longevity and efficiency of terminal devices.

Narrow band (NB)-IoT may provide enhanced radio coverage and assistance (by providing services using its control plane) for D2D communication using DSRC, LTE-based D2D or 5G New Radio (NR)-based D2D.

With reference to FIG. 8, V2X communications may employ several radio communication technologies. For instance, V2X communications utilize one or more of DSRC, LTE V2X, 5G NR D2D and/or NB IoT. Therefore, nodes of the hybrid multi-radio communication network may be configured to support one or more of DSRC, LTE V2X, 5G NR D2D, NB IoT and/or other desired RATs as described above. In some aspects, nodes may include one or more network access nodes, and/or one or more communication devices (e.g., vehicular communication devices), etc.

In some aspects, one or more nodes of radio communication system 800 may comprise the multi-mode communication arrangement of FIG. 7. For instance, a vehicular communication device (e.g., vehicular communication device 810) may include RF transceiver 602. As previously noted, RF transceiver 602 may include RF transceiver 602*a* for a first communication technology, RF transceiver 602*b* for a second communication technology, and/or RF transceiver 602*c* for a third communication technology. RF transceiver 602*a* may be a short range radio communication technology transceiver. A short range radio communication technology transceiver may be configured to support DSRC technology and/or CMSA technology. RF transceiver 602*b* may be a cellular wide area radio communication technology transceiver. A cellular wide area radio communication technology transceiver may be configured to support LTE and/or LTE V2V/V2X technology. RF transceiver 602*c* may be a narrowband radio communication technology transceiver (e.g., cellular narrowband radio communication technology transceiver). A narrowband radio communication technology transceiver may be configured to support LTE, LTE MAC, and/or NB IoT.

RF transceiver 602 may be configured to transmit and receive one or more messages. In some aspects, one or more of RF transceiver 602*a*, RF transceiver 602*b*, and/or RF transceiver 602*c* may be configured to transmit and/or receive a message such as a configuration message, a trigger signal, a beacon signal, synchronization information, scheduling resource information, control data, sensing data and/or context data, etc. A configuration message may, for instance, include at least one parameter about a radio communication technology transceiver to be selected by the vehicular communication device (e.g., vehicular communication device 810).

A vehicular communication device (e.g., vehicular communication device 810) may include digital signal processor 604. As previously noted, digital signal processor 604 may include digital signal processor 604*a* for the first radio communication technology, digital signal processor 604*b* for a second radio communication technology, and/or 604*c* for a third radio communication technology. Digital signal processor 604*a* may be a short range radio communication technology digital signal processor. Short range radio communication technology digital signal processor may be configured to support DSRC technology and/or CMSA technology. Digital signal processor 604*b* may be a cellular wide area radio communication technology digital signal processor. A cellular wide area radio communication technology digital signal processor may be configured to support LTE and/or LTE V2V/V2X technology. Digital signal processor 602*c* may be a radio communication technology digital signal processor (e.g., cellular narrowband radio communication technology digital signal processor). A narrowband radio communication technology digital signal processor may be configured to support LTE, LTE MAC, and/or NB IoT.

A vehicular communication device (e.g., vehicular communication device 810) may include controller 606. As previously noted, controller 606 may include controller 606*a* for the first radio communication technology, controller 606*b* for a second radio communication technology, and/or 606*c* for a third radio communication technology. Controller 606*a* may be a short range radio communication technology controller. Short range radio communication technology controller may be configured to support DSRC technology and/or CMSA technology. Controller 606*b* may be a cellular wide area radio communication technology controller. A cellular wide area radio communication technology controller may be configured to support LTE and/or LTE V2V/V2X technology. Controller 606*c* may be a narrowband radio communication technology controller (e.g., cellular narrowband radio communication technology controller). A narrowband radio communication technology controller may be configured to support LTE, LTE MAC, and/or NB IoT.

One or more processors of a vehicular communication device (e.g., vehicular communication device 810) may be configured to process a message received by the RF transceiver 602. In some aspects, digital signal processor 604 and/or controller 606 may be configured to select a radio communication technology transceiver based on a configuration message received by the RF transceiver 602. Digital signal processor 604 and/or controller 606 may be configured to select RF transceiver 602*a*, RF transceiver 602*b*, and/or RF transceiver 602*c* based on the at least one configuration parameter of the configuration message received by the RF transceiver 602. For instance, digital signal processor 604 and/or controller 606 may be configured to select RF transceiver 602*a*, RF transceiver 602*b*, and/or RF transceiver 602*c* in response to receiving a trigger signal at RF transceiver 602.

Figure 42:
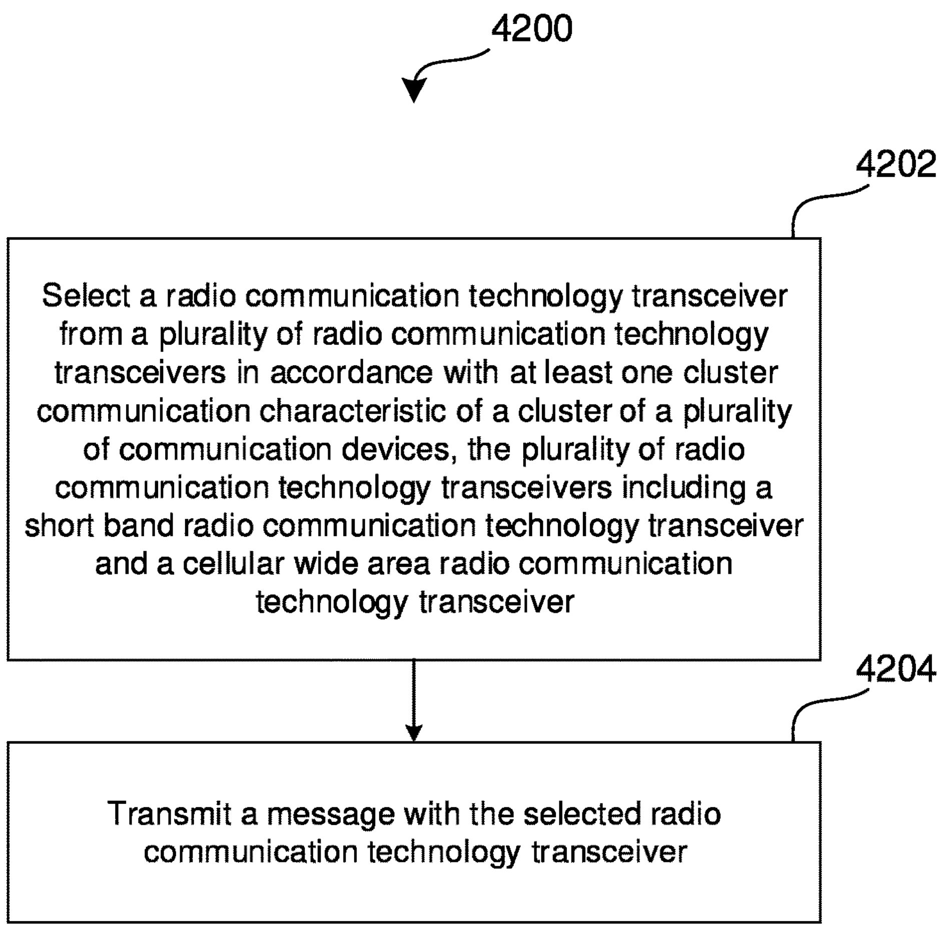
FIG. 42 shows an exemplary method of selecting a transceiver for performing wireless communications according to some aspects.

As shown in FIG. 42, in communication process 4200 for a communication device, the process comprises: selecting a radio communication technology transceiver from a plurality of radio communication technology transceivers in accordance with at least one cluster communication characteristic of a cluster of a plurality of communication devices, the plurality of radio communication technology transceivers including a short band radio communication technology transceiver and a cellular wide area radio communication technology transceiver (4202); and transmitting a message with the selected radio communication technology transceiver (4204).

Figure 43:
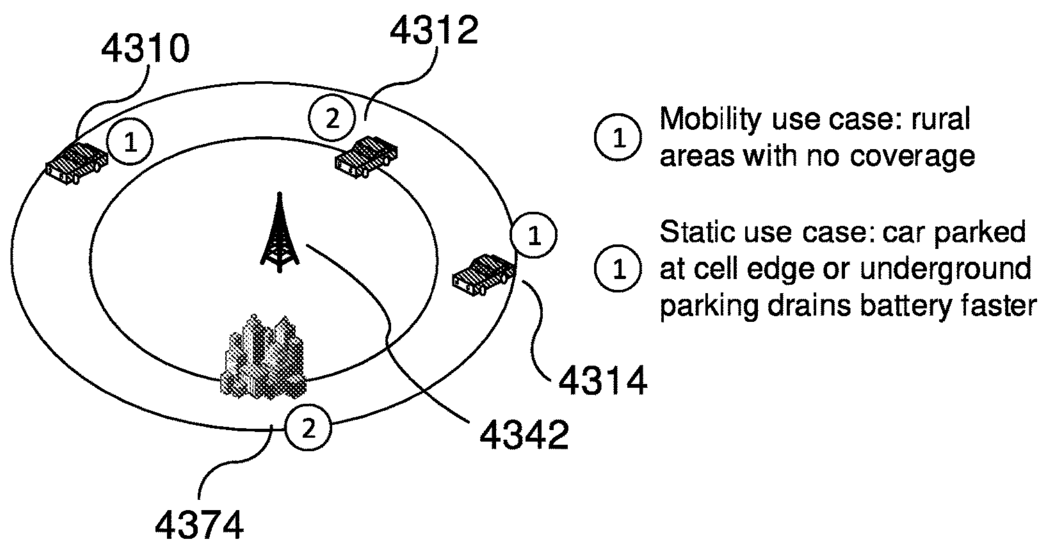
FIG. 43 shows an exemplary network scenario for NB IoT according to some aspects.

In contrast to one or more nodes of FIG. 8, conventional radio communication network deployments have not considered NB IoT for vehicular communication. As shown in FIG. 43, NB IoT connectivity may provide added utility in various configurations. NB IoT may offer a certain degree of coverage enhancement. When no other infrastructure coverage is available, NB IoT may be used to assist, control and/or manage D2D communication. Illustratively, vehicular communication devices 4310 and 4314 may be located in a rural area without 2G, 3G and 4G coverage. Likewise, IoT coverage enhancements may also improve communication performance in underground garages, tunnels and/or other areas where coverage (e.g., LTE, 5G, DSRC RSU) is not reliable. One or more vehicular communication devices 4374 may be located in an underground parking garage, whereas vehicular communication device 4312 may be located and/or parked at the edge of the coverage provided by network access node 4342. Consequently, NB IoT may be utilized to increase the duration for which a connection exists among one or more vehicular communication devices in a variety of scenarios.

NB IoT may not only increase duration in which a data link between vehicular communication devices and network is open, but may also minimize battery drains in scenarios where no high data rate is required. Future evolutions of NB-IoT in 3GPP might extend the usage of NB-IoT towards scenarios with higher data rate and mobility, and by this extend the potential usage of NB-IoT to further scenarios.

NB IoT may be implemented in the hybrid multi-radio communication network of FIG. 8 according to various approaches. For instance, one or more vehicular communication devices may be configured to communicate via NB IoT based on certain conditions. In some aspects, only vehicular communication devices that are within the extended cellular coverage may be configured transmit and receive data via NB IoT. The reduced cellular coverage may enhance the transmission efficiency of the network access node since the NB IoT users are consuming less data (i.e., no voice). Provided this configuration, network access nodes may thus communicate more efficiently (e.g., better channels with higher rates).

As shown in FIG. 8, nodes may conceptually be arranged in a dynamic manner. Vehicular communication devices belonging to a cluster may share one or more characteristics. In some aspects, clusters may be organized according to a variety of characteristics. For instance, clusters may be grouped based one or more applications, one or more scenarios, one or more QoS classes, one or more locations, one or more user preferences and/or one or more relationships between vehicular communication devices. Emergency vehicular communication devices may, for instance, belong to a particular cluster of users (e.g., life-critical application). Additionally or alternatively, mass transportation vehicular communication devices may belong to another cluster of users. In some aspects, private vehicular communication devices may be organized together based on their location.

Radio communication technologies may be assigned to a cluster according to various criteria. For instance, one or more vehicular communication devices requiring short range communication and high QoS may be clustered together to use DSRC. Additionally or alternatively, one or more vehicular communication devices requiring a continuous network connection to another group of users may be allocated access to 3GPP LTE V2X only. Likewise, vehicular communication devices parked for extended durations (e.g., long term parking at the airport) might be assigned to NB IoT only. Users within a given proximity may form a V2X or DSRC ad-hoc D2D-cluster. Additionally or alternatively, digital signal processor 604 and/or controller 606 may be configured to select RF transceiver 602*a*, RF transceiver 602*b*, and/or RF transceiver 602*c* for communicating with nodes (e.g., vehicular communication devices) within a cluster. Likewise, digital signal processor 604 and/or controller 606 may be configured to select RF transceiver 602*a*, RF transceiver 602*b*, and/or RF transceiver 602*c* for communicating with nodes outside of the cluster.

In some aspects, performance optimization techniques may be applied across various radio communication technologies. For instance, load balancing techniques may be employed to improve network communication under certain conditions. If a traffic jam occurs, then a large number of vehicular communication devices may be co-located in a DSRC coverage. As a result, latency may increase due to the additional network load. In such a case, vehicular communication devices may be assigned to one or more radio communication technologies to achieve load balancing. For example, NB IoT may be utilized to extend the range so that a certain number of vehicular communication devices can set-up the link outside of high loaded DSRC coverage. In some aspects, group-based delay tolerant applications may be migrated towards DSRC to make room for non-tolerant applications in IoT, and may thus anticipate the higher load on IoT system due to load balancing from DSRC. To mitigate the possibility of DSRC overload, performance-balancing techniques may be employed by trading non-critical services initially running on IoT for improved performance of more critical services originally running on DSRC.

NB-IoT solutions may not be optimal under certain conditions. In some aspects, one or more application requirements may prevent or reduce the possibility of an NB-IoT allocation. For instance, radio communication technologies other than NB-IoT may be assigned to a group-based (i.e., localized) safety application, which requires V2V communication and time-critical QoS. NB IoT would not be an option in this case, as it doesn't support D2D. DSRC, LTE V2V, 5G V2V (or D2D) may instead be allocated. NB-IoT could, however, be used as control plan for the assistance and/or management of D2D. Likewise, other radio communication technologies might be better suited for delay sensitive applications that require communication with the network (V2I/V2N). If there is an RSU nearby, then DSRC can only be used. Other possibilities include LTE-u or 5G. NB-IoT may be used only in case there are no other option (e.g., extended coverage) because NB-IoT is low data rate and may not provide good latency. In some cases, the load balancing policies might influence which radio communication technologies are assigned to delay tolerant applications that require communication with the network (V2I/V2N). In this case, DSRC RSU, LTE/5G eNB, or NB IoT could each be assigned based on such policies.

In some aspects, allocation of a radio communication technology may be based on group (e.g., cluster) preference information. For instance, a group may obtain access to the most appropriate radio communication technology (DSRC, LTE V2X, or IoT). Clusters may be dynamically created and updated based on the variations in network topology, traffic load, applications, and/or other network user parameters.

One or more groups and/or one or more users within the group may be configured to share a variety of information. Groups and/or users may share synchronization information, scheduling resources, control data, sensing data and/or context data. Referring back to FIG. 7, one or more of RF transceiver 602*a*, RF transceiver 602*b*, and/or RF transceiver 602*c* may be configured to transmit and/or receive a message such as synchronization information, scheduling resources, control data sensing data and/or context data. In one example, a user in a group can download video content via LTE V2X (or with other cellular technologies). The downloaded video content may be multicast using DSRC technology to other users in the group. In some aspects, the transmission of control information may be restricted to the cellular network while the forwarding of data is achieved using DSRC.

Information collected by a vehicular communication device and managed through an electronic control unit (ECU) can be used to support technology selection. For example, the static use case might be mistaken with a use case where higher data rates are required (e.g., parked car, the driver is resting and enjoying an HD movie). In this case, an external technology trigger may be utilized. An external technology trigger exploits data exchanged between TCU (modem and network processor) and ECUs (Electronics Control Units) and detects conditions which are required for a save technology switch back. Detected conditions may, for example, include user location, user movement, car location, and/or ignition on/off, etc.

Figure 98:
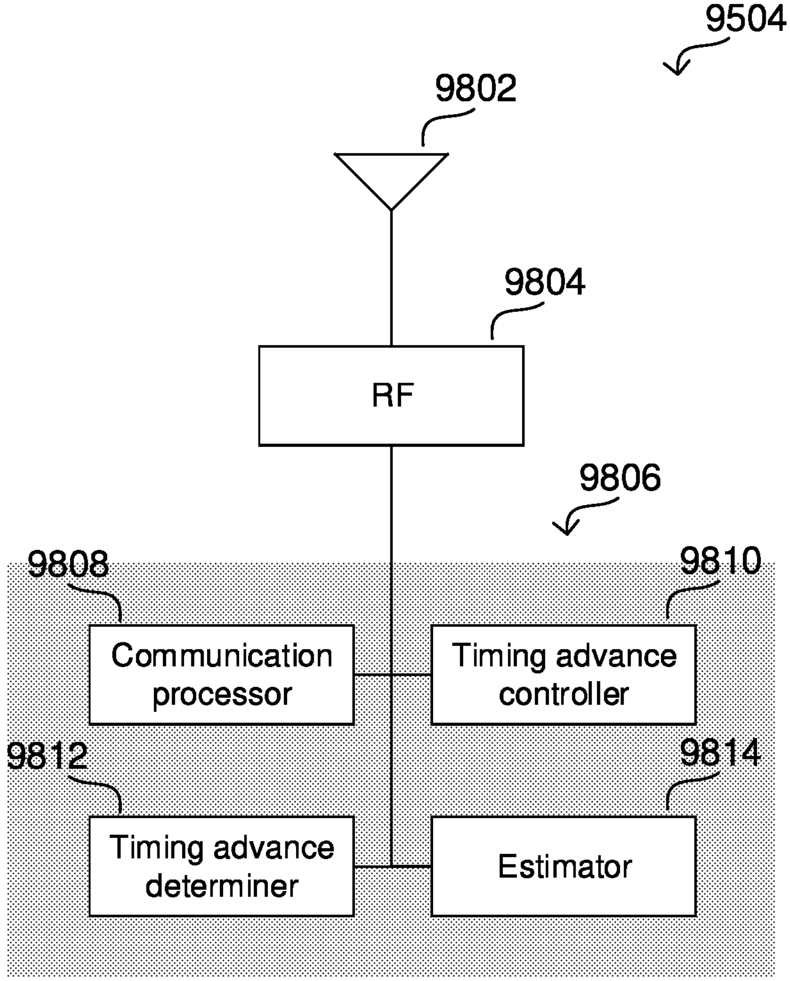
FIG. 98 shows an exemplary internal configuration of a terminal device configured for relaxed synchronization procedures according to some aspects.

In some aspects, a vehicular communication device (e.g., vehicular communication device 810) may include estimator 9814 of FIG. 98. Estimator 9814 may include a radar sensor configured to use radar signaling to estimate the separation distance between a vehicular communication device 9504 and a target device. Referring back to FIG. 7, one or more of RF transceiver 602*a*, RF transceiver 602*b*, and/or RF transceiver 602*c* may be configured to transmit and/or receive a trigger signal, such as an external technology trigger. Digital signal processor 604 and/or controller 606 may be configured to select one or more of RF transceiver 602*a*, RF transceiver 602*b*, and/or RF transceiver 602*c* in response to receiving the external technology trigger.

Figure 44:
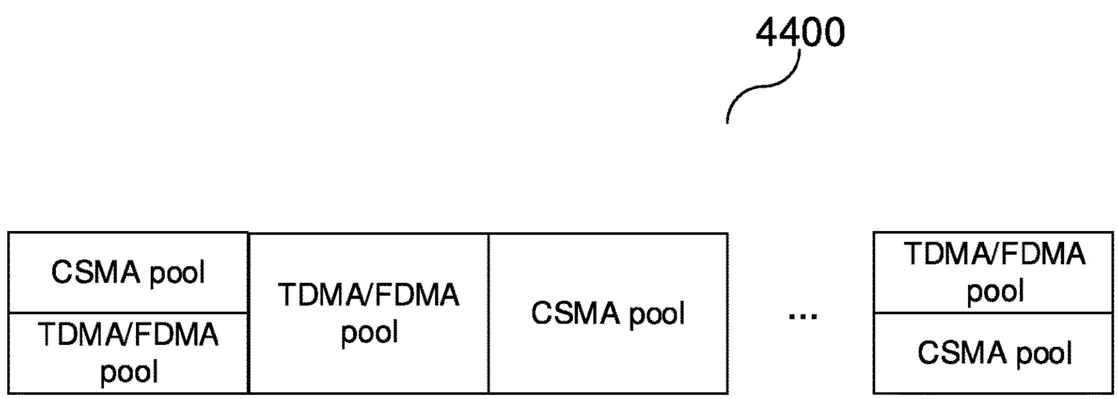
FIG. 44 shows an exemplary resource allocation between CSMA and TDMA/FDMA according to some aspects.

Various aspects are presented to further promote the integration of multiple radio communication technologies. In some aspects, a hybrid CSMA and TDMA/FDMA mode may provide a tradeoff between average delay and individual predictability. DSRC (802.11p-based) is based on CSMA, and can offer good performance for the average response time for packet transmission but the timing of an individual data packet is unpredictable. While the current V2X (LTE-based) standard is based on TDMA/FDMA scheme, it has good predictability but may entail a worse than average delay. In some aspects, a principle of the hybrid scheme may be to allocate certain frequency sub-bands or certain time slots where CSMA is only allowed within a window of the allocated frequency sub-bands or time slots. One example is shown in the FIG. 44, where a CSMA pool is defined where CSMA is only allowed within the CSMA pool. The CSMA pool can be flexibly scheduled together with a normal TDMA/FDMA resource pool. By adjusting the CSMA resource pool size, the duty cycle and the periodicity (e.g., which fraction of the resources are assigned and when), tradeoff between average latency and the individual predictability can be achieved for the coexisting technologies.

While uplink and downlink communications for LTE V2I are generally handled using deterministic scheduling, sidelink communications between devices and vehicles using LTE D2D/V2V may be also based on a contention mechanism. This contention mechanism may use a different channel access protocol than CSMA. In some aspects, LTE D2D/V2V may share the CSMA RB Poole with DSRC. Alternatively, some aspects may define certain CSMA pools exclusively for LTE D2D/V2V devices to share, and may thus keep DSRC separated. Accordingly, some aspects may allocate different resource pools available to LTE D2D/V2V devices through communication either in available control signaling fields (such as the SIB in LTE) to introduce a new logical channel for both systems and to introduce a dedicated physical channel. This allocation can either be done centrally (e.g., a network access node deciding on an allocation between LTE D2D/V2V and DSRC) or in a distributed way with neighboring vehicular communication devices negotiating the appropriate resource split (e.g., observing the usage of the medium by other devices).

Radio communication technologies may be separated geographically to minimize interference. In some aspects, a first radio communication technology and a second radio communication technology may be separated such that only one of the first and second radio communication technologies may operate in a given geographic area. For instance, a radio communication network may be configured in a manner that the first radio communication technology (e.g., DSRC) may operate in a geographic area, whereas the second radio communication technology (e.g., LTE V2V/V2X) may not. Although two radio communication technologies are described as being geographically separated, the present disclosure is not limited to a specific type and number of radio communication technologies.

In some aspects, the geographic separation between radio communication technologies may be further limited by frequency band. A first radio communication technology may be separated from a second radio communication technology, such that only one of the first and second radio communication technologies operate in a given geographic area at a particular frequency band. For example, a first radio communication technology may operate at a first frequency band within a given geographic area, whereas a second radio communication technology may not operate at the first frequency band within the given geographic area. By contrast, however, the first radio communication technology may operate at a first frequency band and the second radio communication technology may operate a second frequency band within the same given geographic area, where the first frequency band and the second frequency band are different (e.g., non-overlapping).

A geographic area may be defined in various respects. For example, one or more bounds of a geographic area may be defined explicitly, implicitly and/or dynamically. In some aspects, a geographic area may be defined with respect to one or more entities of a radio communication network. Entities of the radio communication network may include one or more control servers (e.g., control server 1612), one or more coexistence engines (e.g., coexistence engine 1812), one or more vehicular communication devices (e.g., cluster head 1604), and/or one or more IoT communication devices. Geographic areas may be defined with respect to a behavior and/or function of the one or more network entities. For instance, a geographic area may be associated with one or more network access nodes based on one or more signal transmission characteristic(s) (e.g., signal propagation) thereof. Additionally or alternatively, a geographic area may be defined with respect to content. Content may, in some cases, be associated with one or more vertical applications. Therefore, one or more bounds of a geographic area may be defined with respect to one or more vertical applications or properties associated therewith.

In some aspects, an association procedure may be used to manage the allocation of a radio communication technology to a communication device (e.g., vehicular communication device). This allocation may be provided (e.g., in the manner of stage 1214 of FIG. 12) in response to a communication. For instance, a communication device may request access to a radio communication technology and receive an allocated radio communication technology based on the location of the communication device. Referring back to FIG. 7, digital signal processor 604 and/or controller 606 may be configured to set one or more communication parameters for RF transceiver 602*a*, RF transceiver 602*b*, and/or RF transceiver 602*c* and communicate using the one or more communication parameters (e.g., in the manner of stage 1216 of FIG. 12).

A communication to access a radio communication technology may include various information. For example, the communication may comprise a request for a particular radio communication technology. Such a request may be granted if the communication device is located within a geographic area associated with a requested radio communication technology. If, however, the communication device is not located within a geographic area associated with the requested radio communication technology, then the association may be denied. A communication device may issue a "neutral" request for a radio communication technology. In a neutral request, no specific radio communication technology may be identified. A neutral request may be granted if a radio communication technology is supported where the communication device is located and in accord to one or more priorities associated therewith. In some aspects, the communication may comprise an indication about a desired QoS. The desired QoS may, for instance, be used for communications within the cluster.

The determination as to whether the communication device is located within a geographic area includes an evaluation. This evaluation may comprise a set of instructions configured to execute, in whole or in part, at one or more network entities (e.g., coexistence engine 1812) and/or one or more communication devices (e.g., vehicular communication devices). In some aspects, one or more communication devices may receive a pre-authorization to access a particular radio communication technology at given frequency band within a specific geographic area. With reference to FIG. 49, one or more communication devices of a cluster may, for instance, include a position determiner 5112. The position determiner 5112 may be configured to determine the location of a communication device. With reference to FIG. 98, one or more communication devices may include estimator 9814. Estimator 9814 may include a geopositional sensor, such as satellite-based positioning system (e.g., any Global Navigation Satellite System (GNSS) system), with which estimator 9814 can determine the position of communication device. In some aspects, the communication terminal may provide its position to the one or more network entities. When a pre-authorization is provided, digital signal processor 604 and/or controller 606 may be configured to select one or more RF transceiver 602*a*, RF transceiver 602*b*, and/or RF transceiver 602*c* based on the determined location of the communication device. For instance, digital signal processor 604 and/or controller 606 may be configured to select only one of the short range radio communication technology transceiver or the cellular wide area radio communication technology transceiver for a particular location.

Figure 56:
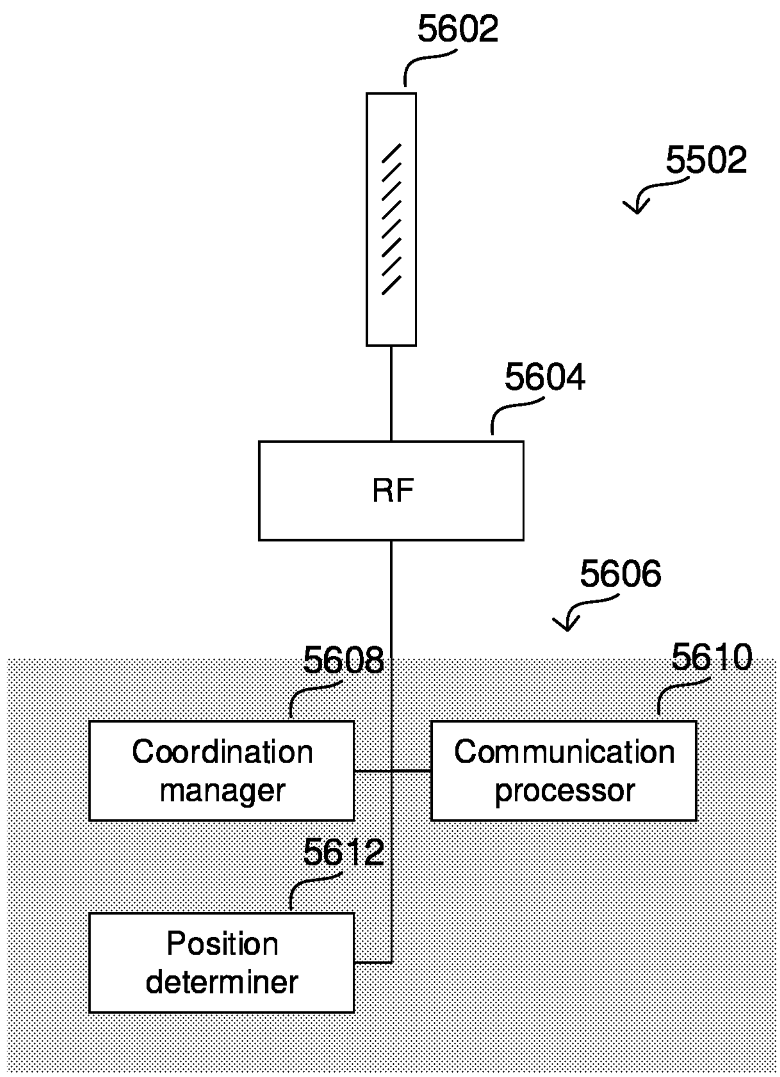
FIG. 56 shows an exemplary internal configuration of a network access node configured to manage radio measurement coordination according to some aspects.

Additionally or alternatively, one or more network entities (e.g., coexistence engine 1812) may be configured to determine and/or verify the location of a communication device upon receipt of a request to access a radio communication technology. This determination may, for instance, employ a location determination mechanism (e.g., triangulation) in evaluating the location of one or more communication devices. In some aspects, one or more network entities may comprise a position determiner 5112 configured to determine the location of one or more communication devices of a cluster. With reference to FIG. 56, one or more network entities may comprise, a position determiner 5612 configured to determine the location of the communication devices of a cluster.

Radio communication technologies may be temporally separated to reduce the potential for interference. With reference to FIG. 7, digital signal processor 604 and/or controller 606 may be configured to implement a time determiner to determine a current time. Digital signal processor 604 and/or controller 606 may be configured to select one or more RF transceiver 602*a*, RF transceiver 602*b*, and/or RF transceiver 602*c* based on the determined time. For instance, digital signal processor 604 and/or controller 606 may be configured to select only one of the short range radio communication technology transceiver or the cellular wide area radio communication technology transceiver for a determined time. In some aspects, a first radio communication technology and a second radio communication technology may be separated such that only one of the first and second radio communication technologies may operate at a time within a geographic area. For instance, a radio communication network may be configured in a manner that the first radio communication technology (e.g., DSRC) may not operate at the same time (e.g., time slot) as the second radio communication technology (e.g., LTE) within the same geographic area. Like the above, although two radio communication technologies are described as being temporally and geographically separated, the present disclosure is not limited to a specific number of radio communication technologies.

In some aspects, the geographic separation between radio communication technologies may be further limited with respect to frequency. A first radio communication technology may be separated from a second radio communication technology, such that only one of the first and second radio communication technologies may operate at a time within a geographic area at a particular frequency band. For example, a first radio communication technology may operate at a first frequency band and at a first time within a given geographic area, whereas a second radio communication technology may not operate at the first frequency band and at the first time within the given geographic area. By contrast, however, the first radio communication technology may operate at a first frequency band at a first time and the second radio communication technology may operate a second frequency band at the first time within the same given geographic area, where the first frequency band and the second frequency band are different (e.g., non-overlapping). Likewise, the first radio communication technology may operate at a first frequency band at a first time and the second radio communication technology may operate at the first frequency band at a second time within the same given geographic area, where the first time and the second time are different (e.g., non-overlapping time slots).

Control data may be used to signal a temporal separation between radio communication technologies. In some aspects, one or more network entities of the radio communication network may provide one or more beacon signals to indicate a temporal separation between radio communication technologies within the same geographic area. In the case in which two or more network entities both provide one or more beacon signals, an interface (e.g., coexistence engine 1812) between the two or more may be employed for communication and synchronization.

Figure 45:
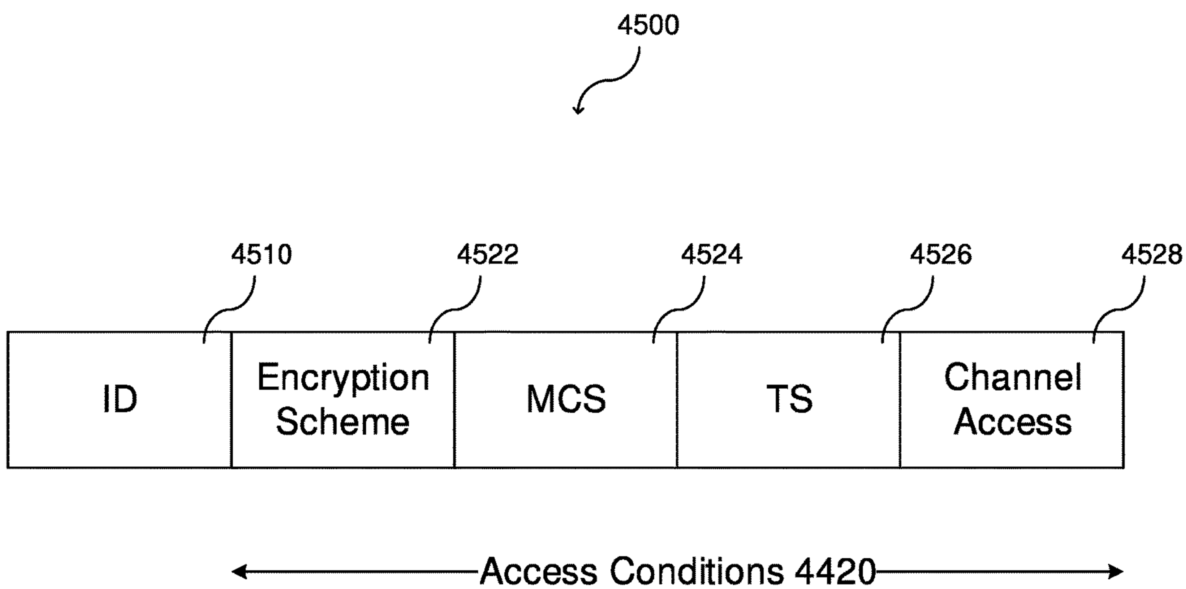
FIG. 45 shows an exemplary meta-beacon for hybrid multi-radio networks according to some aspects.

In some aspects, a meta-beacon may include information that indicates which radio communication technology is available during one or more times (e.g., time slots) for a given geographic area. As shown in FIG. 45, meta-beacon 4500 may include identification (ID) 4510, and access conditions 4520. Access conditions 4520 may include an encryption scheme 4522, modulation and coding schema (MCS) 4524, time slot 4526, and channel access method 4528. Although a meta-beacon is described in accordance with FIG. 45, the present disclosure is not limited to this implementation. For instance, one or more beacons, headers, frames and/or other sequences (e.g., RTS, CTS or novel reject RTS sequences) may be used to indicate which radio communication technology is available during one or more times (e.g., time slots).

Temporal separation may provide reduced interference between radio communication technologies at the expense of additional signaling associated with these approaches that may increase latency. In this regard, utilization of frequency and/or sub-channel separation without the above-described temporal separation techniques may reduce latency at the expense of an increased potential for interference.

In some aspects, a meta-controller may be introduced for optimizing the allocation of one or more radio communication technology resources. For instance, a meta-controller may coordinate the allocation of one or more services (e.g., vertical applications) to one or more radio communication technologies (e.g., LTE).

Meta-controller may be implemented in a variety of manners. For instance, meta-controller may be implemented as or as part of coexistence engine 1812. As described with respect to FIG. 21, coexistence engine 1812 may receive channel resource usage information from and provide channel resource allocations to communication devices in area 1910 through network access node 2116, such as by using a RAN-supported implementation. Coexistence engine 1812 may also receive channel resource usage information from and provide channel resource allocations to communication devices in areas 2128 and 2103 using remote nodes 2118-2120 and 2122-2124, respectively, such as by using a RAN-independent implementation.

In some aspects, meta-controller may be implemented as or as part of a control server 1612 as described with respect to FIG. 16. For example, FIG. 16 shows an example in which control server 1612 interfaces with network access node 1610. Cluster head 1604, which manages cluster 1600 including vehicular communication devices 1602, 1606, and 1608, may then interface with network access node 1610 over a radio link that consequently provides a signaling connection between cluster head 1604 and control server 1612. Control server 1612 may be any of a core node (e.g., located in a core network behind network access node 1610), a network access node (e.g., an internal component of network access node 1610), or an edge node (e.g., an edge computing device placed between network access node 1610 and a core network). In some aspects, control server 1612 may be a server-type component, such as a computing element including one or more processors configured to retrieve (e.g., from a local memory) and execute program code that defines the control and algorithmic functions of control server 1612 as described herein in the form of executable instructions. The program code may be updatable, such as wirelessly or by a manual install.

Figure 46:
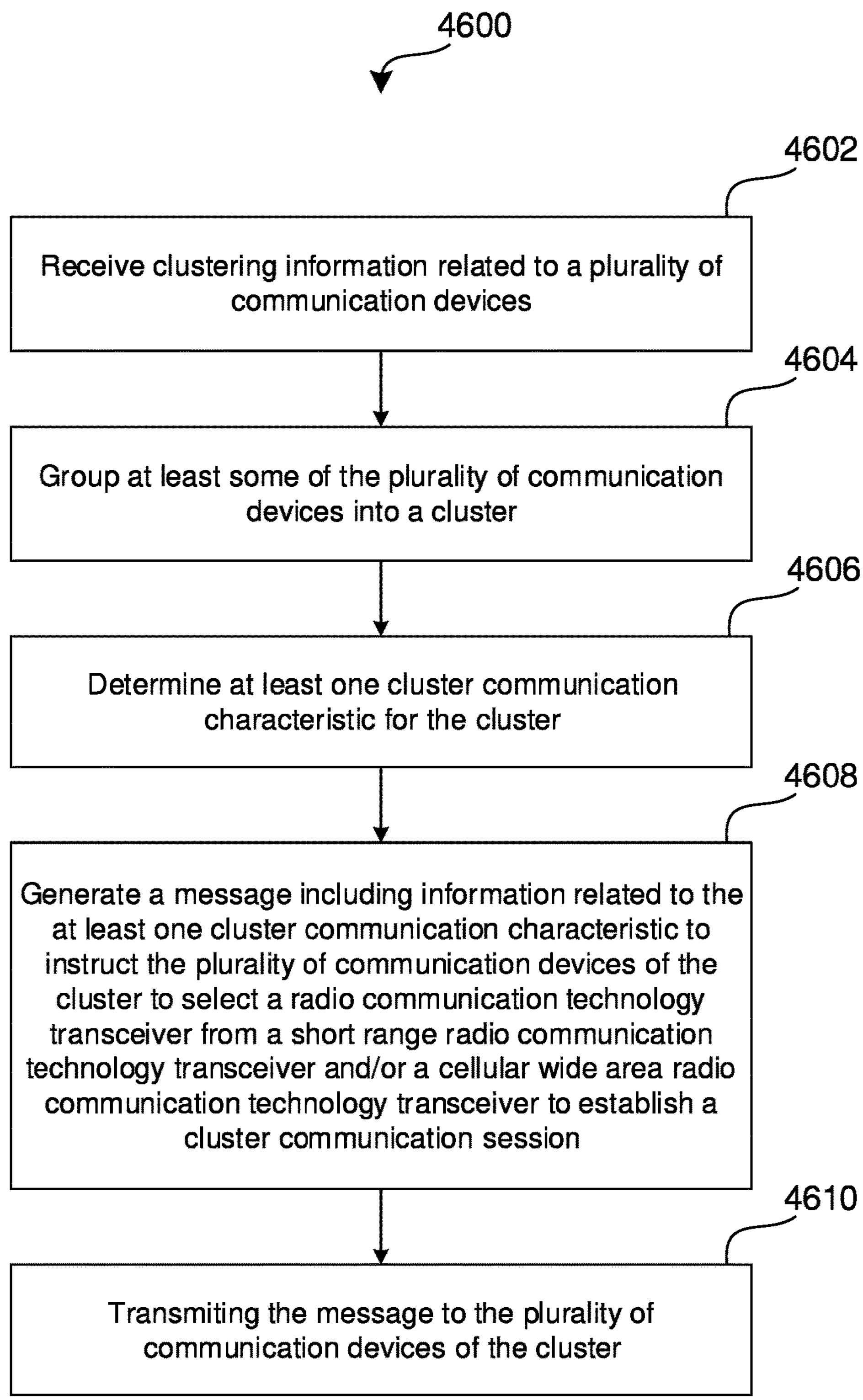
FIG. 46 shows an exemplary method for transmitting a message to a plurality of communication devices of a cluster according to some aspects.

As shown in FIG. 46, in communication process 4600 for a communication device, the process comprises: receiving clustering information related to a plurality of communication devices 4602, grouping at least some of the plurality of communication devices into a cluster 4604, determining at least one cluster communication characteristic for the cluster 4606, generating a message including information related to the at least one cluster communication characteristic to instruct the plurality of communication devices of the cluster to select a radio communication technology transceiver from a short range radio communication technology transceiver and/or a cellular wide area radio communication technology transceiver to establish a cluster communication session 460, and transmitting the message to the plurality of communication devices of the cluster 4610.

Figure 47:
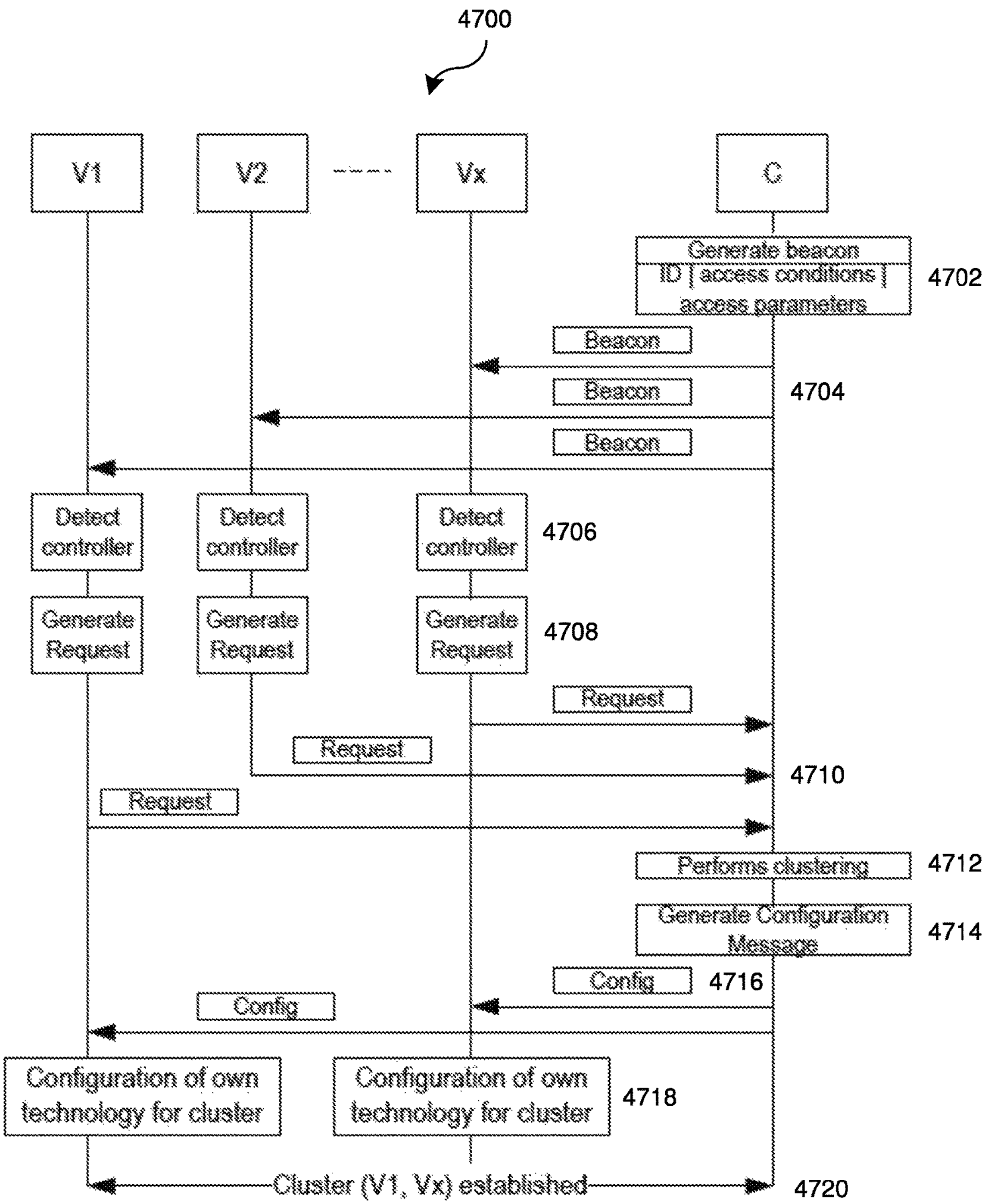
FIG. 47 shows an exemplary message sequence chart describing a procedure for hybrid multi-radio networks according to some aspects.

As shown in exemplary message sequence chart 4700 in FIG. 47, meta-controller may be configured to generate one or more beacon signals at stage 4702. In some aspects, the one or more beacon signals may be a meta-beacon signal as described with respect to FIG. 45. Alternatively, the beacon signal may be implemented as one or more beacons, headers, frames and/or other sequences (e.g., RTS, CTS or novel reject RTS sequences) may be used to indicate which radio communication technology is available during one or more times (e.g., time slots). The one or more beacon signals may be transmitted to the one or more vehicular communication devices at stage 4704. At stage 4706, vehicular communication device may detect the presence of the meta-controller upon receiving a beacon signal therefrom. One or more vehicular communication devices may generate one or more requests at stage 4708 for a radio communication technology and communicate the request(s) to the meta-controller at stage 4710. One or more communications may comprise a request for a particular radio communication technology or a neutral request. Upon receipt, meta-controller may be configured to perform clustering of one or more vehicular communication devices at stage 4712. For instance, one or more processors of the meta-controller may be configured to group at least some of the plurality of vehicular communication devices into one or more clusters. The one or more processors of the meta-controller may be further configured to determine at least one cluster communication characteristic for each generated cluster. At stage 4714, meta-controller may generate one or more configuration messages allocating one or more resources for each generated cluster. A configuration message may include information about the determined at least one cluster communication characteristic to instruct the vehicular communication devices of a respective cluster to select one or more of RF transceiver 602*a*, RF transceiver 602*b*, and/or RF transceiver 602*c*. At stage 4716, the meta-controller may be configured to communicate one or more configuration message to one or more of the plurality of vehicular communication devices. Upon receipt of one or more configuration messages from the meta-controller, one or more vehicular communication devices may configure its allocated technology for their respective clusters at stage 4718. For instance, this may include setting one or more communication parameters for RF transceiver 602*a*, RF transceiver 602*b*, and/or RF transceiver 602*c* and communicating the one or more communication parameters among members of the respective cluster. Once the cluster is established (e.g., in a session) at stage 4720, members of the cluster (e.g., vehicular communication devices) may be configured to communicate using one or more assigned communication technologies (e.g., in the manner of stage 1216 of FIG. 12). One or more members (e.g., vehicular communication devices) of the cluster may be configured to communicate a confirmation message to the meta-controller upon establishment of the cluster using their respectively assigned communication technologies.

Figure 48:
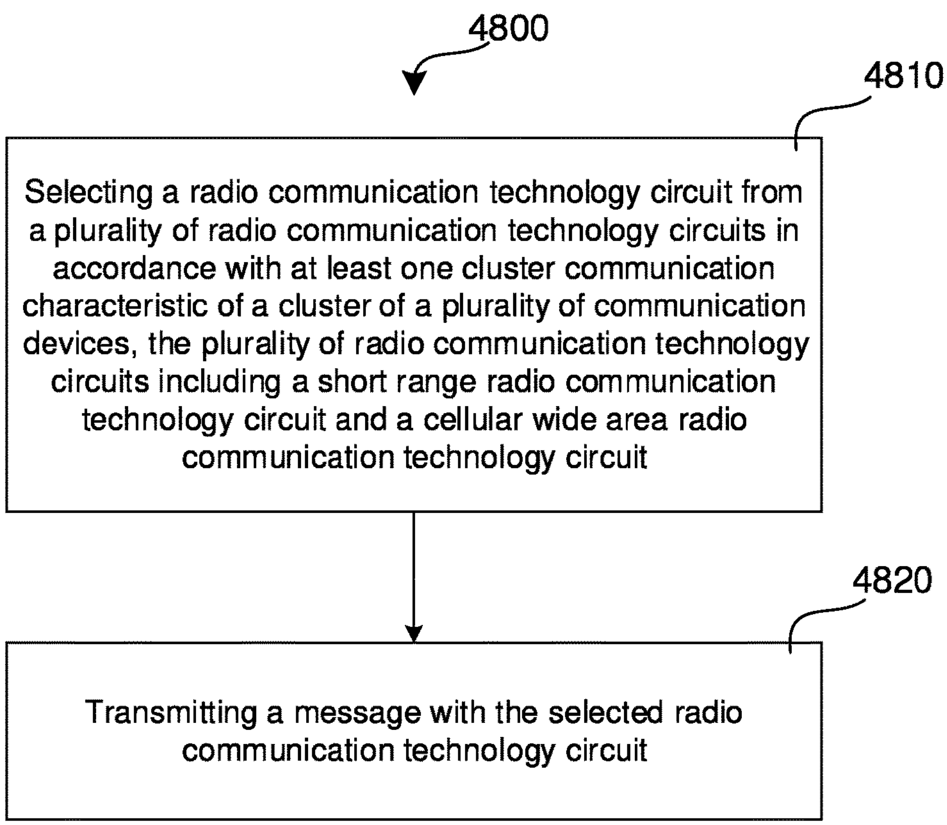
FIG. 48 shows an exemplary method for hybrid communications at a communication device according to some aspects.

FIG. 48 shows method 4800 including selecting a radio communication technology circuit from a plurality of radio communication technology circuits in accordance with at least one cluster communication characteristic of a cluster of a plurality of communication devices, the plurality of radio communication technology circuits including a short range radio communication technology circuit and a cellular wide area radio communication technology circuit (4810), and transmitting a message with the selected radio communication technology circuit (4820).

Radio Measurement Coordination

Terminal devices may be tasked with performing radio measurements as part of cell transfer procedures, including handover, cell selection, and network selection. These radio measurements can be used to determine which network access nodes to camp on or connect to, and can generally be part of frequency scans and cell measurements. Terminal devices may perform a frequency scan on a set of carrier frequencies to identify which carrier frequencies contain active cells. Frequency scans and other radio measurements that do not specifically target measurement or evaluation of an individual cell can be referred to as wideband measurements. Terminal devices may use wideband measurements such as Received Signal Strength Indicator (RSSI) to quickly 'scan' through each of the set of carrier frequencies and determine whether there is sufficient radio energy (e.g., above a predefined threshold) on each carrier frequency to indicate active cells. These wideband measurements may in some cases be part of a network scan where a terminal device scans for cells on an active carrier frequency and subsequently reads system information from detected cells to obtain the network identity of the network operating on the active carrier frequency. Such network identities, which can characterize multiple cells on a given carrier frequency, are also considered wideband radio measurements in the context of this disclosure.

Terminal devices may also perform cell-specific measurements to selectively measure the radio channel with a particular network access node (e.g., where a specific network access node is targeted for measurement, as opposed to multiple cells in the case of wideband measurements). Terminal devices may thus receive and selectively process reference signals transmitted by the network access node to obtain a cell-specific measurement such as Reference Signal Received Power (RSRP), Reference Signal Received Quality (RSRQ), Signal-to-Noise Ratio (SNR) or Signal-to-Interference-Plus-Noise Ratio (SINR), or other signal power, signal quality, or signal-to-noise type measurements. Cell-specific measurements can also include cell identities and/or lists of cell identities, such as a list of nearby neighbor cells that a terminal device can obtain by scanning for cells and reading system information from detected cells to obtain their cell identities.

These radio measurements can be a pertinent part of cell transfer procedures. However, they can also result in battery drain at terminal devices, which may generally expend power during the reception and related processing of radio signals used to obtain the radio measurements. Certain radio measurements such as inter-RAT or inter-frequency measurements that require temporary re-tuning may also divert reception resources that could otherwise be used for downlink data reception. Additionally, terminal devices may be expected to report some radio measurements to the network via transmission of measurement reports. In some cases, these measurement report transmissions can worsen battery drain and similarly divert transmission resources that could otherwise be used for uplink transmissions.

According to various aspects of this disclosure, terminal devices may therefore coordinate radio measurements by sharing radio measurements to avoid redundancies and/or verifying measurement accuracy with redundant measurements. In some cases, these aspects can reduce battery drain by avoiding or limiting duplicate measurements, reduce the time in which reception and transmission resources are diverted to radio measurement purposes, and/or increase the accuracy of radio measurements.

As will be shown and described, these aspects can use a centralized or distributed architecture. In a centralized architecture, a controlling device such as a network access node, core network or edge server, or leader terminal device may assign different measurement tasks to different terminal devices, where this assignment of different measurement tasks can avoid duplicate measurements. The terminal devices may then use radio measurements performed by other terminal devices in place of performing their own radio measurements. The controlling device can additionally or alternatively assign certain terminal devices to perform the same measurement tasks to obtain duplicate radio measurements. The duplicate radio measurements can then be compared, namely either at the terminal devices or the controlling device, to determine whether the duplicate radio measurements match and consequently verify whether the duplicate radio measurements are accurate.

In a distributed architecture, terminal devices may be responsible for the distribution of measurement tasks to each other. Terminal devices may multilaterally negotiate and agree on which terminal devices should perform which measurement tasks. The terminal devices may therefore agree to perform different measurement tasks at different terminal devices, and to share the resulting radio measurements with each other to avoid performing duplicate measurements. The terminal devices may additionally or alternatively organize the acquisition of duplicate radio measurements for verification purposes, where the terminal devices may perform redundant measurement tasks to obtain duplicate radio measurements that can be compared to check for accuracy.

Figure 49A:
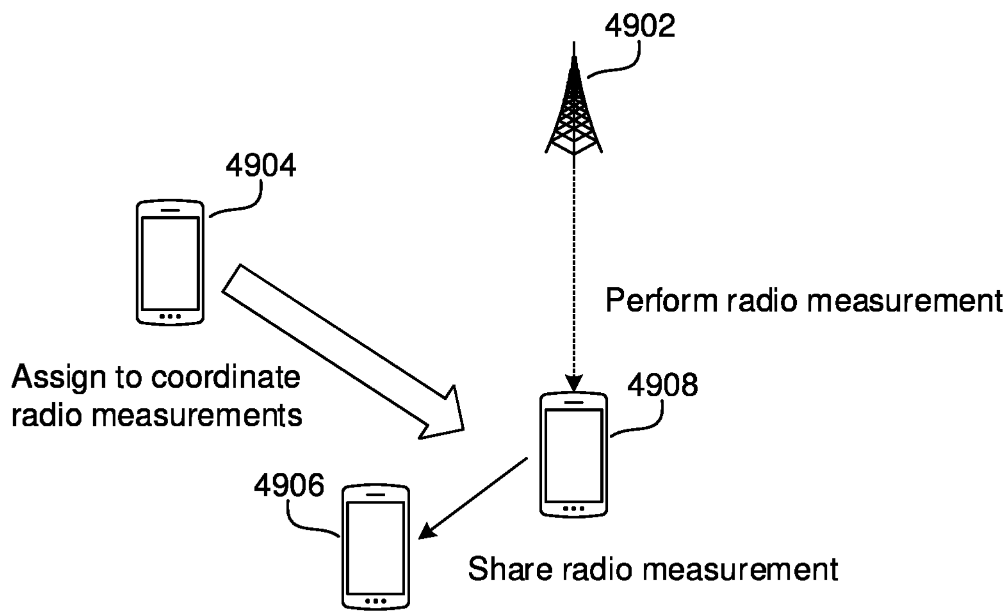
FIGS. 49A and 49B show exemplary network scenarios of radio measurement coordination between terminal devices according to some aspects.
Figure 49B:
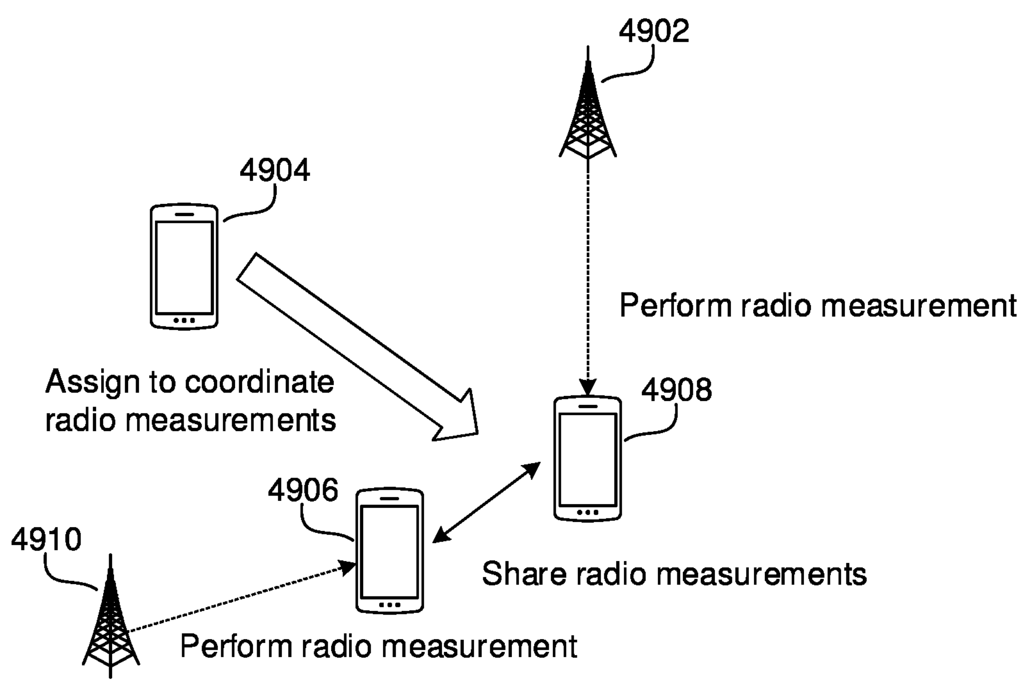

FIGS. 49A and 49B show examples of centralized architectures according to some aspects. As shown in FIG. 49A, leader terminal device 4904 may be the controlling device that distributes measurement tasks to client terminal devices 4906 and 4908. The terminal devices 4904, 4906, and 4908 may be, for example, handheld terminal devices, vehicular terminal devices, drones, IoT devices, or a combination thereof. Leader terminal device 4904 may transmit control signaling to client terminal devices 4906 and 4908 that instruct client terminal devices 4906 and 4908 to coordinate radio measurements. For example, the control signaling may instruct client terminal device 4908 to perform a cell-specific measurement with network access node 4902 as the measurement target, such as one or more of a signal power, signal quality, and signal-to-noise-type radio measurement of network access node 4902. The control signaling may also instruct client terminal device 4908 to share the radio measurement with client terminal device 4906. Accordingly, after performing the radio measurement on network access node 4902, client terminal device 4908 may share the radio measurement with client terminal device 4906 by transmitting the radio measurement to client terminal device 4906.

As client terminal device 4908 may therefore perform the radio measurement on network access node 4902 and share the radio measurement with client terminal device 4906, client terminal device 4906 may not measure network access node 4902, and may instead use the radio measurement provided by client terminal device 4908 in place of performing its own radio measurement of network access node 4902. In some cases, terminal device 4906 may therefore conserve battery power and/or avoid having to divert reception resources to measurement purposes.

The example of FIG. 49A shows a cell-specific measurement in which client terminal device 4908 may selectively receive and process reference signals (for example, selectively processing signals on certain subcarriers and certain time slots that carry the reference signals) transmitted by network access node 4902 to measure the channel between client terminal device 4908 and network access node 4902. In some aspects, leader terminal device 4904 may also assign client terminal device 4908 to perform a wideband measurement and to share the resulting radio measurements with client terminal device 4906. For example, leader terminal device 4904 may transmit control signaling to client terminal device 4908 that instructs client terminal device 4908 to measure a carrier frequency and to share the resulting radio measurements for each carrier frequency (e.g., an RSSI or other wideband measurement) with client terminal device 4906. Client terminal device 4906 can then utilize the radio measurements provided by client terminal device 4908 instead of performing its own radio measurements. In some aspects, leader client terminal device 4904 may assign client terminal device 4908 to perform a scan-type measurement where client terminal device 4908 is instructed to perform a wideband radio measurement on each of a set of carrier frequencies (e.g., a set of measurement targets). Client terminal device 4908 may then measure each of the set of carrier frequencies and share the resulting radio measurements for each carrier frequency (e.g., an RSSI or other wideband measurement) with client terminal device 4906. Client terminal device 4906 can then utilize the radio measurements provided by client terminal device 4908 instead of performing its own radio measurements. In some cases, client terminal device 4908 may perform a network scan and identify the network identity of the network operating on each of a set of carrier frequencies. Client terminal device 4908 may similarly provide these network identities to client terminal device 4906, which may use the network identities instead of performing its own network scan.

As shown in FIG. 49B, leader terminal device 4904 can also distribute different measurement tasks to different terminal devices, which may then share the resulting radio measurements. For example, leader terminal device 4904 can assign client terminal device 4908 to perform a cell-specific measurement on network access node 4902, and assign client terminal device 4906 to perform a cell-specific measurement on network access node 4910. In some aspects, leader terminal device 4904 may also assign client terminal devices 4906 and 4908 to share their respective radio measurements with each other. Accordingly, client terminal devices 4906 and 4908 may perform the respective measurements on network access nodes 4902 and 4910 (e.g., on their respective measurement targets), and exchange their respective radio measurements with each other. Client terminal devices 4906 and 4908 may therefore use the radio measurements provided by the other terminal device in place of performing a duplicate measurement on the same measurement target. The radio measurements obtained at client terminal devices 4906 and 4908 may therefore be a combination of local radio measurements (performed locally at the terminal device) and shared radio measurements (provided by another terminal device). This distribution of different measurement tasks can also be implemented for scan-type measurements, where, for example, terminal device 4904 may assign client terminal device 4908 to measure a first set of carrier frequencies (a first set of measurement targets) and assign client terminal device 4906 to measure a different second set of carrier frequencies (a second set of measurement targets). Terminal device 4904 may further instruct client terminal devices 4908 and 4906 to share the resulting radio measurements with each other. Client terminal devices 4908 and 4906 may thus obtain radio measurements for both the first and second set of carrier frequencies, where the radio measurements obtained at client terminal devices 4908 and 4906 may be a combination of local and external radio measurements.

Figure 50:
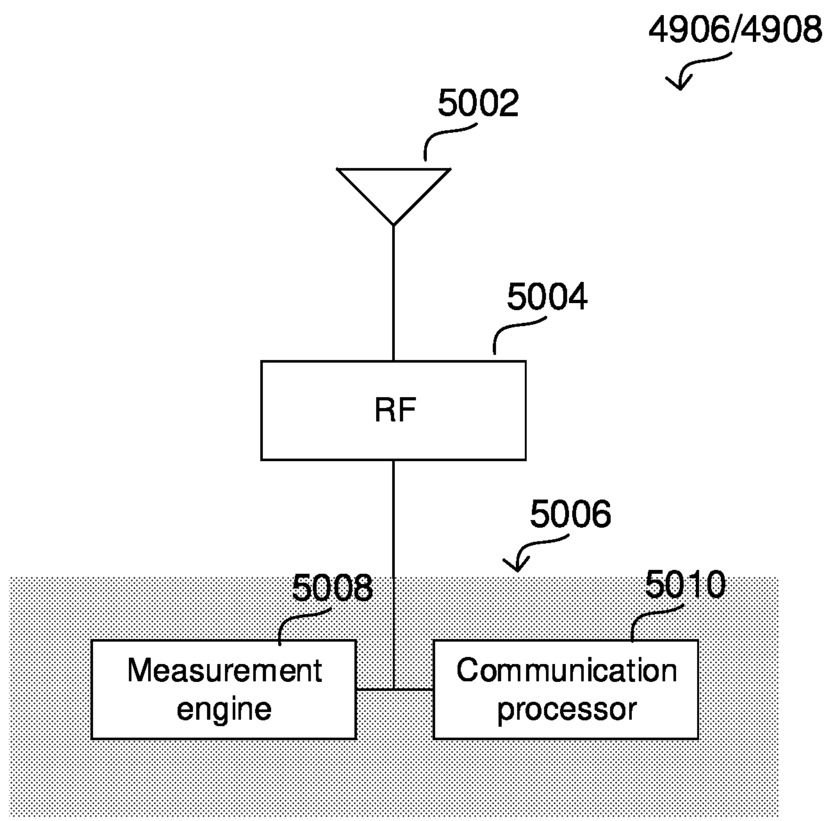
FIG. 50 shows an exemplary internal configuration of a terminal device configured to coordinate radio measurements according to some aspects.
Figure 51:
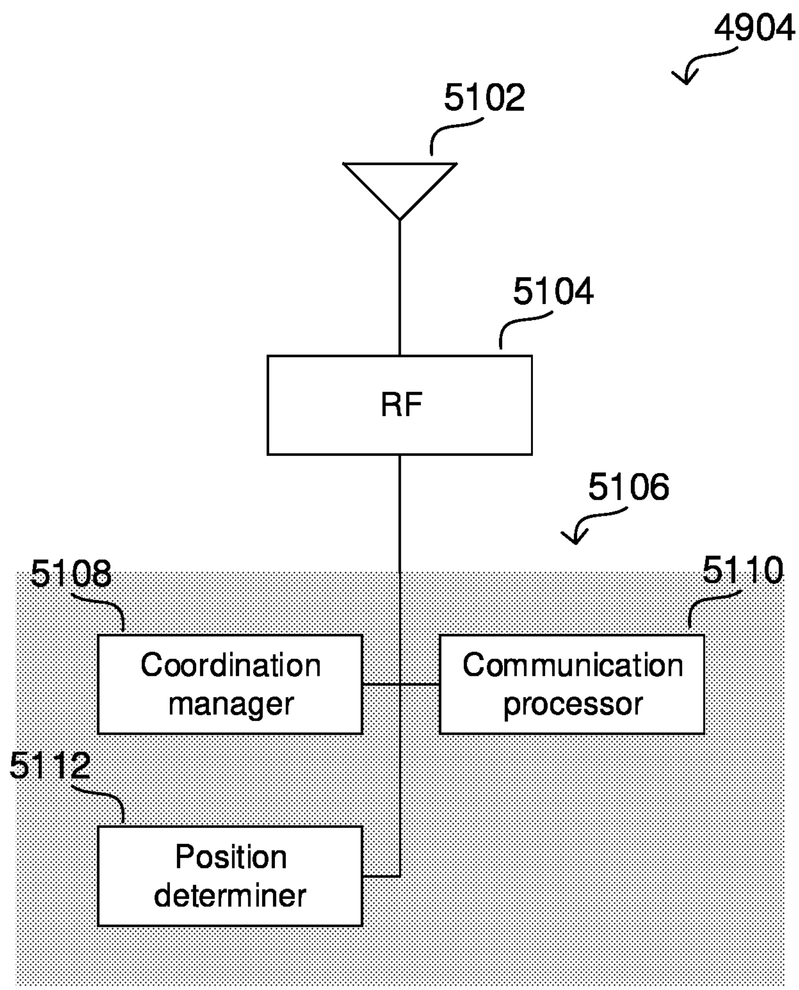
FIG. 51 shows an exemplary internal configuration of a leader terminal device for coordinating radio measurements according to some aspects.

FIG. 50 shows an exemplary internal configuration of client terminal devices 4906 and 4908 according to some aspects, while FIG. 51 shows an exemplary internal configuration of leader terminal device 4904. As shown in FIG. 50, client terminal device 4906/4908 may include antenna system 5002 and RF transceiver 5004, which may be configured in the manner of antenna system 202 and RF transceiver 204 as previously shown and described for terminal device 102 of FIG. 2. Client terminal device 4906/4908 may further include communication arrangement 5006, which may correspond to baseband modem 206 and application processor 212 of terminal device 102. The components of communication arrangement 5006 may therefore be baseband or application layer components, but are not strictly limited to being subcomponents of baseband modem 206 and application processor 212. For purposes of conciseness, FIG. 50 may omit other components of client terminal device 4906/4908 that are less directly involved in radio measurement coordination, including intermediate processing components between RF transceiver 5004 and communication arrangement 5006 that prepare baseband samples provided by RF transceiver 5004 for baseband processing.

As shown in FIG. 50, communication arrangement 5006 may include measurement engine 5008 and communication processor 5010. Measurement engine 5008 may be a hardware circuit or a processor that is configured to receive baseband samples from RF transceiver 5004 and to perform radio measurements using the baseband samples. In some aspects, measurement engine 5008 may include one or more dedicated hardware circuits that are configured with digital logic to process the baseband samples to calculate radio measurements. In some aspects, measurement engine 5008 may include one or more processors configured to retrieve (from a local memory) and execute program code that algorithmically defines radio measurement operations in the form of executable arithmetic instructions. The instructions may, for example, control measurement engine 5008 to receive digital radio and/or baseband data, and to process the digital data to measure a signal strength, signal quality, SNR (or other related measurement, such as SINR), error rate, or a wideband energy measurement. The instructions may define the sequence of calculations involved in processing the digital data according to a measurement technique that determines a signal strength, signal quality, SNR (or other related measurement, such as SINR), error rate, or a wideband energy measurement. In some aspects, measurement engine 5008 may include a combination of hardware circuits and processors, such as a control processor and one or more hardware accelerators that perform specific radio measurement functions, where the control processor may offload measurement tasks to the one or more hardware accelerators and the one or more hardware accelerators may return the resulting radio measurements to the control processor. With reference to terminal device 102 of FIG. 2, measurement engine 5008 can be a component of digital signal processor 208, and can accordingly be a physical-layer component. Measurement engine 5008 can alternatively be a component of controller 210, and may accordingly be a protocol stack-layer component.

Communication processor 5010 may be a processor that is configured to control the overall transmit and receive operations of client terminal device 4906/4908, including determining when to transmit and receive specific communications, what to transmit in each transmission, and what to recover from each reception. Communication processor 5010 may be configured to retrieve (from a local memory) and execute program code that algorithmically defines the processing involved in scheduling, transmitting, and receiving such communications. For example, the program code may configure communication processor 5010 perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. The program code may additionally or alternatively configure communication processor 5010 to perform one or more of header compression and encapsulation, security, error checking and correction, channel multiplexing, scheduling and priority, and setup and maintenance of radio bearers, or any other protocol stack functions. In connection with scheduling, the program code may configure communication processor 5010 to, in the transmit direction, identifying outgoing data intended for one or more destinations (e.g., other communication devices), and processing (e.g., according to physical layer processing functions) and mapping the outgoing data to be transmitted on the channel resources allocated for transmission, and, in the receive direction, receiving data on channel resources allocated for reception, and de-mapping and processing (e.g., according to physical layer processing functions) the data on the channel resources (e.g., according to the physical layer to recover the incoming data.

With reference to terminal device 102 of FIG. 2, communication processor 5010 can be a component of controller 210 and/or digital signal processor 208, and accordingly may be a protocol stack-layer or physical layer component (although is not strictly limited to such). The program code executed by communication processor 5010 may therefore be protocol stack-layer software. In some aspects, communication processor 5010 may also include one or more hardware accelerators, which may be dedicated to physical or protocol stack layer processing tasks.

Although shown as logically separate components in FIG. 50, this illustrates the functional separation between measurement engine 5008 and communication processor 5010 and does not limit measurement engine 5008 and communication processor 5010 to being physically separate components. Accordingly, in some aspects measurement engine 5008 and communication processor 5010 may be physically separate components, while in other aspects measurement engine 5008 and communication processor 5010 may be physically integrated components, such as a digitally-configured hardware arrangement including circuitry to perform multiple functions or a processor configured to execute multiple subroutines.

As shown in FIG. 51, leader terminal device 4904 may include antenna system 5102 and RF transceiver 5104, which may be configured in the manner of antenna system 202 and RF transceiver 204 of terminal device 102 as shown and described for FIG. 2. Leader terminal device 4904 may further include communication arrangement 5106, which may correspond to baseband modem 206 and application processor 212 of terminal device 102. The components of communication arrangement 5106 may therefore be baseband or application layer components, although are not strictly limited to such. For purposes of conciseness, FIG. 51 may omit other components of leader terminal device 4904 that are less directly involved in radio measurement coordination, including intermediate processing components between RF transceiver 5104 and communication arrangement 5106 that prepare baseband samples provided by RF transceiver 5104 for baseband processing.

Coordination manager 5108 may be a processor configured to retrieve (from a local memory) and execute program code that algorithmically defines how terminal devices are selected to coordinate radio measurements with each other. The functionality related to radio measurement coordination that is algorithmically described herein can therefore be embodied as instructions for execution by coordination manager 5108, including one or more of selecting certain terminal devices to coordinate radio measurement with each other, determining how the terminal devices should coordinate the radio measurements with each other, selecting the specific radio measurements that certain terminal devices should perform, and any other related functionality. With reference to terminal device 102 of FIG. 2, coordination manager 5108 can be a component of controller 210 or application processor 212, and accordingly may be a protocol stack or application layer component. The program code executed by coordination manager 5108 may therefore be protocol stack layer software or application layer software.

Communication processor 5110 may be a processor that is configured to control the overall transmit and receive operations of leader terminal device 4904, including determining when to transmit and receive specific communications, what to transmit in each transmission, and what to recover from each reception. Communication processor 5110 may be configured to retrieve (from a local memory) and execute program code that algorithmically defines the processing involved in scheduling, transmitting, and receiving such communications. The functionality related to transmission and reception that is algorithmically described herein can therefore be instructions for execution for communication processor 5110. With reference to terminal device 102 of FIG. 2, communication processor 5110 can be a component of controller 210 and/or digital signal processor 208, and accordingly may be a protocol stack-layer or physical layer component (although is not strictly limited to such). The program code executed by communication processor 5110 may therefore be protocol stack-layer software. In some aspects, communication processor 5110 may also include one or more hardware accelerators, which may be dedicated to physical or protocol stack layer processing tasks Position determiner 5112 may be a hardware circuit arrangement or processor that is configured to determine the positions of terminal devices. The positions can be one or more of absolute geographic positions (e.g., latitude and longitude locations, locations within a predefined local or global grid, or other similar absolute location), relative geographic positions (e.g., radial distance between terminal devices, angular direction between terminal devices, or other similar relative locations), and relative radio signal-derived positions (e.g., signal strength between two terminal devices or a current serving network access node of a terminal device). Position determiner 5112 may be configured to determine such positions for client terminal devices of leader terminal device 4904, which may be terminal devices such as client terminal devices 4906 and 4908 that are subject to control or management by leader terminal device 4904 relating to radio measurement coordination. Position determiner 5112 may be configured to determine the positions of client terminal devices by explicit reporting (e.g., where the client terminal device transmits a position report to position determiner 5112 that explicitly specifies its position) or algorithmic derivation (e.g., where position determiner 5112 algorithmically processes signals to determine the position of a client terminal device). In some aspects, position determiner 5112 may include a processor configured to retrieve (from a local memory) and execute program code that instructs position determiner 5112 to receive and interpret position reports provided by client terminal devices. In some aspects, position determiner 5112 may include a processor or one or more hardware accelerators configured to algorithmically calculate a position of a client terminal device, such as by performing a signal strength measurement (e.g., by performing a sequence of calculations on digital radio or baseband data received from a client terminal device to determine a signal strength measurement) and determining the relative distance between leader terminal device 4904 and the client terminal device based on how strong the signal strength measurement is. For example, as received signal strength may be inversely proportional to relative distance, position determiner 5112 may be configured to use a mathematically-defined inversely proportional relationship between received signal strength and relative distance to calculate the relative distance based on the signal strength measurement. In some aspects, position determiner 5112 may include a combination of such processor and dedicated hardware components. Although shown as logically separate components in FIG. 51, this illustrates the functional separation between coordination manager 5108, communication processor 5110, and position determiner 5112 and does not limit coordination manager 5108, communication processor 5110, and position determiner 5112 to being physically separate components. Accordingly, in some aspects coordination manager 5108, communication processor 5110, and position determiner 5112 may be physically separate components, while in other aspects coordination manager 5108, communication processor 5110, and position determiner 5112 may be physically integrated components, such as a digitally-configured hardware arrangement including circuitry to perform multiple functions or a processor configured to execute multiple subroutines.

With additional reference to FIGS. 49A and 49B, communication processor 5110 of leader terminal device 4904 may therefore prepare and transmit (via RF transceiver 5104 and antenna system 5102) control signaling to client terminal devices 4906 and/or 4908 that assign measurement tasks to client terminal devices 4906 and/or 4908 and instruct how client terminal devices 4906 and 4908 should coordinate measurements. Coordination manager 5108 may select client terminal devices 4906 and 4908 for coordination (e.g., out of a larger set of terminal devices), and may select whether to assign client terminal devices 4906 and 4908 to share radio measurement and/or to verify radio measurements.

Client terminal devices 4906 and 4908 may receive the control signaling (via antenna system 5002 and RF transceiver 5004) from leader terminal device 4904 at communication processor 5010, which may interpret the control signaling to determine what measurement tasks client terminal devices 4906 and 4908 are assigned and how radio measurements should be coordinated. Communication processor 5010 may specify the measurement tasks to measurement engine 5008, which may then perform the measurement tasks. As previously indicated, the measurement tasks can include cell-specific or wideband measurements (which can also be part of a scan-type measurement), which measurement engine 5008 may then perform by processing baseband samples provided by RF transceiver 5004. If the control signaling instructs communication processor 5010 to share the radio measurements with another client terminal device, communication processor 5010 may receive the radio measurements from measurement engine 5008 and transmit the radio measurements as a measurement report to the other client terminal device. If the control signaling instructs communication processor 5010 to receive shared radio measurements from other client terminal devices, communication processor 5010 may receive the shared radio measurements from the other client terminal devices as instructed (via antenna system 5002 and RF transceiver 5004). If the control signaling instructs communication processor 5010 to verify certain local radio measurements with shared radio measurements provided by another client terminal device, communication processor 5010 may receive the shared radio measurement from the other client terminal device, receive the local radio measurement from measurement engine 5008, and compare the shared and local radio measurements to determine if they match.

Figure 52:
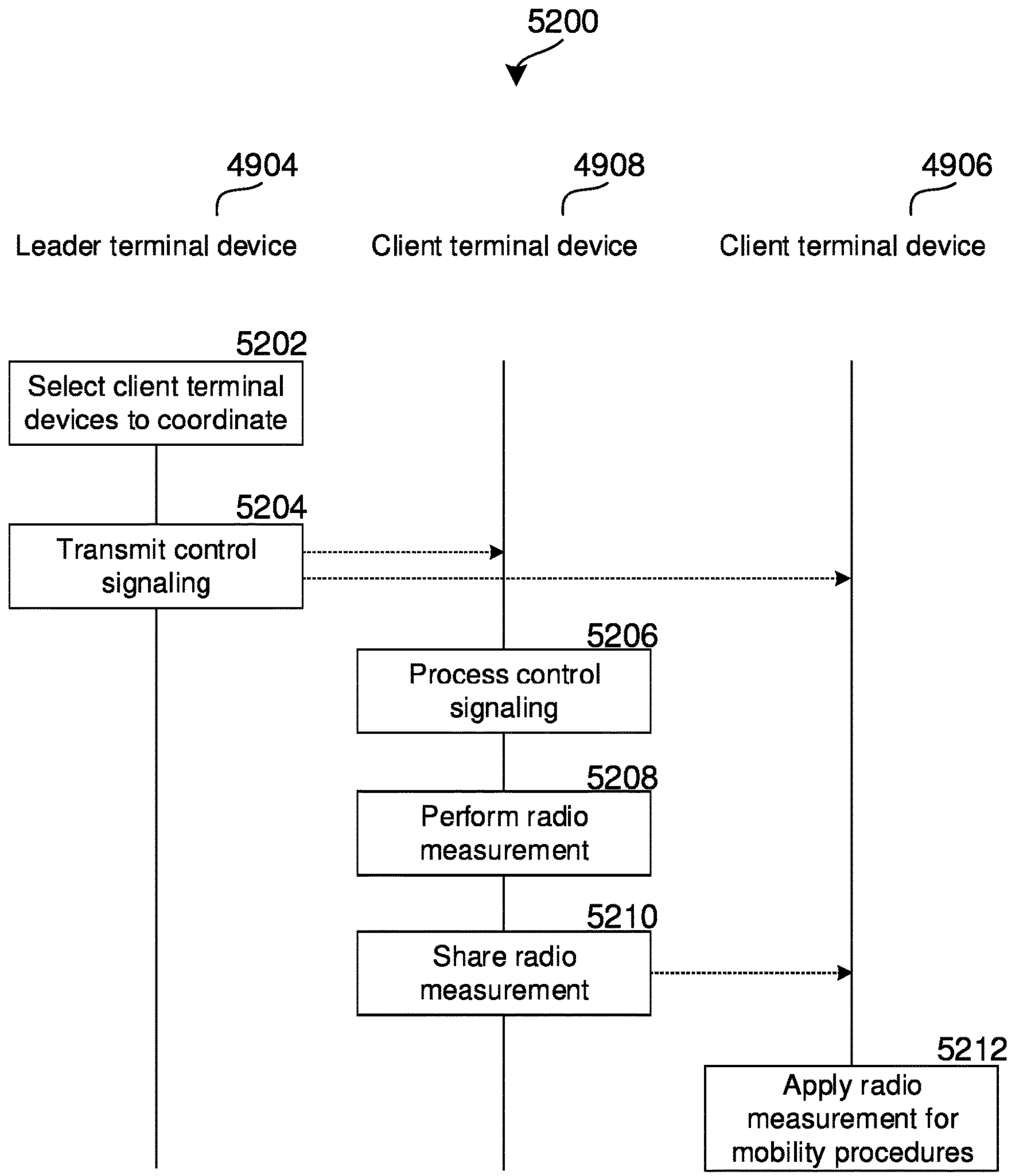
FIG. 52 shows an exemplary message sequence chart describing a procedure for coordinating radio measurements with a leader terminal device and client terminal devices according to some aspects.
Figure 53:
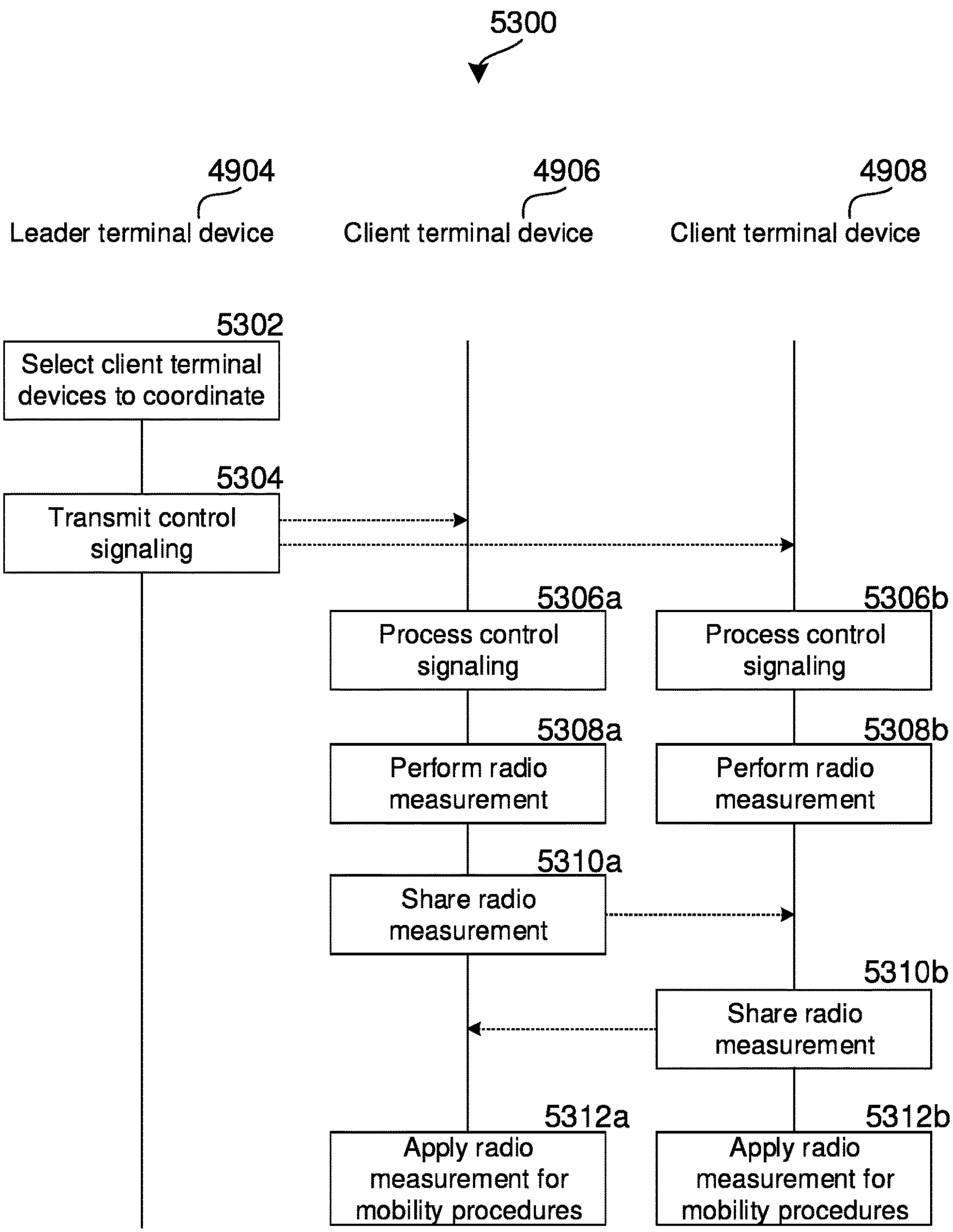
FIG. 53 shows an exemplary message sequence chart describing a procedure for exchanging radio measurements between client terminal devices according to some aspects.

FIGS. 52 and 53 show examples of radio measurement coordination according to a centralized organization according to some aspects. FIG. 52 shows message sequence chart 5200 illustrating the case of FIG. 49A, where client terminal device 4908 may perform a radio measurement and share the radio measurement with client terminal device 4906. As shown in FIG. 52, leader terminal device 4904 may first select client terminal devices to coordinate radio measurements in stage 5202 (e.g., at coordination manager 5108). In some aspects, leader terminal device 4904 may be a controlling device for a plurality of client terminal devices, including client terminal devices 4906, 4908, and one or more additional client terminal devices. Leader terminal device 4904 may therefore select subsets of the plurality of client terminal devices to assign for radio measurement coordination with each other.

In some aspects, leader terminal device 4904 may select client terminal devices to coordinate based on their positions. For example, radio measurements may be geographically-dependent, where neighboring terminal devices that are located closer to each other will have more similar measurements (e.g., closer in value) than terminal devices that are located further from each other. Accordingly, leader terminal device 4904 may select client terminal devices in stage 5202 based on the distances between their positions. For example, in some aspects the plurality of client terminal devices may be configured to transmit position reports (e.g., controlled by communication processor 5010) to leader terminal device 4904 that specify a current position of the client terminal devices. Leader terminal device 4904 may receive and evaluate the position reports at position determiner 5112. The current positions can be one or more of absolute geographic positions of the client terminal devices, relative geographic positions of the client terminal devices and relative radio signal-derived positions of the client terminal devices. Position determiner 5112 may recover the current positions from the position reports (e.g., via explicit reporting) and provide the current positions to coordination manager 5108, which may evaluate the current positions to identify client terminal devices that are proximate to each other.

In some aspects, leader terminal device 4904 may locally estimate the current positions of the client terminal devices at position determiner 5112 (e.g., via algorithmic derivation). For example, position determiner 5112 may process baseband samples received from a client terminal device to obtain a received signal strength and an angle of arrival. Using the received signal strength (which may inversely scale with radial distance) and the angle of arrival, position determiner 5112 may estimate the current relative position of the client terminal device with respect to leader terminal device 4904. In another example, a first client terminal device may perform a signal-strength measurement on signals received from a second client terminal device, and may report the signal strength measurement in a position report as a relative radio signal-derived position. As the signal strength measurement may indicate the relative distance between the first client terminal device and the second terminal device (where signal strength scales inversely with distance), position determiner 5112 may be configured to estimate the relative distance between the first client terminal device and the second client terminal device. Position determiner 5112 may similarly provide these current positions to coordination manager 5108.

Coordination manager 5108 may then evaluate the current positions of the plurality of client terminal devices to identify client terminal devices that are proximate to each other as part of stage 5202. For example, if position determiner 5112 provides absolute geographic positions of client terminal devices or relative geographic positions with respect to leader terminal device 4904, coordination manager 5108 may evaluate the absolute or relative geographic positions to identify client terminal devices that are within a predefined radius of each other (e.g., 10 m, 25 m, 50 m, 100 m, or another radius depending on the desired degree of radio measurement accuracy). Coordination manager 5108 may then select these client terminal devices within the predefined radius (for example, client terminal device 4906 and 4908 in the exemplary context of FIGS. 49A and 49B) to coordinate radio measurements. If position determiner 5112 provides relative positions of client terminal devices with respect to each other (e.g., in the form of signal strength measurements), coordination manager 5108 may similarly select client terminal devices within a predefined distance of each other (e.g., an estimated distance of less than a predefined threshold, or a signal strength measurement greater than a predefined threshold).

Coordination manager 5108 may additionally select the type of coordination and/or what radio measurements are to be coordinated in stage 5202. For example, coordination manager 5108 may select which terminal devices should perform which radio measurements, such as by selecting one or more measurement tasks (e.g., cell-specific measurement of certain network access nodes or wideband measurement of certain carrier frequencies) for one or more client terminal devices. Coordination manager 5108 may also select whether the client terminal devices should share the radio measurements and/or verify the radio measurements. In the exemplary case of FIG. 52, coordination manager 5108 may therefore select to assign client terminal device 4906 to perform a cell-specific measurement of network access node 4902, and to share the cell-specific measurement with client terminal device 4908.

After selecting terminal devices to coordinate in stage 5202, communication processor 5110 may transmit control signaling, in some cases after triggering by coordination manager 5108, to the selected terminal devices in stage 5204. For example, communication processor 5110 may generate control signaling that specifies the measurement tasks (e.g., measurement targets such as network access nodes and/or carrier frequencies), the type of coordination (e.g., sharing or verifying), and the devices to coordinate with (e.g., by specifying a device identity or other identifying characteristic). In the exemplary case of FIG. 49A, communication processor 5110 may generate the control signaling to assign client terminal device 4906 to perform a radio measurement of network access node 4902, and to share the radio measurement with client terminal device 4908. For example, communication processor 5110 may generate control signaling for client terminal device 4906 according to a predefined message format that includes a first field specifying that client terminal device 4906 is assigned to perform a radio measurement of network access node 4902 (e.g., specifying the measurement target), a second field specifying that the coordination type is radio measurement sharing, and a third field specifying that the sharing destination is client terminal device 4908 (e.g., identified by some device identity of client terminal device 4908). Communication processor 5110 may also generate control signaling for client terminal device 4906 according to the predefined message format that includes, for example, a first field specifying that the measurement target is network access node 4902, a second field specifying that the coordination type is sharing, and a third field specifying that the sharing origin is client terminal device 4906. Various other control signaling formats can be used in the same manner. Although depicted for two client devices in FIG. 49A, this is exemplary and communication processor 5110 may likewise generate control signaling to instruct other client terminal devices to coordinate radio measurement with other client terminal devices.

Communication processor 5110 may then transmit the control signaling (via RF transceiver 5104 and antenna system 5102) to the appropriate client terminal devices. Client terminal devices 4906 and 4908 may receive the control signaling and process the control signaling at communication processor 5010 in stage 5206 to determine one or more of which measurement tasks to perform, what other client terminal devices to coordinate with, and what type of coordination to perform. As previously indicated, the control signaling may include control signaling organized according to a predefined format, which communication processors 5010 of client terminal devices 4906 and 4908 may be configured to read according to the predefined format to interpret. In the exemplary case of FIG. 49A, the control signaling for client terminal device 4908 may instruct client terminal device 4908 to perform a radio measurement of network access node 4902, and to share the radio measurement with client terminal device 4906, while the control signaling for client terminal device 4906 may notify client terminal device 4906 that client terminal device 4908 will share a radio measurement for network access node 4902. Communication processor 5010 may then instruct measurement engine 5008 to perform the measurement tasks as instructed in the control signaling.

Measurement engine 5008 may then, for example, perform a cell-specific measurement of network access node 4902 at measurement engine 5008 in stage 5208. Measurement engine 5008 may similarly perform other measurement tasks depending on the instructions included in the control signaling, which, as previously described, may include various cell-specific and/or wideband measurements (which can also be part of scan-type measurements). Measurement engine 5008 may then provide the resulting radio measurements to communication processor 5010.

Communication processor 5010 may then share the radio measurement (as instructed in the control signaling) in stage 5210, namely by transmitting the radio measurement to client terminal device 4906. In some aspects, client terminal device 4908 may transmit the radio measurement to client terminal device 4906 using a sidelink interface (transmitted via RF transceiver 5004 and antenna system 5002) directly between client terminal device 4908 and 4906. The sidelink interface, which can be any direct link between terminal devices, can use any sidelink protocol, such as Device-to-Device (D2D), LTE Proximity Services (ProSe), LTE Vehicle-to-Vehicle (V2V), LTE Machine-Type Communication (MTC), Direct Short-Range Communications (DSRC), or any other protocol that supports direct communications between terminal devices. In some aspects, client terminal device 4908 may transmit the radio measurement to client terminal device 4906 using a sidelink interface via one or more relaying devices. For example, client terminal device 4908 may transmit the radio measurement to client terminal device 4906 using sidelink interfaces for which one or more other terminal devices (e.g., client terminal devices or leader terminal devices) act as a relay. In another example, client terminal device 4908 may transmit the radio measurement to client terminal device 4906 using a network access node or other radio access network component as a relay, such as by transmitting the radio measurement to network access node 4902, which may then relay the radio measurement to client terminal device 4908. Subsequent reference to communications between terminal devices may use any of these or similar techniques to carry out the communications.

Client terminal device 4906 may receive the radio measurement at communication processor 5010, and may then apply the radio measurement for mobility procedures in stage 5212. For example, communication processor 5010 of client terminal device 4906 may use the radio measurement to perform a cell selection, a network selection, to transmit a measurement report, and/or to perform a handover (including transmitting a measurement report).

In a variation of message sequence chart 5200, leader terminal device 4904 may instruct client terminal device 4908 to transmit a measurement report on behalf of client terminal device 4906. For example, instead of sharing the radio measurement with client terminal device 4906 in stage 5210, client terminal device 4908 may generate a measurement report at its communication processor 5010 and transmit the measurement report on behalf of client terminal device 4906. Client terminal device 4908 may, for example, transmit the measurement report to the serving network access node of client terminal device 4906, which may fulfill a scheduled measurement report that client terminal device 4906 is expected to transmit to its serving network access node. In some cases, this can reduce signaling overhead, as client terminal device 4908 may transmit the measurement report directly to the serving network access node of client terminal device 4906 (instead of sharing the radio measurement with client terminal device 4906, which may then generate and transmit a measurement report to its serving network access node). In some cases where client terminal devices 4906 and 4908 may have the same serving network access node and both be scheduled to transmit measurement reports to the serving network access node, client terminal device 4906 may transmit the measurement report on behalf of both client terminal device 4906 and 4908.

In a variation of message sequence chart 5200, leader terminal device 4904 may instruct client terminal device 4906 to perform the same measurement task as client terminal device 4908 with the control signaling, such as to perform a cell-specific measurement of network access node 4902. The control signaling may also instruct client terminal device 4906 to verify its local radio measurement with the shared radio measurement from client terminal device 4908. Client terminal device 4906 may thus similarly perform the cell-specific measurement of network access node 4902 at its measurement engine 5008, and may therefore obtain duplicate radio measurements due to the radio measurement shared by client terminal device 4908. Communication processor 5010 of client terminal device 4906 may then compare the local and shared radio measurements to determine if they match (e.g., if the difference between the local and shared radio measurements is less than a predefined threshold or the local and shared radio measurements are within a predefined percentage of each other). As the similarity between the local and shared radio measurements may scale inversely with the distance between client terminal devices 4906 and 4908, in some aspects communication processor 5010 of client terminal device 4906 may compensate by scaling the predefined threshold or predefined percentage inversely with the distance between client terminal device 4906 and 4908.

If communication processor 5010 determines that the local and shared radio measurements match, communication processor 5010 may use the local radio measurement (or the shared radio measurement, or an average value of the local and shared radio measurements) as part of mobility procedures. If communication processor 5010 determines that the local and shared radio measurements do not match, communication processor 5010 may re-perform the measurement task to obtain a new local radio measurement to use for mobility procedures. In some aspects, communication processor 5010 may notify leader terminal device 4904 or client terminal device 4908 that the radio measurements did not match, which may prompt client terminal device 4908 to likewise re-perform the measurement task to obtain a new shared radio measurement to share with client terminal device 4906. In some aspects, leader terminal device 4904 may assign client terminal devices 4906 and 4908 to share some radio measurements (e.g., that are only performed at one of client terminal device 4906 or 4908) while also assigning client terminal devices 4906 and 4908 to verify other radio measurements.

FIG. 53 shows an example where client terminal devices 4906 and 4908 may exchange radio measurements with each other. For example, communication processor 5110 of leader terminal device 4904 may select terminal devices to coordinate in stage 5302, and then generate control signaling in stage 5304 that instructs client terminal device 4908 to perform a first set of measurement tasks and client terminal device 4906 to perform a second set of measurement tasks. In the example of FIG. 49A, the control signaling may instruct client terminal device 4908 to perform a cell-specific radio measurement of network access node 4902 as a first measurement task, and instruct client terminal device 4906 to perform a cell-specific radio measurement of network access node 4910 as a second measurement task. Other first and second sets of measurement tasks can be similarly formulated. For example, client terminal device 4908 may be assigned to measure a first set of network access nodes or carrier frequencies as the first set of measurement tasks, while client terminal device 4906 may be assigned to measure a second set of network access nodes or carrier frequencies as the second set of measurement tasks. In some aspects, the measurement tasks may be on different measurement targets, while in other aspects the measurement tasks may be on the same measurement targets (e.g., by assigning a first client terminal device to measure a measurement target at a first set of times and assigning a second client terminal device to measure the same measurement target at a second set of times, where the first and second sets of times may be interleaved or occur one after the other). Leader terminal device 4904 may transmit the control signaling in stage 5304.

Client terminal devices 4906 and 4908 may then receive and process the control signaling at their respective communication processors 5010 in stages 5306*a* and 5306*b*, which may occur at the same or different times. Client terminal devices 4906 and 4908 may therefore identify their respectively assigned measurement tasks and determine that they are assigned to share the resulting radio measurements with each other. Client terminal devices 4906 and 4908 may then perform the radio measurements in stages 5308*a* and 5308*b* (at the same or different times) at their respective measurement engines 5008 to obtain the radio measurements.

Client terminal devices 4906 and 4908 may then share the resulting radio measurements with each other (as controlled by their respective communication processors 5010) in stages 5310*a* and 5310*b* (at the same or different times). As the measurement tasks may be different (e.g., on different measurement targets and/or at the same measurement targets at different times), client terminal devices 4906 and 4908 may thus obtain a larger set of radio measurements than were obtained locally. Client terminal devices 4906 and 4908 may then apply the local and shared radio measurements for mobility procedures in stages 5312*a* and 5312*b* (at the same or different times).

In a variation of message sequence chart 5300, client terminal device 4906 or client terminal device 4908 may transmit a measurement report, such as to a serving network access node of client terminal device 4906 or client terminal device 4908, on behalf of the other of client terminal device 4906 or 4908. For example, instead of sharing the radio measurement with client terminal device 4908 in stage 5310*a*, client terminal device 4906 may transmit a measurement report including the radio measurement to the serving network access node of client terminal device 4908 on behalf of client terminal device 4908. In some aspects, such as if client terminal devices 4906 and 4908 have the same serving network access node, the measurement report may satisfy a scheduled measurement report for both client terminal devices 4906 and 4908 (where, for example, the proximity between client terminal devices 4906 and 4908 can enable a single radio measurement from a measurement target to act as the radio measurement from the measurement target and both of client terminal devices 4906 and 4908).

In a variation of message sequence chart 5300, leader terminal device 4904 may assign, via the control signaling, client terminal devices 4906 and 4908 to perform the same measurement tasks and to verify the resulting measurements. Client terminal devices 4906 and 4908 may thus perform the same measurement tasks to obtain duplicate radio measurements, share the duplicate radio measurements, and compare the local duplicate radio measurements with the shared duplicate radio measurements to determine if the duplicate radio measurements match. Client terminal devices 4906 and 4908 may then use the local/shared radio measurements if they match, or may re-perform the local radio measurements (and optionally also obtain new shared local radio measurements from each other). In some aspects, leader terminal device 4904 may assign client terminal devices 4906 and 4908 to share some radio measurements (e.g., that are only performed at one of client terminal device 4906 or 4908) while also assigning client terminal devices 4906 and 4908 to verify other radio measurements.

In some aspects, leader terminal device 4904 and/or client terminal devices 4906 and 4908 may repeat some or all of the process of message sequence charts 5200 and 5300. For example, leader terminal device 4904 may re-select terminal devices to coordinate, such as by re-determining the positions of the plurality of client terminal devices served by leader terminal device 4904 and re-selecting client terminal devices that are proximate to each other to assign for coordination. This can allow leader terminal device 4904 to update the client terminal devices assigned for coordination in response to the changing positions of the client terminal devices, many of which may be mobile. In some aspects, coordination manager 5108 of leader terminal device 4904 may maintain a tracking table (or any other type of state data) that identifies which client terminal devices are assigned to each other for coordination. The tracking table may also include other relevant information, such as the position of the client terminal devices, radio communication technologies supported by the client terminal devices, or the serving or neighboring network access nodes of the client terminal devices. Coordination manager 5108 may be configured to store the tracking table in a local memory and to enter data into the tracking table that identifies the vehicular communication devices (e.g., based on a device ID, such as a universal device ID, temporary device ID, or cluster device ID). Coordination manager 5108 may therefore retain information that identifies which client terminal devices are assigned to coordinate. Coordination manager 5108 may use the tracking table when deciding whether to assigned client terminal devices to coordinate, such as by checking the tracking table to determine whether the client terminal devices are already assigned to coordinate with other devices.

Leader terminal device 4904 may then transmit control signaling to the client devices assigned for coordination, which may receive and process the control signaling to identify one or more of which other client devices to coordinate with, what measurement tasks to coordinate, and what type of coordination to perform. The client terminal devices may then carry out the assigned coordination according to the control signaling, such as by performing their respectively assigned measurement tasks and sharing and/or verifying the resulting radio measurements. Leader terminal device 4904 and its client terminal devices may continually repeat this process, if desired.

In some cases, this repetition can assist with recurrent measurements and/or recurrent measurement reporting. For example, terminal devices may be configured to continually perform radio measurements, such as to continually monitor the radio channel with a serving network access node, to continually monitor for neighboring network access nodes, or to continually provide measurement reports to the network. Accordingly, by repeating some or all of the process of message sequence charts 5200 and 5300, terminal devices may use coordination to assist in obtaining these repeated measurements. For example, instead of performing a scheduled radio measurement periodically at each of a plurality of time intervals, a terminal device may only perform the radio measurement at some of the plurality of time intervals, and may receive shared radio measurements to use at the other of the plurality of time intervals. In another example, a terminal device may perform the radio measurement at all of the plurality of time intervals, and may receive duplicate shared radio measurements for each of the plural of time intervals to use for verifying the local radio measurements.

In some aspects, leader terminal device 4904 may consider the measurement task schedule for client terminal devices when selecting terminal devices to coordinate. For example, client terminal devices 4906 and 4908 may transmit their respective measurement task schedules (e.g., a time-delineated schedule that specifies the time points when certain measurement tasks are scheduled to be performed, which in some cases can be designated by the network) to leader terminal device 4904. Leader terminal device 4904 may then select client terminal devices to assign for coordination based on the measurement task schedules. For example, leader terminal device 4904 may compare the measurement task schedules (e.g., by comparing the different time points when the measurement tasks are scheduled) to determine if any of the measurement task schedules include the same measurement tasks at similar time points (e.g., radio measurements of the same measurement target occurring within a predefined time window of each other). If leader terminal device 4904 identifies measurement task schedules that include the same measurement tasks at similar time points, leader terminal device 4904 may assign the corresponding client terminal devices to coordinate, such as by instructing one of the client terminal devices to perform the measurement task and share the resulting radio measurement with the other client terminal device at the scheduled time and/or by instructing both client terminal devices to perform the measurement task and to compare their resulting radio measurements to verify the radio measurements.

Various aspects described above may focus on cases where leader terminal device 4904 assigns specific measurement tasks to the client terminal devices. In other aspects, leader terminal device 4904 may coordinate radio measurements by assigning client terminal devices to form a measurement coordination group. Instead of assigning the specific measurement tasks to the client terminal devices, the client terminal devices assigned to a measurement coordination group may then be responsible for determining one or more of what type of coordination to perform, what measurement tasks to distribute to the client terminal devices in the measurement coordination group, and what radio measurements to share with other client terminal devices in the measurement coordination group.

Figure 54:
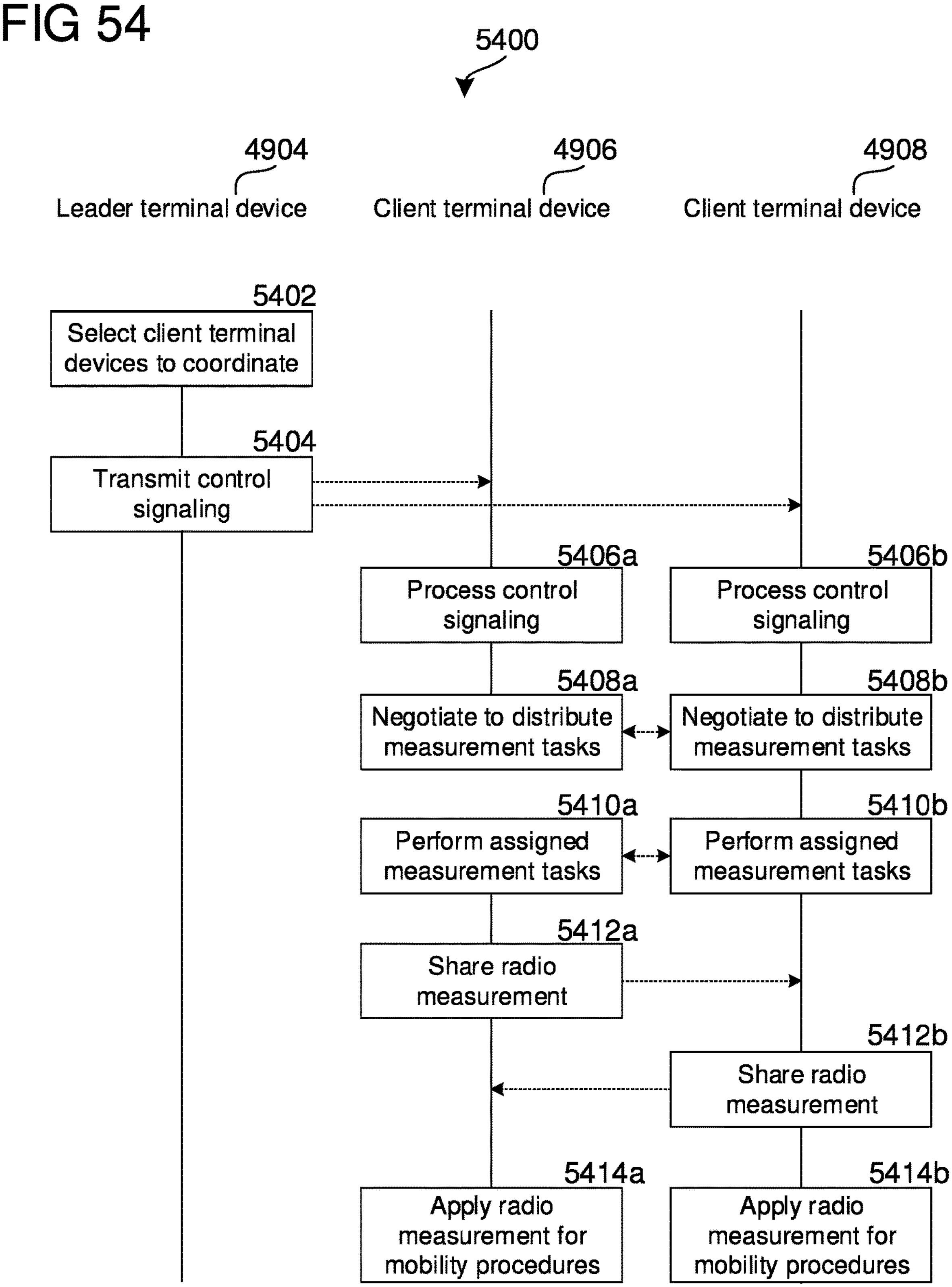
FIG. 54 shows an exemplary message sequence chart describing a procedure for forming measurement coordination groups of client terminal devices according to some aspects.

FIG. 54 shows exemplary message sequence chart 5400 according to some aspects, in which leader terminal device 4904 assigns client terminal devices 4906 and 4908 to a measurement coordination group. As shown in FIG. 54, leader terminal device 4904 may select client terminal devices to coordinate in stage 5402. For example, similarly to as described above regarding FIGS. 52 and 53, leader terminal device 4904 may select client terminal devices to assign for coordination based on the positions of a plurality of client terminal devices served by leader terminal device 4904, such as by identifying which of the plurality of client devices are proximate to each other.

In the example of FIG. 54, leader terminal device 4904 may select to assign client terminal devices 4906 and 4908 to coordinate with each other. As previously indicated, instead of assigning specific measurement tasks to client terminal devices 4906 and 4908, in the context of FIG. 54 leader terminal device 4904 may assign client terminal devices 4906 and 4908 to form a measurement coordination group. Accordingly, leader terminal device 4904 may then generate control signaling (at communication processor 5110) that instructs client terminal devices 4906 and 4908 to perform a measurement coordination group. For example, communication processor 5110 may generate control signaling for client terminal device 4906 according to a predefined message format that includes a first field specifying that client terminal device 4906 is assigned to a measurement coordination group and a second field specifying that the measurement coordination group also includes client terminal device 4908 (e.g., identified by some device identity of client terminal device 4908). Communication processor 5110 may likewise generate control signaling for client terminal device 4908 that includes a first field specifying that client terminal device 4908 is assigned to a measurement coordination group and a second field specifying that the measurement coordination group also includes client terminal device 4906. Various other control signaling formats can be used in the same manner.

Communication processor 5110 may then transmit the control signaling to client terminal devices 4906 and 4908 in stage 5404. Client terminal devices 4906 and 4908 may receive and process the control signaling in stages **5406*a* and 5406*b*, and determine that they are assigned to form a measurement coordination group with each other. Instead of being assigned specific measurement tasks by leader terminal device 4904, client terminal devices 4906 and 4908 may negotiate with each other to distribute the measurement tasks as part of the measurement coordination group in stages 5408*a* and 5408*b*. This can be handled by their respective communication processors 5010, which may exchange control signaling to facilitate the negotiation. For example, measurement engine 5008 of client terminal device 4906 may store a tracking table (e.g., in a local memory) that tracks the measurement tasks that client terminal device 4906 is scheduled to perform. The measurement tasks may be scheduled according to a set period, based on a triggering condition (e.g., a serving network access node signal strength or signal quality falling below a threshold), or an external trigger (e.g., instruction to perform a measurement task by another communication device). Measurement engine 5008 may be configured to update the tracking table to add measurement tasks once they are scheduled, and to remove the measurement tasks from the tracking table once they are performed (e.g., for single-occurrence measurements). In some aspects, measurement engine 5008** may store measurement tasks in the tracking table as entries that identify the type of measurement, the radio communication technology of the measurement, the target of the measurement, and/or the scheduled timing of the measurement.

Client terminal device 4906 may transmit control signaling to client terminal device 4908 that specifies a first set of measurement tasks that client terminal device 4906 is scheduled to perform. The first set of measurement tasks can be any subset of measurement tasks from the tracking table. Client terminal device 4908 may receive the control signaling at its communication processor 5010 and compare the first set of measurement tasks to a second set of measurement tasks that client terminal device 4908 is scheduled to perform. For example, client terminal device 4908 may locally store its own tracking table at its measurement engines 5008, and may compare the first set of measurement tasks to the measurement tasks stored in its tracking table.

If any of the first set of measurement tasks are also included in the second set of measurement tasks (e.g., measurement of the same measurement target scheduled for time points occurring within a predefined time window), client terminal device 4908 may respond to client terminal device 4906 with a proposal that distributes some of the common measurement tasks to client terminal device 4906 and the rest of the common measurement tasks (e.g., measurement tasks appearing in both the first and second sets of measurement tasks) to client terminal device 4908. Client terminal devices 4906 and 4908 may thus negotiate in such a manner, optimally including proposal acceptance signaling, proposal rejection signaling, and counter-proposal signaling, to decide which of client terminal devices 4906 and 4908 should perform which measurement tasks. In some aspects, client terminal devices 4906 and 4908 may re-distribute measurement tasks that are not common measurement tasks. For example, client terminal devices 4906 and 4908 may aggregate the first and set sets of measurement tasks to obtain the complete set of measurement tasks, and may then re-distribute the complete set of measurement tasks between terminal devices 4906 and 4908. For instance, client terminal device 4906 and/or 4908 may agree that client terminal device 4906 will perform some of the complete set of measurement tasks that are on measurement targets on a first frequency band or first RAT, while client terminal device 4908 will perform other of the complete set of measurement tasks that are on measurement targets on a second frequency band or second RAT. In some cases, this re-distribution may reduce the number of different frequency bands or RATs that each client terminal device performs radio measurement on (e.g., reduce the number of inter-frequency or inter-RAT measurements), which can reduce measurement time or battery drain. Other redistribution schemes for the first and second sets of measurement tasks can be used in the same manner, where client terminal devices 4906 and 4908 may divide up the complete set of measurement tasks such that they are assigned to different client terminal devices. Some redistribution schemes may avoid or limit duplicate radio measurements (unless verification is being performed) by assigning a given measurement task to only one of client terminal device 4906 or 4908.

After agreeing on the distribution of measurement tasks, client terminal devices 4906 and 4908 may perform their respectively assigned measurement tasks in stages 5410*a* and 5410*b*. Client terminal devices 4906 and 4908 may then share the resulting radio measurements in stages 5412*a* and 5412*b* based on the agreed distribution of measurement tasks. For example, if client terminal device 4906 performed any of the second set of measurement tasks in stage 5410*a*, client terminal device 4906 may share the resulting radio measurement with client terminal device 4908 in stage 5412*a*. Likewise, if client terminal device 4908 performed any of the first set of measurement tasks in stage 5410*b*, client terminal device 4908 may share the resulting radio measurement with client terminal device 4906 in stage 5412*b*. Client terminal devices 4906 and 4908 may then apply the shared and local radio measurements for mobility procedures in stages 5414*a* and 5414*b*.

It may therefore be the responsibility of the client terminal devices assigned to a measurement coordination group to decide on the distribution of measurement tasks. In some aspects, leader terminal device 4904 may update the measurement coordination groups at a later time by re-selecting the client terminal devices assigned to the measurement coordination group, such as based on the changing positions of client terminal devices 4906 and 4908 and/or the scheduled measurement tasks assigned to client terminal devices 4906 and 4908.

In a variation of message sequence chart 5400, client terminal device 4906 and/or 4908 may transmit a measurement report on behalf of the other of client terminal devices 4906 or 4908. This can take place instead of sharing radio measurements in stages 5412*a* and 5412*b*, where, for example, client terminal device 4906 transmits a measurement report including a radio measurement to the serving network access node of client terminal device 4908 without first sharing the radio measurement with client terminal device 4908.

In a variation of message sequence chart 5400, client terminal devices 4906 and 4908 may additionally or alternatively negotiate in stages 5408*a* and 5408*b* to verify some or all of the radio measurements. Accordingly, client terminal devices 4906 and 4908 may distribute the same measurement task to both client terminal devices 4906 and 4908 in stages 5408*a* and 5408*b*. Client terminal devices 4906 and 4908 may then exchange the resulting duplicate radio measurements, and each compare the shared duplicate radio measurement with the local duplicate radio measurement to determine whether the duplicate radio measurements match. Alternatively, only one of client terminal device 4906 or 4908 may send its local duplicate radio measurement to the other of client terminal device 4906 or 4908, which may then perform the verification. Client terminal devices 4906 and/or 4908 may then apply the duplicate radio measurements (e.g., the local duplicate radio measurement, the shared duplicate radio measurement, or a combination of the local and shared duplicate radio measurements) if the duplicate radio measurements are verified, or may re-perform the verification with new duplicate radio measurements if the duplicate radio measurements are not verified.

In some aspects, leader terminal device 4904 and client terminal devices 4906 and 4908 may be members of a cluster of terminal devices for which leader terminal device 4904 is the cluster head. The cluster may be a cluster of handheld terminal devices, a cluster of vehicular terminal devices, a cluster of drones (e.g., a drone swarm), a cluster of Internet of Things (IoT) devices, or similar such homogenous or heterogenous clusters. As leader terminal device 4904 may be the cluster head, leader terminal device 4904 may exercise a degree of control over the cluster members including client terminal devices 4906 and 4908. Leader terminal device 4904 may therefore utilize its position as cluster head to exercise control over the cluster members (e.g., the plurality of client devices) to assign certain client terminal devices to coordinate radio measurements with each other (including sharing, verifying, and assigning to a measurement coordination group). As leader terminal device 4904 is the cluster head, the cluster members including client terminal device 4906 and 4908 may be obligated to follow instructions issued by leader terminal device 4904, including control signaling related to measurement coordination.

Figure 55A:
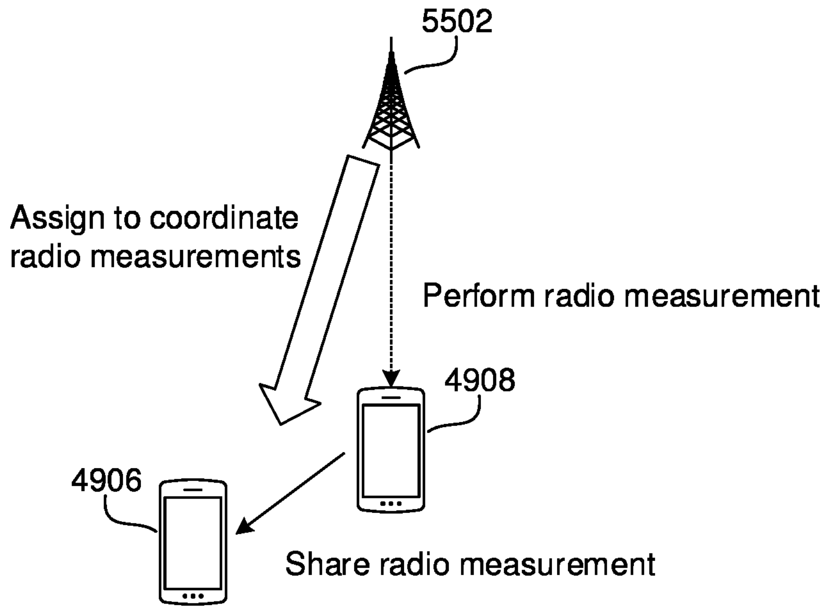
FIGS. 55A and 55B show exemplary network scenarios where a network access node manages radio measurement coordination of terminal devices according to some aspects.
Figure 55B:
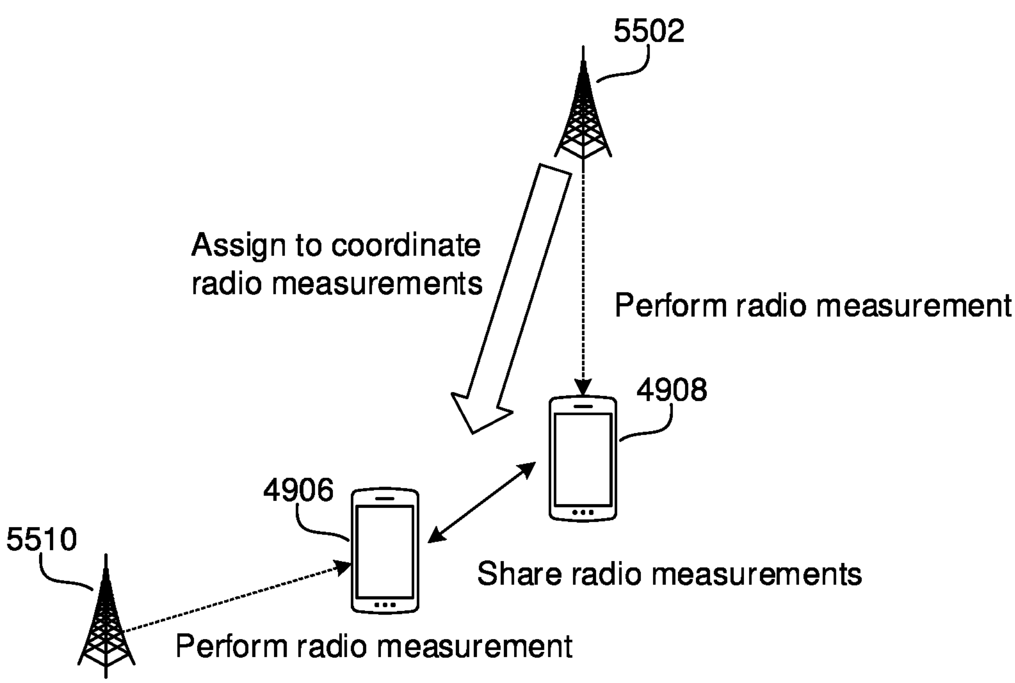

In some aspects, devices other than leader terminal devices or cluster heads may assume the controlling device role realized by leader terminal device 4904 in the examples described above. FIGS. 55A and 55B show examples in which network access node 5502 assumes the controlling device role, and accordingly can assign client terminal devices to coordinate radio measurements with each other, while FIG. 56 shows an exemplary internal configuration of network access node 5502 according to some aspects.

As shown in FIG. 56, network access node 5502 may include antenna system 5602 and radio transceiver 5604, which may be configured in the manner of antenna system 302 and radio transceiver 304 of network access node 110 in FIG. 3. Network access node 5502 may further include communication arrangement 5606 including coordination manager 5608, communication processor 5610, and position determiner 5612. Coordination manager 5608 may be a processor configured to retrieve (from a local memory) and execute program code that algorithmically defines how terminal devices are selected to coordinate radio measurements with each other. With reference to network access node 110 of FIG. 3, coordination manager 5608 can be a component of controller 310, and accordingly may be a protocol stack or application layer component. The program code executed by coordination manager 5608 may therefore be protocol stack layer software or application layer software.

Communication processor 5610 may be a processor that is configured to control the overall transmit and receive operations of network access node 110. With reference to terminal device 102 of FIG. 2, communication processor 5610 can be a component of controller 210 and/or digital signal processor 208, and accordingly may be a protocol stack-layer or physical layer component (although is not strictly limited to such). The program code executed by communication processor 5610 may therefore be protocol stack-layer software. In some aspects, communication processor 5610 may also include one or more hardware accelerators, which may be dedicated to physical or protocol stack layer processing tasks.

Position determiner 5612 may be a hardware circuit arrangement or processor that is configured to determine the positions of terminal devices. Position determiner 5612 may be configured to determine the positions of client terminal devices by explicit reporting (e.g., where the client terminal device transmits a position report to position determiner 5612 that explicitly specifies its position) or algorithmic derivation (e.g., where position determiner 5612 algorithmically processes signals to determine the position of a client terminal device). In some aspects, position determiner 5612 may include a processor configured to retrieve (from a local memory) and execute program code that instructs position determiner 5612 to receive and interpret position reports provided by client terminal devices. In some aspects, position determiner 5612 may include a processor or one or more hardware accelerators configured to algorithmically calculate a position of a client terminal device, such as by performing a signal strength measurement and determining the relative distance between network access node 5502 and the client terminal device based on how strong the signal strength measurement is. For example, position determiner 5612 may be configured to perform a sequence of calculations on digital radio or baseband data received from network access node 5502 to determine a signal strength measurement. Position determiner 5612 may then be configured to calculate the relative distance between network access node 5502 and the client terminal device using a mathematically-defined inversely proportional relationship between received signal strength and relative distance.

In some aspects, position determiner 5612 may include a combination of such processor and dedicated hardware components. Although shown as logically separate components in FIG. 56, this illustrates the functional separation between coordination manager 5608, communication processor 5610, and position determiner 5612 and does not limit coordination manager 5608, communication processor 5610, and position determiner 5612 to being physically separate components. Accordingly, in some aspects coordination manager 5608, communication processor 5610, and position determiner 5612 may be physically separate components, while in other aspects coordination manager 5608, communication processor 5610, and position determiner 5612 may be physically integrated components, such as a digitally-configured hardware arrangement including circuitry to perform multiple functions or a processor configured to execute multiple subroutines.

Network access node 5502 may therefore utilize coordination manager 5608, communication processor 5610, and position determiner 5612 in the manner that leader terminal device 4904 utilizes coordination manager 5108, communication processor 5110, and position determiner 5112. Network access node 5502 may therefore assign client terminal devices 4906 and 4908 to coordinate radio measurements, such as by selecting client terminal devices 4906 and 4908 for coordination (e.g., according to their positions), assigning specific measurement tasks to client terminal devices 4906 and 4908, instructing client terminal devices 4906 and 4908 to share certain measurement results, instructing client terminal devices 4906 and 4908 to verify certain measurement results, and/or assigning client terminal devices 4906 and 4908 to a measurement coordination group.

For example, in the exemplary case of FIG. 55A, network access node 5502 may instruct client terminal device 4908 via control signaling to perform a radio measurement of a particular measurement target (e.g., may assign client terminal device 4908 with a measurement task). In some cases, the measurement target may be network access node 5502, while in other cases the measurement target may be another device. Network access node 5502 may also instruct client terminal device 4908 to share the resulting radio measurement with client terminal device 4906. Client terminal device 4908 may therefore transmit the resulting radio measurement to client terminal device 4906 after performing the measurement task.

In another example, in the exemplary case of FIG. 55B network access node 5502 may assign client terminal devices 4908 and 4906 to coordinate radio measurements by assigning a first measurement task to client terminal device 4908 and a second measurement task to client terminal device 4906. For instance, network access node 5502 may assign client terminal device 4908 to measure network access node 5502, and assign client terminal device 4906 to measure network access node 5510. Network access node 5502 may further instruct client terminal devices 4908 and 4906 to exchange the resulting radio measurements with each other, which may either be strictly sharing radio measurements or verifying radio measurements.

In a variation of the examples of FIGS. 55A and 55B, network access node 5502 may assign client terminal devices 4906 and 4908 to form a measurement coordination group. Accordingly, instead of assigning client terminal devices 4906 and 4908 to perform specific measurement tasks and/or coordinate radio measurements in a particular way (e.g., sharing or verification), network access node 5502 may assign client terminal devices 4906 and 4908 to a measurement coordination group and allow client terminal devices 4906 and 4908 to negotiate with each other to select how to perform the coordination.

Network access node 5502 may perform any such coordination functionality as previously described with respect to leader terminal device 4904. Furthermore, in some aspects, coordination manager 5608, communication processor 5610, and position determiner 5612 may be provided in a core network server, edge server or the like instead of a network access node location. Coordination manager 5608, communication processor 5610, and position determiner 5612 may then interface with a network access node, and may send control signaling addressed to the client terminal devices to the network access node for the network access node to transmit via its baseband, RF, and antenna components. Coordination manager 5608, communication processor 5610, and position determiner 5612 may perform any of the functionality described for leader terminal device 4904 in this manner.

Centralized architectures of radio measurement coordination may therefore use any of a leader terminal device, a network access node, a core network server, or an edge server to act as a controlling device to manage the coordination of radio measurements between various client terminal devices. Furthermore, some aspects of this disclosure may use a distributed architecture for radio measurement coordination. In such distributed architectures, terminal devices may negotiate with each other to coordinate radio measurements without direct coordination control provided by a controlling device.

Figure 57:
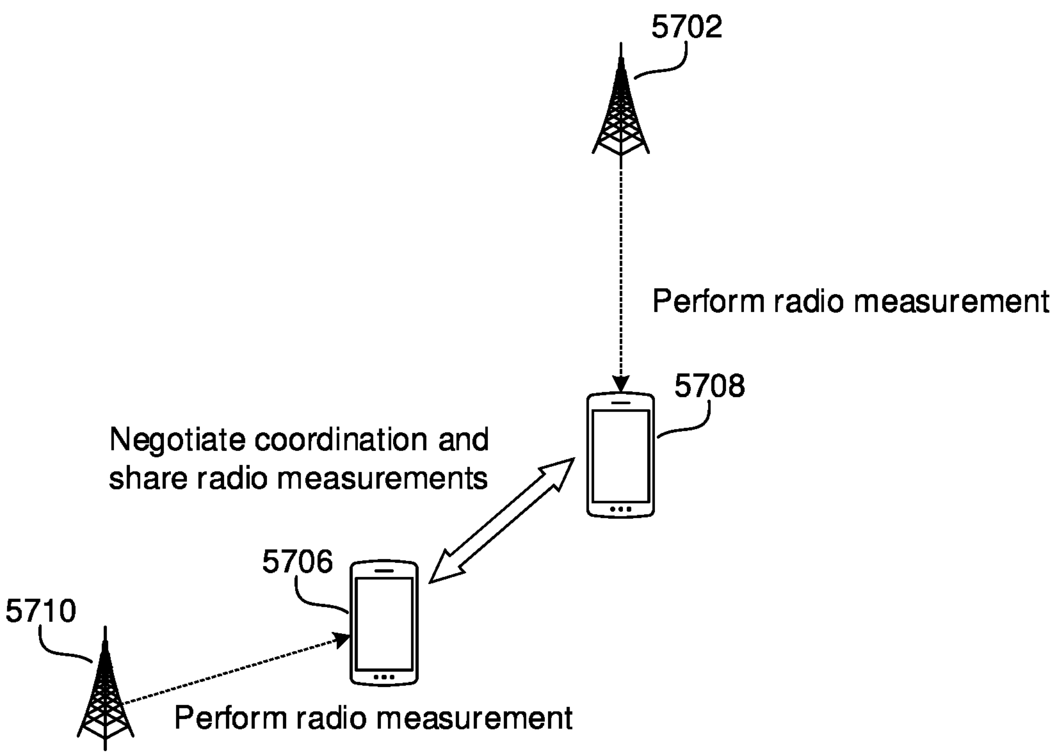
FIG. 57 shows an exemplary network scenario of terminal devices forming measurement coordination groups in a distributed manner according to some aspects.

FIG. 57 shows an example of a distributed architecture of radio measurement coordination according to some aspects. As opposed to the previous examples of FIGS. 49-56 in which a controlling device exercises control over the radio measurement coordination, terminal devices 5706 and 5708 may negotiate with each other to coordinate radio measurements of network access nodes 5702 and 5710, which, in various aspects, can include distributing measurement tasks to each other, sharing radio measurements, verifying radio measurements, and/or transmitting measurement reports on behalf of each other. Terminal devices 5706 and 5708 may be members of a cluster or may be independent terminal devices (e.g., not members of a cluster). Terminal devices 5706 and 5708 may be configured in the manner of client terminal devices 4906 and 4908 as shown and described for FIG. 50.

Figure 58:
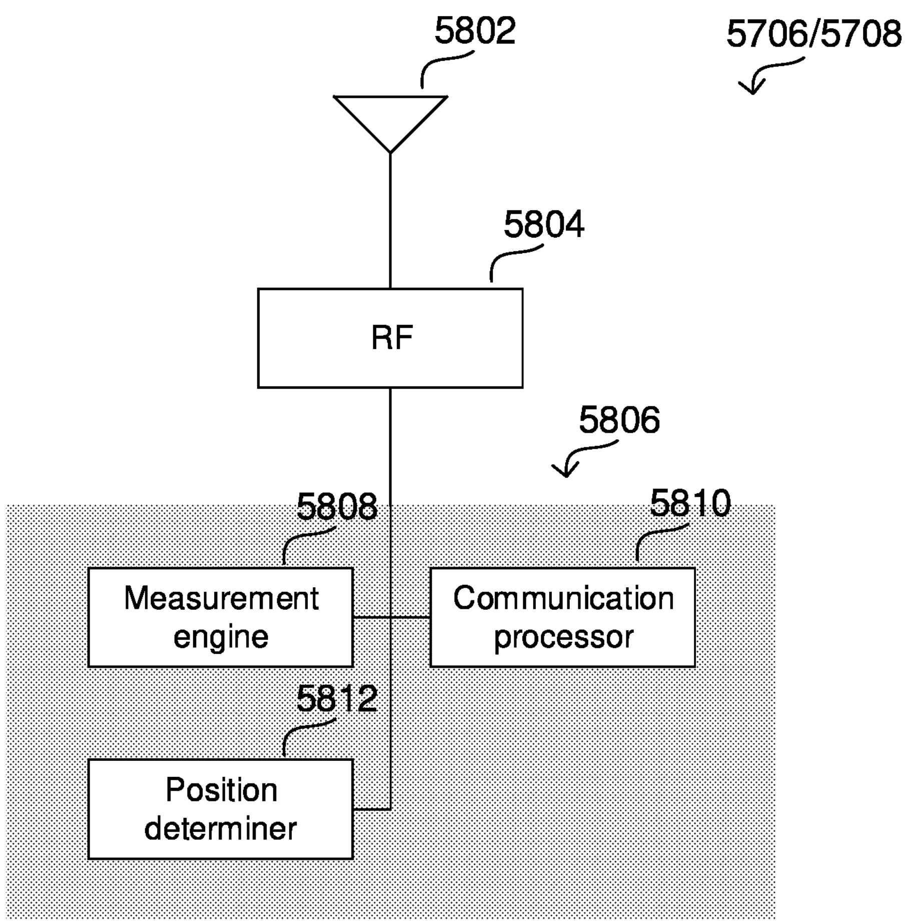
FIG. 58 shows an exemplary internal configuration of a terminal device configured to form measurement coordination groups in a distributed manner according to some aspects.

FIG. 58 shows an exemplary internal configuration of terminal devices 5706 and 5708 according to some aspects. As shown in FIG. 58, terminal devices 5706 and 5708 may include antenna system 5802 and RF transceiver 5804, which may be configured in the manner of antenna system 202 and RF transceiver 203 as shown and described for terminal device 102 in FIG. 2. Terminal device 5706/5708 may further include communication arrangement 5806, which may include measurement engine 5808, communication processor 5810, and position determiner 5812. Measurement engine 5808 and communication processor 5810 may be configured in the manner of measurement engine 5008 and communication processor 5010, respectively, as shown and described for client terminal device 4906/4908 in FIG. 50. Position determiner 5812 may be configured in the manner of position determiner 5112 as shown and described for leader terminal device 4904 in FIG. 51, and may accordingly be configured to determine the positions of other terminal devices.

Figure 59:
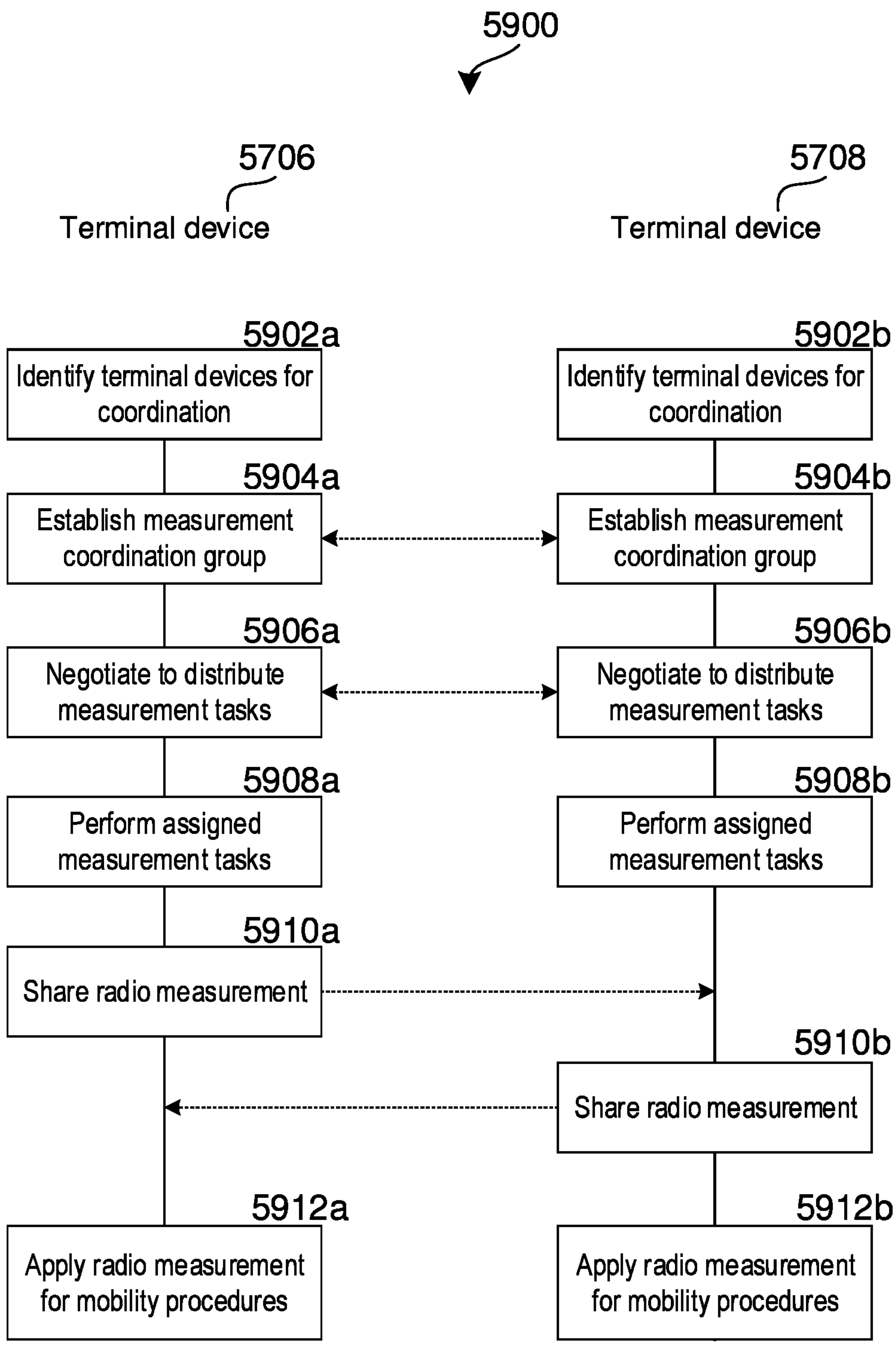
FIG. 59 shows an exemplary message sequence chart describing a procedure for terminal devices to form measurement coordination groups in a distributed manner according to some aspects.

FIG. 59 shows message sequence chart 5900 counterpart to the example of FIG. 57 according to some aspects. As shown in FIG. 59, terminal devices 5706 and 5708 may identify terminal devices for coordination in stages 5902*a* and 5902*b*. In some aspects, this can include transmitting discovery signals (e.g., broadcasted signals that identify the transmitting device and can be used by other devices to detect and identify the transmitting device) via sidelink interfaces (at their respective communication processors 5010), which other proximate terminal devices within radio range may receive. In some aspects, the discovery signals can specify a position of the transmitting terminal device, which the receiving terminal device may identify at its communication processor 5010. In some aspects, stages 5902*a* and 5902*b* can include receiving control signaling from other devices (at their respective communication processors 5010), such as from a cluster head or network access node, that specifies positions of other terminal devices.

In some aspects, terminal devices 5706 and 5708 may then determine the positions of other terminal devices with position determiner 5812. For example, if terminal device 5706 receives a discovery signal from terminal device 5708, position determiner 5812 may either estimate the position of terminal device 5708 based on processing of the received discovery signal (e.g., by estimating the positioning based on the inverse-scaling relationship between signal strength and distance and/or estimating an angle-of-arrival of the received discovery signal via execution of an angle-of-arrival estimation algorithm) or based on a position of terminal device 5708 indicated in the discovery signal. Position determiner 5812 may then determine the relative position between terminal device 5708 and terminal device 5706 (e.g., the distance between terminal device 5708 and terminal device 5706 or the signal strength between terminal device 5708 and terminal device 5706). In another example, if terminal device 5706 receives control signaling from another device that specifies the position of the terminal device 5708, communication processor 5810 may provide the position of terminal device 5708 to position determiner 5812. Position determiner 5812 may then determine the relative position between terminal device 5706 and 5708.

Position determiner 5812 of terminal device 5706/5708 may similarly determine the relative positions of a plurality of terminal devices in stages 5902*a* and 5902*b*. After determining the relative positions, position determiner 5812 may select one or more terminal devices that are proximate to terminal device 5706/5708 (e.g., within a predefined radius and/or having a received signal strength above a predefined threshold) as coordination candidates. Position determiner 5812 may report the selected terminal devices to communication processor 5810. For example, position determiner 5812 of terminal device 5706 may determine that terminal device 5708 is proximate to terminal device 5706, and may report terminal device 5708 to communication processor 5810 as a coordination candidate. Terminal device 5708 may similarly select terminal device 5706 as a coordination candidate.

After identifying terminal devices as coordination candidates, terminal device 5706/5708 may attempt to establish a measurement coordination group with the coordination candidates in stages 5904*a* and 5904*b*. For example, communication processor 5810 of terminal device 5706 may transmit control signaling to terminal device 5708 in stage 5904*a* that invites terminal device 5708 to form a measurement coordination group. Terminal device 5708 may receive the control signaling at its communication processor 5810, and may then respond with control signaling that accepts or declines the invitation in stage 5904*b*. In the example of FIG. 59, terminal device 5708 may accept the invitation and consequently respond to terminal device 5706 with control signaling that accepts the invitation.

Terminal devices 5706 and 5708 may thus establish a measurement coordination group in stages 5904*a* and 5904*b*. Terminal devices 5706 and 5708 may then negotiate to distribute measurement tasks to each other in stages 5906*a* and 5906*b*. Stages 5906*a* and 5906*b* can include any functionality as shown and described for stages 5408*a* and 5408*b* in FIG. 54. Accordingly, terminal devices 5706 and 5708 may decide how to distribute an overall set of measurement tasks to determine a first set of measurement tasks assigned to terminal device 5706 and a second set of measurement tasks assigned to terminal device 5708. In some aspects, the first set of measurement tasks can include common measurement tasks to the second set of measurement tasks, which terminal devices 5706 and 5708 may use to obtain redundant radio measurements for verification. In some aspects, the first set of measurement tasks can additionally or alternatively include different measurement tasks from the second set of measurement tasks, which terminal devices 5706 and 5708 may use to share radio measurements.

Terminal devices 5706 and 5708 may then perform their respectively assigned measurement tasks in stages 5910*a* and 5910*b* at their respective measurement engines 5808, and may then share any radio measurements that were designated for sharing (e.g., agreed upon for sharing during the negotiation of stages 5908*a* and 5908*b*) with each other in stages 5912*a* and 5912*b*. If any redundant radio measurements were designated for verification, terminal devices 5706 and 5708 may verify local radio measurements with shared radio measurements that were received in stages 5910*a* and 5910*b*, and optionally repeat the radio measurements if the redundant radio measurements fail the verification.

Terminal devices 5706 and 5708 may then apply the radio measurements for mobility procedures in stages 5912*a* and 5912*b*. Accordingly, terminal devices 5706 and 5708 may manage radio measurement coordination with a distributed architecture to similarly share and/or verify radio measurements.

Figure 60:
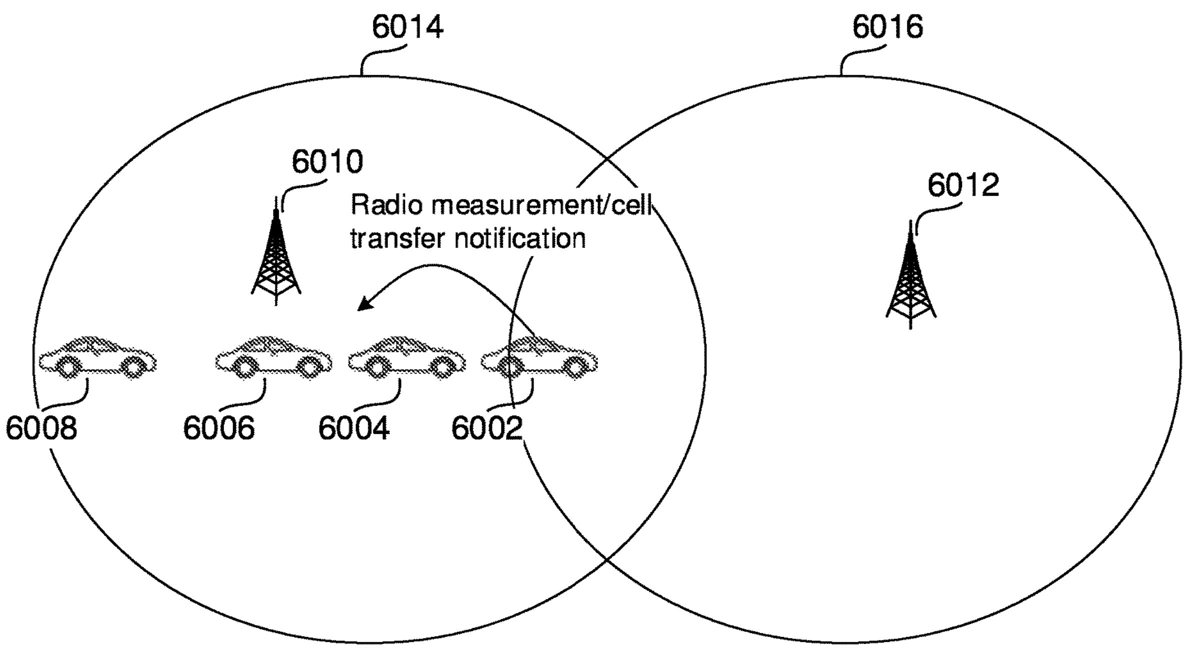
FIG. 60 shows an exemplary network scenario of vehicular communication devices performing coordinate cell transfers according to some aspects.
Figure 61:
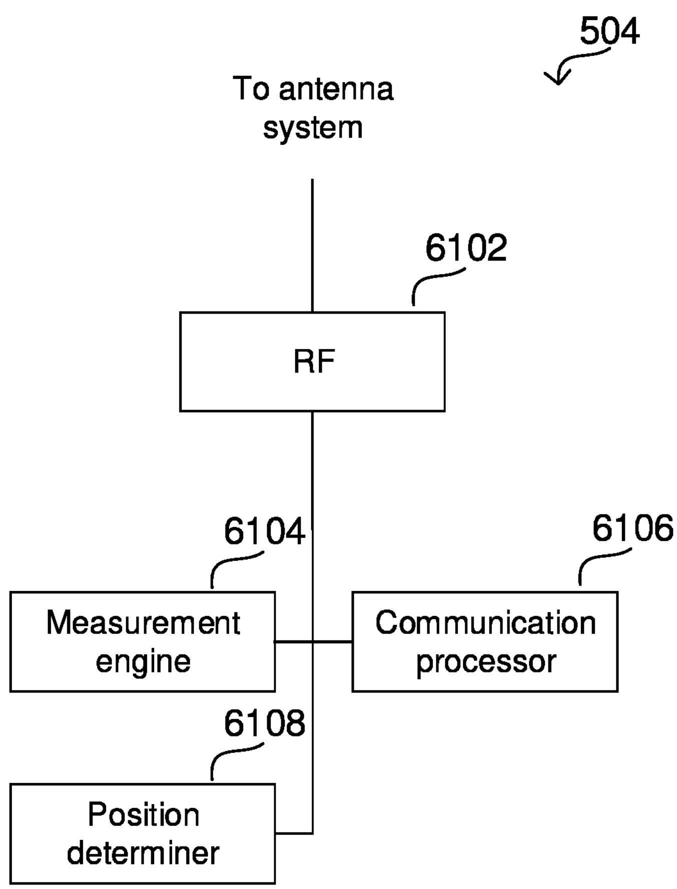
FIG. 61 shows an exemplary internal configuration of a communication arrangement of a vehicular communication device configured to perform coordinated cell transfers according to some aspects.

In some aspects, communication devices that are moving together, such as vehicular communication devices, may utilize radio measurement coordination to coordinate cell transfers. FIG. 60 shows an example of radio measurement coordination between vehicular communication devices 6002, 6004, 6006, and 6008 according to some aspects. Vehicular communication devices 6002-6008 may be configured in the manner of vehicular communication device 500 as shown and described for FIG. 5, and accordingly may each include a steering and movement system 502, communication arrangement 504, and antenna system 506. FIG. 61 shows an exemplary internal configuration of the communication arrangements 504 of vehicular communication devices 6002-6008, which may control the radio measurement coordination. RF transceiver 6102 may be configured in the manner of RF transceiver 602 of vehicular terminal device 500 as shown and described in FIG. 6. Measurement engine 6104, communication processor 6106, and position determiner 6108 may structurally be sub-components of digital signal processor 604 or controller 606, but are not expressly limited to being a physical layer, protocol stack layer, or application layer component. Measurement engine 6104, communication processor 6106, and position determiner 6108 may be configured in the manner of measurement engine 5808, communication processor 5810, and position determiner 5812 as shown and described for FIG. 58.

As shown in FIG. 60, vehicular communication devices 6002-6008 may be moving together in unison, such as to the same destination or along the same route. One of vehicular communication devices, such as vehicular communication device 6002 in the example of FIG. 60, may be leading the rest of the vehicular communication devices and may thus be a leader vehicular communication device. In some aspects, vehicular communication devices 6002-6008 may form a cluster, and therefore may have a pre-established cluster connection (e.g., a logical connection at their respective communication processors 6106 that is controlled and managed via exchange of control signaling). In some cases, leader terminal vehicular communication device 6002 may therefore be the cluster head, while in other cases another of vehicular communication devices 6002-6008 may be the cluster head and leader vehicular communication device 6002 may only be the vehicular communication device that is moving in front of vehicular communication devices 6002-6008.

Figure 62:
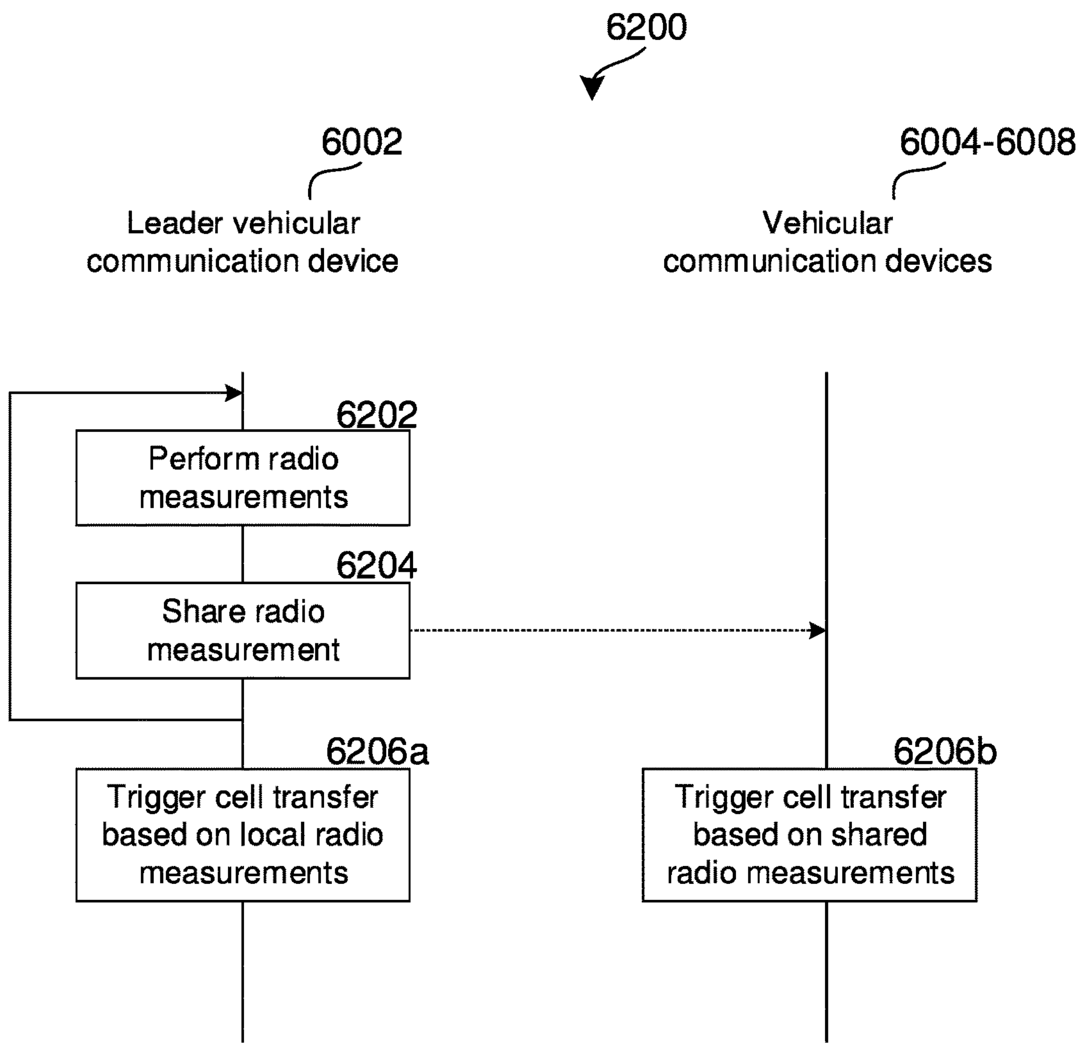
FIG. 62 shows an exemplary message sequence chart describing a procedure for coordinating cell transfer based on shared radio measurements by a leader vehicular communication device according to some aspects.

FIG. 62 shows exemplary message sequence chart 6200 counterpart to the example of FIG. 60. As shown in FIG. 62, and with reference to the example of FIG. 60, vehicular communication devices 6002-6008 may be moving in unison, such as to the same destination or along the same route. As leader vehicular communication device 6002 may be leading vehicular communication devices 6004-6008 (e.g., moving in front of vehicular communication devices 6004-6008 along their path of travel), leader vehicular communication device 6002 may perform radio measurements at stage 6202 (with its measurement engine 6104) and share the radio measurements with vehicular communication devices 6004-6008 in stage 6204 (with its communication processor 6106 via RF transceiver 6102 and antenna system 506). Leader vehicular communication device 6002 may continue to perform radio measurements and share the radio measurements with vehicular communication devices 6004-6008.

Vehicular communication devices 6002-6008 may use the local (for leader vehicular communication device 6002) and shared radio measurements (for vehicular communication devices 6004-6008) to perform mobility procedures such as cell transfers. These cell transfers may be triggered by various measurement thresholds, such as a serving network access node signal power or signal quality measurement falling below a predefined triggering threshold and/or a neighboring network access node signal power or signal quality measurement exceeding a predefined triggering threshold. If a vehicular communication device is in radio idle state, the vehicular communication device may locally decide whether to perform a cell reselection from a current network access node to a neighboring network access node. If the vehicular communication device is in a radio connected state, the vehicular communication device may report the radio measurements to its current serving network access node, which may compare the radio measurements to the triggering thresholds and decide whether to trigger a handover for the vehicular communication device.

With continued reference to FIG. 60, the radio measurements of network access node 6010 may decrease in signal power and/or signal quality as leader vehicular communication device 6002 moves further from network access node 6010 towards the edge of coverage area 6014. Conversely, the radio measurements of network access node 6012 may increase in signal power and/or signal quality as leader vehicular communication device 6002 moves into coverage area 6016 towards network access node 6012.

Accordingly, if in radio idle state, communication processor 6106 of leader vehicular communication device 6002 may continue to evaluate the radio measurements obtained by measurement engine 6104 to determine whether the radio measurements satisfy the conditions for cell reselection (e.g., when the serving cell radio measurements are above a predefined triggering threshold and/or the neighboring cell radio measurements are below a predefined triggering threshold). For example, the communication processors 6106 of vehicular communication devices 6002-6008 may receive the radio measurements, and determine whether to perform a cell transfer, such as a cell reselection or handover, based on the radio measurements. For example, the protocol stack program code executed by communication processors 6106 may define these triggering thresholds, and include instructions that define the comparison of received radio measurements to these triggering thresholds and the subsequent triggering of cell transfer if the radio measurements are above or below the various triggering thresholds.

If in radio connected state, communication processor 6106 of leader vehicular communication device 6002 may generate measurement reports including the radio measurements and transmit the measurement reports to network access node 6010. Network access node 6010 may then similarly compare the radio measurements in the measurement reports to determine whether the serving cell radio measurements and/or neighboring cell radio measurements meet the conditions for handover.

Once leader vehicular communication device 6002 moves far enough from network access node 6010 that the radio measurements meet the triggering thresholds for cell transfer, leader vehicular communication device 6002 may trigger cell transfer in stage 6206*a* from network access node 6010 to network access node 6012. If in radio idle state, communication processor 6106 may trigger cell reselection in stage 6206*a* based on comparison of the local radio measurements to the triggering thresholds. If in radio connected state, communication processor 6106 may receive a handover command in stage 6206*a* from network access node 6010 in response to the measurement reports including the local radio measurements. Leader vehicular communication device 6002 may then carry out the cell transfer.

As leader vehicular communication device 6002 has been sharing its radio measurements with vehicular communication devices 6004-6008, vehicular communication devices 6004-6008 may also have been comparing the shared radio measurements with the triggering thresholds (if in radio idle state) or reporting the shared radio measurements to network access node 6010 (if in radio connected state). As the radio measurements used by vehicular communication devices 6004-6008 may be the same as those use by leader vehicular communication device 6002 to trigger the cell transfer, vehicular communication devices 6004-6008 may likewise trigger the same cell transfer from network access node 6010 to network access node 6012 in stage 6206*b*.

Figure 63:
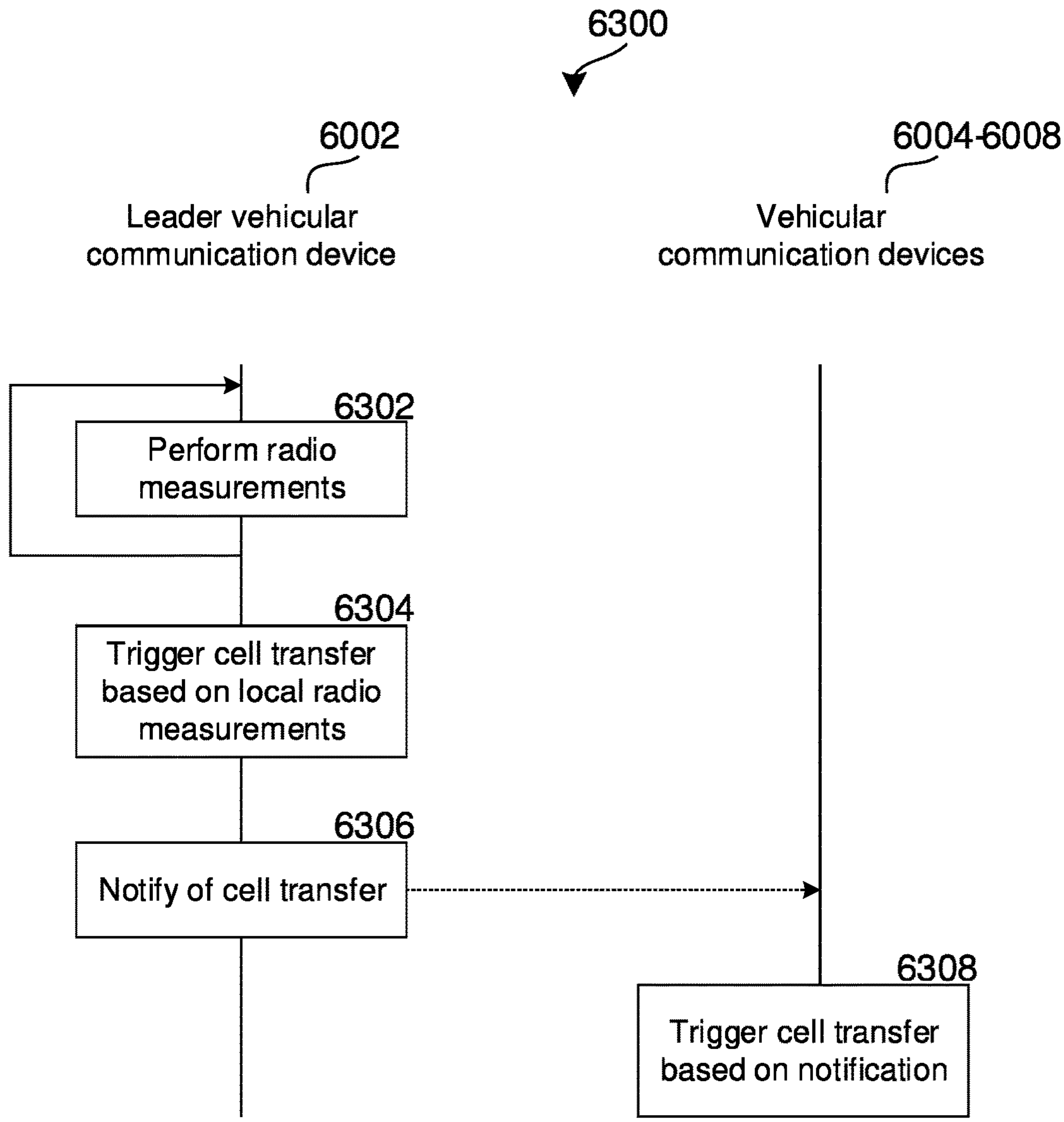
FIG. 63 shows an exemplary message sequence chart describing a procedure for coordinating cell transfer based on a cell transfer notification by a leader vehicular communication device according to some aspects.

FIG. 62 thus shows an example in which the leader vehicular communication device assumes responsibility for acquiring radio measurements for the other vehicular communication devices (although, in some aspects, the other vehicular communication devices may also perform their own radio measurements in addition to receiving the shared radio measurements). FIG. 63 shows message sequence chart 6300 illustrating another example according to some aspects in which the leader vehicular communication device informs the other vehicular communication devices of a cell transfer. Accordingly, instead of sharing the radio measurements with vehicular communication devices 6004-6008, leader vehicular communication device 6002 may instead perform its own local radio measurements in stage 6302 and trigger a cell transfer in stage 6304 based on the local radio measurements (either locally triggered if in radio idle state or externally triggered by network access node 6010 if in radio connected state). Leader vehicular communication device 6002 may then notify vehicular communication devices 6004-6008 of the cell transfer (via communication processor 6106) at stage 6306. The cell transfer notification may include the time of cell transfer and the identity of the destination network access node, e.g., network access node 6012.

Vehicular communication devices 6004-6008 may then trigger their own cell transfers based on the notification in stage 6308, and may therefore make the same cell transfer from network access node 6010 to network access node 6012 as leader vehicular communication device 6002. In some aspects, vehicular communication devices 6004-6008 may perform their own radio measurements or may receive shared radio measurements from leader vehicular communication device 6002, and may decide whether or not to make the same cell transfer based on the local or shared radio measurements.

In some aspects, vehicular communication devices 6004-6008 may use a latency-controlled cell transfer to control the timing of the cell transfer. As shown in FIG. 60, each of vehicular communication devices 6002-6008 may be separated by a distance while traveling. The distances may be approximately the same, such as a cluster of autonomous devices moving with uniform speed along the same path, or may vary. As vehicular communication devices 6002-6008 are separated by such distances, vehicular communication devices 6002-6008 may pass from coverage area 6014 to coverage area 6016 at different times. Accordingly, instead of triggering the cell transfer upon receipt of the transfer notification in stage 6308, vehicular communication devices 6002-6008 may use a latency-controlled cell transfer to stagger the time points when the cell transfers are triggered.

The respective stages 6308 for each of vehicular communication devices 6002-6008 may therefore occur at different times. For example, leader vehicular communication device 6002 may perform the first cell transfer and notify vehicular communication devices 6002-6008 of the cell transfer. Vehicular communication devices 6004-6008 may then stagger their cell transfers such that vehicular communication device 6004 performs the second cell transfer in time, vehicular communication device 6006 performs the third cell transfer in time, and vehicular communication device 6008 performs the fourth cell transfer in time.

In some aspects, vehicular communication devices 6002-6008 may utilize their position determiners 6108 to determine the relative positions of the vehicular communication devices 6002-6008. In one example, leader vehicular communication device 6002 may utilize its position determiner 6108 to determine the relative positions between leader vehicular communication device 6002 and vehicular communication devices 6004-6008. In some aspects, position determiner 6108 can determine the relative positions via explicit reporting (where, for example, vehicular communication devices 6004-6008 report their positions to leader vehicular communication device 6002) or via algorithmic derivation (where, for example, position determiner 6108 evaluates received radio signals to estimate the relative positions based on received signal strength). Based on the relative positions of vehicular communication devices 6002-6008, communication processor 6106 may determine a latency for each of vehicular communication devices 6004-6008 to define how long to wait before triggering the cell transfer. For example, communication processor 6106 may determine a first latency for vehicular communication device 6004 to wait after receiving the cell transfer notification before triggering its cell transfer, a second latency for vehicular communication device 6006 to wait after receiving the cell transfer notification before triggering its cell transfer, and a third latency for vehicular communication device 6008 to wait after receiving the cell transfer notification before triggering its cell transfer. The first latency may be the shortest duration and time, while the third duration may be the longest duration and time. Communication processor 6106 may determine the latencies based on a directly proportional relationship with the relative position of the vehicular communication device and leader vehicular communication device 6002, where larger relative positions may yield larger latencies. Communication processor 6106 may specify the assigned latencies in the cell transfer notification, which vehicular communication devices 6002-6008 may follow when performing the latency-controlled cell transfer.

In some aspects, the position determiners 6108 of vehicular communication devices 6004-6008 may determine their own relative positions and calculate their own latencies. For example, position determiner 6108 of vehicular communication device 6004 may determine its relative position to leader vehicular communication device 6002 and communication processor 6106 may then determine the latency to use (relative to receipt of the cell transfer notification from vehicular communication device 6002) based on the relative position. Communication processor 6106 may then use the determined latency to trigger the cell transfer to network access node 6012. In some aspects, leader vehicular communication device 6002 may specify its current position in the cell transfer notification, which position determiner 6108 can use to determine the relative position (e.g., via explicit reporting) between vehicular communication device 6004 and leader vehicular communication device 6002. In some aspects, position determiner 6108 may estimate the relative position between vehicular communication device 6004 and leader vehicular communication device 6002 using algorithmic derivation. In some aspects, communication processor 6106 of vehicular communication devices 6004 may also consider a current speed or acceleration of vehicular communication devices 6004 relative to vehicular communication device 6002 when determining the latency, which can assist in properly timing the latency-controlled cell transfer.

Accordingly, vehicular communication devices 6004-6008 may calculate the respective latencies to use for triggering their own cell transfers, and may then trigger their cell transfers to accomplish the latency-controlled cell transfer. In some cases, this can assist in avoiding a 'control storm' in which a large number of terminal devices overload the network by attempting to handover at the same time.

As previously indicated, handover decisions may be handled by the network, such as where network access node 6010 decides to trigger a handover for vehicular communication device 6002 from network access node 6010 to network access node 6012 based on measurement reports of network access node 6010 and network access node 6012 provided by vehicular communication device 6002. In some aspects where vehicular communication devices 6002-6006 are part of a cluster, network access node 6010 may use the measurement reports provided by vehicular communication device 6002 to trigger handovers for vehicular communication devices 6002-6006 (e.g., one or more other devices in the cluster). Accordingly, in some aspects vehicular communication devices 6004-6008 (e.g., the vehicular communication devices that are not leading the cluster) may or may not transmit measurement reports to network access node 6010, and network access node 6010 may use the measurement reports provided by vehicular communication device 6002 (e.g., the vehicular communication device leading the cluster) to trigger handovers for vehicular communication devices 6004-6008.

In some aspects, network access node 6010 may be configured to perform the rest of the handover procedure (following reception of measurement reports and deciding to perform a handover) separately for each of vehicular communication devices 6002-6008. Accordingly, while network access node 6010 may use the measurement reports provided by vehicular communication device 6002 to trigger handovers of vehicular communication devices 6004-6008, network access node 6010 may perform the remaining operations of the handover procedure separately for vehicular communication devices 6002-6008.

Figure 64:
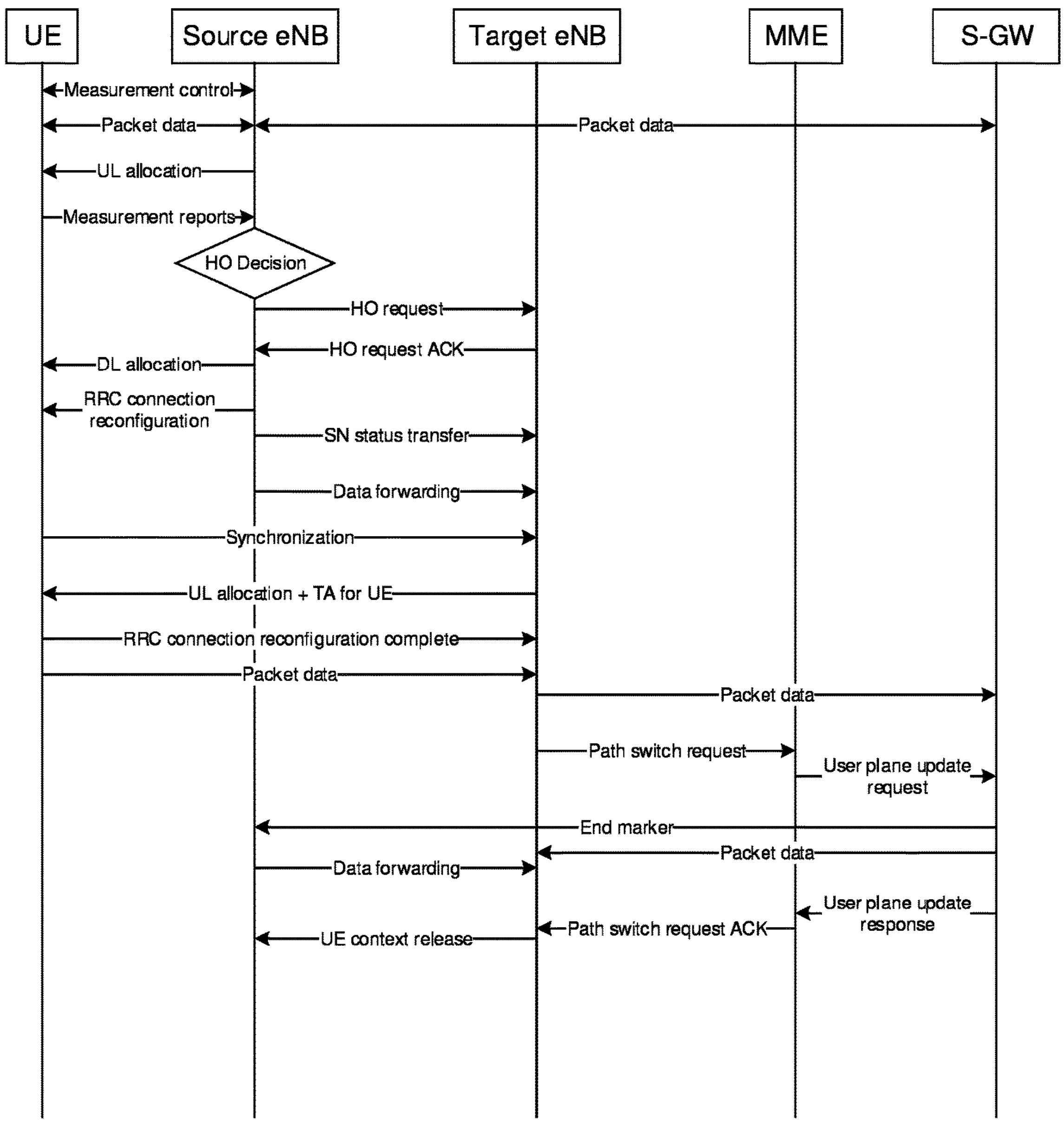
FIG. 64 shows an exemplary procedure for performing handovers according to some aspects.

FIG. 64 shows an exemplary handover procedure as detailed in 3GP TS 36.300 (version 14.2.0, Release 14), "LTE; Evolved Universal Terrestrial Radio Access (E-UTRA) and Evolved Universal Terrestrial Radio Access Network (E-UTRAN); Overall description; Stage 2" for an LTE context. As shown in FIG. 64, a terminal device (e.g., "UE") may receive packet data from an external data network via a gateway (e.g., "Serving Gateway") of the core network. The UE may generate and transmit measurement reports to its serving network access node (e.g., "Source eNB"), which may then trigger a handover (e.g., "HO Decision") of the terminal device to a target network access node (e.g., "Target eNB"). The serving network access node may then notify the terminal device of the handover decision to the target network access node (e.g., "RRC Connection Reconfiguration") and forward related data to the target network access node. The terminal device may then synchronize with the target network access node by performing a random access procedure with the target network access node, after which the target network access node may provide a timing advance (e.g., "TA") to the terminal device for the terminal device to use to time transmissions to the target network access node. Once this procedure is complete, the target network access node may become the new serving network access node for the terminal device, and may route data to and from the terminal device over the connection with the gateway. The new serving network access node, the old serving network access node, the gateway, and a mobility server (e.g., "MME") may then finalize the handover procedure by completing a path switch and deleting the terminal device's information (e.g., "UE Context Release") from the old serving network access node.

Accordingly, in some aspects, network access node 6010 (acting as the serving network access node) may receive measurement reports from vehicular communication device 6002 and use the measurement reports from vehicular communication device 6002 to trigger handover for all of vehicular communication devices 6002-6008. Network access node 6010, network access node 6012 (acting as the target network access node), the core network (including the mobility server and the gateway), and vehicular communication devices 6002-6008 may then perform the subsequent operations following "HO Decision" independently for each of vehicular communication devices 6002-6008. This can include one or more of separate synchronization procedures, timing advance, and control signaling exchange for the handovers of each of vehicular communication devices 6002-6008.

In other aspects, network access node 6010, network access node 6012, and the core network may integrate, or bundle, some or all of the handover procedure for vehicular communication devices 6002-6008. For example, network access node 6010 may similarly trigger handovers for each of vehicular communication devices 6002-6008 based on the measurement reports provided by vehicular communication device 6002. In some aspects, network access node 6010 may then notify network access node 6012 of the handovers for each of vehicular communication devices 6002-6008 with a single exchange of control signaling. In some aspects, vesical communication device 6002 may receive the handover notification ("RRC Connection Reconfiguration"), and may then forward the handover notification to vehicular communication devices 6004-6008. Network access node 6010 may therefore not transmit individual handover notifications to vehicular communication devices 6004-6008.

In some aspects, vehicular communication device 6002 may perform a synchronization procedure with network access node 6012, and vehicular communication devices 6004-6008 may use the results of the synchronization procedure instead of performing their own individual synchronization procedures with network access node 6012. For example, vehicular communication device 6002 may perform a random access procedure with network access node 6012 to obtain time and/or frequency synchronization with network access node 6012, and may transmit information to vehicular communication devices 6004-6008 that details the time and/or frequency synchronization (e.g., a frame schedule and/or specific carrier frequency). Vehicular communication devices 6004-6008 may then use the information to synchronize with network access node 6012 instead of performing their own individual random access procedures. In some aspects, vehicular communication device 6002 may receive a timing advance from network access node 6012 as part of the synchronization procedure, and may then provide the timing advance to vehicular communication devices 6004-6008 for them to use when transmitting to network access node 6012. For example, as vehicular communication devices 6002-6008 are traveling in a cluster, the timing advance for vehicular communication device 6002 may be usable by vehicular communication devices 6004-6008 even though there may be slight differences in their respective propagation delays. In other aspects, vehicular communication devices 6004-6008 may perform their own individual synchronization procedures.

In some aspects, network access node 6010, network access node 6012, and the core network may then finalize the handover procedures for each of vehicular communication devices 6002-6008 in a single exchange of control signaling (e.g., as opposed to performing individual exchanges of control signaling for each of vehicular communication devices 6002-6008). In other aspects, network access node 6010, network access node 6012, and the core network may finalize the handover procedures by performing individual exchanges of control signaling for each of vehicular communication devices 6002-6008.

Figure 65:
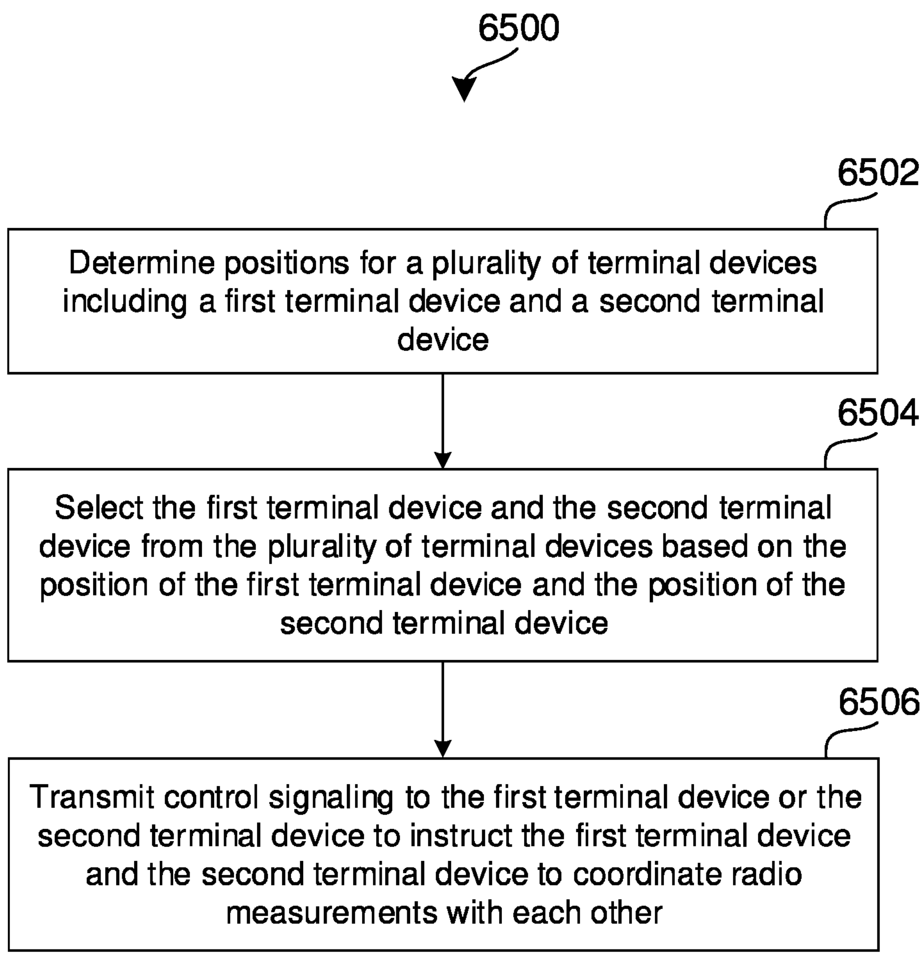
FIG. 65 shows a first exemplary method for performing wireless communications with radio measurement coordination according to some aspects.

FIG. 65 shows exemplary method 6500 of performing wireless communications according to some aspects. As shown in FIG. 65, method 6500 includes determining positions for a plurality of terminal devices including a first terminal device and a second terminal device (6502), selecting the first terminal device and the second terminal device from the plurality of terminal devices based on the position of the first terminal device and the position of the second terminal device (6504), and transmitting control signaling to the first terminal device or the second terminal device to instruct the first terminal device and the second terminal device to coordinate radio measurements with each other (6506).

Figure 66:
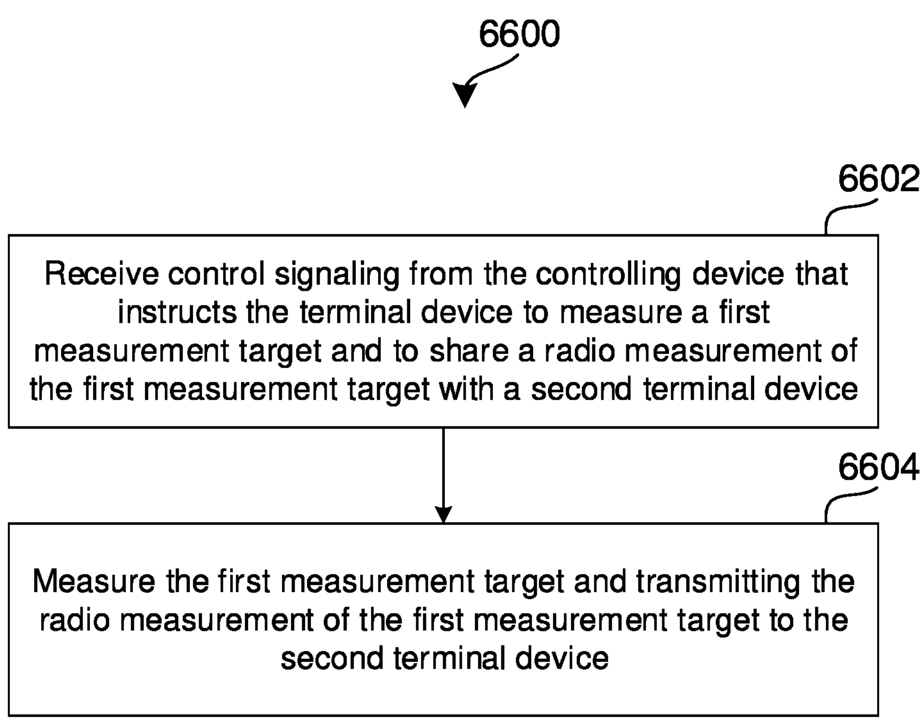
FIG. 66 shows a second exemplary method for performing wireless communications with radio measurement coordination according to some aspects.

FIG. 66 shows method 6600 of performing wireless communications at a terminal device according to some aspects. As shown in FIG. 66, method 6600 includes receiving control signaling from the controlling device that instructs the terminal device to measure a first measurement target and to share a radio measurement of the first measurement target with a second terminal device (6602), and measuring the first measurement target and transmitting the radio measurement of the first measurement target to the second terminal device (6604).

Figure 67:
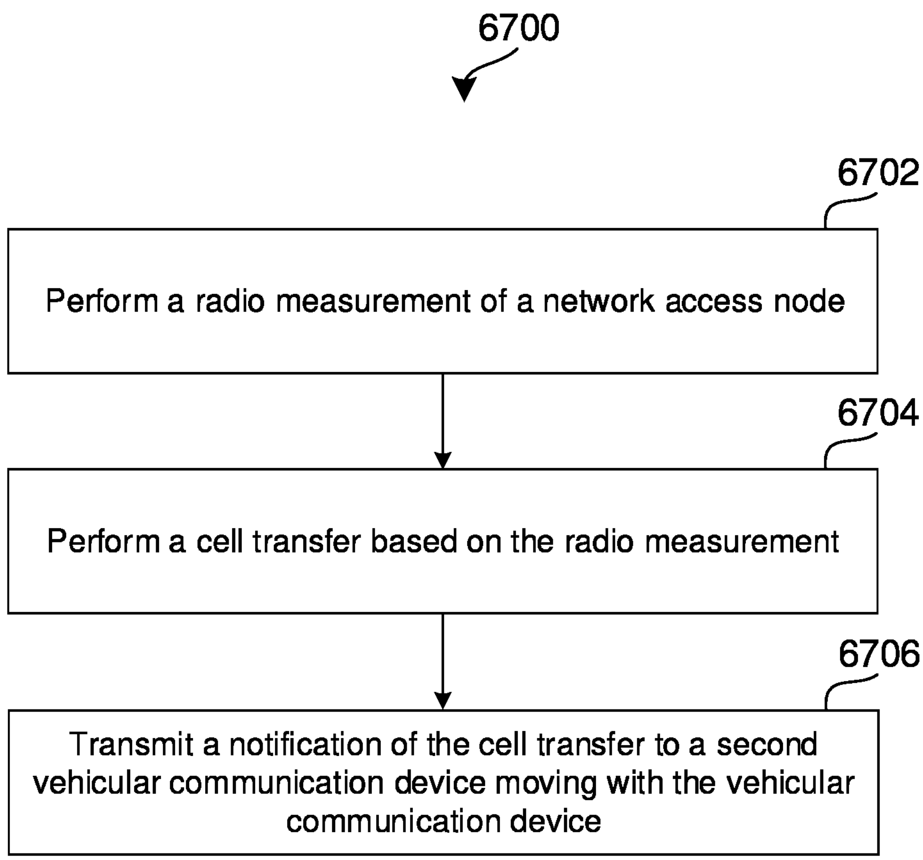
FIG. 67 shows a third exemplary method for coordinating cell transfers according to some aspects.

FIG. 67 shows method 6700 of performing wireless communications at a vehicular communication device according to some aspects. As shown in FIG. 67, method 6700 includes performing a radio measurement of a network access node (6702), performing a cell transfer based on the radio measurement (6704), and transmitting a notification of the cell transfer to a second vehicular communication device moving with the vehicular communication device (6706).

Inter-Operator Carrier Aggregation

According to some aspects of this disclosure, a terminal device may use inter-operator carrier aggregation to transmit or receive data with a data network. In inter-operator carrier aggregation, a terminal device may transmit and/or receive data on carriers provided by multiple network operators. In some cases, this can increase data rates, as the use of multiple carriers can increase the available bandwidth for uplink and downlink communications. Inter-operator carrier aggregation can also increase performance due to added flexibility, namely by providing a terminal device with a wider range of different carriers to select from instead of limiting the available carriers to those of a single network provider.

In various aspects, a terminal device may therefore select multiple carriers that are supplied by different network operators. According to one or more exemplary embodiments, a network operator includes any provider of a wireless communication network, including mobile network operators (MNOs), wireless service providers, wireless carriers, cellular companies, mobile network carriers, mobile virtual network operators, virtual network operators, mobile other licensed operators or any entity that similarly supplies wireless communication networks or related services. A network operator can operate one or multiple wireless networks (e.g., Public Land Mobile Networks (PLMNs), where each wireless network can support one or multiple radio access technologies. Accordingly, a plurality of wireless networks can be operated by the same network operator if the same entity provides or operates the network infrastructure (e.g., via ownership or lease), including cases where a single network operator provides wireless networks of different radio access technologies.

Terminal devices may be able to use carriers provided by wireless networks operated by different network operators. In some aspects, a terminal device may be configured to evaluate a plurality of carriers provided by different network operators based on their carrier characteristics (such as data rate, bandwidth, radio access and interference conditions, frequency band, radio access technology, network load, geographic network availability, and other similar characteristics) and to select multiple carriers to use for uplink or downlink communications. In some aspects, the terminal device may select the multiple carriers based on target characteristics of a data connection of the terminal device, such as by selecting carriers that have matching or otherwise similar characteristics to the target characteristics.

The terminal device may then use the selected carriers for inter-operator carrier aggregation, including carrier aggregation that delivers data of a single data connection using multiple carriers. In a downlink example, the terminal device may be receiving a data stream from a data network over a data connection. Instead of having the data network provide the data stream to the terminal device via the infrastructure of a single network operator, the data network may deliver the data stream to the terminal device via the infrastructure of multiple network providers. Each network operator may accomplish the final delivery of the data dream over its respective radio access network using a different carrier, and the terminal device may thus receive the data stream over multiple carriers provided by different network operators.

Figure 68:
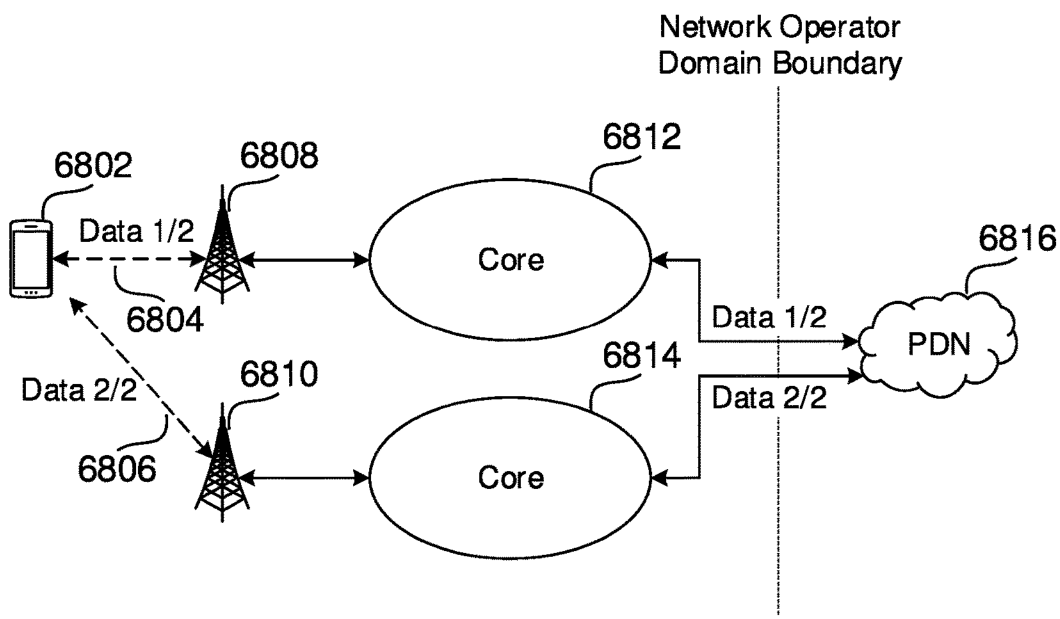
FIG. 68 shows an exemplary network architecture for performing inter-operator carrier aggregation that splits a data stream at an external data network according to some aspects.
Figure 69:
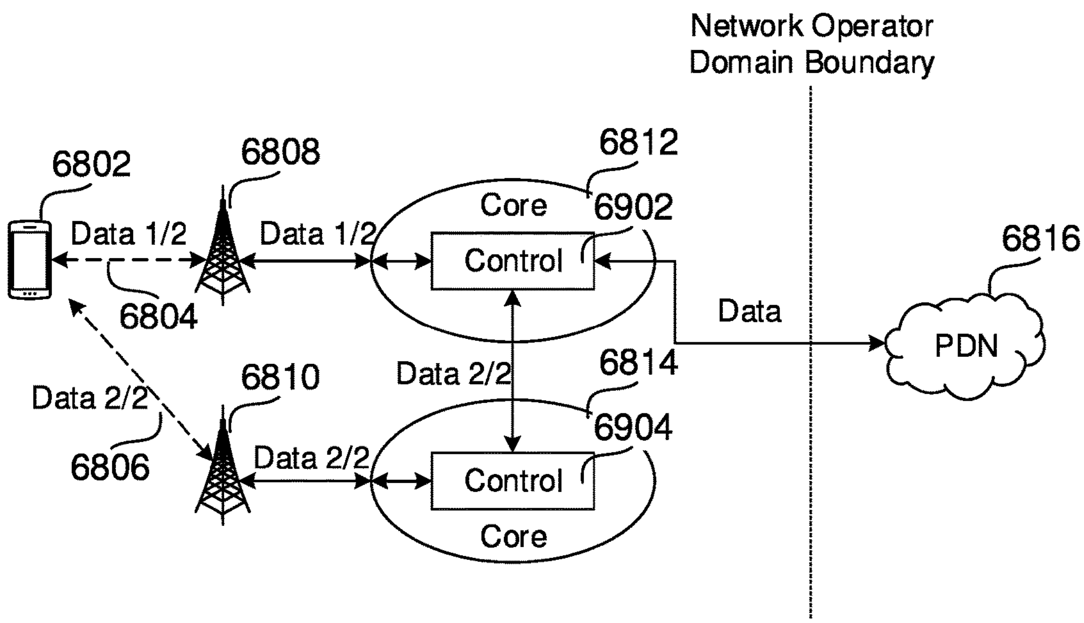
FIG. 69 shows an exemplary network architecture for performing inter-operator carrier aggregation that splits a data stream at a core network according to some aspects.
Figure 70:
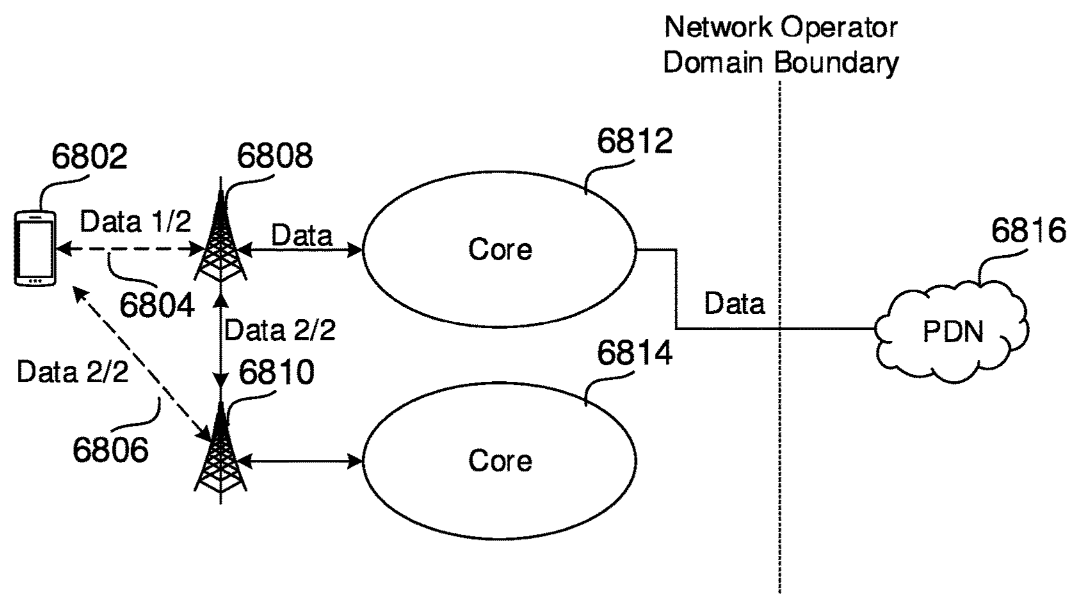
FIG. 70 shows an exemplary network architecture for inter-operator carrier aggregation that splits a data stream at a radio access or edge network according to some aspects.

Accordingly, the data stream may be separated into multiple substreams between the data network and the terminal device, and each carrier may deliver a separate substream to the terminal device. Inter-operator carrier aggregation can be implemented using various different network architectures that separate the data stream into the substreams at different network locations. FIGS. 68-70 show several examples of the different network architectures for inter-operator carrier aggregation according to some aspects, including examples where a data network separates the data stream (in other words, where the data network comprises the separation node), where a core network separates the data stream (in other words, where the core network comprises the separation node), and where a radio access network separates the data stream (in other words, where the radio access network comprises the separation node). While some of the following examples may refer to a downlink case involving delivery of a data stream to a terminal device from a data network, the inter-operator carrier aggregation described herein can be applied in the reverse direction to uplink cases where a terminal device delivers a data stream to the data network.

FIG. 68 depicts an example of a network architecture according to some aspects where the data network separates the data stream into substreams. As shown in FIG. 68, terminal device 6802 may receive wireless signals from network access node 6808 over carrier 6804 and from network access node 6810 over carrier 6806. Network access node 6808 may be a radio access network component of a first network operator, where the first network operator operates a first wireless network including the radio access network and core network 6812. Similarly, network access node 6810 may be a radio access network component of a second network operator, where the second network operator operates a second wireless network including the radio access network and core network 6814.

Terminal device 6802 may schedule to receive a data stream from data network 6816. The data stream may include any sequence of related data that is part of the same data connection, such as voice data, audio data, video data, image data, Web traffic or browser data, mobile gaming data, user application data, file data, messaging data, and/or other similar types of multimedia, internet, and/or user data. Data network 6816 may be a server or similar source-type unit (e.g., a Packet Data Network (PDN)) that can provide the data stream to terminal device 6802, and may either store the data of the data stream locally or receive the data from another component (e.g., as in the case of a voice call server such as an IP Multimedia Subsystem (IMS) server). In some aspects, data network 6816 may be located external to the domain of the first and second network operators, and may interface with the first wireless network and the second wireless network via gateways (e.g., PDN Gateways (PGWs)) of core network 6812 and core network 6814, respectively, that act as a connection point to data networks external to the first and second wireless networks.

Figure 71:
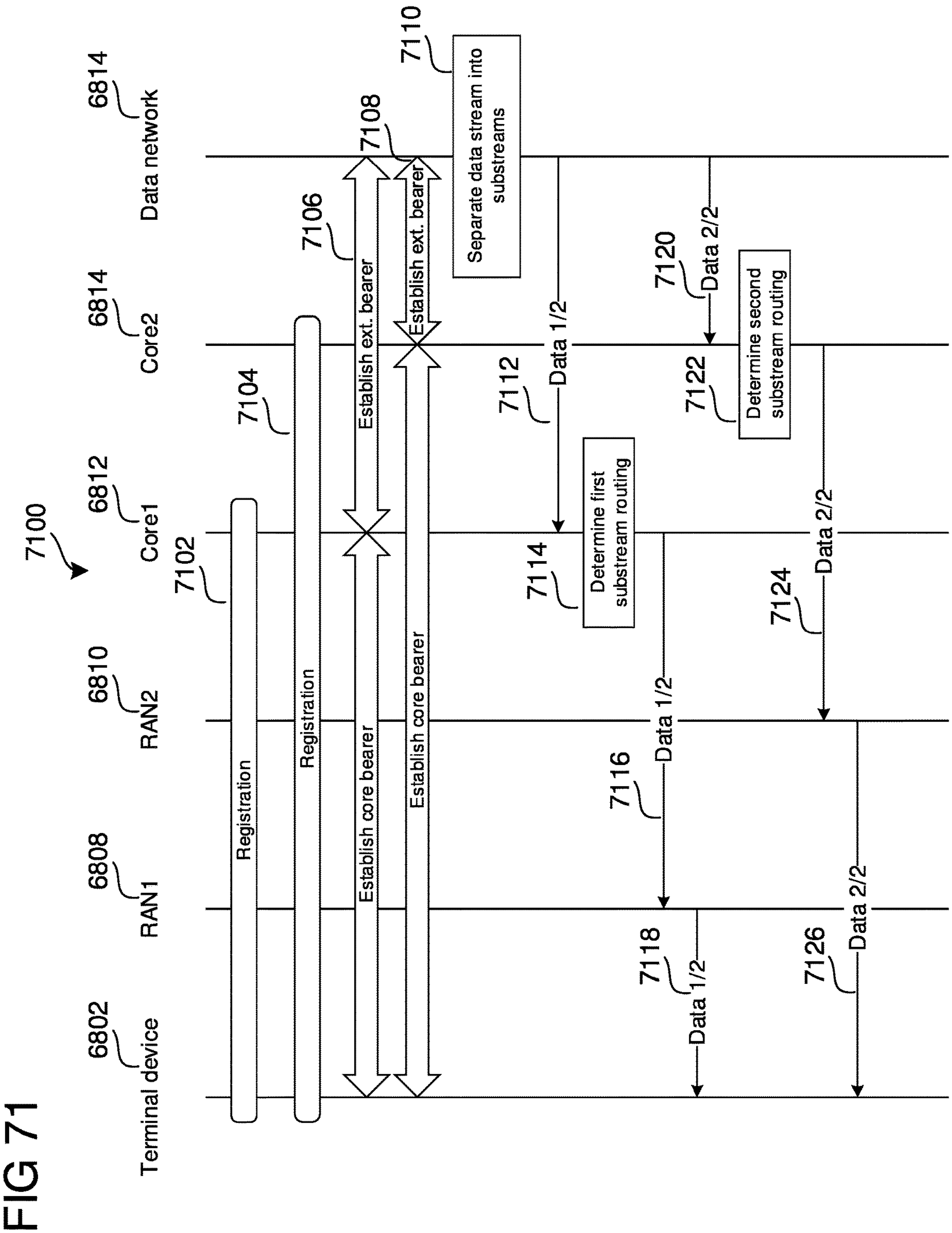
FIG. 71 shows an exemplary message sequence chart illustrating inter-operator carrier aggregation that splits a data stream at an external data network according to some aspects.

FIG. 71 shows exemplary message sequence chart 7100 counterpart to FIG. 68 that illustrates an example of inter-operator carrier aggregation according to some aspects. Terminal device 6802 may first register with the first and second wireless networks in stages 7102 and 7104. Stage 7102 can include performing a random access procedure with the radio access network (including network access node 6808) of the first wireless network and, after establishing an initial radio access connection, exchanging control signaling with a registration server of core network 6812 to register terminal device 6802 with the first wireless network. In some aspects, terminal device 6802 may supply registration information to the registration server, which the registration server may utilize to verify the identity of terminal device 6802 and authenticate terminal device 6802 for operation on the first wireless network. The registration information can include a terminal identifier such as an International Mobile Subscriber Identity (IMSI). Terminal device 6802 may perform a similar registration procedure with the second wireless network. This registration procedure, including the specific sequence of events, involved components, and control signaling, may vary depending on the particular radio access technology and core network protocols employed by the first and second wireless networks.

After registering with the first and second wireless networks, terminal device 6802 may establish the data connection with data network 6816 that will be used to transfer the first and second substreams across the first and second wireless networks. The data connection with data network 6816 may therefore be logically separated into the first data subconnection carrying the first substream across the first wireless network and the second data subconnection carrying the second substream across the second wireless network. The first and second data subconnections may each be end-to-end connections in the context of FIG. 68, and may thus extend from terminal device 6802 to data network 6816. These end-to-end connections may use lower bearers to transfer the data between the intermediate points along the path of the end-to-end connection. Accordingly, terminal device 6802 may establish a core bearer with core network 6812 in stage 7106, which may then establish an external bearer with data network 6816 to complete the end-to-end connection of the first data subconnection. Terminal device 6802 may similarly establish a core bearer with core network 6814 in stage 7108, which may then establish an external bearer with data network 6816 to complete the end-to-end connection of the second data subconnection. In some aspects, these bearers may similarly be composed of lower bearers, such as bearers between terminal device 6802 and the radio access networks (e.g., a radio bearer, which may be the logical connections underlying carriers 6804 and 6806), terminal device 6802 and various gateways of core networks 6812 and 6814, and the radio access networks and the various gateways of core networks 6812 and 6814. In some aspects, the registration and bearer establishment of stages 7102 and 7106, and 7104 and 7108, may occur in the same process, such as where a terminal device is registered and established a default bearer as part of an initial attach procedure.

The establishment of the first and second data subconnections and underlying bearers may define routing paths between terminal device 102 and data network 6816 across the first and second wireless networks, where the routing paths describe each node between which the first and second substreams are transported across the first and second wireless networks. For example, the intermediate start and end nodes of each bearer may establish where to route data for the first and second data subconnections through the first and second wireless networks. For example, when the gateway at the edge of core network 6814 receives data on the first data subconnection from data network 6816, the gateway will know where to route the data through core network 6814 so that the data arrives at network access node 6808 and can thus be transmitted to terminal device 6802. Each node along the first and second subconnections will thus know the routing parameters that specify which node to transmit data to and which node to receive data from. The establishment of the first and second data subconnections in stages 7106 and 7108 may thus define routing parameters for each node to use when determining where to route data for the first and second data subconnections.

Accordingly, once terminal device 6802 has established the first and second data subconnections, data network 6816 may separate the data stream addressed to terminal device 6802 at stage 7110 to obtain the first and second substreams. Data network 6816 may then transmit the first substream to core network 6812 over the first data subconnection in stage 7112, and the second substream to core network 6814 over the second data subconnection in stage 7120. Although stages 7120-7126 are depicted underneath stages 7112-7118 in FIG. 71, stages 7120-7126 may be performed before, concurrent to, or after stages 7112-7118.

Core networks 6812 and 6814 may then determine where to route the first and second substreams in stages 7114 and 7122. Accordingly, core network 6812 may reference the routing parameters for the first data subconnection, and determine that the first substream should be routed to network access node 6808 of the radio access network of the first wireless network. Core network 6814 may likewise reference the routing parameters for the second data subconnection, and determine that the second substream should be routed to network access node 6810 of the radio access network of the second wireless network. Core networks 6812 and 6814 may then route the first and second substreams accordingly in stages 7116 and 7124. Core networks 6812 and 6814 may perform this routing according to core network routing protocols, such as a tunneling-based protocol. As core networks 6812 and 6814 may in some aspects each contain multiple nodes through which the first and second substreams are routed, each node may use the routing parameters to determine where to route the first and second substreams.

Network access node 6808 may receive the first substream and transmit the first substream to terminal device 6802 over carrier 6804 as wireless signals. Network access node 6810 may similarly receive the second substream and transmit the second substream to terminal device 6802 over carrier 6806 as wireless signals. Terminal device 6802 may then receive the wireless signals corresponding to the first and second substreams, and process the wireless signals to recover the first and second substreams. Terminal device 6802 may then recombine the first and second substreams to revert the separation by the data network 6816, and thus recover the data stream. Inter-operator carrier aggregation may thus enable terminal device 6802 to receive data for a single data connection and/or with the same external data network over carriers operated by multiple network operators.

While FIG. 71 depicts an example in the downlink direction, inter-operator carrier aggregation may likewise be implemented in the uplink direction to transmit a data stream from a terminal device to a data network. Accordingly, after registering with the first and second wireless networks and establishing the first and second data sub connections, terminal device 6802 may separate the data stream into the first and second substreams. Terminal device 6802 may then transmit the first and second substreams as wireless signals over carriers 6804 and 6806, respectively. Network access nodes 6808 and 6810 may receive the and process the wireless signals and may then transport the first and second substreams over the first and second data subconnections across core networks 6812 and 6814 according to the proper routing paths defined by the routing parameters. Core networks 6812 and 6814 may then provide the first and second substreams to data network 6816 over the external bearers, while may then recombine the first and second substreams to recover the data stream.

The inter-operator carrier aggregation of FIGS. 68 and 71 may therefore utilize two separate end-to-end connections in the first and second data subconnections, where the data network providing the data stream (or receiving the data stream in the uplink direction) is responsible for separating the data stream and routing the resulting substreams to the first and second data sub connections. The first and second substreams may therefore remain separated during the entirety of the transport across the different wireless networks, and the different wireless networks may transport the first and second substreams independently of each other. The terminal device may then separately receive the first and second substreams on the different carriers, and finally recombine the first and second substreams to recover the data stream.

Figure 72:
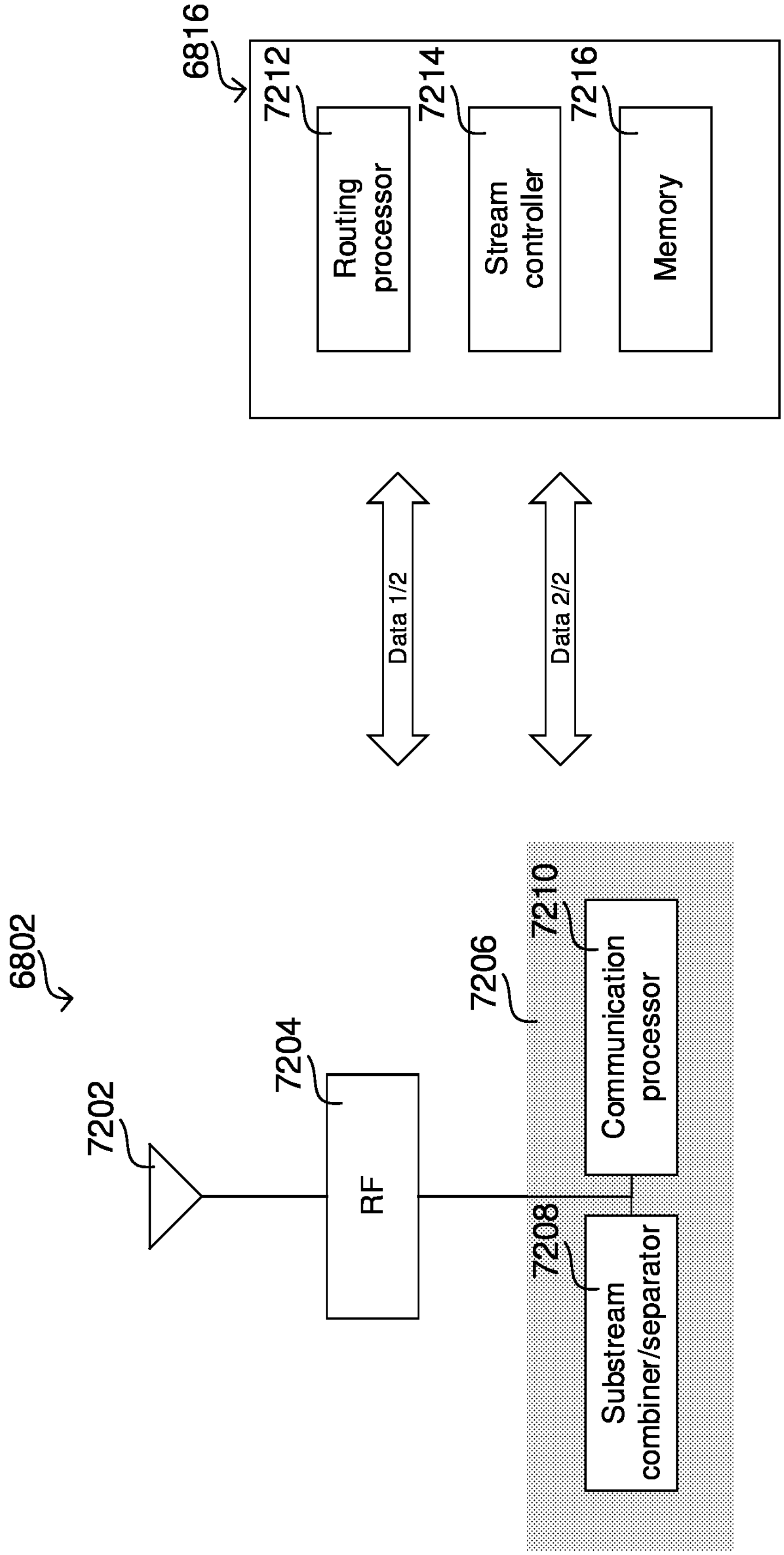
FIG. 72 shows an exemplary internal configuration of a terminal device and an external data network for inter-operator carrier aggregation according to some aspects.

FIG. 72 show an exemplary internal configuration of terminal device 6802 and data network 6816 according to some aspects. As shown in FIG. 61, terminal device 6802 may include antenna system 7202 and RF transceiver 7204, which may be configured in the manner of antenna system 202 and RF transceiver 204 as shown and described for terminal device 102 in FIG. 2. Terminal device 6802 may further include communication arrangement 7206 including substream combiner/separator 7208 and communication processor 7210. Substream combiner/separator 7208 and communication processor 7210 may comprise components of a digital signal processor (e.g., in the manner of digital signal processor 208 of terminal device 102), a controller (e.g., in the manner of controller 210 of terminal device 102), and/or an application processor (e.g., in the manner of application processor 212) of terminal device 6802. The depiction of FIG. 72 thus illustrates that while terminal device 6802 may include substream combiner/separator 7208 and communication processor 7210, these components are not limited to being implemented exclusively as part of the physical layer, protocol stack layer, or application layer and may instead be implemented at any one or combination of the physical layer, protocol stack layer, or application layer.

Communication processor 7230 may be a processor configured to control the overall transmit and receive operations of terminal device 6802, including determining when to transmit and receive specific communications, what to transmit in each transmission, and what to recover from each reception. Communication processor 7210 may be configured to retrieve (e.g., from a local memory) and execute program code that algorithmically defines the processing involved in scheduling, transmitting, and receiving such communications instructions. With reference to terminal device 102 of FIG. 2, communication processor 7210 can be a controller component such as controller 210, and accordingly may be a protocol stack-layer component (although is not strictly limited to such). The program code executed by communication processor 7210 may therefore be protocol stack-layer software.

Substream combiner/separator 7208 may comprise a processor or dedicated hardware component that is configured to recombine separately received substreams to recover an original data stream (e.g., for downlink inter-operator carrier aggregation) and/or to separate an original data stream to obtain multiple substreams (e.g., for uplink inter-operator carrier aggregation). In some processor implementations, substream combiner/separator 7208 may be configured to retrieve (e.g., from a local memory) and execute program code that algorithmically defines the processing operations for separating a data stream into separate substreams and/or for combining separate substreams to recover a data stream.

In some hardware implementations, substream combiner/separator 7208 may comprise hardware circuitry that is configured with digital logic that defines the processing operations for separating a data stream into separate substreams and/or for combining separate substreams to recover a data stream. In some aspects, substream combiner/separator 7208 may be a protocol stack or application layer component, such as a subcomponent of a controller (e.g., in the manner of controller 210 of terminal device 102) or an application processor (e.g., in the manner of application processor 212 of terminal device 102) of terminal device 6802.

Although shown as logically separate components in FIG. 72, this illustrates the functional separation between substream combiner/separator 7208 and communication processor 7210 and does not limit substream combiner/separator 7208 and communication processor 7210 to being physically separate components. Accordingly, in some aspects substream combiner/separator 7208 and communication processor 7210 may be physically separate components, while in other aspects substream combiner/separator 7208 and communication processor 7210 may be physically integrated components, such as a digitally-configured hardware arrangement including circuitry to perform multiple functions or a processor configured to execute multiple subroutines.

With continued reference to FIG. 71, communication processor 7210 may be configured to perform the protocol stack layer registration and connection establishment operations of stages 7102-7108. In the downlink direction, after antenna system 7202 and RF transceiver 7204 receive and convert the wireless signals from network access nodes 6808 and 6810 to baseband samples, communication processor 7210 may be configured to perform the physical layer and protocol stack layer processing to recover the first and second substreams. Communication processor 7210 may then provide the first and second substreams to substream combiner/separator 7208, which may then recombine the first and second substreams to recover the data stream that originated from data network 6816. Substream combiner/separator 7208 may optionally provide the data stream to another component of terminal device 6802, such as an application layer component that can present the data to a user or otherwise render the data available to the user. In the uplink direction, substream combiner/separator 7208 may be configured to separate the data stream into the first and second substreams, and to provide the first and second substreams to communication processor 7210 for protocol stack and physical layer processing. Communication processor 7210 may perform the protocol stack and physical layer processing to produce baseband samples, which RF transceiver 7204 and antenna system 7202 may then transmit to network access nodes 6808 and 6810 as wireless signals.

In some aspects, terminal device 6802 may be configured in a multiple (e.g., dual) reception and/or multiple (e.g., dual) transmission architecture, and may be configured to transmit and/or receive simultaneously on multiple wireless connections. The multiple wireless connections may be on the same or different frequency bands and/or on the same or different radio access technologies, and terminal device 6802 may therefore be configured to support separate wireless connections at the same time as part of inter-band and/or inter-RAT carrier aggregation. Although other multiple (e.g., dual) reception/transmission architectures are also possible, in some aspects antenna system 7202 may include a first antenna (or antenna array) and a second antenna (or antenna array), where the first and second antenna can transmit and/or receive simultaneously on two respective wireless connections. RF transceiver 7204 may optionally also be a dual-band RF transceiver (or two separate RF transceivers) configured to transmit and/or receive simultaneously over two wireless connections. Communication processor 7210 may optionally also be configured to manage two separate wireless connections at once, such as with separate protocol stack instances executed at the same processor, a protocol stack that can simultaneously support multiple wireless connections executed at a processor, or by being implemented as two separate processors that collectively form communication processor 7210 and each execute a respective protocol stack. Terminal device 6802 may therefore be configured to receive the wireless signals on carriers 6804 and 6806 from network access nodes 6808 and 6810 simultaneously in the downlink direction and/or to transmit the wireless signals on carriers 6804 and 6806 to network access nodes 6808 and 6810 simultaneously in the uplink direction.

With continued reference to FIG. 72, data network 6816 may include routing processor 7212, stream controller 7214, and memory 7216. Routing processor 7212 may be a processor configured to route data to and from data network 6816 on the proper data subconnections. Accordingly, routing processor 7212 may perform the establishment of the end-to-end connections and underlying external bearers in stages 7106 and 7108, and thus may determine the routing parameters for transporting data on the first and second data subconnections and otherwise managing and maintaining the first and second data subconnections. Routing processor 7212 may be configured to retrieve (e.g., from a local memory) and execute program code that algorithmically defines this functionality in the form of executable instructions. The program code may be updatable, such as wirelessly or by a manual install.

Stream controller 7214 may comprise a processor and/or dedicated hardware component that is configured to recombine separately received substreams to recover an original data stream (e.g., for downlink inter-operator carrier aggregation) and/or to separate an original data stream to obtain multiple substreams (e.g., for uplink inter-operator carrier aggregation). In some processor implementations, stream controller 7214 may be configured to retrieve (e.g., from a local memory) and execute program code that algorithmically defines the processing operations for separating a data stream into separate substreams and/or for combining separate substreams to recover a data stream. In some dedicated hardware implementations, stream controller 7214 may be hardware circuitry that is configured with digital logic that defines the processing operations for separating a data stream into separate substreams and/or for combining separate substreams to recover a data stream.

Memory 7216 may optionally store the data of the data stream. Alternatively, data network 6816 may receive the data stream from an external location, such as from another data network or core network.

Although shown as logically separate components in FIG. 72, this illustrates the functional separation between routing processor 7212 and stream controller 7214 and does not limit routing processor 7212 and stream controller 7214 to being physically separate components. Accordingly, in some aspects routing processor 7212 and stream controller 7214 may be physically separate components, while in other aspects routing processor 7212 and stream controller 7214 may be physically integrated components, such as a digitally-configured hardware arrangement including circuitry to perform multiple functions or a processor configured to execute multiple subroutines.

In the downlink direction, stream controller 7214 may receive the data stream from memory 7216 and/or from an external location. Stream controller 7214 may then separate the data stream into the first and second substreams, and provide the first and second substreams to routing processor 7212. Routing processor 7212 may then map the first and second substreams onto the first and second data subconnections, respectively, for transport to terminal device 6802 via the first and second wireless networks. In the uplink direction, routing processor 7212 may receive the first and second substreams from core networks 6812 and 6814, respectively, on the first and second data subconnections. Routing processor 7212 may then provide the first and second substreams to stream controller 7214, which may recombine the first and second substreams to recover the data stream that originated at terminal device 6802. Stream controller 7214 may optionally provide the data stream to memory 7216 and/or to an external location.

In some aspects of the network architecture shown in FIG. 68, substream combiner/separator 7208 and stream controller 7214 may operate above the protocol stack layers, such as at the transport or application layers. In some aspects, substream combiner/separator 7208 and stream controller 7214 may operate exclusively at the application layer, and may perform the stream separation and combination in a manner that is mostly or completely transparent to the first and second wireless networks. For example, stream controller 7214 can separate the data stream into the first and second substreams at the application layer, and subsequently map and transport the first and second substreams independently of each other across the first and second wireless networks. Accordingly, in some aspects the stream separation and recombination can be handled outside of the domain of the network operators.

Figure 73:
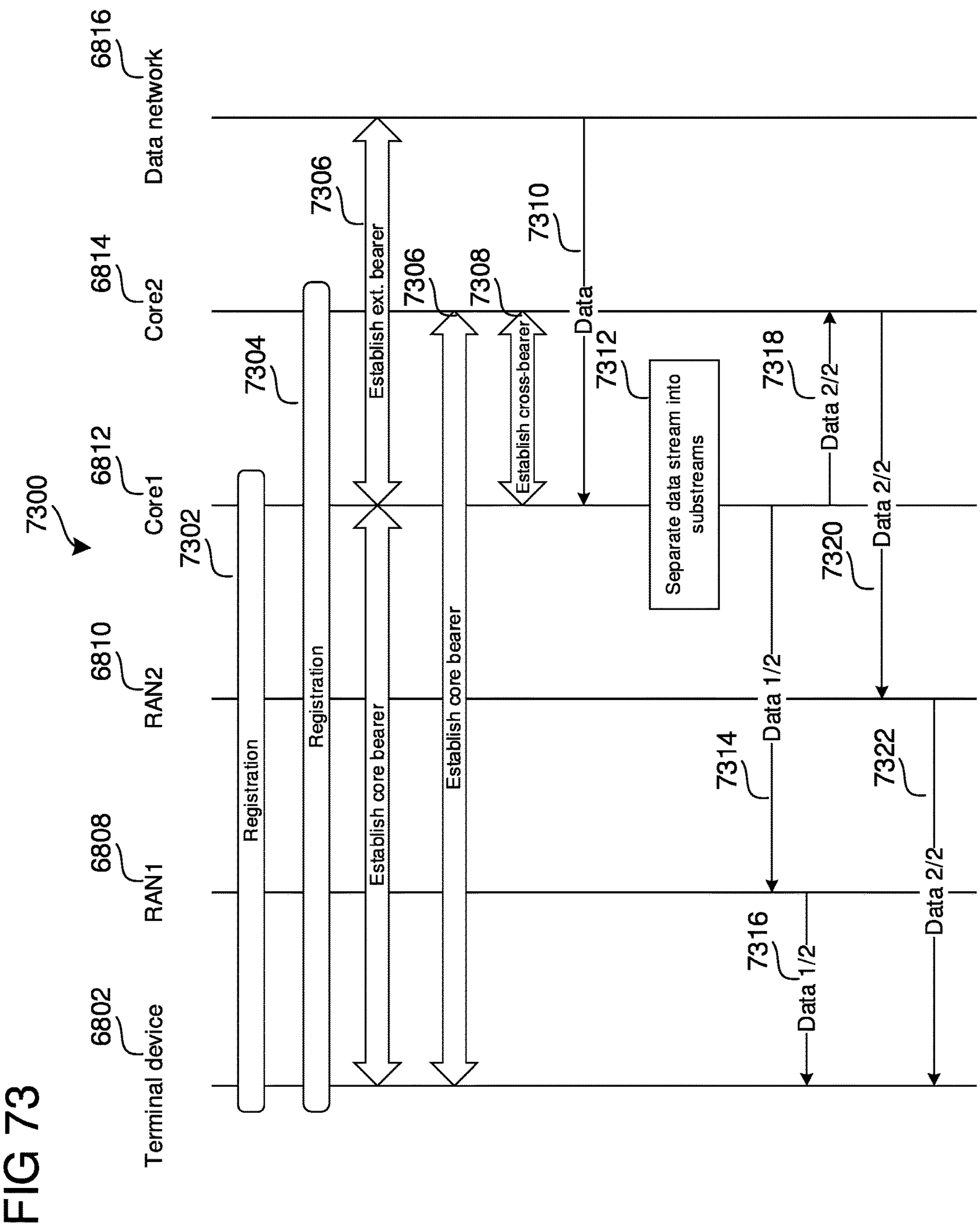
FIG. 73 shows an exemplary message sequence chart illustrating inter-operator carrier aggregation that splits a data stream at a core network according to some aspects.

FIG. 69 shows another example of a network architecture according to some aspects where a core network separates the data stream into substreams. FIG. 73 shows exemplary message sequence chart 7300 counterpart to the example of FIG. 69 according to some aspects. As shown in FIG. 69, terminal device 6802 may receive (e.g., in the downlink direction) the data stream in the form of first and second substreams transmitted on carriers 6804 and 6806 using inter-operator carrier aggregation. However, as opposed to FIG. 68 where data network 6816 separates the data stream into the first and second substreams, control server 6902 located in core network 6812 may separate the data stream into the first and second substreams. The first data subconnection may therefore bridge between terminal device 6802 and data network 6816, while the second data subconnection may bridge between terminal device 6802 and control server 6904.

Accordingly, with continued reference to FIG. 73, terminal device 6802 may register with the first and second wireless networks in stages 7302 and 7304 in the same or a similar manner as stages 7102 and 7104 in FIG. 71. Terminal device 6802 may also establish the first data subconnection including the core bearer and external bearer with data network 6816 in stage 7306 but, as opposed to stage 7108 in FIG. 71, terminal device 6802 may establish the second data subconnection with a core bearer but without an external bearer.

As shown in FIG. 69, the second data subconnection may according to some exemplary embodiments therefore not be an end-to-end connection, and may instead bridge between terminal device 6802 and control server 6904 located in core network 6814. Control servers 6902 and 6904 may thus establish a cross-bearer in stage 7308 that bridges between core networks 6812 and 6814, thus providing a path to transport data from core network 6812 to core network 6814 and to terminal device 6802 over carrier 6804 of the second wireless network.

Data network 6816 may then provide the data stream (e.g., without separation into substreams) to core network 6812 in stage 7310, where the data stream may be received by control server 6902. Control server 6902 may then separate the data stream into the first and second substreams in stage 7312, and may provide the first substream to the radio access network of the first wireless network that includes network access node 6808 in stage 7314. Control server 6902 may utilize the routing parameters that were determined during establishment of the core bearer in the first data subconnection to determine the appropriate routing for the first substream. Network access node 6808 may then transmit the first substream to terminal device 6802 as wireless signals on carrier 6804.

Control server 6902 may transmit the second substream to control server 6904 of core network 6814 using the cross-bearer in stage 7318. Although stages 7318-7322 are depicted underneath stages 7314-7316 in FIG. 73, stages 7318-7322 may be performed before, concurrent to, or after stages 7314-7316. Control server 6902 may then route the second substream to the radio access network of the second wireless network including network access node 6810, and may use the routing parameters determined during establishment of the core bearer of the second data subconnection to determine the appropriate routing for the second substream. Network access node 6810 may then transmit the second substream to terminal device 6802 as wireless signals on carrier 6806. Terminal device 6802 may thus receive the first and second substreams with inter-operator carrier aggregation, and proceed to recombine the first and second substreams to recover the data stream.

In the uplink direction, terminal device 6802 may separate the data stream into the first and second substreams, and transmit the first and second substreams on carriers 6804 and 6806, respectively. The radio access networks of the first and second wireless networks may then route the first and second substreams to control servers 6902 and 6904. Control server 6904 may route the second substream to controller server 6902 using the cross-bearer, which may then recombine the first and second substreams to recover the data stream. Control server 6902 may then transmit the data stream to data network 6816.

Figure 74:
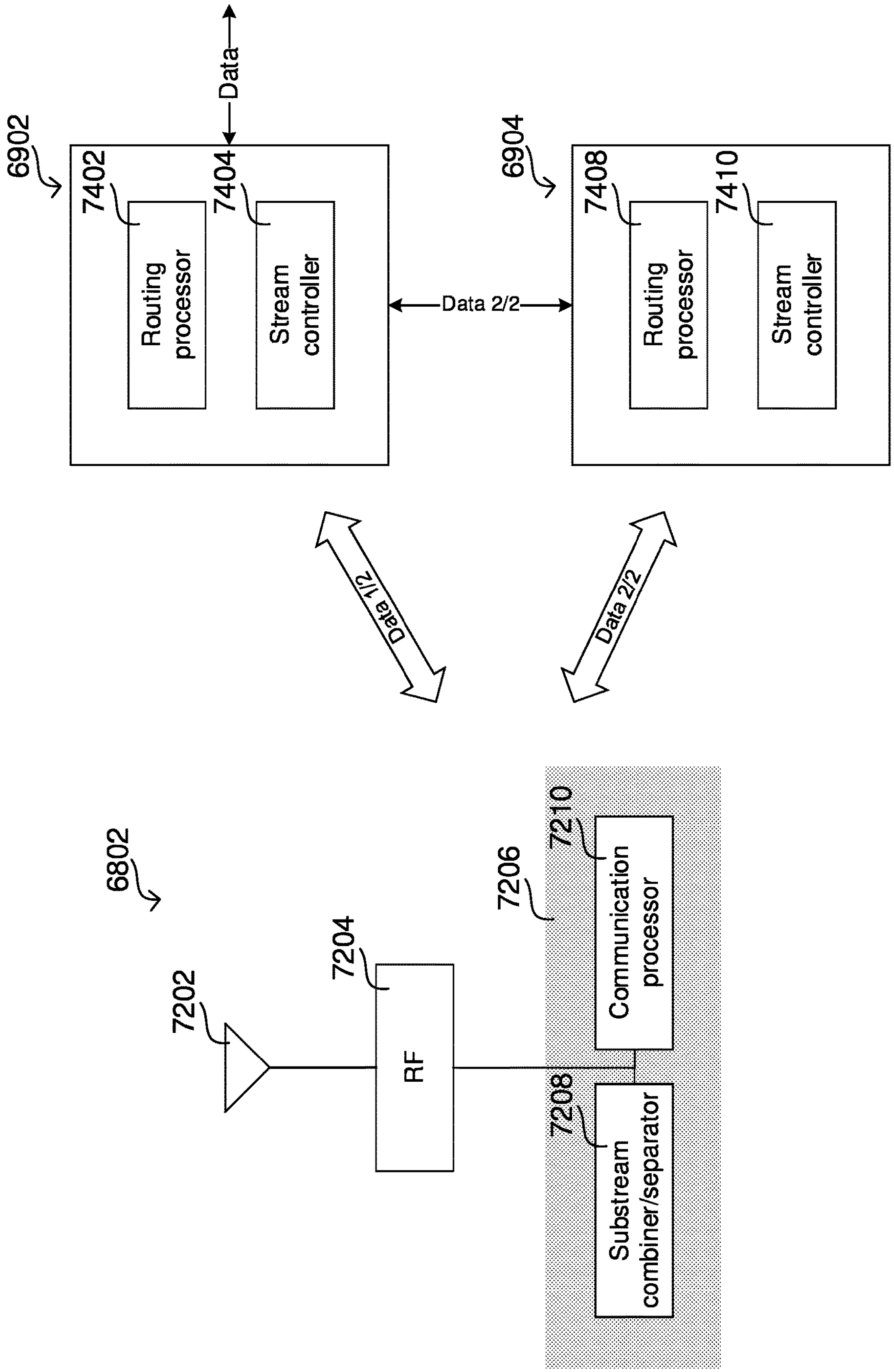
FIG. 74 shows an exemplary internal configuration of a terminal device and control servers for inter-operator carrier aggregation according to some aspects.

FIG. 74 shows an exemplary internal configuration of terminal device 6802, control server 6902, and control server 6904 according to some aspects. Terminal device 6802 may be configured in the same manner as shown and described above for FIG. 72. Control server 6902 may include routing processor 7402 and stream controller 7404. Routing processor 7402 may be a processor configured to retrieve (e.g., from a local memory) and execute program code that algorithmically defines the routing functionality of control server 6902 as executable instructions, including the establishment of bearers, determination of routing parameters, and execution of routing on different bearers according to the routing parameters. Stream controller 7404 may be a processor and/or dedicated hardware component that is configured to recombine separately received substreams to recover an original data stream (e.g., for downlink inter-operator carrier aggregation) and/or to separate an original data stream to obtain multiple substreams (e.g., for uplink inter-operator carrier aggregation). In some processor implementations, stream controller 7404 may be configured to retrieve (e.g., from a local memory) and execute program code that algorithmically defines the processing operations for separating a data stream into separate substreams and/or for combining separate substreams to recover a data stream. In some hardware implementations, stream controller 7404 may be hardware circuitry configured with digital logic that defines the processing operations for separating a data stream into separate substreams and/or for combining separate substreams to recover a data stream.

Although shown as logically separate components in FIG. 74, this illustrates the functional separation between routing processor 7402 and stream controller 7404 and does not limit routing processor 7402 and stream controller 7404 to being physically separate components. Accordingly, in some aspects routing processor 7402 and stream controller 7404 may be physically separate components, while in other aspects routing processor 7402 and stream controller 7404 may be physically integrated components, such as a digitally-configured hardware arrangement including circuitry to perform multiple functions or a processor configured to execute multiple subroutines.

In some aspects, such as in the exemplary depiction of FIG. 74, control server 6904 may be configured in the same or a similar manner as control server 6902 and thus include routing processor 7408 and stream controller 7410 configured to perform routing to and from control server 6904 and stream combination and separation, respectively. In other aspects, control server 6904 may not include stream controller 7410. For example, control server 6904 may receive substreams from control server 6902 over the cross-bearer and provide substreams to control server 6902 over the cross-bearer without locally performing stream separation or combination. Accordingly, in some exemplary embodiments, control server 6904 may not include stream separation or combination functionality in the form of stream controller 7410.

As previously detailed, in some aspects the exemplary network architecture of FIG. 68 can accomplish inter-operator carrier aggregation above the protocol stack layer, such as at the transport layer and/or application layer. As the stream separation and combination of the network architecture of FIG. 69 can occur in the core network, e.g., at control server 6902, in some aspects the stream separation and combination may be implemented in the protocol stack layers and/or transport layers. For example, control server 6902 can be placed in a gateway of core network 6812 (e.g., at a Serving Gateway (SGW) or PDN Gateway (PGW)), and the core bearers used for transporting the substreams across core networks 6812 and 6814 can be protocol stack layer bearers (e.g., that use a tunneling protocol such as GPRS Tunneling Protocol (GTP)) and/or transport layer bearers (e.g., that use a protocol such as IP). Sub stream combiner/separator 7208 of terminal device 6802 and stream controller 7404 of control server 6902 can therefore perform the stream separation and combination at the protocol stack layers and/or transport layers, e.g., according to whether the core bearers used to separately transport the first and second substreams are protocol stack layer bearers or transport layer bearers.

As core network 6812 and core network 6814 may each maintain their own core bearers to transport the substreams, core network 6812 and core network 6814 may separately manage and control the transport of the substreams across their network paths. Accordingly, while the data of the first and second substreams may be associated by virtue of origin at the data stream, control over the transport of the data may be handled separately at the respective core networks.

Figure 75:
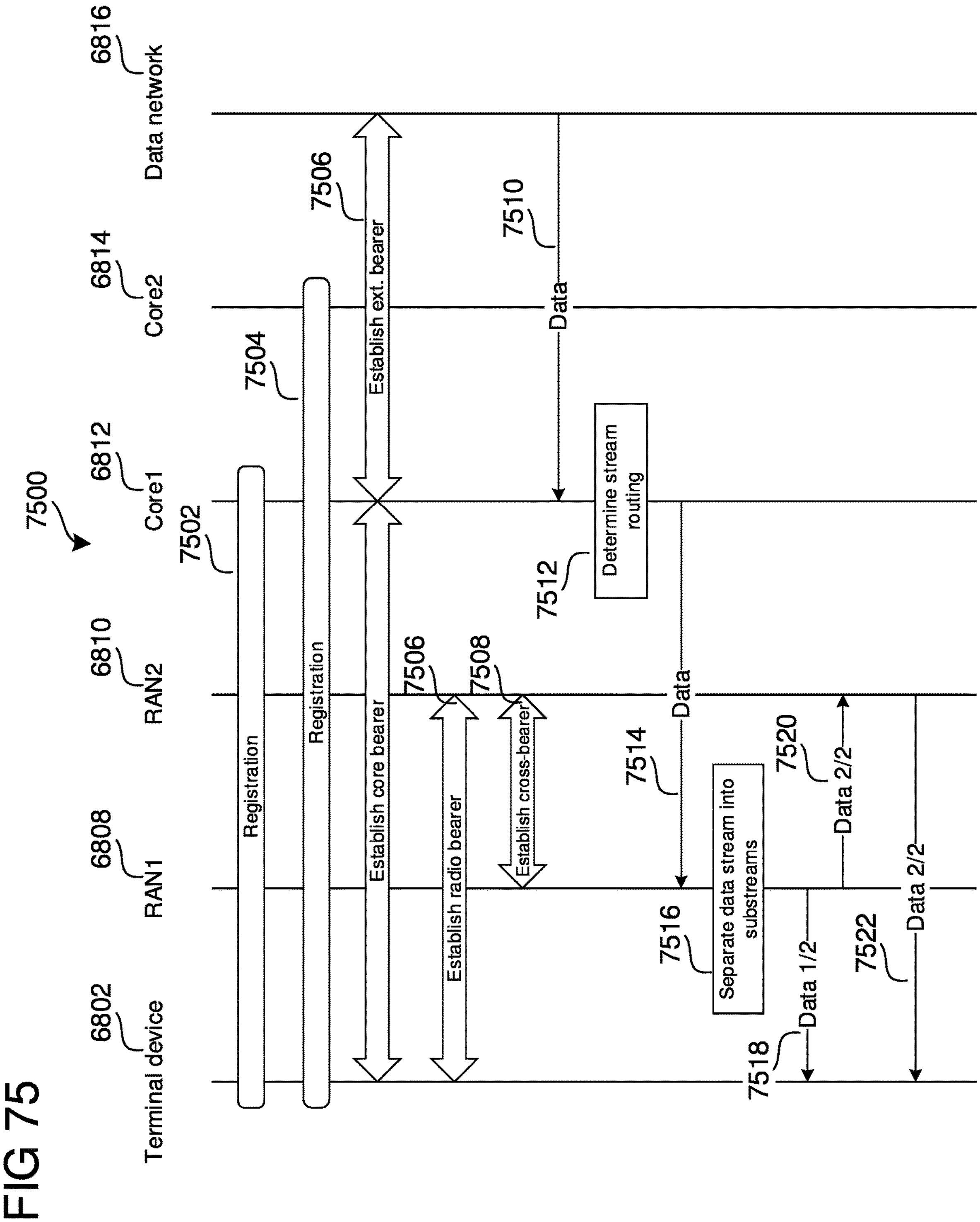
FIG. 75 shows an exemplary message sequence chart illustrating inter-operator carrier aggregation that splits a data stream at a radio access network according to some aspects.

FIG. 70 shows another example of a network architecture according to some aspects where a core network separates the data stream into substreams. FIG. 75 shows exemplary message sequence chart 7500 counterpart to the example of FIG. 70 according to some aspects. As shown in FIG. 70, data network 6816 may provide the data stream to core network 6812, which may provide the data stream (unseparated) to the radio access network of the first wireless network. Network access node 6808 (or, alternatively, another component such as an edge server) may then separate the data stream into the first and second substreams. Network access node 6808 may then transmit the first substream to terminal device 6802 over carrier 6804, and may transmit the second substream to network access node 6810 in the radio access network of the second wireless network. Network access node 6810 may then transmit the second substream to terminal device 6802 over carrier 6806. Terminal device 6802 may thus receive the first and second substreams with inter-operator carrier aggregation and subsequently recombine the first and second substreams to recover the data stream. The first data subconnection may therefore bridge between terminal device 6802 and data network 6816, while the second data subconnection may bridge between terminal device 6802 and network access node 6810.

As shown in FIG. 75, terminal device 6802 may register with the first and second wireless networks in stages 7502 and 7504, respectively, in the same or a similar manner as in stages 7102 and 7104 in FIG. 71. Terminal device 6802 may then establish the first data subconnection with data network 6816 in stage 7506, including establishing the underlying core and external bearers.

As the stream separation is performed in the radio access network of the first wireless network, according to some exemplary embodiments, terminal device 6802 may not establish the second data subconnection as an end-to-end connection with data network 6816 across the second wireless network. Instead, terminal device 6802 may establish a radio bearer with network access node 6810 (where the core bearer with core network 6812 may also include an underlying radio bearer with network access node 6808) in stage 7506, where the radio bearer may support carrier 6806. Network access node 6808 may then establish a cross-bearer with network access node 6810 in stage 7508 that bridges the radio access networks of the first and second wireless networks.

Data network 6816 may then transmit the data stream to core network 6812 in stage 7510, which may then determine the proper routing in stage 7512 based on routing parameters determined during establishment of the first data subconnection in stage 7506. Core network 6812 may then route the data stream to network access node 6808 in the radio access network of the first wireless network in stage 7514.

Network access node 6808 may then separate the data stream into the first and second substreams in stage 7516, and may transmit the first substream to terminal device 6802 over carrier 6804 in stage 7518. Network access node 6808 may transmit the second substream to network access node 6810 in the radio access network of the second wireless network over the cross-bearer in stage 7520. Network access node 6810 may then transmit the second substream to terminal device 6802 over carrier 6806 in stage 7522. Terminal device 6802 may receive and recombine the first and second substreams to recover the data stream.

In the uplink direction, terminal device 6802 may separate the data stream into the first and second substreams, and transmit the first substream to network access node 6808 over carrier 6804 and the second substream to network access node 6810 over carrier 6806. Network access node 6810 may route the second substream to network access node 6808, which may then recombine the first and second substreams to recover the data stream. Network access node 6810 may then transmit the data stream to data network 6816 via core network 6812 according to the routing parameters of the first data subconnection.

Figure 76:
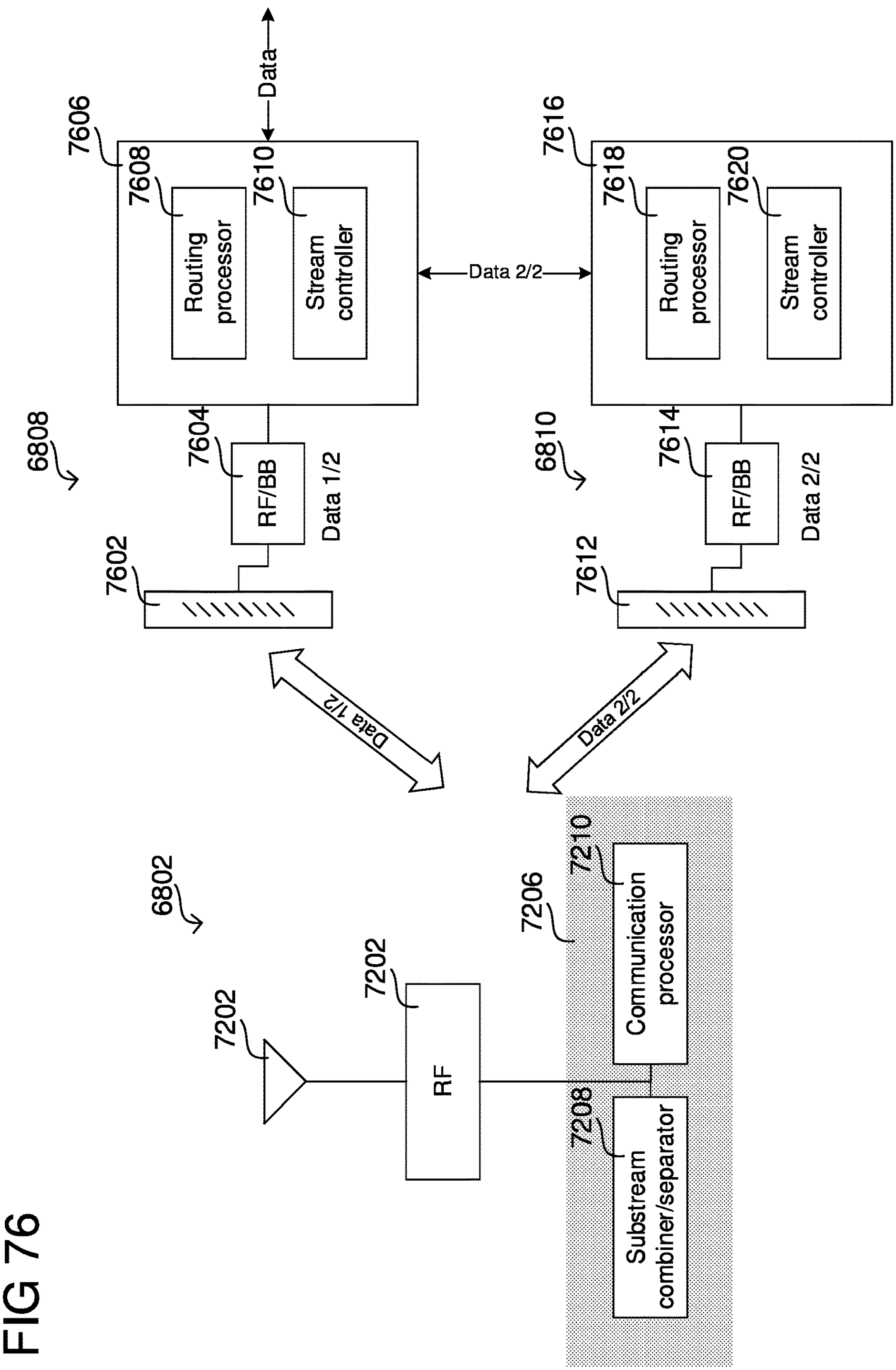
FIG. 76 shows an exemplary internal configuration of a terminal device and network access nodes for inter-operator carrier aggregation according to some aspects.

FIG. 76 shows exemplary internal configurations of terminal device 6802, network access node 6808, and network access node 6810. Terminal device 6802 may be configured in the manner as previously shown and described for FIG. 72. Network access nodes 6808 and 6810 may respectively include antenna systems 7602 and 7612, radio/baseband arrangements 7604 and 7614, and routers 7606 and 7616. Antenna systems 7602 and 7612 may be configured in the manner of antenna system 302 as shown and described for network access node 110 in FIG. 3. Radio/baseband arrangements 7604 and 7614 may include a radio transceiver (e.g., in the manner of radio transceiver 304 of network access node 110 in FIG. 3) and baseband subsystem (e.g., in the manner of baseband subsystem 306 of network access node 110 in FIG. 3), and may therefore handle the radio and baseband transmission and reception functionality of network access nodes 6808 and 6810.

Network access nodes 6808 and 6810 may further respectively include routers 7606 and 7616, which may handle routing and stream control functions. As shown in FIG. 76, router 7606 may include routing processor 7608 and stream controller 7610. Routing processors 7608 and 7618 may be a processor configured in the manner of routing processors 7212 and 7402 of data network 6816 and control server 6902 as shown and described for FIGS. 72 and 74, and may accordingly be configured to perform routing functions such as receiving data, determining the proper routing for the data based on routing parameters of a corresponding data subconnection, and routing the data along the proper routing. Stream controllers 7610 and 7620 may be a processor and/or dedicated hardware component configured in the manner of stream controller 7214 and 7404 of data network 6816 and control server 6902 as shown and described for FIGS. 72 and 74. Stream controllers 7610 and 7620 may therefore be configured to perform stream control functions such as separating data streams into multiple substreams and/or recombining multiple substreams to recover a data stream.

Accordingly, in the downlink direction, routing processor 7608 may be configured to receive the data stream from core network 6812 over the first data subconnection and, after identifying that the data stream is assigned for inter-operator carrier aggregation based on the routing parameters of the first data subconnection, providing the data stream to stream controller 7610. Stream controller 7610 may then separate the data stream into the first and second substreams, and provide the first substream to radio/baseband arrangement 7604 and the second substream to network access node 6810 over the cross-bearer. Radio/baseband arrangement 7604 may then transmit the first substream to terminal device 6802 with antenna system 7602 over carrier 6804.

Network access node 7616 may receive the second substream at routing processor 7618, which may then provide the second substream to radio/baseband arrangement 7614. Radio/baseband arrangement 7614 may then transmit the second substream with antenna system 7612 over carrier 6806. In some aspects, network access node 7616 may not be configured to perform stream control functions such as stream separation and combination, and may thus not include stream controller 7620.

Terminal device 6802 may then receive the first and second substreams from network access nodes 6808 and 6810 at antenna system 7202 as wireless signals, and may process the wireless signals with RF transceiver 7204 to obtain baseband samples for the first and second substreams. Communication processor 7210 may then process the baseband samples according to physical and protocol stack layer functions and provide the resulting baseband data for the first and second substreams to substream combiner/separator 7208. Substream combiner/separator 7208 may then recombine the first and second substreams to recover the data stream, and may optionally provide the data stream to other components of terminal device 6802 such as application layer components.

In the uplink direction, substream combiner/separator 7208 may separate the data stream (optionally after receiving the data stream from, for example, an application layer of terminal device 6802) into the first and second substreams and provide the first and second substreams to communication processor 7210. Communication processor 7210 may then process the first and second substreams according to protocol stack and physical layer functions and provide the resulting baseband samples for the first and second substreams to RF transceiver 7204. RF transceiver 7204 may then wirelessly transmit the first and second substreams via antenna system 7202 over carriers 6804 and 6806, respectively.

Network access node 6808 may receive and process the first substream at antenna system 7602 and radio/baseband arrangement 7604, and provide the first substream to stream controller 7610. Network access node 6810 may receive and process the first substream at antenna system 7612 and radio/baseband arrangement 7614, and provide the second substream to routing processor 7618. Routing processor 7618 may then transmit the second substream to stream controller 7610 over the cross-bearer. Stream controller 7610 may then combine the first and second substreams to recover the data stream, and provide the data stream to routing processor 7608 for routing through core network 6812 to data network 6816.

In some aspects, substream combiner/separator 7208 and stream controllers 7610 and 7620 may perform the stream separation and combination in the protocol stack layers that govern the radio bearers between terminal device 6802 and network access nodes 6808 and 6810.

In some aspects, network access node 6810 may not include router 7616, and router 7618, and stream controller 7610 may provide the second substream to radio/baseband arrangement 7614 of network access node 6810.

In some aspects, network access nodes 6808 and 6810 may coordinate with each other to control the delivery of the first and second substreams over carriers 6804 and 6806. For example, instead of each providing the first and second substreams independently, network access nodes 6808 and 6810 may exchange control signaling over the cross-bearer to coordinate delivery of the first and second substreams. This can include Media Access Control (MAC) layer coordination, such as where network access nodes 6808 and 6810 may coordinate the transmission scheduling of the first and second substreams to occur concurrently. In some cases, this can be more effective in aspects where network access nodes 6808 and 6810 are deployed at proximate locations, such as at the same cell site or at proximate cell sites.

In some aspects, network access nodes 6808 and 6810 may be configured to route data back and forth as needed. For example, if network access node 6808 becomes heavily loaded, stream controller 7610 may include more data from the data stream in the second substream than the first substream, and provide the second substream to network access node 6810 to transmit on carrier 6806. If network access node 6810 then becomes heavily loaded, stream controller 7620 may be configured to provide some or all of the second substream back to network access node 6808 for transmission over carrier 6804

In some aspects, routers 7606 and 7616 may not be deployed directly at the network access node. For example, routers 7606 and 7616 can alternatively be deployed at an edge network location located between the radio access and core network, such as part of an edge server. Routers 7606 and 7616 can therefore sit on the interface between the core and radio access network, and tap the data that passes along this interface. Routing processor 7608 and stream controller 7610 may therefore identify the data stream as it passes along this interface, and separate the data stream into the first and second substreams. Router 7606 can then provide the first substream to network access node 6808 for wireless transmission on carrier 6804, and can provide the second substream to router 7616.

In some aspects, routing processors 7212, 7402, 7408, 7608, and/or 7618 may utilize a routing encapsulation protocol to route the first and second substreams to terminal device 6802 over the first and second wireless networks. For example, the corresponding stream controller may separate the data stream into the first and second substreams, and then provide the first and second substreams to the routing processor for respective routing on the first and second data subconnections. The first and second substreams may be sequences of packets that collectively compose the data stream. The routing processor may then encapsulate the data packets of the first substream with a header that specifies the first data subconnection (e.g., that contains some field identifying the first data subconnection, the first wireless network, the next node along the first data subconnection in the first wireless network, or some other identifying feature that indicates the first data subconnection), and likewise encapsulate the data packets of the second substream with a header that specifies the second data subconnection. The routing processor may generate the headers according to a routing encapsulation protocol, such as a Generic Routing Encapsulation (GRE) protocol. In some aspects, the header may also specify the carrier that is designated to transmit each data packet (e.g., by identifying the network access node that provides the carrier, such as with a network address or cell identity of the network access node). The routing processor may therefore specify carrier 6804 in the headers for data packets of the first substream, and specify carrier 6806 in the headers for data packets of the second substream.

The headers may thus allocate a preferred physical transmission path for each data packet, which can therefore guide the nodes along the first and second data subconnections to route each data packet along the assigned routing path until the data packets reach network access nodes 6808 and 6810, respectively. Network access nodes 6808 and 6810 may receive the data packets, read the header to determine the assigned carrier, and then transmit the data packets for the first and second substreams accordingly.

Terminal device 6802 may receive the data packets for the first and second substreams separately over carriers 6804 and 6806. As the header of each data packet identifies the first or second data subconnection, substream combiner/separator 7208 may identify which data packets are part of the first substream, which data packets are part of the second substream, and then recombine the first and second substreams to recover the original data stream that originated from data network 6816. For example, the data packets of the first and second substreams may be pass through communication processor 7210 (e.g., in addition to data packets from any other substreams that are active). The header of each data packet of the first and second substream may contain some identifying information that indicates that the data packet is part of the first or second substream. Communication processor 7210 may be configure to monitor the data packets that pass through it, and to provide any data packets having a header identifying it as part of the first or second substream to substream combiner/separator 7208. In some aspects, communication processor 7210 may also process and decode the packets, and provide the resulting data to substream combiner/separator 7208 along with identifying information that identifies whether the data packets are from the first or second substream. In some aspects, the header or other data in the data packet may also indicate a packet number or other information that identifies the sequential position of the data packet within the data stream. Substream combiner/separator 7208 may thus use this packet number or other information to re-organize the data from the data packets from the first and second substreams into the correct order consistent with the data stream. Substream combiner/separator 7208 may therefore recover the data stream.

Alternatively, in some aspects the stream controller may encapsulate the data packets with the headers, such as by receiving the data packets of the data stream, assigning some data packets to the first substream by encapsulating them with a header specifying the first data subconnection, and assigning other data packets to the second substream by encapsulating them with a header specifying the second data subconnection. The stream controller may then pass the encapsulated data packets to the routing processor, which may read the header of each data packet and route the data packet to the next node along the first and second data subconnections.

In some aspects, the routing processor and/or stream controller may utilize an intelligent algorithm to decide which packets to route onto which data subconnection (and equivalently, which data packets to transmit over each carrier). For example, the routing processor and/or stream controller may consider the carrier characteristics of the carrier of each data subconnection, such as the delay and data rate, and may assign some data packets to the first data subconnection and other data packets to the second data subconnection based on the carrier characteristics. For example, carrier 6804 may have a higher data rate than carrier 6806, and the routing processor and/or stream controller may therefore assign a proportionally greater amount of data packets to the first substream than the second substream. The routing processor and/or stream controller may likewise assign a proportionally greater amount of data packets to a data subconnection that has a higher reliability than another data subconnection. In some aspects, the routing processor and/or stream controller may use a 'cheapest pipe first' algorithm, in which the routing processor and/or stream controller may assign as many data packets as possible to a 'cheaper' data subconnection until it is at full capacity. Once the cheaper data subconnection is at full capacity, the routing processor and/or stream controller may then allocate data packets to a more expensive data subconnection, if needed based on demand.

These techniques can be analogously applied in the uplink direction for the communication processor and/or substream combiner/separator of a terminal device.

The exemplary network architectures of FIGS. 68-70 may therefore provide several approaches for inter-operator carrier aggregation, where the various network architectures may perform stream separation and combination at different locations. Although described above for separation of a data stream into two substreams, the number of substreams can be scaled to any positive plural integer. Accordingly, in the case of, for example, three substreams in the downlink direction, terminal device 6802 may receive three carriers where each carrier includes one of the substreams. Although at least two of the carriers will be provided by network architecture operated by different network operators in inter-operator carrier aggregation, in some aspects standard carrier aggregation can also be employed along with inter-operator carrier aggregation. For example, the first wireless network operated by the first network operator may provide the first substream over a first carrier, while the second wireless network operated by the second network operator may provide the second and third substreams over second and third carriers, respectively. The second and third carriers can be supplied from the same or different network access nodes of the second wireless network. The stream separation can be performed at any of the network locations as shown and described for FIGS. 68-70. Continuing with the three carrier example, the three carriers can also be provided by three different wireless networks operated by three different network operators.

In some aspects, inter-operator carrier aggregation may be used for peer-to-peer applications. For example, a first terminal device that is receiving data from a second terminal device may be configured to receive the data over multiple carriers. The data can be, for example, a voice call or any type of user data (e.g., multimedia, files, or other data). In some aspects, the second terminal device may transmit the data stream to a network access node, which may then separate the data stream into a first and second substream (e.g., in the manner of FIG. 70). The network access node may then transmit the first substream to the first terminal device on a first carrier, and may provide the second substream to another network access node in a wireless network operated by another network operator. The other network access node may then transmit the second substream to the first terminal device on a second carrier.

In another example, the network access node, e.g. the first network access node, receiving the data stream from the second terminal device may provide the data stream to its core network, e.g. a first core network, which may then separate the data stream into the first and second substreams, and provide the second substream to a core network, e.g. a second core network, of a wireless network operated by another network provider (e.g., in the manner of FIG. 69). The first core network may then provide the first substream to a network access node in its wireless network (e.g., the first network access node or another network access node in its wireless network), which may then transmit the first substream to the first terminal device on a first carrier. The second core network may provide the second substream to a network access node in its wireless network, which may then transmit the second substream to the first terminal device on a second subcarrier. In another example, the first network access node and first core network may transport the data stream to an external data network. The external data network may then transport the data stream to the first terminal device using any of the techniques of FIGS. 68-70, e.g., where the data stream is separated into the first and second substreams by the external data network, a core network, or a radio access network.

Various aspects of inter-operator carrier aggregation as described above may involve a terminal device registering with two (or more) wireless networks. The registration process can involve an authentication procedure by the wireless networks, which may verify that the terminal device is authorized to operate on the wireless networks before completing the registration. Once registered, the terminal device may concurrently maintain both registrations and thus be able to transmit and receive data on both wireless networks, including using the wireless networks for inter-operator carrier aggregation.

In some registration procedures, a terminal device may access a local Subscriber Identity Module (SIM) card and retrieve a terminal identifier, such as an International Mobile Subscriber Identity (IMSI), from the SIM card. The terminal device may then transmit the terminal identifier to the core network, where a registration server such as a Home Location Register (HLR) or Home Subscriber Server (HSS) of the core network may reference the supplied terminal identifier with known terminal identifiers (e.g., terminal identifiers of terminal devices for which the wireless network is the home network) to authenticate the terminal device. If the terminal device is visiting the wireless network (e.g., is roaming and/or a different wireless network is its home network), the registration server may communicate with the registration server of the terminal device's home network to authenticate the terminal device for roaming.

As terminal device 6802 is connected to wireless networks operated by different network operators for inter-operator carrier aggregation, at least one of the wireless networks may be a visited wireless network for the terminal device (in other words, not the home wireless network to which the terminal device is primarily subscribed, such as an HPLMN). Accordingly, while terminal device 6802 may register with, for example, the first wireless network as a home terminal device, terminal device 6802 may register with the second wireless network as a visitor terminal device.

In some aspects of inter-operator carrier aggregation, a wireless network may have a pool of visitor terminal identifiers that are available to terminal devices using the wireless network for inter-operator carrier aggregation. The wireless network may then assign one of the visitor terminal identifiers in the pool to a terminal device as part of the registration procedure of the terminal device. The visitor terminal identifiers in the pool may be assignable to any terminal device that is visiting the wireless network (e.g., for roaming), or may be exclusively assignable to terminal devices that are visiting the wireless network for inter-operator carrier aggregation. In some aspects, the pool of visitor terminal identifiers may be shared between multiple network operators, where a wireless network of a first network operator and a wireless network of a second network operator may both use the pool to assign visitor terminal identifiers to visiting terminal devices. In other aspects, the pool of visitor terminal identifiers may be exclusive to one or more wireless networks of a single network operator.

Accordingly, a registration server of a wireless network may access the pool of visitor terminal identifiers when a terminal device is registering with the wireless network as part of inter-operator carrier aggregation. The registration server may then select a visitor terminal identifier for the terminal device and transmit the visitor terminal identifier to the terminal device. The terminal device may then utilize the visitor terminal identifier to maintain its registration with the wireless network, thus enabling the terminal device to use the wireless network for inter-operator carrier aggregation.

Figure 77:
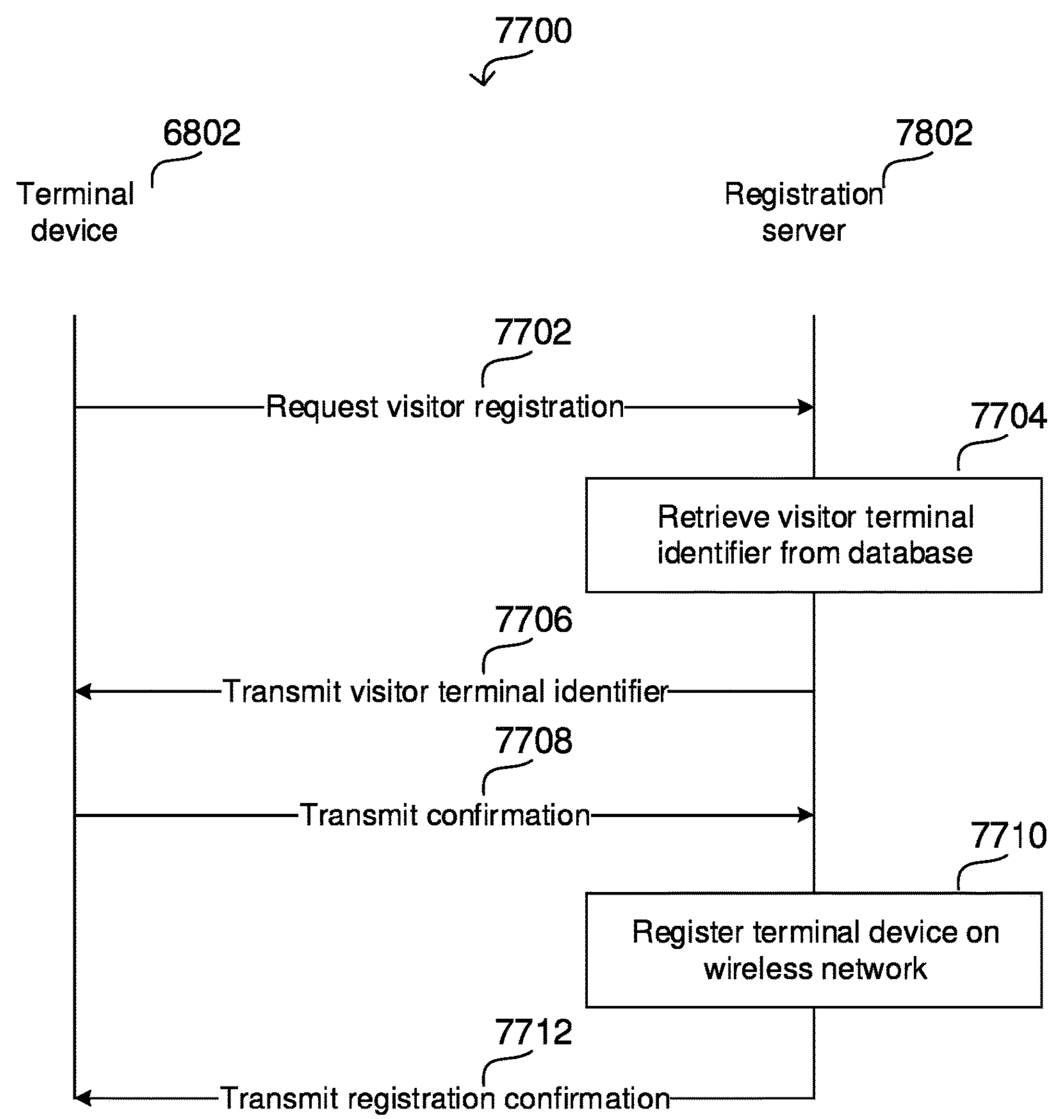
FIG. 77 shows an exemplary message sequence chart for registration of terminal devices for inter-operator carrier aggregation according to some aspects.
Figure 78:
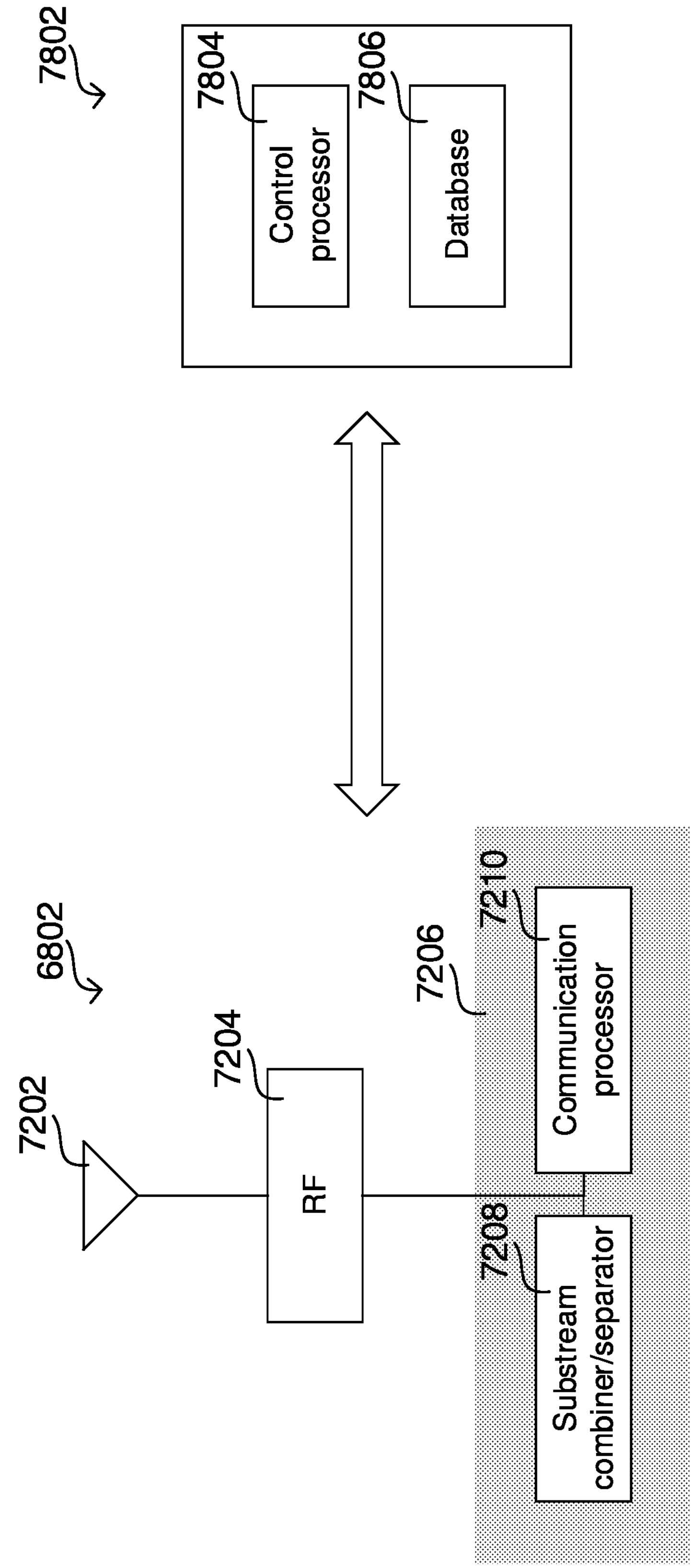
FIG. 78 shows an exemplary internal configuration of a terminal device and a registration server according to some aspects.

FIG. 77 shows exemplary message sequence chart 7700 illustrating this registration procedure between terminal device 6802 and registration server 7802 according to some aspects. FIG. 78 shows an exemplary internal configuration of terminal device 6802 and registration server 7802 according to some aspects.

Registration server 7802 may be located in a core network of a wireless network, such as core network 6812 or 6814 of the first or second wireless network. In some aspects, registration server 7802 may be a core network server such as a Home Location Register (HLR), Visitor Location Register (VLR), Home Subscriber Server (HSS), or another similar type of core network server that handles registration of terminal devices.

As shown in FIG. 78, registration server 7802 may include control processor 7804 and database 7806. While shown as a single component in FIG. 78, this depiction illustrates the logical association between control processor 7804 and database 7806, and in some aspects control processor 7804 and database 7806 may be physically located at different locations and/or be virtualized entities realized through network virtualization. Control processor 7804 may be one or more processors configured to retrieve (e.g., from a local memory) and execute program code that algorithmically defines the registration procedure as described herein in the form of executable instructions. Control processor 7804 may therefore be configured to perform functions including receiving registration requests, accessing database 7806 to retrieve terminal identifiers, and transmitting terminal identifiers to terminal devices. Database 7806 may comprise a memory configured to store terminal identifiers at least including a pool of visitor terminal identifiers. In some aspects, registration server 7802 may be configured to perform registration functions exclusively for visitor terminal devices of the wireless network, while in other aspects registration server 7802 may be configured to perform registration functions for home and visitor terminal devices.

With continued reference to FIG. 77, terminal device 6802 and registration server 7802 may perform the process of message sequence chart 7700 during the registration of terminal device 6802 (e.g., for any one or more of stages 7102, 7104, 7302, 7304, 7502, or 7504). In some aspects, terminal device 6802 and registration server 7802 may perform the process of message sequence chart 7700 if terminal device 6802 is a visitor terminal device to the wireless network of registration server 7802, and may perform a home terminal device registration procedure if terminal device 6802 is a home terminal device to the wireless network of registration server 7802. In some aspects, terminal device 6802 may perform a home terminal device registration procedure with the home wireless network of terminal device 6802 (which may then supply a first carrier for inter-operator carrier aggregation), and may perform the process of message sequence chart 7700 with a registration server of each visitor wireless network (which may each supply an additional carrier for inter-operator carrier aggregation). Terminal device 6802 may thus register with each wireless network that is providing a carrier for inter-operator carrier aggregation.

Terminal device 6802 and registration server 7802 may exchange signaling as shown in FIG. 77 via a logical connection between communication processor 7210 of terminal device 6802 and control processor 7804 of registration server 7802, which may use the radio access network and core network interfaces for lower-layer data transport. As shown in FIG. 77, terminal device 6802 (at communication processor 7210) may request a visitor registration from registration server 7802 in stage 7702. Registration server 7802 may receive the visitor registration request at control processor 7804, which may then access database 7806 to retrieve a visitor terminal identifier from database 7806. Database 7806 may store the pool of visitor terminal identifiers, which may be a pre-allocated pool of visitor terminal identifiers that are assignable to visitor terminal devices that use the wireless network for inter-operator carrier aggregation (and, in some aspects, may also be assignable to other visitor terminal devices). In some aspects, the visitor terminal identifiers in the pool may be IMSIs or another similar type of terminal identifier.

In some aspects, control processor 7804 may select a visitor terminal identifier from the pool at random in stage 7704, while in other aspects control processor 7804 may select a visitor terminal identifier based on a selection criteria.

After retrieving the visitor terminal identifier from database 7806, control processor 7804 may transmit the visitor terminal identifier to terminal device 6802 in stage 7706. Terminal device 6802 may respond with a confirmation in stage 7708 of receipt of the visitor terminal identifier. Registration server 7802 may then register terminal device 6802 on the wireless network in stage 7710, which can include control processor 7804 storing a local indication or transmitting an indication to another core network server that specifies that terminal device 6802 is authenticated for operation on the wireless network with the visitor terminal identifier. Control processor 7804 may then transmit a registration confirmation to terminal device 6802 in stage 7712 to complete the registration procedure.

Once terminal device 6802 is registered on the wireless network with the visitor terminal identifier, terminal device 6802 may operate on the wireless network. Terminal device 6802 and the wireless network may utilize the visitor terminal identifier to manage the operation of terminal device 6802, which can include the generation of temporary terminal identifiers (e.g., Temporary Mobile Subscriber Identity (TMSI)) that are used to identify terminal device 6802 during its operation on the wireless network.

Terminal device 6802 may thus register with the wireless network, and utilize the visitor terminal identifier to establish the data bearers across the wireless network used for inter-operator carrier aggregation. As previously shown and described regarding FIGS. 68-70, terminal device 6802 may establish different bearers across the wireless networks depending on which wireless network is separating or recombining the data stream and where in the wireless network the separation or combination is occurring. In particular, terminal device 6802 may establish the first data subconnection as an end-to-end data connection to data network 6816 over the first wireless network, while the second data subconnection may in some exemplary embodiments only bridge between terminal device 6802 and the network location where the data stream is being separated or recombined. Accordingly, in some aspects the wireless network that has the longer data subconnection can be considered the primary wireless network, while the wireless network that has the shorter data subconnection can be considered the secondary wireless network.

While depicted in FIGS. 68-70 for transporting a data stream concurrently across the radio access and core networks of two different network operators with inter-operator carrier aggregation, in some aspects the same architecture may be used for intra-operator carrier aggregation. For example, core network 6812 and the radio access network including network access node 6808 may be the core network and the radio access network of a network operator that supports a first radio communication technology, and core network 6814 and the radio access network including network access node 6810 may be the core network and the radio access network of the network operator that supports a second radio communication technology. A non-limiting example can be where core network 6812 and the radio access network including network access node 6808 supports LTE, and core network 6814 and the radio access network including network access node 6810 supports a legacy radio communication technology such as UMTS or GSM. Accordingly, the first wireless network supporting LTE (including core network 6812 and the radio access network including network access node 6808) and the second wireless network supporting the legacy radio communication technology (including core network 6814 and the radio access network including network access node 6810) may operate in the same manner as described for inter-operator carrier aggregation to perform intra-operator carrier aggregation using a first LTE carrier provided by the first wireless network and a legacy carrier provided by the second wireless network. The cross-bearers may function in the same manner to transfer data between the first and second wireless networks, and the first and second wireless networks may operate in the same manner to transport the first and second substreams.

In some aspects, terminal device 6802 may be configured to select which carriers to use for inter-operator carrier aggregation. For example, terminal device 6802 may be configured to select the carriers based on wireless network, frequency band, network load, radio access conditions, radio access technology, bandwidth, geographic availability, latency, reliability, or other similar characteristics of a carrier. Terminal device 6802 may be configured to consider one or more of these carrier characteristics in selecting which carriers to use.

Figure 79:
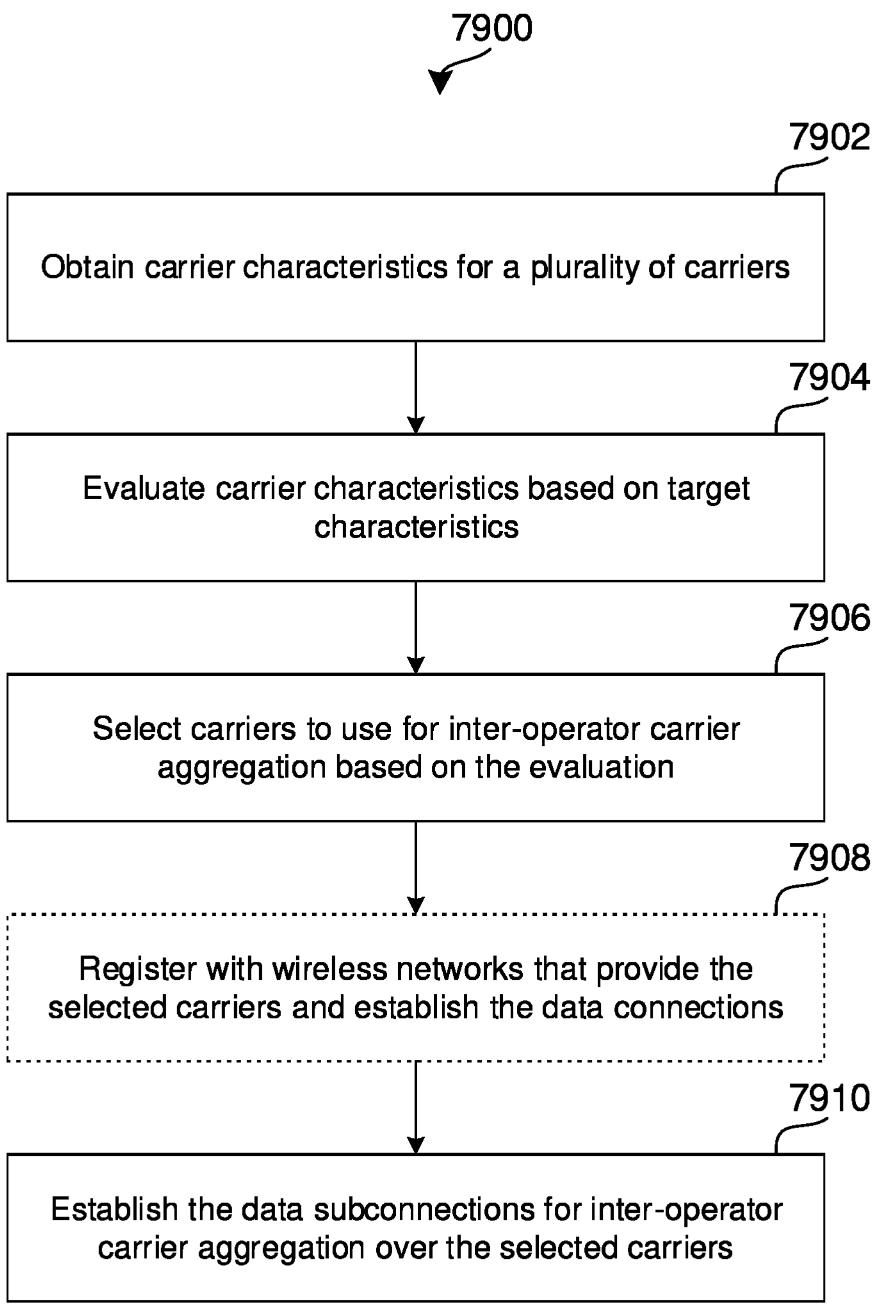
FIG. 79 shows an exemplary method for selecting carriers to use for inter-operator carrier aggregation according to some aspects.

FIG. 79 shows exemplary method 7900 according to some aspects, which terminal device 6802 may perform to select carriers to use for inter-operator carrier aggregation. In some aspects, communication processor 7210 of terminal device 6802 may perform method 7900 by retrieving (from a local memory) and executing program code that algorithmically defines the process of method 7900 in the form of executable instructions.

As shown in FIG. 79, communication processor 7210 may obtain carrier characteristics for a plurality of carriers in stage 7902. The plurality of carriers may be provided from the wireless networks of multiple network operators, such as the first wireless network operated by the first network operator and the second wireless network operated by the second network operator. In some aspects, communication processor 7210 may obtain the carrier characteristics by receiving and processing wireless signals on the plurality of carriers. For example, communication processor 7210 may receive wireless signals on carrier 6804 from network access node 6808, and process the wireless signals to obtain carrier characteristics for carrier 6804. Communication processor 7210 may also receive wireless signals on carrier 6806 from network access node 6810, and process the wireless signals to obtain carrier characteristics for carrier 6806.

In some aspects, communication processor 7210 may receive and process wireless signals such as reference signals to obtain the carrier characteristics. For example, communication processor 7210 may receive a reference signal on carrier 6804 from network access node 6808 and process the reference signal to, for example, measure a signal strength of the reference signal, measure a signal quality of the reference signal, measure an SNR-type measurement of the reference signal, measure an interference level of the reference signal, or measure another type of radio access condition-related carrier characteristic of carrier 6804.

In some aspects, communication processor 7210 may obtain carrier characteristics by performing a cell detection procedure. These cell detection procedures can also be a part of mobility procedures, and can include neighbor cell measurements and scan-type measurements. When performing cell detection procedure, communication processor 7210 may receive wireless signals on a carrier (e.g., using the center frequency of the carrier) and process the wireless signals to determine whether any cells are active on the carrier. For example, communication processor 7210 may receive wireless signals using the center frequency of carrier 6804, and may process the wireless signals to detect any synchronization signals (e.g., Primary Synchronization Signals (PSSs), Secondary Synchronization Signals (SSSs), or another type of broadcasted signal used for cell detection and/or identification) transmitted by nearby network access nodes. Communication processor 7210 may use any detected synchronization signals to identify the network access node that transmitted the synchronization signal, such as by deriving a cell identity from the detected synchronization signals or by using the synchronization signals to synchronize with the transmitting network access node and reading system information from the transmitting network access node. Communication processor 7210 may also read other information from system information transmitted by any detected network access nodes, such as the network identity (e.g., a PLMN ID or another network identity that identifies the wireless network operating the carrier), the bandwidth of the carrier, or other information included in the system information. Communication processor 7210 may repeat this cell detection procedure using multiple different carrier frequencies optionally on multiple different frequency bands. While some information for a single carrier may be different for different network access nodes (e.g., different cell identities), some information may be common to all network access nodes operating on the carrier (e.g., network identity, bandwidth, etc., which may at least be common to network access nodes operating in a proximate geographic area).

These cell detection procedures may thus yield a variety of carrier characteristics. For example, communication processor 7210 may be configured to obtain a network identity or a bandwidth of a carrier by performing cell detection procedures. Furthermore, as some synchronization signals may be RAT-specific, communication processor 7210 may also identify the radio access technology of a carrier by detecting a RAT-specific synchronization signal of the radio access technology on the carrier. Communication processor 7210 may also determine the frequency band of the carrier based on which frequency band the center frequency of the carrier is located in.

Accordingly, in some aspects communication processor 7210 may obtain carrier characteristics such as network identity, bandwidth, radio access technology, and/or frequency band of one or more carriers by performing cell detection procedures in stage 7902. In some aspects, communication processor 7210 may use results from previous cell detection procedures (e.g., performed as part of initial attach, network scan, or neighbor cell measurements) as carrier characteristics in stage 7902. In some aspects, communication processor 7210 may perform a new cell detection procedure in stage 7902 to obtain carrier characteristics.

In some aspects, communication processor 7210 may also determine a network load, latency, and/or reliability of a carrier in stage 7902. These carrier characteristics, in contrast to carrier characteristics related to radio access conditions, may characterize the core network supporting the carrier. In some aspects, communication processor 7210 may measure these carrier characteristics and/or may receive information that specifies these carrier characteristics.

In some aspects, communication processor 7210 may perform stage 7902 by scanning through a plurality of potential carriers, such as by checking each of a plurality of carrier center frequencies to determine whether a carrier is active at the carrier center frequency and, if so, obtaining carrier characteristics for the active carriers.

Communication processor 7210 may therefore obtain carrier characteristics for a plurality of carriers in stage 7902, which can include using any one or more of the techniques described above (or similar techniques) to obtain the carrier characteristics.

Communication processor 7210 may then evaluate the carrier characteristics based on target characteristics. As previously indicated, terminal device 6802 may use inter-operator carrier aggregation to transmit or receive data for a single data connection, where the data stream from the data connection can be separated into multiple separate sub-streams that are each transmitted on a different carrier. It may therefore be advantageous to select carriers that have suitable carrier characteristics for the data connection. For example, communication processor 7210 may have an active data connection (e.g., that terminal device 6802 is currently transmitting or receiving data on) or a potential data connection (e.g., that terminal device 6802 is planning to begin transmitting or receiving data on). Different data connections may have different service types, and thus may have differing requirements. These requirements may therefore be the target characteristics. For example, voice data connections may generally have stricter latency requirements, while best-effort data connections (e.g., browser or other Internet traffic) may have looser latency requirements. In another example, messaging data connections may have low data rate requirements, while audio or video streaming may have high data rate requirements. In some aspects, these target characteristics of the data connection may be indicated by a Quality of Service (QoS) class of the data connections, such as a QoS Class Indicator (QCI), which may specify the target characteristics as quantitative values for each QoS class. Communication processor 7210 may therefore determine the target characteristics based on the QoS class or a similar set of predefined requirements of the active or potential data connection.

Communication processor 7210 may therefore evaluate the carrier characteristics in stage 7904 based on the target characteristics of the active or potential data connection. In some aspects, communication processor 7210 may compare the carrier characteristics for the plurality of carriers to the target characteristics of the active or potential data connection to quantitatively determine which carrier has carrier characteristics that best match the target characteristics. For example, communication processor 7210 may have numerical carrier characteristics for each of the plurality of carriers that quantitatively represent the carrier characteristics, such as a signal strength measured in decibels, an SNR measured as a numerical ratio, a latency measured in seconds, a data rate measured in bytes per second, etc. Communication processor 7210 may similarly have numerical target characteristics that quantitatively represent the requirements of the active or potential data connection, such as a target signal strength in decibels, a target SNR as a numerical ratio, a target latency in seconds, a data rate in bytes per second, etc. Communication processor 7210 may then calculate the difference between the carrier characteristics for each carrier and the counterpart target characteristic and sum the differences to obtain a numerical metric for each carrier that quantitatively represents how well the carrier characteristics for each carrier match the target characteristics. In some aspects, the differences may be weighted in the sum, such as where target characteristics are given higher weights in direct proportion to importance (e.g., latency for voice calls, data rate for multimedia streaming, etc.).

In some aspects, certain carrier and target characteristics may be factored into the numerical metric based on other predefined relationships. For example, communication processor 7210 may add or subtract a predefined value from the numerical metric for each carrier based on whether the carrier is operated by a target wireless network, whether the carrier is on a target frequency band, and/or whether the carrier uses a target radio access technology. For example, communication processor 7210 may add a predefined value to the numerical metric for a carrier if the carrier is operated by the home wireless network of terminal device 6802, may add a predefined value to the numerical metric for a carrier if the carrier uses a preferred frequency band or a low frequency band (where lower frequency bands generally exhibit lower path loss than higher frequency bands), may add a predefined value to the numerical metric for a carrier if the carrier uses a preferred RAT, etc. In some cases, communication processor 7210 may have different predefined values to add to the numerical metric for a carrier depending on the carrier characteristics, such as a highest predefined value to add to the numerical value for a carrier if the carrier uses a highest priority radio access technology (e.g., LTE), a second-highest predefined value to add to numerical value for a carrier if the carrier uses a second-highest priority radio access technology (e.g., UMTS), etc., which can be analogously expanded for other carrier characteristics for different predefined values corresponding to the priority of different carrier characteristics.

Communication processor 7210 may therefore obtain a numerical value for each of the plurality of carriers in stage 7904. Communication processor 7210 may then select carriers to use for inter-operator carrier aggregation in stage 7906. In some aspects, communication processor 7210 may be configured to identify a predefined number of carriers (e.g., two in the above examples with carriers 6804 and 6806) having the highest numerical values, and select these carriers in stage 7906. In some aspects, communication processor 7210 may evaluate the carriers individually during selection in stage 7906, such as by selecting the carriers with the highest numerical values. In other aspects, communication processor 7210 may evaluate the carriers jointly, such as by selecting the predefined number of carriers having the highest numerical values that are on the same frequency band and/or use the same radio access technology.

In some aspects, communication processor 7210 may use current, past, or anticipated carrier characteristics to select the carriers to use for inter-operator carrier aggregation. For example, communication processor 7210 may be configured to monitor (e.g., by performing radio measurements on the carriers over tie) and store (e.g., in a local memory) carrier characteristics over time. Communication processor 7210 may then be configured to use both current carrier characteristics (e.g., that are recently obtained) and historical carrier characteristics (e.g., stored in the memory) to select the carriers to use for inter-operator carrier aggregation. In some aspects, communication processor 7210 may render predictions (e.g., using a machine learning or other predictive algorithm that can use current or historical carrier characteristics to make predictions about future carrier characteristics) to determine anticipated carrier characteristics. Communication processor 7210 may then additionally or alternatively use the anticipated carrier characteristics to select the carriers for inter-operator carrier aggregation. In some aspects where communication processor 7210 uses numerical values to evaluate carriers, communication processor 7210 may be configured to weight historical, current, or anticipated carrier characteristics higher or lower relative to each other when determining numerical values for a carrier.

In some aspects, communication processor 7210 may be configured to select a primary carrier and one or more secondary carriers in stage 7906. For example, with continued reference to FIGS. 68-70, carrier 6804 may be the primary carrier through which an end-to-end connection with data network 6816 is maintained regardless of where the stream separation and combination occurs, while carrier 6806 may be the secondary carrier that may or may not support an end-to-end connection. In some aspects, communication processor 7210 may be configured to select the carrier with the highest numerical value as the primary carrier and the carrier with the second-highest numerical value as the secondary carrier. In some aspects, communication processor 7210 may be configured to select the carrier with the highest numerical value that also has a specific carrier characteristic as the primary carrier. For example, communication processor 7210 may select the carrier with the highest numerical value that is operated by a home wireless network of terminal device 6806 as the primary carrier.

After selecting the carriers to use for inter-operator carrier aggregation in stage 7906, communication processor 7210 may register with the wireless networks that provide the selected carriers in optional stage 7908. This can include the network registration procedure as described above in FIGS. 71, 73, 75, and/or 77. In some aspects, communication processor 7210 may already be registered on all the wireless networks that provide the selected carriers, and thus may not perform optional stage 7908. In some aspects, communication processor 7210 may already be registered on some of the wireless networks that provide the selected carriers, and may only register with the wireless networks to which communication processor 7210 is not already registered in optional stage 7908. In some aspects, communication processor 7210 may be configured to re-register with one or more wireless networks, or perform another update procedure to update its registration with the network. For example, communication processor 7210 may be configured to periodically re-register with wireless networks, or to re-register with wireless network if a triggering condition occurs (e.g., if a parameter associated with its registration changes).

Communication processor 7210 may then establish the data subconnections for inter-operator carrier aggregation over the selected carriers. This can include the bearer establishment procedures as described above in FIGS. 71, 73, and/or 75, where communication processor 7210 may establish the underlying bearers through the radio access network and core network that form the data subconnections between terminal device 6802 and data network 6816. After establishing the data subconnections, communication processor 7210 may transmit and/or receive data over the selected carriers using inter-operator carrier aggregation.

The procedure of method 7900 may therefore enable terminal device 6802 to evaluate numerous different carriers to select which carriers provide suitable matches for active or potential data connections of terminal device 6802. As the carriers may be provided by different network operators, terminal device 6802 may have a larger range of carriers to select from as opposed to single-operator carrier aggregation. In some aspects, terminal device 6802 may pre-register with wireless networks in anticipation of potential use of a wireless network for inter-operator carrier aggregation. For example, terminal device 6802 may register with more wireless networks than it is actively using for inter-operator carrier aggregation. If terminal device 6802 then determines that one of the wireless networks that it is not actively using would provide a more suitable carrier than another active wireless network (e.g., according to an evaluation with numerical values as previously described), terminal device 6802 may be configured to use the existing registration with the wireless network to establish a data subconnection over the wireless network and begin using the wireless network for inter-operator carrier aggregation. In some aspects, terminal device 6802 may be configured to de-register from the other wireless network, or may be configured to maintain its registration with the other wireless network for potential later re-activation. In some aspects, terminal device 6802 may be configured to pre-register with wireless networks based on anticipated carrier characteristics for the wireless networks, such as by pre-registering with a wireless network that has a carrier having suitable anticipated carrier characteristics.

Figure 80:
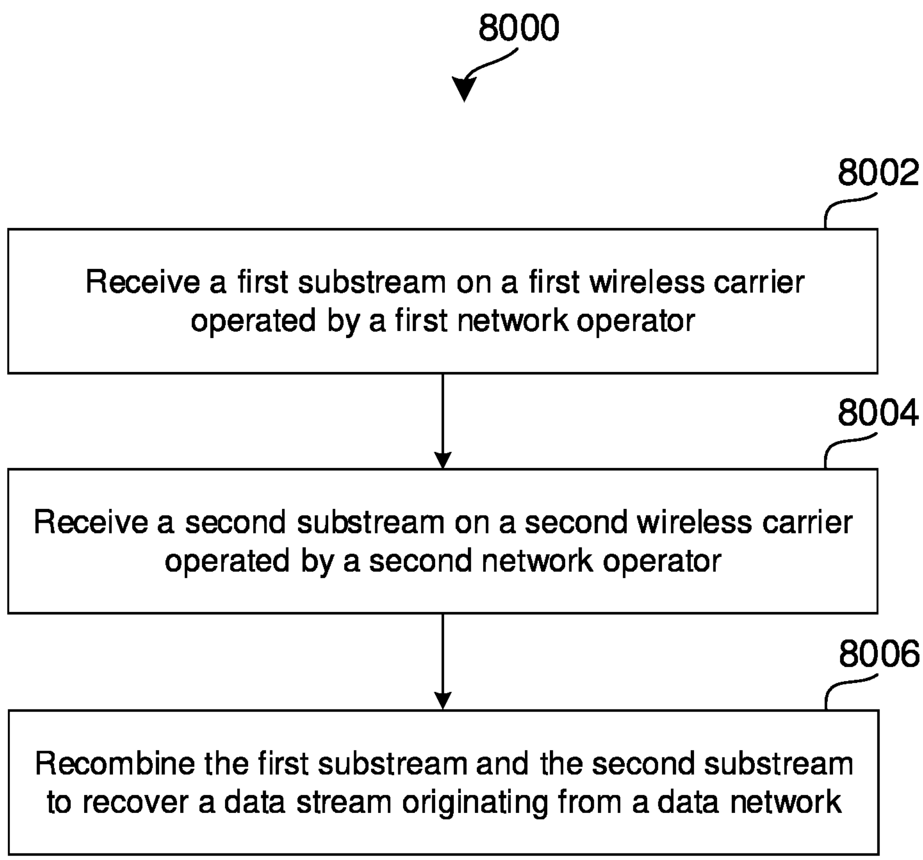
FIG. 80 shows an exemplary method of performing inter-operator carrier aggregation at a terminal device according to some aspects.

FIG. 80 shows method 8000 of transporting data across wireless networks. As shown in FIG. 80, method 8000 includes receiving a first substream on a first carrier operated by a first network operator (8002), receiving a second substream on a second carrier operated by a second network operator (8004), and recombining the first substream and the second substream to recover a data stream originating from a data network (8006).

Figure 81:
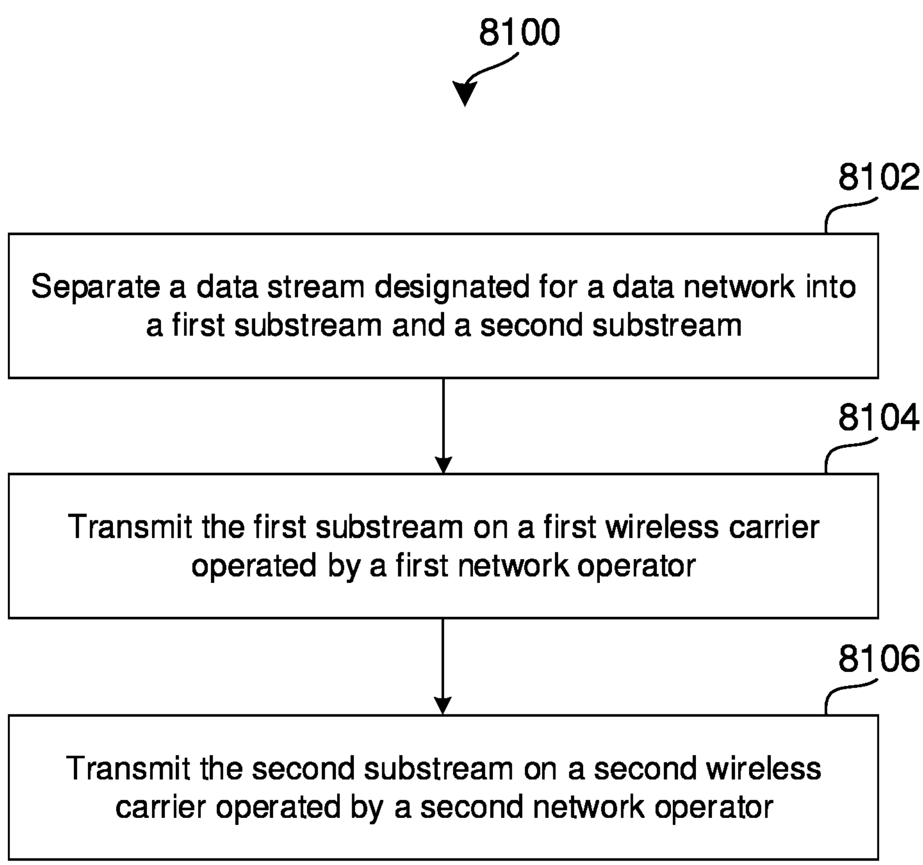
FIG. 81 shows a first exemplary method of splitting a data stream for inter-operator carrier aggregation according to some aspects.

FIG. 81 shows method 8100 of transporting data across wireless networks. As shown in FIG. 81, method 8100 includes separating a data stream designated for a data network into a first substream and a second substream (8102), transmitting the first substream on a first carrier operated by a first network operator (8104), and transmitting the second substream on a second carrier operated by a second network operator (8106).

Figure 82:
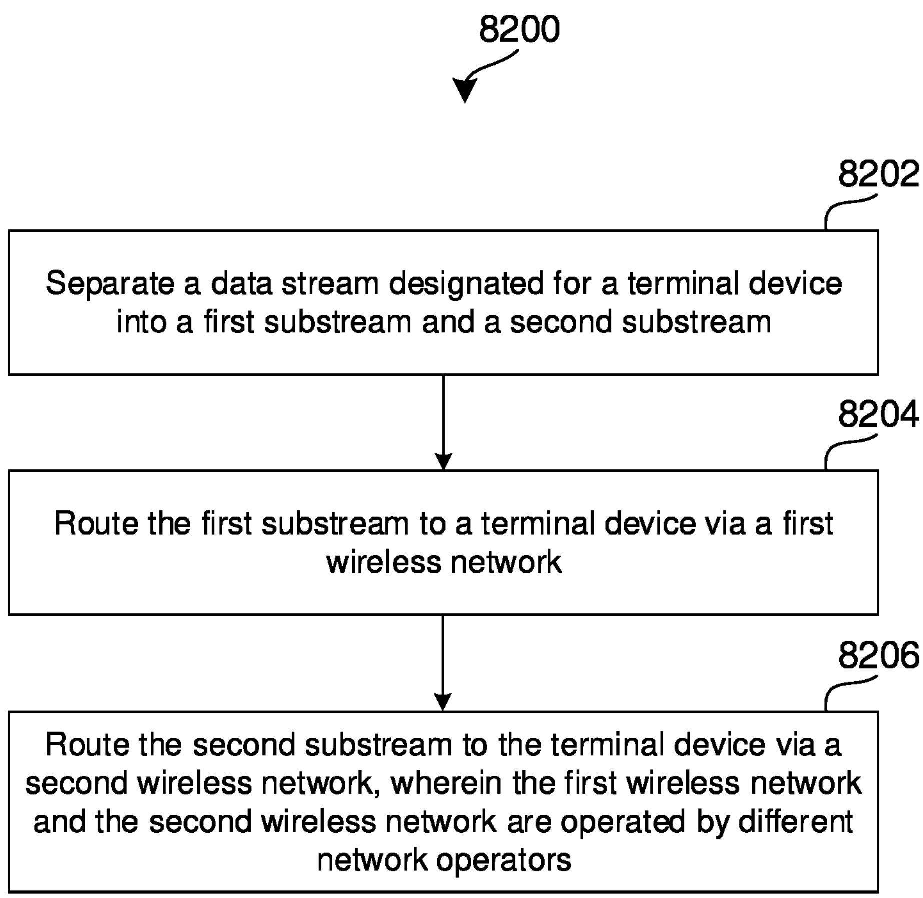
FIG. 82 shows a second exemplary method of splitting a data stream for inter-operator carrier aggregation according to some aspects.

FIG. 82 shows method 8200 transporting data across wireless networks. As shown in FIG. 82, method 8200 includes separating a data stream designated for a terminal device into a first substream and a second substream (8202), routing the first substream to a terminal device via a first wireless network (8204), and routing the second substream to the terminal device via a second wireless network (8206), wherein the first wireless network and the second wireless network are operated by different network operators.

Figure 83:
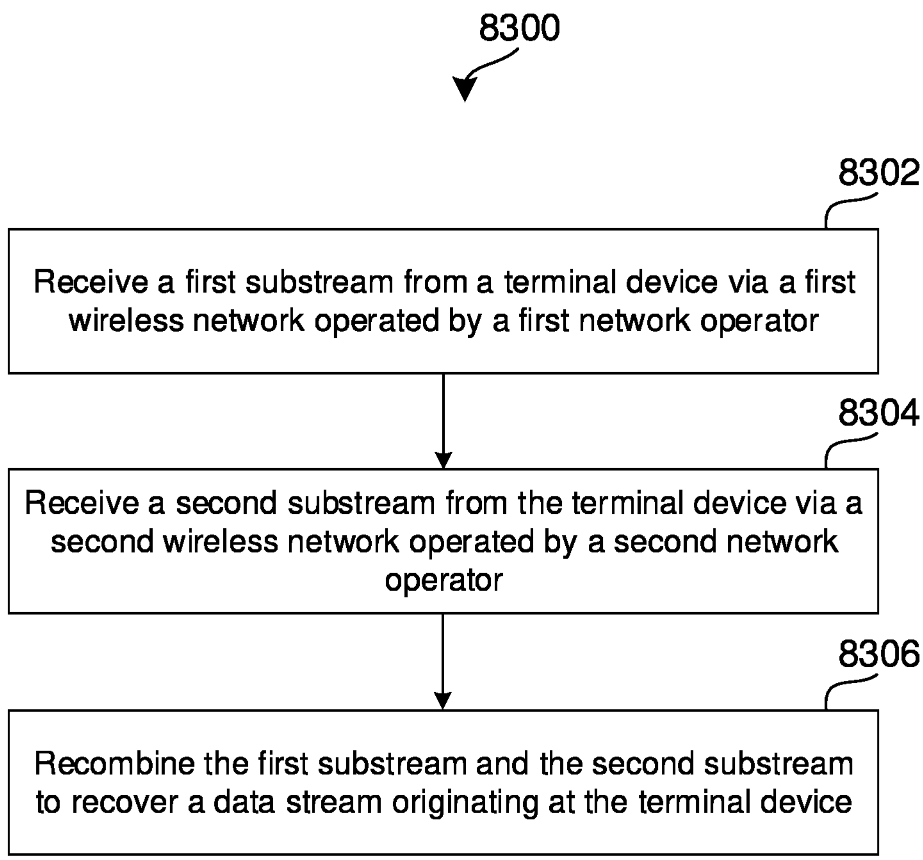
FIG. 83 shows an exemplary method of recombining substreams to recover a data stream in inter-operator carrier aggregation according to some aspects.

FIG. 83 shows method 8300 of transporting data across wireless networks. As shown in FIG. 83, method 8300 includes receiving a first substream from a terminal device via a first wireless network operated by a first network operator (8302), receiving a second substream from the terminal device via a second wireless network operated by a second network operator (8304), and recombining the first substream and the second substream to recover a data stream originating at the terminal device (8306).

Narrowband Signal Injection

Mechanisms that facilitate coexistence between different radio communication technologies may be featured in next generation communication networks. In some aspects of this disclosure, communication devices may be configured to use narrowband signal injection to transmit and receive information with each other on top of spectrum used for their wideband communication activity. Communication devices can therefore use narrowband signal injection communicate with each other even if using different wideband radio communication technologies, and may exchange information in a direct manner while re-using spectrum for both narrowband and wideband.

Figure 84:
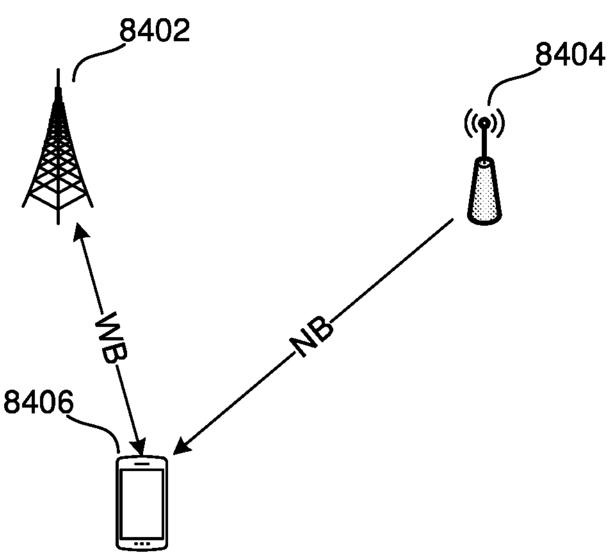
FIG. 84 shows an exemplary network scenario for using narrowband signal injection from a network access node to a terminal device according to some aspects.
Figure 85:
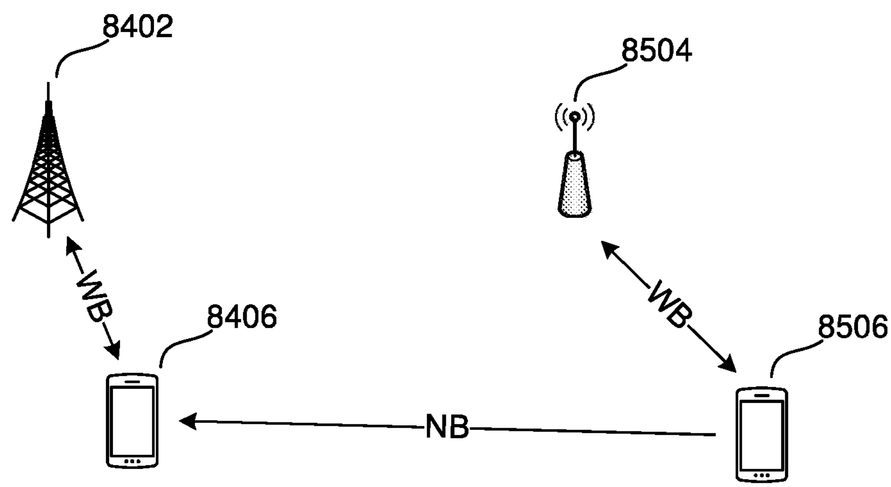
FIG. 85 shows an exemplary network scenario for using narrowband signal injection from a terminal device to another terminal device according to some aspects.

FIGS. 84 and 85 show examples of narrowband signal injection according to some aspects. In the exemplary scenario of FIG. 84, network access node 8402 may be the serving network access node of terminal device 8406 (e.g., for radio connected state or radio idle state). Network access node 8402 may therefore transmit wideband data to terminal device in the form of wideband wireless signals, which terminal device 8406 may receive and process to recover the wideband data. In some aspects, terminal device 8406 may also transmit wideband data to network access node 8402 in the form of wideband wireless signals, such as by using a duplexing scheme to separate the transmission of uplink and downlink signals.

The wideband signals transmitted by network access node 8402 may occupy a specific frequency band, which may be allocated to network access node 8402 for use. The data and the wideband signals used to wirelessly transport the data may be governed by a first radio communication technology, which may specify the particular control scheme, formatting, and scheduling for transmitting and receiving data. Network access node 8402 and terminal device 8406 may therefore be internally configured for operation with the first radio communication technology. The frequency band of the wideband signal may be centered at a carrier frequency and have a specific bandwidth that is defined by the first radio communication technology.

Network access node 8404 may be configured to operate on a second radio access technology, which may use different a control scheme, formatting, and scheduling from the first radio communication technology. However, network access node 8404 may still communicate with terminal device 8406 with narrowband signal injection. For example, network access node 8404 may transmit a narrowband signal within the frequency band of the wideband signal transmitted by network access node 8402. This injection of a narrowband signal into the spectrum occupied by the wideband signal may therefore provide a mechanism for network access node 8404 to communicate with terminal device 8406. Furthermore, as the narrowband signal may occupy the same spectrum as the wideband signal, terminal device 8406 may receive the narrowband signal without retuning to a different frequency band and/or receiving and processing signals on additional spectrum (e.g., as may be the case if network access node 8404 transmits the narrowband signal outside of the frequency band of the wideband signal). As will be described in later examples, in some aspects terminal device 8406 may also be configured to transmit a narrowband signal (with the same or different spectrum as the narrowband signal transmitted by network access node 8404) to network access node 8404, and may consequently engage in bidirectional communications with network access node 8404 using narrowband signal injection. Network access node 8404 and terminal device 8406 may be configured to unidirectionally and/or bidirectionally exchange various different types of information using this narrowband signal injection.

In the exemplary scenario of FIG. 85, network access node 8402 and terminal device 8406 may be configured to communicate (unidirectionally or bidirectionally) with wideband signals according to a first radio communication technology, and network access node 8504 may be configured to communicate (unidirectionally or bidirectionally) with wideband signals according to a second radio communication technology. In some aspects, network access nodes 8402 and 8504 may operate on the same, overlapping, or closely adjacent (e.g., close enough in spectral distance to be detectable to devices operating on the other frequency band) frequency band. Accordingly, in some cases there may be interference between the wideband signals of the first radio communication technology and the wideband signals of the second radio communication technology. In other aspects, network access nodes 8402 and 8504 may operate on completely separate (e.g., far enough in spectral distance to avoid detectable or meaningful interference) frequency bands.

As shown in FIG. 85, terminal device 8506 may be configured to transmit a narrowband signal to terminal device 8406 with narrowband signal injection. Accordingly, the narrowband signal may be within the frequency band of the wideband signals between network access node 8402 and terminal device 8406. Accordingly, terminal device 8406 may be configured to receive both the wideband signals from network access node 8402 and the narrowband signals from terminal device 8506 on the same frequency band. As in the case of FIG. 84, this narrowband signal injection may provide a mechanism for terminal device 8506 to communicate with terminal device 8406, and to exchange various information. In some aspects, the narrowband signal injection may enable bidirectional communication between terminal device 8406 and terminal device 8506, such as where terminal device 8406 is configured to transmit a narrowband signal to terminal device 8506 on the frequency band of the wideband signals between network access node 8504 and terminal device 8506. Depending on the specific frequency bands used by network access nodes 8402 and 8504 for their respective wideband signals, the narrowband signals used for bidirectional communications between terminal devices 8406 and 8506 may be within the same or different frequency bands.

As will be described, the narrowband signals can be used to exchange any type of information. In some aspects, the narrowband signals may be used to coordinate time and/or frequency synchronization, to exchange control information, and/or to exchange key channel parameters. This information can then be used to manage coexistence between communication devices that are operating with different radio communication technologies.

Figure 86:
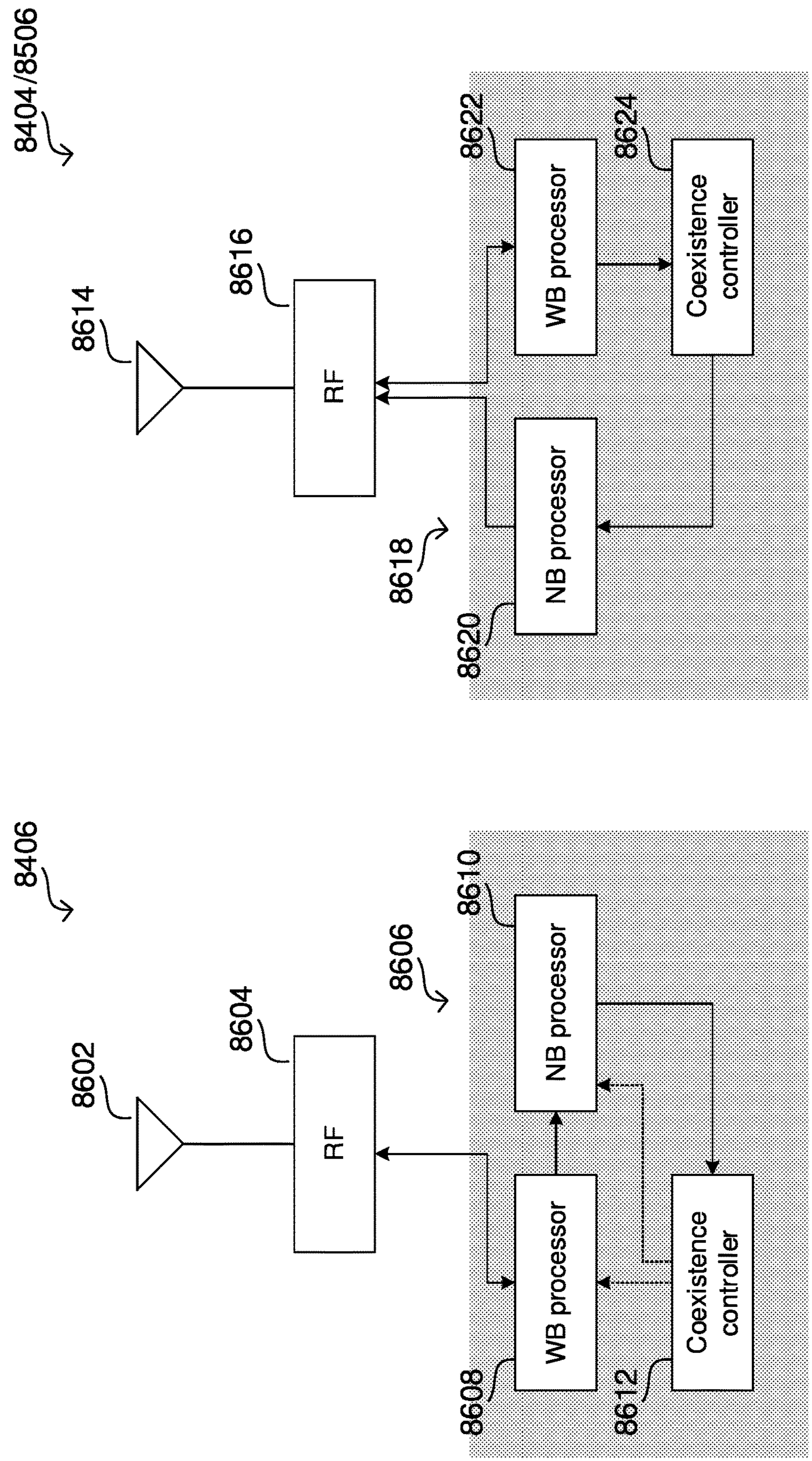
FIG. 86 shows an exemplary internal configuration of a terminal device and another communication device configured to communicate using narrowband signal injection according to some aspects.

FIG. 86 shows exemplary internal configurations of terminal device 8406 and of network access node 8404 or terminal device 8506 according to some aspects. As introduced above, terminal device 8406 may be configured to receive a wideband signal from network access node 8402, where the wideband signal includes a narrowband signal on overlapping spectrum from another communication device (e.g., network access node 8404 or terminal device 8506). Terminal device 8406 may then separate the narrowband signal from the wideband signal, and separately process the narrowband signal and the wideband signal to recover the wideband and narrowband data respectively modulated onto the respective signals. In some aspects, the narrowband data may include coexistence information from the other communication device, which terminal device 8406 may be able to use to adjust its wideband activity with network access node 8402 to coordinate with wireless activity of the other communication device. This coordination can include adjustment of transmission and/or reception activity to avoid interference, such as where terminal device 8406 and the other communication device use different radio communication technologies subject to coexistence-related interference. In other aspects, the narrowband data may include information not directly related to coexistence, and may be used to exchange any type of information between terminal device 8406 and the other communication device. Terminal device 8406 may also be configured to transmit narrowband signals of its own, such as to the other communication device.

Accordingly, as shown in FIG. 86 terminal device 8406 may include antenna system 8602, RF transceiver 8604, and communication arrangement 8606. Antenna system 8602 and RF transceiver 8604 may be configured in the manner shown and described for antenna system 202 and RF transceiver 204 of terminal device 102 in FIG. 2. Antenna system 8602 and RF transceiver 8604 may therefore may function to, in the transmit direction, receive baseband samples from communication arrangement 8606, process and modulate the baseband samples to obtain radio frequency signals, and wirelessly transmit the radio frequency signals and, in the receive direction, wirelessly receive radio frequency signals, process and demodulate the radio frequency signals to obtain baseband samples, and provide the baseband samples to communication arrangement 8606.

Communication arrangement 8606 may correspond to the physical layer, protocol stack, and application layer (if any) of terminal device 8406, and may include various components of terminal device 8406 that are part of a digital signal processor, controller, and/or application processor of terminal device 8406. As shown in FIG. 86, communication arrangement 8606 may include wideband processor 8608, narrowband processor 8610, and coexistence controller 8612. The depiction of FIG. 86 thus illustrates that wideband processor 8608, narrowband processor 8610, and coexistence controller 8612 may be part of one or multiple of a physical layer processor/digital signal processor, controller, and/or application processor and are therefore not exclusively limited to being a physical layer, protocol stack, or application layer component.

As shown in FIG. 86, wideband processor 8608 may receive wideband signals (e.g., in the baseband domain in the form of baseband samples) from RF transceiver 8604. Wideband processor 8608 may be configured to process the wideband signals to recover wideband data (e.g., control and user data) contained in the wideband signals. Wideband processor 8608 may further be configured to separate narrowband signals from the wideband signals, and to provide the narrowband signals to narrowband processor 8610. In some aspects, wideband processor 8608 may include one or more processors configured to retrieve (e.g., from a local memory) and execute program code that algorithmically defines the reception processing described herein to demodulate and decode the wideband signals to recover the wideband data. The program code may be updatable, such as wirelessly or by a manual install. Wideband processor 8608 may also be configured to perform interference cancelation, signal reconstruction, and/or subcarrier extraction as part of this processing. In some aspects, wideband processor 8608 may also include one or more hardware accelerators configured to perform dedicated processing tasks as part of the reception processing. In some aspects, wideband processor 8608 may correspond to a wideband physical layer and/or protocol stack, where the one or more processors are protocol processors configured to execute protocol stack program code to control the wideband reception processing and the hardware accelerators are digital signal processing circuitry for low-level wideband processing functions. Wideband processor 8608 may also be configured to generate wideband signals from wideband data, and to provide the wideband signals to RF transceiver 8604 for wireless transmission. Wideband processor 8608 may therefore transmit and receive wideband signals with a counterpart wideband processor of another communication device via a logical connection that uses wireless propagation for low-layer transmission.

Narrowband processor 8610 may be configured to receive narrowband signals from wideband processor 8608 and to process the narrowband signals to recover narrowband data contained in the narrowband signals. In some aspects, narrowband processor 8610 may include one or more processors configured to retrieve (e.g., from a local memory) and execute program code that algorithmically defines the reception processing described herein to demodulate and decode the narrowband signals to recover the narrowband data. The program code may be updatable, such as wirelessly or by a manual install. In some aspects, narrowband processor 8610 may also include one or more hardware accelerators configured to perform dedicated processing tasks as part of the narrowband reception processing. In some aspects, narrowband processor 8610 may correspond to a narrowband physical layer and/or protocol stack, where the one or more processors are protocol processors configured to execute protocol stack program code to control the narrowband reception processing and the hardware accelerators are digital signal processing circuitry for low-level narrowband processing functions. Narrowband processor 8610 may therefore receive narrowband signals from a counterpart wideband processor of another communication device via a logical connection that relies on wireless propagation for low-layer transmission. Although shown with a focus on the receive path in FIG. 86, in some aspects narrowband processor 8610 may also be configured to transmit narrowband signals, such as in the manner as described herein for network access node 8404/terminal device 8506.

As previously indicated, in some aspects terminal device 8406 may be configured to coordinate its wideband communication activity (transmission and/or reception) with communication activity of the other communication device that transmitted the narrowband signals. For example, the narrowband data received in the wideband signals can include coexistence information that wideband processor 8608 may use to arrange its wideband communication activity. In various example, the coexistence information may be time or frequency synchronization signals, transmission or reception schedule information, and/or key channel parameters. Narrowband processor 8610 may be configured to recover this coexistence information as narrowband data from the narrowband signals, and to provide the coexistence information to coexistence controller 8612. Coexistence controller 8612 may then read the coexistence information, and provide control signaling to wideband processor 8608 to instruct wideband processor 8608 to schedule its communication activity.

In some aspects, coexistence controller 8612 may include one or more processors configured to retrieve (e.g., from a local memory) and execute program code that algorithmically defines the reading and interpretation of coexistence information and the control of wideband processor 8608 as described herein. The program code may be updatable, such as wirelessly or by a manual install. In some aspects, coexistence controller 8612 may correspond be a protocol stack component of terminal device 8406, and may, for example, interface between the wideband protocol stack of wideband processor 8608 and the narrowband protocol stack of narrowband processor 8610, or may be part of the wideband protocol stack of wideband processor 8608 that manages wideband transmission or reception scheduling.

With continued reference to FIG. 86, an internal configuration of network access node 8404 or terminal device 8506 is also shown. As previously described regarding FIGS. 84 and 85, network access node 8404 or terminal device 8506 may be configured to transmit narrowband signals to terminal device 8406 using narrowband signal injection. Network access node 8404/terminal device 8506 may include antenna system 8614, RF transceiver 8616, and communication arrangement 8618. In the case of network access node 8404, antenna system 8614 and RF transceiver 8616 may be configured in the manner shown and described for antenna system 302 and radio transceiver 304 of network access node 110 in FIG. 3. In the case of terminal device 8506, antenna system 8614 and RF transceiver 8616 may be configured in the manner shown and described for antenna system 202 and RF transceiver 204 of terminal device 102 in FIG. 2.

Communication arrangement 8618 may correspond to the physical layer, protocol stack, and/or application layer (if any) of network access node 8404/terminal device 8506, and may include various components of network access node 8404/terminal device 8506 that are part of a physical layer processor/digital signal processor, controller, and/or application processor of network access node 8404/terminal device 8506. As shown in FIG. 86, communication arrangement 8618 may include narrowband processor 8620, wideband processor 8622, and coexistence controller 8624. The depiction of FIG. 86 thus illustrates that narrowband processor 8620, wideband processor 8622, and coexistence controller 8624 may be part of one or multiple of a digital signal processor, controller, and/or application processor and are therefore not exclusively limited to being a physical layer, protocol stack, or application layer component.

The exemplary internal configuration of network access node 8404/terminal device 8506 may focus on the transmit path in which network access node 8404/terminal device 8506 performs narrowband signal injection to transmit a narrowband signal to terminal device 8406 in a frequency band occupied by a wideband signal for terminal device 8406. Narrowband processor 8620 may be configured to select narrowband spectrum in the wideband signal frequency band to use for transmission of the narrowband signal. Narrowband processor 8620 may then be configured to generate the narrowband signal in the narrowband spectrum, and to provide the narrowband signal to RF transceiver 8616 and antenna system 8614 for wireless transmission. In some aspects, coexistence controller 8624 may be configured to provide coexistence information to narrowband processor 8620, which narrowband processor 8620 may include as narrowband data when generating the narrowband signal. In other aspects, narrowband processor 8620 may be configured to transmit other data such as any type of control or user data as the narrowband data.

In some aspects, narrowband processor 8620 may include one or more processors configured to retrieve (e.g., from a local memory) and execute program code that algorithmically defines the transmission processing described herein to generate and transmit the narrowband signals. The program code may be updatable, such as wirelessly or by a manual install. In some aspects, narrowband processor 8620 may also include one or more hardware accelerators configured to perform dedicated processing tasks as part of the narrowband transmission processing. In some aspects, wideband processor 8620 may correspond to a narrowband physical layer and/or protocol stack, where the one or more processors are protocol processors configured to execute protocol stack program code to control the narrowband transmission processing and the hardware accelerators are digital signal processing circuitry for low-level narrowband processing functions. Narrowband processor 8620 may therefore transmit narrowband signals to a counterpart narrowband processor (e.g., narrowband processor 8610 of network access node 8404/terminal device 8506) of another communication device via a logical connection that uses wireless propagation for low-layer transmission. Although shown with a focus on the transmit path in FIG. 86, in some aspects narrowband processor 8620 may also be configured to receive narrowband signals, such as in the manner as described above for narrowband processor 8610 of terminal device 8406.

Wideband processor 8622 may be configured to generate wideband signals from wideband data and provide the wideband signals to RF transceiver 8616 and antenna system 8613 for wireless transmission. Wideband processor 8622 may also be configured to receive wideband signals from RF transceiver 8616 and antenna system 8613, and to process the wideband signals to recover wideband data. In some aspects, wideband processor 8622 may be configured to transmit and receive wideband signals with a different radio communication technology from wideband processor 8608 of terminal device 8406. Accordingly, in some aspects terminal device 8406 and network access node 8404/terminal device 8506 may be configured to operate on different radio communication technologies, which may cause coexistence-related interference to the wideband communication activity of one or both of terminal device 8406 and network access node 8404/terminal device 8506.

In some aspects, wideband processor 8622 may include one or more processors configured to retrieve (e.g., from a local memory) and execute program code that algorithmically defines the transmission and reception processing described herein to transmit and receive wideband signals. The program code may be updatable, such as wirelessly or by a manual install. In some aspects, wideband processor 8622 may also include one or more hardware accelerators configured to perform dedicated processing tasks as part of the reception processing. In some aspects, wideband processor 8622 may correspond to a wideband physical layer and/or protocol stack, where the one or more processors are protocol processors configured to execute protocol stack program code to control the wideband transmission and reception processing and the hardware accelerators are digital signal processing circuitry for low-level wideband processing functions.

In some aspects, coexistence controller 8624 may be configured to generate coexistence information for narrowband processor 8620 to include in the narrowband signals for transmission to terminal device 8406. As indicated above, in some cases wideband processor 8622 may experience coexistence-related interference, where, for example, the wideband signals transmitted by terminal device 8406 may interfere with the wideband signals received by network access node 8404/terminal device 8506. Accordingly, in some aspects wideband processor 8622 may be configured to provide coexistence controller 8624 with time and/or frequency synchronization information, transmission and/or reception schedules, and/or key channel parameters that can be used at terminal device 8406 to coordinate transmission and reception activity to counter coexistence-related interference. In some aspects, coexistence controller 8624 may include one or more processors configured to retrieve (e.g., from a local memory) and execute program code that algorithmically defines the generation of coexistence information. The program code may be updatable, such as wirelessly or by a manual install. In some aspects, coexistence controller 8624 may correspond be a protocol stack component of network access node 8404/terminal device 8506.

Figure 87:
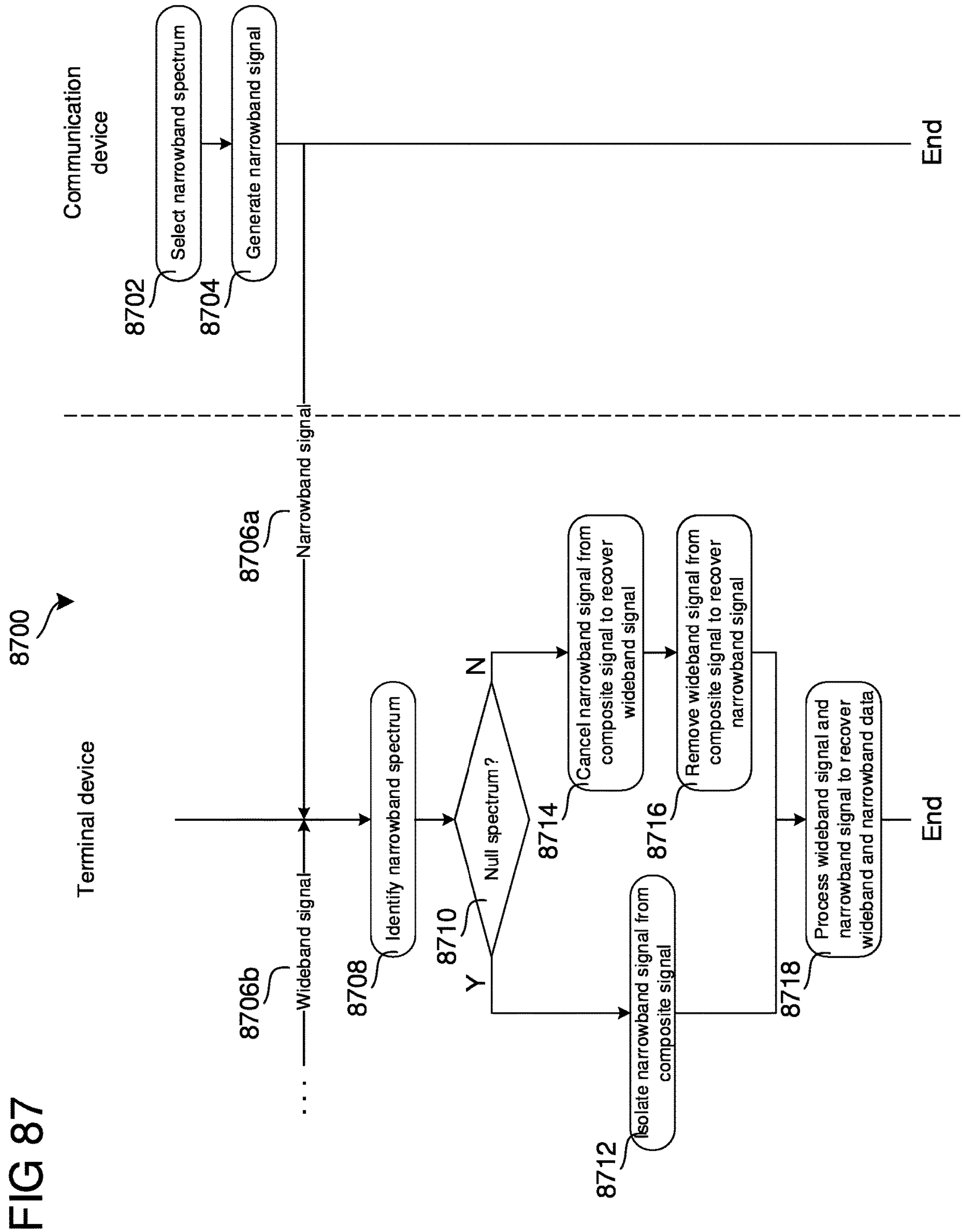
FIG. 87 shows a first exemplary message sequence chart for performing narrowband signal injection between a terminal device and a communication device according to some aspects.

FIG. 87 shows exemplary message sequence chart 8700 describing narrowband signal injection according to some aspects. As shown in FIG. 87, a communication such as network access node 8404 or terminal device 8506 and a terminal device such as terminal device 8406 may use the procedure of message sequence chart 8700 to perform narrowband signal injection.

Network access node 8404/terminal device 8506 may first select narrowband spectrum to use for the narrowband signal in stage 8702. For example, narrowband processor 8620 of network access node 8404/terminal device 8506 may identify subcarriers or a single-carrier subband to use for injecting the narrowband signal into a frequency band of a wideband signal received by terminal device 8406. As the narrowband spectrum will therefore overlap with the wideband signal frequency band, narrowband processor 8620 may be configured to select narrowband spectrum in stage 8702 that avoids interference (in other words minimizes, or results in a manageable amount) to the wideband signal.

Figure 88:
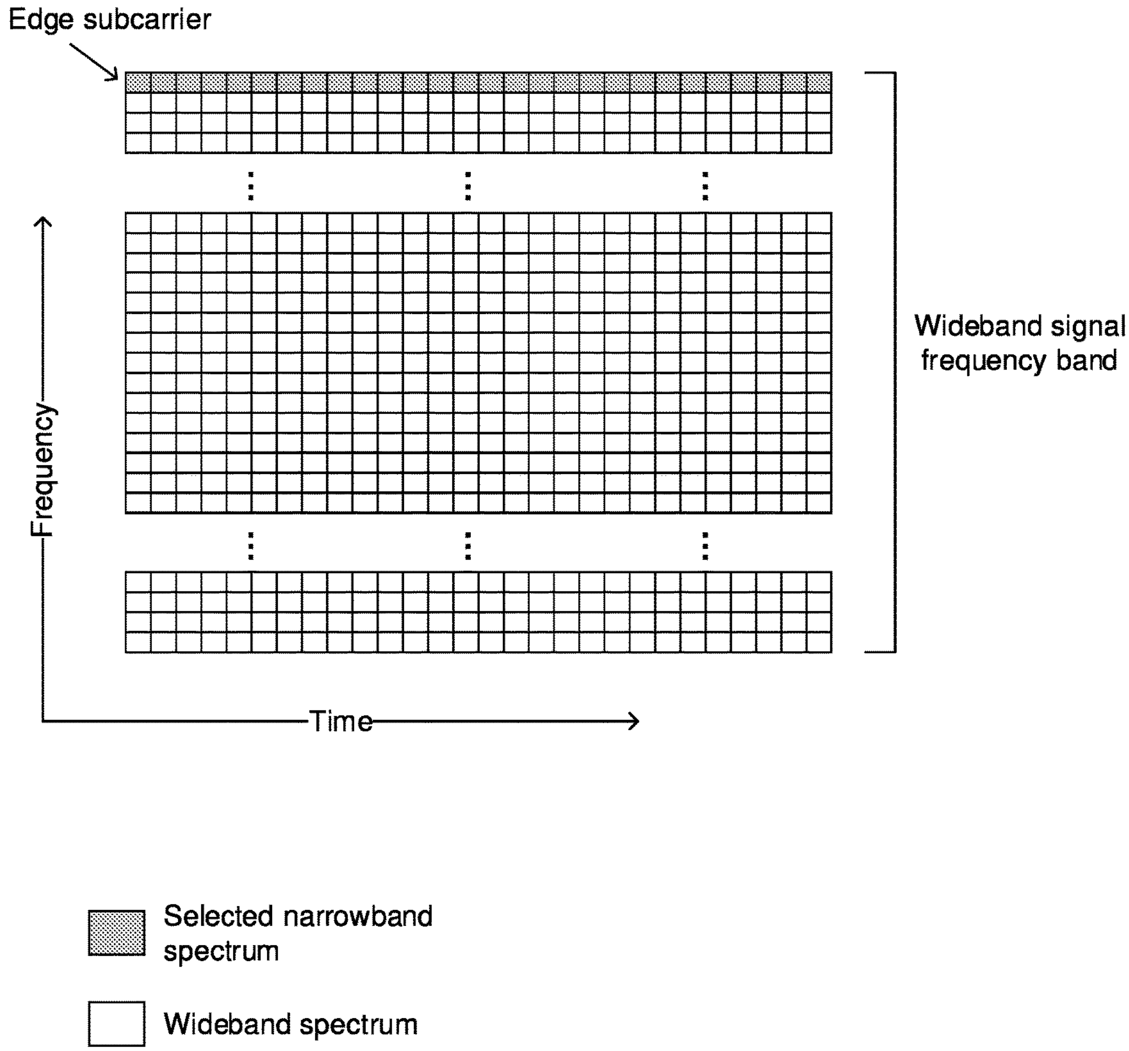
FIG. 88 shows an exemplary resource grid using an edge subcarrier for narrowband signal injection according to some aspects.
Figure 89:
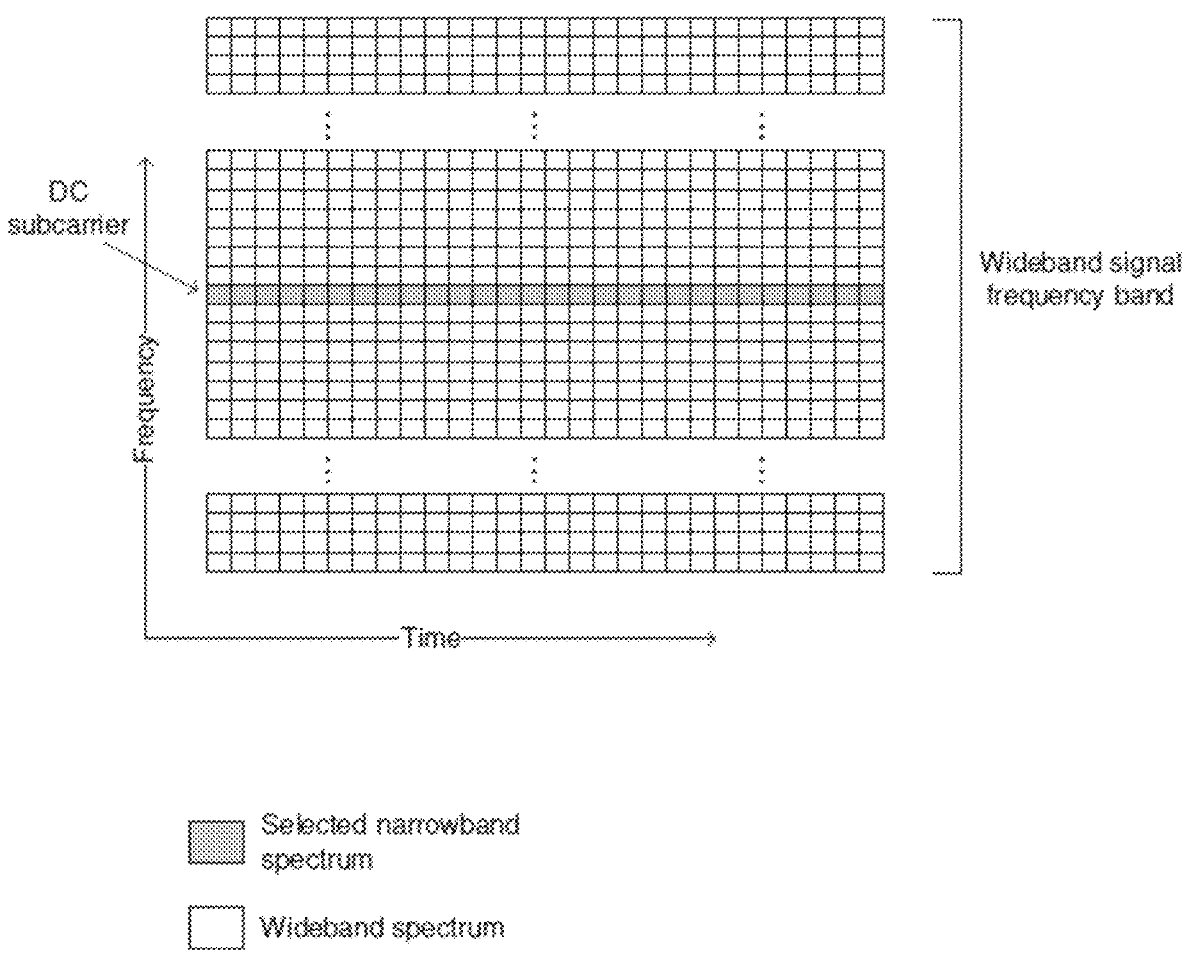
FIG. 89 shows an exemplary resource grid using a DC subcarrier for narrowband signal injection according to some aspects.
Figure 90:
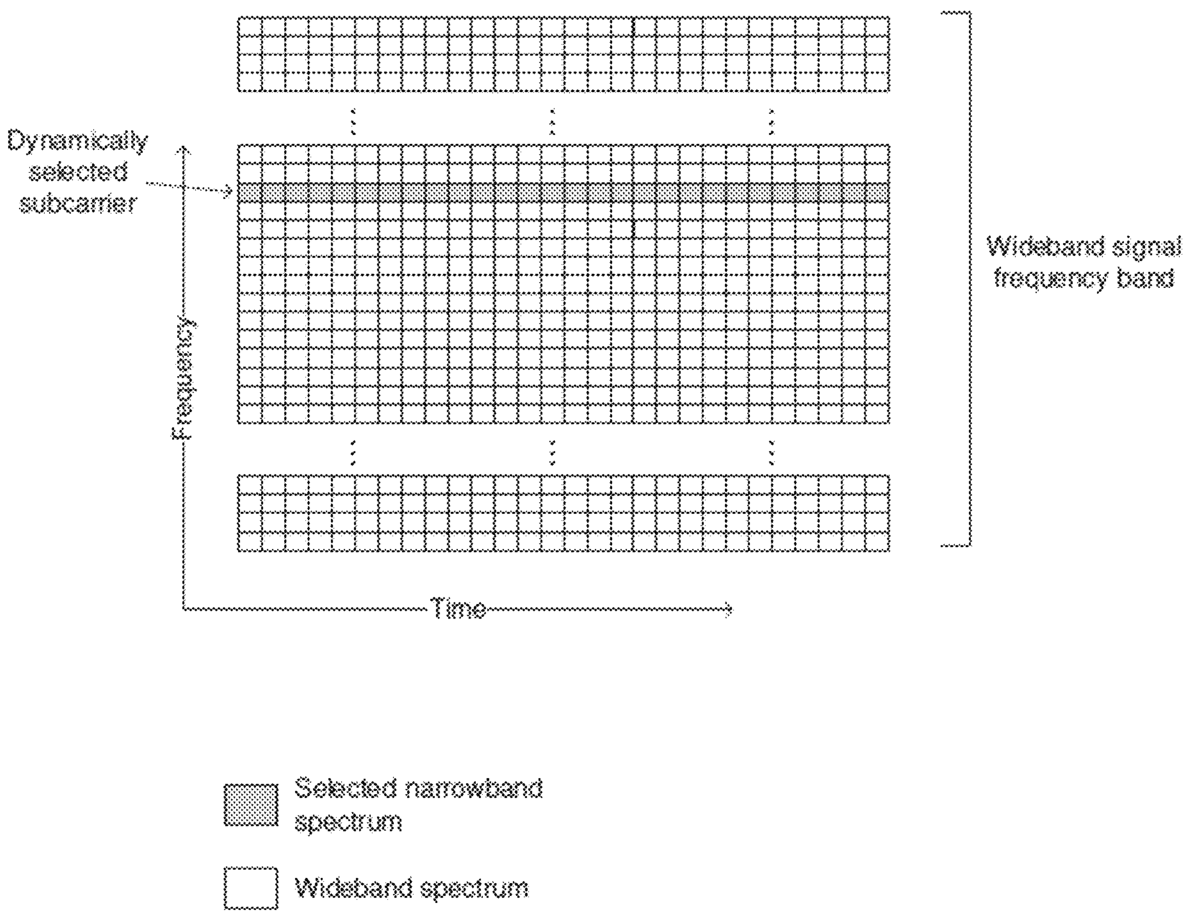
FIG. 90 shows an exemplary resource grid using a dynamically selected subcarrier for narrowband signal injection according to some aspects.

FIGS. 88-90 show several examples of narrowband spectrum selection according to some aspects. While FIGS. 88-90 show examples where the wideband signal is a multi-carrier signal spread over the wideband signal frequency band, in other cases the wideband signal can also be a single-carrier signal spread over the wideband signal frequency band.

In the example of FIG. 88, the wideband signal may be a multi-carrier signal occupying the wideband signal frequency band as shown. Each block shown in FIG. 88 may be a time-frequency resource, such as Resource Element (RE), that occupies a symbol period in time and a subcarrier in frequency. The symbol period and subcarrier spacing may be defined by the radio communication technology used by terminal device 8406 for the wideband signal.

As shown in FIG. 88, narrowband processor 8620 may select a subcarrier on the edge of the wideband signal frequency band, or an edge subcarrier, for the narrowband spectrum in stage 8702. In some cases, edge subcarriers may be less likely to be used as data subcarriers (e.g., a subcarrier carrying control and/or user data), and may avoid interference to the wideband signal if selected for the narrowband spectrum. In some cases, narrowband processor 8620 may not know in advance which subcarriers of the wideband signal will be data subcarriers, and accordingly may select an edge subcarrier for the narrowband spectrum on the basis that edge subcarriers may be less likely to be data subcarriers. In some aspects, narrowband processor 8620 may select more than one edge subcarrier for the narrowband spectrum (e.g., if more narrowband bandwidth is desired). In alternative cases where the wideband signal is a single-carrier signal, narrowband processor 8620 may similarly select an edge subband of the wideband signal frequency band, where the edge subband is, for example, the outer 5% of the wideband signal frequency band on either edge, outer 10%, outer 15%, etc. In various aspects, narrowband processor 8620 may therefore select a single subcarrier, multiple subcarriers (adjacent or separated), and/or a subband (e.g., for spread-spectrum/single-carrier) to use for the narrowband spectrum.

Continuing to the example of FIG. 89, in some aspects narrowband processor 8620 may select a Direct Current (DC) subcarrier as the narrowband spectrum in stage 8702. For example, in some cases the radio communication technology used by terminal device 8406 for wideband signals may use a spectrum allocation scheme that leaves a DC subcarrier unoccupied at the center of the wideband signal frequency band (where, for example, the DC subcarrier is tuned to the carrier frequency when modulated onto an RF carrier signal). As the DC subcarrier is unoccupied, the wireless superposition of the narrowband signal occupying the DC subcarrier onto the wideband signal may avoid interference to the wireless signal. Accordingly, if, for example, an unused DC subcarrier is available (e.g., as in the case of LTE downlink based on OFDMA), narrowband processor 8620 may select the DC subcarrier in stage 8702. In some cases, some spectrum allocation schemes, such as many of those used for single-carrier- and spread spectrum-based radio communication technologies, may not provide a DC subcarrier, in which case narrowband processor 8620 may, for example, choose a different part of the wideband signal frequency band for the narrowband spectrum.

Continuing to the example of FIG. 90, in some aspects narrowband processor 8620 may dynamically select the narrowband spectrum within the wideband signal frequency band. In some aspects, narrowband processor 8620 may use advance knowledge to select the narrowband spectrum. For example, narrowband processor 8620 may have previously received narrowband control data (e.g., as narrowband signals if network access node 8404/terminal device 8506 is configured for bidirectional narrowband signaling) from terminal device 8406 that specifies which spectrum to select (e.g., subcarriers or a specific subband) for the narrowband spectrum. This spectrum can be, for example, null subcarriers and/or unused spectrum that does not carry data in the wideband signal, subcarriers or spectrum that less frequently carry data, subcarriers or spectrum that carries low-priority data, and/or subcarriers or spectrum that carry robustly encoded data. In some aspects, the narrowband control data may, for example, be a reception schedule that specifies the time-frequency resources being used on the downlink signal over an allocation period. Narrowband processor 8620 may therefore identify unused, lightly used, low-priority, and/or robustly encoded spectrum based on the reception schedule and select from this spectrum to obtain the narrowband spectrum.

In another example, narrowband processor 8620 may have previously received narrowband control data (e.g., as narrowband signals) from terminal device 8406 that specifies a channel fading profile of the wideband signal frequency band for terminal device 8406. As the narrowband signal may be sensitive to interference from the wideband signal (such as when the wideband signal is encoded in a robust manner with redundant coding and the narrowband signal is not protected or minimally protected with such coding), selection of spectrum in which the wideband signal experiences deep fading at terminal device 8406 may be able to reduce interference to the narrowband signal. Accordingly, narrowband processor 8620 may be configured to select spectrum of the wideband signal frequency band that the channel fading profile indicates is deep-fading at terminal device 8406 as the narrowband spectrum. In various aspects, narrowband processor 8620 may select a single subcarrier, multiple subcarriers (adjacent or separated), or a subband for use with spread-spectrum/single-carrier for the narrowband spectrum.

In other cases, narrowband processor 8620 may not have advance information from terminal device 8406 to use for selecting the narrowband spectrum. Narrowband processor 8620 may therefore determine the channel fading profile of the wideband signal locally (e.g., as observed at network access node 8404/terminal device 8506, such as by performing radio measurements over the wideband signal frequency band to obtain the channel fading profile), and may then select a subcarrier allocation that maximizes the SINR of the narrowband signal based on the channel fading profile.

While in many cases the narrowband signal will be more susceptible to interference from the wideband signal than the reverse, in some cases the wideband signal may be susceptible to interference to the narrowband signal. In these cases, narrowband processor 8620 may attempt to select unused spectrum, such as DC or null subcarriers, for the narrowband spectrum as previously described in FIGS. 88 and 89.

In some aspects, narrowband processor 8620 may be configured to select narrowband spectrum that overlaps partially but not completely with the wideband spectrum. Accordingly, part of the narrowband signal may overlap with the wideband signal, while part of the narrowband signal does not overlap with the wideband signal.

In some aspects, narrowband processor 8620 may be configured to select narrowband spectrum for multiple narrowband signals. Accordingly, the following description in reference to one narrowband signal may be duplicated to any number of narrowband signals. In some aspects, each narrowband signal may occupy different narrowband spectrum. In some aspects, the multiple narrowband signals may be used to support bi-directional communication paths, such as where a first narrowband signal is for narrowband processor 8620 to transmit on and a second narrowband signal on different narrowband spectrum is for downlink is for narrowband processor 8620 to receive on. In some aspects, the multiple narrowband signals may additionally or alternatively be used for multiple parallel communication paths in the same direction to or from narrowband processor 8620.

Additionally, in some cases network access nodes and/or terminal devices may be configured to broadcast narrowband control data that identifies the narrowband spectrum to use for narrowband signals. Communication devices such as terminal device 8506 may then receive such information from its serving network access node, and use the narrowband control data to select the narrowband spectrum in stage 8702. In some aspects, network access nodes of different radio communication technologies may coordinate with each other to broadcast this narrowband control data and to allocate wideband resources to their client devices that null this spectrum for wideband communications. Accordingly, narrowband processor 8620 may then select the narrowband spectrum based on this narrowband control data. Alternatively, in some aspects network access nodes may broadcast narrowband control data in the form of a radio map (e.g., such as a Radio Environment Map (REM)), which narrowband processor 8620 may receive and use to estimate the channel fading profile at terminal device 8406. Narrowband processor 8620 may then use this estimated channel fading profile to select spectrum of the wideband signal frequency band experiencing deep fading at terminal device 8506 as the narrowband spectrum.

With continued reference to FIG. 87, after selecting the narrowband spectrum, narrowband processor 8620 may generate the narrowband signal on the narrowband spectrum in stage 8704. For example, narrowband processor 8620 may process narrowband data for the narrowband signal according to protocol stack and/or physical layer transmit functions to obtain the narrowband signal (e.g., in the form of baseband samples). This can include mapping the narrowband data onto the subcarriers of the narrowband spectrum (e.g., if using a multi-carrier scheme for the narrowband signal) and/or spreading the narrowband data across a single-carrier subband (e.g., if using a single-carrier scheme for the narrowband signal) to obtain the baseband samples representing the narrowband data.

Narrowband processor 8620 may then transmit the narrowband signal in stage 8706*a*, such as by providing the narrowband signal to RF transceiver 8616 and antenna system 8614 for RF modulation and wireless transmission.

As narrowband processor 8620 may select spectrum from the wideband signal frequency band for the narrowband spectrum in stage 8702, the narrowband signal will therefore be wirelessly superposed onto, or injected into, the wideband signal. As shown in FIG. 87, terminal device 8406 may then wirelessly receive the narrowband signal and wirelessly receive the wideband signal in stages 8706*a* and 8706*b*, respectively, which may occur simultaneously. For example, antenna system 8602 and RF transceiver 8604 may wirelessly receive and process a composite signal including of the wideband signal and narrowband signal on overlapping spectrum (e.g., where the narrowband signal is superposed over part of the wideband signal) to obtain the composite signal as baseband samples. The composite signal may thus occupy the wideband signal frequency band and include the narrowband signal in the narrowband spectrum (which may be a single subcarrier, multiple subcarriers, or a subband). RF transceiver 8604 may then provide the composite signal to wideband processor 8608.

Wideband processor 8608 may then be configured to isolate the narrowband and wideband signals from the composite signal. Accordingly, wideband processor 8608 may identify the narrowband spectrum in stage 8708. In some aspects, wideband processor 8608 may use advance knowledge to identify the narrowband spectrum. For example, terminal device 8406 may have previously received narrowband control data from network access node 8404/terminal device 8506 that specifies the narrowband spectrum, such as via exchange of high-layer and/or semi-static messages that coordinate the subcarrier allocation. In some aspects, terminal device 8406 may have previously received this narrowband control data from network access node 8404/terminal device 8506 in the form of narrowband signals. This narrowband control data can specify, for example, the starting frame and/or subframe index for the narrowband signal, the length of the narrowband signal, the subcarrier index of narrowband signal, and/or the periodicity of the narrowband signal. Wideband processor 8608 may therefore have advance information that identifies (e.g., explicitly and/or implicitly) the narrowband spectrum containing the narrowband signal. In another example, terminal device 8406 may have previously transmitted narrowband control data (e.g., as narrowband signals) instructing network access node 8404/terminal device 8506 which spectrum to use for the narrowband spectrum. Wideband processor 8608 may then assume that the narrowband signal is on this spectrum, and identify this spectrum as the narrowband spectrum in stage 8708.

In some aspects, wideband processor 8608 may not have advance information that explicitly identifies the narrowband spectrum, and may be configured to detect the narrowband spectrum in stage 8708. For example, the narrowband signals may have a predefined signal format that includes an identifying sequence (e.g., any uniquely identifying data sequence, which, for example, can be predefined or pseudo-random and may be included in a preamble) that advance information at both terminal device 8406 and network access node 8404/terminal device 8506. Accordingly, when generating the narrowband signal in stage 8704, narrowband processor 8620 of network access node 8404/terminal device 8506 may generate the narrowband signal to include the identifying sequence. Accordingly, when identifying the narrowband spectrum in stage 8708, wideband processor 8608 of terminal device 8406 may process the composite signal at each subcarrier (e.g., if the narrowband signal is a single subcarrier or multi-subcarriers) or at different subbands (e.g., if the narrowband signal is single-carrier) to detect whether the subcarrier or subband contains the identifying sequence. As wideband processor 8608 may search for the identifying sequence in the composite signal, this can be referred to as blind detection. In some aspects, wideband processor 8608 may be configured to calculate the cross-correlation between the identifying sequence and the composite signal to determine whether a cross-correlation peak exceeding a threshold occurs and, if so, concluding that the composite signal contains the narrowband signal. If wideband processor 8608 detects the identifying sequence at a subcarrier, group of subcarriers, or subband, wideband processor 8608 may identify the narrowband spectrum as the subcarrier, group of subcarriers, or subband. If wideband processor 8608 detects the identifying sequence at a subcarrier, group of subcarriers, or subband, wideband processor 8608 may conclude that the narrowband signal is not present and may end the procedure. In some aspects, wideband processor 8608 may perform this blind detection over a window of the composite signal to detect the narrowband spectrum, and may then process each symbol period individually.

In some aspects, wideband processor 8608 may focus this narrowband signal detection on certain spectrum. For example, wideband processor 8608 may identify edge subcarriers and/or DC subcarriers of the wideband signal frequency band as detection candidates, and may process the composite signal these detection candidates to search for the identifying sequence on the detection candidates. In some aspects, network access node 8404/terminal device 8506 may have previously received narrowband control data that specifies a channel fading profile of the wideband signal from terminal device 8406, or narrowband control data that specifies spectrum to use for the narrowband spectrum. Wideband processor 8608 may then be configured to select spectrum (subcarriers or subbands) where there is deep fading, or spectrum as specified in the narrowband control data, as detection candidates, and may then search the detection candidates the identifying sequence.

After identifying the narrowband spectrum (if any) in stage 8708, wideband processor 8608 may determine whether the narrowband spectrum is null (unused) spectrum in stage 8708. For example, wideband processor 8608 may have a reception schedule (e.g., received from a serving network access node) that specifies the data carried on the subcarriers of the wideband signal frequency band. Wideband processor 8608 may thus determine whether the narrowband spectrum overlaps with data subcarriers of the wideband signal based on the reception schedule in stage 8710.

In some aspects, wideband processor 8608 may perform the procedure of FIG. 87 repeatedly (e.g., continuously over a time period or intermittently). As the data carried on each subcarrier may vary over time (e.g., as reflected in the reception schedule for each of a sequence of allocation periods), wideband processor 8608 may determine that the narrowband spectrum overlaps with data subcarriers of the wideband signal during some time periods and does not overlap with data subcarriers on other time periods (in other words, falls on a null subcarrier). Wideband processor 8608 may therefore alternate between proceeding to stage 8712 or stage 8714 over time depending on the narrowband spectrum (which may also change) and the data subcarriers at each point in time. In some aspects, wideband processor 8608 may perform this on a per-symbol basis, and may process each symbol period of the composite signal based on whether the narrowband signal overlaps with a data subcarrier or null subcarrier during that symbol period.

Figure 91:
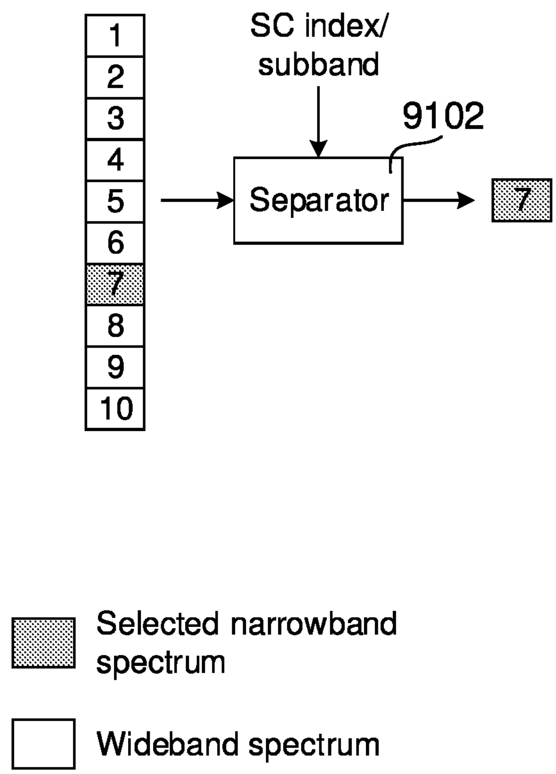
FIG. 91 shows a separator for separating a narrowband signal on a null subcarrier from a wideband signal according to some aspects.

Wideband processor 8608 may proceed to stage 8712 if the narrowband spectrum is null spectrum, and may proceed to stage 8716 if the narrowband spectrum is not null spectrum. As shown in FIG. 87, if, for example, the narrowband spectrum is null spectrum, wideband processor 8608 may isolate the narrowband signal from the composite signal in stage 8712. FIG. 91 shows an example according to some aspects where wideband processor 8608 may include separator 9102. Separator 9102 may, for example, be a processor included as part of wideband processor 8608, a subroutine executed by wideband processor 8608, or dedicated hardware circuitry of wideband processor 8608. In some aspects, separator 9102 may not be part of wideband processor 8608, and may instead be placed as a separate component between RF transceiver 8604 and wideband processor 8608 and narrowband processor 8610. Separator 9102 may be configured to separate the wideband and narrowband signals from the composite signal, and provide the wideband and narrowband signals to wideband processor 8608 and narrowband processor 8610, respectively. Accordingly, in some aspects the narrowband signal may not pass through wideband processor 8608.

As shown in FIG. 91, separator 9102 may receive the composite signal, which may be in the form of baseband samples on respective subcarriers over the duration of a symbol period. Wideband processor 8608 may provide the subcarrier index (or, e.g., identify the subband) of the narrowband spectrum to separator 9102, which may then select the subcarriers and/or subband of the composite signal and provide this isolated signal as output. While the example of FIG. 91 shows the narrowband signal superposed onto null subcarrier index 7 of the wideband signal, in other examples the narrowband signal can be superposed onto a null DC subcarrier and/or subband, a null edge subcarrier and/or subband, and/or another null subcarrier and/or subband of the wideband signal (e.g., where null subcarriers and subbands are still included in the 'wideband signal frequency band' even if not currently carrying data).

In the example shown in FIG. 91, the narrowband spectrum may be on, for example, subcarrier index 7, and separator 9102 may select the baseband sample of the composite signal appearing on subcarrier index 7 and pass this baseband sample as the isolated signal as its output. As the narrowband signal may be continuously or intermittently spread across a sequence of symbol periods, separator 9102 may repeat this procedure to provide a sequence of baseband samples that compose the narrowband signal in time. Separator 9102 may similarly isolate other subcarriers, multiple subcarriers, or a subband based on the narrowband spectrum.

As the narrowband spectrum is null spectrum, the isolated signal produced by separator 9102 will be the narrowband signal. Accordingly, separator 9102 may provide the narrowband signal to narrowband processor 8610. As the narrowband spectrum is null spectrum, in some aspects wideband processor 8608 may be configured to ignore the null spectrum during subsequent processing of the wideband signal to recover the wideband data. Separator 9102 may therefore not need to isolate the wideband signal from the composite signal, as wideband processor 8608 may recover the wideband data from the composite signal while ignoring the null spectrum containing the narrowband signal. In other aspects, separator 9102 may be configured to isolate the remaining subcarriers of the composite signal as the wideband signal and provide the resulting wideband signal (e.g., with the narrowband signal removed) to wideband processor 8608.

Wideband processor 8608 may then process the wideband signal to recover the wideband data and narrowband processor 8610 may process the narrowband signal to recover the narrowband data in stage 8718. In some aspects, the narrowband signal may be in a predefined format, and accordingly narrowband processor 8610 may process the wideband signal according to the predefined format to revert the wideband signal generation by narrowband processor 8620 of network access node 8404/terminal device 8506 in stage 8702. In some aspects, the narrowband signal may be eligible to be in several different formats. Narrowband processor 8620 of network access node 8404/terminal device 8506 may therefore be configured to select any of the different formats (e.g., in an ad-hoc manner, such as based on supported data rate, security, latency, or reliability of the different formats and the characteristics of the narrowband data) to generate the narrowband signal. In some aspects, narrowband processor 8620 may indicate the format in a header, which may enable narrowband processor 8610 on the receiving end to determine which format to use to decode the narrowband signal. In other aspects, narrowband processor 8620 may not indicate the format, and narrowband processor 8610 may be configured to attempt decoding of the narrowband signal using the different formats to determine which produces a successful decode.

Returning back to stage 8710, wideband processor 8608 may proceed to stage 8714 if the narrowband spectrum is not null spectrum. Accordingly, the narrowband signal may occupy data subcarriers (or, e.g., a subband that carries data if the wideband signal is single-carrier) of the wideband signal. Wideband processor 8608 may therefore cancel the narrowband signal from the composite signal to recover the wideband signal in stage 8714, and remove the wideband signal from the composite signal to recover the narrowband signal in stage 8716.

Figure 92:
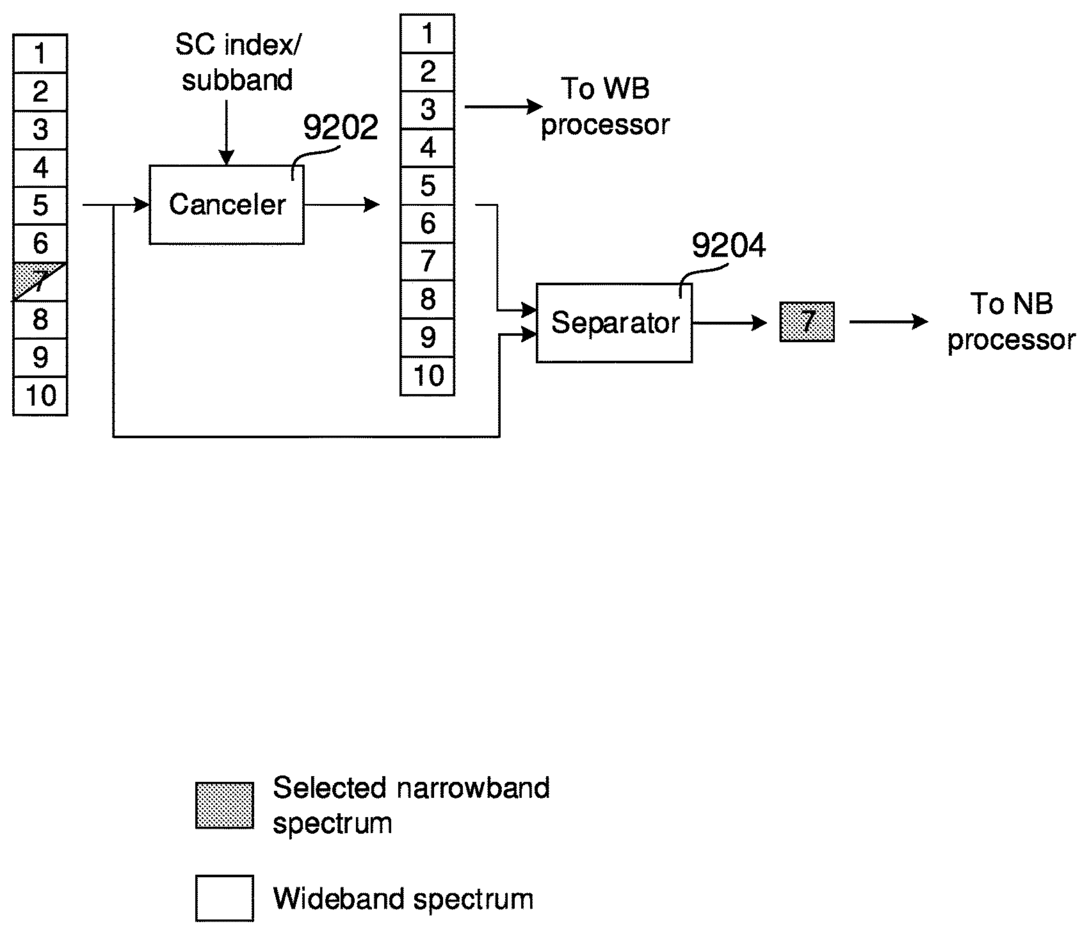
FIG. 92 shows a canceler and separator for isolating a narrowband signal on used spectrum from a wideband signal according to some aspects.

FIG. 92 shows an example according to some aspects where wideband processor 8608 may include canceler 9202 and separator 9204. Canceler 9202 and separator 9204 may, for example, be processors included as part of wideband processor 8608, subroutines executed by wideband processor 8608, and/or dedicated hardware circuitry of wideband processor 8608, and may be configured to execute program code or configured with digital logic that algorithmically defines their functionality described herein. In other aspects, canceler 9202 and separator 9204 may not be part of wideband processor, and may be placed between RF transceiver 8604 and communication arrangement 8606. Canceler 9202 and separator 9204 may perform their functionality as described below, and provide the resulting wideband and narrowband signals to wideband processor 8608 and narrowband processor 8610, respectively. In some aspects, canceler 9202 and separator 9204 may transfer data back and forth with wideband processor 8608 and narrowband processor 8610 as part of the separation, such as when using SIC or another iterative process where wideband processor 8608 and narrowband processor 8610 perform decoding on the narrowband and wideband signals as part of the separation. The narrowband signal may thus in some aspects not pass through wideband processor 8608, and may be separated by another component before being provided to narrowband processor 8610.

As shown in FIG. 92, canceler 9202 may receive the composite signal, which includes the wideband signal and the narrowband signal superposed on part of the wideband signal frequency band. Although the example of FIG. 92 depicts the narrowband signal superposed onto subcarrier index 7 of the wideband signal, in other examples the narrowband signal can be superposed onto a DC subcarrier and/or subband, an edge subcarrier and/or subband, and/or another subcarrier and/or subband of the wideband signal.

Canceler 9202 may also receive the subcarrier index and/or subband of the narrowband spectrum from wideband processor 8608. Canceler 9202 may then perform interference cancelation to remove the narrowband signal from the wideband signal. In some aspects, such as where the narrowband spectrum is a single or several subcarriers, the narrowband signal may appear as spurious interference (e.g., interference shaped as a steep spur or spike that impacts only a narrow spectral band) to the wideband signal. Accordingly, canceler 9202 may be configured to perform spurious interference mitigation to remove partially or fully the spurious interference/narrowband signal from the wideband signal. As shown in FIG. 92, canceler 9202 may thus recover the wideband signal from the composite signal in stage 8714, where the wideband signal may be largely free of interference from the narrowband signal (e.g., only minor uncanceled residue from the narrowband signal may remain). Canceler 9202 may then provide the wideband signal to wideband processor 8608 for processing and recovery of the wideband data in stage 8718.

Canceler 9202 may also provide the wideband signal to separator 9204, which may also receive the composite signal (e.g., still containing the uncanceled narrowband signal) from wideband processor 8608. Separator 9204 may then subtract the wideband signal from the composite signal in stage 8716 to recover the narrowband signal, which separator 9204 may then provide the narrowband processor 8610 for processing and recovery of the narrowband data in stage 8718.

In some aspects, canceler 9202 and separator 9204 may perform Successive Interference Cancellation (SIC) in stages 8714 and 8716. For example, the composite signal Y can be mathematically expressed as $$Y=X_{NB}*H_{NB}+X_{WB}(c)*H_{WB}(c) \quad (1)$$

where $X_{NB}$ is the frequency-domain narrowband signal (occupying subcarrier c of the wideband signal), $H_{NB}$ is the frequency-domain channel for the narrowband signal, $X_{WB}(c)$ is the frequency-domain wideband signal at subcarrier c, and $H_{WB}(c)$ is the frequency-domain channel for the wideband channel at subcarrier c. Although expressed for a single subcarrier case in Equation (1) and the following description, equivalent algorithmic logic applies for multiple subcarrier and subband cases. Furthermore, while the below example refers to processing in a single symbol period, wideband processor 8608 may be configured to perform this processing over each of a sequence of symbol periods to recover the wideband and narrowband symbols at each symbol period.

Wideband processor 8608 may then be configured to use pilot symbols (e.g., Cell-specific Reference Signals (CRSs) in LTE or similar predefined pilot symbols usable for channel estimation) that are distributed over time and frequency of the wideband signal (e.g., as defined by the wideband radio communication technology) to obtain raw a channel sample $\tilde{H}_{WB}(c)$ that approximates the actual narrowband channel $H_{WB}(c)$. For example, if pilot symbols appear on subcarriers c+1 and c−1 in the current symbol period being processed, wideband processor 8608 may compare the received pilot symbols with the original predefined pilot symbols to obtain raw channel samples $\tilde{H}_{WB}(c+1)$ and $\tilde{H}_{WB}(c-1)$. Wideband processor may then interpolate $\tilde{H}_{WB}(c+1)$ and $\tilde{H}_{WB}(c-1)$ to obtain the raw channel sample $\tilde{H}_{WB}(c)$ at subcarrier c. Wideband processor 8608 may similarly use interpolation to obtain $\tilde{H}_{WB}(c)$ from pilot symbols received on subcarriers other than the immediately adjacent c+1 and c−1 subcarriers. Wideband processor 8608 can also incorporate time interpolation (e.g., in addition to frequency interpolation) if the pilot symbols appear in symbol periods other than the current symbol period to obtain the raw channel sample $\tilde{H}_{WB}(c)$.

Wideband processor 8608 may provide $\tilde{H}_{WB}(c)$ to canceler 9202. Canceler 9202 may then treat the received narrowband signal $X_{NB}*H_{NB}$ (the narrowband symbol $X_{NB}$ as manipulated by the narrowband channel $H_{NB}$) as interference, and may perform spurious interference mitigation to remove $X_{NB}*H_{NB}$ from composite signal Y. Now having $X_{WB}(c)*H_{WB}(c)$ remaining from Y, canceler 9202 may use $\tilde{H}_{WB}(c)$ to equalize $X_{WB}(c)*H_{WB}(c)$ to recover the wideband sample $X_{WB}(c)$ (with some leftover residue from imperfect estimation of $\tilde{H}_{WB}(c)$). Canceler 9202 may then provide $X_{WB}(c)$ to separator 9204.

Separator 9204 may then decode $X_{WB}(c)$ to obtain the wideband data (or may, e.g., provide $X_{WB}(c)$ to wideband processor 8608 for decoding and recovery of the wideband data for part of stage 8718) as part of stage 8716, which can include using the redundant channel coding of the wideband signal for error-correction. The resulting wideband data may therefore correct for some wireless propagation errors. Separator 9204 may then reconstruct $X_{WB}(c)$ at the channel level by re-encoding the error-corrected wideband data to obtain error-corrected wideband sample $\hat{X}_{WB}(c)$. Separator 9204 may then apply $\tilde{H}_{WB}(c)$ to $\hat{X}_{WB}(c)$ to obtain $\hat{X}_{WB}(c)*\tilde{H}_{WB}(c)$.

Separator 9204 may then subtract the reconstructed wideband signal $\hat{X}_{WB}(c)*\tilde{H}_{WB}(c)$ from composite signal Y to remove the wideband signal from Y, and may thus recover the narrowband signal $X_{NB}*H_{NB}$. In some aspects, separator 9204 may also perform channel equalization on $X_{NB}*H_{NB}$ to remove $H_{NB}$, such as by using pilot symbols inserted into the narrowband signal during generation (e.g., by narrowband processor 8620 at network access node 8404/terminal device 8506).

Separator 9204 may therefore recover the narrowband signal at the output of stage 8716, while the wideband signal may have already been recovered by canceler 9202 at stage 8714. In some aspects, canceler 9202 and separator 9204 may perform multiple SIC iterations, such as by decoding the narrowband signal to recover the narrowband data (and using any redundant coding for error correction, which may be performed by narrowband processor 8610), reconstructing the narrowband signal at the channel level, subtracting the reconstructed narrowband signal from composite signal Y to isolate the wideband signal, and re-decoding the wideband signal to recover the wideband data. Additional SIC iterations may improve the accuracy of the recovered wideband and narrowband data.

Accordingly, wideband processor 8608 may obtain the recovered wideband data and narrowband processor 8610 may obtain the recovered narrowband data in stage 8718. As the SIC procedure by canceler 9202 and separator 9208 may include decoding and recovering the wideband and narrowband data as part of each SIC iteration, stages 8714-8718 may or may not be performed in a strictly sequential order, and are only depicted as such for simplicity. Furthermore, in some aspects wideband processor 8608 may not identify the narrowband spectrum until the narrowband signal has been isolated from the composite signal. For example, wideband processor 8608 may first isolate candidate narrowband signals from the composite signal using canceler 9202 and separator 9204 (e.g., using certain subcarriers of the narrowband signal as detection candidates), and may then attempt to detect the identifying sequence of the narrowband signal in each candidate narrowband signal. Accordingly, in some aspects wideband processor 8608 may not identify the narrowband spectrum until the narrowband signal has been isolated from the wideband signal. This may be applicable where wideband processor 8608 does not have advance information (such as narrowband control data) that identifies the narrowband spectrum, or where detection of the identifying sequence is prohibitively difficult when the wideband signal is present (although in other cases, detection of the identifying sequence may be possible even in the presence of the wideband signal).

In an exemplary variation of message sequence chart 8700, wideband processor 8608 may not determine whether the narrowband spectrum is null spectrum in stage 8710 and perform stage 8712, and may instead perform the cancelation and removal procedure of stages 8714 and 8716 regardless of whether the narrowband spectrum is null spectrum. In some aspects, wideband processor 8608 may perform this variation when the narrowband signal alternates between being null spectrum and data spectrum over time.

Figure 93:
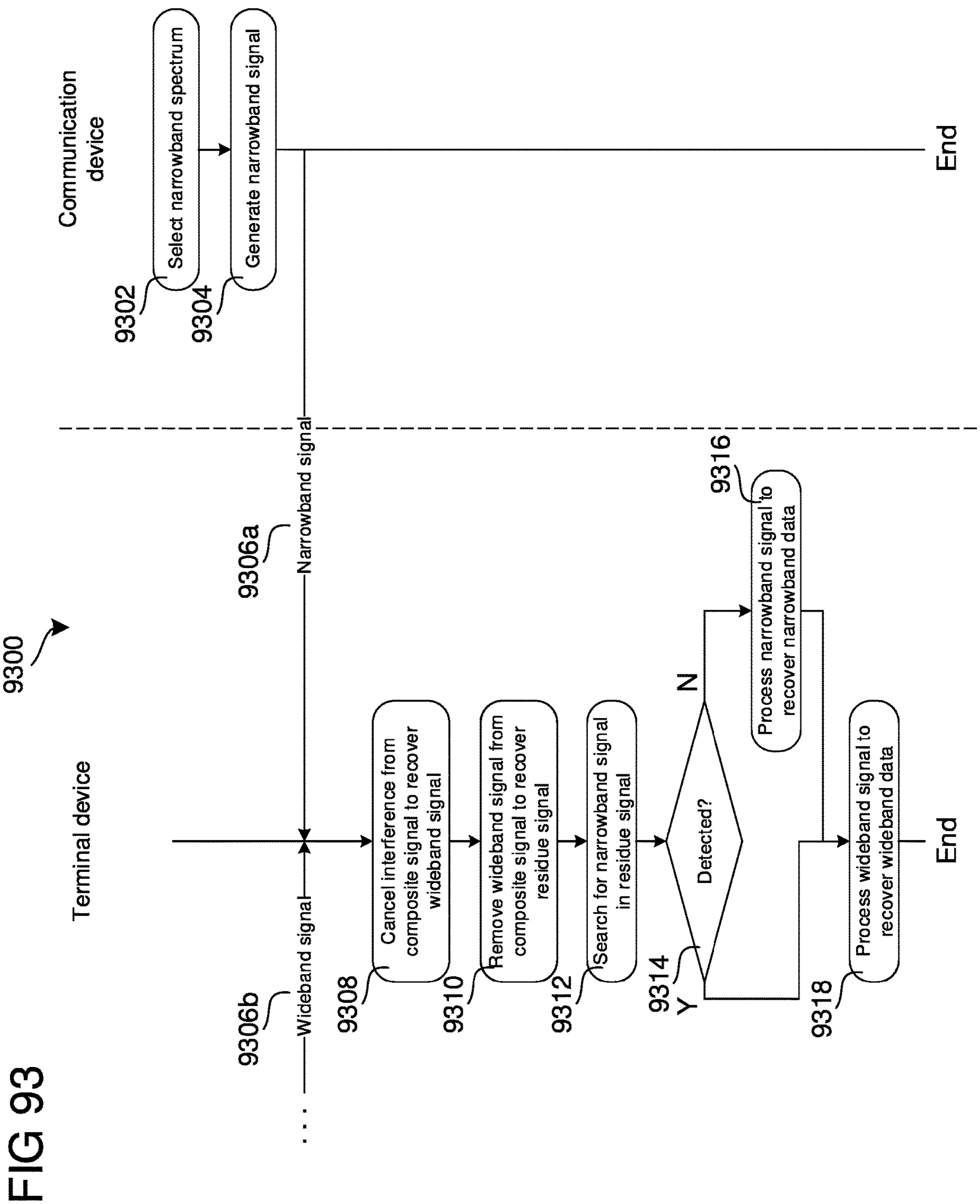
FIG. 93 shows a second exemplary message sequence chart for performing narrowband signal injection between a terminal device and a communication device according to some aspects.

FIG. 93 shows exemplary message sequence chart 9300 according to some aspects. Message sequence chart 9300 provides a variation on message sequence chart 8700 with which terminal device 8406 may recover narrowband and wideband data from a received composite signal.

As shown in FIG. 93, network access node 8404/terminal device 8506 and terminal device 8406 may perform stages 9302-9306*b* in the same manner as stages 8702-8706*b* in FIG. 87. However, instead of identifying the narrowband spectrum as in stage 8708, wideband processor 8608 of terminal device 8406 may proceed directly to canceling interference from the composite signal to recover the wideband signal in stage 9308. Accordingly, instead of identifying the narrowband spectrum as in message sequence chart 8700, wideband processor 8608 may first cancel any potential narrowband signal from the composite signal to obtain the wideband signal, and may then isolate the wideband signal and a residue signal that may contain the narrowband signal. Wideband processor 8608 may then search the residue signal to determine if the narrowband signal is in the residue signal and, if so, may provide the narrowband signal to narrowband processor 8610 for recovery of the narrowband data from the narrowband signal. Wideband processor 8608 may then process the wideband signal to recover the wideband data.

Accordingly, wideband processor 8608 may cancel interference from the composite signal to recover the wideband signal in stage 9308 in the same manner as in stage 8708, such as by using canceler 9202 to apply spurious interference mitigation to remove spurious interference from the composite signal. Wideband processor 8608 may then remove the wideband signal from the composite signal to recover a residue signal in stage 9310, such as by decoding, error-correcting, and reconstructing the wideband signal at the channel level, and using canceler 9202 to remove the reconstructed wideband signal from the composite signal. The leftover signal may thus be a residue signal that potentially contains a narrowband signal.

Wideband processor 8608 may then search for the narrowband signal in the residue signal in stage 9312, such as by using blind detection to search for an identifying sequence of the narrowband signal within the residue signal. This can include searching each of a set of subcarriers or subbands as detection candidates, such as with a cross-correlation calculation, to determine whether the identifying sequence is contained in the residue signal.

If wideband processor 8608 does not detect the identifying sequence in stage 9314, wideband processor 8608 may proceed to stage 9318 to process the wideband signal to recover the wideband data. If wideband processor 8608 detects the identifying sequence, wideband processor 8608 may conclude that the residue signal contains the narrowband signal and may provide the residue signal/narrowband signal to narrowband processor 8610. Narrowband processor 8610 may then process the residue signal/narrowband signal (where the residue signal may equal the narrowband signal) to recover the narrowband data in stage 9316. Wideband processor 8608 may similarly process the wideband signal to recover the wideband data in stage 9318. In some aspects, narrowband processor 8610 may reconstruct the narrowband signal at the channel level after decoding and error-correcting the narrowband data. Canceler 9202 and separator 9204 may then subtract the reconstructed narrowband signal from the composite signal to again isolate the wideband signal, and may continue to alternate between decoding, error-correcting, reconstructing, and removing the wideband signal and the narrowband signal from the composite signal as part of SIC.

In various aspects, the wideband data may be user and/or control data for the wideband connection between wideband processor 8608 and the serving network access node of terminal device 8406 (e.g., network access node 8402 in the context of FIG. 84). The narrowband data obtained at narrowband processor 8610 may be any type of user and/or control data.

In some aspects, some of the narrowband data may be narrowband control data used for supporting the narrowband connection between narrowband processor 8610 of terminal device 8406 and narrowband processor 8620 of network access node 8404/terminal device 8506. For example, as previously indicated narrowband processor 8620 may include narrowband control data in the narrowband signal that identifies the narrowband spectrum, which narrowband processor 8610 may receive and use in stage 8708 to identify the narrowband spectrum. This narrowband control data may, e.g., refer to an upcoming time period, and narrowband processor 8610 may therefore use the narrowband control data to receive the narrowband signals (e.g., part of stage 8708) in the upcoming time period. In bi-directional narrowband communication cases, such as where terminal device 8406 is transmitting narrowband signals to network access node 8404/terminal device 8506, the narrowband control data received at terminal device 8406 from network access node 8404/terminal device 8506 may identify null subcarriers of the wideband signal for network access node 8404/terminal device 8506, or may be a channel fading profile of the wideband signal for network access node 8404/terminal device 8506. Narrowband processor 8610 may then use this narrowband control data to select the narrowband spectrum (e.g., in the manner described above for narrowband processor 8620 in stage 8702).

In some aspects, the narrowband data can include coexistence information provided by coexistence controller 8624 of network access node 8404/terminal device 8506. As shown in FIG. 86, narrowband processor 8610 may identify this narrowband data as coexistence information and provide the coexistence information to coexistence controller 8612. Coexistence controller 8612 may then provide control signaling to wideband processor 8608 and/or narrowband processor 8610 to coordinate the communication activity of terminal device 8406 with the communication activity of network access node 8404/terminal device 8506.

For example, in some aspects the narrowband signal may contain a synchronization pilot for time and/or frequency coordination (and, optionally, also for channel estimation used in narrowband channel equalization). For example, coexistence controller 8624 may provide the synchronization pilot to narrowband processor 8620 of network access node 8404/terminal device 8506, which may then include the synchronization pilot when generating the narrowband signal in stage 8704. Terminal device 8406 may then receive the synchronization pilot as part of the narrowband signal, which narrowband processor 8610 may identify and process to obtain time and/or frequency synchronization information for network access node 8404/terminal device 8506. Narrowband processor 8610 may provide the time and/or frequency synchronization information as coexistence information to coexistence controller 8612, which may then be able synchronize wideband and/or narrowband transmissions by terminal device 8406 in time (e.g., by synchronizing frames in time) and/or in frequency (e.g., by matching/tuning carrier frequencies). For example, coexistence controller 8612 may identify a time reference point for synchronizing wideband communications with network access node 8404/terminal device 8506, and may provide the time reference point to wideband processor 8608 for wideband processor 8608 to adjust its transmission or reception timing to synchronize with the transmission or reception timing of network access node 8404/terminal device 8506. In another example, coexistence controller 8612 can precisely identify the carrier frequency used by network access node 8404/terminal device 8506, and may provide the carrier frequency to wideband processor 8608 for wideband processor 8608 to use for adjusting the carrier frequency used for RF transmission of the wideband signals from terminal device 8406 to synchronize with the carrier frequency used for RF transmission of the wideband signals from network access node 8404/terminal device 8506 (where, for example, wideband processor 8608 may control RF transceiver 8604 to adjust its RF modulation frequency).

In some aspects, the coexistence information in the narrowband data may include key channel parameters such as a transmission/reception schedule of network access node 8404/terminal device 8506. The transmission/reception schedule may specify when, and on what spectrum, network access node 8404/terminal device 8506 is scheduled to transmit and/or receive. As shown in FIG. 86, wideband processor 8622 of network access node 8404/terminal device 8506 may provide its transmission/reception schedule (e.g., for an upcoming period of time) to coexistence controller 8624, which may provide the transmission/reception schedule to narrowband processor 8620 for narrowband processor 8620 to include as narrowband data in the narrowband signal.

After receipt of the narrowband signal and recovery of the narrowband data, narrowband processor 8610 may provide the narrowband data to coexistence controller 8612, which may identify the transmission/reception schedule. Coexistence controller 8612 may then provide control signaling to wideband processor 8608 that instructs wideband processor 8608 to avoid transmitting during scheduled reception (as indicated by the transmission/reception schedule) of network access node 8404/terminal device 8506, to avoid receiving during scheduled transmission of network access node 8404/terminal device 8506, and/or to transmit during scheduled transmission of network access node 8404/terminal device 8506. For example, if wideband processor 8608 of terminal device 8406 and wideband processor 8622 of network access node 8404/terminal device 8506 may operate with different radio communication technologies (e.g., LTE vs. WiFi, or LTE V2V/V2X vs. DSRC) that are overlapping or neighboring (e.g., close in frequency enough to cause noticeable interference), overlapping transmissions with receptions may cause coexistence-related interference. Accordingly, by avoiding overlapping transmissions with receptions and/or transmitting at the same time, terminal device 8406 and network access node 8404/terminal device 8506 may be able to avoid or reduce coexistence-related interference. Wideband processor 8608 may then follow the instructions by coexistence controller 8612 (derived from the transmission/reception schedule in the coexistence information) to control its transmission and/or reception schedule to avoid interfering conflicts (e.g., overlapping transmissions with receptions) with the transmissions and receptions of network access node 8404/terminal device 8506. In some aspects, coexistence controller 8612 may also identify certain subcarriers and/or subbands that will experience interference from and/or will cause interference to network access node 8404/terminal device 8506 based on the transmission/reception schedule. Coexistence controller 8612 may then instruct wideband processor 8608 to avoid transmission and/or reception on these subcarriers and/or subbands (optionally also during certain time periods that have interfering conflicts on these sub carriers and/or subbands).

In some aspects, coexistence controller 8612 may use time and/or frequency synchronization information and transmission/reception schedules in the coexistence information to generate the control signaling for wideband processor 8608. For example, coexistence controller 8612 may use a time reference point derived from the time and/or frequency synchronization information to generate control signaling for wideband processor 8608 that instructs wideband processor 8608 to perform (or avoid) a transmission or to perform (or avoid a reception) at a specific time point based on the time reference point. In some aspects, coexistence controller 8612 may instruct wideband processor 8608 to update its current timing reference based on the time reference point, and/or to update its carrier frequency based on the identified carrier frequency. Wideband processor 8608 may then use the updated timing reference and/or updated carrier frequency when following subsequent instructions by coexistence controller 8612 to perform (or avoid) a transmission or to perform (or avoid a reception) at a specific time point or on a specific subcarrier or subband. As wideband processor 8608 may be synchronized in time and/or frequency with network access node 8404/terminal device 8506, this can in some cases increase the efficacy of the coordination and reduce or avoid coexistence-related interference.

In some aspects, the narrowband data may include key channel parameters such as channel estimates. For example, wideband processor 8622 of network access node 8404/terminal device 8506 have previously performed channel estimates, and may provide the channel estimates to coexistence controller 8624. Coexistence controller 8624 may provide the channel estimates to narrowband processor 8620 for inclusion as coexistence information in the narrowband data.

After reception of the narrowband signal and recovery of the narrowband data, narrowband processor 8610 of terminal device 8406 may provide the coexistence information to coexistence controller 8612. Coexistence controller 8612 may identify the channel estimates and provide the channel estimates to wideband processor 8608. Wideband processor 8608 may then use the channel estimates to control its own transmission and/or reception. For example, the channel estimates may pertain to spectrum in the wideband signal frequency band, and wideband processor 8608 may use the channel estimates to identify spectrum with strong channel conditions and/or to identify spectrum with poor channel conditions. Wideband processor 8608 may schedule transmissions and/or receptions on the spectrum with strong channel conditions and/or avoid scheduling transmissions and/or receptions on the spectrum with poor channel conditions.

Accordingly, in addition to general data exchange, in some aspects the narrowband signals may be used to exchange coexistence information for coordinating communication activity between different communication devices. For example, this can be used to coordinate communication activity between devices that use different radio communication technologies, which may in some cases not be able to directly communicate with each other due to the lack of dual-support for both radio communication technologies. Narrowband signal injection may therefore provide a channel for this direct communication to occur, and may also provide a channel that in some cases does not use additional spectrum. While described above for a terminal device receiving narrowband signals, in some aspects a network access node may be configured to receive narrowband signals from terminal devices or other network access nodes in the same or a similar manner.

In some aspects, the narrowband spectrum may be constant, and may thus remain the same indefinitely. For example, if there is a DC subcarrier or other subcarrier of the wideband signal that is designated as a null subcarrier, narrowband processor 8620 of network access node 8404/terminal device 8506 may continually select this spectrum for the narrowband spectrum in stage 8702. While narrowband processor 8620 may or may not continuously transmit a narrowband signal, narrowband processor 8620 may select this as the narrowband spectrum when transmitting a narrowband signal. Similarly, wideband processor 8608 of terminal device 8406 may continue to identify this spectrum as the narrowband spectrum in stage 8708.

In other aspects, the narrowband spectrum may dynamically change over time. For example, as previously described narrowband processor 8610 of terminal device 8406 may transmit narrowband control data that includes a channel fading profile and/or that identifies spectrum to use for the narrowband spectrum, for example. Accordingly, narrowband processor 8620 may receive and recover the narrowband data to obtain the narrowband control data, and may then select the narrowband spectrum based on the channel fading profile and/or identified spectrum in stage 8702. In cases where narrowband processor 8610 repeatedly updates and transmits narrowband control data, the channel fading profile and/or identified spectrum may change over time, which may in turn prompt narrowband processor 8620 to dynamically change its selection of the narrowband spectrum. In other aspects, narrowband processor 8620 may dynamically change the narrowband spectrum without explicit input from network access node 8404/terminal device 8506, such as where narrowband processor 8620 selects the narrowband spectrum to maximize the SNR.

In some aspects, narrowband processor 8620 of network access node 8404/terminal device 8506 may decide which spectrum to select for the narrowband spectrum for an upcoming period, and may identify the narrowband spectrum to terminal device 8406 by transmitting narrowband signals (for which terminal device 8406 may or may not have advance information to identify the narrowband spectrum) containing the selected narrowband spectrum as narrowband control data. Terminal device 8406 may then use the selected narrowband spectrum to process the composite signal during the upcoming period using the selected narrowband spectrum to isolate the wideband signal and the narrowband signal from the composite signal (e.g., either using null-spectrum isolation in stage 8712 or data spectrum isolation in stages 8714-8716). In some aspects, wideband processor 8608 of terminal device 8406 may use blind detection when initially receiving a narrowband signal from network access node 8404/terminal device 8506 to identify the narrowband spectrum, and may then use narrowband control data included in the narrowband signal that identifies the selected narrowband spectrum for upcoming periods to isolate the narrowband signal in these upcoming periods.

In some aspects, narrowband processor 8610 of terminal device 8406 may be configured to transmit measurements back to narrowband processor 8620 of network access node 8404/terminal device 8506 that indicate the reception performance of the narrowband signal. For example, narrowband processor 8610 may measure an error rate (such as a block, bit, and/or packet error rate) and/or an SINR, and transmit the measurement to narrowband processor 8620 as narrowband control data. If the measurement indicates poor reception performance, such as a high error rate or low SINR, narrowband processor 8620 may decide to select other spectrum for the narrowband spectrum, and may keep the same spectrum as the narrowband spectrum in the alternative case. In some aspects, wideband processor 8608 of terminal device 8406 may indicate to narrowband processor 8610 whether the wideband signal has poor reception performance (e.g., a high error rate or low SINR), which may be caused by excessive interference to the wideband signal by the narrowband signal. Narrowband processor 8610 may then transmit narrowband control data to narrowband processor 8620 that instructs narrowband processor 8620 to select different narrowband spectrum, such as a null subcarrier or spectrum.

In some aspects, narrowband processor 8620 may use a frequency-hopping scheme for the narrowband signal, where narrowband processor 8620 may inject the narrowband signal onto different subcarriers or subbands on a per-symbol and/or per-frame basis. In some aspects, the frequency-hopping scheme (e.g., which subcarrier and/or subbands will carry the narrowband signal at each of a sequence of symbol periods) may be available at terminal device 8406 as advance information. In other aspects, narrowband processor 8620 of network access node 8404/terminal device 8506 may identify the frequency-hopping scheme to wideband processor 8608 of terminal device 8406 as earlier narrowband control data, which wideband processor 8608 may then use to isolate the narrowband signal from the composite signal.

In some aspects, clusters of vehicular communication devices may use narrowband signal injection to communicate with each other. For example, vehicular communication devices operating in a cluster may use a narrowband connection to exchange cluster signaling with each other to coordinate operation of the cluster.

In some aspects, vehicular communication devices using distributed coexistence management as shown and described for FIGS. 9-17 may use narrowband signal injection to coordinate which vehicular communication devices in a cluster use certain vehicular radio communication technologies. For example, a cluster head (such as cluster head 904, 914, 1304, 1404, 1504, or 1604) may include communication arrangement 8606 and/or 8618 as shown in FIG. 86 as part of its communication arrangement (e.g., for communication arrangement 504 of vehicular communication device 500). The cluster head may then generate and transmit narrowband signals for the members of its cluster that contain cluster signaling for creating clusters, maintaining clusters, and allocating channel resources to the members of the cluster. The vehicular communication devices that are members of the cluster may include communication arrangement 8606 and/or 8618 as part of their communication arrangements, and may accordingly be configured to recover the control signaling in the narrowband signals. Accordingly, the vehicular communication devices may receive cluster signaling such as channel resource allocation for distributed coexistence management, and may then use their wideband processors to transmit and receive signals according to the first and/or second vehicular radio communication technologies as specified in the channel resource allocations for distributed coexistence management. In some aspects, the cluster head and/or vehicular radio communication devices may be configured for bidirectional narrowband signaling, and may transmit and receive narrowband signals to exchange cluster signaling.

Figure 94:
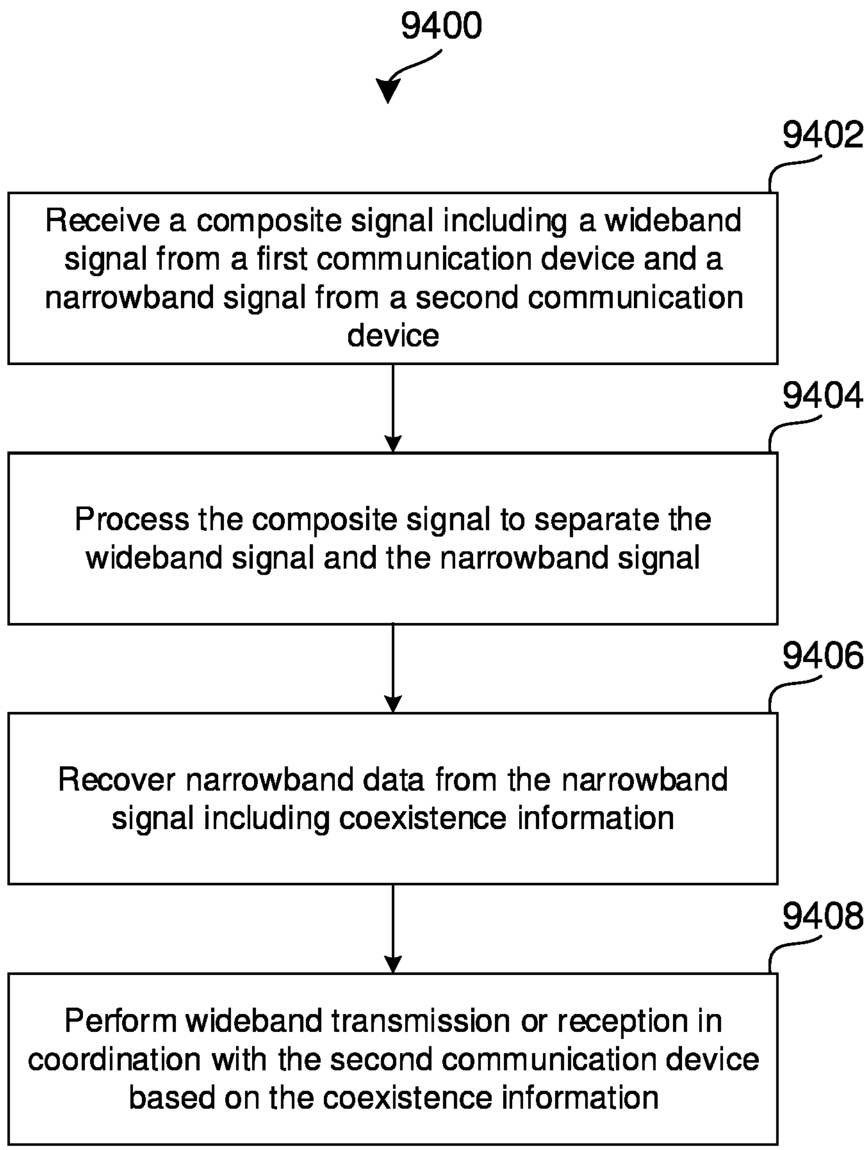
FIG. 94 shows an exemplary method for separating a wideband signal and a narrowband signal from a composite signal and using coexistence information in the narrowband signal to perform wideband communications according to some aspects.

FIG. 94 shows method 9400 of performing wireless communications. As shown in FIG. 94, method 9400 includes receiving a composite signal including a wideband signal from a first communication device and a narrowband signal from a second communication device (9402), processing the composite signal to separate the wideband signal and the narrowband signal (9404), recovering narrowband data from the narrowband signal including coexistence information (9406), and performing wideband transmission and/or reception in coordination with the second communication device based on the coexistence information (9408). For example, wideband processor 8608 of terminal device 8406 may be configured to execute stages 9402 and/or 9404 to separate the wideband signal and the narrowband signal, and may provide the narrowband signal to narrowband processor 8610. Narrowband processor 8610 may then be configured to perform stage 9406 to recover the narrowband data, and provide the coexistence information to coexistence controller 8612. Coexistence controller 8612 may then use the coexistence information to control wideband processor 8608 to transmit and receive based on the coexistence information in stage 9408.

Relaxed Synchronization Procedures

As the distance between terminal devices and their serving network access nodes can vary, many radio communication technology standards include timing advance procedures that adjust transmission timing based on the separation distance between terminal devices and network access nodes. In particular, during timing advance procedures a terminal device or network access may estimate the separation distance (or, equivalently, corresponding propagation delay) and subsequently adjust transmission timing to synchronize the arrival of transmissions at a target with a timing schedule. For example, terminal devices can adjust their uplink transmission timing according to their respective propagation delays to synchronize the arrival of uplink transmissions from multiple terminal devices at a network access node.

Some timing advance procedures, such as those related to Timing Advance (TA) in LTE and ranging in WiMax, generally stipulate that a terminal device and network access will determine the propagation delay during initial attach of the terminal device to the network access node (e.g., as part of a random access procedure). Terminal devices may then perform uplink transmissions to the network access node with a timing advance based on their individual propagation delay. Transmitting their uplink transmission 'early' according to their respective timing advances can thus synchronize the receipt of uplink transmission at the network access node with its timing schedule (e.g., where the uplink transmissions arrive at the base station at the same time as its downlink transmissions). The network access node may periodically instruct the terminal devices to adjust their respective timing advances to maintain synchronization over time even when terminal devices are mobile.

In some aspects of this disclosure, terminal devices can relax their synchronization maintenance, such as by skipping (or, equivalently, omitting) timing advance updates and/performing timing advance updates less frequently. The terminal devices can decide whether to skip timing advance updates and/or adjust the frequency of timing advance updates depending on the separation distance or propagation delay to the network access node.

Figure 95:
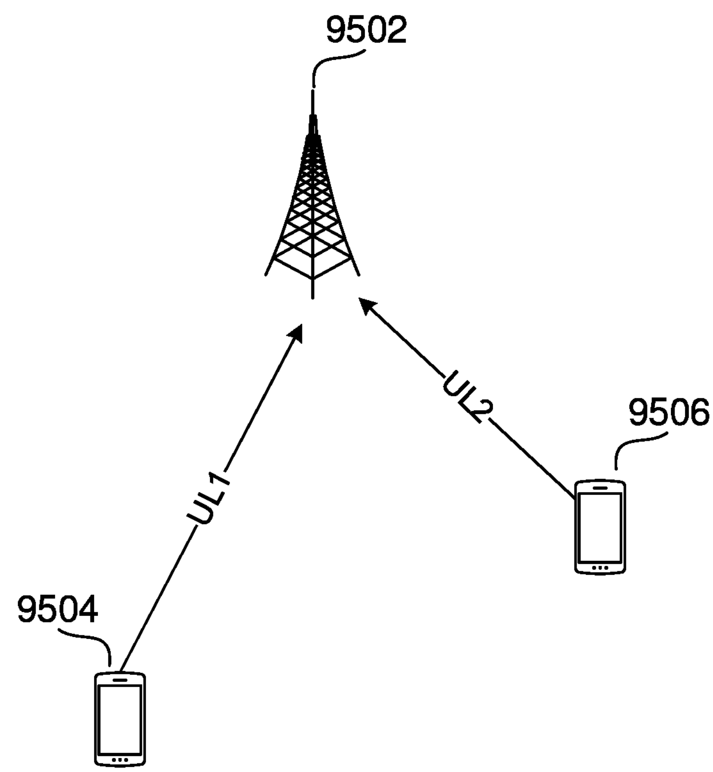
FIG. 95 shows an exemplary network scenario for use of timing advances in uplink transmissions from terminal devices to a network access node according to some aspects.
Figure 96:
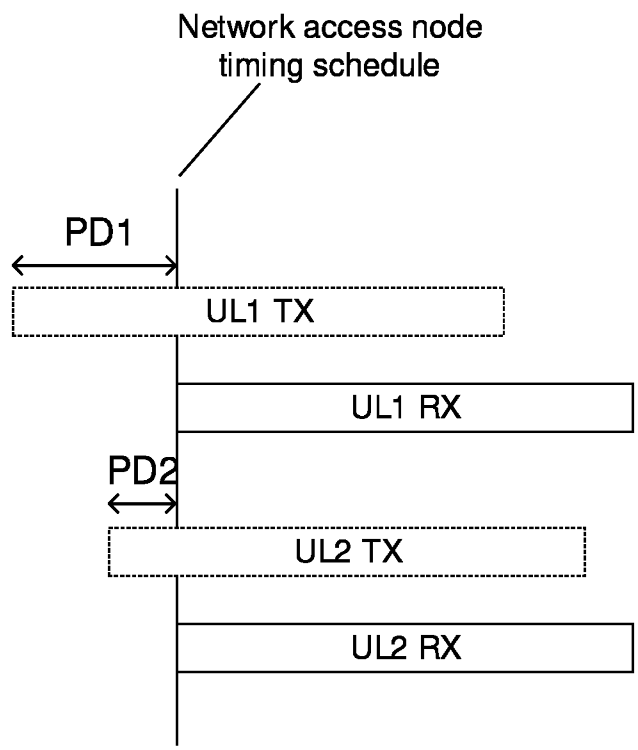
FIG. 96 shows an example illustrating propagation delays in uplink transmissions between terminal devices to a network access node according to some aspects.
Figure 97:
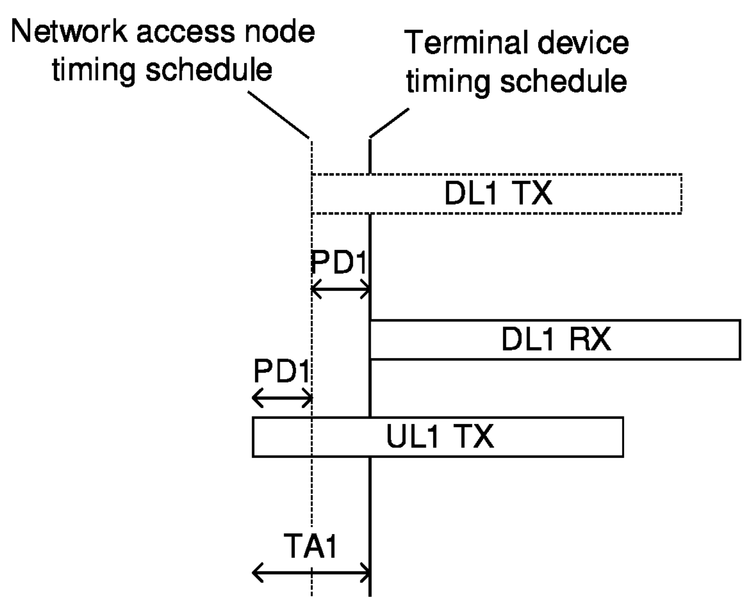
FIG. 97 shows an example illustrating propagation delays and timing advances relative to a terminal device timing schedule according to some aspects.

FIGS. 95-97 illustrate an example of timing advance updates according to some aspects. As shown in FIG. 95, terminal devices 9504 and 9506 may be connected to network access node 9502, and may respectively perform uplink transmissions UL1 and UL2. As terminal devices 9504 and 9506 are located at different distances relative to network access node 9502 (in other words, have different separation distances), the propagation delays PD1 and PD2 for UL1 and UL2 will be different (with the propagation delay being directly proportional to the separation distance). If terminal devices 9504 and 9506 do not transmit UL1 and UL2 with proper timing advances to compensate for PD1 and PD2, UL1 and UL2 will arrive at network access node 9502 at different times and will not be in sync with the timing schedule maintained by network access node 9502. As shown in FIG. 96, terminal device 9504 may transmit UL1 at a time occurring PD1 before the network access node timing schedule (which is offset from the timing schedule at terminal device 9504 as described below) and terminal device 9506 may transmit UL2 at a time occurring PD2 before the network access node timing schedule. UL1 and UL2 may therefore arrive simultaneously at network access node 9502 and in sync with the network access node timing schedule.

The timing advances TA1 and TA2 used by terminal devices 9504 and 9506 to transmit UL1 and UL2 may be relative to their own terminal device timing schedules, which may be synchronized in time with the arrival of downlink transmissions from network access node 9502 at terminal device 9504 and 9506, respectively. FIG. 97 shows an example for TA1 relative to the terminal device timing schedule at terminal device 9504. As shown in FIG. 97, the terminal device timing schedule at terminal device 9504 may be synchronized in time with the arrival of downlink transmissions from network access node 9502. As the propagation delay PD1 will similarly hold for downlink transmissions from network access node 9502 to terminal device 9504, the terminal device timing schedule at terminal device 9504 may be offset in time from the network access node timing schedule by PD1. Accordingly, to transmit UL1 so that UL1 arrives at network access node 9502 in synchronization with the network access node timing schedule, terminal device 9504 may transmit UL1 with a timing advance TA1 equal to twice the propagation delay PD1. Uplink transmissions from terminal device 9504 to network access node 9502 will therefore arrive simultaneous to downlink transmissions by network access node 9502, which subsequently arrive at terminal device 9504 with a propagation delay PD1 (and thus in sync with the terminal device timing schedule). The timing schedule boundaries identified by vertical lines in FIGS. 96 and 97 may be any type of timing schedule boundary, such as a symbol boundary, subframe boundary, frame boundary, or any other time point that separates predefined time periods in the timing schedule.

Terminal device 9506 may similarly transmit UL2 with a timing advance TA2 equal to twice the propagation delay PD2, where the terminal device timing schedule of terminal device 9506 is offset from the network access node timing schedule at network access node 9502 by PD2. If TA1 and TA2 are accurate, UL1 and UL2 may arrive simultaneously at network access node 9502.

Accurate timing advances may assist network access node 9502 in correctly receiving and processing uplink transmissions. For example, if TA1 is too large, and terminal device 9504 consequently transmits UL1 too early, UL1 will at least partially overlap with in time with uplink transmissions in the immediately preceding time period of the network access node timing schedule. UL1 may therefore interfere with uplink transmissions on the same spectrum in this immediately preceding time period. This interference may cause reception errors at network access node 9502 and may even result in reception failure. The use of cyclic prefixes or guard periods between symbols can provide some tolerance for timing advance accuracy. However, interference may still occur if the timing advance error is larger than the cyclic prefix or guard period.

Network access node 9502 and terminal devices 9504 and 9506 may periodically update the timing advances over time, which may enable tracking of accurate timing advances even when terminal device 9504 and 9506 are mobile. In some aspects, this responsibility may be handled at network access node 9502, and the timing advance update may therefore be network-centric. For example, network access node 9502 may track the arrival of uplink transmissions from terminal device 9504 over time to determine whether the uplink transmissions from terminal device 9504 are arriving at network access node 9502 on time (e.g., in synchronization with the network access node timing schedule). If the uplink transmissions are arriving early, network access node 9502 may update TA1 to a lower value. Conversely, if the uplink transmissions are arriving late, network access node 9502 may update TA1 to a larger value. In some cases, network access node 9502 may determine updated timing advances based on the reception and processing of synchronization pilot signals, such as sounding reference signals in LTE and other similar reference signals for time synchronization. As these synchronization pilot signals are predefined sequences, network access node 9502 may compare a synchronization pilot signal received from a terminal device to a local copy of the predefined synchronization pilot signal to determine the propagation delay and the corresponding timing advance. After determining an updated timing advance, network access node 9502 may then transmit a timing advance update command to terminal device 9504 that includes the updated TA1. Terminal device 9504 may then update TA1 to the updated TA/specified in the timing advance update command and perform subsequent uplink transmissions using the updated TA1.

In other aspects, terminal devices may be responsible for determining the timing advances, and the timing advance update procedures may therefore be terminal-centric. For example, in the reverse of the procedure described above, terminal device 9504 may be configured to receive and process synchronization pilot signals from network access node 9502. Terminal device 9504 may then determine the propagation delay and the corresponding timing advance and update TA1 as needed. This terminal-centric implementation can be useful, for example, when terminal devices perform infrequent transmissions (e.g., for Machine-Type Communication (MTC) and/or Internet-of-Things (IoT) use cases). Terminal devices may therefore maintain accurate timing advances by receiving synchronization pilot signals and periodically updating the timing advance (e.g., according to a fixed period and/or as needed). The terminal device may thus use the updated timing advance for subsequent transmissions.

While described above for an uplink-centric case where timing advances are implemented to synchronize reception of uplink transmissions at a network access node, timing advances can also be used in downlink cases. For example, in some network scenarios a network access node transmitting to a terminal device may use a timing advance to synchronize arrival of its downlink transmission at the terminal device with the terminal device timing schedule (e.g., simultaneous to the arrival of downlink transmissions from other network access nodes transmitting to the terminal device, and/or simultaneous to uplink transmissions from the terminal device). In other cases, terminal devices may use timing advances for sidelink transmissions to other terminal devices, such as where a terminal device transmitting to another terminal device may use a timing advance to control timing of the arrival of its sidelink transmissions at the other terminal device.

While helpful in managing interference, these timing advance procedures may involve dedication of resources to timing advance update that could be used for other functions, such as the receipt of other data (e.g., user or control data). For example, in network-centric cases where the network access node is responsible for determining timing advances and providing timing advance update commands to terminal devices, the terminal devices will be expected to dedicate reception resources, which could be used to receive and process other data, to receiving and processing the timing advance update commands. In terminal-centric cases where terminal devices are responsible for determining timing advances, the terminal devices may utilize reception and processing resources as well as expend battery power during the reception and processing of synchronization pilot signals to determine timing advances.

Accordingly, in some aspects of this disclosure terminal devices may be configured to decide whether to perform timing advance procedures contingent on the separation distance or propagation delay. For example, if the separation distance or propagation delay with a network access node is less than a predefined threshold, a terminal device may decide to skip (omit) timing advance updates and/or reduce the frequency of timing advance updates.

FIG. 98 shows an exemplary internal configuration of a terminal device, such as terminal device 9504 of FIG. 95, according to some aspects. As shown in FIG. 98, terminal device 9504 may include antenna system 9802, RF transceiver 9804, and communication arrangement 9806. Antenna system 9802 and RF transceiver 9804 may be configured in the manner shown and described for antenna system 202 and RF transceiver 204 of terminal device 102 in FIG. 2. Accordingly, in the receive direction antenna system 9802 and RF transceiver 9804 may be configured to receive and process wireless signals to obtain baseband samples, and to provide the baseband samples to communication arrangement 9806 for reception processing. In the transmit direction, RF transceiver 9804 and antenna system 9802 may be configured to receive and process baseband samples provided by communication arrangement 9806 and subsequently transmit the baseband samples as wireless signals.

As shown in FIG. 98, communication arrangement 9806 may include communication processor 9808, timing advance controller 9810, timing advance determiner 9812, and estimator 9814. Communication processor 9808, timing advance controller 9810, timing advance determiner 9812, and estimator 9814 may be part of a digital signal processor, controller, and/or application processor of terminal device 9504. Accordingly, the arrangement shown in FIG. 98 illustrates that communication processor 9808, timing advance controller 9810, timing advance determiner 9812, and estimator 9814 are not limited to being part of a physical layer, protocol stack, or application layer of terminal device 9504, and can be implemented at any of the physical layer, protocol stack, or application layer. Furthermore, while depicted as logically separate components in FIG. 98, this illustrates the functional separation between communication processor 9808, timing advance controller 9810, timing advance determiner 9812, and estimator 9814, and does not limit these components to being physically separate components. Accordingly, in some aspects communication processor 9808, timing advance controller 9810, timing advance determiner 9812, and estimator 9814 may be physically separate components, while in other aspects communication processor 9808, timing advance controller 9810, timing advance determiner 9812, and estimator 9814 may be physically integrated components, such as a digitally-configured hardware arrangement including circuitry to perform multiple functions or a processor configured to execute multiple subroutines.

Communication processor 9808 may be configured to control transmission, reception, and communication processing operations of terminal device 9504. In the transmit direction, communication processor 9808 may be configured to perform the transmission processing for generating physical layer uplink signals (in the form of baseband samples) from application layer user data and protocol stack control data, and providing the physical layer uplink signals to RF transceiver 9804 and antenna system 9802 for wireless transmission. In the receive direction, communication processor 9808 may be configured to perform the reception processing for receiving physical layer downlink signals (in the form of baseband samples) from RF transceiver 9804 and antenna system 9802, and processing the physical layer downlink signals to obtain application layer user data and protocol stack control data. Communication processor 9808 may also be configured to manage the timing of transmissions and receptions. The processing performed by communication processor 9808 may be defined in a radio communication technology standard that defines the control, scheduling, and formatting for transmission and reception of data in the form of wireless signals. Communication processor 9808 may be a processor that is configured to retrieve (e.g., from a local memory) and execute program code that algorithmically defines this processing for scheduling, transmitting, and receiving. The program code may be updatable, such as wirelessly or by a manual install. In some aspects, communication processor 9808 may be a physical layer and/or protocol stack component, and may include a digital signal processor and/or controller of terminal device 9504. The program code executed by processor 9808 may therefore be protocol stack and/or physical layer software. In some aspects, communication processor 9808 may include one or more hardware accelerators dedicated to physical layer or protocol stack processing tasks. Communication processor 9808 may transmit and receive data via a logical connection with counterpart communication processors of network access nodes, core network servers, and data network servers, where the logical connection uses wireless signals for low layer transport. References herein to transmission and reception by communication processor 9808 therefore refer to this transmission of data over such logical connections in the form of wireless signals.

Timing advance controller 9810 may be configured to trigger timing advance updates. Accordingly, timing advance controller 9810 may be configured to decide when to perform timing advance update at terminal device 9504, and may instruct timing advance determiner 9812 whether and when to perform timing advance updates. Timing advance controller 9810 may be configured to evaluate a separation distance or propagation delay, and to decide whether to skip timing advance updates and/or reduce the frequency of timing advance updates based on the separation distance or propagation delay. In some aspects, timing advance controller 9810 may be a processor configured to retrieve (e.g., from a local memory) and execute program code that algorithmically defines the functionality described herein in the form of executable instructions. The program code may be updatable, such as wirelessly or by a manual install. In some aspects, timing advance controller 9810 may be a subroutine executed by communication processor 9808 that exerts control over when communication processor 9808 receives timing advance update commands. In some aspects, timing advance controller 9810 may execute Media Access Control (MAC) layer program code or may be a MAC layer subroutine.

Timing advance determiner 9812 may be configured to determine timing advances and provide the timing advances to communication processor 9808, which may then control transmission timing according to the timing advance (e.g., by performing uplink transmissions in advance of the terminal device timing schedule by a time period equal to the timing advance). In network-centric timing advance cases, timing advance determiner 9812 may be configured to read and interpret (after initial receipt and processing by communication processor 9808 via antenna system 9802 and RF transceiver 9804) timing advance update commands to determine the timing advance specified therein. As timing advance update commands may be messages generated according to a predefined message format, timing advance determiner 9812 may be configured to decode and interpret timing advance update commands according to the predefined message format to determine the timing advance update specified in the timing advance update command. In some aspects, timing advance determiner 9812 may be a processor configured to retrieve (e.g., from a local memory) and execute program code that algorithmically defines this functionality. The program code may be updatable, such as wirelessly or by a manual install. In some aspects, timing advance determiner 9812 may be a subroutine executed by communication processor 9808 that algorithmically defines this functionality in the form of executable instructions.

In terminal-centric timing advance cases, timing advance determiner 9812 may be configured to calculate timing advance updates. In some aspects, this may, for example, include receiving and processing synchronization pilot signals transmitted by a network access node or other target device to calculate a timing advance based on the synchronization pilot signals. As the synchronization pilot signals may be predefined, timing advance determiner 9812 may be configured to compare a local copy of the synchronization pilot signal to the received synchronization pilot signal to determine the differences between the local and received synchronization pilot signals, which indicates the timing advance offset. Timing advance determiner 9812 may then be configured to determine an updated timing advance based on the differences arising from the timing advance offset. In some aspects, timing advance determiner 9812 may be a processor configured to retrieve (e.g., from a local memory) and execute program code that algorithmically defines this processing functionality in the form of executable instructions. The program code may be updatable, such as wirelessly or by a manual install. In some aspects, timing advance determiner 9812 may include one or more hardware accelerators that are configured with digital logic to perform this processing functionality. In some aspects, timing advance determiner 9812 may be a physical layer component, and the program code executed by timing advance determiner 9812 and/or the digital logic of timing advance determiner 9812 may be physical layer software and/or physical layer logic. In other aspects, timing advance determiner 9812 may be a protocol stack component, such as part of the MAC layer. The program code executed by timing advance determiner 9812 and/or the digital logic of timing advance determiner 9812 may be protocol stack software and/or protocol stack logic Estimator 9814 may be configured to estimate the separation distance or propagation delay between terminal device 9504 and a target device (e.g., a network access node for uplink or another terminal device for sidelink). In various aspects, estimator 9814 may be configured to use one or more of radar, position information, and/or synchronization pilot signals to estimate the separation distance and/or propagation delay between terminal device 9504 and the target device. For example, in some aspects estimator 9814 may include a radar sensor configured to use radar signaling to estimate the separation distance between terminal device 9504 and the target device.

Additionally or alternatively, in some aspects estimator 9814 may include a geopositional sensor, such as satellite-based positioning system (e.g., any Global Navigation Satellite System (GNSS) system), with which estimator 9814 can determine the position of terminal device 9504. Estimator 9814 may also be configured to determine the position of the target device, such as by receiving a position report from the target device that specifies its position, and/or by receiving a position report from a position database that specifies the position of the target device. Estimator 9814 may then be configured to estimate the separation distance based on the position of terminal device 9504 and the target device.

Additionally or alternatively, in some aspects estimator 9814 may be configured to estimate the separation distance and/or propagation delay using synchronization pilot signals in the manner described above for timing advance determiner 9812, namely by receiving and comparing a synchronization pilot signal from the target device with a local copy of the synchronization pilot signal to determine the timing advance offset and corresponding timing advance.

In some aspects, estimator 9814 may include a processor configured to retrieve (e.g., from a local memory) and execute program code that algorithmically defines the processing for estimating the separation distance and/or propagation delay based on radar, position information, and/or synchronization pilot signals in the form of executable instructions. The program code may be updatable, such as wirelessly or by a manual install. In some aspects, estimator 9814 may include one or more hardware accelerators including digital logic configured to perform part of this processing.

In some aspects, estimator 9814 may use multiple of radar, position information, and/or synchronization pilot signals to estimate the separation distance and/or propagation delay. For example, estimator 9814 can estimate a first separation distance and/or propagation delay based on one of radar, position information, and synchronization pilot signals, and a second separation distance and/or propagation delay based on another of radar, position information, and synchronization pilot signals. Estimator 9814 can then determine a combined separation distance and/or propagation delay based on the first and second separation distances and/or propagation delays, such as by calculating an average or weighted average of the first and second separation distances or propagation delays. Various other combined calculations using multiple of radar, position information, and/or synchronization pilot signals can similarly be calculated.

Figure 99:
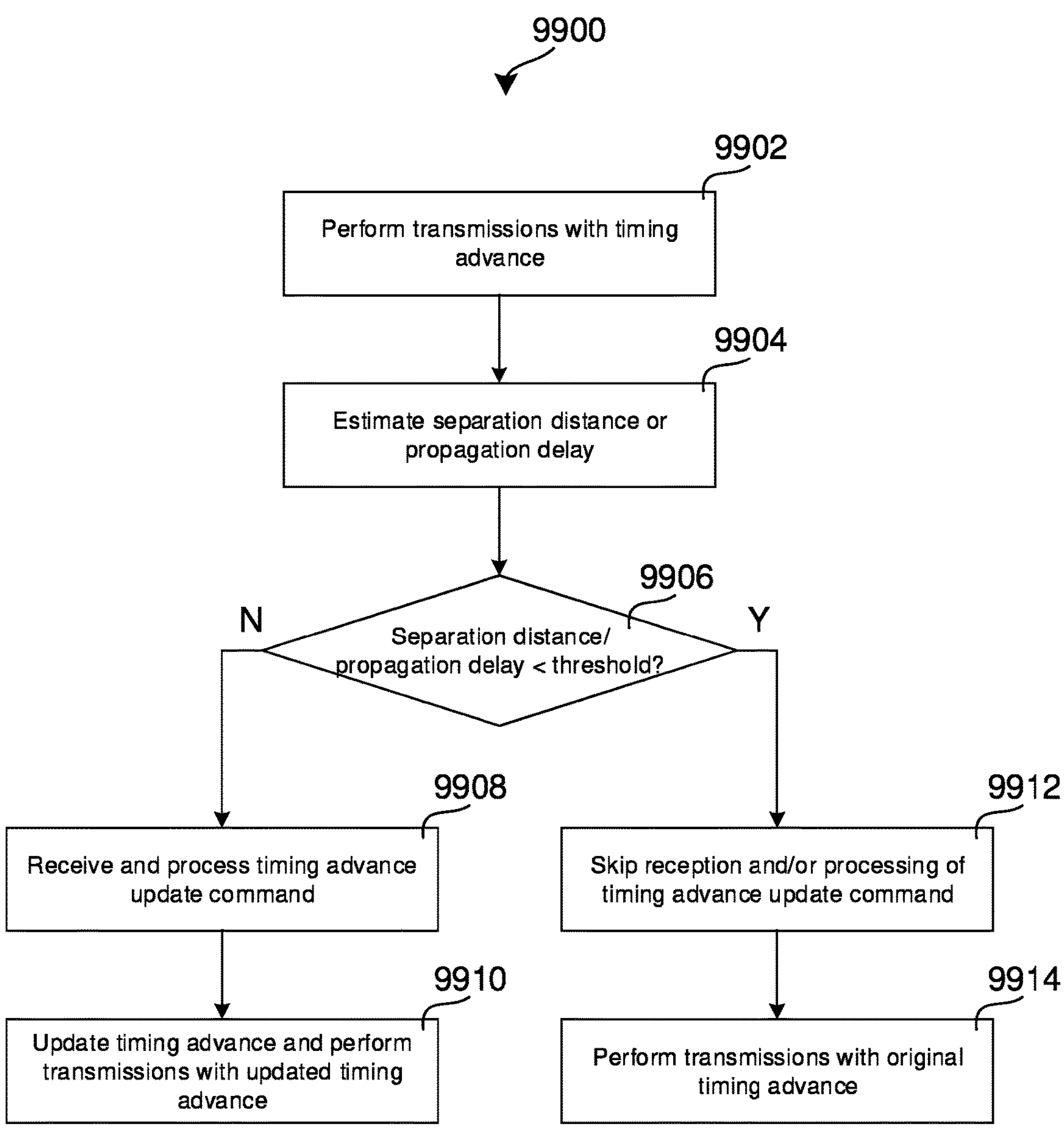
FIG. 99 shows an exemplary procedure for skipping processing of timing advance update commands based on separation distance or propagation delay according to some aspects.

As previously indicated, terminal device 9504 may be configured to skip (omit) and/or reduce the frequency of timing advance procedures depending on the separation distance and/or propagation delay with the target device. FIG. 99 shows exemplary method 9900 according to some aspects, where terminal device 9504 may be configured to skip timing advance updates in a network-centric case continent on the separation distance and/or propagation delay. While FIG. 99 refers to network access node 9502 as the target device (which, in network-centric cases, may determine and transmit timing advance updates to a terminal device), terminal device 9504 may also perform the procedure of method 9900 with other devices as the target device. For example, in a sidelink context, terminal device 9504 may use another terminal device as the target device (e.g., a handheld/mobile terminal device, and/or a vehicular communication device), where the other terminal device may be configured to determine timing advance updates for transmissions by terminal device 9504 and transmit a timing advance update command including the timing advance update to terminal device 9504.

As shown in FIG. 99, terminal device 9504 may perform transmissions with a timing advance in stage 9902. For example, terminal device 9504 may have previously determined the timing advance with timing advance determiner 9812, such as by receiving an earlier timing advance update command from network access node 9502 that specified the timing advance. Communication processor 9808 may be configured to control the transmission timing of uplink transmissions from terminal device 9504 to network access node 9502, and accordingly may control uplink transmissions to occur at a time period equal to the timing advance prior to the arrival of downlink transmissions (which may be in synchronization with the terminal device timing schedule).

Terminal device 9504 may then estimate the separation distance or propagation delay between terminal device 9504 and network access node 9502 in stage 9904. For example, estimator 9814 may be configured to use one or more of radar, position reporting, and/or synchronization pilot signals to estimate the separation distance and/or propagation delay. Both separation distance and propagation delay are considered within the scope of this disclosure due to the direct relationship between separation distance and propagation delay, and terminal device 9504 may equivalently use one or both of separation distance and propagation delay for purposes of deciding whether the skip transmit advance updates.

As previously described regarding FIG. 98, in some aspects estimator 9814 may include a radar sensor, and may use radar signaling to determine the distance and/or delay between terminal device 9504 and network access node 9502 as the separation distance and/or propagation delay in stage 9904.

In some aspects, estimator 9814 may be configured to estimate the separation distance and/or propagation delay in stage 9904 based on position information. For example, estimator 9814 may include a geographic positional sensor configured to determine the position of terminal device 9504. Estimator 9814 may also be configured to receive a position report that specifies the position of network access node 9502. For example, network access node 9502 may be configured to broadcast position reports (and/or system information that includes a position report) that specify the position of network access node 9502. Additionally or alternatively, in some aspects estimator 9814 may be configured to access a position database (e.g., via a logical connection provided by communication processor 9808) using the identity (e.g., a cell identity or other uniquely identifying tag) of network access node 9502. The position database may respond with a position report that specifies the position of network access node 9502.

Estimator 9814 may receive (e.g., via communication processor 9808) and process these position reports to read the position of network access node 9502 from the position report. Estimator 9814 may then compare the position of terminal device 9504 with the position of network access node 9502 to estimate the separation distance between terminal device 9504 and network access node 9502.

In some aspects, estimator 9814 may be configured to estimate the separation distance or propagation delay in stage 9904 using synchronization pilot signals. For example, as previously described estimator 9814 may be configured to receive synchronization pilot signals from network access node 9502 and compare the received synchronization pilot signals with local copies of synchronization pilot signals. Estimator 9814 may therefore estimate the separation distance and/or propagation delay based on the differences between the received and local synchronization pilot signals. In some aspects, estimator 9814 may use a coarse estimation technique in stage 9904, where, for example, the estimated separation distance and/or propagation delay is not accurate enough for timing advance purposes (and is thus 'coarse') but gives a general estimate for the separation distance and/or propagation delay. For example, estimator 9814 may receive less synchronization pilot signals (e.g., less resource elements) and/or may utilize less intensive processing to estimate the separation distance or propagation delay than would be involved in obtaining high-accuracy separation distance or propagation delay estimates for timing advance purposes. This can enable terminal device 9504 to use less reception resource and expend less battery power.

In some aspects, estimator 9814 may be configured to use an auxiliary connection with the network access node and/or other target device (e.g., a connection other than the connection for which the timing advance applies) to assist in estimating the separation distance and/or propagation delay in stage 9904. For example, some next-generation network architectures may support multiple wireless connections between terminal devices and network access nodes that use different radio communication technologies. Accordingly, if terminal device 9504 has a first wireless connection with network access node 9502 to which the timing advance applies, and also has a second wireless connection (e.g., an auxiliary connection) on a different radio communication technology with network access node 9502, terminal device 9504 may use the second wireless connection to estimate the separation distance and/or propagation delay in stage 9904. For example, network access node 9502 may use the second wireless connection to transmit a position report and/or a synchronization pilot signal to terminal device 9504, which timing advance determiner 9812 may then use to estimate the separation distance or propagation delay in stage 9904.

As previously described, estimator 9814 may utilize estimates of the separation distance and/or propagation delay from multiple of radar, position reporting, and/or synchronization pilot signals to obtain the separation distance and/or propagation delay in stage 9904.

After estimating the separation distance or propagation delay in stage 9904, estimator 9814 may provide the separation distance and/or propagation delay to timing advance controller 9810, which may be configured to control triggering of timing advance updates for terminal device 9504. Timing advance controller 9810 may then determine in stage 9906 whether the separation distance and/or propagation delay is less than a predefined threshold. If using separation distance, timing advance controller 9810 may compare the separation distance to a distance threshold to determine whether the separation distance is less than the distance threshold. If using propagation delay, timing advance controller 9810 may compare the propagation delay to delay threshold to determine whether the propagation delay is less than the delay threshold.

If timing advance controller 9810 determines that the separation distance and/or propagation delay is not less than the threshold, timing advance controller 9810 may instruct timing advance determiner 9812 to perform timing advance updates. In the network-centric timing advance context of FIG. 99, timing advance determiner 9812 may therefore be configured to receive (via communication processor 9808) and process timing advance update commands in stage 9908. Accordingly, communication processor 9808 may receive the resource elements on which network access node 9502 transmits the timing advance update command, and provide the resulting data to timing advance determiner 9812 for processing. Timing advance determiner 9812 may then read the updated timing advance included in the timing advance update command.

Timing advance determiner 9812 may then provide the updated timing advance to communication processor 9808, which may update the timing advance to the updated timing advance and perform transmissions with the updated timing advance in stage 9910.

Accordingly, as the separation distance or propagation delay is not less than the threshold, terminal device 9504 may be configured to perform the timing advance update according to the timing advance update command provided by network access node 9502.

However, if the separation distance and/or the propagation delay is less than the threshold, timing advance controller 9810 may proceed to stage 9912, and may instruct timing advance determiner 9812 to skip reception and/or processing of the timing advance update command. For example, in some cases network access node 9502 may transmit timing advance update commands according to a deterministic schedule (e.g., according to a fixed period on certain time-frequency resources), where timing advance determiner 9812 may know in advance which time-frequency resources (e.g., resource elements) will transport the timing advance update command (e.g., before the timing advance update command arrives at terminal device 9504). Accordingly, timing advance determiner 9812 may instruct communication processor 9808 (which may be responsible for the related physical and MAC layer protocols) that communication processor 9808 does not need to receive the time-frequency resources that transport the timing advance update command. Accordingly, by skipping the timing advance update, communication processor 9808 may be able to use these time-frequency resources to receive other data and/or may avoid expending battery power in receiving and processing these time-frequency resources. Timing advance determiner 9812 may similarly avoid expending battery power as timing advance determiner 9812 may in some cases not read the timing advance update command.

In other cases, network access node 9502 may not transmit timing advance commands with a deterministic schedule. For example, network access node 9502 may be configured to transmit timing advance commands when network access node 9502 determines that the timing advance currently used by terminal device 9504 is outdated (e.g., due to mobility by terminal device 9504). Accordingly, timing advance determiner 9812 may not know in advance when, or on which time-frequency resources, the timing advance update command will arrive. Timing advance determiner 9812 may thus not be able to preemptively instruct communication processor 9808 to skip reception of the time-frequency resources carrying the timing advance update command. However, once communication processor 9808 receives these time-frequency resources and identifies the corresponding data as being a timing advance update command, timing advance determiner 9812 may skip the timing advance update in stage 9912 by refraining from processing the timing advance update command to read the timing advance update included therein. For example, timing advance determiner 9812 may discard the timing advance update command without reading an updated timing advance from the timing advance update command. This can enable timing advance determiner 9812 to avoid expending battery power in the processing of the timing advance update command.

As timing advance determiner 9812 has skipped the timing advance update, communication processor 9808 may continue performing transmissions with the original timing advance in stage 9914.

Accordingly, terminal device 9504 may be configured to skip timing advance updates by skipping receipt and/or processing of timing advance update commands from the target device. As described, terminal device 9504 may skip timing advance updates contingent on whether a separation distance and/or propagation delay is less than a threshold. Exemplary distance thresholds can be, for example, 10 m, 50 m, 100 m, 200 m, 500 m, or other distance thresholds in a similar range. Exemplary delay thresholds can be selected based on the cyclic prefix or guard interval used in communications between terminal device 9504 and network access node 9502 (which may be dictated by the radio communication technology standard). The delay threshold can, for example, be equal to (or below) half the cyclic prefix or guard interval length. For example, for a 50 nanosecond guard interval, an exemplary delay threshold can be 20 nanoseconds.

In some aspects, the specific distance and delay threshold used for terminal device 9504 can be preselected based on use characteristics of terminal device 9504. For example, some developing radio communication technologies such as millimeter wave (mmWave) may use highly-directional beamforming that provides high beamgain and is thus effective in countering interference. Accordingly, mmWave network access nodes may be able to successfully receive uplink transmissions even in the presence of timing advance error. Other radio communication technologies such as IoT- and MTC-related standards may use very low data rates (e.g., several Kbps) having low spectral efficiency (e.g., <0.1 bps/Hz), which may be able to operate even in low SNR conditions. This may provide additional margin to compensate a loss of SNR due to synchronization error (although this may depend on deployment assumptions). Small cell use cases (e.g., cells of <50 m radius) may also be resilient against synchronization-related interference on account of the short separation distances. Additionally, some terminal devices may transmit low-priority data (e.g., user data versus critical control data), or may transmit latency-tolerant data that can be transported with high redundancy or repetitions, and may be able to sustain higher rates of data loss from timing advance error. Any of these factors may warrant higher distance and/or delay thresholds for a particular terminal device, while the reverse may warrant lower distance and/or delay thresholds.

In some aspects, terminal device 9504 may repeatedly perform the procedure of method 9900. For example, if timing advance controller 9810 determines that the separation distance and/or the propagation delay is less than the threshold in stage 9906, timing advance controller 9810 may instruct timing advance determiner 9812 to skip timing advance update commands at a particular skip rate. For example, timing advance controller 9810 can instruct timing advance determiner 9812 to skip every other timing advance update (in other words, a skip rate of 0.5), every two timing advance updates (a skip rate of 0.6666666), every three timing advance updates (a skip rate of 0.75), every timing advance update (a skip rate of 1.0, for which timing advance determiner 9812 skips every timing advance update until timing advance controller 9810 instructs otherwise), or any other skip rate between 0.0 and 1.0. This may in effect reduce the frequency of the timing advance updates by terminal device 9504.

Estimator 9814 and timing advance controller 9810 may continue to repeatedly estimate the separation distance and/or propagation delay and evaluate the separation distance and/or propagation delay in stages 9902-9904 to check if the separation distance and/or propagation delay is still less than the threshold. If timing advance controller 9810 determines that the separation distance and/or propagation delay is no longer less than the threshold, timing advance controller 9810 may instruct timing advance determiner 9812 to stop skipping timing advance updates. Timing advance determiner 9812 may be configured to use the timing advance update in the most recently processed timing advance update command (e.g., the most recent timing advance update command that was not skipped) during the intervening period in which timing advance updates are skipped.

In some aspects, timing advance controller 9810 may compare the separation distance and/or propagation delay to multiple different thresholds in stage 9906, where each of the thresholds is mapped to a different predefined skip rate. Timing advance controller 9810 may then identify the lowest-valued of the thresholds that the separation distance and/or propagation delay is less than, and instruct timing advance determiner 9812 to skip timing advance updates at the skip rate mapped to the identified threshold.

In some aspects, timing advance determiner 9812 may update the timing advance in between processed timing advance updates based on separation distances and/or propagation delays obtained by estimator 9814. For example, as estimator 9814 may continually estimate the separation distance and/or propagation delay for timing advance controller 9810 to use for determining whether to continue skipping timing advance updates, timing advance determiner 9812 may use the separation distance and/or propagation delay to update the timing advance used by communication processor 9808. This can include, for example, calculating a new timing advance based on the separation distance or propagation delay (e.g., twice the propagation delay), or increasing or decreasing the current timing advance by a fixed amount based on whether the estimated separation distance or propagation delay is greater than or less than the separation distance and/or propagation delay conveyed by the current timing advance. In some cases, the technique used by estimator 9814 to estimate separation distances or propagation delays may not be as accurate as timing advances provided by network access node 9502, and thus may be poorly suited to completely substitute for the receipt of timing advance update commands from network access node 9502. However, the separation distances and/or propagation delays obtained by estimator 9814 may be suitable for use when skipping timing advance updates.

In other cases, terminal device 9504 and the target device may perform timing advance updates in a terminal-centric manner, for example, where terminal device 9504 performs a local timing advance update (e.g., where terminal device 9504 calculates the timing advance as opposed to receiving it in a timing advance update command). For example, in some cases the target device may transmit a timing advance update command to terminal device 9504 that instructs terminal device 9504 to perform a local timing advance update, such as with timing advance determiner 9812. In other cases, terminal device 9504 may be configured to periodically perform local timing advance updates, such as with a fixed period.

Figure 100:
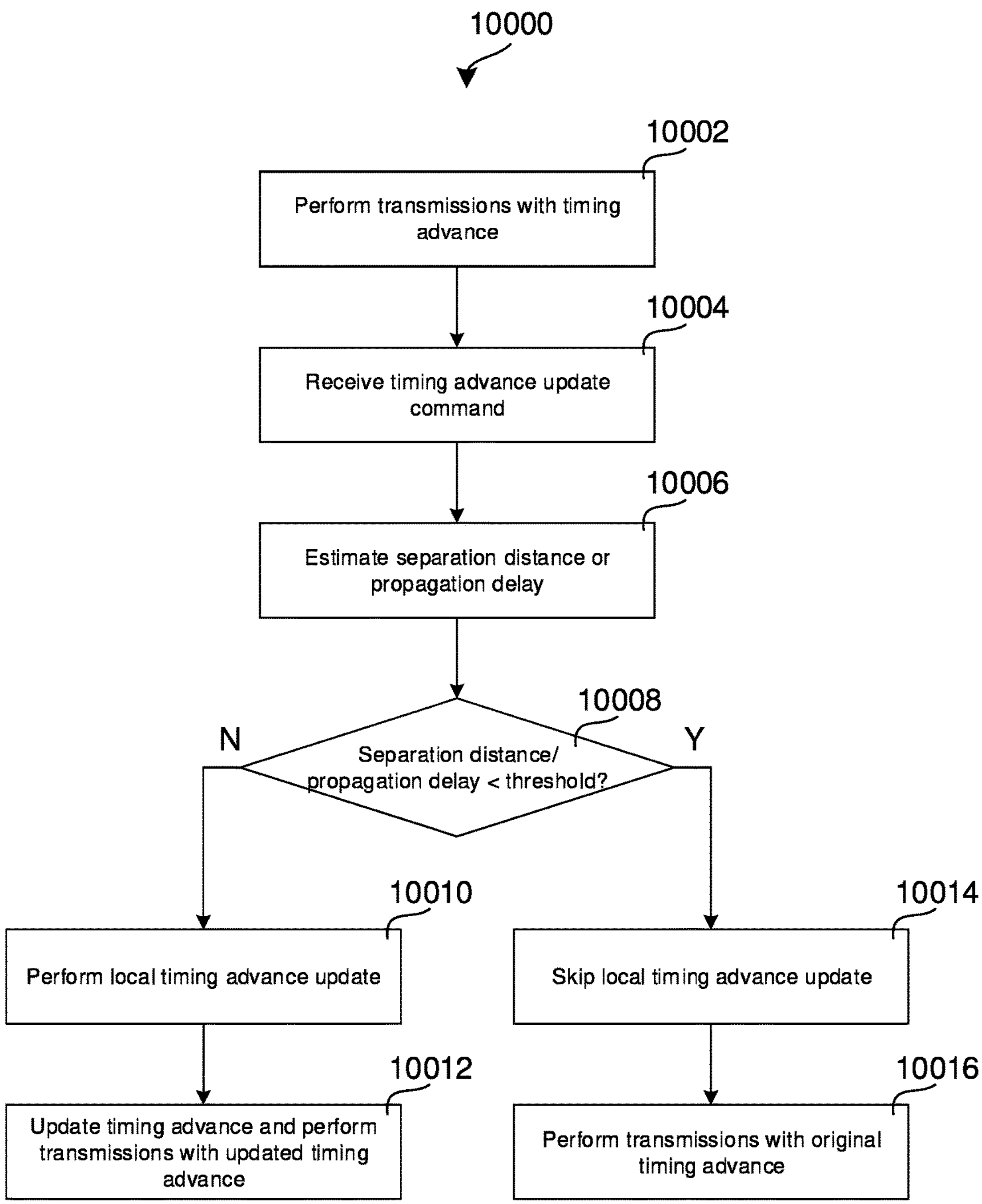
FIG. 100 shows an exemplary procedure for skipping local timing advance updates based on separation distance or propagation delay according to some aspects.

FIG. 100 shows exemplary method 10000 according to some aspects, which relates to a scenario where the target device is configured to transmit a timing advance update command to terminal device 9504 that instructs terminal device 9504 to perform a local timing advance update. While FIG. 100 refers to network access node 9502 as the target device, in other aspects another terminal device may be the target device. Accordingly, terminal device 9504 may perform local timing advance updates to determine a timing advance to use for sidelink transmissions to the other terminal device.

Terminal device 9504 may perform stages 10002 in the manner of stage 9902 in FIG. 99. Timing advance determiner 9812 may then receive a timing advance update command (e.g., via communication processor 9808) from network access node 9502 in stage 10004, where the timing advance update command instructs timing advance determiner 9812 to perform a local timing advance update. As this local timing advance update may be used for determining a timing advance to use to transmit to network access node 9502, in some cases the local timing advance update may be expected to be high-accuracy (e.g., compared to the coarse estimation performed by estimator 9814).

Estimator 9814 may then estimate the separation distance and/or propagation delay in stage 10006 using one or more of radar, position information, or synchronization pilot signals as previously described. In some cases, estimator 9814 may be configured to periodically estimate the separation distance and/or propagation delay (e.g., with a fixed period), and may provide the most recently estimated separation distance or propagation delay to timing advance controller 9810 for use in stage 10008. In other cases, timing advance controller 9810 may be configured to instruct estimator 9814 to estimate the separation distance and/or propagation delay when a timing advance update command is received.

Timing advance controller 9810 may then determine in stage 10008 whether the separation distance and/or propagation delay is less than the threshold (distance threshold and/or delay threshold depending on which of separation distance and/or propagation delay is being used). Timing advance controller 9810 may perform stage 10008 in the manner described above for stage 9906 in FIG. 99.

If timing advance controller 9810 determines that the separation distance and/or propagation delay is not less than the threshold, timing advance controller 9810 may conclude that the timing advance update command should be obeyed. Accordingly, timing advance controller 9810 may instruct timing advance determiner 9812 to perform a local timing advance update as instructed in the timing advance update command. Accordingly, timing advance determiner 9812 may perform a local timing advance update in stage 10010.

In particular, and as previously described regarding FIG. 98, timing advance determiner 9812 may be configured to perform timing advance updates by receiving and processing synchronization pilot signals from the target device, e.g., network access node 9502. For example, timing advance determiner 9812 may receive a synchronization pilot signal in the form of baseband samples from communication processor 9808. Timing advance determiner 9812 may then compare the synchronization pilot signal to a local copy of the synchronization pilot signal (e.g., also in the form of baseband samples). Timing advance determiner 9812 may be configured to calculate an updated timing advance based on the differences between the received synchronization pilot signal and the local copy, such as based on the amplitude and/or phase differences between the baseband samples of the received synchronization pilot signal and the local copy. In some cases, this may be a high-accuracy timing advance update determination procedure, and may produce timing advances having higher accuracy than the timing advances conveyed by the separation distance or propagation delay estimation by estimator 9814.

Timing advance determiner 9812 may then provide the updated timing advance to communication processor 9808. Communication processor 9808 may then update the timing advance used for transmission to the updated timing advance, and proceed to perform transmissions to network access node 9502 with the updated timing advance in stage 10012.

Returning to stage 10008, if timing advance controller 9810 determines that the separation distance or propagation delay is less than the threshold, terminal device 9504 may proceed to stage 10014. Accordingly, timing advance controller 9810 may instruct timing advance determiner 9812 to skip the local timing advance update in stage 10014. Timing advance determiner 9812 may therefore skip the local timing advance in stage 10014 by not performing the local timing advance update in stage 10014. Communication processor 9808 may therefore continue to perform transmissions with the original timing advance in stage 10016.

In some cases, this may free up reception and processing resources and/or reduce battery power expenditure at terminal device 9504. For example, in a case where timing advance determiner 9812 does not perform the local timing advance update if the separation distance and/or propagation delay is less than the threshold, terminal device 9504 may be able to receive wireless signals other than those transporting the synchronization pilot signal, and may, for example, not perform any processing of synchronization pilot signals to determine a timing advance update.

In some aspects, terminal device 9504 may continually repeat the procedure of method 10000. For example, timing advance controller 9810 may, for each timing advance update command received, determine whether the separation distance and/or propagation delay is less than the threshold and thus determine whether or not to perform a local timing advance update. Estimator 9814 may therefore be configured to estimate the separation distance or propagation delay each time a timing advance update command is received.

Figure 101:
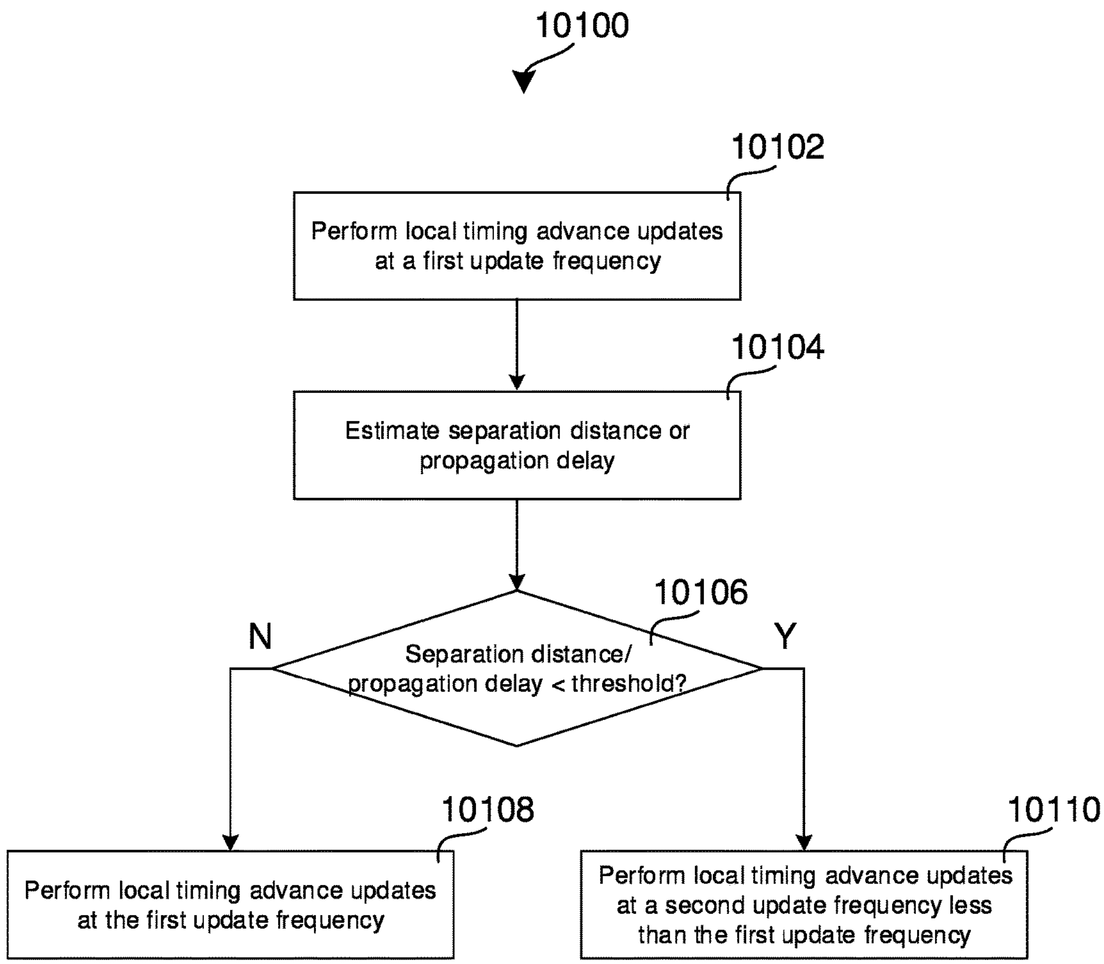
FIG. 101 shows an exemplary procedure for reducing the frequency of local timing advance updates based on separation distance or propagation delay according to some aspects.

FIG. 101 shows exemplary method 10100 according to some aspects, which may relate to a scenario where terminal device 9504 is configured to perform local timing advance updates according to fixed period. For example, the radio communication technology standard used by terminal device 9504 to communicate with the target device may dictate that terminal device 9504 perform periodic local timing advance updates according to a first update frequency. In some cases, this may enable terminal device 9504 to maintain time synchronization with the target device over time even when terminal device 9504 is not performing regular transmissions to the target device. While the exemplary case of FIG. 101 refers to network access node 9502 as the target device, other target devices such as other terminal devices may equivalently be used as the target device.

As shown in FIG. 101, timing advance determiner 9812 may initially perform local timing advance updates at the first update frequency in stage 10102. In some aspects, the first update frequency may be stipulated by a radio communication technology standard, or may be provided by the target device to terminal device 9504 as an instruction to perform timing advance updates at the first update frequency. The first update frequency can also be considered a scheduled update frequency, as terminal device 9504 may initially be scheduled to perform timing advance updates at the first update frequency.

In some aspects, timing advance controller 9810 may specify the first update frequency to timing advance determiner 9812, and timing advance determiner 9812 may then perform the local timing advance updates at the first update frequency (e.g., timing advance determiner 9812 may trigger the local timing advance updates at the first update frequency). In other aspects, timing advance controller 9810 may instruct timing advance determiner 9812 when to perform the local timing advance updates according to the first update frequency (e.g., timing advance controller 9810 may trigger the local timing advance updates at the first update frequency). Timing advance determiner 9812 may be configured to perform the local timing advance updates as previously described for stage 10010 in FIG. 100.

Estimator 9814 may then estimate the separation distance and/or propagation delay in stage 10104, and provide the separation distance and/or propagation delay to timing advance controller 9810. In some aspects, estimator 9814 may be configured to trigger estimation of the separation distance and/or propagation delay at the first update frequency, while in other aspects timing advance controller 9810 may be configured to instruct estimator 9814 to estimate the separation distance and/or propagation delay at the first update frequency.

Timing advance controller 9810 may then determine whether the separation distance and/or propagation delay is less than the threshold in stage 10106. If the separation distance and/or propagation delay is not less than the threshold, timing advance controller 9810 may control timing advance determiner 9812 to continue to perform local timing advance updates at the first update frequency in stage 10108 (e.g., by refraining from instructing timing advance determiner 9812 to change the update frequency). If the separation distance and/or propagation delay is less than the threshold, timing advance controller 9810 may control timing advance determiner 9812 to perform local timing advance updates at a second update frequency less than the first update frequency in stage 10110. For example, in cases where timing advance determiner 9812 is triggering the local timing updates, timing advance controller 9810 may instruct timing advance determiner 9812 to perform local timing advance updates at the second update frequency. In cases where timing advance controller 9810 is configured to instruct timing advance determiner 9812 each time a local timing advance update should be performed, timing advance controller 9810 may use the second update frequency to govern this triggering. In some aspects where estimator 9814 is configured to trigger estimation of the separation distance and/or propagation delay at an update frequency, timing advance controller 9810 may also instruct estimator 9814 to estimation of the separation distance or propagation delay at the second update frequency.

As the second update frequency is less than the first update frequency, terminal device 9504 may perform local timing advance updates less frequently when the separation distance and/or propagation delay is less than the threshold. As terminal device 9504 is therefore sufficiently close to the target device, terminal device 9504 may have more leniency in time synchronization with the target device. Terminal device 9504 may therefore free up reception and/or processing resources as well as reduce battery expenditure without critical loss in performance by reducing the update frequency.

In some aspects, timing advance controller 9810 may compare the separation distance and/or propagation delay to multiple different thresholds in stage 10106, where each of the thresholds is mapped to a different predefined update frequency. Timing advance controller 9810 may then identify the lowest-valued of the thresholds that the separation distance or propagation delay is less than, and instruct timing advance determiner 9812 to perform local timing advance updates at the update frequency mapped to the identified threshold.

Figure 102:
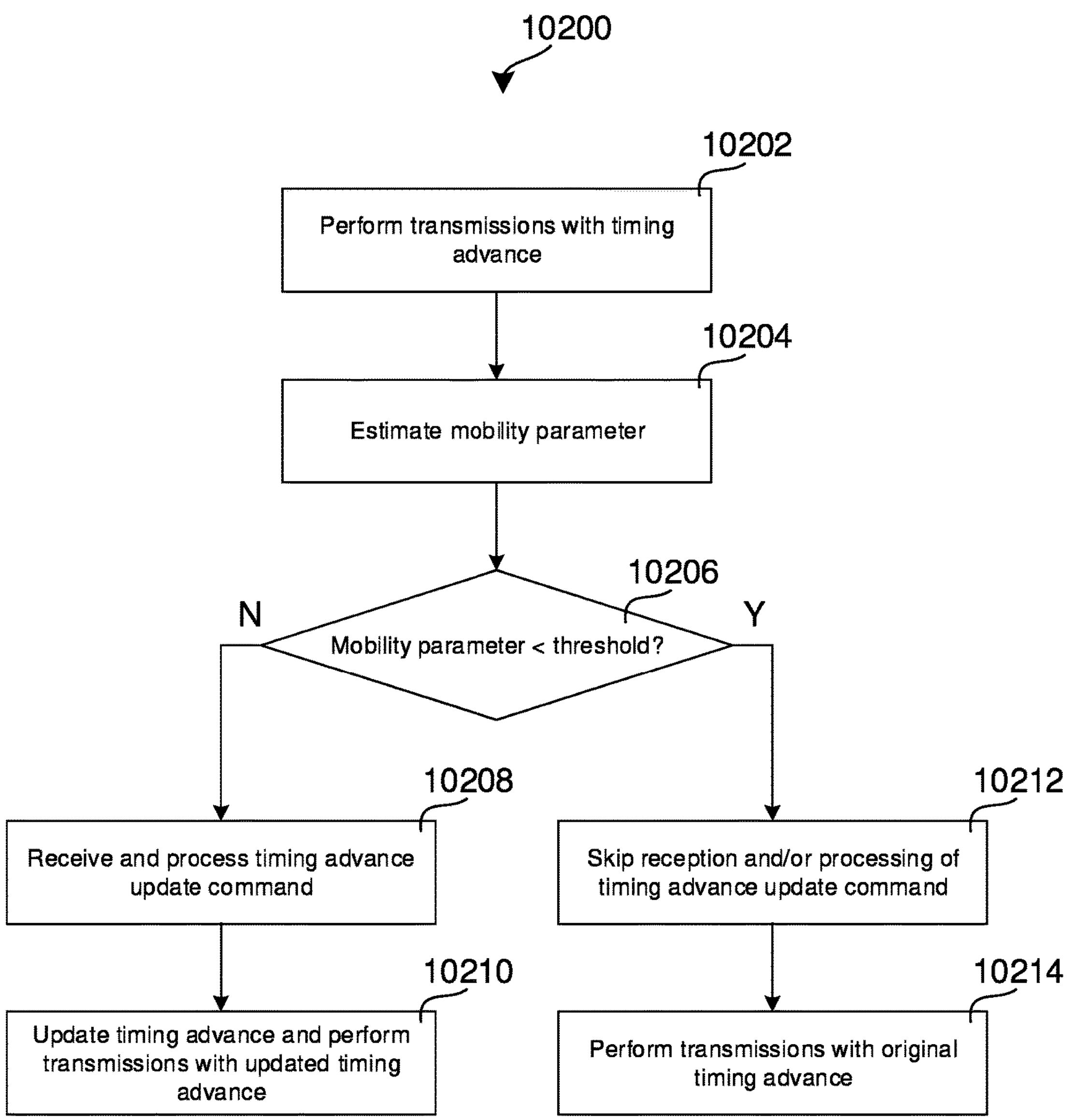
FIG. 102 shows an exemplary procedure for skipping processing of timing advance update commands based on a mobility parameter according to some aspects.
Figure 103:
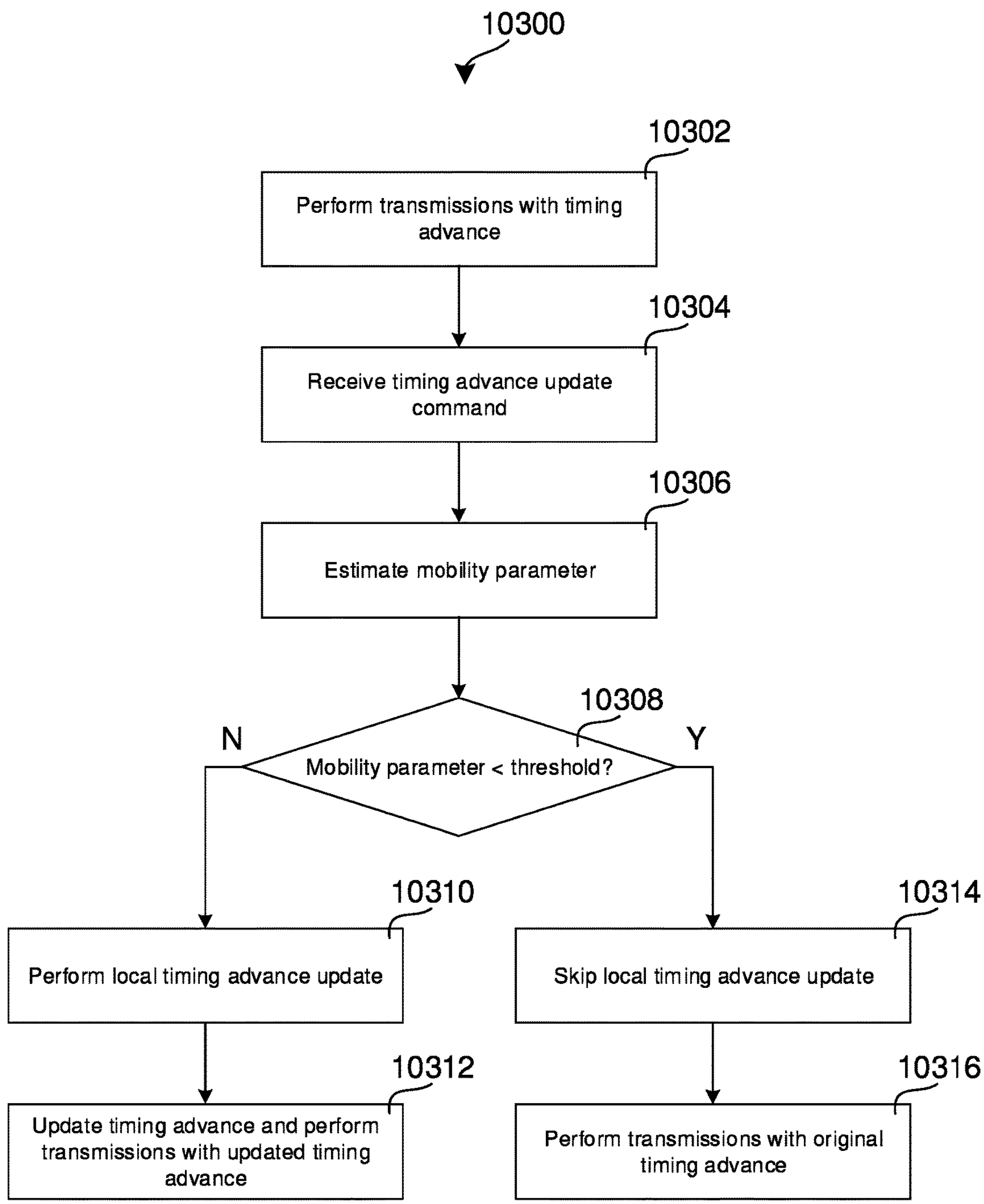
FIG. 103 shows an exemplary procedure for skipping local timing advance updates based on a mobility parameter according to some aspects.
Figure 104:
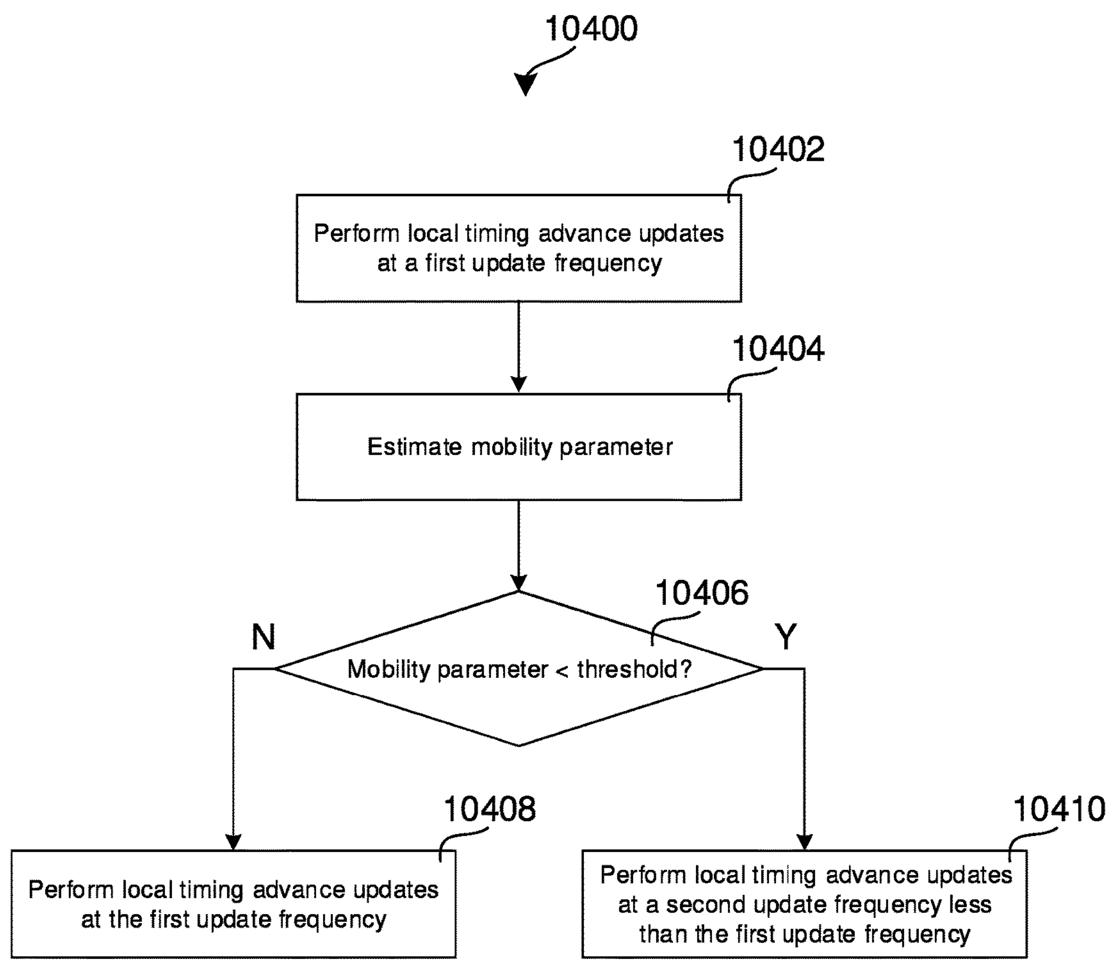
FIG. 104 shows an exemplary procedure for reducing the frequency of local timing advance updates based on a mobility parameter according to some aspects.

In some aspects, timing advance controller 9810 may consider additional or alternative factors to separation distance or propagation delay in deciding whether to skip or reduce the frequency of timing advance updates. For example, FIGS. 102-104 show exemplary message sequence charts 10200, 10300, and 10400 in which timing advance controller 9810 uses a mobility parameter of terminal device 9504 to decide whether the skip or reduce the frequency of timing advance updates. Without loss of generality, the mobility parameter can comprise, for example, a velocity and/or a distance traveled of terminal device 9504.

For example, in some aspects estimator 9814 may include a velocity sensor and may be configured to determine a velocity of terminal device 9504. Accordingly, estimator 9814 may be configured to determine the velocity of terminal device 9504 in stage 10204, 10306, and 10404. Timing advance controller 9810 may then compare the velocity of terminal device 9504 to a velocity threshold in stage 10206, 10308, or stage 10406. If the velocity of terminal device 9504 is greater than the velocity threshold, timing advance controller 9810 may, for example, decide to receive and process the timing advance update command in stage 10208, perform the local timing advance update in stage 10310, or perform local timing advance updates at the first update frequency in stage 10408. Terminal device 9504 may perform the other stages of message sequence charts 10200, 10300, and 10400 in the same or a similar manner as described above for message sequence charts 9900, 10000, and 10100.

In another example, estimator 9814 may include a position sensor and may be configured to determine a position of terminal device 9504 in stage 10204, 10306, and 10404. Estimator 9814 may then provide the position to timing advance controller 9810. Timing advance controller 9810 may then compare the position to a position of terminal device 9504 previously reported by estimator 9814 to obtain a distance traveled based on the difference between the current position and the old position. Timing advance controller 9810 may then compare the distance traveled of terminal device 9504 to a distance threshold in stage 10206, 10308, or stage 10406. If the distance traveled of terminal device 9504 is greater than the distance threshold, timing advance controller 9810 may, for example, decide to receive and process the timing advance update command in stage 10208, perform the local timing advance update in stage 10310, or perform local timing advance updates at the first update frequency in stage 10408. Terminal device 9504 may perform the other stages of message sequence charts 10200, 10300, and 10400 in the same or a similar manner as described above for message sequence charts 9900, 10000, and 10100.

In some cases, high mobility as indicated by velocity and/or distance traveled may indicate that the separation distance with the target device, e.g., network access node 9502, is changing. Accordingly, it may be important that terminal device 9504 perform more frequent timing advance updates, such as by refraining from skipping timing advance updates (e.g., by receiving and processing timing advance update commands, and performing local timing advance updates when instructed in a timing advance update command) and/or by refraining from reducing the frequency of timing advance updates (e.g., by not reducing the frequency of timing advance updates). Terminal device 9504 may therefore be configured to adjust the frequency of timing advance updates based on the velocity and/or distanced traveled of terminal device 9504.

Figure 105:
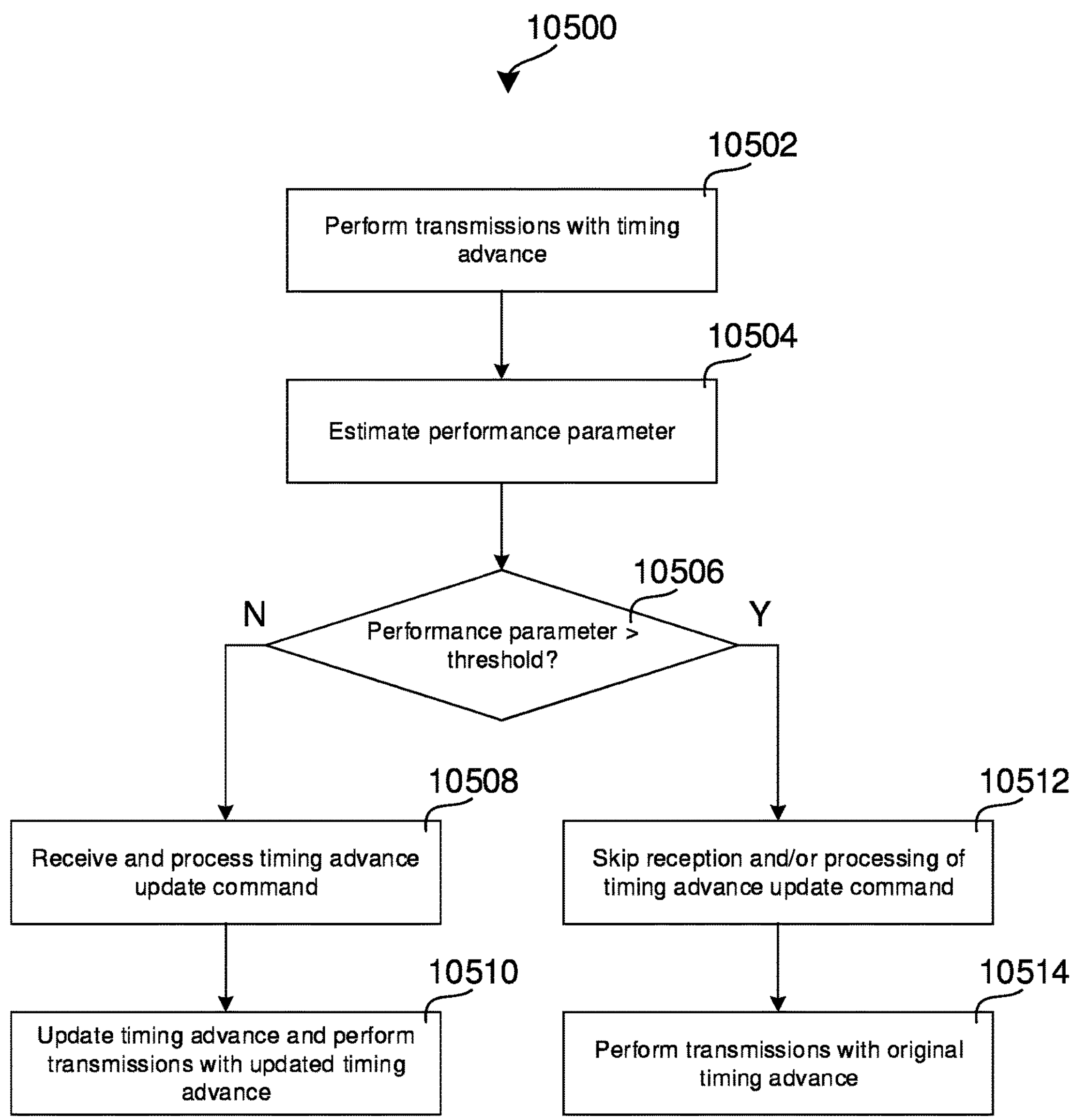
FIG. 105 shows an exemplary procedure for skipping processing of timing advance update commands based on a performance parameter according to some aspects.
Figure 106:
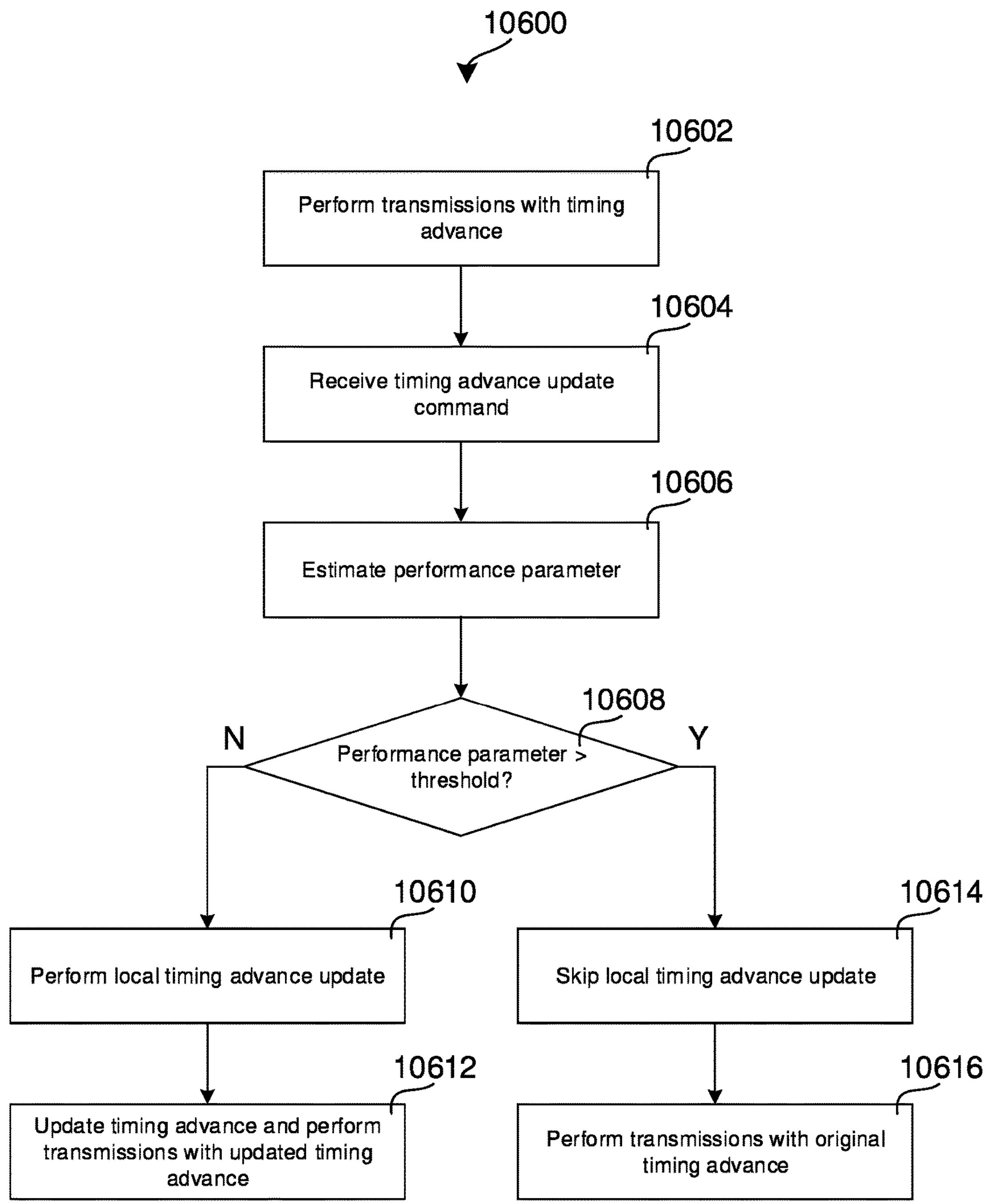
FIG. 106 shows an exemplary procedure for skipping local timing advance updates based on a performance parameter according to some aspects.
Figure 107:
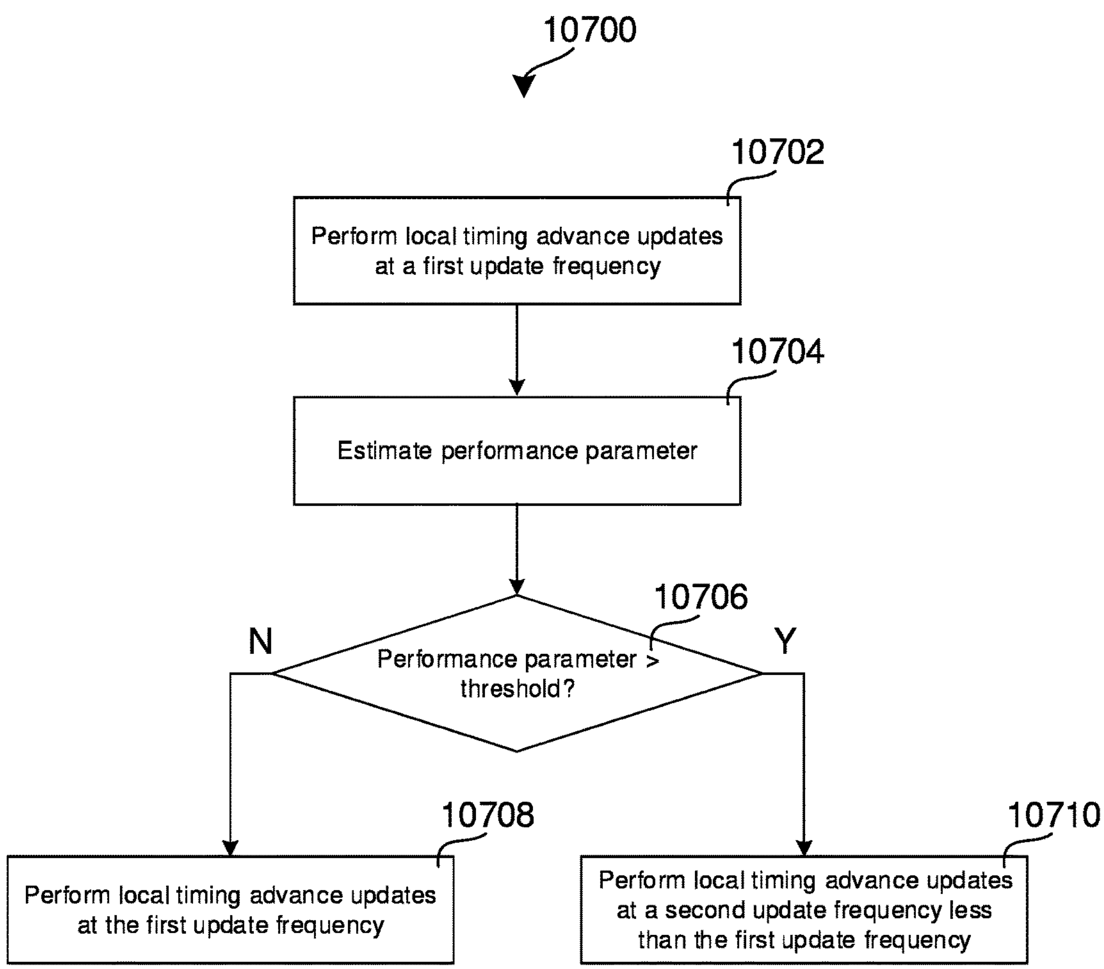
FIG. 107 shows an exemplary procedure for reducing the frequency of local timing advance updates based on a performance parameter according to some aspects.

In some aspects, timing advance controller 9810 may be configured to consider a performance parameter when deciding whether to skip timing advance updates or reduce the frequency of timing advance updates. FIGS. 105-107 show exemplary message sequence charts 10500, 10600, and 10700, in which timing advance controller 9810 may compare a performance parameter to a threshold to determine whether to skip or reduce the frequency of timing advance updates.

As shown in FIGS. 105-107, estimator 9814 may estimate a performance parameter in stage 10504, 10606, or 10704. The performance parameter can comprise, for example, any measurement or parameter that indicates characterizes the channel between terminal device 9504 and the target device, such as a channel quality, SNR, SINR, or an error rate. In some aspects, estimator 9814 may include a measurement engine configured to perform radio measurements on the channel between terminal device 9504 and the target device, and may use the measurement engine to estimate the performance parameter. Although not limited to such, this can be particularly effective when there is channel reciprocity on the channel, such as when time-division duplexing (TDD) is used between terminal device 9504 and the target device. In other aspects, estimator 9814 may be configured to receive a measurement reports from the target device that includes the performance parameter, which may be a similar measurement.

Estimator 9814 may then provide the performance parameter to timing advance controller 9810, which may compare the performance parameter to a performance threshold in stage 10506, 10608, or 10706. If the performance parameter is less than the performance threshold, timing advance controller 9810 may, for example, receive and process timing advance update commands in stage 10508, perform a local timing advance update in stage 10610, or continue to perform local timing advance updates at the first update frequency in stage 10708. Conversely, if the performance parameter is greater than the performance threshold, timing advance controller 9810 may, for example, skip reception and/or processing of the timing advance update command in stage 10512, skip the local timing advance update in stage 10614, or perform local timing advance updates at a second update frequency in stage 10710.

Accordingly, if performance is indicated as being low by virtue of the performance parameter being below the threshold, terminal device 9504 may not skip or reduce the frequency of timing advance updates. For example, low performance of the channel can indicate that the target device may have difficulty in receiving transmissions from terminal device 9504, and thus may not be able to tolerate any extra interference arising from timing advance error. Conversely, if performance of the channel is high, the target device may be able to tolerate timing advance error, and terminal device 9504 may consequently decide to skip timing advance updates or reduce the frequency of timing advance updates.

While considered applicable to all use cases, some aspects described herein may be particularly suited for implementation in new radio communication technology standards, such as mmWave, that use robust physical layer waveforms that are resilient to interference. Other radio communication technology standards or use cases that use low data rates, small cells, low-priority data, or high-latency data that can be repeated may also be particularly suited for these aspects.

Some waveforms help relaxing synchronization or are more resilient to synchronization error. Physical layer techniques can be developed that are more robust and can deal with synchronization error.

Figure 108:
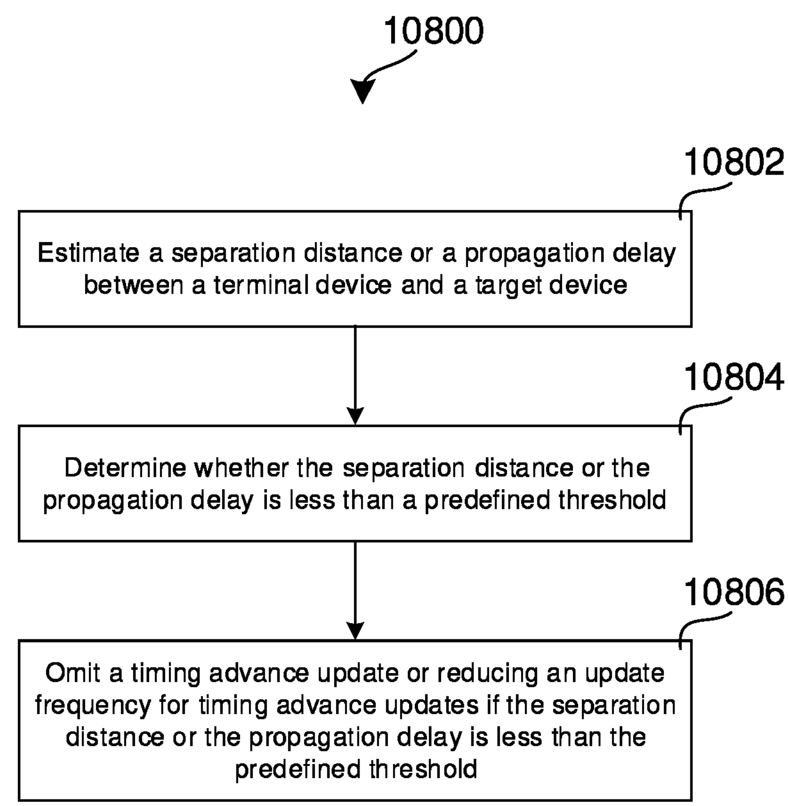
FIG. 108 shows an exemplary procedure for skipping or reducing the frequency of timing advance updates according to some aspects.

FIG. 108 shows method 10800 of performing wireless communications according to some aspects. As shown in FIG. 108, method 10800 includes estimating a separation distance or a propagation delay between a terminal device and a target device (10802), determining whether the separation distance or the propagation delay is less than a predefined threshold (10804), and omitting a timing advance update or reducing an update frequency for timing advance updates if the separation distance or the propagation delay is less than the predefined threshold (10806). For example, estimator 9814 of terminal device 9504 may be configured to estimate the separation distance or propagation delay between terminal device 9504 and the target device in stage 10802. Timing advance controller 9810 may then determine whether the separation distance or the propagation delay is less than the predefined threshold in stage 10804, and may control timing advance determiner 9812 to perform, skip (omit), or reduce the update frequency for timing advance updates based on the determination in stage 10806.

Trusted Device Authentication

As more vehicle are equipped with V2X capabilities, there may be an increase in the amount of data available for exchange between vehicles and/or the network. Since vehicle operation and overall network management may become increasingly reliant on the quality and integrity of this data exchange, the effective and safe transfer of data from device-to-device and device-to-network may be an important feature. In some aspects of this disclosure, methods and devices are provided to authenticate the sources of data in V2X communications.

As described below, there may be various methods for devices such as vehicular communication devices to exchange authenticated data in the V2X setting. This data exchange may be, for example, between vehicular communication devices operating at high speeds, and the integrity and veracity of the exchanged data may be an important consideration. Accordingly, various aspects may provide methods to verify the source of data and blacklist devices which have been flagged as false/bogus. Furthermore, various aspects may relate to methods and devices configured for data exchange with differing levels of detail among a plurality of vehicles are disclosed. For example, these differing levels of detail can depend on certain vehicular communication device characteristics, such as higher levels, and more detailed information may be exchanged between vehicles of a common manufacturer. Various aspects may further provide methods and an interface for providing data from vehicular communication devices to higher authorities, such as vehicle manufacturers, service providers, regulatory authorities, law enforcement authorities, etc.

As the application of V2X expands, data acquired by vehicular communication devices may become a valuable resource for network efficiency and safety, such as for vehicular communications and autonomous driving. However, this data may also be vulnerable to exploitation, and thus may warrant extra protection. As data acquired by vehicular communication devices will continue to increase in both volume and complexity as V2X applications continue to grow, there may be an increased demand for effective methods and devices to verify data provided by other sources.

Figure 109:
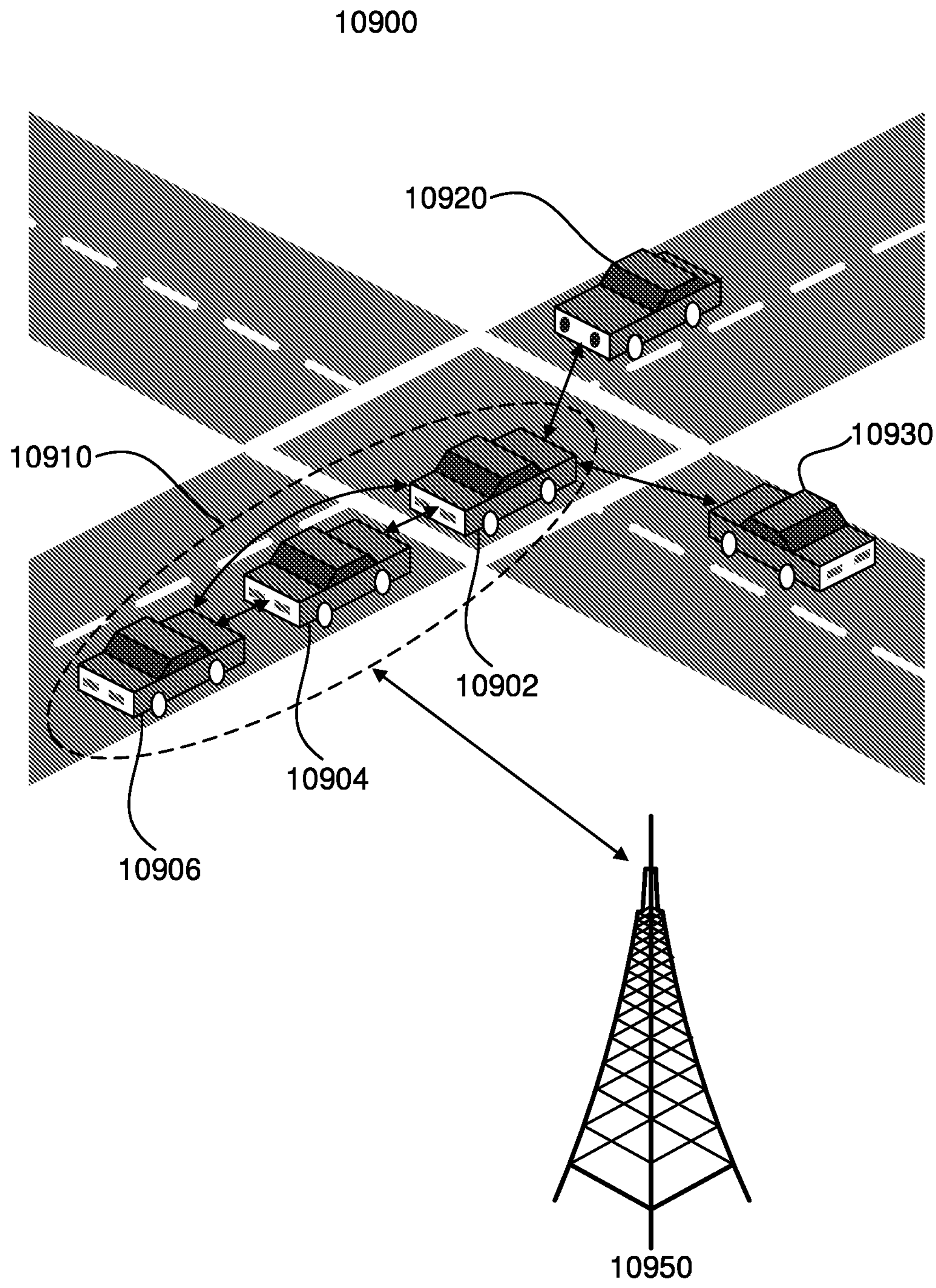
FIG. 109 shows an exemplary network scenario of vehicular communication devices verifying sources of data using trusted device authentication according to some aspects.

FIG. 109 shows an exemplary illustration 10900 for vehicular communication devices to verify sources of data according to some aspects of this disclosure. As shown in FIG. 109, vehicular communication devices 10902-10906 may belong to cluster 10910, while vehicular communication devices 10920-10930 may be external to cluster 10910. In some aspects, the vehicular communication devices of cluster 10910 may coordinate to manage channel resources between multiple vehicular radio communication technologies, such as DSRC, LTE V2V/V2X, and/or any other vehicular radio communication technologies, as described herein.

Prior to and/or during the creation of cluster 10910, vehicular communication devices 10902-10906 may be configured to verify sources of data within cluster 10910, such as with the other vehicular communication devices in the cluster. A focus of this authentication in some cases is to prevent against the acquisition and/or implementation of fraudulent or malicious data, which can include falsified speed, traffic, and/or camera/imaging data. Vehicular communication devices 10902-10906 may utilize certificates and signatures provided to verify data sources.

A vehicular communication device may be provided with a certificate from a particular trusted authority, such as a vehicle manufacturer or service provider. The certificate may include a public key and metadata detailing information about the certificate (e.g., the identity of the issuer, validity time, etc.). The certificate can also be signed with a hash that is usable to verify whether the certificate has been tampered. The vehicular communication device that possesses the certificate may also have a private key corresponding to the public key specified in the certificate (where the private key was either locally generated or issued by the entity that generated the certificate). The vehicular communication device may therefore be able to create signatures for messages using the private key, such as by processing the data in the message using the private key to derive a signature that uniquely depends on both the data in the message and the private key. The vehicular communication device may then send the message, signature, and certificate to another vehicular communication device (where the private key remains secret). The other vehicular communication device may then use the public key specified in the certificate to check whether the signature is valid. As only devices that know the private key can create signatures that can be verified with the public key in the certificate, the other vehicular communication device may be able to determine whether the vehicular communication devices knows the private key (and is thus assumed to be trusted by the trusted authority). Vehicular communication devices that can sign messages with a valid signature for a certificate issued by a trusted authority may therefore also be assumed to be trusted.

In addition to verifying individual messages using the signature and public key, vehicular communication devices may also verify whether the certificate was actually issued by the purported issuer (e.g., as indicated in the metadata). For example, a vehicular communication device that receives a certificate from another vehicular communication device may check with a gatekeeper authority that has a database of valid certificates and their issuers whether the certificate was issued by the purported issuer. Additionally or alternatively, the vehicular communication device may have its own local database of valid certificates and their issues, and may reference this database with received certificates. The vehicular communication device may also check the hash (if any) on the certificate to ensure the certificate has not been tampered with.

The trusted authority may provide certificates to multiple vehicular communication devices, where the certificates may either be the same (e.g., common to multiple vehicular communication devices under the authority of the trusted authority) or may be uniquely tailored to individual vehicular communication devices (but still issued by the same trusted authority, for example as indicated in the certificate metadata). In this manner, vehicular communication devices common to the particular trusted authority may all share the trusted authority's certificate, which may be used to exchange higher levels of data as described later in this disclosure.

Accordingly, when forming clusters, vehicular communication devices 10902-10906 may be configured to transmit their certificates to the other vehicular communication devices during cluster creation. Vehicular communication devices 10902-10906 may then be configured to validate the certificates from the other vehicular communication devices with a gatekeeper authority. For example, the network may act as the gatekeeper authority and may have a database of all valid certificates. In an example using a vehicle manufacturer as the issuer of the certificates, the network may be able to verify whether each certificate was actually issued by the vehicle manufacturer claimed in the certificate (e.g., in the metadata). The network may then notify vehicular communication devices 10902-10906 whether the certificates are valid or not. If the certificates are valid, vehicular communication devices 10902-10906 may then exchange signed messages with each other by generating a signature to accompany each message using their private key. As the certificates have already been validated by the gatekeeper authority, vehicular communication devices 10902-10906 may assume that a message having a signature corresponding to a validated certificate is a legitimate message. In this manner, vehicular communication devices 10902-10906 may be able to determine whether or not exchanged information is trustworthy or not. In some aspects, vehicular communication devices 10902-10906 may only initially exchange certificates, and may then use these initially exchanged certificates for data exchange (e.g., by verifying signatures from a vehicular communication device using the previously validated certificate). In other aspects, vehicular communication devices 10902-10906 may repeatedly exchange certificates.

In one aspect of this disclosure, each of vehicular communication devices 10902-10906 may be configured to independently verify the other vehicular communication devices, as indicated by the double headed arrows between each of them in FIG. 109. In another aspect of this disclosure, a cluster head, such as vehicular communication device 10904, may be configured to verify the certificates of other vehicular communication devices 10902 and 10906 and subsequently share the verification with the other vehicular communication devices in cluster 10910. In some cases this can simplify the verification procedure. In other words, vehicular communication devices 10902 and 10906 may not directly verify one another, and thus where the verification shown by the curved double headed arrow between 10902 and 10906 in FIG. 109 can be omitted.

By performing this verification process, vehicular communication devices operating in a cluster may be able to verify the source of data (e.g., whether the transmitting vehicular communication device can provide a certificate from a trusted authority and can generate valid signatures for the certificate). Once the certificates are verified, the vehicular communication devices may freely exchange signed data with each other (e.g., while checking received data to ensure the signature is valid for the earlier-verified certificate). Such data may include, but is not limited to, usage, imaging/sensor, speed, road condition, signs, traffic, weather, optimal beams to use for wireless communications, or the like. In some aspects, higher levels of information (e.g., more sensitive information), such as vehicle dynamics including engine operating parameters/specifications, suspension information, vehicle hardware operating parameters or the like, may only be shared among vehicles that share a common trusted authority as governed by their certificates, such as common vehicle manufacturer. Basic data can then be shared with all vehicular communication devices regardless of whether they can produce a valid certificate from the trusted authority. In some cases, this type of highly detailed data exchange may serve to optimize vehicle performance among vehicles with similar components.

Accordingly, vehicular communication devices with a certificate from a common trusted authority may not only be configured to verify the source of the certificate but also able to identify that they share a common certificate issuer that is a trusted authority. This certificate verification can be done with or without network assistance. For example, after receiving a certificate from vehicular communication device 10902, vehicular communication device 10904 may be configured to locally identify that the certificate was issued by the same vehicle manufacturer that provided its own certificate. For example, vehicular communication device 10904 may include a database of validated certificates mapped to their certificate issuers. Vehicular communication device 10904 may therefore be able to reference the database with the certificate provided by vehicular communication device 10902 to determine whether the certificate was issued by the same vehicle manufacturer. In some cases, this can simplify the verification process by avoiding network dependency for verification.

In one aspect of this disclosure, the verification process between the vehicular communication devices may be performed with the network operating as a gatekeeper authority, e.g., via network access node 10950. Accordingly, one or more of vehicular communication devices 10902-10906 may be configured to communicate with network access node 10950 after the receipt of a certificate from another vehicular communication device and the network may check whether the certificate has been registered with the network as coming from a trusted source. In some aspects, the network may have its own database of valid certificates, while in other aspects the network may verify certificates with the purported issuer of the certificate (e.g., the manufacturer). Upon verification, the network may communicate to vehicular communication device that the other device that provided the certificate may be trusted (see FIG. 110).

Furthermore, vehicular communication devices and the network may be configured to determine between short-term/dynamic information, which can difficult to process quickly enough for the infrastructure to implement for wide-ranging use to share with other vehicular communication devices, and long-term/static information, which can be stored and used for longer periods of time. The vehicular communication devices may be configured to communicate at least some of the acquired data/information with the network so that the network may assist in processing and/or storing the more static information for transmission to other vehicular communication devices.

In the exemplary scenario of FIG. 109, some or all of the vehicular communication devices within cluster 10910 may produce valid certificates and be verified as such. One or more of vehicular communication devices 10902-10906 may then be configured to verify an outside source, such as vehicular communication devices 10920 and/or 10930, to share that acquired outside source's data with the rest of the cluster 10910. For example, vehicular communication device 10902 may verify the certificate of vehicular communication device 10920 (e.g., locally or by using a gatekeeper authority) and, upon verification, may acquire data (e.g., accompanied with a valid signature for the certificate) to share with the rest of cluster 10910. As the certificate of vehicular communication device 10920 has been verified, vehicular communication devices 10902-10904 may assume subsequent data provided by vehicular communication device 10920 accompanied by a valid signature for the data (e.g., as verified by one or more of vehicular communication devices 10902-10904 using the public key in the certificate) is valid data originating from vehicular communication device 10920. In various aspects, vehicular communication device 10902 may not only verify that the certificate of vehicular communication device 10920 is valid, but also determine whether the certificate was issued by a trusted authority, such as the same vehicle manufacturer. In some aspects, the vehicular communication devices in cluster 10910 may be configured to exchange higher levels of information (e.g., more sensitive information) with vehicular communication device 10920 only if vehicular communication device 10920 can produce a certificate issued by a trusted authority (e.g., the same manufacturer) and produce valid signatures for that signature.

Figure 110:
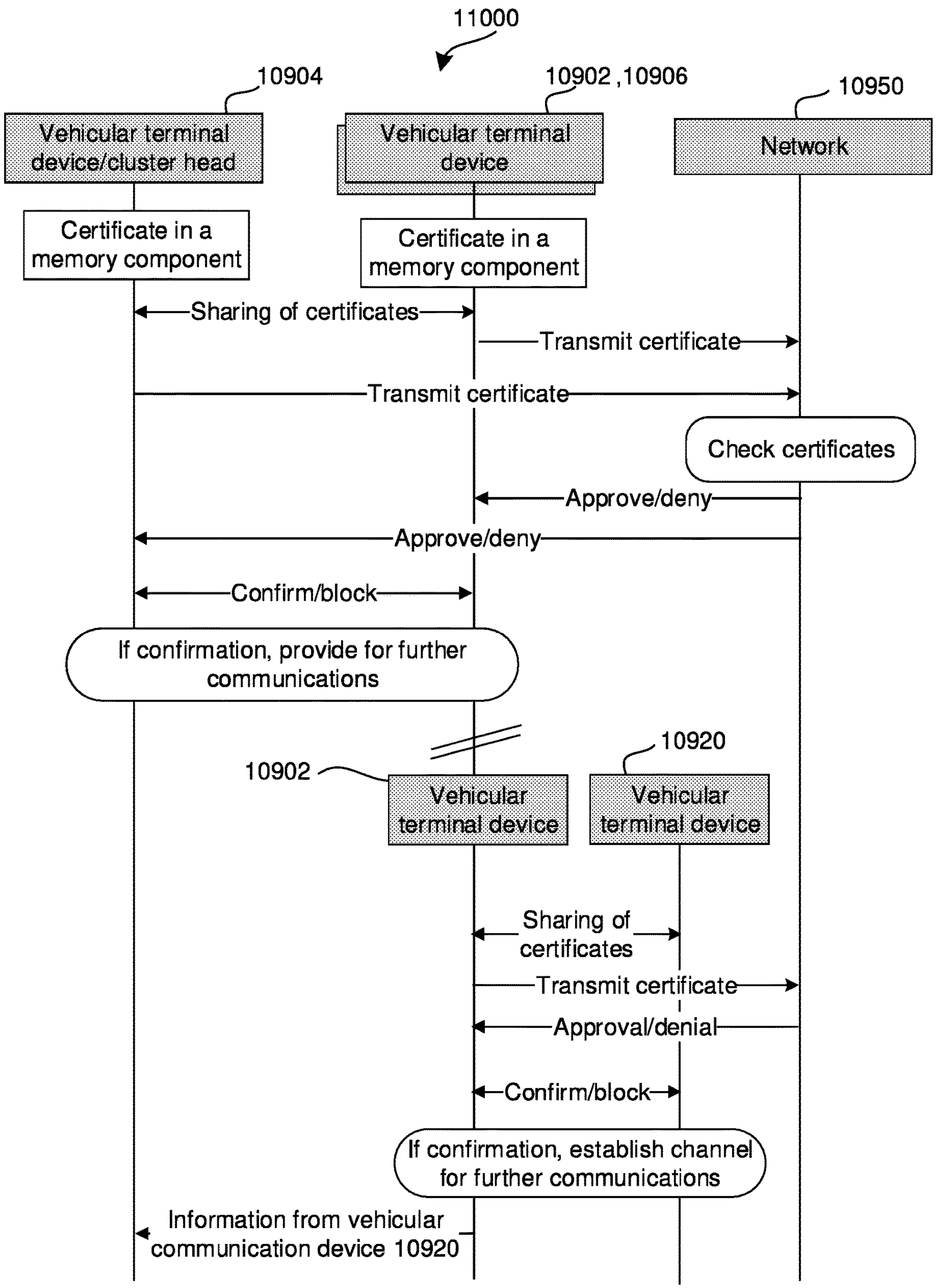
FIG. 110 shows an exemplary message sequence chart of trusted device authentication based on certificates provided by vehicular communication devices according to some aspects.

FIG. 110 is an exemplary message sequence chart 11000 showing the exchange of messages between vehicular communication devices and/or the network described with respect to FIG. 109.

As shown in message sequence chart 11000, the network may be configured to check each of the certificates against a database accessible by the network to verify whether the certificates have been registered with the network and/or check to see if the device is on a "blacklist" of devices flagged as fraudulent or bogus. If the certificates have been registered with the network, network access node 10950 (or a core network server located in the network, for example) approves the certificates, and communicates with each of vehicular communication devices 10902-10906 that the certificates have been approved in order for vehicular communication devices 10902-10906 to establish a channel for further communications. Once the channel has been established, the vehicular communication devices may exchange data by generating signatures using the public keys in their respective certificates, and transmitting the data accompanied by the signatures to others of the vehicular communication devices.

However, if the devices are on the blacklist (e.g., if data previously provided with the certificate, such as by another device, has been identified as being fraudulent), the network may communicate with vehicular communication devices 10902-10906 to cease all communications with the "blacklisted" device and block communications with the device. The lower portion of message sequence chart 11000 is an exemplary exchange of messages when communicating with new vehicular communication device 10920 (as shown in FIG. 109).

If the signed certificate is not in either of the approved or blacklisted lists in the database, network access node 10950 may add the device to the blacklisted device while it takes further precautionary measures to determine whether the device can be trusted, e.g., check with the certificate's purported issuer to verify it can be trusted. The network may then send a confirmation to the vehicular communication device if the certificate is valid, or a rejection if the certificate is marked as compromised or unknown. If unknown, the network may undertake further procedures to verify the authenticity of the certificate to confirm future requests.

For example, if a "bogus" device is unable to produce a verifiable certificate, the network may blacklist the bogus device. Alternatively, if a device produces a certificate but has been previously associated with fraudulent data (e.g., signed data connected to the certificate has been identified as being fraudulent), the network and/or receiving vehicular communication device may be configured to check the integrity of the data and, if the data is determined to be fraudulent, blacklist the device.

In some aspects, vehicular communication devices, such as vehicular communication devices 10902-10906, may also be configured with authentication algorithms in case the network is unable to serve as a gatekeeper authority for data exchange in V2X communications (e.g., if the vehicle is out of range of the network). In this manner, vehicular communication devices may be able to determine the integrity of data obtained from other devices on their own (in other words, without network assistance). For example, vehicular communication devices may be configured to receive a communication request from another device and store the request in a cache while the certificate is verified. In some aspects, vehicular communication devices may be pre-programmed with a database of certificates issued by a trusted authority (e.g., a particular manufacturer), and may therefore determine whether certificates provided by other vehicular communication devices were validly issued by the trusted authority without relying on network assistance. In some aspects, the vehicular communication devices may be configured to receive periodic updates of "blacklisted" devices from the network, and may flag data received from blacklisted devices as being potentially fraudulent. Upon approval of the received certificate, the vehicular communication device may store the approved certificate in a memory component for future communications.

Such authentication methods can include the implementation of symmetric key, public/private key pair, or other cryptographic algorithms. By implementing these algorithms in the manners described, machine executable instructions programmed into a computer readable medium and executable by one or more processors of the vehicular communication devices are able to effectively monitor the integrity of the data exchanged.

In some aspects, vehicular communication devices and/or the network may be configured to "tag" all data originating from a "blacklisted" source to remove this data from its central database where so as to avoid future transmission of this data. For example, if exchanged data is saved in a database for later use (e.g., for machine learning algorithms for autonomous driving), the data may be tagged with a source identity that identifies the device that provided the data and/or the certificate that was provided with the data. If the device is later determined to be blacklisted (e.g., providing fraudulent data, or using a fraudulent certificate), or if the certificate is later determined to be fraudulent, the manager of the database (e.g., a vehicular communication device storing the database or the network) may flag all data associated with the blacklisted device or fraudulent certificate. The flagged data may either be completely discarded or set aside for more intensive verification to determine whether it is fraudulent or not.

Figure 111:
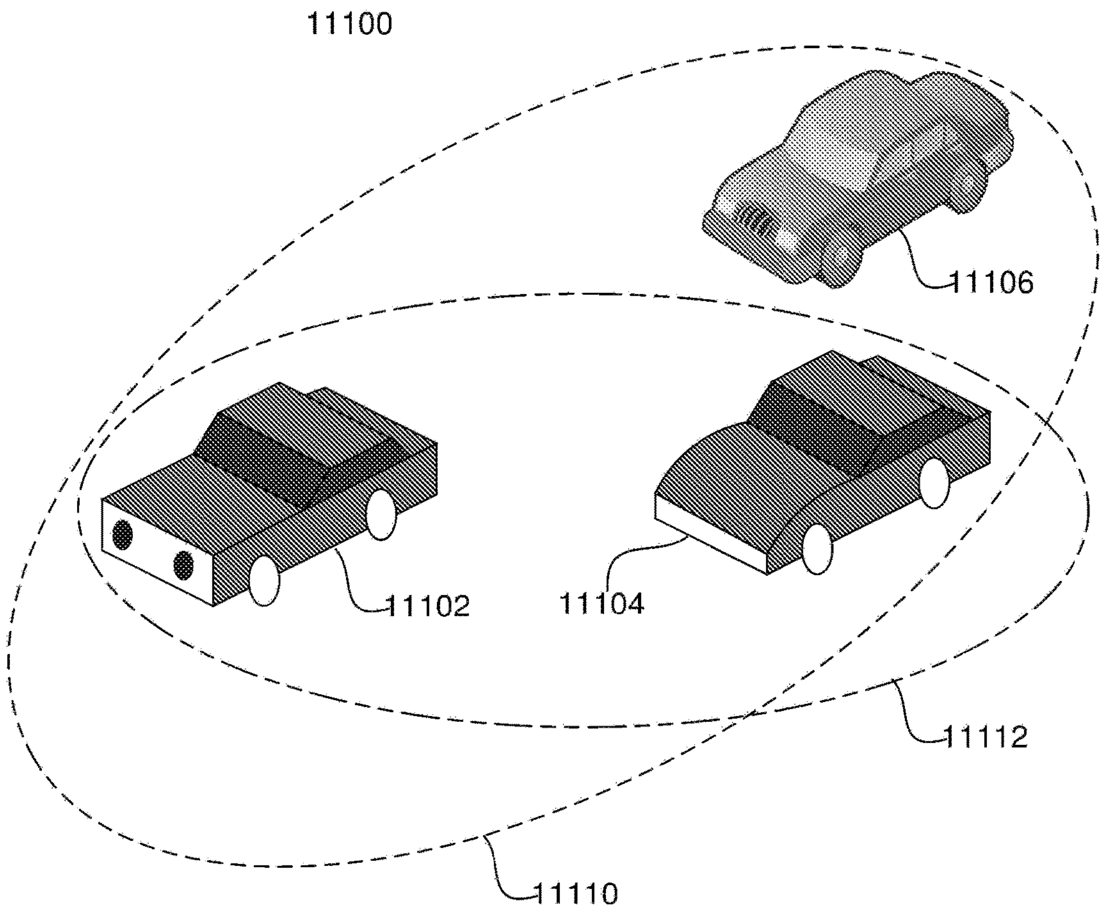
FIG. 111 shows an exemplary network scenario of sharing different types of data with other vehicular communication devices based on the certificate exchange according to some aspects.

FIG. 111 is an exemplary illustration 11100 showing vehicular communication devices 11102-11106 with differing levels of data exchange based on each of the vehicular communication device's certificates.

Vehicular communication devices 11102-11106 may all be configured to share a first level of information with one another as indicated by grouping 11110. This first level information may include data for safety features, autonomous driving (e.g., camera or traffic data), beamforming data, or the like. However, during the verification process, vehicular communication devices 11102-11104 may have identified each other's respective certificates as being provided from a common trusted authority, e.g., vehicle manufacturer. Vehicular communication devices 11102-11104 may therefore be configured to exchange higher levels of data, e.g., vehicle dynamics, between each other. However, the certificate provided by vehicular communication device 11106 may not be issued by the common trusted authority (e.g., may be issued by a different manufacturer). As indicated by grouping 11112, vehicular communication devices 11102-7106 may not share the higher levels of data with vehicular communication device 11102, and may instead only share basic data with vehicular communication device 11106.

Without loss of generality, an exemplary scenario in which such levels of communication may be beneficial can be in off-terrain situations, where vehicular communication devices 11102-11104 may have adjustable suspensions and share suspension information with each other for optimal vehicle performance.

Figure 112:
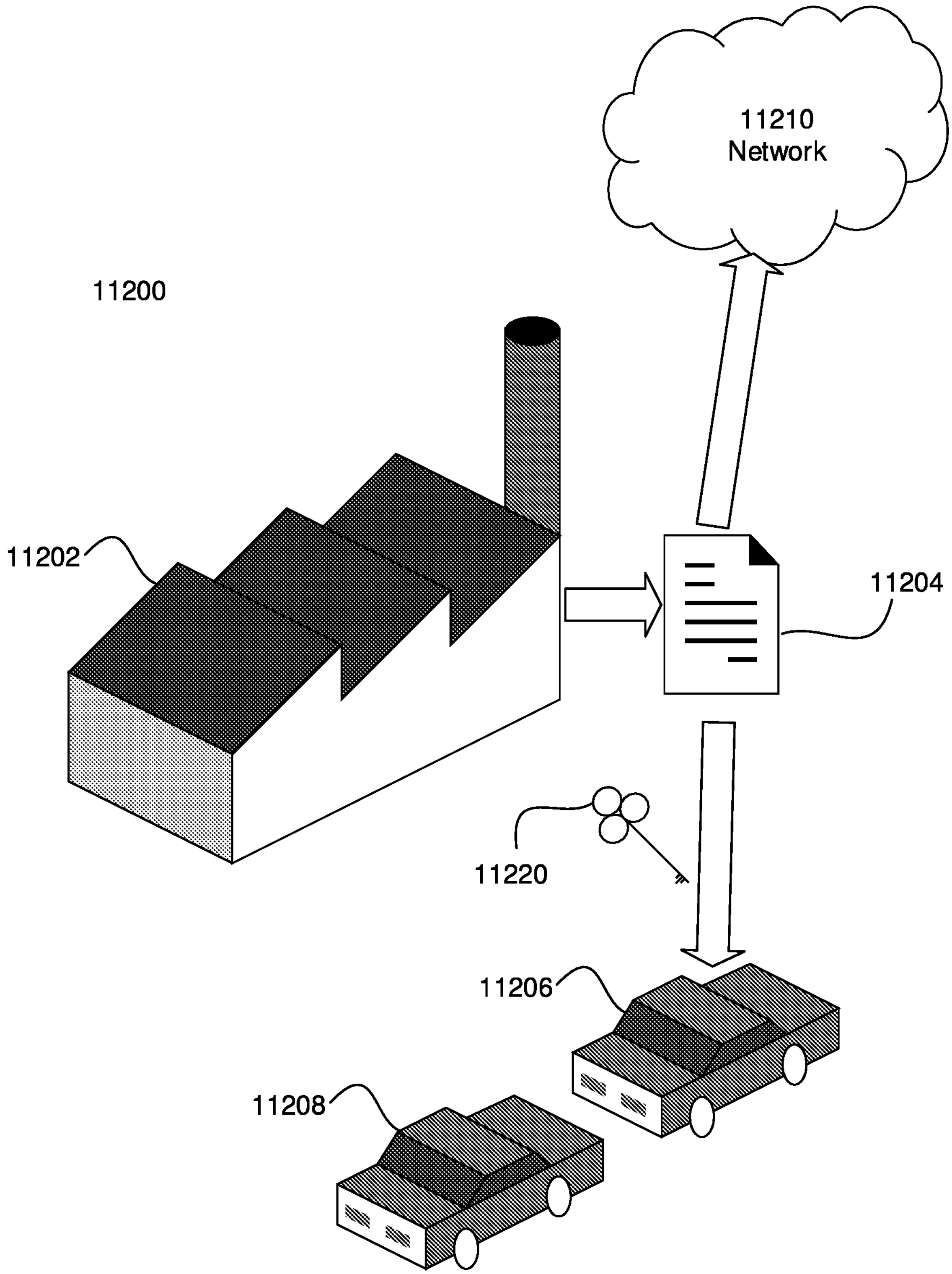
FIG. 112 shows an example describing issuance of certificates to vehicular communication devices by a manufacturer according to some aspects.

FIG. 112 is an exemplary illustration 11200 showing a manufacturer 11202 providing a certificate 11204 to a vehicular communication device 11206. It is appreciated that other providing and/or manufacturing entities (e.g., service providers, regulatory authorities, etc.) may implement a similar method as shown with respect to manufacturer 11202.

As shown, manufacturer 11202 provides a certificate 11204 which it registers with network 11210 certifying that all devices with certificate 11204 comes from a trusted authority, e.g., the vehicle manufacturer. The certificates may specify a public key and metadata for the certificate, and may optionally be signed with a hash. Certificate 11204 is installed into each vehicular communication device 11206-11208 produced by the manufacturer. Furthermore, each vehicular communication device may be provided with a private key 11220 (which may be the same or different) that can be used to generate signatures that can be validated with the public key in certificate 11204. In various aspects, the certificate 11204 installed into each vehicular communication device may be the same and have the same private key 11220, or may be different (e.g., different public keys, but potentially with the same metadata that identifies manufacturer 11202 as the issuer) with different private keys 11220. In some aspects, the private key 11220 may be stored in a trusted module platform (TPM) in a communication component of the vehicular communication device 11206. The certificate 11204 may also be signed with a hash (e.g., that is signed with private key 11220 or another private key of a private-key public pair used by manufacturer 11202 or whichever entity generates the certificate 11204) that receivers of certificate 11204 can use to verify that the certificate 11204 has not been tampered with.

Accordingly, the network 11210 will store certificate 11204 in a database of certificates provided by trusted authorities, and may subsequently be able to verify certificate 11204 when requested. For example, during operation vehicular communication device 11206 may generate a signature for data using private key 11220, and may provide the data, signature, and certificate 11204 to vehicular communication device 11208. Vehicular communication device 11208 may receive the data, and may check with network 11210 (and/or in its own local database of certificates known to be issued by manufacturer 11202) whether certificate 11204 was actually issued by manufacturer 11202. Vehicular communication device 11208 may also use the public key included in certificate 11204 to determine whether the signature for the data is a valid signature (as only possessors of private key 11220 can generate signatures that can be validated with the public key in certificate 11204). Accordingly, vehicular communication devices 11206-11208 will be able to identify one another as being from the same manufacturer 11202 to exchange higher levels of information with each other.

Figure 113:
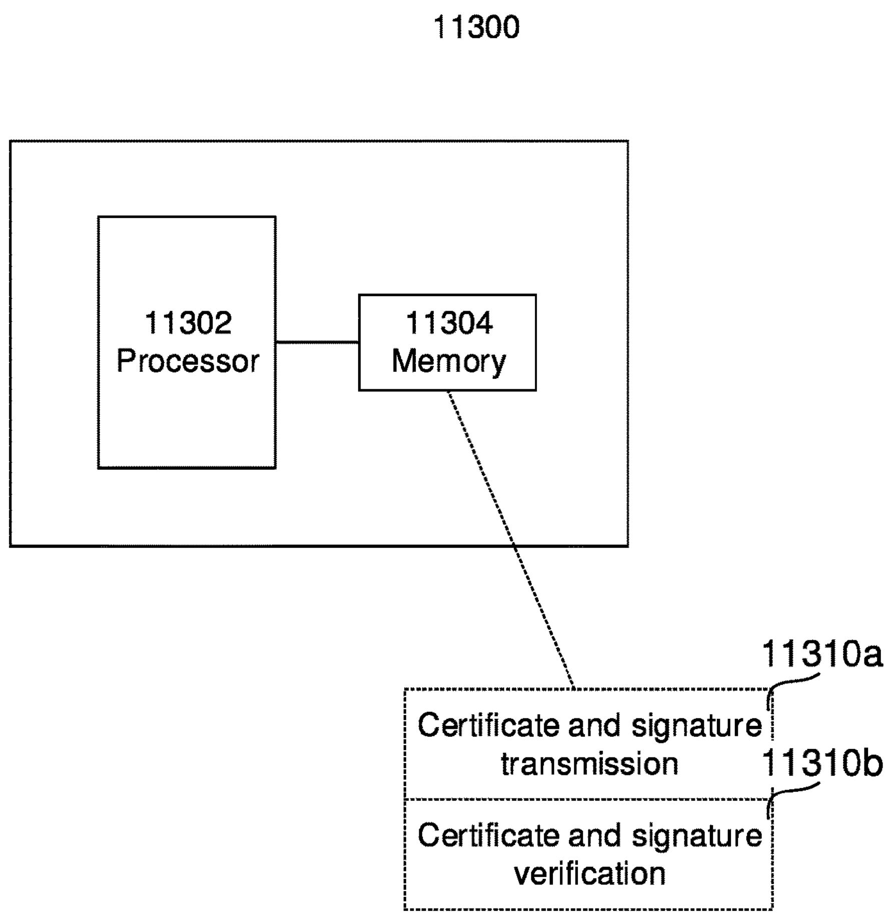
FIG. 113 shows an exemplary internal configuration of a controller configured to transmit and verify signatures and certificates according to some aspects.

FIG. 113 shows an exemplary internal configuration of controller 11300 according to some aspects, which may be included in a communication arrangement of a vehicular communication device. For example, controller 606 of vehicular communication device 500 shown and described in FIGS. 5 and 6 be configured in the manner shown for controller 11300 in FIG. 113.

As shown in FIG. 113, controller 11300 may include processor 11302 and memory 11304. Processor 11302 may be a single processor or multiple processors, and may be configured to retrieve (e.g., from a local memory) and execute program code to perform the transmission and reception, channel resource allocation, and cluster management as described herein. The program code may be updatable, such as wirelessly or by a manual install. Processor 11302 may transmit and receive data over a software-level connection that is physically transmitted as wireless radio signals by digital signal processor 11104, RF transceiver 11102, and antenna system 11006. Memory 11304 may be a non-transitory computer readable medium storing instructions for a certificate and signature transmission subroutine **11310*a* and certificate and signature verification subroutine 11310*b***.

Certificate and signature transmission subroutine **11310*a* and certificate and signature verification subroutine 11310*b* may each be an instruction set including executable instructions that, when retrieved and executed by processor 11302, perform the functionality of controller 11300 as described herein. In particular, processor 11302 may execute certificate and signature transmission subroutine 11310*a* prior to transmitting a data in order for the receiving party to authenticate the source of the data, e.g., vehicular communication device with controller 11300. As previously described, this may include retrieving the certificate upon demand from a memory of the vehicular communication device and providing the certificate to a requesting device. This can also include signing data with the private key included in the certificate to generate a signature for the data, and transmitting the data and accompanying signature to another vehicular communication device. Certificate and signature transmission subroutine 11310*a*** may also include instructions to determine one or more specific receivers to transmit the data, signature, and certificate, such as to a cluster head for simplified verification as described in this disclosure.

Processor 11302 may further execute certificate and signature verification subroutine **11310*b* upon receiving a certificate from another vehicular communication device. As previously described, this may include verifying certificates using the network as a gatekeeper authority or locally verifying certificates by checking the certificate against a local database of certificates issued by trusted authorities. Certificate and signature verification subroutine 11310*b* can also include instructions to check whether a certificate or supplying device is blacklisted, either by checking with the network or with a local list of blacklisted certificates and devices. Certificate and signature verification subroutine 11310*b* may also include instructions to verify signatures with a certificate, such as by using a public key in the certificate to determine whether the signature if a valid signature for the signature (e.g., whether the signature was generated for the data by a possessor of the private key corresponding to the public key). Certificate and signature verification subroutine 11310*b* may also include instruction to check a hash attached to a certificate (e.g., checking with a public key in the certificate or with another public key provided by the certificate issuer) to determine whether the certificate has been tampered with. Furthermore, the certificate and signature verification subroutine 11310*b* may include an instruction set, which when executed by the processor, identifies that the verified certificate was provided by a same provider who provided the vehicular communication device (in which controller 11300** is located) with its own certificate. Accordingly, the instruction set may include executable instructions to exchange higher levels of data with devices sharing a common provider of certificates.

Figure 114:
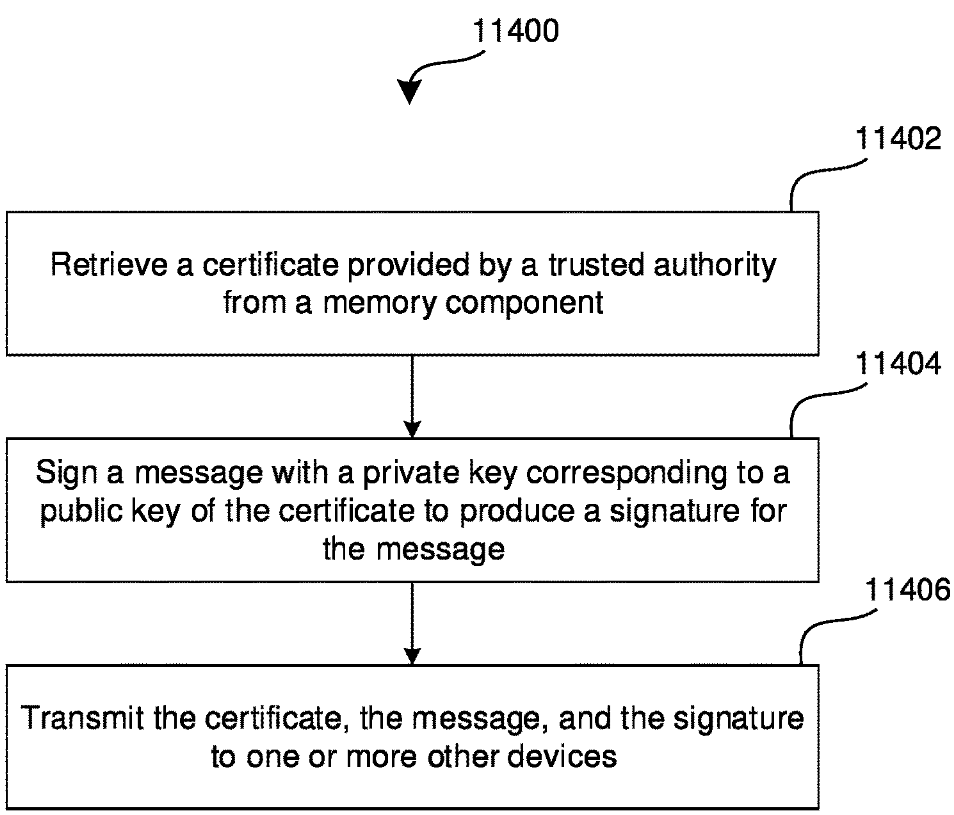
FIG. 114 shows an exemplary procedure for providing certificates and signed messages to other devices as part of trusted device authentication according to some aspects.

FIG. 114 is a flowchart 11400 describing a method for certificate transmission in vehicular radio communications in an aspect of this disclosure. It is appreciated that flowchart 11400 is exemplary in nature and may thus be simplified for purposes of this explanation.

The vehicular communication devices of this disclosure may be configured to perform the method described in flowchart 11400 to certify its transmissions for receiving devices. In stage 11402, the vehicular communication device retrieves a certificate provided by a trusted authority from a memory component of the vehicular communication device. In stage 11404, the vehicular communication device signs a message with a private key corresponding to a public key of the certificate to produce a signature for the message. In stage 11404, the vehicular communication device transmits the certificate, the message, and the signature to one or more other devices.

In particular, the vehicular communication device signs the message with the signature to prove that the vehicular communication device possesses the private key associated with the certificate. As each certificate is registered with the network, that the network may verify that a certificate is valid and thus that valid signatures for the certificate can be assumed to be produced by a trusted device.

An additional step may be included to determine one or more specific receivers to which to transmit the message, certificate, and signature, e.g., a cluster head in a cluster of vehicles.

Figure 115:
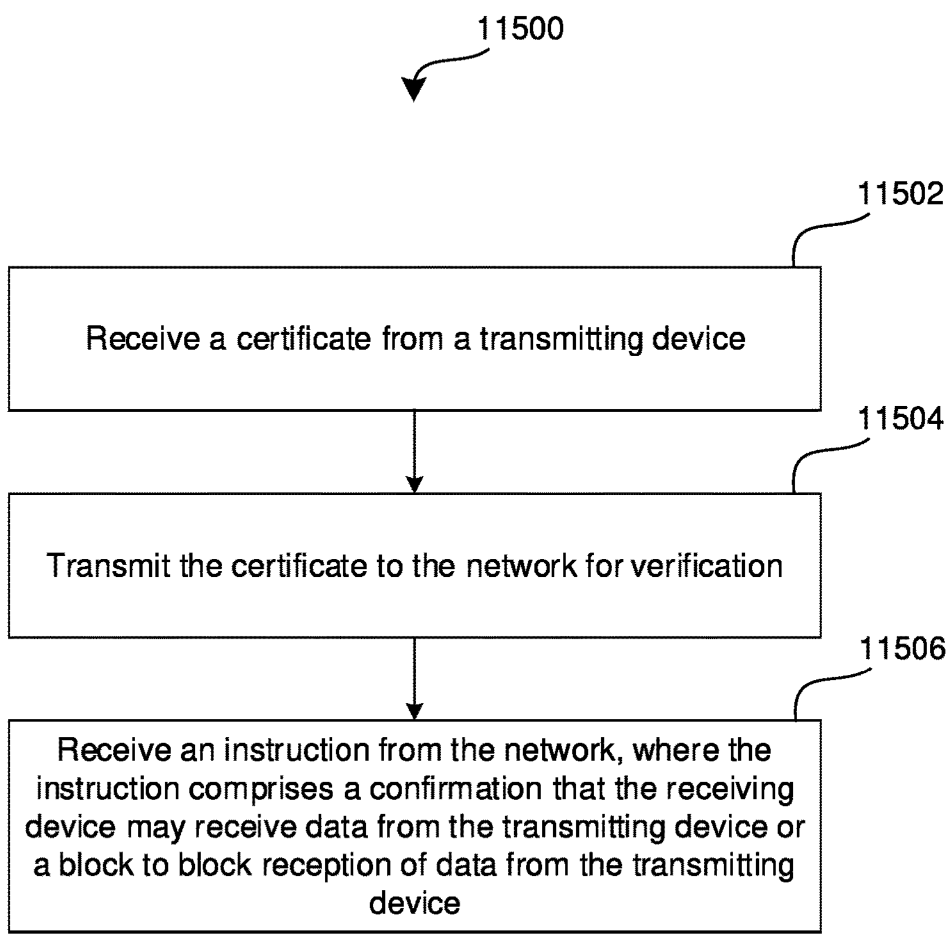
FIG. 115 shows an exemplary procedure for verifying certificates and signatures provided by other devices according to some aspects.

FIG. 115 is a flowchart 11500 describing a method for certificate verification in an aspect of this disclosure. It is appreciated that flowchart 11500 is exemplary in nature and may thus be simplified for purposes of this explanation.

In stage 11502, a receiving device receives a certificate from a transmitting device. In stage 11504, the receiving device transmits the certificate to the network in order for the network to verify that the transmitting device is a trusted source. In stage 11506, the receiving device receives an instruction from the network, where the instruction comprises a confirmation that the receiving device may receive data from the transmitting device or a block to block reception of data from the transmitting device.

Incentivized Resource and Data Exchange

Some aspects of this disclosure may provide an interface configured to provide data from vehicular communication devices to higher authorities (e.g., car manufacturers, service providers, regulatory authorities, law enforcement authorities, etc.). This interface may be configured for obtaining data and determining a product/service to provide for the obtained data. Exemplary products and services may include, but are not limited to: electric charge, network access, maintenance, or the like. In some aspects, the interface may also include at least one of an evaluation processor configured to evaluate provided data in order to determine an appropriate amount of the product/service to provide and/or a determination processor configured to determine a balance of the product/service to be covered by the user.

Figure 116:
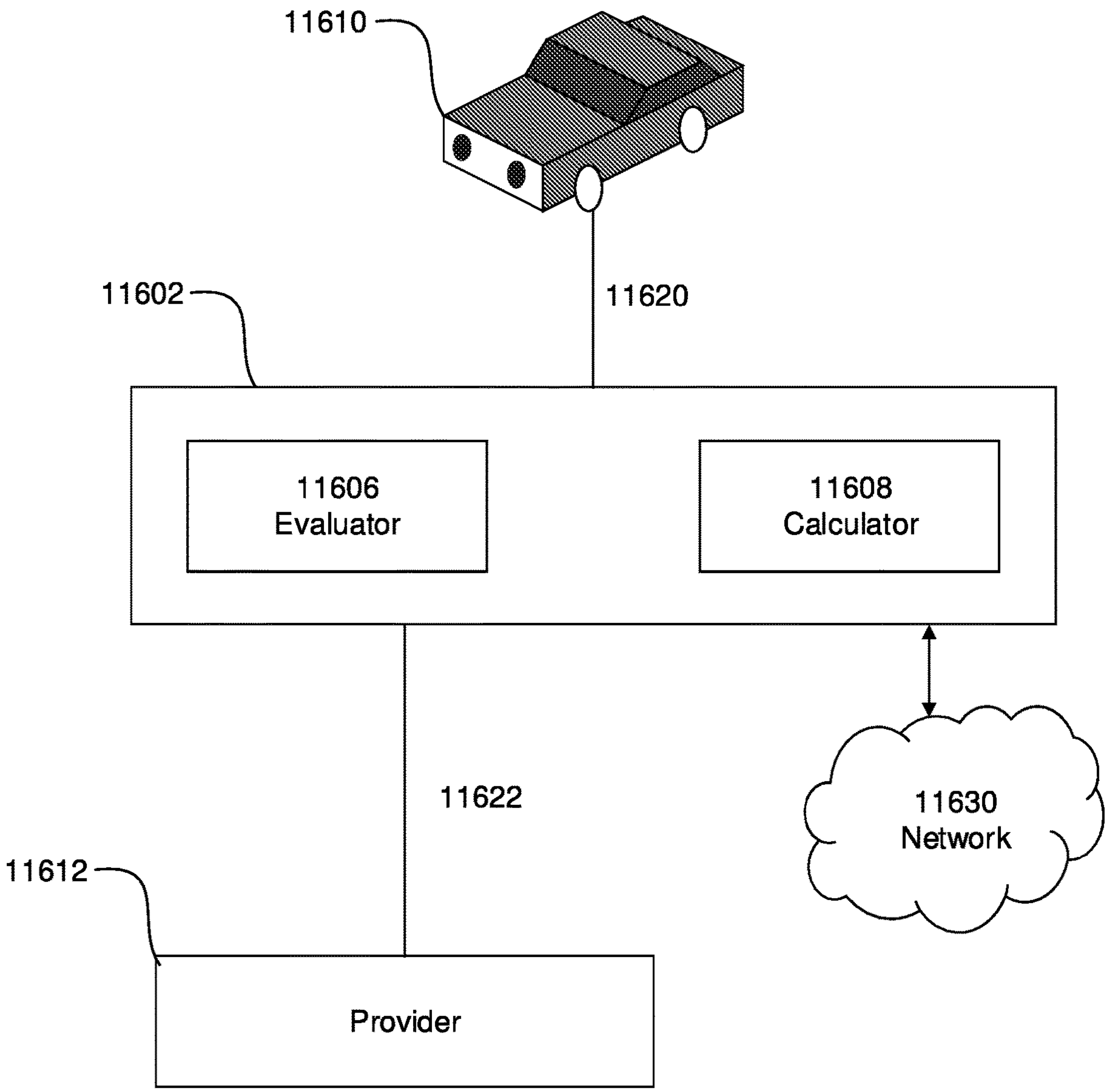
FIG. 116 shows an example of incentivized resource exchange between a vehicular communication device and an interface device according to some aspects.

FIG. 116 is an exemplary illustration of an interface device 11602 configured to provide for data exchange between a vehicular communication device 11610 and a provider 11612. Provider 11612 may be, for example, a vehicle manufacturer, a service provider, a regulatory authority, a law enforcement authority, or the like. Interface device 11600 may include one or more processors configured to perform the following methods, e.g., performing evaluation and/or calculation processes as described herein.

Interface device 11602 may be configured to acquire data acquired by a vehicular communication device 11610 and, in exchange, provide vehicular communication device 11610 with a particular resource, e.g., electricity, network access, a certain service, maintenance, etc. In one exemplary aspect, interface device 11602 may be provided in a charging station and be configured to acquire data from a vehicular communication device in exchange for electricity. In the following description, provider 11612 will be described as a vehicle manufacturer, but it is appreciated that interface device 11602 may be configured to communicate with other entities in the same manner.

Interface device 11602 may be configured to acquire vehicular communication device's 11610 certificate upon vehicular communication device 11610 plugging into the charging station via cable 11620. In this respect, cable 11620 may function as a high-speed data link between interface device 11602 and vehicular communication device 11610 in addition to providing vehicular communication device 11610 with electricity. In another aspect of this disclosure, interface device 11602 may be configured to wirelessly obtain the certificate from vehicular communication device 11610 (e.g., where interface device 11602 is equipped with a wireless receiver) upon vehicular communication device 11610 coming within range of interface device 11602. In this manner, interface device 11602 may start the certificate verification process prior to vehicular communication device 11610 plugging into the charging station to streamline the process.

Upon receiving vehicular communication device's 11610 certificate, interface device 11602 may be configured to determine which whether the certificate is valid (e.g., based on a hash of the certificate) and whether the certificate was issued by a trusted authority. Accordingly, interface device 11601 may check the certificate with the network 11630 (in other words, use the network 11630 as a gatekeeper authority) or reference a local database of in interface device 11602 (not pictured) to determine whether the certificate appears as a valid certificate issued by a trusted authority in the local database. For example, interface device 11602 may determine that the certificate was provided by a certain manufacturer (e.g., based on metadata of the certificate that identifies the issuer), and may then contact the manufacturer to verify whether the certificate was issued by it. The manufacturer may respond to the request from interface device 11602 by confirming that it is the issuer of the certificate, and may subsequently send a response instructing interface device 11602 to provide electricity to vehicular communication device 11610 in exchange for data. Vehicular communication device 11610 may then sign the data according to the public key in the verified certificate and provide the data and resulting signature to interface device 11602, which may provide vehicular communication device 11610 with electricity for charging in response.

In some aspects, interface device 11602 may be configured to accept data provided by any vehicular communication device with a valid (e.g., non-tampered certificate). Interface device 11602 may then acquire the data (e.g., accompanied by a valid signature) from vehicular communication device 11610 either via a direct connection (e.g., via cable 11620) or wirelessly, and may then transmit the data to the provider 11612 over high-speed data link 11622.

In some aspects, interface device 11602 may further include an evaluator 11606 configured to evaluate the quality of the data provided by the vehicular communication device 11610. Such evaluation may include whether the data is already available to and/or possessed by provider 11612, or whether the data is short-term/dynamic or static (generally, the more static the data, the more valuable it is as it will be able to be used over a wider range of time). The more valuable the data, the greater the amount of electricity (or other product/service) the provider 11612 may authorize interface device 11602 to provide for said data.

Evaluator 11606 may determine the value of data with any of a variety of evaluation techniques. For example, evaluator 11606 may have pre-assigned weighting factors for certain types of data, where the weighing factors increase and decrease the data's relative importance. For instance, highly static data may be assigned a weighing factor value close to or equal to 1 while and highly dynamic data may be assigned a weighing factor closer to zero. In other words, the more dynamic, and therefore less relevant for long term use, the data is, the lower the corresponding weighting factor will be. Evaluator 11606 may also determine the age of the data, where more recent data is assigned a higher weight than older data. In sum, evaluator 11606 may be configured to assign different weighing factors across a wide spectrum of different classifications of data in determining an overall value of the data provided by vehicular communication device 11610.

Interface device 11602 may further include a calculator 11608 configured to determine the amount of electricity (or other product/service) that the provider 11612 will provide in exchange for the data from the vehicular communication device 11610, and then determine the remaining amount of electricity to be paid by the user of vehicular communication device 11610. For example, if the evaluator 11606 has determined the data provided by vehicular communication device 11610 to be a certain value, the calculator 11608 may determine the amount to be paid by the use as the total provided minus the amount provided by the provider 11612.

Alternatively, raw data from vehicular communication device 11610 may be communicated from interface device 11602 to provider 11612 vehicular communication device 11610 via high-speed data link 11622, and the provider may perform the evaluation and/or calculation and communicate the results back to interface device 11602.

Figure 117:
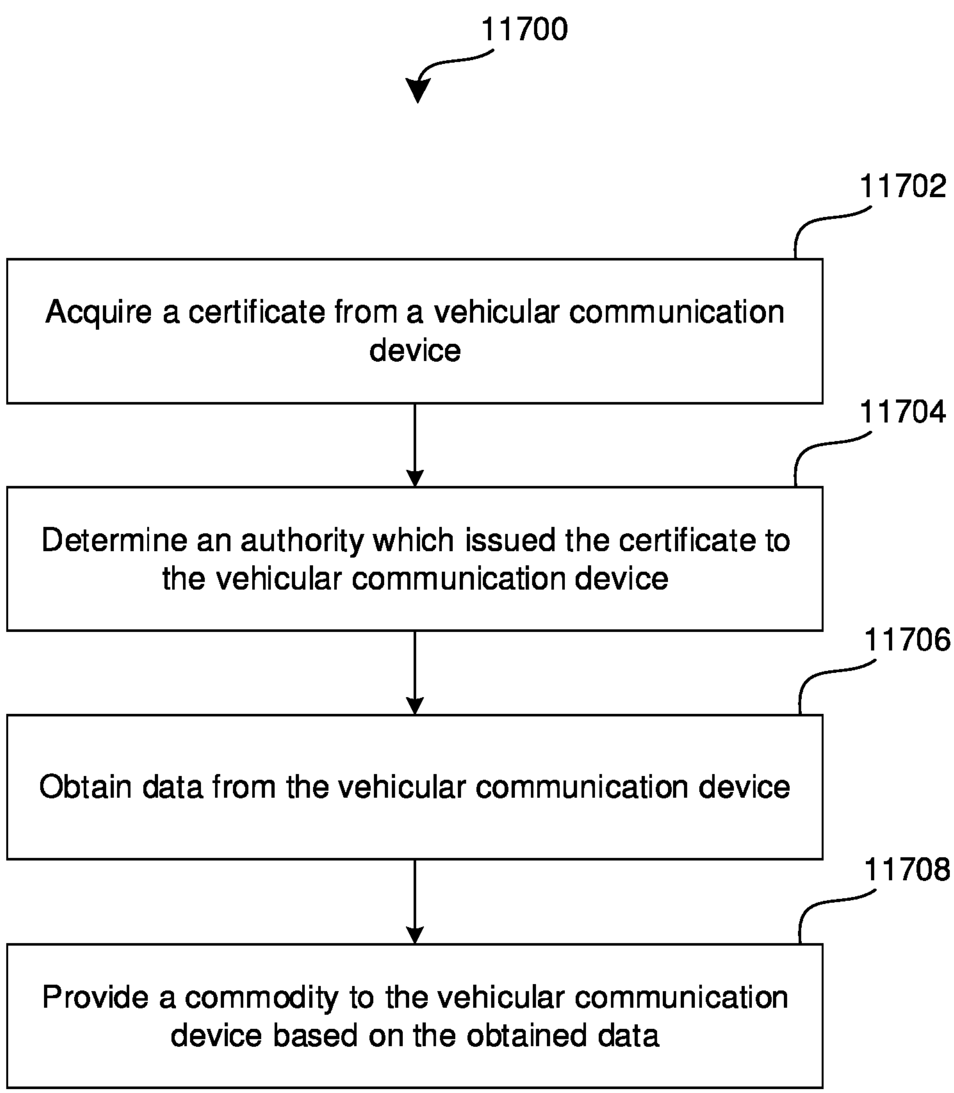
FIG. 117 shows an exemplary procedure for providing a commodity to a vehicular communication device contingent on a certificate and data provided by the vehicular communication device according to some aspects.

FIG. 117 shows a flowchart 11700 describing a method for an interface device to provide an exchange of data in an aspect of this disclosure. This method may be implemented by the interface device by executing, via one or more processors of the interface device, a set of instructions stored on a memory component of the interface device. It is appreciated that flowchart 11700 is exemplary in nature and may therefore de simplified for purposes of this explanation.

In stage 11702, the interface device acquires a certificate from a vehicular communication device. The interface device may acquire the certificate wirelessly or via a hard-wire connection (e.g., high-speed data wired data link).

In stage 11704, the interface device determines a corresponding trusted authority from the certificate, such as by reading metadata from the certificate to determine its issuer. The interface device may contact the trusted authority to receive instructions whether to engage in further communication with the vehicular communication device on the trusted authority's behalf. In another aspect of this disclosure, the trusted authority may instruct the interface device to proceed in the exchange of data (e.g., signed with a signature for a verified certificate) with all vehicular communication devices with certificates from the trusted authority.

In stage 11706, the interface device obtains data from the vehicular communication device. After obtaining the data and verifying (e.g., with a public key of the certificate) that it is signed with a valid signature, the interface device may be further configured to evaluate the quality of the data based on a number of parameters (e.g., age of the data, whether the trusted authority has the data or access to it, whether the data is static or dynamic, etc.). The interface device may be further configured to calculate a quantity of the commodity it is to deliver to the vehicular communication device based on the evaluation, where the interface device may be further configured to charge the vehicular communication device a balance of the commodity provided to the vehicular communication device minus an amount covered by the trusted authority.

In stage 11708, the interface device provides the commodity to the vehicular communication device based on the data received.

The cryptographic methods and algorithms described in this disclosure may be implemented in the application processor or a subscriber identity module (SIM) processor or in the protocol stack of a vehicular communication device. However, to tie the identity to the vehicular communication device itself, it may be preferable to implement the algorithms in the application processor of the vehicular communication device. The application processor, may be configured as a "data center" including a plurality of different processing components each specialized for different tasks. One processing component, for example, could serve as the supervisor/main processor, while another would be in charge of signal processing and yet another as an image processor for processing raw image data. These processing components may each include a plurality of central processing units (CPUs) with graphic processing units (GPUs), field programmable gate arrays (FPGAs), etc.

Beamforming Based on Surrounding Data

Various beamforming methods and devices can result in insufficient beamforming coverage and/or high delays in situations where devices adapt to their environment in real-time. This can be especially problematic in some V2X use cases, where the environment of vehicular communication devices may constantly change. As previously measured channel gains for a particular beam may prove to be irrelevant at a device's new position in relation to its surroundings, traditional beamforming approaches depending on measured channel gains may be inadequate for V2X communications.

Furthermore, as wireless communications move into the mmWave spectrum (e.g., 5G communications), signals will become increasingly susceptible to signal attenuation and blockage problems. Blockage problems are a particular concern as mmWave signals may not be able to propagate through objects similarly to signals with longer wavelengths. In this respect, the disclosure herein provides for methods and devices for effectively transmitting and receiving signals to account for a constantly changing environment when using configurations in wireless communications.

Beams are generally more narrow and directional in mmWave configurations compared to other technologies. This feature, in particular when compounded with the issues of signal attenuation and blockage, may warrant systems using mmWave configurations to more accurately and quickly determine the effective directions for the beam search space.

In some aspects of this disclosure, vehicular communication devices are configured to obtain surrounding area (e.g., environment) data in real-time from sensors and/or data acquisition equipment (e.g., cameras and other sensors) and use this data to dynamically set and modify beamforming patterns to maximize throughput and minimize delay in V2X communications. In particular, various aspects provide methods and devices that use acquired data to determine optimal beam directions for the vehicular communication device to use.

This data may be collected by the vehicular communication device in several different ways. For example, the vehicular communication device may use its own on-board equipment, such as cameras, radar, motion sensors, light detection and ranging (LIDAR), infrared sensors, ultrasonic sensors, GPS, etc., to acquire surrounding area data. The vehicular communication device may, for example, be configured to use its cameras to locate markers to set its beams and modify these initial beams based on obstacles detected in the signal paths. In another example, the vehicular communication device may obtain data from other vehicles, RSUs, etc., by methods discussed in this disclosure to set/modify its beams. This acquired data may be used, for example, to set one or more initial beams at each of one or more locations. The beams may then be modified in real-time by the vehicular communication device by data acquired using its own sensing equipment (e.g., cameras). In this manner, a vehicular communication device may be configured to have an initial understanding of optimal beams to use at a particular location from other similar devices, and subsequently be configured to use data obtained in real-time to dynamically determine optimal beam directions.

Figure 118:
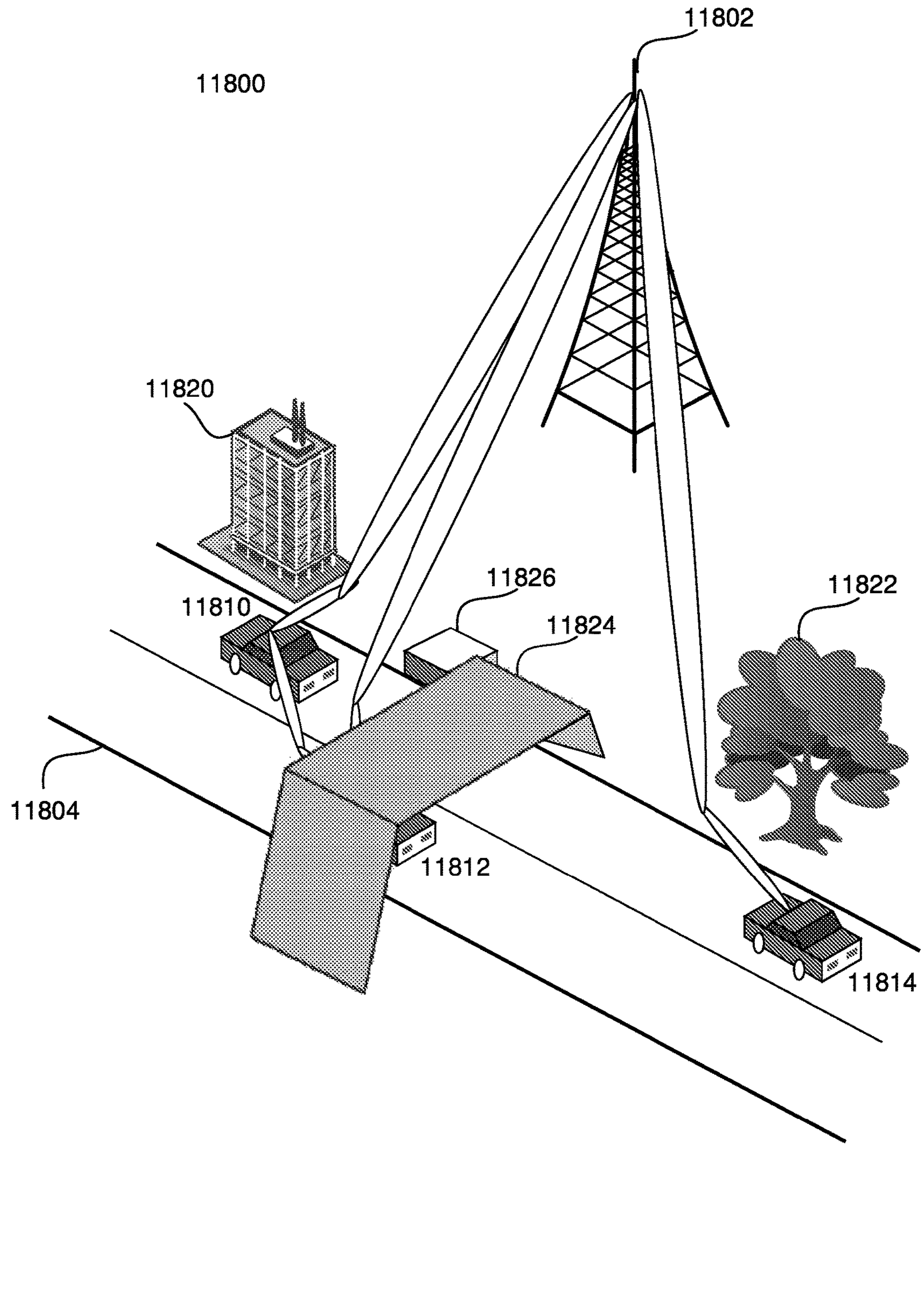
FIG. 118 shows an exemplary network scenario for beamforming at vehicular communication devices based on surrounding data according to some aspects.

FIG. 118 shows an exemplary illustration of a network 11800 beamforming scenario according to some aspects. As shown in FIG. 118, network 11800 may include a network access node 11802 and vehicular communication devices 11810-11814 driving on road 11804. Various obstacles, such as buildings 11820 and 11826, tree 11822, and bridge 11824, may be arranged along road 11804 and consequently may block communication between vehicular communication devices 11810-11814 and network access node 11802 at certain points along road 11804. Other obstacles (not pictured) may block communications with the network access node or even between the vehicular communication devices 11810-11814 themselves, such as other vehicles, road signs, bridge pillars, and other obstacles placed in the vicinity of roadways.

In one aspect of this disclosure, one or more of vehicular communication devices 11810-11814 may be configured to identify objects to set and/or modify beams at a location to optimize communications. For example, vehicular communication device 11810 may identify building(s) 11820 and/or 11826, and set beams to communicate with network access node 11802 accordingly. In this respect, vehicular communication device 11810 may be configured to identify a landmark as on object to set its beamforming patterns. Once the landmark is identified, vehicular communication device 11810 sets an initial beamforming pattern, and may further be configured to use real-time surrounding area data, e.g., camera images, to avoid obstacles, e.g., other vehicles, to communicate with network access node 11802.

Beamforming is a technique used in wireless communications for directional signal transmission and/or reception. It combines elements in a phased array in a way to constructively interfere with signals at certain angles while other angles experience destructive interference. In this manner, beams may concentrate a signal to a target location, e.g., a receiver. The improvement compared with omnidirectional reception/transmission is referred to as the gain (or loss in the case of diminishment).

The devices of this disclosure may be configured to employ one or more types of beamforming, such as analog/RF beamforming, digital beamforming, and/or hybrid beamforming. In analog beamforming, the amplitude and/or phase variation is applied to the analog signal, and the different signal are summed up before the ADC conversion. In other words, all the combining and the precoding of the signals may be done at the RF side (e.g., in RF circuitry). This type of beamforming offers low hardware complexity, but may result in a higher error rate across multiple frequencies than digital beamforming. In digital beamforming, the amplitude and/or phase variation may be applied to the digital signal at baseband. In other words, the combining and precoding is performed in the digital (e.g., DSP) side, resulting in higher gains. However, in digital beamforming, each antenna may use a dedicated RF chain, which can increase hardware costs. Hybrid beamforming may combine elements from both analog and hardware beamforming including combining and precoding in both the analog/RF and the digital components of the radio equipment. Hybrid beamforming may include a digital platform with antenna ports processing digital signals and an analog beamforming platform with antenna elements processing analog signals. Each antenna port may be connected to a subarray of several antenna elements and receives a digital signal filtered by the analog beamforming. In this manner, the RF hardware of the radio equipment may be reduced while achieving the higher performance of digital beamforming.

In order to effectively beamsteer around obstacles 11820-11826, vehicular communication devices 11810-11814 may be configured to use data acquired from at least one of the following to generate beams avoiding obstacles 11820-11826: its on-board equipment (e.g., cameras); data acquired from other vehicles and communicated to vehicular communication device 11810-11814, either directly from the other vehicles or from network access nodes, e.g., 11802; and/or data acquired from network access nodes. The vehicular communication device may be configured to use this acquired data as an input to locate markers and/or avoid obstacles. For example, one of vehicular communication devices 11810-11814 may determine the location of a receiver based off the acquired data to set an initial beamforming pattern, and then use its real-time acquired camera images to determine if there are any obstacles in the transmit paths, and modify the initial beamforming pattern accordingly.

Figure 119:
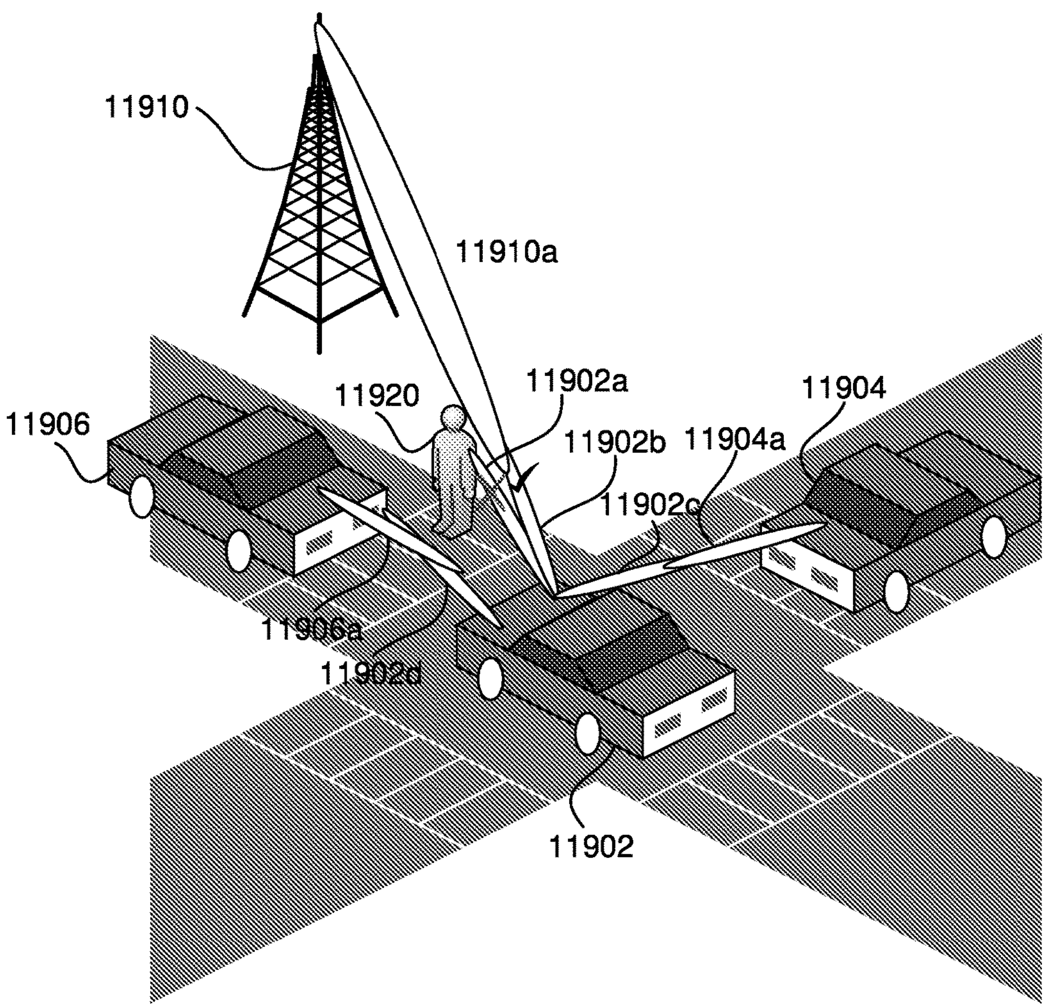

FIG. 119 shows a method by which a vehicular communication device 11902 may set a beamforming direction according to an aspect of this disclosure. It is appreciated that FIG. 119 is exemplary in nature and may therefore be simplified for purposes of this disclosure.

Vehicular communication device 11902 may be configured to receive a data from network or from another vehicular communication device, e.g., 11904 and/or 11906. For example, camera data may be shared among vehicles in a particular cluster (e.g., where vehicular communication devices 11902 and 11906 belong to the same cluster) to provide a more comprehensive imaging of the vehicle's surroundings. Such shared data may provide numerous advantages, such as sharing obstacles between vehicles so that a vehicular communication device 11902 may supplement its own captured images to create a more comprehensive mapping of its surroundings, or, in some cases, be able to identify obstacles which it itself is unable to identify but other vehicular communication devices are able to identify. Such cooperation between vehicles may be further supplemented by information shared by the network infrastructure (e.g., network access node 11910) to create a comprehensive map of vehicular communication device's 11902 surroundings to determine an effective or the most effective beam directions. Raw or processed visual data may be shared, and/or each vehicular communication device's comprehensive map may be shared. If processed data is exchanged between vehicles, the vehicular communication devices may be able to directly modify its beams from this processed data. If raw data is exchanged, the vehicular communication devices may process the data prior to setting its beams. The vehicular communication devices of this disclosure may be configured to implement either or both of these methods. When configured to exchange raw data the vehicular communication devices may include additional hardware and/or software to process the received raw data to set its beams.

The exchange of either raw and/or processed data may depend on one or more factors. For example, in the absence of infrastructure, raw and/or processed data may be exchanged directly between vehicular communication devices. In another example, the use of an RSU may be able to combine data from several sources to create a more comprehensive overall map for use by the vehicular communication device. In another example, the exchange of raw and/or processed data may depend on data processing complexity and/or vehicular communication device processing power, channel conditions, etc. Additionally, whether raw and/or processed data is shared may depend on the accuracy of the approach, capabilities of the devices/infrastructure (whether processing data at a certain point/device is feasible), or based on legal conditions, e.g., retaining all data in the case of an accident.

In another aspect of this disclosure, a learning processor, such as a neural network (NN), deep neural network (DNN), etc., may be configured to map beam sets based on raw and/or processed data. The computation for setting the beam former, e.g., the weights assigned to in analog/hybrid beamforming, may then be computed based on the NN/DNN output. The learning processors may be implemented in memory components of vehicular communication devices to instruct processors to carry out the methods and algorithms described herein.

Furthermore, in some aspects vehicular communication device 11902 may be configured to use current location information to select an initial beam for that specific location, and thereafter, use its own acquired data (e.g., from onboard cameras) to locate markers/obstacles to dynamically adapt the initial beam, and/or to select a secondary, tertiary, etc., beam. Vehicular communication device 11902 may obtain its location by any one of a number of methods, such as Global Navigation Satellite System (GNSS) (e.g., GPS, Galileo, etc.), triangulation methods, location marker detection, etc., and for each given location, vehicular communication device 11902 may be configured to select from a set of candidate beams to use to communicate with network access node 11910. Vehicular communication device 11902 may obtain this set of candidate beams from vehicular communication device 11904 and/or vehicular communication device 11906, both of which were, for example, previously at the location that vehicular communication device 11902 is currently located. Each of vehicular communication device 11904 and 11906 may have, for example, used beams 11902*a* and 11902*b*, respectively. Vehicular communication device 11902 may then select from these two beams to communicate with network access node 11910. Each candidate beam may be defined as a set of complex beamforming weights for application at the elements of ab antenna array.

In another aspect of this disclosure, vehicular communication device 11902 may have either a programmed route or an anticipated route detected by the network based on its movement, and may obtain sets of candidate beams to use at a plurality of locations along the route. This set of candidate beams may be obtained by the network over time from other vehicular communication devices that have relayed information back to the network detailing beams used at different locations, which the network may use to assemble a list of the most effective beams to use at a specific location, e.g., a primary beam, a secondary beam, a tertiary beam, etc. In other words, this set of candidate beams may be obtained over time from vehicular communication devices passing through the specific location and sharing its data with network access node 11910, which in turn is able to determine an order of the best candidate beams that will serve that respective location. With respect to FIG. 119, for example, this set of candidate beams may include primary beam 11902*a* and secondary beam 11902*b*.

Accordingly, vehicular communication device 11902 may have a set of candidate beams 11902*a*-11902*b*. Each candidate beam may be defined by a set of complex beamforming weights and may have a unique radiation pattern and/or steering direction. In an example, vehicular communication device 11902 may be configured to elect beam 11902*a* as the primary beam to communicate with network access node 11910. However, obstacle 11920 (in FIG. 119, represented by a person) may block communication via beam 11902*a*. Vehicular communication device 11902 is able to determine that beam 11902*a* is unsuitable, for example, by using real-time camera data, and accordingly, elect beam 11902*b* for communication with network access node 11910. Vehicular communication device 11902 may be configured to use its geographic position to establish a set of candidate beams to use and elect from this candidate set of beams based on real-time data acquired from its onboard equipment, e.g., cameras, LIDAR, radar, etc. By using information acquired from other devices and/or the network, the vehicular communication device may be configured to implement a multi-step approach to selecting the most suitable beam to use at a particular location.

Figure 120:
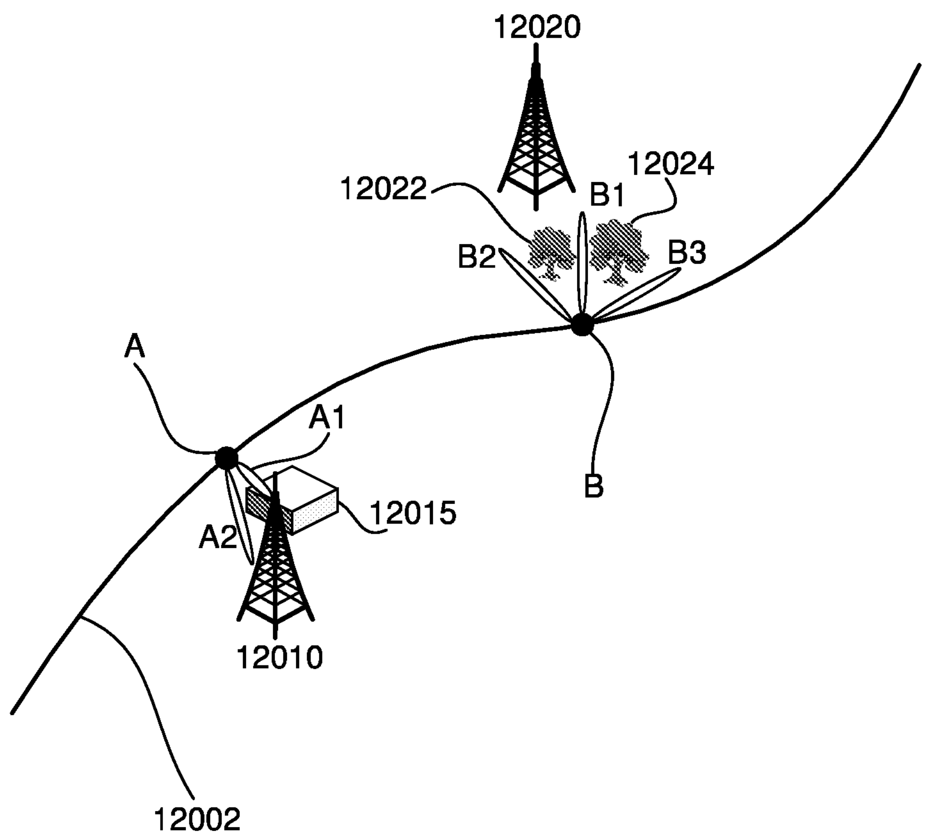

FIG. 120 shows an example of sets of candidate beams for a vehicular communication device to use at different points A and B along path 12002 in an aspect of this disclosure. While in this example a limited number of points and candidate beams at each point are shown, it is appreciated that this is for purposes of simplifying the explanation. For example, the number of point(s) and candidate beam(s) at each point along path 12002 may be any number greater than or equal to one.

Path 12002 may be, for example, a predetermined route that has been programmed into a vehicular communication device (e.g., for navigation purposes), or, alternatively, may be a most likely path estimated by the device or the network, e.g., path 12002 is a long stretch of highway with no exits. In either case, vehicular communication device may be programmed with a set of candidate beams to use at each of a plurality of points, e.g., A and B, along path 12002.

At point A, the vehicular communication device may select from a candidate set of beams including beams A1-A2 to communicate with network access node 12010. A1 may be the primary beam and A2 may be the secondary beam. In this case, upon reaching point A, a vehicular communication device will attempt to communicate with network access node 12010 via A1. However, if the vehicular communication device determines that there is an obstacle impeding communication via A1, the vehicular communication device will elect to use beam A2 to communicate with network access node 12010. The vehicular communication device may be able to determine that an obstacle is blocking A1 by using its camera and/or sensor equipment to detect an impedance, such as a sign or a group of people on top of structure 12015. In this manner, the vehicular communication device may be able to modify its beam generation based on this real-time information about its environment.

Similarly, at point B, a vehicular communication device may have a set of candidate beams B1-B3 to select from to communicate with network access node 12020, with B1 being the primary beam, B2 the secondary beam, and B3 the tertiary beam to select from. A vehicular communication device, for example, may determine that B1 is blocked due to foliage on trees 12022-12024.

In another aspect of this disclosure, B1 and B2 may swap priorities depending on the time of the year. For instance, B1 may prove be the primary beam from late fall until early spring when trees 12022-12024 have no foliage and B1 provides the most direct path to network access node 12020. However, from early spring through late fall, foliage on trees 12022-12024 may impede any signals using beam B1, in which case secondary beam B2 for late fall until early spring may be promoted to the primary beam. This determination may be done by the network on the basis of camera data acquired by vehicular communication device traveling along path 12002.

In addition to selecting from a candidate set of beams, the methods and devices of this disclosure may be configured to steer beams based on real-time data acquired by onboard detection equipment (e.g., cameras, sensors, radar, etc.). For example, a vehicular communication device may be configured to implement an initial beamforming pattern to use by default at one or more locations to maximize the beam search space and modify this initial beamforming pattern if obstacles are detected by the vehicular communication device's onboard detection equipment. The machine learning algorithms and methods implemented by this disclosure may take a position and may use actual/ray-tracing data to learn about the physics and geometry of the surrounding environment to effectively and efficiently direct the vehicular communication device's beams.

Figure 121:
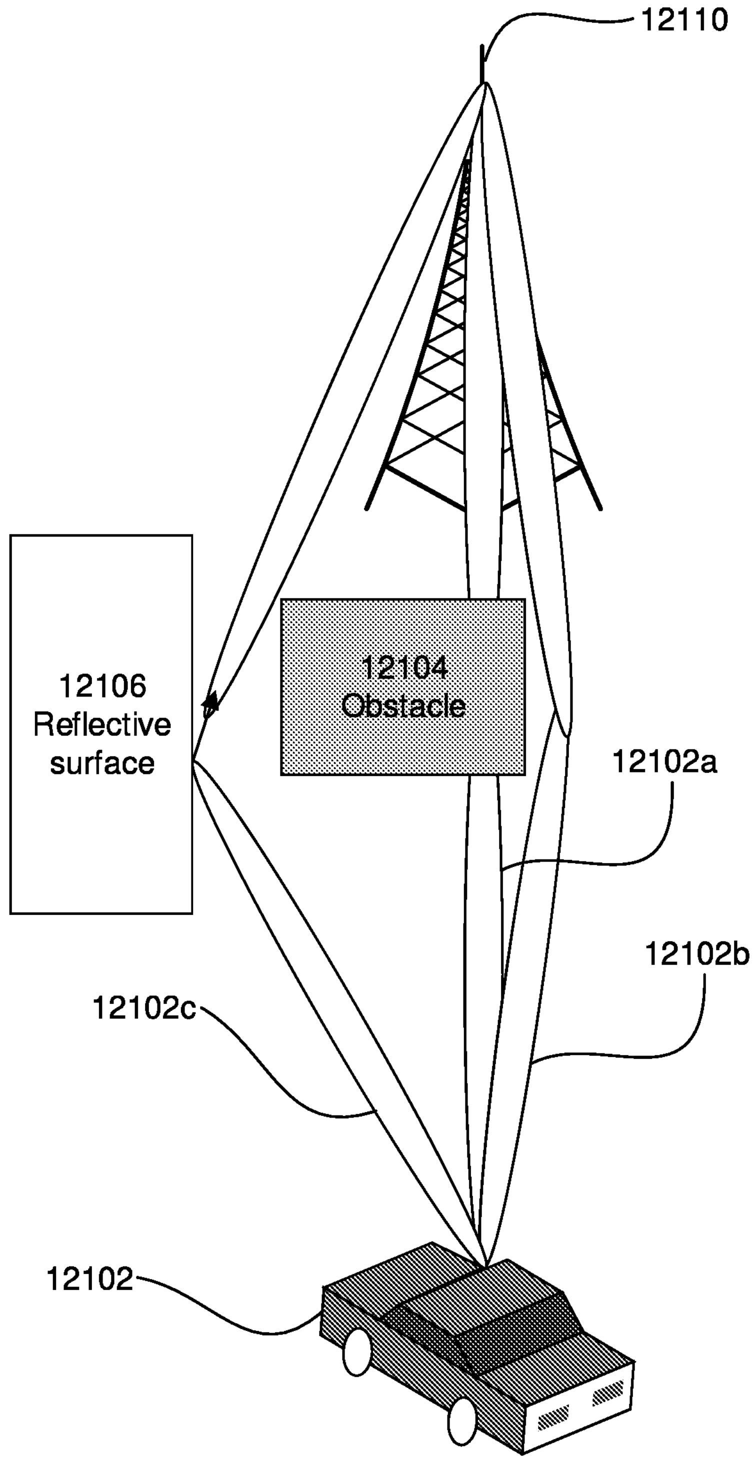

FIG. 121 is an exemplary scenario showing how vehicular communication device 12102 may apply machine learning algorithms to determine the most effective beams to use for communication with network access node 12110. While the device with which the vehicular communication device 12102 is a network access node in the description, it is appreciated that similar methods are applied for all types of other receiving devices, such as communications with other vehicular communication devices.

Upon detecting the receiving target, e.g., network access node 12110, vehicular communication device may be initially configured to use beam 12102A to communicate with network access node 12110. Vehicular communication device may detect network access node 12110 in any one of a number of ways, such as with a paging signal, visually via on-board cameras and image recognition software, etc. In this example, initial beam 12102A follows the most direct path between vehicular communication device vehicular communication device 12102 and network access node 12110, but it is appreciated that the initial beam may be directed in a different direction based information sent by the network.

However, using its onboard detection equipment (cameras, radar, LIDAR, motion sensors, etc.), vehicular communication device 12102 may detect obstacle 12104, and steer its beam to communicate with network access node 12110 to 12102B so as to avoid obstacle 12104. Accordingly, vehicular communication device 12102 may be configured to implement image analysis/recognition algorithms stored on a memory component and executable by one or more processors on real-time data acquired by its onboard detection equipment. Data from multiple onboard detection equipment units, e.g., cameras, radar, LIDAR, motion sensor, may be fused for a more comprehensive map. Additionally, fusing different types of data in this manner may simplify processing of the acquired data (for example, processing camera data can be more complex than processing radar data), and the devices and methods of this disclosure may use radar data to reduce the computational complexity.

In addition to detecting obstacles, in some aspects vehicular communication device 12102 may be configured to determine potential reflectors, such as reflective surface 12106, to steer beams around obstacles. In this manner, reflective surfaces may be used to determine an auxiliary path, e.g., using beam 12102C, around obstacle 12104. Vehicular communication device 12102 may be configured to determine reflecting surfaces (e.g., metallic side of a large truck, a street sign, or a building) to assist in such determination. The determination of reflective surfaces may be based on real-time camera data, for example, or on light emission/detection units of the vehicular communication device (e.g., vehicle's headlights emit light, sensors equipped on vehicle determine the amount of the light which is reflected back to the vehicle). In another aspect of this disclosure, a reflecting infrastructure may be created along a route taken by a vehicular communication device to create potential paths for secondary beams. The location of such reflective surfaces along the route may be communicated to the vehicular communication device by the network for implementation.

If the vehicular communication devices are operating on multiple frequencies, in some aspects it may only determine suitable beam(s) for one frequency, and use the determined beam(s) as being indicative of an appropriate beam direction for other frequencies. In other aspects, it may determine suitable beams for multiple frequencies.

Accordingly, a vehicular communication device may include one or more processors operatively coupled to a memory loaded with executable program instructions for operating the one or more processors, the executable program instructions including: a data acquisition subroutine for acquiring data of a device surrounding, an identification subroutine for identifying objects based on the acquired data, and a beam generation subroutine for generating a beam based on identified objects. Said program instructions may further include: an initial pattern acquisition subroutine for acquiring an initial beam to use at a specified location and/or a transmission subroutine for transmission of the generated beam.

Figure 122:
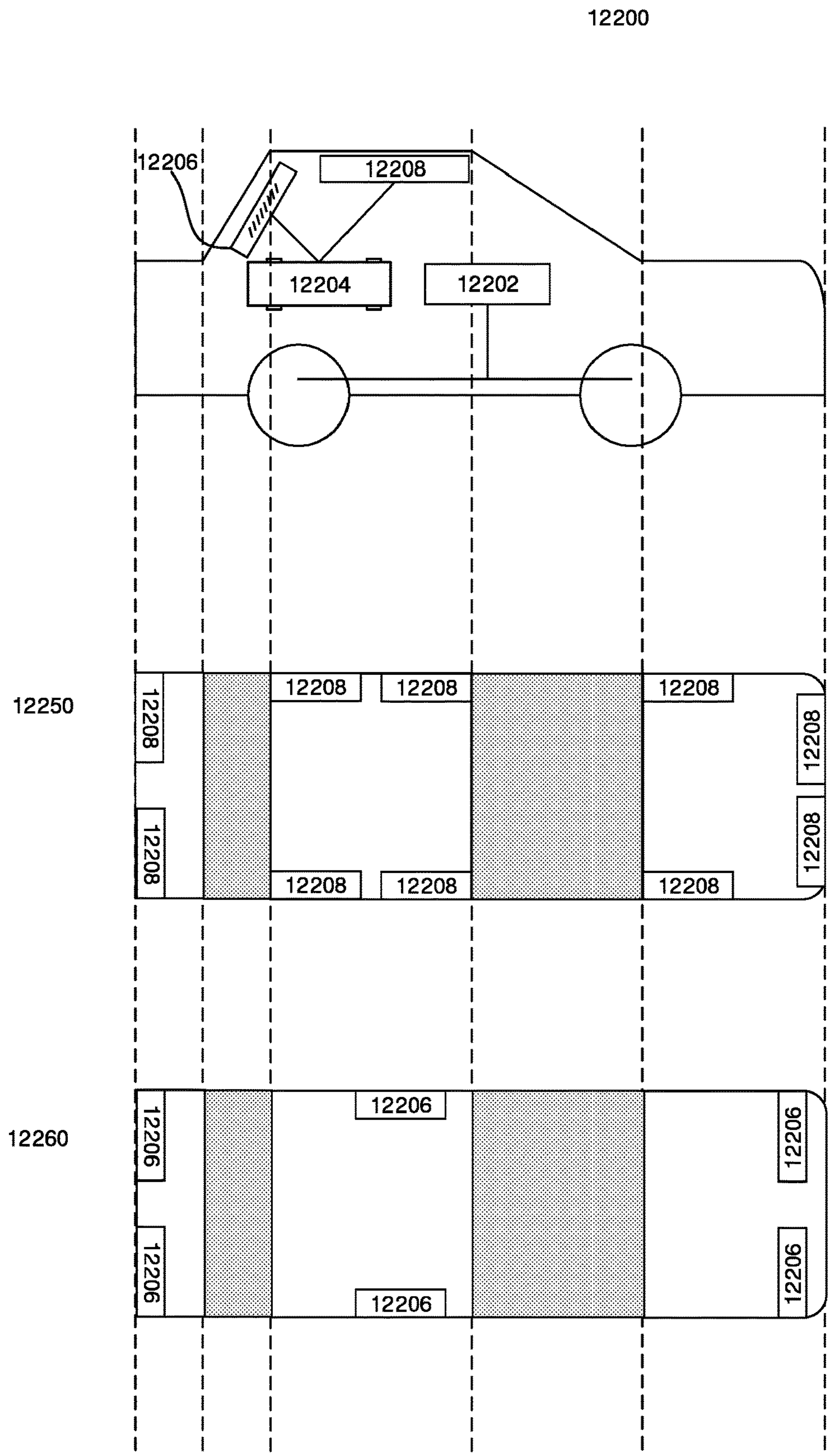

FIG. 122 shows an exemplary internal configuration of vehicular communication device 12200 according to some aspects. Vehicular communication device 12200 may correspond to vehicular communication device 500 of FIG. 5, and accordingly may include steering and movement system 12202, communication arrangement 12204, and antenna system 12206 configured in the manner shown and described for steering and movement system 502, communication arrangement 504, and antenna system 506. In addition to these components, vehicular communication device 12200 may also include onboard data acquisition equipment 12208.

Data acquisition equipment 12208 may include, for example, video cameras, infrared cameras, motion sensors, radar equipment, LIDAR equipment, or any other equipment configured to acquire data representative of the surroundings of vehicular communication device 12200. In some aspects, data acquisition equipment 12208 can strategically distributed around vehicular communication device 12200 to provide a comprehensive acquisition range for data acquisition. For example, data acquisition equipment may be deployed around the outer housing of vehicular communication device 12200 to maximize the acquisition range of data acquisition equipment 12208 (e.g., to maximize the field view of a camera, radar sensor, motion sensor, LIDAR, infrared sensor, ultrasonic sensor, or to maximize the reception capabilities of a GPS system). For example, data acquisition equipment 12208 may be arranged along the front, rear, sides, and/or top of vehicular communication device 12200. An exemplary distribution of data acquisition equipment 12208 is shown in the top-view of vehicular communication device 12200 in 12250. Each of these components of data acquisition equipment 12208 may be operatively coupled to communication arrangement 12204 to provide it with data detailing the environment (e.g., surrounding area) of vehicular communication device 12200.

Antenna system 12206 may be an antenna array configured for digital, RF, or hybrid beamforming. In some digital beamforming aspects, communication arrangement 12204 may include a baseband processor and a plurality of RF chains, each of which is coupled to an element of antenna system 12206. The baseband processor may then apply the complex beamforming weights for a particular antenna beam to a respective duplicate stream of the transmit signal (or receive signal in reverse direction), thus obtaining a plurality of weighted streams. In some RF beamforming aspects, antenna system 12206 or an RF transceiver of communication arrangement 12204 may include a set of analog weighting elements, which may be RF phase shifters and/or tapering circuits. Each of the analog weighting elements may apply a respective complex beamforming weight from the set of complex beamforming weights for a particular antenna beam to a respective duplicate stream of the transmit signal (and/or receive signal), thus obtaining a plurality of weighted streams. In some hybrid beamforming aspects, communication arrangement 12204 may include a baseband processor and a plurality of RF chains and antenna system 12206 or an RF transceiver of communication arrangement 12204 may include a set of analog weighting elements. The baseband processor and set of analog weighting elements may apply complex beamforming weights to obtain a plurality of weighted streams. Each antenna element of antenna system 12206 may then transmit a respective one of the plurality of weighted streams to realize the particular antenna beam.

In some aspects, antenna system 12206 may be a uniform array, such as a uniform linear or planar array. In other aspects, the antenna elements of antenna system 12206 may be non-uniformly distributed around vehicular communication device 12200 to allow vehicular communication device 12200 to emit beams in a number of different directions in the horizontal plane and in vertical directions. An exemplary distribution of the antenna elements is shown in 12250. The antenna elements may be configured to transmit and/or receive wireless communications in accordance to any of the wireless communication technologies of this disclosure.

Figure 123:
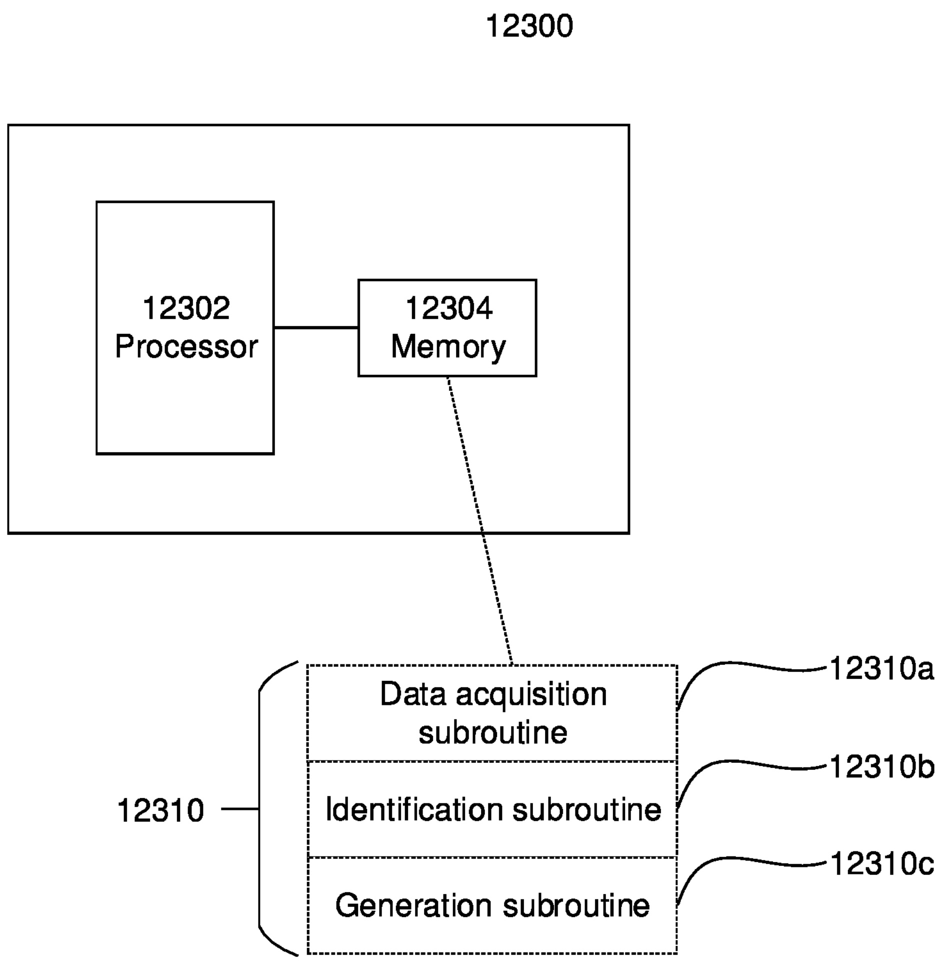

FIG. 123 shows an exemplary internal configuration of controller 12300 according to some aspects, which may be included in the communication arrangement 12204 of a vehicular communication device. As shown in FIG. 123, controller 12300 may include processor 12302 and memory 12304. Processor 12302 may be a single processor or multiple processors, and may be configured to retrieve (e.g., from a local memory) and execute program code to perform the transmission and reception, channel resource allocation, and cluster management as described herein. The program code may be updatable, such as wirelessly or by a manual install. Processor 12302 may transmit and receive data over a software-level connection that is physically transmitted as wireless radio signals by a digital signal processor, RF transceiver, and antenna system 12206. Memory 12304 may be a non-transitory computer readable medium storing instructions 12310 for beamforming including data acquisition subroutine 12310*a*, identification subroutine 12310*b*, and beam generation subroutine 12310*c*.

Data acquisition subroutine 12310*a*, identification subroutine 12310*b*, and beam generation subroutine 12310*c* may each include an instruction set(s) including executable instructions that, when retrieved and executed by processor 12302, perform the functionality of controller 12300 as described herein. In particular, processor 12302 may execute data acquisition subroutine 12310*a* to acquire data from any one of an onboard detection equipment. As described, this may include acquiring data from any one or more of a camera, motion sensor, radar, infrared detection equipment, LIDAR, etc. Data acquisition subroutine 12310*a* may also include instructions to assign varying weights to each of the different types of data to be processed, e.g., data obtained from video cameras may be assigned a higher weight value. Furthermore, data acquisition subroutine 12310*a* may include instructions to obtain initial beams (e.g., a candidate set of beams) to use at one or more locations.

Processor 12302 may further execute identification subroutine 12310*b* to identify objects based on the data acquired by data acquisition equipment 12208. This may include identifying at least one of an obstacle, a receiver, or a reflective surface. Identification subroutine 12310*b* may instruction set(s) including executable instructions, that when retrieved an executed by processor 12302, perform image analysis of the data acquired from the onboard detection equipment.

Processor 12302 may further execute beam generation subroutine 12310*c* to generate beams based on the identified objects. For example, this may include: generating beams to avoid identified obstacles, generating beams based on a candidate set of beams, generating beams based on identified receivers and/or reflective surfaces, or any combination of the above. For example, processor 12302 may generate complex beamforming weights for elements of antenna system 12206 with beam generation subroutine 12310*c*, where the complex beamforming weights create a particular antenna beam when applied across the elements of antenna system 12206 with baseband, RF, or hybrid beamforming. Processor 12302 may then generate the actual antenna beam by supplying the complex beamforming weights for digital (e.g., in a baseband processor of communication arrangement 12204), RF (e.g., an RF beamforming platform in communication arrangement 12204, which can be, for example, a plurality of phase shifters and/or tapering circuits that apply the complex beamforming weights), or hybrid (e.g., a baseband processor and RF beamforming platform) beamforming with antenna system 12206.

Figure 124:
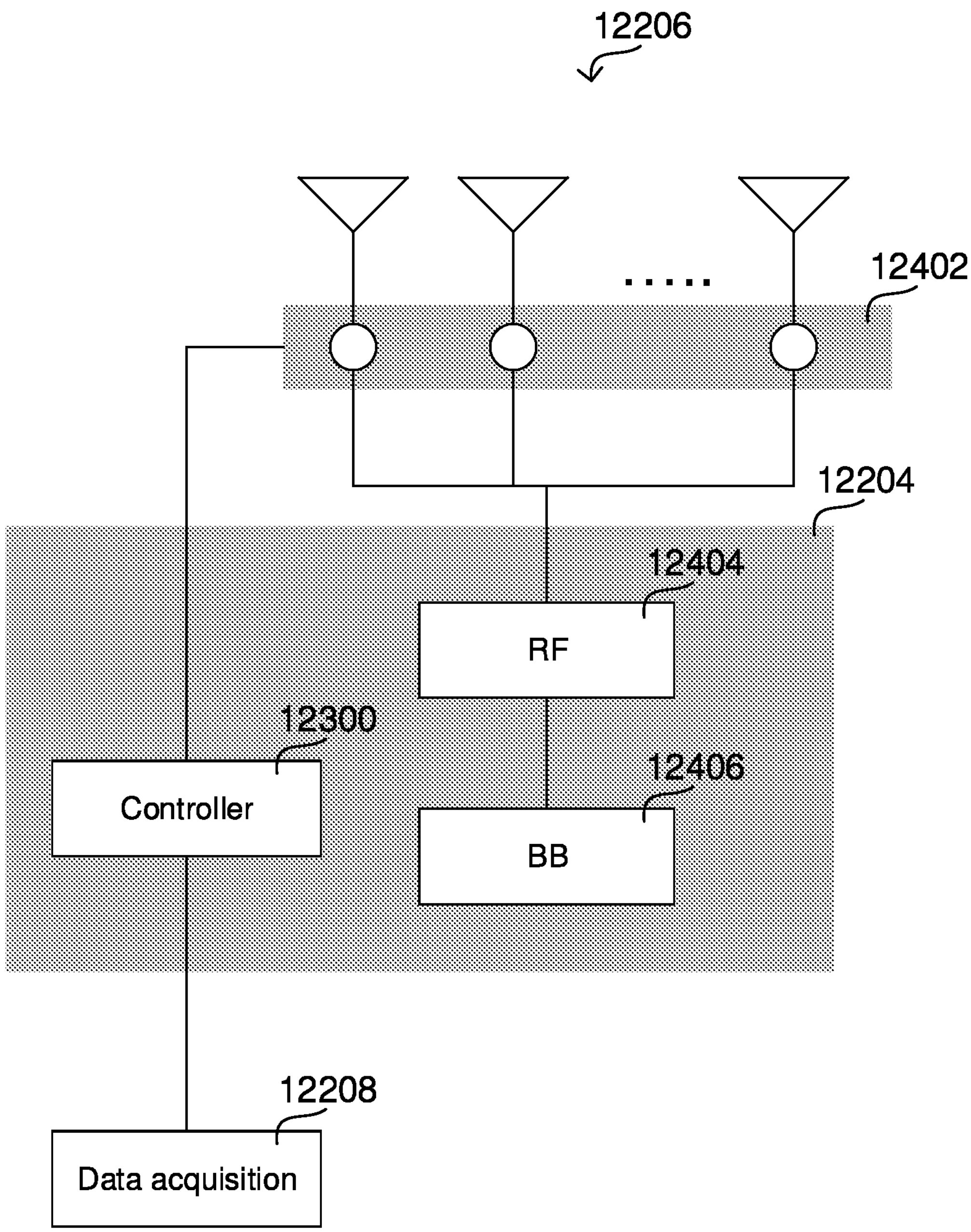
Figure 125:
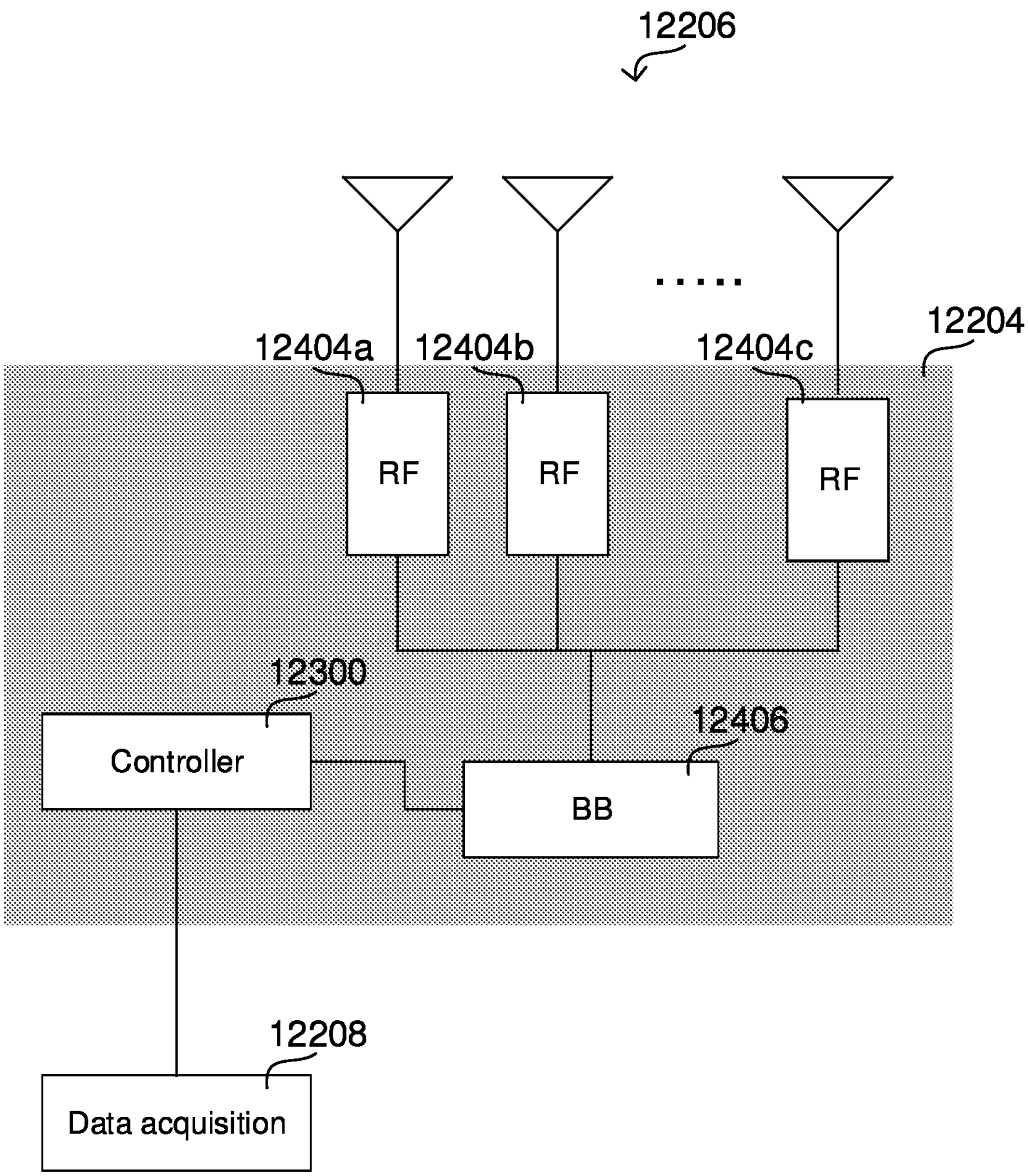

FIGS. 124 and 125 show examples of the beam generation functionality of controller 12300 according to some aspects. With reference to FIG. 124, this example shows beam generation functionality of controller 12300 using analog/RF beamforming. As shown in FIG. 124, controller 12300 may receive data representing the surroundings of vehicular communication device 12200 from data acquisition equipment 12208 during execution of data acquisition subroutine 12310*a*. Controller 12300 may then execute identification subroutine 12310*b* to identify objects based on the data obtained from data acquisition subroutine 12310*a*, which can include identifying obstacles, receivers, and/or reflective surfaces.

Controller 12300 may then execute beam generation subroutine 12310*c* to generate an antenna beam with antenna system 12206 based on the objects identified with identification subroutine 12310*b*. For example, controller 12300 may generate a set of complex beamforming weights that, when applied over the antenna elements of antenna system 12206, generate a beam steered towards a receiver or reflective surface and/or away from an obstacle. In particular, the application of the phase and gain of each complex beamforming weight of a different antenna element of antenna system 12206 may produce a pattern of constructive and destructive interference when the resulting weighted signals are transmitted by antenna system 12206.

As shown in FIG. 124, controller 12300 may generate the antenna beams by then providing the set of complex beamforming weights to RF beamformer 12402, which may include a plurality of RF beamforming circuits each of which is placed on the signal line of a respective antenna element of antenna system 12206. In some aspects, the plurality of RF beamforming circuits of RF beamformer 12402 may be analog phase shifters, and may each apply a phase shift corresponding to a respective one of the set of complex beamforming weights to the signal on their respective antenna element. In some aspects, the plurality of RF beamforming circuits of RF beamformer 12402 may additionally or alternatively include tapering circuits, which may each apply a gain corresponding to a respective one of the set of complex beamforming weights to the signal on their respective antenna element.

Accordingly, baseband controller 12406 may produce a baseband transmit signal for transmission, which RF transceiver 12404 may perform RF modulation on to produce an RF transmit signal. RF transceiver 12404 may split the RF transmit signal into duplicate RF transmit signals and provide each respective transmit signal to a respective antenna element of antenna system 12206. The respective RF beamforming circuit of RF beamformer 12402 placed on the signal line of each antenna element of antenna system 12206 may therefore apply the corresponding complex beamforming weight (e.g., a phase shift and, optionally, a gain) of the set of complex beamforming weights generated by controller 12300 to the duplicate RF transmit signal on its signal line. The antenna elements of antenna system 12206 may then transmit the resulting weighted RF transmit signals. The resulting radiation pattern produced by antenna system 12206 will therefore produce a pattern of constructive and destructive interference (e.g., resulting in main lobes, side lobes, and nulls) between the transmitted signals from each antenna element that realize the antenna beam. Controller 12300 may therefore generate the antenna beam with beam generation subroutine 12310*c* by calculating the set of complex beamforming weights that produces an antenna pattern towards a receiver or reflective surface and/or away from an obstacle previously identified with identification subroutine 12310*b*. While shown in the transmit direction in FIG. 124, the reciprocal nature of beamforming enables controller 12300 and RF beamformer 12402 to function in the same manner in the receive direction.

With reference to FIG. 125, this example shows beam generation functionality of controller 12300 using digital beamforming. Accordingly, RF transceiver 12404 may include a plurality of RF transceivers 12404*a*-12404*c*, where each of the plurality of RF transceivers 12404*a*-12404*c* is placed on the signal line of a respective antenna element of antenna system 12206. Accordingly, controller 12300 may obtain data, identify objects, and calculate the set of complex beamforming weights in the same manner as described above for FIG. 124. Controller 12300 may generate the antenna beam with beam generation subroutine 12310*c* by providing the set of complex beamforming weights to baseband controller 12406, which may be configured with digital beamformer functionality. Accordingly, in the transmit direction, baseband controller 12406 may be configured to duplicate a baseband transmit signal to obtain duplicate baseband transmit signals, and to apply a respective complex beamforming of the set of complex beamforming weights to each of the duplicate baseband transmit signals. Baseband controller 12406 may then provide each of the resulting weighted baseband transmit signals to a respective one of the plurality of RF transceivers 12404*a*-12404*c*, which may then perform RF modulation on the weighted duplicate baseband transmit signals. The plurality of RF transceivers 12404*a*-12404*c* may then provide the resulting RF transmit signals to antenna system 12206 for transmission. The resulting radiation pattern formed by the propagation of the transmitted signals will thus produce the antenna pattern corresponding to the set of complex beamforming weights. While shown in the transmit direction in FIG. 125, the reciprocal nature of beamforming enables controller 12300 and baseband controller 12406 to function in the same or a similar manner in the receive direction.

In other aspects using hybrid beamforming, communication arrangement 12204 may include a plurality of RF transceivers and an RF beamformer including a plurality of RF beamforming circuits, where controller 12300 may provide a first set of complex beamforming weights to the plurality of RF beamforming circuits for application and a second set of complex beamforming weights to the baseband controller. Each RF transceiver is then coupled to a respective subset of the plurality of RF beamforming circuits. The signal received at each respective subset of the plurality of RF beamforming circuits may therefore have the same complex weight applied at the baseband controller, but may each apply a different complex beamforming weight to the signal on their respective signal line.

Figure 126:
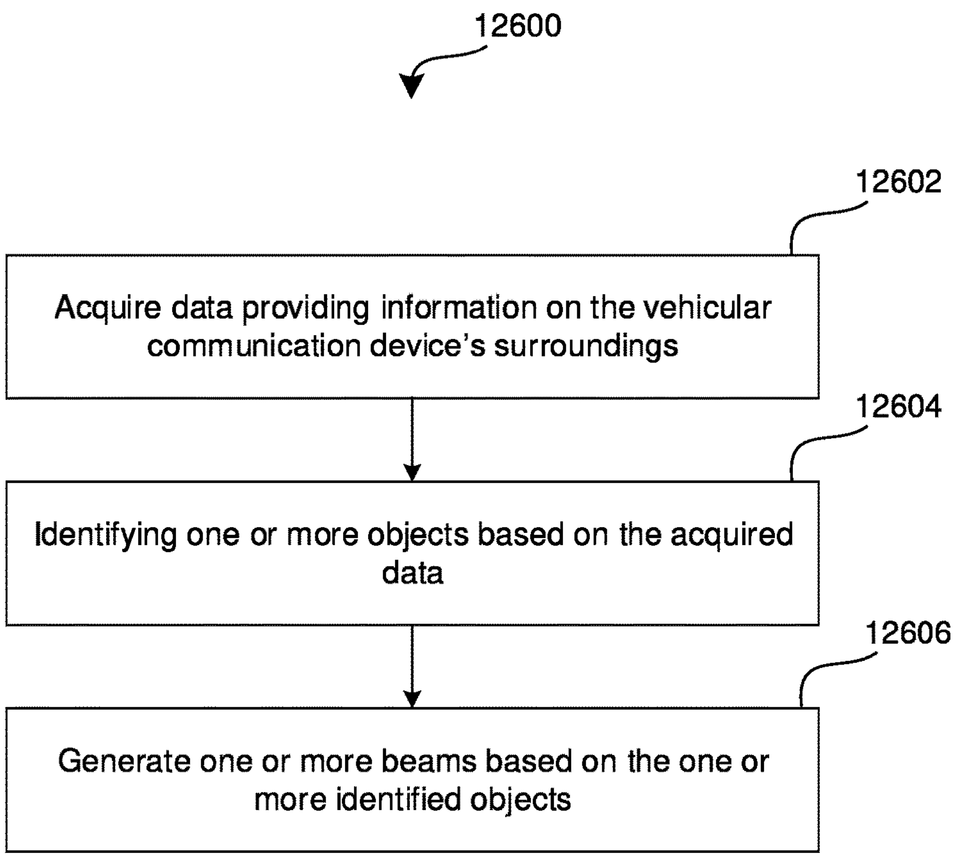

FIG. 126 is a flowchart 12600 describing a method for beam generation in an aspect of this disclosure. It is appreciated that flowchart 12600 is exemplary in nature and may thus be simplified for purposes of this explanation.

In stage 12602, the vehicular communication device acquires data providing information on the vehicular communication device's surroundings. This data may be acquired via the vehicular communication device's onboard equipment, e.g., cameras, radar, motion sensors, LIDAR, etc. In stage 12604, the vehicular communication device identifies one or more objects based on the acquire data. The one or more objects may include at least one of a receiving target, an obstacle, or a reflecting surface. In stage 12606, the vehicular communication device generates one or more beams based on the one or more identified objects.

Figure 127:
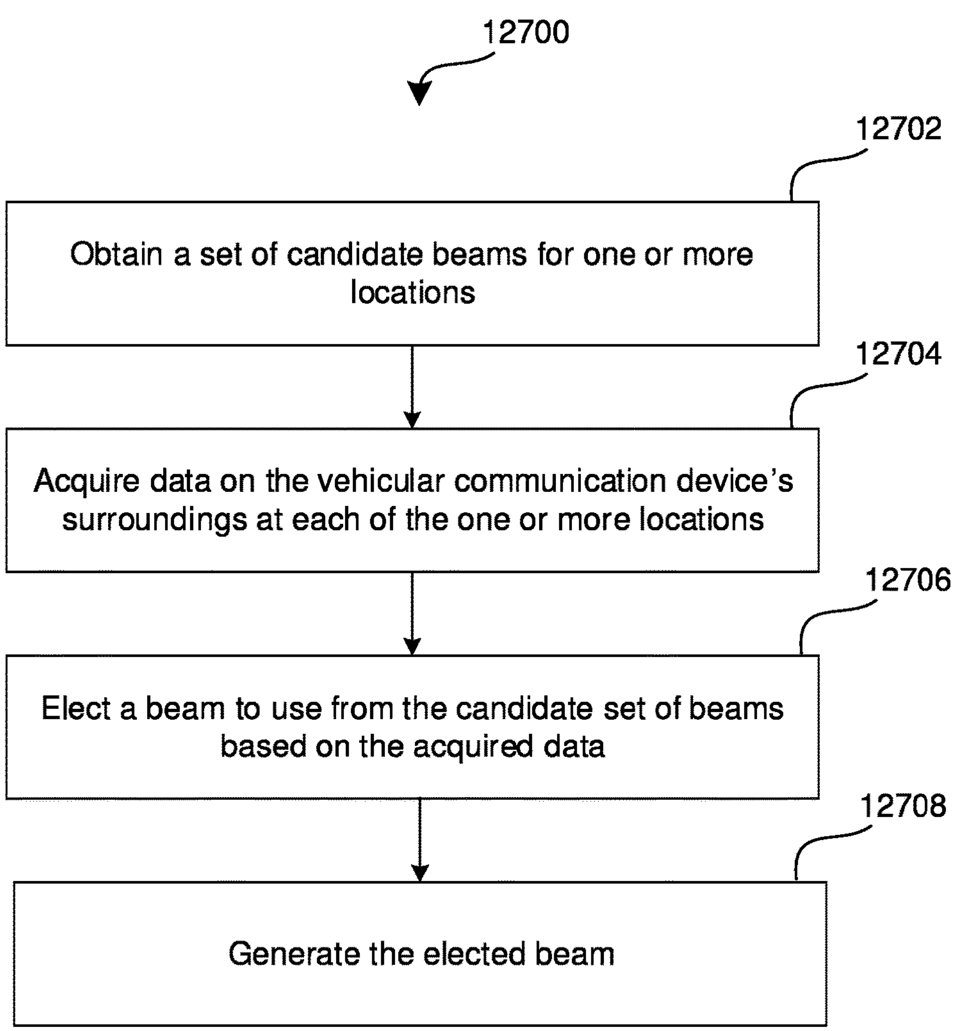

FIG. 127 is a flowchart 12700 describing a method for beam generation in an aspect of this disclosure. It is appreciated that flowchart 12700 is exemplary in nature and may thus be simplified for purposes of this explanation.

In stage 12702, the vehicular communication device obtains a set of candidate beams for one or more locations. The candidate set of beams may include one or more beams, wherein where there is more than one beam, the beams are ranked in order of priority. This set of candidate beams may be obtained from the network or directly from another vehicular communication device.

In stage 12704, the vehicular communication device acquires data to provide information on the vehicular communication device's surroundings at each of the one or more locations. This data may be acquired via the vehicular communication device's onboard equipment, e.g., cameras, radar, motion sensors, LIDAR, etc.

In stage 12706, the vehicular communication device determines which beam to use from the candidate set of beams based on the acquired data. This may include determining whether there is an obstacle obstructing a primary beam from the candidate set of beams. If not, the vehicular communication device may be configured to use the primary beam. If there is, the vehicular communication device may be configured to determine whether there is an obstacle obstructing a secondary beam from the candidate set of beams, etc. In another aspect of this disclosure, the vehicular communication device may use the acquired data to simultaneously determine obstacles for all the beams in the candidate set of beams, and elect to use the highest ranked unobstructed beam. In stage 12708, the vehicular communication device generates the elected beam.

The vehicular communication devices of this disclosure may be configured to implement the methods described in flowcharts 12600-12700 by executing, via one or more processors, instructions stored on a computer readable medium.

Integrated Circuit Replacement with Software Reconfigurable Chip

Applications may use integrated circuits that remain relevant over the lifetime of the device in which they are installed. In V2X applications (e.g., DSRC- and 3GPP LTE V2V/V2X-based), vehicular communication devices may have a lifetime of 10 years or more, which can be much longer than that of many handheld terminal devices. As these vehicular communication devices evolve, important new functionalities such as updated security features may be introduced. The disclosure provided herein may enable manufacturers to update their integrated circuits without a full physical replacement of the communication equipment.

In some Internet of Things (IoT) use cases, there may be hundreds of vertical applications, and manufacturers may not be able to serve all these markets with dedicated and optimized solutions. This disclosure provides various devices and methods for developing a small number of reconfigurable chipsets which can be adapted through software reconfiguration to a target market. Furthermore, chip manufacturers may have the ability to upgrade the software to improve performance, enhance functionality, and fix issues.

Accordingly, this disclosure provides according to some aspects for chip designs which are highly power efficient and allow for post-sale software reconfiguration either for a device's lifetime (e.g., in V2X) or for the initial application-dependent configuration (e.g., IoT).

Various aspects of this disclosure provide an efficient application-specific integrated circuit implementation. This implementation is complemented by software reconfigurable chips, which may be any type of reprogrammable logic circuitry such as digital signal processors (DSPs), microcontrollers, field-programmable gate arrays (FPGAs), programmable logic arrays (PLAs) or any other reprogrammable processing platform. In some aspects, some processing resources (e.g., the logic circuitry of the component reconfigurable circuitry) of the software reconfigurable chips may initially be unused, and may be activated over time to implement updates or new features. Accordingly, over the lifetime of the equipment, selected integrated circuits (e.g., any processor and/or dedicated hardware circuitry, which can be either standalone integrated circuits or integrated circuits that are components of other integrated circuits) can be replaced by replacement software instruction sets installed onto the software reconfigurable chips. The replacement software instruction sets, when executed by the processing resources of the software reconfigurable chips, may realize software-based 'virtualized' integrated circuits that can replace the original 'physical' integrated circuits. In some cases, this can avoid the need to perform hardware removal and installation to update the systems.

In another aspect of this disclosure, priority classes for these replacement software instruction sets may be provided. Once the processing resources of the software reconfigurable chips have been exhausted (e.g., once the reconfigurable logic circuitry of the software reconfigurable chips are at full capacity with replacement software instruction sets), less important replacement software instruction sets may be uninstalled and replaced by more critical replacement software instruction sets, such as those geared towards security updates, new encryption methods, or the like.

Based on the above framework, another aspect of this disclosure provides devices and methods for in-field software reconfiguration based on context awareness to enable a modem platform to, for example, perform in-field downloads for its partial replacement software instruction set updates through its own wireless communication link. These updates may be based on channel conditions or user scenarios, such as where certain updated replacement software instruction sets may be optimized for various specific scenarios, such as high speed use cases when the user intensively uses the terminal device in a train, high downlink throughput use cases where the user frequently watches video streams, use cases demanding longer battery life, etc. Updates may also be performed to replacement software instruction sets to support new features, such as when a terminal device needs to support a new type measurement report or various other newly introduced physical layer or protocol stack procedures.

Accordingly, this disclosure provides methods and device for the component features of a modem platform to be dynamically tailored and updated, for example, without de-assembling the hardware and without implementing all possible optimizations in the initial software build with big instruction memory.

Furthermore, the software reconfiguration of this disclosure can be performed in-field, for example, without interrupting the current wireless service. This can be achieved by exploiting the idle time within the wireless service so that the reconfiguration of a subsystem (e.g., a dedicated processor or hardware circuitry component) within a modem is activated, for example, only when it is idle, e.g., during inactive periods in the discontinuous reception (DRX) cycle. This disclosure enables dynamic chipset reconfiguration based on user needs to allow the same chipset to support various applications, thereby reducing implementation effort and productions costs.

In another aspect of this disclosure, methods and devices are proposed to utilize unused resources from the framework proposed herein to build a second system supporting a different type of application in parallel.

Figure 128:
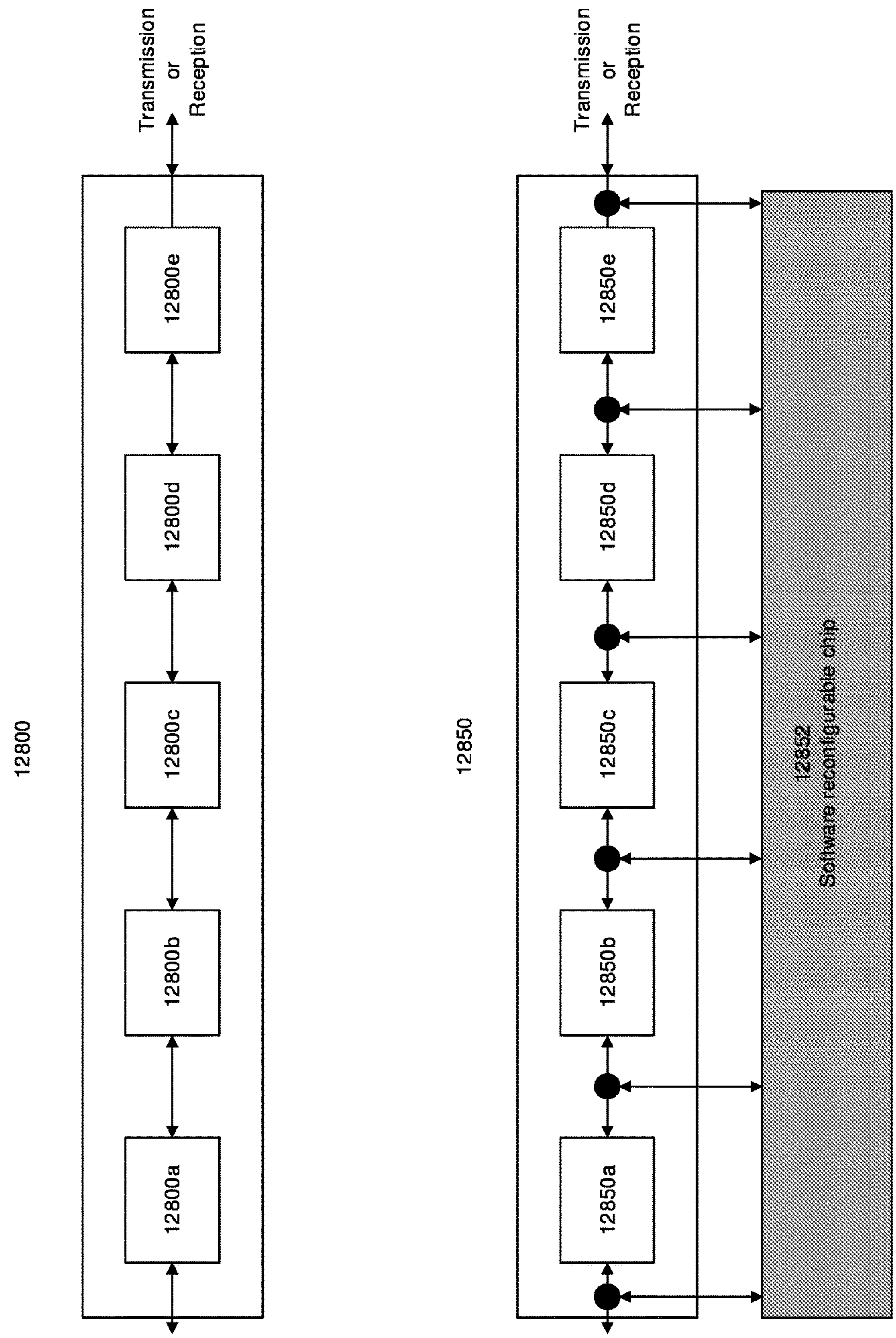

FIG. 128 is a comparison between an existing approach 12800 to chip design versus a chip design 12850 in an aspect of this disclosure. It is appreciated that 12800 and 12850 are exemplary in nature and may therefore be simplified for purposes of this explanation.

Traditional approach 12800 is based on either per-component implementations (e.g., each of integrated circuits 12800_a_-12800_e_, which may represent, for example, a cyclic redundancy check (CRC) generator/checker, channel encoder/decoder, interleaver/de-interleaver, constellation mapper/demapper, modulator/demodulator, etc.), which are highly power efficient but limited in terms of flexibility, or pure software reconfiguration solutions, which are highly flexible but inefficient from a power consumption and complexity perspective and potentially expensive for the end user. In the case of per-component implementations (based on hardware, software, or a combination of both) some firmware reconfiguration may be possible, but the full replacement of a full component, e.g., an encryption engine, is not feasible.

In the traditional approach 12800, even for a software-defined radio-based modem platform, the physical layer software may implement all the algorithms optimized for all scenarios within the same software image before the terminal device is deployed in the field. Such traditional approaches may use vast amounts of memory storage to store the codes for all scenarios, and the redundancy is especially great when the algorithms are completely different for different scenarios rather than just tuning of parameters. Furthermore, the large software image may need to be refreshed completely if feature updates are needed. Lastly, the traditional approach 12800 to chip design are designed for one or a small number of similar applications. In most cases, chips are designed for single application only (e.g., automotive, cellular modem, smartwatch, etc.), leading to increased implementation costs and maintenance.

In contrast, the chip design 12850 of this disclosure provides for devices with lower memory requirements for storing the software image as in-field reconfiguration for partial replacement software instruction sets can overwrite the existing replacement software instruction set. Furthermore, in some cases design 12850 may be more flexible and have a lower cost when partial replacement software instruction sets are updated in-field through a terminal device's own wireless links. Accordingly, the chip design 12850 can implement an optimized ASIC (or other integrated circuit) configuration that allows for replacement of integrated circuits through software reconfigurable chip 12852. In this manner, the chip may be dynamically adapted to user needs or channel conditions with on-the-fly online-based reconfiguration. In some cases, this approach can provide one or more of flexibility, power efficiency, and minimized costs.

In one aspect of this disclosure, one or more of the following features are provided to enable the combination of a highly efficient ASIC configuration with software reconfigurable chips.

First, a highly efficient ASIC configuration can be combined with software reconfigurable chips. In one aspect of this feature, the software reconfigurable chip may be initially unused, and may subsequently be activated for installation replacement software instruction sets. In this manner, selected integrated circuits may be replaced by the replacement software instruction sets installed onto the software reconfigurable chips. The processing resources (e.g., reconfigurable logic circuitry) of the software reconfigurable chips may then execute the replacement software instruction sets to realized virtualized replacements for the original integrated circuits. In some aspects, entire integrated circuits may be replaced, while in other aspects only certain partial functions of the integrated circuit may be replaced.

Second, priority classes of replacement software instruction sets can be implemented. For example, priority classes for replacement software instruction sets can be defined so that once the software reconfigurable chips are at full capacity in terms of installed replacement software instruction sets, less important replacement software instruction sets (e.g., lower priority classes) may be uninstalled and replaced by replacement software instruction sets of a higher priority class, such as replacement software instruction sets concerning security updates, new encryption methods, etc.

Third, unused processing resources can be reassigned for use in parallel-running systems, such as where processors of replaced integrated circuits (e.g., that have been replaced by virtualized replacements realized by replacement software instruction sets) are made available to the software reconfigurable chip 12852 to be to support other replacement software instruction sets (e.g., used along with the processing resources of software reconfigurable chip 12852). Software reconfigurable resource chip 12852 may include a processor or controller (not pictured) configured to control the allocation and prioritization of the processing resources available to it (e.g., both local and from repurposed processors of bypassed components).

In another aspect of this disclosure, the software reconfigurable chip may be initially designed to implement only an initially required amount of processing resources (e.g., the reconfigurable logic circuitry may only be able to support a finite amount of replacement software instruction sets), and functionalities may be updated to implement new virtualized replacement components as described in the prioritization schemes of this disclosure. The prioritization of the different applications/functionalities may be controlled by a controller.

In another aspect of this disclosure, spare processing resources for non-critical applications may be exploited. For example, if a non-critical application such as a computer game is installed, processing resources which are not currently in use may be allocated to the computer game to provide calculation power support.

The basic principle of the chip configurations and methods of these aspects is shown in example 12850. A first-generation configuration of the chip using an efficient chip surface approach, such as an ASIC platform or other integrated circuit configuration, is provided with various building blocks/basic integrated circuits 12850*a*-12850*e*. In various aspects, these integrated circuits may be, for example, a cyclic redundancy check (CRC) generator/checker, channel encoder/decoder, interleaver/de-interleaver, constellation mapper/demapper, modulator/demodulator, encryption/decryption units, MIMO processors, etc. The integrated circuits can be any type of integrated circuitry, including processors/microprocessors, controllers/microcontrollers, and dedicated hardware-defined circuitry (such as ASICs). The input/output (shown by black circles) of one or more of integrated circuits 12850*a*-12850*e* (or as shown in 12850, all of them) are provided with connectors/interfaces coupled (directly or indirectly) to software reconfigurable ship 12852, whose distribution/programming may be controlled by a controller (not pictured).

Once one of integrated circuits 12850*a*-12850*e* is identified for replacement, a corresponding replacement software instruction set may be loaded onto processing resources of software reconfigurable chip 12852 (e.g., onto an FPGA, processor, or other reconfigurable logic circuitry of software reconfigurable chip 12852) and connected to the output(s)/input(s) of the integrated circuit identified to be replaced. The replaced integrated circuit may then be bridged, or 'bypassed'. The replaced integrated circuit may be switched off from the chain, e.g., the power supply disconnected or switched off. Software reconfigurable chip 12852 may then execute the replacement software instruction set, which may realize a 'virtualized' replacement for the replaced integrated circuit. The replacement software instruction sets may therefore represent the functionality of the virtualized replacement in the form of executable instructions (e.g., using software virtualization). In some aspects, the software reconfigurable chip may fully replace the integrated circuit, while in other aspects the software reconfigurable chip may partially replace the integrated circuit, e.g., replace a specific partial functionality of the chip.

In this respect, one of the features of this disclosure is properly defining the inputs/outputs, "bypass points," of the specific blocks, shown as black circles in the figures. Specifically, bypass points may be located at the input/output of a particular block doing a specific operation, e.g., fast Fourier transform (FFT), turbo encoder, decoder, interleaver, MIMO encoder/decoder, etc. In one example, one of integrated circuits 12850*a*-12850*e* may have been originally designed for 6-bit decoding, which at some point, may not provide sufficient granularity for the intended purpose. This 6-bit decoder may be provided to another channel which is not so densely encoded, and a new FFT may be implemented from the processing resources of the software reconfigurable chip 12852 to decode at higher bits.

In some aspects, the virtualized replacements realized by the software reconfigurable chip 12852 (e.g., realized by execution of a replacement software instruction set) can be implemented across the entire protocol stack. For example, software virtualization can be used to generate replacement software instruction sets to virtualize channel coding techniques, new media access channel (MAC) functionality, new radio resource management (RRM) functionality, and/or new hardware accelerators for various processing-intensive features at the physical, protocol stack, or application layers. Accordingly, the integrated circuit of integrated circuits 12800*a*-12800*e* corresponding to the protocol stack function may be replaced by a corresponding replacement software instruction set (including program code that virtualizes the protocol stack functions in the form of executable instructions) in the software reconfigurable chip 12852.

Figure 129:
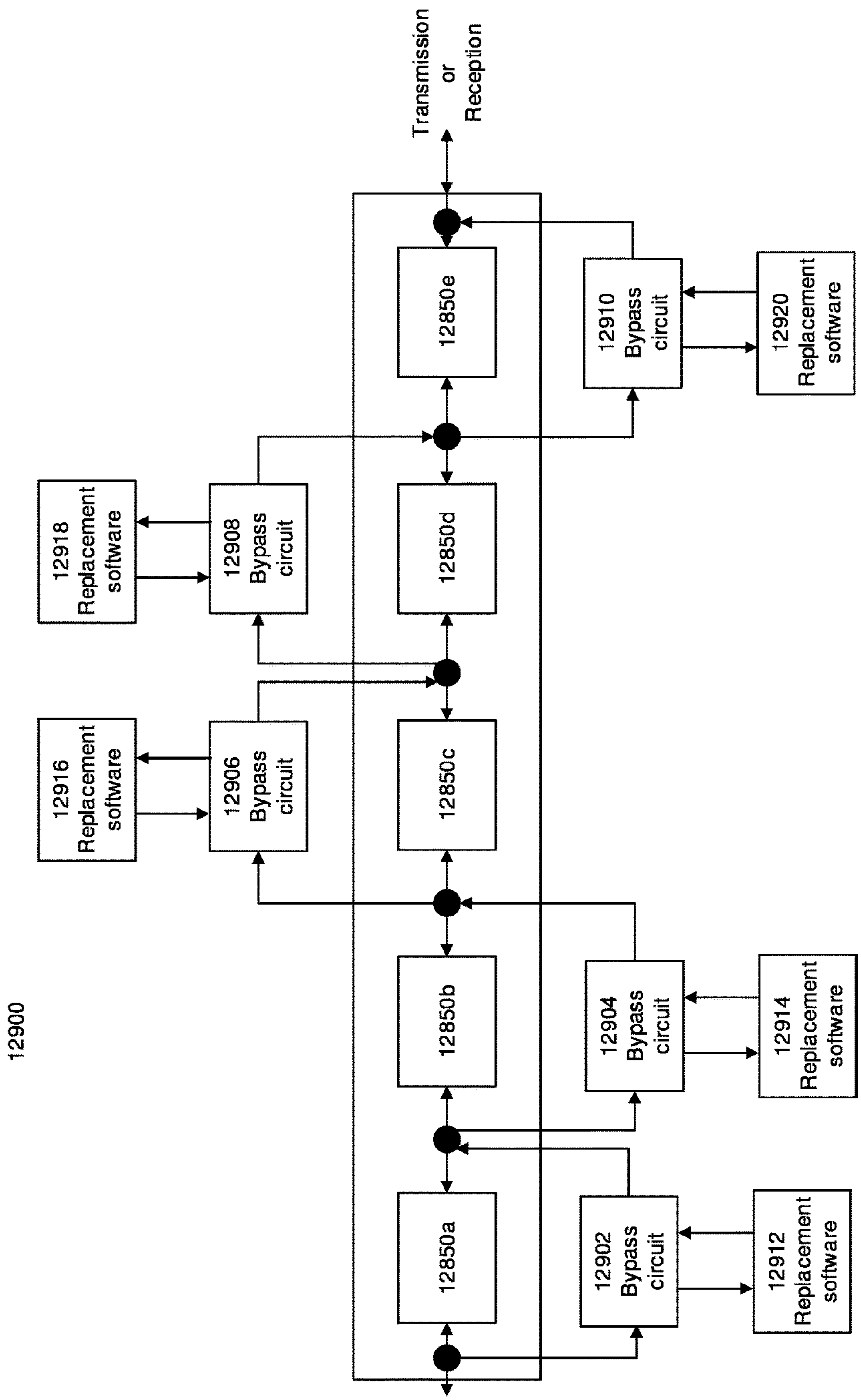

FIG. 129 shows a detailed block diagram 12900 for the devices in an aspect of this disclosure. It is appreciated that block diagram 12900 is exemplary in nature and may thus be simplified for purposes of this explanation.

Block diagram 12900 shows an integrated circuit with five baseband and/or RF components 12850*a*-12850*e*. This integrated circuit may, for example, be part of terminal device, part of a vehicular communication device, part of a network access node, or part of another radio communications device, and may include processors and/or dedicated hardware circuitry.

As shown in block diagram 12900, any one of integrated circuits 12850*a*-12850*e* may be replaced by a replacement software instruction set 12912-12920, respectively, by execution of the replacement software instruction sets by processing resources (e.g., an FPGA or other reconfigurable processor) of a software reconfigurable chip. Each of replacement software instruction sets 12912-12920 may be loaded and executed by the processing resources of the software reconfigurable chip 12852 of FIG. 128. For example, the replacement software instruction set 12920 may change a Turbo Code encoding integrated circuit (e.g., 12850*a*) to a target virtualized integrated circuit (e.g., a virtualization of an integrated circuit with software) including a modern Multi-Edge low density parity check (LDPC) encoding. The following description describes how an interface can be implemented to reroute the inputs/outputs of the original integrated circuit (which can be hardwired) to the virtualized replacement (as realized by a replacement software instruction set) and made available to the developer of software components.

In an aspect of this disclosure, a user programmable interface is provided which "reroutes" the inputs/outputs of the original integrated circuit to the processing resources of the software reconfigurable chip. Current methods may not foresee the replacement of a specific integrated circuit (e.g., of a baseband) by software-based versions. Rather, a protocol stack for each Radio Access Technology (RAT) is provided in a software version. Embodiments of the present disclosure allow manufacturers to provide a platform to software developers (e.g., original or third-party software developers) and enable the developers to replace only those integrated circuits which are authorized to be changed by the manufacturers.

To enable a software developer to perform the replacement of the integrated circuit, the manufacturer may identify the inputs/outputs of the target integrated circuit that will be available for replacement by a replacement software instruction set and provides a "bypass circuit" 12902-12910 that provides the developers with access to those inputs and outputs.

The manufacturer may define specific inputs and outputs for the target integrated circuit in block diagram 12900 to be used by the software developer (e.g., third-party) as shown by the respective black circles. The manufacturer then generates a bypass circuit standard functional block (SFB) for each input/output pairing that provides developers with access to the original (e.g., hardwired) integrated circuit 12850*a*-12850*e*. In some aspects, bypass circuits 12902-12910 may not have functionality beyond providing one or more application program interfaces (APIs) for the target integrated circuit to the developers. In other aspects, bypass circuits 12902-12910 may have limited functionality, such as buffering, synchronization or similar interfacing features. This functionality may be implemented either in hardware or software. In one aspect of this disclosure, the bypass circuits may be configured with a buffering functionality configured to temporarily hold data provided by another integrated circuit or to temporarily hold data to be provided to another integrated circuit. In another aspect of this disclosure, the bypass circuits may be configured with a synchronization functionality configured to synchronize data transfer between the software reconfigurable chip and the other integrated circuits.

The corresponding bypass box may be provided to the software development ecosystem in the form of native object code. The bypass circuit can either be made available to a front-end compiler (e.g., offline compilation in a remote site; e.g., different from compilation on the device) or a back-end compiler (e.g., online compilation on the device).

A third-party software developer may replace the original integrated circuit 12850*a*-12850*e* by accessing the inputs/outputs of the respective bypass circuit which are made available for specific usage. This replacement software instruction set (that acts as a virtualized replacement for the integrated circuit) may then be made available as a User Defined Functional Block (UDFB) to a Radio App Store.

In addition, the circuit may switch between the original integrated circuit and the virtualized replacement when needed. For example, in some circumstances one or the other of the original integrated circuit and the replacement software instruction set may be better suited, for example, in terms of stability, robustness, power consumption, etc.

The replacement software instruction set can also be updated with a newer version of the replacement software instruction set when desired. The replacement software instruction set can be activated for a pre-defined duration (e.g., from now until the end of the year), or for a fraction of the time (e.g., for a certain time period each day, etc.). Alternatively, the replacement software instruction set can be activated upon occurrence of an external or an internal trigger such as a sensing a new location, a particular type of interference for which the replacement software instruction set would perform better, etc.

In another aspect of this disclosure, a specific authorization may be provided to allow access to a bypass circuit for the installation of a replacement software instruction set. For example, the hardware manufacturer may include a request for a password or encryption key in the bypass circuit before allowing the developer access to the input and output. If a malfunctioning of the replacement software instruction set is detected (e.g., through an external trigger or by the target platform itself, such as through suitable (loop-back) tests, sensing, etc.), the device may fall back to a safe state. For example, the original integrated circuit integrated circuit 12850*a*-12850*e* may be reactivated and the replacement software instruction set 12912-12920 may be deactivated.

As described above, once the original integrated circuit is replaced by the replacement software instruction set, the power supply for the integrated circuit can be disabled, such as by using a switch. The switch may be a transmission gate that is controlled by control circuitry of the device or in the replacement software instruction set to decouple the original integrated circuit from a source of operational power.

Note that various bypass circuits, each for a respective integrated circuit, can be made available to software developers, including third-party software developers, over time. For example, the manufacturer may have full control over which integrated circuits will be available for replacement when and by whom. It is thus possible for a manufacturer to carefully open up the platform step by step and/or component by component.

Although not shown, in some aspects a bypass circuit may be used to replace more than one integrated circuit. For example, a bypass circuit includes an API for the inputs to 12850*b* and for the output of 12850*c*. In this example, the manufacturer determines the input to integrated circuit 12850*b* and the output from integrated circuit 12850*c* and the target integrated circuit, including the bypass circuit and the corresponding new integrated circuit replaces both 12850*b* and 12850*c*.

Also, it is possible that some integrated circuits are installed through software (e.g., onto FPGA resources) from the beginning if a replacement of the integrated circuit is to be expected in the near future.

In another aspect of this disclosure, the bypass circuit may provide a replacement software instruction set that is bidirectional. For example, the replacement software instruction set may be configured to replace both a channel encoder and a channel decoder. In this case, the bypass circuit provides access to the inputs and outputs of both integrated circuits.

In some aspects, the description provided above may involve replacement of integrated circuits in the physical layer. It is appreciated, however, that the replacement software instruction sets may also replace integrated circuits at higher layers of the Open Systems Interconnection (OSI) model. For example, device security is often implemented at OSI levels 2 and 3. Accordingly, a replacement software instruction set may replace a security platform. In this respect, the manufacturer may provide the input and output APIs for the security platform (e.g., an arrangement of security-related hardware and/or software) implemented in the level 2/level 3 processing block of block diagram 12900 in a corresponding bypass circuit. The replacement software instruction set may then replace the security subsystem in for 12900. The replaced integrated circuits may be at higher layers of the OSI model, e.g., the application layer.

Figure 130:
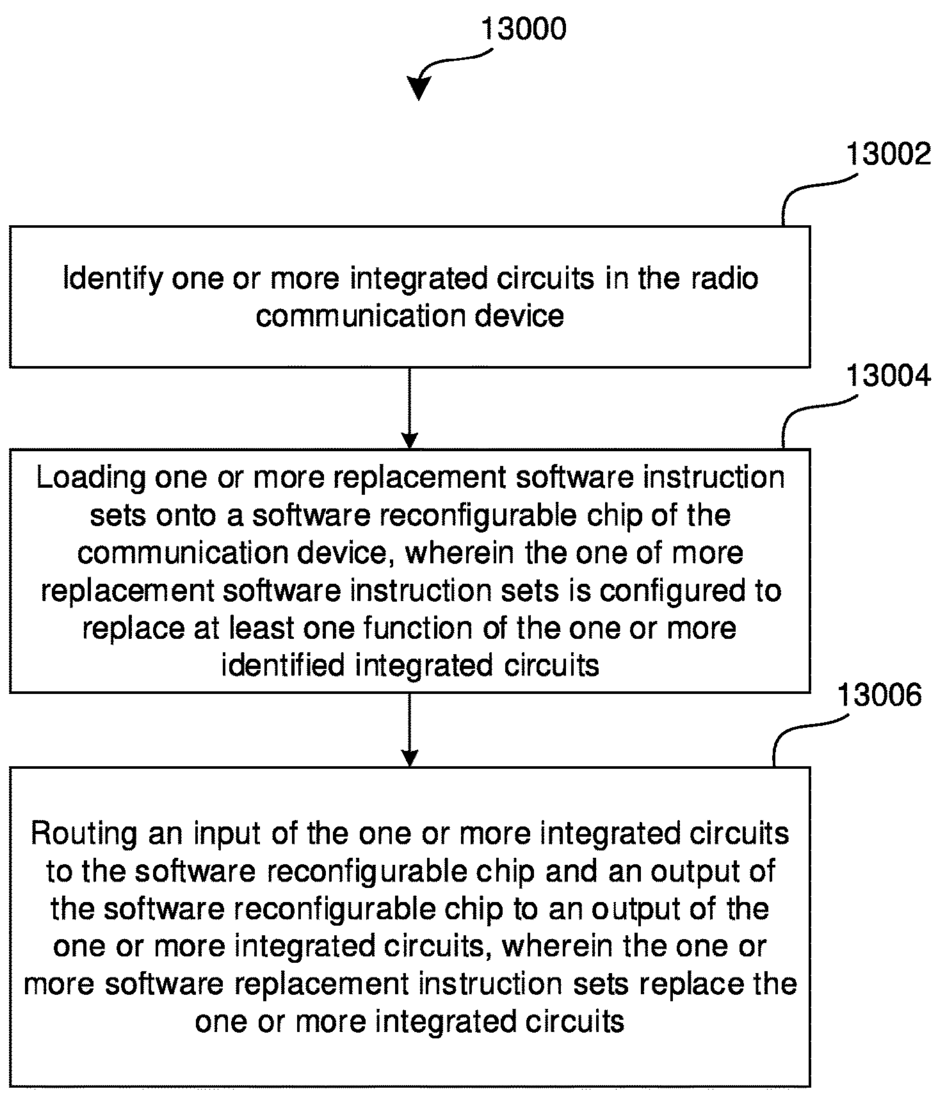

FIGS. 130 and 131 shows flowcharts 13000 and 13100 in aspects of this disclosure. It is appreciated that flowcharts 13000 and 12000 are exemplary in nature and may thus be simplified for purposes of this explanation.

Flowchart 13000 shows a method for reconfiguring a communication device. In stage 13002, an integrated circuit in the communication device is identified. For example, this integrated circuit may be baseband processing element. In stage 13004, one or more replacement software instruction sets (for virtualizing a software-based replacement of the identified integrated circuit) are loaded onto a software reconfigurable chip of the communication device, wherein the one or more replacement software instruction sets is configured to replace at least one function of the identified one or more hardware integrated circuits. For example, the software reconfigurable chip may include an FPGA, DSP, or other reconfigurable logic circuitry on which software instruction sets can be loaded and executed. In stage 13006, an input of the one or more integrated circuits is routed to the software reconfigurable chip and an output of the software reconfigurable chip to an output of the one or more integrated circuits, wherein the one or more replacement software instruction sets replace the one or more integrated circuits. Accordingly, input may be provided as input to the replacement software instruction set, and outputs from the replacement software instruction set may be provided as output.

Flowchart 13100 shows a method for producing a communication device capable of being reconfigured in an aspect of this disclosure. In stage 13102, the communication device is provided with one or more software reconfigurable chips (e.g. FPGA, DSP, PLA, etc.). In stage 13104, one or more bypass circuits are provided for one or more integrated circuits of the device, wherein each bypass circuit is configured to reroute an input of the one or more integrated circuits to one of the one or more software reconfigurable chips and route an output of the one of the one or more software reconfigurable chips to an output of the one or more integrated circuits.

FIG. 132 shows an exemplary implementation for bypass circuits, in this example, bypass circuit 12904, to provide an interface to update original integrated circuit 12805B with a software reconfigurable chip 12852. Bypass circuits may include control logic 13252, multiplexers and demultiplexer (s) 13254-13256, and buffer(s) 13258-13260. In one aspect, these elements may be implemented using a FPGA or a programmable logic array (PLA). Accordingly, the programming for the functional block defining the bypass circuit is the programming of the FPGA or PLA. While the ensuing description assumes a unidirectional flow from integrated circuit 12850*a* to integrated circuit 12850*c*, it is appreciated that a unidirectional flow in the opposite manner is also within the scope of this disclosure (in which case, a demultiplexer may be substituted in for a multiplexer). Bidirectional data flow can also be implemented, such as where control logic 13252 provides both multiplexing and demultiplexing capabilities.

Output data from original integrated circuit 12850*a* is routed to demultiplexer 13254, which is controlled by control logic 13352 to route the data either to the input port of integrated circuit 12850*b* or to buffer 13258. The control logic 13252 may be controlled by a processor of software reconfigurable chip 12852 or by a controller of the baseband modem (e.g., controller 13510 in FIG. 135). Multiplexer 13256 is controlled by control logic 13252 to route the output of integrated circuit 12850*b* or the output of buffer 13260 to the input of integrated circuit 12850*c*. Buffers 13258-13260 are controlled by control logic 13252 to latch data from the demultiplexer 13254 and from the software reconfigurable chip 12852 to synchronize the data provided by integrated circuit 12850*a* and to integrated circuit 12850*c*. Although not shown in FIG. 132, in some aspects a switch may be provided to decouple integrated circuit 12850*b* from power if integrated circuit 12850*b* is replaced by a replacement software instruction set via bypass circuit 12904. The switch may be controlled by control logic 13252 or another controller/processor of the device. Accordingly, the bypass circuit 12904 provides an interface to route data around integrated circuit 12850*b* and replace it with the software reconfigurable chip 12852.

FIG. 133 is a block diagram 13300 showing reallocation of resources in an aspect of this disclosure. In example 13300, integrated circuit 12850*b* is being replaced by replacement software instruction set 12852*a* from software reconfigurable resource chip 12852 (the corresponding bypass circuit is not shown). Example 13302 shows a more detailed diagram of 12850*b*.

Processing resources of integrated circuit 12850*b* can be allocated to the processing resources of software reconfigurable resource chip 12852 (e.g., to form a common pool of processing resources available for software reconfigurable resource chip 12852) to be used for reconfiguration and replacement of additional integrated circuits with replacement software instruction sets in the future. In this respect, upon replacement of integrated circuit 12850*b* by replacement software instruction set 12852A, DSP 13314 and FPGA 13316 may be reallocated to software reconfigurable chip 12852 in order to be reconfigured for other applications. A controller of software reconfigurable chip 12852 may then be able to access the processing resources of integrated circuit 12850*b* to upload and execute replacement software instruction sets to realized virtualized replacements for other integrated circuits.

FIG. 134 is a block diagram of an exemplary radio virtual machine (RVM) 13400 that allows for processing resources of a software reconfigurable chip to serve as replacement software instruction sets (for virtualizing replacements for integrated circuits) as described in this disclosure. RVM 13400 may be operatively coupled at least one of a baseband, application processor and/or RF circuitry in a radio communication device (e.g., a handheld or stationary terminal device or a vehicular communication device).

The RVM 13400 includes a program memory 13402 that holds code for basic operations, a program memory 13404 that holds configcodes and a controller 13406. The controller controls multiple abstract processing elements (APEs) 13410*a*-13410*m*, multiple data objects (DOs) 13408*a*-13408*n* and an abstract switch fabric 13412. The basic operations stored in the program memory 13402 include both standard functional blocks (SFBs) and user defined functional blocks (UDFBs). The SFBs and UDFBs are in the form of object code for the APEs 13410*a*-13410*m*. The configcodes in the program memory 13404 may be in the form of source code, for example C, C++, etc. configcodes stored in the program memory 13404 may be converted to object code SFBs or UDFBs for the APEs 13410*a*-13410*m* by a compiler configured to run on one of the APEs or on the controller 13406.

The integrated circuits of the example RVM 13400 are meant to convey the operational flow of the RVM. In various aspects, the actual implementation may be different from what is shown in FIG. 134. For example, the processing elements of the RVM (APEs 13410*a*-13410*m*) and the controller 13406 may include one or more single-core or multi-core processors, digital signal processors (DSPs), microcontrollers, field-programmable gate arrays (FPGAs), programmable logic arrays (PLAs) or other programmable processing elements. The memory elements of the RVM may include a single memory that is shared by the processing elements, multiple shared memory elements (DOs 13408*a*-13408*n*) and/or multiple dedicated memory elements coupled, respectively, to the multiple processing elements. The switch fabric may be a system of busses coupling the memories to the processors and/or a multiple-input multiple output switch fabric, such as a cross-point switch.

The controller 13406 stores data provided by one of the APEs 13410*a*-13410*m* or from the external ports 13414 into one or more of the data objects 13408*a*-13408*n*. The abstract switch fabric 13412 is controlled by controller 13406 to couple one or more of the data objects 13408*a*-13408*n* to one or more of the APEs 13410*a*-13410*m*. The controller 13406 also receives status information from the DOs 13408*a*-13408*n* and from the APEs 13410*a*-13410*m*. The status information from the DOs 13408*a*-13408*n* includes information on the amount of data in each DO. The status information from the APEs 13410*a*-13410*m* includes information on the status of the operations performed by each of the APEs. The controller 13406, in turn, provides status information to the appropriate RAT.

FIG. 135 shows an internal configuration of a communication device 13500 according to some aspects, which may include antenna system 13502, radio frequency (RF) transceiver 13504, baseband modem 13506 (including digital signal processor 13508 and controller 13510), application processor 13512, memory 13514, and RVM 13400. Although not explicitly shown in FIG. 135, in some aspects communication device 13500 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Communication device 13500 may transmit and receive radio signals on one or more radio access networks. Baseband modem 13506 may direct such communication functionality of communication device 13500 according to the communication protocols associated with each radio access network, and may execute control over antenna system 13502 and RF transceiver 13504 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of communication device 13500 shown in FIG. 135 depicts only a single instance of such components.

Communication device 13500 may transmit and receive wireless signals with antenna system 13502, which may be a single antenna or an antenna array that includes multiple antennas. In some aspects, antenna system 13502 may additionally include analog antenna combination and/or beamforming circuitry. In the receive (RX) path, RF transceiver 13504 may receive analog radio frequency signals from antenna system 13502 and perform analog and digital RF front-end processing on the analog radio frequency signals to produce digital baseband samples (e.g., In-Phase/Quadrature (IQ) samples) to provide to baseband modem 13506. RF transceiver 13504 may include analog and digital reception components including amplifiers (e.g., Low Noise Amplifiers (LNAs)), filters, RF demodulators (e.g., RF IQ demodulators)), and analog-to-digital converters (ADCs), which RF transceiver 13504 may utilize to convert the received radio frequency signals to digital baseband samples. In the transmit (TX) path, RF transceiver 13504 may receive digital baseband samples from baseband modem 12906 and perform analog and digital RF front-end processing on the digital baseband samples to produce analog radio frequency signals to provide to antenna system 13502 for wireless transmission. RF transceiver 13504 may thus include analog and digital transmission components including amplifiers (e.g., Power Amplifiers (PAs), filters, RF modulators (e.g., RF IQ modulators), and digital-to-analog converters (DACs), which RF transceiver 13504 may utilize to mix the digital baseband samples received from baseband modem 13506 and produce the analog radio frequency signals for wireless transmission by antenna system 13502. In some aspects baseband modem 13506 may control the RF transmission and reception of RF transceiver 13504, including specifying transmit and receive radio frequencies for operation of RF transceiver 13504.

As shown in FIG. 135, baseband modem 13506 may include digital signal processor 13508, which may perform physical layer (PHY, Layer 1) transmission and reception processing to, in the transmit path, prepare outgoing transmit data provided by controller 13510 for transmission via RF transceiver 13504, and, in the receive path, prepare incoming received data provided by RF transceiver 13504 for processing by controller 13510. Digital signal processor 13508 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. Digital signal processor 13508 may be structurally realized as hardware components (e.g., as one or more digitally-configured hardware circuits or FPGAs), defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 13508 may include one or more processors configured to retrieve (e.g., from a local memory) and execute program code that defines control and processing logic for physical layer processing operations. The program code may be updatable, such as wirelessly or by a manual install. In some aspects, digital signal processor 13508 may execute processing functions with software via the execution of executable instructions. In some aspects, digital signal processor 13508 may include one or more dedicated hardware circuits (e.g., ASICs, FPGAs, and other hardware) that are digitally configured to specific execute processing functions, where the one or more processors of digital signal processor 13508 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 13508 may be realized as a coupled integrated circuit.

Communication device 13500 may be configured to operate according to one or more radio communication technologies. Digital signal processor 13508 may be responsible for lower-layer processing functions of the radio communication technologies, while controller 13510 may be responsible for upper-layer protocol stack functions. Controller 13510 may thus be responsible for controlling the radio communication components of communication device 13500 (antenna system 13502, RF transceiver 13504, and digital signal processor 13508) in accordance with the communication protocols of each supported radio communication technology, and accordingly may represent the Access Stratum and Non-Access Stratum (NAS) (also encompassing Layer 2 and Layer 3) of each supported radio communication technology. Controller 13510 may be structurally embodied as a protocol processor configured to execute protocol software (retrieved from a controller memory) and subsequently control the radio communication components of communication device 13500 to transmit and receive communication signals in accordance with the corresponding protocol control logic defined in the protocol software. Controller 13510 may include one or more processors configured to retrieve (e.g., from a local memory) and execute program code that defines the upper-layer protocol stack logic for one or more radio communication technologies, which can include Data Link Layer/Layer 2 and Network Layer/Layer 3 functions. The program code may be updatable, such as wirelessly or by a manual install. Controller 13510 may be configured to perform both user-plane and control-plane functions to facilitate the transfer of application layer data to and from communication device 13500 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 12910 may include executable instructions that define the logic of such functions.

In some aspects, communication device 13500 may be configured to transmit and receive data according to multiple radio communication technologies. Accordingly, in some aspects one or more of antenna system 13502, RF transceiver 13504, digital signal processor 13508, and controller 13510 may include separate components or instances dedicated to different radio communication technologies and/or unified components that are shared between different radio communication technologies. For example, in some aspects controller 13510 may be configured to execute multiple protocol stacks, each dedicated to a different radio communication technology and either at the same processor or different processors. In some aspects, digital signal processor 13508 may include separate processors and/or hardware accelerators that are dedicated to different respective radio communication technologies, and/or one or more processors and/or hardware accelerators that are shared between multiple radio communication technologies. In some aspects, RF transceiver 13504 may include separate RF circuitry sections dedicated to different respective radio communication technologies, and/or RF circuitry sections shared between multiple radio communication technologies. In some aspects, antenna system 13502 may include separate antennas dedicated to different respective radio communication technologies, and/or antennas shared between multiple radio communication technologies. Accordingly, while antenna system 13502, RF transceiver 13504, digital signal processor 13508, and controller 13510 are shown as individual components in FIG. 135, in some aspects antenna system 13502, RF transceiver 13504, digital signal processor 13508, and/or controller 13510 can encompass separate components dedicated to different radio communication technologies.

RVM 13400 may be operatively connected to RF transceiver 13504, baseband modem 13506 (and to digital signal processor 13508 and controller 13510 in the baseband modem), and Application processor 13512. RVM 13400 may operate and provide updates to integrated circuits of communication device 13500 as discussed in the disclosure herein.

It is expected that over time, more and more original integrated circuits such as ASICs will be candidates for virtualized software replacement. At some point in time, the processing resources of the software reconfigurable chip will be consumed and no further replacement software instruction sets can be added. In such a case, replacement software instruction sets may be prioritized. For example, it may be considered more important to provide security, encryption, etc., schemes compared to small improvements of usability. In case a new replacement software instruction set (for virtualizing a replacement for an integrated circuit) is provided and no more processing resources are available on the software reconfigurable chip, the following method may be used for prioritizing the replacement software instruction sets:

a) Identify the priority class of the new replacement software instruction set (e.g., "high" for security updates)
b) Identify the replacement software instruction sets that are already installed of lowest priority class (e.g., "low" for small application level updates)
c) Uninstall replacement software instruction sets of lowest priority class to free up processing resources of the software reconfigurable chip
d) Install higher priority replacement software instruction set If no lower priority class replacement software instruction sets can be vacated, the installation of the higher priority class replacement software instruction set may be rejected. The prioritization and installation of features may be determined and controlled by a controller.

Classes of features may be prioritized as being safety-related, non-safety related, and fully optional. If a vulnerability is detected, the appropriate resources are identified that can be re-exploited to address the vulnerability. The devices and methods of this disclosure according to some aspects are designed to avoid the killing of safety related applications by first re-allocating resources from fully optional features (e.g., games), and if need be, re-allocating resources from non-safety related features, and if further needed, lower priority safety related features.

The controller may control the priority lists that determine which features are sacrificed for the installation of the new replacement software instruction sets. In some aspects, the controller is configured to determine the priority list with a priority value assigned to each of the replacement software instruction sets, and make a decision on which features to install/activate based on the ranking of the list. Accordingly, the controller may apply a number of different parameters, thresholds, and/or metrics to rank replacement software instruction sets within the same class in making this determination. For example, the controller may be configured to use a time parameter in ranking replacement software instruction sets within the same class, where older replacement software instruction sets may be assigned as lower priority. Additionally, the controller may be configured to use a "frequency of use" parameter, where replacement software instruction sets which are used more regularly than others will be assigned a higher priority. The controller may also be configured to implement situational parameters to prioritize replacement software instruction sets. For example, in V2X communications, a controller may be configured to deactivate a replacement software instruction set controlling a traffic light feature when driving on a long stretch of highway (which may be determined from a vehicle navigation system of the vehicular communication device), and, upon exiting the highway, to reactivate the replacement software instruction set for this feature. Accordingly, controller may be configured to determine which services and/or features to sacrifice based on a location parameter.

FIG. 136 shows an exemplary flowchart 13600 describing methods and algorithms for prioritization of replacement software instruction sets in an aspect of this disclosure. Flowchart 13600 shows a method by which to prioritize classes of replacement software instruction sets.

In stage 13602, a priority class of a new replacement software instruction set for virtualizing a replacement for an integrated circuit is identified. In stage 13604, the priority class of each of a respective replacement software instruction set loaded on the software reconfigurable chip is identified. In another aspect of this disclosure, this stage may have already been performed and the results of each respective priority class may be stored in an accessible storage medium.

In stage 13606, the determination is made if the priority class of the new replacement software instruction set is greater than the priority class of a respective replacement software instruction set already loaded on the software reconfigurable chip (this may be the component with the lowest priority on the software reconfigurable chip). If it is not, then the installation of the new replacement software instruction set is rejected in stage 13608.

If the priority class of the new replacement software instruction set is greater than the priority class of a respective replacement software instruction set already loaded on the software reconfigurable chip, then the respective replacement software instruction set is uninstalled in stage 13610, and, if there are enough resources for the installation of the new replacement software instruction set in stage 13612, the new replacement software instruction set is installed in stage 13614. If there are not enough resources, then stages 13606-13612 may be repeated.

In another aspect of this disclosure, a determination may be made to make available enough processing resources of the software reconfigurable chip occupied by replacement software instruction sets of lower priority classes than the new replacement software instruction set for immediate installation, e.g., no loop back between stage 13612 and 13606 is needed.

For V2X applications, the methods and algorithms described in this disclosure may be implemented in the communication arrangement of a vehicle to address security vulnerabilities and provide critical updates to the system to prevent attacks on certain components and identify weaknesses in implementations or protocols. In order to maintain long-term functionality, the various components making up the vehicular communication device will need to be able to perform critical upgrades of its parts, e.g., to comply with updated radio communication standards.

The disclosure provided herein allows for the vehicular communication device (as well as any other type of radio communication device based on the disclosure herein) to make these upgrades without the need that the replaced integrated circuit be entirely designed as software in the first place. For example, there may be a full hardware implementation of an integrated circuit, and additional replacement software instruction sets may provide replacements for parts of the hardware with the specific focus to address security vulnerabilities. This may be attained by adding additional hardware resources in parallel to the replaceable parts, or by increasing the capacity within each of the parts (e.g., adding additional spare capacity to a DSP within any of integrated circuits 12850*a*-12850*e*).

FIG. 137 is a block diagram 13700 demonstrating an exemplary device modem platform for a communication device 13500 interacting with a base station 13750 through uplink 13720 and downlink 13730 in an aspect of this disclosure.

Within the modem platform, there are certain sub-systems in the physical layer, such as an encoder and modulator arrangement 13710 for uplink transmitted signal generation, a demodulator and decoder arrangement 13714 for downlink signal reception, and a cell search and measurement engine 13712 for neighboring cell detection and measurement. Each of these integrated circuits can consist of hybrid combination of software reconfigurable signal processing processor, e.g., a DSP, and configurable hardware accelerators to support flexibility. The integrated circuits are loosely coupled with each other, meaning each has its own software image to configure the processor and the hardware accelerators. The control signaling between integrated circuits are through inter-core messages.

In an aspect of this disclosure, based on the context awareness methods and algorithms described herein, the communication device 13500 may send a software reconfiguration request to the base station 13750 for its physical layer components to get a user tailored feature/optimization.

For an exemplary user scenario, the communication device 13500 is embedded within a communication arrangement of a vehicular communication device which changes its status from driving state to parking state. After this change, the baseband modem 13506 may no longer need high data throughput but needs coverage enhancement and low power consumption. Thus, the communication device 13500 may request the base station 13750 to download a dedicated "long range low power radio app" to update software reconfiguration of its transmitter and receiver.

In another exemplary scenario, communication device 13500 may be on a high-speed train and use high-quality wireless data access in the train. The communication device 13500 can download a "high-speed radio app" to update the configuration of the baseband modem 13506. The updates are done in-field on-the-fly so that the user experience of a phone is not degraded.

In another exemplary scenario, for a new feature requirement, when communication device 13500 has been deployed for many years but still serving in the field (e.g., when integrated into a vehicle) the baseband modem 13506 can be upgraded through on-line software reconfiguration for new radio features, e.g., the cell search and measurement engine 13712 can be updated with a new software configuration or algorithms to support a new measurement report.

In another exemplary scenario, for a new application requirement, if the baseband modem 13506 is not being used for the application it is designed for, it can be reconfigured online by a user for another application assuming it is equipped with the necessary hardware. In this case, the baseband modem 13506 hardware would be designed for a set of applications but the integrated software could be updated accordingly to user needs. For example, the baseband modem 13506 may be equipped with the requisite hardware and/or software for a set of applications such as health, entertainment, or sport applications, and may be updated/reconfigured for a desired application on-the-fly per user needs.

While several exemplary context awareness scenarios have been provided above, it is appreciated that the application of the methods and devices disclosed herein are not limited to these examples.

The software reconfiguration request by the baseband modem 13506 may be initialized by a number of different schemes. In one aspect of this disclosure, an autonomous update is provided. The communication device 13500 learns the user behaviors, such as by counting the statistics of measured metrics such as Doppler shift estimation, downlink throughput, or based on triggers from sensors 13702 such as a velocity sensor, and then, based on the learning results, can send a request to base station 13750 to download the corresponding tailored replacement software instruction sets (e.g., certain cell search library instruction sets). By doing this, the baseband modem 13506 may, for example, not be reset, and consequently the user experience may not be degraded. In another aspect of this disclosure, a user may directly request updates. When user desires a new feature or demands optimization for certain scenarios, the communication device 13500 wireless physical gets indications directly for user requests through higher layers, and the requests the replacement software instruction set updates from the base station.

The activation of a software reconfiguration can be done in-field, or in other words, on-the-fly, which can in some cases avoid degradation of user experience of a communication device. In an aspect of this disclosure, this is done when the integrated circuit targeted for replacement is not active while the overall wireless link is still active, e.g., the reconfiguration of a receiver (RX) can be activated with new software reconfiguration during DRX (discontinued reception) cycles when the receiver is idle; the reconfiguration of a transmitter (TX) can be activated during measurement gaps or DTX (discontinued transmission) cycles when the transmitter is idle; the reconfiguration of a cell search and measurement engine 13712 can be activated when the communication device 13500 has a good serving cell link and therefore no measurement is scheduled.

FIG. 138 is a flowchart 13800 describing a method allowing for replacement of an integrated circuit by a software reconfigurable chip in an aspect of this disclosure.

In stage 13802, one or more integrated circuits in the circuit are identified to be replaced, e.g., one or more of integrated circuits 12850*a*-12850*e* in FIG. 128, which may correspond to components in a baseband modem, RF circuitry, or application processor of a communication device.

In stage 13804, a software reconfigurable chip is configured with one or more replacement software instruction sets to replace the identified integrated circuits (e.g., by virtualizing a replacement for the integrated circuit via software execution), wherein each of the replacement software instruction sets is configured to replace at least one identified function of a respective integrated circuit.

In stage 13806, an input of each of the one or more identified integrated circuits is routed to the software reconfigurable chip and an output of the software reconfigurable chip is routed to a destination of the one or more identified integrated circuits' outputs so that the one or more replacement software instruction sets replaces a functionality of the one or more integrated circuits, thereby bypassing the one or more integrated circuits.

FIG. 139 is a flowchart 13900 describing a method for a triggering a software reconfiguration of a device in an aspect of this disclosure.

In stage 13902, a reconfiguration of the device is triggered. This may be done, for example, if vulnerability is detected, or if an update is available to provide a virtualized replacement for an RF subsystem of the device. In stage 13904, a reconfiguration request is transmitted to the network. In stage 13906, the reconfiguration grant is received from the network, wherein the reconfiguration grant may include the replacement software instruction set configured to provide a replacement for an integrated circuit of the device.

In stage 13908, the device may install the replacement software instruction set, and in stage 13910, the device is reconfigured so that the replacement software instruction set replaces at least one of one of the identified integrated circuits which triggered the reconfiguration of the device in stage 13902.

It is appreciated that flowchart 13900 provides a basic implementation for the methods of this disclosure, and may further be supplemented by the certification and protections mechanisms disclosed herein.

In another aspect of this disclosure, methods and mechanisms for certification of devices which are updated as described in this disclosure are presented. The declaration of conformity (DoC) methods described below provide for reconfiguration of device radio features when it is already on the market.

Current DoC methods present procedures by which manufacturers sign a document to certify that a device meets all of the requirements of the applicable directives. However, since the devices presented in this disclosure are configured to be updated and possibly reconfigured to alter their radio functionalities, for example, currently imposed DoC methods are inadequate to ensure that these devices still conform to the appropriate standards.

Accordingly, methods and devices configured to provide in-field DoC updates. For example, updated DoC standards are disclosed in order to allow a manufacturer to provide a pointer to a web address for a specific device (e.g., terminal device, vehicular communication device, etc.) or type of device where the DoC is located, and allow the manufacturer to update the DoC available at the indicated web address upon upgrades to the device.

An exemplary scenario of a certification procedure for a device which has changed its radio features is described as follows. Initially, a manufacturer may develop a replacement software instruction set, and prior to installing the replacement software instruction set on the device, the manufacturer determines whether the existing DoC allows the combination of software and hardware. If it is not allowed, the manufacturer updates the DoC to include the new software and makes the updated DoC available at the web address indicated by the pointer. Thereafter, the manufacturer may send the software to the device.

The device then identifies if its current DoC covers the replacement software instruction set, e.g., by reading an electronically readable file on the replacement software instruction set that are covered by the DoC, which may include software identifications, versions, signatures, etc. If the new replacement software instruction set is not covered, the device is configured to look up the web address (known to the device) to check if the manufacturer has made a new DoC available. Upon determining that a new DoC is available, the device will download the updated DoC, and then check again to see if the new replacement software instruction set is covered by the updated DoC. A machine readable medium may serve as an annex to the updated DoC.

If it is covered, the new replacement software instruction set will be installed, and if it is not, the installation of the replacement software instruction set will be rejected. If installed, the device is configured to send a notification about its upgrades status. This notification may be triggered by the manufacturer, which maintains a database for each time a device is updated.

In another aspect of this disclosure, protection mechanisms are presented. In order to avoid replacement software instruction sets being copied by third parties, each device (e.g., Terminal device, vehicular communication device, etc.) includes an encryption engine and a unique private key. The private key may be contained in a trusted platform module (TPM).

After receiving a replacement software instruction set, such as to provide an upgrade to an integrated circuit by virtualization as described in this disclosure, the device is configured to sign the replacement software instruction set with its private key, and the manufacturer is able to obtain and verify this signature. Thereafter, if device is copied by a third-party, the party would need access to the private key to use the device. The digital signature of the private key will not change the device content and the replacement software instruction set need not be encrypted. If a third-party copies the clear text and the digital signature, they may be able to use the integrated circuits privately, but a central trusted authority would be able to assess that the integrated circuit is not the original, and blacklist the copied device from the network.

Accordingly, it would be very impractical to copy a device, as access to the private key would be needed, and decomposing the TPM to obtain the private key is both time consuming and extremely costly. Furthermore, as the private key is unique to each device, only a single private key obtainable.

In an exemplary scenario illustrating the above protection mechanism, a device may request a new replacement software instruction set to address an identified vulnerability. The network would send the replacement software instruction set to the device and the device would verify the signature of the source of the software. Then, the device would sign the new replacement software instruction set with its private key, which the source of the replacement software instruction set would be able to recover through a remote attestation mechanism. The source of the replacement software instruction set would check to see if the signature corresponds to the private key (which is known by the manufacturer and registered with the network). In this manner, if a rogue device copies the device, the rogue device could be blocked by the network as its signature would not correspond to the appropriate private key known by the network.

Reuse of Existing Structures for Vehicular Antennas

Vehicular communication devices in developing vehicular networks may engage in wireless communications with a variety of different types of devices, including other vehicles (Vehicle-to-Vehicle, or V2V), network infrastructure (Vehicle-to-Infrastructure, or V21), and pedestrians (Vehicle-to-Pedestrian, or V2P). Vehicular communication devices can therefore be expected to initiate and maintain communication links with various different targets having varying mobility profiles, such as other vehicles moving in unison, stationary network infrastructure and parked vehicles, pedestrians on foot, etc. There may therefore be a use for new and effective mechanisms to transmit and receive wireless signals with other target devices.

In an aspect of this disclosure, RF and antenna subsystems are integrated with existing vehicular structures, such as headlights, tail lights, turn signals, mirrors, windows, etc., to form passively- and/or actively-controlled communication interfaces. For example, an RF and antenna subsystem may be integrated with a headlight by positioning the antenna head to emit radio signals in a forward direction of a vehicle. RF lens techniques can be incorporated by depositing lensing materials onto the surface of the headlight. The lensing material can be deposited to form a passive RF lens that refracts radio signals in a fixed manner, such as by focusing or narrowing an RF beam to be emitted through the headlight, or broadening an RF beam in a similar manner, or creating other desirable antenna patterns.

In another aspect of this disclosure, responsive lensing materials may be used with a controller to form an actively-controlled communication interface. In particular, the controller can vary the lensing pattern by changing a bias across the lensing material, which may be an electrically-responsive lensing material may be altered by applying an electric bias, a magnetically-responsive lensing material may be altered by applying a magnetic bias, etc.

The methods and devices provided herein provide for improved front and rear directional radio communications for vehicular communication devices. While side-to-side communications may function without issue (e.g., V2I), in certain cases vehicular communication devices may have issues when communicating with targets located directly in front of and/or behind (e.g., V2V). The integration of RF and antenna subsystems into headlights and/or tail lights may help to resolve these problems.

FIG. 140 is an exemplary diagram of a vehicular communication device 14000 with an RF lensing system in an aspect of this disclosure. It is appreciated that components of vehicular communication device 14000 may correspond to vehicular communication device 500 in FIG. 5, such as steering and movement system 502, communication arrangement 504, and antenna system 506. Furthermore, antenna system 506 and communication arrangement 504 may be internally configured in the manner shown and described for FIG. 6. In some aspects, RF transceivers 14002*a*-14002*b* as shown in FIG. 140 may be configured in the manner of RF transceiver 602 shown in FIG. 7.

Communication arrangement 504 may include one or more processors for controlling RF transceivers 14002*a*-14002*b*, each of which may be configured to transmit one or more radio signals for multiple RATs. As shown in FIG. 140, vehicular communication device 14000 may include communication arrangement 504 and a primary antenna 506 that serve as a primary communication source. RF lens subsystems 14002*a* and 14004*a* (at the front of vehicular communication device 14000) and 14002*b* and 14004*b* (at the rear of vehicular communication device 14000) can be incorporated into existing structures of the vehicle, such as the headlight and tail lights, respectively. Each RF lens subsystem may include an RF transceiver (14002*a* or 14002*b*) and may further include an antenna mounted in the light housing (14004*a* or 14004*b*) and an RF lens deposited on the lens of the respective light.

Alternatively, in some aspects the antenna may be arranged behind a window, windshield, sunroof, etc., or a mirror surface and the RF lens may be applied to the glass surface when using one of the aforementioned existing vehicular structures to transmit the radio signals.

In some aspects, a high speed wired data bus (e.g., a Common Public Radio Interface (CPRI)) or a high speed short-range wireless technology (e.g., WiGig) may be used as the bridge between communication arrangement 504 and RF transceivers 14002*a*-14002*b*. In some cases, this may assist in managing the relatively long communication distance between the baseband processor in communication arrangement 504 and RF transceivers 14002*a*-14002*b*. Additionally or alternatively, in some aspects the IQ samples may be prepared earlier and associated with a global time stamp which indicates when the data packet shall be activated in the RF side (e.g., for transmission cases) or the baseband side (e.g., for reception cases). In some cases, this may assist in ensuring that V2X communications are carried out in a precise temporal fashion, and may also reduce uncertainty in transmission time between the central baseband processor and the remote RF lens subsystems.

FIG. 141A is an exemplary diagram of an RF lens subsystem 14100 implemented in a headlight of a vehicular communication device in an aspect of this disclosure. Although demonstrating the implementation of the RF lends subsystem 14100 in the headlight, it is appreciated the disclosure herein may also be implemented in other lights, windows, and/or structures of vehicular communication device in the same or a similar structural and operational manner.

In RF lens subsystem 14100, antenna 14104 is positioned to emit radio beams out of the headlight 14102. A lensing material deposited on the surface of the headlight 14102 may form an RF lens that refracts and redirects radio beams produced by antenna 14104. Similar to an optical lens for refracting visible light, the lensing material deposited on headlight 14102 may bend and refract the radio beams 14120 produced by antenna 14104 to produce a directed radio beam 14122 out of the headlight. Depending on the arrangement of the lensing material, the RF lens subsystem 14100 can focus, broaden, and/or steer the directed radio beam.

RF lens subsystem 14100 is exemplary of a passively functioning RF lens subsystem. In this case, the RF lens placed on the surface (e.g., of the headlight) in a specific configuration produces a fixed, radiated pattern with radio beams produced by the antenna. If, for example, focused radio beam 14122 is desired to communicate with devices in front of the vehicle, the RF lens on headlight 14102 can be configured in a focusing arrangement that produces a highly directional radio beam. The RF lensing material applied to headlight may be specifically configured to steer the focused RF beam 14122 in the approximate direction towards where receiving antennas would be placed in other vehicles, for example, or can be broadened to cover a wider area. As the RF lensing material on headlight 14102 is operated passively, the directing pattern of beam 14122 is fixed over time.

FIG. 141B is an exemplary diagram of an RF lens subsystem 14150 according to some aspects that is configured to operating in an active manner to dynamically change the directed RF beams emitted from the headlight 14102.

In RF lens subsystem 14150, controller 14152 provides a control signal to biasing circuitry 14154 that electrically interfaces with the RF lens applied on headlight 14102. In these active implementations, the RF lens may be made from an electrically-excitable material which changes the manner it refracts RF beams based on electrical stimulations applied to it. Accordingly, controller 14152, which may receive signals from communication arrangement 504 (as shown in FIG. 140) on what control signals to send to biasing circuitry 14154, may carry the control signal, prompting the biasing circuitry 14154 to alter the voltage applied to the RF lens applied on headlight 14102. This in turn will manipulate the directed RF beam pattern emitted by the headlight dependent on the manner by which the electrically stimulated RF lens bends and refracts the RF beam 14120 from antenna 14104. For example, when biasing circuitry 14154 applies zero voltage across RF lens applied to headlight 14102, the RF lens may be configured to produce RF beam 14122. However, upon a control signal from controller 14152, biasing circuitry 14154 may apply a voltage across RF lens in/on the headlight 14102, thereby dynamically altering (in this case, narrowing) the emitted RF beam 14162.

Accordingly, an active implementation as shown in FIG. 141B may enable the RF lens subsystem to adaptively change the beam direction, change the degree of beam narrowing/focusing, and/or change the amount of beam broadening. The controller may be provided in part as the main radio communication system, and may rely on information that specifies the target device and/or the target direction of the directed pattern, e.g., which can be derived from camera data, radar sensing, position reporting by other devices, and or Angle on Arrival (AoA) estimation. Controller 14152 may then provide the appropriate control signal to the biasing circuit 14154 that will result in the corresponding bias voltage to change the directing pattern in the desired direction. RF transceiver 14002a and antenna 14104 may function in the same manner as in the passive case (e.g., as shown in FIG. 141A), although in some cases, the antenna may also use beam adaptation (e.g., beamsteering, beamforming, beam narrowing, etc.) to further manipulate the overall radiation pattern.

An exemplary case for beam broadening in the active RF lens subsystem 14150 may be where, initially, RF lens subsystem 14150 may be configured to emit a narrow beam from RF lensing material on headlight 14102 as shown by beam 14162. In this exemplary case, beam 14162 is emitted when biasing circuitry 14154 applies zero voltage (or, alternatively, some other predefined voltage corresponding to a narrow beam, which may depend and vary depending on the specific configuration of the RF lensing material) across the RF lens on headlight 14102. However, if communication arrangement 504 determines that beam 14162 is suboptimal for current radio communication conditions (e.g., if vehicular communication device not receiving appropriate responses from vehicles located in front of the vehicular communication device), controller 14152 may send a control signal to biasing circuitry 14154 to instruct biasing circuitry 14154 to apply a voltage across RF lens on headlight 14102. This voltage may then manipulate the electrically-excitable RF lens on headlight 14104, and may widen the beam to shape 14122.

In some cases, the vehicular communication devices of this disclosure may use RF lens subsystems as a secondary communication mechanism, and may primarily use the main antenna(s) to communicate with other devices. The vehicular communication devices may use then use the RF lens subsystem when needed and/or for communication in specific directions (governed by placement of the RF lens subsystem). In this manner, the RF lens subsystem may supplement the main antennas vehicular communication device (e.g., antenna 506 in vehicular communication device 14000 shown in FIG. 140).

In other aspects, the vehicular communication device may use RF lens subsystems (e.g., shown in FIG. 141A-141B) for the primary communication mechanism. In some aspects, the vehicular communication device may also use an array of RF lens subsystems placed in a variety of different locations on the vehicle (e.g., in the different windows and lighting components), and may selectively use each RF lens subsystem when communication in the direction in which the respective RF lens subsystem is facing.

The various placement options of the RF lens subsystem on the vehicle can be useful for different types of communications. For example, forward-facing RF lensing subsystems placed in a headlight may be used for communicating with vehicles in front of the vehicular communication device, while rear-facing RF lensing subsystems placed in a tail light may be used for communicating with vehicle behind the vehicular communication device. Various other placement options for RF lens subsystems are turn signals, front and rear windshields, side windows, mirrors, sunroofs/moon roofs, or the like. Accordingly, the RF lens subsystems may not only be limited to V2V uses, but may also be used for V2I and V2P. For example, placement of the RF lens subsystem in a side window and roof window may facilitate sideways and overhead communication, respectively.

In some exemplary use cases, an RF lens subsystem with beam focusing (e.g., narrowing) and steering can be used for V2I, where stationary location of network infrastructure may allow for the use of narrower beams. In some cases, as it may be difficult to steer and trach the RF lens subsystem in the precise direction of another moving vehicle, the RF lensing subsystem may use beam broadening for V2V.

The lensing material used for the RF lens may be any material that refracts or bends radio waves. For example, engineered electromagnetic material and/or metamaterials may be specifically developed to manipulate the manner in which the RF waves refract as they pass through the material.

The RF lens applied to any of the existing structures in a vehicular communication device (e.g., to lights, windows, etc.) may include a frequency selective surface (FSS). This FSS surface may include applying a thin, periodic (e.g., repetitive) surface designed to reflect, transmit, or absorb RF waves based on the frequency. Accordingly, the FSS layer in the RF lens may function as a filter in which the filtering is performed according to the regular, periodic (e.g., metallic or dielectric) pattern on the surface of the FSS layer. The thickness and periodicity of the elements in the FSS layer may be specifically engineered for a particular RF frequency and/or beamforming application.

FIG. 142 shows an exemplary FSS layer arrangement, including a top view 14200 and a side view 14250 of an FSS layered arrangement that may be applied to an existing vehicular structure (e.g., on a headlight, tail light, or any other suitable vehicular structure). While each element in the FSS layer shown in FIG. 142 is a circular ring, it is appreciated that other shapes (e.g., quadrilaterals or other polygons) are included in this disclosure. In the case of polygons, the multilayered arrangements may be configured to align each layer perfectly with one another or have some rotational difference between the polygons of the different layers (e.g., the center of each of the polygons may be aligned while the corners of the polygons are not).

The frequency response of the FSS elements 14210 on substrate 14255 is largely determined by the element type and size, the element periodicity, and the lattice geometry and electrical properties of the substrate material 14255. FSS elements 14210 may include metallic components (e.g., aluminum), and substrate material 14255 may be composed of metallic and/or a dielectric material (e.g., silicon-based materials).

FSS elements 14210 may be printed on a substrate material 14255 according to various printing techniques. Double resonant arrays, as shown in 14250, have a usable transmission band situated between the two resonances. The upper resonance may be determined by adjusting the inner element dimensions and spacing between elements 14210. In addition to the modifying the geometric parameters of the FSS layer, the frequency response can be tailored by cascading two or more arrays (e.g., two as shown in side view 14250) where the interlayer interference effects are used to modify the width of the bands and the roll-off rate.

Side view 14250 shows a double layered periodic FSS structure with a substrate material 14255 separating two layers of FSS cells 14210. Substrate 14255 may be determined based on the relative permittivity of the material and the characteristic admittance of the material, among other factors. In one aspect of this disclosure, a fused silica substrate with a thickness greater than about 70 micrometers (e.g., about 100 micrometers) may be used.

In another aspect of this disclosure, a third layer of elements may be added separated from one of the other layered array of elements (e.g., either top lay or bottom layer as shown in side view 14250) by a second layer of substrate material.

FIG. 143 is an exemplary configuration of an active RF lens 14300 applied in or on an existing vehicular structure (e.g., headlight 14102), wherein RF lens 14300 is configured to be dynamically modified with an applied bias.

As shown in configuration 14310, when there is zero voltage applied to the substrate 14255 (e.g., from biasing circuitry 14154), the layers of the FSS elements 14210 on either side of substrate 14255 may have an offset as indicated by 14302. Furthermore, substrate 14255 may have a width W. This particular arrangement, for example, may serve to provide a desired RF beam in a first scenario.

Upon the application of a voltage from biasing circuitry 14154 to substrate 14255, two parameters, for example, of the active RF lens 14320 may be altered in order to dynamically alter the RF beam produced. First, there may be a reduction in the offset 14322 between both layers of FSS elements 14210 (in other aspects of this disclosure, application of a voltage may result in an increase in the offset, depending on how the RF lens 14300 is initially arranged and designed at when no bias is applied). Second, the substrate 14255 may undergo an increase or decrease in width, W f A, as compared to when no voltage is applied. Either, or both, of these changes to the active RF lens upon the application of a voltage may result in two distinct desired RF beams being emitted in 14310 and 14320, respectively, which may be toggled between depending on the scenario.

Accordingly, by applying a perturbation (e.g., via a voltage bias) across the substrate material 14255, the lateral displacement of the elements 14210 on either side of the substrate and/or a variation in width of the substrate may result in a different RF beam compared to when no perturbation is applied.

FIG. 144 is a flowchart 14400 is a flowchart describing a method in an aspect of this disclosure. It is appreciated that flowchart 14400 is exemplary in nature and may thus be simplified for purpose of this explanation.

In stage 14402, an RF antenna subsystem of a vehicular communication device receives an input signal. In stage 14404, the RF antenna subsystem outputs one or more radio signals to an RF lens applied to a structure of a vehicle. In stage 14406, the RF lens selectively transmits the one or more radio signals based on their respective frequencies.

FIG. 145 is a flowchart 14500 is a flowchart describing a method in an aspect of this disclosure. It is appreciated that flowchart 14500 is exemplary in nature and may thus be simplified for purpose of this explanation.

In stage 14502, an RF antenna subsystem of a vehicular communication device receives an input signal. In stage 14504, the RF antenna subsystem outputs one or more radio signals to an RF lens applied to a structure of a vehicle. In stage 14506, a bias is applied to the RF lens in order to alter the structure of the RF lens to modify the one or more radio signals transmitted through it. In 14508, the RF lens selectively transmits the one or more radio signals based on their respective frequencies. It is appreciated that stages 14506 and 14508 may be performed simultaneously, or that stage 14508 may be performed prior to stage 14506.

Correction of Doppler Effect

In another aspect of this disclosure, vehicular communication devices may be configured to account for Doppler shift between moving vehicles. Doppler shift can introduce noise into wireless signals between moving vehicles, and the resulting noise will vary in frequency depending on the relative speeds of the vehicles. For wideband signals, the noise may vary across the composite subcarriers, while for narrowband signals, the noise may be approximately uniform across the entire narrowband width.

In an aspect of this disclosure, a vehicular communication device is configured to estimate the relative speed of a target vehicle and equalize transmit and/or receive signals to compensate for the resulting Doppler shift. The relative velocity of the target vehicle may be estimated based on, for example, radar sensing, location reporting, and/or pilot symbol estimation. The vehicular communication device may then calculate the resulting Doppler shift over the frequency, and then perform the frequency-specific compensation for a received signal and/or outgoing transmit signal to counteract the Doppler shift. Accordingly, the vehicular communication devices in an aspect of the disclosure may be configured to compensate for Doppler shift and account for the additional noise, thereby resulting in a higher success rate of transmitted/received communications between moving vehicles.

FIG. 146 shows an exemplary use case 14600 where a vehicular communication device 500 is receiving a Doppler shifted signal from a moving target vehicle 14602. The Doppler shift produced by the relative speed between the vehicular communication device 500 and the target vehicle will result in a Doppler shifter signal received at the vehicular communication device 500. Although shown for a vehicle-to-vehicle case in the example FIG. 146, correction of Doppler shift as described herein may also be implemented for vehicle-to-infrastructure, vehicle-to-pedestrian, or any similar case where there is relative motion between the two devices (e.g., one or both are moving).

The relative velocity between two vehicles engaging in vehicular radio communications will have two effects, which, if unaccounted for, can degrade the quality of the communications: the Doppler shift and varied coherent time. The relative velocity and direction can be estimated based on the content of the Basic Safety Messages (BSMs), e.g., SAE J2735, exchanged between the vehicles. BSMs are typically exchanged between vehicles one every 100 ms by default, but may be updated based on the desired frequency of location updates. These messages are sent on top of the DSRC radio, allowing for their transmission on either LTE or 5G V2X radio communications as well.

If left uncorrected, the noise resulting from the Doppler shift in the signal may lead to detection errors and failed transmissions. Accordingly, vehicular communication device 500 may process the received signal to compensate for the Doppler noise. As the Doppler effect is frequency-dependent, the Doppler shift in the received signal will vary over the frequency according to a deterministic relationship. Vehicular communication device 500 may be able to compensate for the Doppler shift by estimating the relative velocity (e.g., the other vehicle's velocity relative to its own position/velocity) of vehicle 14602, calculating the resulting Doppler shift, and equalizing the received signal. This can also be implemented in the transmit direction, where vehicular communication device 500 may use the estimated relative velocity and resulting calculated Doppler shift to equalize a transmit signal before transmission.

In an Additive white Gaussian noise (AWGN) channel, the Doppler shift is an additional frequency offset error causing inter-carrier interference (ICI) which behaves like additional noise. In a multi-path channel, each path will have a different Doppler shift, resulting in a Doppler spread. Estimating Doppler shift will help frequency domain equalization because we can compensate for the shift, allowing to offset its effect on ICI.

The varied coherent time indicates how fast the channel transfer function changes over time. While not directly correlated with the Doppler Effect, it is a side effect of movement in radio communications because the reflection profile of the multi-path channel changes due to the communication device moving. The faster a communication device is moving (e.g., in vehicular radio communications, the faster the relative speed between two vehicular communication devices), the shorter the coherent time is. When a communication device is able to obtain velocity information, it can use the velocity information to derive the time weighing coefficients of time interpolation. For example, take an exemplary set of OFDM symbols in the time direction, [P1, D, D, D1, P2], where D are data symbols and P are pilot symbols. First, the channel transfer function is obtained by frequency domain channel estimation for pilot symbols P1, P2. Then, the channel transfer functions are time interpolated for the data symbols, for example, D1 is time interpolated using P1, P2. In the extreme case where the communication device is not moving at all, the assumption can be are moving relative to each other (e.g., either one is stationary and the other is moving, or both are moving at different velocities), to time interpolate the channel in D1, the weighing of P2 is higher than P1 because D1 is more correlated with P2. Accordingly, the devices and methods of this disclosure may utilize a Look-up Table (LUT) detailing the relative speed and the outcome is the weight coefficients used by the time interpolation. The LUT may be compiled through preliminary testing and loaded in to a memory component of the devices for implementation.

In addition to using the velocity information to improve channel estimation and equalization performance, various aspects may use it for other cases. For example, the velocity information may be used to separate the frequency offset error estimated between the parts due to oscillator drift and the parts due to high mobility. Once the part due to oscillator drift is estimated, it may be used to calibrate the oscillator in field. In another example, the velocity information may be used for mobility adaptive of measurement rates. In high mobility cases, the communication device needs to perform more frequent handovers, and, accordingly, it needs a higher measurement rate to detect neighboring network access points (APs), e.g., eNBs, as fast as possible. In low mobility cases, the communication device may reduce measurement rates in order to conserve power. In another example, the velocity information may be used for mobility adaptive of paging cycles. Low paging cycles, such as discontinuous reception cycles (DRX), may be applied to track the serving cell by time tracking, Automatic Gain Control (AGC) tracking, frequency offset error tracking, or the like, while long paging cycles may be applied in low mobility cases to conserve device power.

FIG. 147 shows a processing arrangement 14700 that can be provided as part of the radio communication system of the vehicular communication device to correct for Doppler shift in received signals. It is appreciated that processing arrangement 14700 is exemplary in nature, and may therefore be simplified for purposes of this explanation. It is further appreciated that the corresponding structure may be implemented to correct for Doppler shift in transmitted signals, e.g., the equalization is performed before signal transmission.

The relative velocity estimator 14702 may be configured to estimate the relative velocity of the other vehicle, which in this case, will be a source of the received signal (in the case of signal transmission, this will be the target of the signal to be transmitted). The relative velocity estimator 14702 may estimate the relative velocity based on one or more methods, including: based on the content of the Basic Safety Messages (BSMs), e.g., SAE J2735, exchanged between the vehicles; radar sensing, where a radar sensing subsystem on the vehicular communication device provides the radar sensing data to the relative velocity estimator 14702; or other data obtained from other on board data acquisition equipment, e.g., cameras, navigation satellite equipment, etc.

For example, in some cases, the other device may transmit position reports via the BSMs to the vehicular communication device, and these position reports may include one or more of a position, velocity, or speed. The relative velocity estimator 14702 may use the information from the position reports to estimate the relative velocity between the two vehicles.

In other cases, for example, the other device may transmit pilot symbols (e.g., on certain subcarriers according to a predefined resource element grid pattern), which the vehicular communication device may receive. The relative velocity estimator 14702 may, for example, examine the pilot symbols received on each subcarrier and determine the frequency shift across the subcarriers. The relative velocity estimator 14702 can either determine the relative velocity that would produce the corresponding frequency shift as observed in the pilot symbols (e.g., by using a LUT) and provide the relative speed to the Doppler shift/varied time calculator 14704, or may directly calculate the Doppler shift, e.g., by interpolating the shift on the pilot symbol subcarriers to all of the subcarriers, thus obtaining the Doppler Effect at each subcarrier, and provide it to the equalizer 14706.

As Doppler shift and/or varied coherent time may change as the relative velocities change, the relative velocity estimator 14702 may be configured to periodically re-estimate the relative velocities, e.g., when using the default BMS message, every 100 ms, or in other cases more frequently or infrequently depending on the scenario. In other cases, the relative velocity estimator 14702 may be configured to use multiples of the input types to estimate the relative velocities.

The Doppler shift/varied coherent time calculator 14704 can then calculate the Doppler shift and/or the varied coherent time based on the relative velocity provided by the Relative Velocity Estimator 14702. For example, the expected Doppler shift at each subcarrier of the received signal may be calculated. In some cases using narrowband signals, the Doppler shift may be largely uniform across the entire narrowband signal, and only one (or several) Doppler shift values may be calculated. In some cases, Doppler shift/varied coherent time calculator 14704 may use a LUT (or other pre-calculated set of information) to obtain the Doppler shift and/or coherent time values, such as, for example, a plurality of sets of Doppler shift values for the subcarriers over a certain bandwidth where each set is for a different relative speed. In other cases, the Doppler shift calculator may algorithmically calculate the Doppler shift values over the subcarriers.

For example, Doppler shift/varied coherent time calculator 14704 may calculate the adjustment values as described above, such as by deriving time weighing coefficients of time interpolation. In particular, Doppler shift/varied coherent time calculator 14704 may take a set of data symbols (e.g., OFDM symbols) in the time direction, [P1, D, D, D1, P2], where D are data symbols and P are pilot symbols. Doppler shift/varied coherent time calculator 14704 (or, optionally, a separate channel estimator of processing arrangement 14700) may obtain channel transfer function with frequency domain channel estimation for pilot symbols P1, P2. Then, Doppler shift/varied coherent time calculator 14704 may interpolate the channel transfer functions over time for the data symbols (for example, D1 is time interpolated using P1, P2). In a case where vehicular communication device 500 is not moving at all, Doppler shift/varied coherent time calculator 14704 can assume that the channel transfer is the same over all the symbols, which, continuing with the example, the optimal time interpolation for D1 is $$\frac{P1}{2} + \frac{P2}{2}.$$

If vehicular communication device 500 and the target device are moving relative to each other (e.g., either one is stationary and the other is moving, or both are moving at different velocities), Doppler shift/varied coherent time calculator 14704 may time interpolate the channel in D1, where the weighting of P2 is higher than P1 because D1 is more correlated with P2. In some aspects, Doppler shift/varied coherent time calculator 14704 may algorithmically perform these computations, while in other aspects Doppler shift/varied coherent time calculator 14704 may use a lookup table.

The Doppler shift/varied coherent time calculator 14704 can then provide the corresponding calculated values to the equalizer 14706, which may also receive the received signal as an input. The received signal may be in the form of parallel baseband samples (e.g., parallel over the subcarriers of the received signal, or, alternatively, serial baseband samples for the single-carrier case). As shown in FIG. 148, the equalizer 14706 may then correct the baseband sample (IQ sample) at each subcarrier with an adjustment value based on the Doppler shift and/or coherent time value at the subcarrier. After correcting the baseband samples with the adjustment values, the equalizer 14706 may then output corrected baseband samples.

The vehicular communication device may additionally, or alternatively, perform the reverse of this process in the transmission direction in order to compensate for outgoing transmit signals prior to transmission to the target vehicle.

In some cases, instead of compensating for the Doppler shift and/or the coherent time, the processing arrangement 14700 may be configured to identify subcarriers that are severely corrupted by Doppler shift, and notify the controller of the radio communication system of these unusable carriers, which may then attempt to avoid using these subcarriers for future transmission/reception with the other device.

It is appreciated that the relative velocity estimation techniques for Doppler shift equalization and/or coherent time variation equalization may be applied to any of the other signal processing methods and devices of this disclosure.

FIG. 149 is a flowchart 14900 is a flowchart describing a method in an aspect of this disclosure. It is appreciated that flowchart 14900 is exemplary in nature and may thus be simplified for purpose of this explanation.

In stage 14902, the relative velocity between a first vehicle and a second vehicle is estimated. In stage 14904, the Doppler shift and/or a varied coherent time is determined based on the estimated relative velocity. In stage 14906, a signal to be communicated between the first and second vehicle is equalized based on the calculated Doppler shift and/or varied coherent time.

Exemplary Configurations of a Vehicular Communication Device

FIG. 150 shows an exemplary internal configuration of a vehicular communication device acting as a cluster head according to some aspects. As shown in FIG. 150, the vehicular communication device may include antenna system 15002, which may be configured in the manner shown and described for antenna system 506 of vehicular communication device 500 in FIGS. 5 and 6. The vehicular communication device may also include communication arrangement 15004, which may correspond to communication arrangement 504 of vehicular communication device 500 in FIGS. 5 and 6. The vehicular communication device of FIG. 150 may further include communication arrangement 15004, including RF transceiver 15006, communication processor 15008, and various other subcomponents. RF transceiver 15006 may be configured in the manner of RF transceiver 602 in FIG. 6. Communication processor 15008 may be a processor that is configured to retrieve (e.g., from a local memory) and execute program code that algorithmically defines this processing for scheduling, transmitting, and receiving data in the form of radio signals via RF transceiver 15006 and antenna system 15002. The program code may be updatable, such as wirelessly or by a manual install. In some aspects, communication processor 15008 may be a physical layer and/or protocol stack component, and may include a digital signal processor or controller. While the illustration of FIG. 150 shows components of communication arrangement 15004 from multiple concepts described above, including distributed coexistence management, centralized spectrum allocation, decision-making flow chart, centralized channel access control, radio measurement coordination, inter-operator carrier aggregation, narrowband signal injection, relaxed synchronization procedures, trusted device authentication, incentivized resource and data exchange, beamforming based on surrounding data, integrated circuit replacement with reconfigurable software resources, hybrid multi-radio networks, reuse of existing structures for vehicular antennas, and correction of Doppler effect, various aspects may omit components from one or more of these concepts.

FIG. 151 shows an exemplary internal configuration of a vehicular communication device acting as a cluster member according to some aspects. As shown in FIG. 151, the vehicular communication device may include antenna system 15102, which may be configured in the manner shown and described for antenna system 506 of vehicular communication device 500 in FIGS. 5 and 6. The vehicular communication device may also include communication arrangement 15104, which may correspond to communication arrangement 504 of vehicular communication device 500 in FIGS. 5 and 6. The vehicular communication device of FIG. 151 may further include communication arrangement 15104, including RF transceiver 15106, communication processor 15108, and various other subcomponents. RF transceiver 15106 may be configured in the manner of RF transceiver 602 in FIG. 6. Communication processor 15108 may be a processor that is configured to retrieve (e.g., from a local memory) and execute program code that algorithmically defines this processing for scheduling, transmitting, and receiving data in the form of radio signals via RF transceiver 15106 and antenna system 15102. The program code may be updatable, such as wirelessly or by a manual install. In some aspects, communication processor 15108 may be a physical layer and/or protocol stack component, and may include a digital signal processor or controller. While the illustration of FIG. 151 shows components of communication arrangement 15104 from multiple concepts described above, including distributed coexistence management, centralized spectrum allocation, decision-making flow chart, centralized channel access control, radio measurement coordination, inter-operator carrier aggregation, narrowband signal injection, relaxed synchronization procedures, trusted device authentication, incentivized resource and data exchange, beamforming based on surrounding data, integrated circuit replacement with reconfigurable software resources, hybrid multi-radio networks, reuse of existing structures for vehicular antennas, and correction of Doppler effect, various aspects may omit components from one or more of these concepts.

FIG. 152 shows an example according to some aspects where vehicular communication device 15204 may act as a cluster head for cluster 15200, which includes cluster head 15204 and vehicular communication devices 15202, 15206, and 15208. In some aspects, cluster head 15204 may use cluster-based distributed coexistence management as described above, and may therefore be configured to allocate channel resources to vehicular communication devices 15202, 15206, and 15208. This can include allocating specific channel resources to vehicular communication devices 15202, 15206, and 15208 via channel resource allocations. Vehicular communication device 15214 may similarly act as a cluster head for cluster 15210, which includes cluster head 15214 and vehicular communication devices 15212, 15216, and 15218.

Cluster heads 15204 and 15214 may be configured in the manner shown for a cluster head in FIG. 150, while vehicular communication devices 15202, 15206, 15208, 15212, 15216, and 15218 may be configured in the manner shown for a cluster member in FIG. 151. As shown in FIGS. 150 and 151, cluster heads 15204 and 15214 may include respective cluster managers 1010 configured in the manner shown and described for cluster manager 1010 in FIG. 10, while vehicular communication devices 15202, 15206, 15208, 15212, 15216, and 15218 may include respective cluster managers 1110 configured in the manner shown and described for cluster manager 1110 in FIG. 11.

Accordingly, the respective cluster managers 1010 of cluster heads 15204 and 15214 may manage clusters 15200 and 15210 by creating and terminating clusters, adding and removing members from clusters, generating and transmitting cluster signaling, and performing other cluster management functions as shown and described above for FIGS. 9-17. Cluster managers 1110 of vehicular communication devices 15202, 15206, 15208, 15212, 15216, and 15218 may act as counterparts to cluster managers 1010, and may control the cluster behavior of vehicular communication devices 15202, 15206, 15208, 15212, 15216, and 15218.

Accordingly, cluster head 15204 may use resource allocator 1008 to determine channel resource allocations for vehicular communication devices 15202, 15206, and 15208 as shown and described for distributed coexistence management using clusters. Resource allocator 1008 may therefore assign specific channel resources to vehicular communication devices 15202, 15206, and 15208, which may include assigning different channels (e.g., subcarriers or subbands) at different time slots for vehicular communication devices 15202, 15206, and 15208 to use for transmission or reception. Resource allocator 1008 may also specify a radio communication technology which vehicular communication devices 15202, 15206, and 15208 are assigned to use for the assigned channel resources, such as a first vehicular radio communication technology (e.g., a contention-based radio communication technology such as DRSC) or a second vehicular radio communication technology (e.g., a deterministic scheduling radio communication technology such as LTE V2V/V2X). Cluster head 15204 may then transmit the channel resource allocations to vehicular communication devices 15202, 15206, and 15208, which may receive the channel resource allocations and use their respectively assigned channel resources to transmit and receive.

In some aspects, coexistence engine 1812 as previously shown and described regarding FIGS. 18-28 may be deployed to manage channel resource allocations between different vehicular radio communication technologies, such as DSRC and LTE V2V/V2X. The example of FIG. 152 depicts a RAN-supported implementation of centralized spectrum allocation, where coexistence engine 1812 uses network access node 15220 to monitor channel resource usage by a first and second vehicular radio communication technology. For example, coexistence engine 1812 may receive channel resource usage information from network access node 15220, which may wirelessly monitor the channel resource usage by the first and second vehicular radio communication technology. Coexistence engine 1812 may then aggregate the channel resource usage information to obtain first aggregated channel resource usage information that characterizes the channel resource usage by the first vehicular radio communication technology, and second aggregated channel resource usage information that characterizes the channel resource usage by the second vehicular radio communication technology (e.g., as described regarding method 1900 of FIG. 19).

Alternative to the RAN-supported implementation shown in the example of FIG. 152, coexistence engine 1812 may use a RAN-independent implementation of centralized spectrum allocation, where coexistence engine 1812 may interface with a network of remote nodes (e.g., as for remote nodes 2012-2016 of FIG. 20), or may use a hybrid RAN-supported/RAN-independent implementation (e.g., as in FIG. 21). The network access nodes and/or remote nodes interfacing with coexistence engine 1812 may utilize their radio communication components (e.g., antenna systems, radio transceivers, baseband/application layer components) to perform radio sensing and obtain channel resource usage information (e.g., for the first and/or second vehicular radio communication technologies). The network access nodes and/or remote nodes may then supply the channel resource usage information to coexistence engine 1812. While the example of FIG. 152 focuses on the area surrounding clusters 15200 and 15210 (where, for example, network access node 15220 can obtain channel resource usage information for this area using radio sensing), in some aspects coexistence engine 1812 may be configured to monitor channel resource usage by the first and second vehicular radio communication technologies over a larger geographic area.

After determining the first and second aggregated channel resource usage information for the first and second vehicular radio communication technologies, respectively, coexistence engine 1812 may determine an overall ratio of channel resources to allocate to the first vehicular radio communication technology and the second vehicular radio communication technology. In some aspects, the relative proportion may depend on the channel resource usage indicated by the first and second aggregated channel resource usage information. For example, if the channel resource usage indicated by the first aggregated channel resource usage information is double that of the channel resource usage indicated by the second aggregated channel resource usage information, coexistence engine 1812 may determine the overall ratio as 2:1, while if the channel resource usage indicated by the first aggregated channel resource usage information is approximately equal to that of the channel resource usage indicated by the second aggregated channel resource usage information, coexistence engine 1812 may determine the overall ratio as 1:1. The overall ratio may similarly scale based on the relative amounts of channel resource usage indicated by the first and second aggregated channel resource usage information.

In some aspects, coexistence engine 1812 may then transmit the overall ratio to one or more cluster heads, such as cluster heads 15204 and 15214. Cluster head 15204 may be configured in the manner shown in FIG. 152, and may receive the overall ratio at resource allocator 1008 (after radio and wireless reception and processing by antenna system 15002 and RF transceiver 15006), which may be configured in the manner described above for resource allocator 1008 in FIG. 10. Resource allocator 1008 may then generate channel resource allocations for vehicular communication devices 15202, 15206, and 15208, where the overall channel resources allocated meets the overall ratio specified by coexistence engine 1812 (e.g., the ratio of resources allocated to the first vehicular radio communication technology compared to the resources allocated to the second vehicular radio communication technology is approximately equal to the overall ratio). Resource allocator 1008 may then transmit the channel resource allocations to vehicular communication devices 15202, 15206, and 15208, which may receive the channel resource allocations at their respective schedulers 1008 as shown in FIG. 151 and use the channel resource allocations to transmit and receive on their respectively allocated resources.

Accordingly, cluster heads 15204 and 15214 may implement the overall ratio as determined by coexistence engine 1812 at their respective clusters by allocating channel resources between the first and second vehicular radio communication technologies according to the overall ratio. As previously indicated, in some aspects coexistence engine 1812 may aggregate channel resource usage information over an extended geographic area. Coexistence engine 1812 may similarly transmit the overall ratio to other cluster heads in the geographic area, and therefore may control the relative allocation of channel resources between the first and second vehicular radio communication technologies over the geographic area.

In some aspects, coexistence engine 1812 may provide the same ratio to each cluster head. In other aspects, coexistence engine 1812 may provide different ratios to cluster heads. For example, resource allocator 1008 may transmit signaling to coexistence engine 1812 that indicates the number of cluster members that support the first and second vehicular radio communication technologies, past channel resource usage information characterizing the channel resource usage by the first and second vehicular radio communication technologies in cluster 15200, or a requested ratio of channel resources between the first and second vehicular radio communication technologies. Coexistence engine 1812 may similarly receive such information from other cluster heads, where the information received from each cluster head uniquely characterizes the channel resource usage by the cluster for the first and second vehicular radio communication technologies.

Coexistence engine 1812 may then determine different ratios for the cluster heads based on the information provided by each cluster head. Coexistence engine 1812 may attempt to determine different ratios that in aggregate balance to the overall ratio that coexistence engine 1812 determined based on the first and second aggregated channel resource usage information. For example, coexistence engine 1812 may determine the different ratios with a target of having a weighted average of the different ratios approximately equal the overall ratio. Each different ratio in the weighted average can be weighted, for example, according to the number of devices in the corresponding cluster or based on the total channel resource usage by the cluster. Coexistence engine 1812 may then transmit the resulting ratio to the cluster head for each cluster. Accordingly, cluster head 15204 may receive a ratio tailored to the cluster members of cluster 15200, while the overall ratio of channel resources allocated between the first and second vehicular radio communication technologies for all clusters may be approximately equal to the ratio.

In some aspects, cluster head 15204 may be configured to use decision-based flow chart techniques as shown and described for FIG. 27. For example, cluster head 15204 may receive radio technology selection criteria via antenna system 15002 and RF transceiver 15006, which resource allocator 1008 may then use the procedure of process 2700 to select radio communication technology resources for one or more members of cluster 15200, e.g., one or more of vehicular communication device 15202, 15206, or 15208. In some aspects, coexistence engine 1812 may be configured to use decision-based flow chart techniques as shown and described for FIG. 27 to select radio communication technology resources.

In some aspects, cluster head 15204 may use centralized channel access control as previously shown and described for FIGS. 28-41 to control channel resource allocation between cluster members using the first and second vehicular radio communication technologies. For example, as previously described the first vehicular radio communication technology can be a contention-based radio communication technology such as DRSC while the second vehicular radio communication technology can be a deterministic scheduling radio communication technology such as LTE V2V/V2X.

For example, vehicular communication devices 15202 and 15206 may use the second vehicular radio communication technology, e.g., the deterministic-scheduling radio communication technology. Vehicular communication device 15208 may use the first vehicular radio communication technology, e.g., the contention-based radio communication technology. Cluster head 15204 may then use centralized channel access control to manage access to shared channel resources by vehicular communication devices 15202, 15206, and 15208.

As shown in FIG. 150, in some aspects cluster head 15204 may include carrier sensor 3208 and reservation manager 3214. Cluster head 15204 may therefore use carrier sensor 3208 and reservation manager 3214 to reserve a channel to use for deterministic scheduling for vehicular communication devices 15202 and 15206. For example, resource allocator 1008 may determine a channel resource allocation for cluster 15200 that allocates a first set of time slots on a channel to the first vehicular radio communication technology and a second set of time slots on the channel to the second vehicular radio communication technology. In some aspects, resource allocator 1008 may determine the resource allocation based on interaction with coexistence engine 1812 as described above.

Carrier sensor 3208 and reservation manager 3214 may then carry out the channel resource allocation by reserving the channel for the second vehicular radio communication technology during the second set of time slots, and leaving the channel open for use by the first vehicular radio communication technology during the first set of time slots. Accordingly, carrier sensor 3208 may perform carrier sensing before the start of each time slot in the second set of time slots to determine when the channel is free. Reservation manager 3214 may then be configured to reserve the channel once it has been free for a reservation interval (less than the sensing interval used by vehicular communication device 15208), such as with dummy noise or a preamble, for each time slot of the second set of time slots. As the channel may not be free immediately at the beginning of each of the second set of time slots, in some aspects reservation manager 3214 may be configured to reserve the channel at the earliest point in time in each time slot that the channel has been free for at least a reservation interval.

Reservation manager 3214 may thus maintain the channel reservation during each of the second set of time slots, and may transmit dummy noise or preambles to avoid transmission breaks longer than the sensing interval. Resource allocator 1008 may include some or all of the functionality of scheduler 3212 as shown in FIG. 32, and accordingly may be configured to generate a channel resource allocation for vehicular communication devices 15202 and 15206 and to transmit channel resource allocation messages to vehicular communication devices 15202 and 15206 that specify their respectively allocated channel resources. For example, resource allocator 1008 may allocate different channel resources to vehicular communication devices 15202 and 15206 for the second set of time slots with the channel resource allocation, and generate corresponding channel resource allocation messages for vehicular communication devices 15202 and 15206. Resource allocator 1008 may then transmit the channel resource allocation messages to vehicular communication devices 15202 and 15206, which may then use the channel as assigned during the second set of time slots. As shown in FIG. 151, in some aspects vehicular communication devices 15202 and 15206 may include respective schedulers 3308, which may be configured in the manner of scheduler 3308 of FIG. 33. The schedulers 3308 of vehicular communication devices 15202 and 15206 may then control vehicular communication devices 15202 and 15206 to transmit and receive using the channel resources specified in the channel resource allocation messages.

As the channel is reserved, vehicular communication device 15208 may detect that the channel is occupied (by detecting transmissions by cluster head 15204 or vehicular communication devices 15202 or 15206) and may not access the channel. For example, as shown in FIG. 151, in some aspects vehicular communication device 15208 may include carrier sensor 3408, which vehicular communication device 15208 may use to monitor the channel to determine when it has been free for at least a sensing interval. As cluster head 15204 may maintain the channel during the second set of time slots, vehicular communication device 15208 may determine that the channel is occupied during the second set of time slots and thus may not access the channel.

Other proximate communication devices using contention-based radio communication technologies may similarly determine that the channel is occupied, thus reserving the channel for use by cluster head 15204 and vehicular communication devices 15202 and 15206 with deterministic scheduling.

As in some cases reservation manager 3214 may not reserve the channel during the first set of time slots, the channel may remain open. Accordingly, vehicular communication device 15208 may detect that the channel is open with its carrier sensor 3408 by determining that the channel has been free for at least a sensing interval, and may then access the channel using the contention-based protocols of the first vehicular radio communication technology.

In some aspects, cluster heads and/or cluster members may also be configured to perform radio measurement coordination as previously shown and described for FIGS. 49A-67. Accordingly, as shown in FIG. 150, in some aspects cluster head 15204 may include coordination manager 5108 and position determiner 5112, which may be configured in the manner of coordination manager 5108 and position determiner 5112 in FIG. 50. Accordingly, position determiner 5112 may be configured to determine the positions of vehicular communication devices 15202, 15206, and 15208, such as by receiving position reports from vehicular communication devices 15202, 15206, and 15208 (e.g., explicit reporting) or by receiving and processing signals from vehicular communication devices 15202, 15206, and 15208 to determine their position (e.g., algorithmic derivation).

Position determiner 5112 may provide the positions to coordination manager 5108, which may evaluate the positions of vehicular communication devices 15202, 15206, and 15208 to identify if any of vehicular communication devices 15202, 15206, and 15208 are proximate to each other. FIG. 153 shows an exemplary scenario where vehicular communication devices 15206 and 15208 are proximate to each other, which position determiner 5112 and coordination manager 5108 may determine based on the positions of vehicular communication devices 15206 and 15208 (e.g., by determining that vehicular communication devices 15206 and 15208 are within a predefined radius, and that vehicular communication device 15202 is not within the predefined radius of either of vehicular communication devices 15206 and 15208).

Coordination manager 5108 may then select vehicular communication devices 15206 and 15208 to coordinate radio measurements with each other. Coordination manager 5108 may then transmit control signaling to vehicular communication devices 15206 and 15208 that instructs vehicular communication devices 15206 and 15208 to coordinate radio measurements with each other. For example, in the exemplary scenario of FIG. 153, coordination manager 5108 may instruct vehicular communication device 15206 to perform a cell-specific measurement of network access node 15302, and to share the cell-specific measurement of network access node 15302 with vehicular communication device 15306. In another example, coordination manager 5108 may instruct vehicular communication device 15206 to perform a cell-specific measurement of network access node 15304, vehicular communication device 15208 to perform a cell-specific measurement of network access node 15302, and to share the resulting measurements with each other. In other examples, coordination manager 5108 may be configured to instruct vehicular communication devices 15206 and 15208 to perform wideband measurements, scan-type measurements, measurements on other cluster members of cluster 15200, and/or to verify measurements with each other. In some aspects, coordination manager 5108 may further instruct vehicular communication devices 15206 and 15208 to report the measurements back to cluster head 15204.

Accordingly, as shown in FIG. 151 vehicular communication devices 15206 and 15208 may further include measurement engine 5008, which vehicular communication devices 15206 and 15208 may use to perform the measurements as instructed by coordination manager 5108. Vehicular communication devices 15206 and 15208 may then share or verify measurements with each other and/or report measurements back to cluster head 15204.

In some aspects, vehicular communication devices 15206 and 15208 may be configured to use a distributed architecture for radio measurement coordination, such as shown and described for FIGS. 57-59. Accordingly, vehicular communication devices 15206 and 15208 may also include position determiner 5812, which may be configured in the manner of position determiner 5812 of FIG. 58. Accordingly, vehicular communication devices 15206 and 15208 may be configured to use their respective position determiners 5812 to determine their relative positions (e.g., using explicit reporting or algorithmic derivation) and, based on their relative position, determine whether they are proximate to each other (e.g., within a predefined radius). If determined to be proximate to each other, vehicular communication devices 15206 and 15208 may then be configured to establish a measurement coordination group, negotiate to distribute measurement tasks, perform their respectively assigned measurement tasks (e.g., at measurement engines 5008, which may also be configured for the functionality of measurement engines 5808 of FIG. 58), and share or verify the resulting measurements with each other.

In some aspects, cluster 15200 may be configured to coordinate group cell transfers, such as shown and described for FIGS. 60-63. For example, as shown for the exemplary scenario FIG. 153, vehicular communication device 15208 may be leading vehicular communication devices 15202-15206 as they move in unison. Accordingly, if vehicular communication devices 15202-15208 are initially in the coverage area of network access node 15302 and moving towards network access node 15304, vehicular communication device 15208 may be the first to enter the coverage area of network access node 15304. As described above for FIG. 62, in some aspects vehicular communication device 15208 may be configured to perform radio measurements with measurement engine 5008, and to share resulting radio measurements with vehicular communication devices 15202-15206. Vehicular communication devices 15202-15206 may then trigger cell transfers from network access node 15302 to network access node 15304 based on the shared measurements, and thus may implement a coordinated cell transfer.

As described above for FIG. 63, in some aspects vehicular communication device 15208 may be configured to trigger a cell transfer from network access node 15302 to network access node 15304 based on radio measurements obtained by its measurement engine 5008. Vehicular communication device 15208 may then notify vehicular communication devices 15202-15206 of the cell transfer, which may then trigger their own cell transfers based on the notification.

In some aspects, cluster head 15204 and/or one or more of vehicular communication devices 15202, 15206, or 15208 may be configured to use inter-operator carrier aggregation as shown and described for FIGS. 68-83. Accordingly, as shown in FIGS. 150 and 151, cluster head 15204 and/or one or more of vehicular communication devices 15202, 15206, or 15208 may include substream combiner/separator 7208 configured in the manner of substream combiner/separator 233008 of FIG. 72.

As shown in FIG. 154, network access nodes 6808 and 6810 as previously shown and described for FIGS. 68-70 may respectively provide carriers 6804 and 6806. Network access nodes 6808 and 6810 may be operated by different network operators and respectively part of the first and second wireless networks. Network access node 6808 may interface with core network 6812, while network access node 6810 may interface with core network 6814. Data network 6816 may then interface with core networks 6812 and 6814.

In some aspects, cluster head 15204 and/or one or more of vehicular communication devices 15202, 15206, or 15208 may then use both carriers 6804 and 6806 to receive a data stream from data network 6816 using inter-operator carrier aggregation. In an example using cluster head 15204 in the downlink direction (that can also be applied for one or more of vehicular communication devices 15202, 15206, and 15208), data network 6816 may be configured to separate the data stream into the first and second substreams and to route the first substream to cluster head 15204 via the first wireless network for transmission on carrier 6804 by network access node 6808, and to route the second substream to cluster head 15204 via the second wireless network for transmission on carrier 6806 by network access node 6810. Cluster head 15204 may receive and recombine the first and second substreams to recover the data stream. This may use the procedure of FIG. 71. Data network 6816 may thus be configured as shown in FIG. 72, while cluster head 15204 may utilize substream combiner/separator 7208 and communication processor 15008 in the manner described for terminal device 6802. In an example using cluster head 15204 in the uplink direction (that can also be applied for one or more of vehicular communication devices 15202, 15206, and 15208), cluster head 15204 may separate the data stream designated for data network 6816 into the first and second substreams with substream combiner/separator 7208, and route the first substream to data network 6816 by transmitting the first substream on carrier 6804 and route the second substream to data network 6816 by transmitting the second substream on carrier 6806.

In another example using cluster head 15204 in the downlink direction, data network 6816 may provide the data stream to core network 6812, which may then separate the data stream into the first and second substream with control server 6902 (which may be an optional component of core network 6812 depending on whether or not the data stream is separated in core network 6812). Control server 6902 may then route the first substream to network access node 6808 for transmission to cluster head 15204 on carrier 6804, and route the second substream to control server 6904 in core network 6814. Control server 6904 may then route the second substream to network access node 6810 for transmission to cluster head 15204 on carrier 6806. Cluster head 15204 may receive and recombine the first and second substreams to recover the data stream. This may use the procedure of FIG. 73. Cluster head 15204 and control servers 6902 and 6904 may be configured in the manner shown and described for FIG. 74. In an example using cluster head 15204 in the uplink direction (that can also be applied for one or more of vehicular communication devices 15202, 15206, and 15208), cluster head 15204 may separate a data stream designated for data network 6816 into the first and second substreams at substream combiner/separator 7208, and may then transmit the first substream to network access node 6808 on carrier 6804 and the second substream to network access node 6810 on carrier 6806. Network access node 6808 may route the first substream to control server 6902 in core network 6812, while network access node 6810 may route the second substream to control server 6904 in core network 6814. Control server 6904 may then route the second substream to control server 6902, which may recombine the first and second substreams to recover the data stream. Control server 6902 may then route the data stream to data network 6816.

In another example using cluster head 15204 in the downlink direction, data network 6816 may route the data stream through the first wireless network to router 7606 located at network access node 6808 or behind network access node 6808 as an edge network location. Router 7606 may then separate the data stream into the first and second substreams, and provide the second substream to router 7616 located at network access node 6810 or behind network access node 6810 in an edge network location. Router 7606 may provide the first substream to network access node 6808, which may transmit the first substream to cluster head 15204 on carrier 6804. Router 7616 may likewise provide the second substream to network access node 6810, which may transmit the first substream to cluster head 15204 on carrier 6806. Cluster head 15204 may receive and recombine the first and second substreams to recover the data stream. This may use the procedure shown and described for FIG. 75, while cluster head 15204, network access nodes 6808 and 6810, and routers 7606 and 7616 may be configured as shown and described for FIG. 76. In an example using cluster head 15204 in the uplink direction (that can also be applied for one or more of vehicular communication devices 15202, 15206, and 15208), cluster head 15204 may separate the data stream into the first and second substreams at substream combiner/separator 7208, and may then transmit the first substream to network access node 6808 on carrier 6804 and the second substream to network access node 6810 on carrier 6806. Routers 7606 and 7616 may then receive the first and second substreams from network access nodes 6808 and 6810, respectively. Router 7616 may then route the second substream to router 7606, which may then recombine the first and second substreams to recover the data stream. Router 7606 may then route the data stream to data network 6816 over the first wireless network.

In some aspects where one or more of vehicular communication devices 15202, 15206, and 15208 are also using inter-operator carrier aggregation, cluster head 15204 may handle some or all control procedures related to inter-operator carrier aggregation for vehicular communication devices 15202, 15206, and 15208. For example, if vehicular communication device 15202 is also using inter-operator carrier aggregation, cluster head 15204 may select the first and second carrier for vehicular communication device 15202 to use for inter-operator carrier aggregation. For instance, cluster head 15203 may perform the procedure of message sequence chart 7900 of FIG. 79 to obtain carrier characteristics (e.g., stage 7902), evaluate the carrier characteristics (e.g., stage 7904), and select carriers for vehicular communication device 15202 to use for inter-operator carrier aggregation (e.g., stage 7906). In some aspects, cluster head 15204 may provide cluster signaling to vehicular communication device 15202 that specifies the selected carriers. In some aspects, vehicular communication device 15202 may be configured to then register with the wireless networks that provide the selected carriers (if not already registered) (e.g., stage 7908) and establish the data subconnections for inter-operator carrier aggregation over the selected carriers (e.g., stage 7910). In other aspects, cluster head 15204 may be configured to register vehicular communication device 15202 with the wireless networks and/or establish the data subconnections on behalf of vehicular communication device 15202.

In some aspects, cluster head 15204 may perform the carrier selection, network registration, and/or data subconnection establishment procedures for some or all members of cluster 15200 that perform inter-operator carrier aggregation, and may select the same or different carriers for each cluster member performing inter-operator carrier aggregation.

In some aspects, members of cluster 15200 that are performing inter-operator carrier aggregation may use channel resource allocations provided by cluster head 15204 to transmit or receive data on the selected carriers. In some aspects, cluster head 15204 may determine the channel resource allocations according to distributed coexistence management or centralized spectrum allocation. For example, in an exemplary scenario vehicular communication device 15202 may use a first vehicular radio communication technology that uses contention-based access, such as DSRC, for carrier 6804 with network access node 6808, and may use a second vehicular radio communication technology that uses deterministic scheduling, such as LTE V2V/V2X, for carrier 6806 with network access node 6810. In an exemplary downlink case, resource allocator 1008 of cluster head 15204 may then generate channel resource allocations that allocate channel resources for vehicular communication device 15202 to receive the first substream on carrier 6804 and that allocate channel resources for vehicular communication device 15202 to receive the second substream on carrier 6804. In some aspects, resource allocator 1008 of cluster head 15204 may interface with deterministic scheduling network access nodes, such as network access node 6810, to determine which channel resources to allocate for deterministic scheduling (as this may generally be handled at the network access node).

In some aspects, multiple members of cluster 15200 may coordinate to perform inter-operator carrier aggregation where transmission or reception of a single data stream is shared between multiple terminal devices. For example, vehicular communication device 15202 may establish the first data subconnection over carrier 6804 with network access node 6808 and vehicular communication device 15206 may establish the second data subconnection over carrier 6806 with network access node 6810. Data network 6816 may then route the data stream to vehicular communication devices 15202 and 15206, where the data stream is separated into the first and second substreams by data network 6816, control server 6902, or router 7606 as previously described. Vehicular communication device 15202 may then receive the first substream at its communication processor 15108, which may provide the first substream to substream combiner/separator 7208. Vehicular communication device 15206 may likewise receive the second substream at its communication processor 15108. If the data stream is designated for vehicular communication device 15202, the communication processor 15108 of vehicular communication device 15206 may wirelessly transmit the second substream to the communication processor 15108 of vehicular communication device 15202, which may provide the second substream to its substream combiner/separator 7208. The substream combiner/separator 7208 of vehicular communication device 15202 may then recombine the first and second substreams to recover the data stream. In some aspects, the data stream may be designated for cluster head 15204, in which case vehicular communication devices 15202 and 15206 may respectively transmit the first and second substreams to cluster head 15204, which may recombine the first and second substreams at its substream combiner/separator 7208 to recover the data stream.

In some aspects, cluster head 15204 and one or more members of cluster 15200 may be configured to use narrowband signal injection as shown and described for FIGS. 84-94 to communicate with each other. For example, communication processor 15008 of cluster head 15204 may be configured with the functionality of wideband processors 8608 (which generally focuses on operation of a wideband processor in the receive direction) and/or 8622 (which generally focuses on operation of a wideband processor in the transmit direction) of FIG. 86, and may accordingly be configured to transmit and receive data for uplink, downlink, and/or sidelink using a wideband format. Communication processor 2508 of vehicular communication devices 15202, 15206, and 15208 may likewise be configured with the functionality of wideband processors 8608 (which generally focuses on operation of a wideband processor in the receive direction) and/or 8622 (which generally focuses on operation of a wideband processor in the transmit direction) of FIG. 86, and may accordingly be configured to transmit and receive data with for uplink, downlink, and/or sidelink using a wideband format.

As shown in FIG. 150, cluster head 15204 may further include narrowband processor 15010 configured with the functionality of narrowband processors 8610 (which is generally described with a focus on the functionality of a narrowband processor in the receive direction) and 8620 (which is generally described with a focus on the functionality of a narrowband processor in the transmit direction) of FIG. 86 and coexistence controller 15012 configured with the functionality of coexistence controllers 1112 and 1124 of FIG. 86. As shown in FIG. 150, vehicular communication devices 15202, 15206, and 15208 may likewise include narrowband processor 15110 configured with the functionality of narrowband processors 8610 and 8620 of FIG. 86 and coexistence controller 15112 configured with the functionality of coexistence controllers 8612 and 8624 of FIG. 86.

Accordingly, cluster head 15204 and vehicular communication devices 15202, 15206, and 15208 may use narrowband signal injection to transmit and receive data with each other. In various aspects, cluster head 15204 and vehicular communication devices 15202, 15206, and 15208 may use narrowband signal injection to transmit and receive any type of data with each other, including coexistence information, cluster signaling, channel resource allocations, user and control data.

For example, in some aspects cluster head 15204 may use narrowband signal injection to transmit channel resource allocations to vehicular communication devices 15202, 15206, and 15208. In some aspects, cluster head 15204 may determine the channel resource allocations with resource allocator 1008 as part of distributed coexistence management or centralized spectrum allocation, and may then transmit the channel resource allocations by providing them to narrowband processor 15010. Narrowband processor 15010 may then transmit the channel resource allocations as narrowband data in a narrowband signal via RF transceiver 15006 and antenna system 15002. Narrowband processor 15010 may select the narrowband spectrum for the narrowband signal as described above for FIGS. 84-84.

Vehicular communication devices 15202, 15206, and 15208 may then receive a composite signal including the narrowband signal and a wideband signal, where the wideband signal may be a wideband signal from another communication device (such as a network access node). In the example of vehicular communication device 15202, communication processor 15108 of vehicular communication device 15202 may receive and process the composite signal as described above for FIGS. 84-94 to separate the wideband signal or the narrowband signal, such as by recovering the narrowband signal from narrowband spectrum that is null spectrum (e.g., subcarriers or subband) of the wideband signal and/or by canceling the narrowband signal from the wideband signal as interference and recovering the wideband signal and the narrowband signal (e.g., using an SIC-type procedure). Narrowband processor 15110 may then recover the narrowband data from the narrowband signal, where asp previously indicated the narrowband data may be a channel resource allocation for vehicular communication device 15202. Narrowband processor 15110 may provide the channel resource allocation to scheduler 3308 of vehicular communication device 15202, which may then schedule transmission or reception on the assigned channel resources. Communication processor 15108 may separately process the wideband data depending on the contents of the wideband data (e.g., user data for presentation to a user). Cluster head 15204 may likewise use narrowband signal injection to provide cluster signaling to vehicular communication device 15202, which may recover the cluster signaling as narrowband data at its narrowband processor 15110 and provide the cluster signaling to cluster manager 1110 to control subsequent cluster behavior of vehicular communication device 15202 according to the cluster signaling. Cluster head 15204 may use narrowband signal injection in the same manner to transmit other data as narrowband data to vehicular communication device 15202. Vehicular communication device 15202 may likewise use its narrowband processor 15110 to transmit various types of data as narrowband data to cluster head 15204, where cluster head 15204 may process the resulting composite signal with its communication processor 15008 and narrowband processor 15010 to separate the wideband signal and narrowband signal and recover the wideband data and narrowband data.

Furthermore, in some aspects cluster head 15204 and/or one or more of vehicular communication devices 15202, 15206, and 15208 may use narrowband signal injection to exchange coexistence information, such as time or frequency synchronization signals, transmission or reception schedule information, or key channel parameters. Cluster head 15204 and/or one or more of vehicular communication devices 15202, 15206, and 15208 may thus exchange such coexistence information using narrowband signal injection and act on the coexistence information with coexistence controllers 8612 and 8624 as described above for FIGS. 84-94.

In some aspects, cluster head 15204 and/or one or more of vehicular communication devices 15202, 15206, and 15208 may additionally or alternatively use narrowband signal injection to exchange authentication information, such as certificates and/or signatures for trusted device authentication. In some aspects cluster head 15204 and/or one or more of vehicular communication devices 15202, 15206, and 15208 may additionally or alternatively use narrowband signal injection to exchange surrounding data to use for beamforming.

In some aspects, one or more of cluster head 15204 or vehicular communication devices 15202, 15206, or 15208 may be configured to use relaxed synchronization procedures as shown and described for FIGS. 95-108. Accordingly, as shown in FIG. 150, in some aspects cluster head 15204 may include timing advance controller 9810, timing advance determiner 9812, and estimator 9814, which may be respectively configured in the manner of timing advance controller 9810, timing advance determiner 9812, and estimator 9814 of FIG. 98. Communication processor 15008 of cluster head 15204 may be configured with the functionality of communication processor 9808 in FIG. 98.

Similarly, as shown in FIG. 151, in some aspects vehicular communication devices 15202, 15206, or 15208 may include timing advance controller 9810, timing advance determiner 9812, and estimator 9814, which may be respectively configured in the manner of timing advance controller 9810, timing advance determiner 9812, and estimator 9814 of FIG. 98. Respective communication processors 15108 of vehicular communication devices 15202, 15206, or 15208 may be configured with the functionality of communication processor 9808 in FIG. 98.

In an example (that can also be applied for one or more of vehicular communication devices 15202, 15206, and 15208) where cluster head 15204 uses relaxed synchronization procedures for time synchronization with a network access node, such as network access node 15220 in FIG. 152, timing advance controller 9810 may decide whether to skip or reduce the frequency of timing advance updates based on estimates of separation distance or propagation delay (and/or mobility or performance parameters) obtained by estimator 9814. In various aspects, timing advance controller 9810 may perform this procedure according to that shown and described for any one of FIGS. 99-107. Timing advance determiner 9812 may then be configured to perform timing advance updates (e.g., either by receiving and processing timing advance update commands including updated timing advances or by performing local timing advance updates) as controlled by timing advance controller 9810. In some aspects, timing advance controller 9810, timing advance determiner 9812, and estimator 9814 of vehicular communication devices 15202, 15206, or 15208 may be similarly configured to perform relaxed synchronization procedures regarding timing advances for communication with network access node 15220.

In some aspects, the members of cluster 15200 may coordinate to perform relaxed synchronization procedures. For example, in some aspects, multiple members of cluster 15200 may coordinate to use the same timing advance update. For instance, timing advance controller 9810 may be configured to select one of vehicular communication devices 15202, 15206, or 15208 to assign to perform a timing advance update, such as vehicular communication device 15202, and may transmit cluster signaling to timing advance controller 9810 of vehicular communication device 15202 that instructs vehicular communication device 15202 to perform a timing advance update. In some aspects, the cluster signaling may instruct vehicular communication device 15202 to perform a local timing advance update at a particular time (or at a particular update frequency), or to receive and process timing advance update commands from network access node 15220 at a particular skip rate. Timing advance controller 9810 may then trigger timing advance determiner 9812 to perform the timing advance updates as instructed in the control signaling. Communication processor 15008 of vehicular communication device 15202 may then use the updated timing advance for transmission timing to network access node 15220.

As the members of cluster 15200 may, in some cases, be proximate (e.g., within radio range) to each other to support formation the cluster, the updated timing advance obtained by vehicular communication device 15202 may also be suitable (e.g., usable without causing unmanageable synchronization-related interference for network access node 15220) for the other members of cluster 15200. Other members of cluster 15200 may therefore also use the updated timing advance obtained by vehicular communication device 15202 for their own transmission timings to network access node 15220. For example, timing advance controller 9810 of vehicular communication device 15202 may transmit the updated timing advance obtained with the timing advance update to cluster head 15204, which may then transmit the updated timing advance to vehicular communication device 15206 and/or vehicular communication device 15208 as cluster signaling. Vehicular communication device 15206, and/or vehicular communication device 15208 may then receive the updated timing advance at their respective timing advance controllers 9810, and may then use the updated timing advance at their respective communication processors 15008 and 15108 to control transmission timing to network access node 15220. Alternatively, in some aspects timing advance controller 9810 of vehicular communication device 15202 may transmit the updated timing advance obtained with the timing advance update directly to cluster head 15204 and vehicular communication devices 15206 and 15208.

In some aspects, cluster head 15204, vehicular communication device 15206, and/or vehicular communication device 15208 may decide whether to use the updated timing advance update obtained by vehicular communication device 15202. For example, once timing advance controller 9810 of vehicular communication device 15206 receives an updated timing advance obtained by vehicular communication device 15202, vehicular communication device 15206 may determine whether vehicular communication device 15202 is within a predefined distance of vehicular communication device 15206. If vehicular communication device 15202 is within the predefined distance of vehicular communication device 15206, timing advance controller 9810 of vehicular communication device 15206 may use the updated timing advance. Conversely, if vehicular communication device 15202 is not within the predefined distance of vehicular communication device 15206, timing advance controller 9810 of vehicular communication device 15206 may not use the updated timing advance. In some aspects, vehicular communication device 15206 may use its estimator 9814 to determine the distance between vehicular communication device 15206 and vehicular communication device 15202, such as by using radar sensing, synchronization pilot signal processing (e.g., receiving and processing synchronization pilot signals from vehicular communication device 15202), or position reporting (e.g., receiving a position report for vehicular communication device 15202 and determining the position of vehicular communication device 15206) to determine the distance between vehicular communication device 15206 and vehicular communication device 15202.

In some aspects, when assigning a cluster member to perform timing advance updates, timing advance controller 9810 of cluster head 15204 may also instruct other cluster members to skip or reduce the frequency of timing advance updates. For example, timing advance controller 9810 of cluster head 15204 may transmit cluster signaling to vehicular communication device 15206 and/or 15208 that instructs vehicular communication device 15206 and/or 15208 to skip timing advance updates at a particular skip rate or to reduce the frequency of timing advance updates to an update frequency. Vehicular communication device 15206 and/or 15208 may then use updated timing advances obtained by vehicular communication device 15202 instead of performing their own timing advance updates.

In some aspects, cluster head 15204 may alternate between the members of cluster 15200 in selecting one of vehicular communication devices 15202, 15206, or 15208 to perform the timing advance update while instructing the other of vehicular communication devices 15202, 15206, or 15208 to skip or reduce the frequency of timing advance updates. In some aspects, cluster head 15204 may instruct those of vehicular communication devices 15202, 15206, or 15208 that are not selected to perform the timing advance update to skip all timing advance updates (in other words, a skip rate of 1.0) until otherwise instructed.

In some aspects, cluster head 15204 and/or one or more of vehicular communication devices 15202, 15206, or 15208 may be configured to use timing advances when communicating with each other. For example, in some cases vehicular communication devices 15202, 15206, or 15208 may be expected to use a timing advance when transmitting to cluster head 15204, which can act in a pseudo-network access node role. Accordingly, vehicular communication devices 15202, 15206, or 15208 may be configured to use a timing advance to synchronize the arrival of their transmissions with a timing schedule of cluster head 15204. The respective timing advance determiners 9812 of vehicular communication devices 15202, 15206, and 15208 may therefore be configured to determine timing advances that reflect the separation distance or propagation delay between vehicular communication devices 15202, 15206, and 15208 and cluster head 15204, and to provide the timing advances to their respective communication processors 15108. The respective communication processors 15108 of vehicular communication devices 15202, 15206, and 15208 may then use the timing advances to control timing of transmissions to cluster head 15204.

In various aspects, the timing advance determiners 9812 of vehicular communication devices 15202, 15206, and 15208 may be configured to determine the timing advances by receiving timing advance update commands from cluster head 15204 that include an updated timing advance or by performing local timing advance updates (e.g., periodically or triggered by receipt of a timing advance update command from cluster head 15204). Accordingly, in some aspects timing advance controllers 9810 of vehicular communication devices 15202, 15206, and 15208 may be configured to use relaxed synchronization procedures to decide whether to skip and/or reduce the frequency of timing advance updates. For example, the respective estimators 9814 of vehicular communication devices 15202, 15206, and 15208 may estimate a separation distance or propagation delay between vehicular communication devices 15202, 15206, and 15208 and cluster head 15204, and may provide the separation distance or propagation delay to the timing advance controllers 9810. The timing advance controllers 9810 may then determine whether to skip (omit) and/or reduce the update frequency of timing advance updates based on the separation distance or propagation delay, and may control timing advance determiners 9812 to perform timing advance updates based on this determination.

In some aspects, the members of cluster 15200 may be configured to use trusted device authentication as shown and described for FIGS. 109-115. For example, in some aspects, cluster head 15204 and vehicular communication devices 15202, 15206, and 15208 may be configured to verify other vehicular communication devices before forming or joining a cluster with them. For instance, as shown in FIGS. 150 and 151, cluster head 15204 and vehicular communication devices 15202, 15206, and 15208 may include respective controllers 11300, which cluster head 15204 and vehicular communication devices 15202, 15206, and 15208 may use to verify other devices that they interact with in clusters.

Accordingly, when cluster head 15204 initially creates a cluster, cluster head 15204 may provide its certificate to vehicular communication devices 15202, 15206, and 15208 during creation of cluster 15200, such as in or accompanying a create cluster message (e.g., as in the manner shown and described for FIG. 12). Vehicular communication devices 15202, 15206, and 15208 may then verify whether or not the certificate is valid and issued by a trusted authority with their respective controllers 11300 (e.g., executing certificate and signature verification subroutine 11310*b*), which may check with a gatekeeper authority or perform local verification with a database of pre-verified certificates. In some aspects, cluster head 15204 may similarly provide its certificate when inviting a vehicular communication device to join cluster 15200, such as in or accompanying a cluster invitation message.

Additionally or alternatively, vehicular communication devices 15202, 15206, and 15208 may provide their own certificates when joining cluster 15200, which cluster head 15204 may verify with its controller 11300 to determine whether the certificate is valid and was issued by a trusted authority. In some aspects, controller 11300 of cluster head 15204 may, for example, be configured to only permit vehicular communication devices that offer a valid certificate (e.g., that is not blacklisted and has a valid hash), or that have a valid certificate issued by a particular trusted authority (e.g., the same vehicle manufacturer as cluster head 15204).

In some aspects, vehicular communication devices 15202, 15206, and 15208 may be configured to join clusters contingent upon information in the certificate provided by cluster head 15204 accompanying create cluster or cluster invitation messages. In an example for vehicular communication device 15202 (that can also be applied for one or more of vehicular communication devices 15206 and 15208), vehicular communication device 15202 may be configured to join clusters when invited by a vehicular communication devices with the same manufacturer, or alternatively to join clusters when the cluster exclusively contains other vehicular communication devices with the same manufacturer. The respective controllers 11300 of vehicular communication device 15202 may be configured to read the manufacturer of cluster head 15204 from the metadata of a verified certificate, and then decide whether or not to join the cluster based on whether the manufacturer of cluster head 15204 is the same manufacturer as that of vehicular communication device 15202. In some aspects where vehicular communication device is configured to join clusters only when all of the members of the cluster are of the same manufacturer, vehicular communication device 15202 may be configured to request certificates from each other member of the cluster and to subsequently verify the certificates. In some aspects, vehicular communication devices 15202 may not exchange any sensitive data (e.g., vehicle dynamics, camera or traffic, beamforming, usage, speed, road condition, signs, traffic, or weather data) with the other members of the cluster until their certificates have been verified as being issued by a trusted authority. Once the other members of the cluster have been verified by their respective controllers 11300, vehicular communication device 15202 may proceed as full members of the cluster using any of the cluster behavior described herein. If vehicular communication device 15202 determine that another cluster member does not have the same manufacturer, they may decline to join the cluster.

Alternatively, in some aspects vehicular communication device 15202 may be configured to join a cluster if not all of the other cluster members have the same manufacturer, but may only exchange sensitive data and/or perform certain cluster behavior with other cluster members having the same manufacturer. For example, vehicular communication device 15202 may only perform relaying when the hops in the relaying link are provided by cluster members having the same manufacturer, or may only use channel resource allocations, receive narrowband signaling, or share timing advances if coordinating with cluster members having the same manufacturer. These examples using the same manufacturer as a condition may likewise hold for other trusted authorities, such as where vehicular communication devices verify whether other devices can provide a certificate from the same service provider, or from a different manufacturer or service provider that is still trusted.

In some aspects, vehicular communication device 15202 may likewise verify the other members of the cluster to determine whether the devices are trusted or blacklisted based on their certificates, and may not act as full members of the cluster until all other members are verified. If vehicular communication device 15202 determine that another cluster member does not have the same manufacturer, they may decline to join the cluster. In some aspects, cluster head 15204 may perform the certificate verification on behalf of the other members of the cluster. For example, controller 11300 of cluster head 15204 may collect certificates provided by vehicular communication devices 15202, 15206, and 15208, and verify whether the certificates are valid and/or whether they are issued by a trusted manufacturer by executing certificate and signature verification subroutine 11310*b* (e.g., by checking with an external gatekeeper authority or referencing a local database of pre-verified certificates). Cluster head 15204 may then inform vehicular communication devices 15202, 15206, and 15208 whether the others of vehicular communication devices 15202, 15206, and 15208 provided a valid certificate and/or specify the certificate issuer for the others of vehicular communication devices 15202, 15206, and 15208. Vehicular communication devices 15202, 15206, and 15208 may then use this information to determine whether the join or remain in the cluster and/or which types of data to share with the other members of cluster 15200. In some aspects, cluster head 15204 may likewise verify certificates for the members of cluster 15200 that they obtain while communicating with other devices external to cluster 15200, such as other vehicular communication devices and network access nodes.

The members of cluster 15200 may then sign their data that they exchange with each other using the private key corresponding to the public key in their certificate (e.g., by executing certificate and signature transmission subroutine 11310*a*), and sending the resulting signature with the exchanged data. The members of cluster 15200 may then verify incoming data by checking the signature with the public key included in the certificate provided by the transmitting device to determine whether the signature is valid.

In some aspects, vehicular communication devices such as cluster head 15204 and vehicular communication devices 15202, 15206, and 15208 may further be configured to use incentivized resource and data exchange as shown and described for FIGS. 116-117. Accordingly, one or more of cluster head 15204 or vehicular communication devices 15202, 15206, and 15208 may be configured to dock with an interface device such as shown for interface device 11602 in FIG. 116. In an example using cluster head 15204 (that can also be applied for one or more of vehicular communication devices 15202, 15206, and 15208), cluster head 15204 may dock with interface device 11602, and provide its signed authentication certificate with its controller 11300. Interface device 11602 may then verify the signed authentication certificate with provider 11612 and, if verified, may exchange resources for data with cluster head 15204.

For example, in some aspects cluster head 15204 may have collected data from its own operation in addition to the operation of vehicular communication devices 15202, 15206, and 15208, which may have shared data with cluster head 15204 as part of cluster behavior. Cluster head 15204 may then exchange this data for resources, such as electricity, network access, a particular service, or maintenance.

In some aspects, one or more of cluster head 15204 or vehicular communication devices 15202, 15206, or 15208 may be configured to perform beamforming based on acquired surrounding data as shown and described for FIGS. 118-125. For example, as shown in FIGS. 150 and 151, cluster head 15204 and vehicular communication devices 15202, 15206, or 15208 may include respective controllers 12300 and data acquisition equipment 12208 configured in the manner of controller 12300 and data acquisition equipment 12208 of FIGS. 122 and 123.

Accordingly, in an example using cluster head 15204 (that can also be applied for one or more of vehicular communication devices 15202, 15206, and 15208), controller 12300 of cluster head 15204 may use data acquisition equipment 12208 to acquire data representative of the surroundings of cluster head 15204. In various aspects, data acquisition equipment 12208 may include one or more of a camera, a radar sensor, a motion sensor, a light detection and ranging (LIDAR) sensor, an infrared sensor, an ultrasonic sensor, or a GPS system. Controller 12300 may then execute data acquisition subroutine 12310*a* to acquire the data from data acquisition equipment 12208, and may then execute identification subroutine 12310*b* to identify an object based on the data. The object can be, for example, a receiver such as a network access node (e.g., network access node 15220 of FIG. 152) or one of vehicular communication devices 15202, 15206, or 15208 (in other words, another member of cluster 15200). The object can additionally or alternatively be a reflective surface that can be used to reflect signals to a receiver, or an obstacle that is obstructing the path between cluster head 15204 and the receive.

Controller 12300 may then execute beam generation subroutine 12310*c* to generate an antenna beam with antenna system 15002 that directs the beam toward a receiver (e.g., directly or via a reflective surface) or away from an obstacle. For example, controller 12300 may generate complex beamforming weights with beam generation subroutine 12310*c*, and supply the complex beamforming weights to communication processor 15008 for digital beamforming, RF transceiver 15006 for RF beamforming, or both communication processor 15008 and RF transceiver 15006 for hybrid beamforming.

In some aspects, the respective controllers 12300 of multiple members of cluster 15200 may exchange data acquired by their respective data acquisition equipment 12208 with each other. For example, after collecting data from data acquisition equipment 12208, controller 12300 of cluster head 15204 may transmit the data to controller 12300 of vehicular communication device 15202. As cluster head 15204 and vehicular communication device 15202 may be proximate to each other by virtue of being members of the same cluster, the data may also represent the surroundings of vehicular communication device 15202. In some aspects, the data may be raw data, such as data that was not yet processed by controller 12300 of cluster head 15204 with identification subroutine 12310*b* to identify objects. In other aspects, the data may be processed data, such as data that was processed by controller 12300 of cluster head 15204 with identification subroutine 12310*b* to identify objects. For example, the data may identify the location of objects.

Controller 12300 of vehicular communication device 15202 may then use the data, optionally in addition to its own data locally acquired with its data acquisition equipment 12208, as input to identification subroutine 12310*b* (e.g., if the data was raw data) and/or as input to beam generation subroutine 12310*c* (e.g., if the data was processed data, such as the position of an object). Controller 12300 of vehicular communication device 15202 may then generate corresponding complex beamforming weights and apply them with its communication processor 15108, RF transceiver 15106, and antenna system 15102 to generate antenna beams.

In some aspects, cluster head 15204 and vehicular communication devices 15202, 15206, and 15208 may use their respective controllers 11300 to verify the source of data if externally provided before using it for beamforming. For example, if vehicular communication device 15202 receives data from vehicular communication device 15206 that can be used for beamforming, controller 11300 of vehicular communication device 15202 may determine whether the data is accompanied by a valid signature corresponding to a valid certificate provided by vehicular communication device 15206. Controller 11300 may therefore execute certificate and signature verification subroutine 7310*b* to determine whether the certificate is valid (e.g., either by using a gatekeeper authority or referencing a local database to determine whether the certificate was actually issued by the purported issuer), and to verify that the signature accompanying the data can be validly decrypted using the public key in the signature. In some aspects, controller 11300 may then only decide to use the data for beamforming when the certificate and signature are valid, or only when the signature is valid and the certificate was issued by a particular trusted authority (e.g., the same vehicular manufacturer as vehicular communication device 15202).

In some aspects, one or more of cluster head 15202 or vehicular communication devices 15202, 15206, and 15208 may be configured to use integrated circuit replacement with reconfigurable software resources as shown and described for FIGS. 126-136.

For example, as shown in FIGS. 150 and 151, cluster head 15202 and vehicular communication devices 15202, 15206, and 15208 may include software reconfigurable chips 15014 and 15114, respectively. Software reconfigurable chips 15014 and 15114 may be any type of reprogrammable logic circuitry, such as digital signal processors (DSPs), microcontrollers, field-programmable gate arrays (FPGAs), programmable logic arrays (PLAs) or other programmable processing elements, and may be available for programming to fully or partially replace any other integrated circuit of cluster head 15204 or vehicular communication devices 15202, 15206, and 15208.

In an example using cluster head 15204 (that may likewise be applied for any of vehicular communication devices 15202, 15206, or 15208), cluster head 15204 may update one or more of the integrated circuit s of communication arrangement 15004 by downloading (e.g., via a connection with a server provided by communication processor 15008, RF transceiver 15006, and antenna system 15002) and installing replacement software instruction sets on software reconfigurable chip 15014. Accordingly, cluster head 15204 may render a virtualized replacement of any of the integrated circuit s of communication arrangement 15004 by downloading replacement software instruction sets that defines the operation of the virtualized integrated circuit and installing the replacement software instruction sets onto software reconfigurable chip 15014. In some aspects, one or more of the integrated circuit s of communication arrangement 15004 may be connected at its input and output to a bypass circuit of software reconfigurable chip 15014. Once the virtualized replacement has been installed on software reconfigurable chip 15014, the bypass circuit may tap the input and output to the integrated circuit, provide the input to the virtualized replacement of software reconfigurable chip 15014, and provide the resulting output from the virtualized replacement back to the output of the integrated circuit. This may enable cluster head 15204 to update any one of the integrated circuit s of communication arrangement 15004 without physically replacing the integrated circuit. In some aspects, software reconfigurable chip 15014 may be also configured in the manner shown and described for RVM 12900 in FIGS. 129-132.

In some aspects, coexistence engine 1812 as shown in FIG. 152 may be configured according to hybrid multi-radio networks as shown and described for FIGS. 43-48. In some aspects, RF transceiver 15006 of cluster head 15204 and/or RF transceiver 15108 of one or more of vehicular communication devices 15202, 15206, or 15208 may include a short-range transceiver (e.g., for DSRC) and a cellular wide area transceiver (e.g., for LTE V2V/V2X). In an example for cluster head 15204 (that can likewise be applied for one or more of vehicular communication devices 15202, 15206, and 15208), communication processor 15008 of cluster head 15204 may be configured to select between the short-range transceiver and the cellular wide area transceiver based on a configuration message received from coexistence engine 1812 (or, in other aspects, a control server such as control server 1612). Communication processor 15008 may therefore operate the short-range and cellular wide area transceivers according to hybrid multi-radio networks as shown and described for FIGS. 43-48.

In some aspects, one or more of cluster head 15204 and/or vehicular communication devices 15202, 15206, or 15208 may be configured to reuse existing structures for vehicular antennas as shown and described for FIGS. 140-145. In an example for cluster head 15204 (that may likewise be applied for any one or more of vehicular communication devices 15202, 15206, or 15208), RF transceiver 15006 and antenna system 15002 may be integrated along with an RF lensing system into an existing structure of cluster head 15204, such as a headlight, tail light, turn signal, mirror, or window of cluster head 15204 as shown in FIGS. 141A and 141B. RF transceiver 15006, antenna system 15002, and the RF lensing system can be arranged to form either a passively- or actively-controlled communication interface, which cluster head 15204 may use to communicate to cluster members of cluster 15200 and/or such as infrastructure network access nodes.

As shown in FIG. 150 (and likewise in FIG. 151 for vehicular communication devices 15202, 15206, and 15208), communication arrangement 15104 of cluster head 15204 may include controller 14152 in cases where RF transceiver 15006, antenna system 15002, and the RF lensing system are arranged to form an actively-controlled communication interface. Accordingly, controller 14152 may adjust the control signal provided to biasing circuitry of the RF lensing system based on a target receiver or transmitter of cluster head 15204 (e.g., one of vehicular communication devices 15202, 15206, or 15204 or network access node 15220) based on the direction of the target receiver or transmitter from cluster head 15204. In some aspects, controller 14152 may use data provided by data acquisition equipment 12208 (e.g., a camera or some other type of sensor as previously described regarding FIGS. 118-125) to determine the desired effect of the RF lensing system (e.g., broadening, narrowing, and/or steering), and may adjust the control signals provided to the biasing circuitry based on the data to produce the desired effect for the beam generated by antenna system 15002.

FIG. 155 shows an exemplary diagram illustrating the placement of vehicular antennas in existing structures of a vehicular communication device. In various aspects, multiple antennas can be embedded in vehicle hoods, roofs and/or glass using integrated patterns. As illustrated, at least one antenna 15522 (or, optionally, antenna array) can be placed at a first location of a first surface (e.g., roof or hood) of the vehicle and at least another antenna 15526 (or, optionally, antenna array) can placed on a second location of the first surface. 360-degree coverage can be provided by embedding antenna systems in four sides of the vehicle hood or roof. For example, as shown in FIG. 155, antennas 15522, 15524, 15526 and 15528 can be embedded at the four corners of the vehicle roof. Additionally, antennas 15530 and 15532 can be etched into windshields of the vehicle. Multiple antennas also allow vehicles to be connected to more than one point of infrastructure at the same time, as well as to more than one vehicle at the same time. In various aspects, one or more of antennas 15502-15538 may be deployed in an RF lensing configuration, and accordingly may interface with an RF transceiver and project radio signals via an RF lensing material deposited in front of the antenna head. In various aspects, one or more of antennas 15502-15538 may be configured as a passively-controlled communication interface (e.g., a passive RF lensing system) or as an actively-controlled communication interface (e.g., an active RF lensing system including a controller and biasing circuitry).

In some aspects, one or more of cluster head 15204 and/or vehicular communication devices 15202, 15206, or 15208 may be configured to correct for Doppler shift as shown and described for FIGS. 146-149. Accordingly, as shown in FIGS. 150 and 151, communication arrangement 15004 of cluster head 15204 and/or communication arrangement 15104 of vehicular communication devices 15202, 15206, or 15208 may include processing arrangement 14700, which may be configured as shown and described for FIG. 147.

Accordingly, in an example for cluster head 15204 (that can likewise apply for one or more of vehicular communication devices 15202, 15206, or 15208), processing arrangement 14700 may be configured to correct for Doppler shift for transmit and/or receive signals of cluster head 15204 (e.g., that are transmitted or received via communication processor 15008, RF transceiver 15006, and antenna system 15002) based on the velocity of a target device. In some aspects, processing arrangement 14700 may be configured to use data acquisition equipment 12208 in conjunction with or in place of relative velocity estimator 14702 as shown in FIG. 147. Accordingly, data acquisition equipment 12208 may be configured to use sensors to determine the position and/or velocity of the target device, and to provide this information to Doppler shift/varied coherent time calculator 14704. Doppler shift/varied coherent time calculator 14704 may then use this position or velocity information to estimate the Doppler shift.

While described above in FIGS. 150-155 for vehicular communication devices, the configuration of communication arrangement 15004 and antenna system 15002 shown in FIGS. 150 and 151 is not limited to vehicular uses, and may be implemented in any type of terminal device.

CONCLUSION

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples pertain to further aspects of this disclosure:

Example 1 is a communication device for vehicular radio communication, the communication device including one or more processors configured to identify a plurality of vehicular communication devices of a cluster of cooperating vehicular communication devices, determine channel resource allocations of the plurality of vehicular communication devices that include first channel resources allocated for a first vehicular radio communication technology and second channel resources allocated for a second vehicular radio communication technology, and transmit the channel resource allocation to the plurality of vehicular communication devices.

In Example 2, the subject matter of Example 1 can optionally further include a digital signal processor, a radio transceiver, and one or more antennas, wherein the one or more processors are configured to transmit the channel resource allocation as wireless radio signals with the digital signal processor, the radio transceiver, and the one or more antennas.

In Example 3, the subject matter of Example 1 or 2 can optionally further include a steering and movement system and configured as a vehicular communication device.

In Example 4, the subject matter of Example 1 or 2 can optionally be configured as a communication component for a vehicular communication device.

In Example 5, the subject matter of any one of Examples 1 to 3 can optionally include wherein the first vehicular radio communication technology utilizes a contention-based channel access scheme and wherein the second vehicular radio communication technology utilizes a deterministic scheduling channel access scheme.

In Example 6, the subject matter of any one of Examples 1 to 5 can optionally include wherein the one or more processors are configured to assign different channel resources to the first vehicular radio communication technology from the second vehicular radio communication technology in the channel resource allocations.

In Example 7, the subject matter of any one of Examples 1 to 6 can optionally include wherein the one or more processors are configured to generate the cluster of cooperating vehicular communication devices by transmitting a create cluster message and by receiving cluster accept messages from the plurality of vehicular communication devices.

In Example 8, the subject matter of Example 7 can optionally include wherein the one or more processors are configured to exchange signaling with one or more of the plurality of vehicular communication devices to select the communication device as a cluster head for the cluster.

In Example 9, the subject matter of Example 7 can optionally include wherein the one or more processors are configured to autonomously generate the cluster.

In Example 10, the subject matter of Example 7 can optionally include wherein the one or more processors are further configured to receive an instruction from a control node to generate the cluster.

In Example 11, the subject matter of any one of Examples 7 to 10 can optionally include wherein the one or more processors are configured to receive cluster decline messages from one or more additional vehicular communication devices.

In Example 12, the subject matter of any one of Examples 7 to 10 can optionally include wherein the one or more processors are configured to identify one or more additional vehicular communication devices that transmitted a cluster accept message, and to reject the one or more additional vehicular communication devices from the joining the cluster.

In Example 13, the subject matter of Example 12 can optionally include wherein the one or more processors are configured to reject the one or more additional vehicular communication devices from the joining the cluster based on one or more of a current travel lane, a current travel route, a current target destination, a type of vehicular communication device, or a type of supported vehicular radio communication technology.

In Example 14, the subject matter of any one of Examples 1 to 13 can optionally include wherein a first subset of the plurality of vehicular communication devices is configured to support the first vehicular radio communication technology and wherein a second subset of the plurality of vehicular communication devices is configured to support the second vehicular radio communication technology.

In Example 15, the subject matter of any one of Examples 1 to 14 can optionally include wherein the one or more processors are configured to determine the channel resource allocations for the plurality of vehicular communication devices by determining a channel resource allocation for each of the plurality of vehicular communication devices, wherein each channel resource allocation indicates one or more channels and one or more time slots that the respective vehicular communication device is allocated.

In Example 16, the subject matter of Example 15 can optionally include wherein a channel resource allocation for a first vehicular communication device of the plurality of vehicular communication devices instructs the first vehicular communication device to utilize the first vehicular radio communication technology or the second vehicular radio communication technology.

In Example 17, the subject matter of any one of Examples 1 to 13 can optionally include wherein the one or more processors are configured to determine the channel resource allocations for the plurality of vehicular communication devices by determining overall available channel resources for the plurality of vehicular communication devices to compete for.

In Example 18, the subject matter of any one of Examples 1 to 17 can optionally include wherein the one or more processors are configured to periodically determine a new channel resource allocation for the plurality of vehicular communication devices and transmit the new channel resource allocation to the plurality of vehicular communication devices.

In Example 19, the subject matter of any one of Examples 1 to 18 can optionally include wherein the one or more processors are configured to transmit a channel resource allocation to a first vehicular communication device of the plurality of vehicular communication devices via a relaying link through one or more other of the plurality of vehicular communication devices.

In Example 20, the subject matter of any one of Examples 1 to 19 can optionally include wherein the one or more processors are configured to add or remove one or more vehicular communication devices from the cluster by transmitting control signaling to the one or more vehicular communication devices.

In Example 21, the subject matter of any one of Examples 1 to 20 can optionally include wherein the one or more processors are configured to exchange signaling with a cluster head of a second cluster of cooperating vehicular communication devices, and to determine the channel resource allocations based on the signaling.

In Example 22, the subject matter of Example 21 can optionally include wherein the one or more processors are configured to determine the channel resource allocations to avoid interference with the second cluster.

In Example 23, the subject matter of any one of Examples 1 to 22 can optionally include wherein the one or more processors are configured to receive signaling from a control node that specifies overall available channel resources for the cluster, and to determine the channel resource allocations based on the overall available channel resources.

In Example 24, the subject matter of Example 23 can optionally include wherein the channel resource allocations instruct the plurality of vehicular communication devices to perform greedy spectrum selection to compete for the overall available channel resources, wherein greedy spectrum selection comprises checking for the least-used bands and access the least-used resources with a particular vehicular radio communication technology.

In Example 25, the subject matter of any one of Examples 1 to 24 can optionally include wherein the first vehicular radio communication technology is a Dedicated Short-Range Communications (DSRC) radio communication technology and the second vehicular radio communication technology is a Long Term Evolution (LTE) Vehicle-to-Vehicle (V2V) or Vehicle-to-Everything (V2X) radio communication technology.

Example 26 is a communication device for vehicular radio communications, the communication device including one or more processors configured to receive control signaling from a cluster head vehicular communication device to instruct the communication device to a cluster of cooperating vehicular communication devices, receive a channel resource allocation that indicates channel resources that are allocated for the communication device, and transmit or receive radio signals based on the channel allocation schedule.

In Example 27, the subject matter of Example 26 can optionally further include a digital signal processor, a radio transceiver, and one or more antennas, wherein the one or more processors are configured to transmit the channel resource allocation as wireless radio signals with the digital signal processor, the radio transceiver, and the one or more antennas.

In Example 28, the subject matter of Example 26 or 27 can optionally include wherein the one or more processors are configured to select a new cluster head vehicular communication device for the cluster by negotiating with one or more vehicular communication devices of the cluster.

In Example 29, the subject matter of any one of Examples 26 to 28 can optionally include wherein the one or more processors are further configured to receive a create cluster message from the cluster head vehicular communication device, transmit a cluster accept message to the cluster head vehicular communication device, and receive the control signaling from the cluster head vehicular communication device in response to the cluster accept message.

In Example 30, the subject matter of any one of Examples 26 to 29 can optionally include wherein the channel resource allocation identifies a channel, a time slot, and a vehicular radio communication technology, and wherein the one or more processors are configured to transmit or receive radio signals based on the channel allocation schedule by transmitting or receiving radio signals on the channel during the time slot with the vehicular radio communication technology.

In Example 31, the subject matter of any one of Examples 26 to 30 can optionally further include a steering and movement system for a vehicle and configured as a vehicular communication device.

In Example 32, the subject matter of any one of Examples 26 to 30 can optionally be configured as a communication component for a vehicular communication device.

Example 33 is a communication device for vehicular radio communications, the communication device including one or more processors configured to perform an evaluation of a plurality of channels that are available for a first vehicular radio communication technology and a second vehicular radio communication technology according to usage conditions of the channel, select a channel from the plurality of channels based on the evaluation, transmit an indication of the channel to one or more vehicular communication devices, and transmit or receive radio signals on the channel.

In Example 34, the subject matter of Example 33 can optionally further include a digital signal processor, a radio transceiver, and one or more antennas, wherein the one or more processors are configured to transmit the channel resource allocation as wireless radio signals with the digital signal processor, the radio transceiver, and the one or more antennas.

In Example 35, the subject matter of Example 33 or 34 can optionally include wherein the one or more processors are configured to select the channel from the plurality of channels based on which of the channels have low usage.

In Example 36, the subject matter of any one of Examples 33 to 35 can optionally include wherein the one or more processors are configured to perform the evaluation of the plurality of channels by sensing the plurality of channels for transmissions by other transmitters.

In Example 37, the subject matter of any one of Examples 33 to 36 can optionally include wherein the first vehicular radio communication technology is a Dedicated Short-Range Communications (DSRC) radio communication technology and the second vehicular radio communication technology is a Long Term Evolution (LTE) Vehicle-to-Vehicle (V2V) or Vehicle-to-Everything (V2X) radio communication technology.

In Example 38, the subject matter of any one of Examples 33 to 37 can optionally further include a steering and movement system for a vehicle and configured as a vehicular communication device.

In Example 39, the subject matter of any one of Examples 33 to 37 can optionally be configured as a communication component for a vehicular communication device.

Example 40 is a communication device including means for identifying a plurality of vehicular communication devices of a cluster of cooperating vehicular communication devices, means for determining channel resource allocations for the plurality of vehicular communication devices that includes first channel resources allocated for a first vehicular radio communication technology and second channel resources allocated for a second vehicular radio communication technology, and means for transmitting the channel resource allocation to the plurality of vehicular communication devices.

Example 41 is a method for performing vehicular radio communications, the method including identifying a plurality of vehicular communication devices of a cluster of cooperating vehicular communication devices, determining channel resource allocations for the plurality of vehicular communication devices that includes first channel resources allocated for a first vehicular radio communication technology and second channel resources allocated for a second vehicular radio communication technology, and transmitting the channel resource allocation to the plurality of vehicular communication devices.

In Example 42, the subject matter of Example 41 can optionally include wherein the first vehicular radio communication technology utilizes a contention-based channel access scheme and the second vehicular radio communication technology utilizes a deterministic scheduling channel In Example 43, the subject matter of Example 41 or 42 can optionally include wherein determining the channel resource allocations includes assigning different channel resources to the first vehicular radio communication technology from the second vehicular radio communication technology in the channel resource allocations.

In Example 44, the subject matter of any one of Examples 41 to 43 can optionally further include creating the cluster of cooperating vehicular communication devices by transmitting a create cluster message and receiving cluster accept messages from the plurality of vehicular communication devices.

In Example 45, the subject matter of Example 44 can optionally further include exchanging signaling with one or more of the plurality of vehicular communication devices to select the communication device as a cluster head for the cluster.

In Example 46, the subject matter of Example 44 can optionally include wherein creating the cluster is triggered automatically.

In Example 47, the subject matter of Example 44 can optionally include wherein creating the cluster is triggered by receipt of an instruction from a control node to generate the cluster.

In Example 48, the subject matter of any one of Examples 44 to 47 can optionally further include receiving cluster decline messages from one or more additional vehicular communication devices.

In Example 49, the subject matter of any one of Examples 44 to 47 can optionally further include identifying one or more additional vehicular communication devices that transmitted a cluster accept message and rejecting the one or more additional vehicular communication devices from the joining the cluster.

In Example 50, the subject matter of any one of Examples rejecting the one can optionally include more additional vehicular communication devices from the joining the cluster includes rejecting the one or more additional vehicular communication devices based on one or more of a current travel lane, a current travel route, a current target destination, a type of vehicular communication device, or a type of supported vehicular radio communication technology.

In Example 51, the subject matter of any one of Examples 41 to 50 can optionally include wherein a first subset of the plurality of vehicular communication devices is configured to support the first vehicular radio communication technology and a second subset of the plurality of vehicular communication devices is configured to support the second vehicular radio communication technology.

In Example 52, the subject matter of any one of Examples 41 to 51 can optionally include wherein determining the channel resource allocations for the plurality of vehicular communication devices includes determining a channel resource allocation for each of the plurality of vehicular communication devices, wherein each channel resource allocation indicates one or more channels and one or more time slots that the respective vehicular communication device is allocated.

In Example 53, the subject matter of Example 52 can optionally include wherein a channel resource allocation for a first vehicular communication device of the plurality of vehicular communication devices instructs the first vehicular communication device to use the first vehicular radio communication technology or the second vehicular radio communication technology.

In Example 54, the subject matter of any one of Examples 41 to 51 can optionally include wherein determining the channel resource allocations for the plurality of vehicular communication devices includes determining overall available channel resources for the plurality of vehicular communication devices to compete for.

In Example 55, the subject matter of any one of Examples 41 to 54 can optionally further include periodically determining a new channel resource allocation for the plurality of vehicular communication devices and transmitting the new channel resource allocation to the plurality of vehicular communication devices.

In Example 56, the subject matter of any one of Examples 41 to 55 can optionally include wherein transmitting a channel resource allocation to a first vehicular communication device of the plurality of vehicular communication devices via a relaying link through one or more other of the plurality of vehicular communication devices.

In Example 57, the subject matter of any one of Examples 41 to 56 can optionally further include adding or removing one or more vehicular communication devices from the cluster by transmitting control signaling to the one or more vehicular communication devices.

In Example 58, the subject matter of any one of Examples 41 to 57 can optionally further include exchanging signaling with a cluster head of a second cluster of cooperating vehicular communication devices, wherein determining the channel resource allocations includes determining the channel resource allocations based on the signaling.

In Example 59, the subject matter of Example 58 can optionally include wherein determining the channel resource allocations based on the signaling includes determining the channel resource allocations to avoid interference with the second cluster.

In Example 60, the subject matter of any one of Examples 41 to 59 can optionally further include receiving signaling from a control node that specifies overall available channel resources for the cluster, and wherein determining the channel resource allocations includes determining the channel resource allocations based on the available channel resources.

In Example 61, the subject matter of Example 60 can optionally include wherein the channel resource allocations instruct the plurality of vehicular communication devices to perform greedy spectrum selection to compete for the overall available channel resources, wherein greedy spectrum selection comprises checking for the least-used bands and access the least-used resources with a particular vehicular radio communication technology.

In Example 62, the subject matter of any one of Examples 41 to 60 can optionally include wherein the first vehicular radio communication technology is a Dedicated Short-Range Communications (DSRC) radio communication technology and the second vehicular radio communication technology is a Long Term Evolution (LTE) Vehicle-to-Vehicle (V2V) or Vehicle-to-Everything (V2X) radio communication technology.

Example 63 is a non-transitory computer readable medium storing instructions that when executed by a processor cause the processor to perform the method of any one of Examples 41 to 62.

Example 64 is a non-transitory computer readable medium storing instructions that when executed by a controller of a vehicular communication device cause the vehicular communication device to perform the method of any one of Examples 41 to 62.

Example 65 is a control device for allocating channel resources to different vehicular radio communication technologies, the control device including one or more processors configured to receive channel resource usage information from one or more reporting communication devices that indicates channel resource usage by a first vehicular radio communication technology and a second vehicular radio communication technology, determine channel resource allocations for the first vehicular radio communication technology and the second vehicular radio communication technology based on the channel resource usage information, and transmit the channel resource allocations to one or more participating communication devices.

In Example 66, the subject matter of Example 65 can optionally include wherein the one or more processors are configured to receive at least some of the channel resource usage information from the one or more reporting communication devices via a radio access network.

In Example 67, the subject matter of Example 65 or 66 can optionally include wherein the one or more processors are configured to receive at least some of the channel resource usage information from a vehicular communication device of the one or more reporting communication devices via a network access node that serves the vehicular communication device.

In Example 68, the subject matter of any one of Examples 65 to 67 can optionally include wherein the one or more processors are configured to receive at least some of the channel resource usage information from a network access node of the one or more reporting communication devices.

In Example 69, the subject matter of any one of Examples 66 to 68 can optionally include wherein the one or more processors are configured to transmit at least some of the channel resource allocations to the one or more participating communication devices via the radio access network.

In Example 70, the subject matter of any one of Examples 65 to 69 can optionally include wherein the one or more processors are configured to receive at least some of the channel resource usage information from one or more remote nodes that serve the control device.

In Example 71, the subject matter of Example 70 can optionally include wherein the one or more processors are configured to transmit at least some of the channel resource allocations to the one or more participating communication devices via the one or more remote nodes.

In Example 72, the subject matter of any one of Examples 65 to 71 can optionally include wherein the channel resource usage information indicates spectrum used, spectrum used per unit time, spectrum used per unit time per spatial multiplexing layer, spectrum used per unit time, spatial multiplexing layer, code, polarization, or propagation channel orthogonality, a total airtime of transmissions, a total number of active users, a total transmit power of transmissions, a total amount of data transmitted, or a transmission efficiency of the first vehicular radio communication technology and the second vehicular radio communication technology.

In Example 73, the subject matter of any one of Examples 65 to 72 can optionally include wherein the channel resource allocations assign one or more of channels, time slots, transmit powers, or spatial multiplexing layers to the one or more participating communication devices.

In Example 74, the subject matter of any one of Examples 65 to 73 can optionally include wherein the one or more processors are configured to determine the channel resource allocations by allocating more channel resources to the first vehicular radio communication technology than the second vehicular radio communication technology if the channel resource usage information indicates that the first vehicular radio communication technology uses more channel resources the second vehicular radio communication technology.

In Example 75, the subject matter of any one of Examples 65 to 74 can optionally include wherein the one or more processors are configured to determine the resource allocations by allocating different channel resources to the first vehicular radio communication technology than the second vehicular radio communication technology.

In Example 76, the subject matter of any one of Examples 65 to 75 can optionally include wherein the one or more processors are further configured to identify a first set of channel resource usage information provided by a first set of the one or more reporting devices in a first geographic area, and to determine the channel resource allocations for a first set of the one or more participating devices located in the first geographic area based on the first set of channel resource usage information.

In Example 77, the subject matter of Example 76 can optionally include wherein the one or more processors are configured to identify a second set of channel resource usage information provided by a second set of the one or more reporting devices in a second geographic area, and to determine the channel resource allocations for a second set of the one or more participating devices located in the second geographic area based on the second set of channel resource usage information.

In Example 78, the subject matter of any one of Examples 65 to 77 can optionally include wherein the one or more participating communication devices include one or more vehicular communication devices or one or more network access nodes.

In Example 79, the subject matter of any one of Examples 65 to 78 can optionally include wherein the one or more reporting communication devices include one or more vehicular communication devices or one or more network access nodes.

In Example 80, the subject matter of any one of Examples 65 to 79 can optionally include wherein at least some of the channel resource usage information is based on deterministic scheduling from a network access node of the one or more reporting communication devices.

In Example 81, the subject matter of any one of Examples 65 to 80 can optionally include wherein the first vehicular radio communication technology is a deterministic-scheduling vehicular radio communication technology and the second vehicular radio communication technology is a contention-based channel access vehicular radio communication technology.

In Example 82, the subject matter of any one of Examples 65 to 81 can optionally include wherein the one or more processors are further configured to receive updated channel resource usage information, determine updated channel resource allocations based on the updated channel resource usage information, and transmit the updated channel resource allocations.

In Example 83, the subject matter of any one of Examples 65 to 82 can optionally include wherein the one or more processors are further configured to gradually allocate more channel resources to the second vehicular radio communication technology than the first vehicular radio communication technology over an extended period of time.

In Example 84, the subject matter of any one of Examples 65 to 82 can optionally include wherein the one or more processors are further configured to gradually allocate more channel resources to the second vehicular radio communication technology than the first vehicular radio communication technology over an extended period of time during which the second vehicular radio communication technology gradually uses more channel resources than the first vehicular radio communication technology.

In Example 85, the subject matter of Example 83 or 84 can optionally include wherein the channel resource allocations are short-term channel resource allocations for time periods of milliseconds, seconds, or minutes, and wherein the extended period of time is a time period of months or years.

In Example 86, the subject matter of any one of Examples 65 to 85 can optionally include wherein the first vehicular radio communication technology is a Dedicated Short-Range Communication (DSRC) technology and the second vehicular radio communication technology is a Long Term Evolution (LTE) Vehicle-to-Vehicle (V2X) or Vehicle-to-Everything (V2X) technology.

Example 87 is a control device for allocating channel resources to different vehicular radio communication technologies, the control device including one or more processors configured to receive channel resource usage information from one or more reporting communication devices that indicates channel resource usage by a first vehicular radio communication technology and a second vehicular radio communication technology, determine channel resource allocations based on whether the first vehicular radio communication technology uses more channel resources than the second vehicular radio communication technology, and transmit the channel resource allocations to one or more communication devices.

In Example 88, the subject matter of Example 87 can optionally include wherein the one or more processors are configured to receive at least some of the channel resource usage information from the one or more reporting communication devices via a radio access network.

In Example 89, the subject matter of Example 87 or 88 can optionally include wherein the one or more processors are configured to receive at least some of the channel resource usage information from a vehicular communication device of the one or more reporting communication devices via a network access node that serves the vehicular communication device.

In Example 90, the subject matter of any one of Examples 87 to 89 can optionally include wherein the one or more processors are configured to receive at least some of the channel resource usage information from a network access node of the one or more reporting communication devices.

In Example 91, the subject matter of any one of Examples 88 to 90 can optionally include wherein the one or more processors are configured to transmit at least some of the channel resource allocations to the one or more participating communication devices via the radio access network.

In Example 92, the subject matter of any one of Examples 87 to 92 can optionally include wherein the one or more processors are configured to receive at least some of the channel resource usage information from one or more remote nodes that serve the control device.

In Example 93, the subject matter of Example 92 can optionally include wherein the one or more processors are configured to transmit at least some of the channel resource allocations to the one or more participating communication devices via the one or more remote nodes.

In Example 94, the subject matter of any one of Examples 87 to 93 can optionally include wherein the one or more processors are configured to aggregate the channel resource usage information to obtain first aggregated channel resource usage information for the first vehicular radio communication technology and second aggregated channel resource usage information for the second vehicular radio communication technology, and to compare the first aggregated channel resource usage information to the second aggregated channel resource usage information to determine whether the first vehicular radio communication technology uses more channel resources than the second vehicular radio communication technology.

In Example 95, the subject matter of Example 94 can optionally include wherein the one or more processors are configured to aggregate the channel resource usage information to obtain the first aggregated channel resource usage information by aggregating the channel resource usage information provided by the one or more participating devices that use the first vehicular radio communication technology.

In Example 96, the subject matter of Example 94 can optionally include wherein the one or more processors are configured to compare the first aggregated channel resource usage information to the second aggregated channel resource usage information by comparing spectrum used, spectrum used per unit time, spectrum used per unit time per spatial multiplexing layer, spectrum used per unit time, spatial multiplexing layer, code, polarization, or propagation channel orthogonality, a total airtime of transmissions, a total number of active users, a total transmit power of transmissions, a total amount of data transmitted, or a transmission efficiency of the first vehicular radio communication technology to the second vehicular radio communication technology.

In Example 97, the subject matter of any one of Examples 87 to 96 can optionally include wherein the channel resource usage information indicates spectrum used, spectrum used per unit time, spectrum used per unit time per spatial multiplexing layer, spectrum used per unit time, spatial multiplexing layer, code, polarization, or propagation channel orthogonality, a total airtime of transmissions, a total number of active users, a total transmit power of transmissions, a total amount of data transmitted, or a transmission efficiency of the first vehicular radio communication technology and the second vehicular radio communication technology.

In Example 98, the subject matter of any one of Examples 87 to 97 can optionally include wherein the channel resource allocations assign one or more of channels, time slots, transmit powers, or spatial multiplexing layers to the one or more participating communication devices.

In Example 99, the subject matter of any one of Examples 87 to 98 can optionally include wherein, if the first vehicular radio communication technology uses more channel resources than the second vehicular radio communication technology, the one or more processors are configured to allocate more spectrum, more spectrum per unit time, more spectrum per unit time per spatial multiplexing layer, or more transmit power to the first vehicular radio communication technology than the second vehicular radio communication technology.

In Example 100, the subject matter of any one of Examples 87 to 99 can optionally include wherein the one or more processors are configured to allocate different channel resources to the first vehicular radio communication technology than the second vehicular radio communication technology.

In Example 101, the subject matter of any one of Examples 87 to 100 can optionally include wherein the one or more processors are configured to identify a first set of channel resource usage information provided by a first set of the one or more reporting devices in a first geographic area, and to determine the channel resource allocations for a first set of the one or more participating devices located in the first geographic area based on the first set of channel resource usage information.

In Example 102, the subject matter of Example 101 can optionally include wherein the one or more processors are configured to identify a second set of channel resource usage information provided by a second set of the one or more reporting devices in a second geographic area, and to determine the channel resource allocations for a second set of the one or more participating devices located in the second geographic area based on the second set of channel resource usage information.

In Example 103, the subject matter of any one of Examples 87 to 102 can optionally include wherein the one or more participating communication devices include one or more vehicular communication devices or one or more network access nodes.

In Example 104, the subject matter of any one of Examples 87 to 103 can optionally include wherein the one or more reporting communication devices include one or more vehicular communication devices or one or more network access nodes.

In Example 105, the subject matter of any one of Examples 87 to 104 can optionally include wherein at least some of the channel resource usage information is based on deterministic scheduling from a network access node of the one or more reporting communication devices.

In Example 107, the subject matter of any one of Examples 87 to 105 can optionally include wherein the first vehicular radio communication technology is a deterministic-scheduling vehicular radio communication technology and the second vehicular radio communication technology is a contention-based channel access vehicular radio communication technology.

In Example 107, the subject matter of any one of Examples 87 to 106 can optionally include wherein the one or more processors are configured to receive updated channel resource usage information, determine updated channel resource allocations based on the updated channel resource usage information, and transmit the updated channel resource allocations.

In Example 108, the subject matter of any one of Examples 87 to 107 can optionally include wherein the one or more processors are further configured to gradually allocate more channel resources to the second vehicular radio communication technology than the first vehicular radio communication technology over an extended period of time.

In Example 109, the subject matter of any one of Examples 87 to 108 can optionally include wherein the one or more processors are further configured to gradually allocate more channel resources to the second vehicular radio communication technology than the first vehicular radio communication technology over an extended period of time during which the second vehicular radio communication technology gradually uses more channel resources than the first vehicular radio communication technology.

In Example 110, the subject matter of Example 108 or 109 can optionally include wherein the channel resource allocations are short-term channel resource allocations for time periods of milliseconds, seconds, or minutes, and wherein the extended period of time is a time period of months or years.

In Example 111, the subject matter of any one of Examples 87 to 110 can optionally include wherein the first vehicular radio communication technology is a Dedicated Short-Range Communication (DSRC) technology and the second vehicular radio communication technology is a Long Term Evolution (LTE) Vehicle-to-Vehicle (V2X) or Vehicle-to-Everything (V2X) technology.

Example 112 is a control device for allocating channel resources to different vehicular radio communication technologies, the control device including one or more processors configured to receive channel resource usage information from one or more reporting communication devices, wherein the channel resource usage information indicates relative channel resource usage by a first vehicular radio communication technology and a second vehicular radio communication technology, allocate different channel resources to the first vehicular radio communication technology and the second vehicular radio communication technology based on the channel resource usage information to obtain channel resource allocations, and transmit the channel resource allocations to one or more communication devices.

Example 113 is a control device for allocating channel resources to different vehicular radio communication technologies, the control device including one or more processors configured to receive channel resource usage information for a first vehicular radio communication technology and a second vehicular radio communication technology from a plurality of reporting communication devices, aggregate the channel resource usage information to obtain first aggregated channel resource usage information for the first vehicular radio communication technology and second aggregated channel resource usage information for the second vehicular radio communication technology, allocate an available set of channel resources between the first vehicular radio communication technology and the second vehicular radio communication technology based on the first aggregated channel resource usage information and the second aggregated channel resource usage information.

Example 114 is a communication device including means for receiving channel resource usage information from one or more reporting communication devices that indicates channel resource usage by a first vehicular radio communication technology and a second vehicular radio communication technology, means for determining channel resource allocations for the first vehicular radio communication technology and the second vehicular radio communication technology based on the channel resource usage information, and means for transmitting the channel resource allocations to one or more participating communication devices.

Example 115 is a method of allocating channel resources to different vehicular radio communication technologies, the method including receiving channel resource usage information from one or more reporting communication devices that indicates channel resource usage by a first vehicular radio communication technology and a second vehicular radio communication technology, determining channel resource allocations for the first vehicular radio communication technology and the second vehicular radio communication technology based on the channel resource usage information, and transmitting the channel resource allocations to one or more participating communication devices.

In Example 116, the subject matter of Example 115 can optionally include wherein receiving the channel resource usage information includes receiving at least some of the channel resource usage information from the one or more reporting communication devices via a radio access network.

In Example 117, the subject matter of Example 115 or 116 can optionally include wherein receiving the channel usage information includes receiving at least some of the channel resource usage information from a vehicular communication device of the one or more reporting communication devices via a network access node that serves the vehicular communication device.

In Example 118, the subject matter of any one of Examples 115 to 117 can optionally include wherein receiving the channel resource usage information includes receiving at least some of the channel resource usage information from a network access node of the one or more reporting communication devices.

In Example 119, the subject matter of any one of Examples 116 to 118 can optionally include wherein transmitting the channel resource allocations includes transmitting at least some of the channel resource allocations to the one or more participating communication devices via the radio access network.

In Example 120, the subject matter of any one of Examples 115 to 119 can optionally include wherein receiving the channel resource usage information includes receiving at least some of the channel resource usage information from one or more remote nodes that serve the control device.

In Example 121, the subject matter of Example 120 can optionally include wherein transmitting the channel resource allocations includes transmitting at least some of the channel resource allocations to the one or more participating communication devices via the one or more remote nodes.

In Example 122, the subject matter of any one of Examples 115 to 121 can optionally include wherein the channel resource usage information indicates spectrum used, spectrum used per unit time, spectrum used per unit time per spatial multiplexing layer, spectrum used per unit time, spatial multiplexing layer, code, polarization, or propagation channel orthogonality, a total airtime of transmissions, a total number of active users, a total transmit power of transmissions, a total amount of data transmitted, or a transmission efficiency of the first vehicular radio communication technology and the second vehicular radio communication technology.

In Example 123, the subject matter of any one of Examples 115 to 122 can optionally include wherein the channel resource allocations assign one or more of channels, time slots, transmit powers, or spatial multiplexing layers to the one or more participating communication devices.

In Example 124, the subject matter of any one of Examples 115 to 123 can optionally include wherein determining the channel resource allocations includes allocating more channel resources to the first vehicular radio communication technology than the second vehicular radio communication technology if the channel resource usage information indicates that the first vehicular radio communication technology uses more channel resources the second vehicular radio communication technology.

In Example 125, the subject matter of any one of Examples 115 to 124 can optionally include wherein determining the channel resource allocations includes allocating different channel resources to the first vehicular radio communication technology than the second vehicular radio communication technology.

In Example 126, the subject matter of any one of Examples 115 to 125 can optionally further include identifying a first set of channel resource usage information provided by a first set of the one or more reporting devices in a first geographic area, wherein determining the channel resource allocations includes determining the channel resource allocations for a first set of the one or more participating devices located in the first geographic area based on the first set of channel resource usage information.

In Example 127, the subject matter of Example 126 can optionally further include identifying a second set of channel resource usage information provided by a second set of the one or more reporting devices in a second geographic area, wherein determining the channel resource allocations includes determining the channel resource allocations for a second set of the one or more participating devices located in the second geographic area based on the second set of channel resource usage information.

In Example 128, the subject matter of any one of Examples 115 to 127 can optionally include wherein the one or more participating communication devices include one or more vehicular communication devices or one or more network access nodes.

In Example 129, the subject matter of any one of Examples 115 to 128 can optionally include wherein the one or more reporting communication devices include one or more vehicular communication devices or one or more network access nodes.

In Example 130, the subject matter of any one of Examples 115 to 129 can optionally include wherein at least some of the channel resource usage information is based on deterministic scheduling from a network access node of the one or more reporting communication devices.

In Example 131, the subject matter of any one of Examples 115 to 130 can optionally include wherein the first vehicular radio communication technology is a deterministic-scheduling vehicular radio communication technology and the second vehicular radio communication technology is a contention-based channel access vehicular radio communication technology.

In Example 132, the subject matter of any one of Examples 115 to 131 can optionally further include receiving updated channel resource usage information, determining updated channel resource allocations based on the updated channel resource usage information, and transmitting the updated channel resource allocations.

In Example 133, the subject matter of any one of Examples 115 to 132 can optionally include wherein determining the channel resource allocations for the first vehicular radio communication technology and the second vehicular radio communication technology includes gradually allocating more channel resources to the second vehicular radio communication technology than the first vehicular radio communication technology over an extended period of time.

In Example 134, the subject matter of any one of Examples 115 to 132 can optionally include wherein determining the channel resource allocations for the first vehicular radio communication technology and the second vehicular radio communication technology includes gradually allocating more channel resources to the second vehicular radio communication technology than the first vehicular radio communication technology over an extended period of time during which the second vehicular radio communication technology gradually uses more channel resources than the first vehicular radio communication technology.

In Example 135, the subject matter of Example 133 or 134 can optionally include wherein the channel resource allocations are short-term channel resource allocations for time periods of milliseconds, seconds, or minutes, and wherein the extended period of time is a time period of months or years.

In Example 136, the subject matter of any one of Examples 115 to 135 can optionally include wherein the first vehicular radio communication technology is a Dedicated Short-Range Communication (DSRC) technology and the second vehicular radio communication technology is a Long Term Evolution (LTE) Vehicle-to-Vehicle (V2X) or Vehicle-to-Everything (V2X) technology.

Example 137 is a non-transitory computer readable medium storing instructions that when executed by a processor causes the processor to perform the method of any one of Examples 115 to 136.

Example 138 is a communication device including means for receiving channel resource usage information from one or more reporting communication devices that indicates channel resource usage by a first vehicular radio communication technology and a second vehicular radio communication technology, means for determining channel resource allocations based on whether the first vehicular radio communication technology uses more channel resources than the second vehicular radio communication technology, and means for transmitting the channel resource allocations to one or more communication devices.

Example 139 is a method of allocating channel resources to different vehicular radio communication technologies, the method including receiving channel resource usage information from one or more reporting communication devices that indicates channel resource usage by a first vehicular radio communication technology and a second vehicular radio communication technology, determining channel resource allocations based on whether the first vehicular radio communication technology uses more channel resources than the second vehicular radio communication technology, and transmitting the channel resource allocations to one or more communication devices.

In Example 140, the subject matter of Example 139 can optionally include wherein receiving the channel resource usage information includes receiving at least some of the channel resource usage information from the one or more reporting communication devices via a radio access network.

In Example 141, the subject matter of Example 139 or 140 can optionally include wherein receiving the channel resource usage information includes receiving at least some of the channel resource usage information from a vehicular communication device of the one or more reporting communication devices via a network access node that serves the vehicular communication device.

In Example 142, the subject matter of any one of Examples 139 to 141 can optionally include wherein receiving the channel resource usage information includes receiving at least some of the channel resource usage information from a network access node of the one or more reporting communication devices.

In Example 143, the subject matter of any one of Examples 140 to 142 can optionally include wherein transmitting the channel resource allocations includes transmitting at least some of the channel resource allocations to the one or more participating communication devices via the radio access network.

In Example 144, the subject matter of any one of Examples 139 to 143 can optionally include wherein receiving the channel resource usage information includes receiving at least some of the channel resource usage information from one or more remote nodes that serve the control device.

In Example 145, the subject matter of Example 144 can optionally include wherein transmitting the channel resource allocation includes transmitting at least some of the channel resource allocations to the one or more participating communication devices via the one or more remote nodes.

In Example 146, the subject matter of any one of Examples 139 to 145 can optionally further include aggregating the channel resource usage information to obtain first aggregated channel resource usage information for the first vehicular radio communication technology and second aggregated channel resource usage information for the second vehicular radio communication technology, and comparing the first aggregated channel resource usage information to the second aggregated channel resource usage information to determine whether the first vehicular radio communication technology uses more channel resources than the second vehicular radio communication technology.

In Example 147, the subject matter of Example 146 can optionally include wherein aggregating the channel resource usage information to obtain the first aggregated channel resource usage information includes aggregating the channel resource usage information provided by the one or more participating devices that use the first vehicular radio communication technology.

In Example 148, the subject matter of Example 146 can optionally include wherein comparing the first the first aggregated channel resource usage information to the second aggregated channel resource usage information includes comparing spectrum used, spectrum used per unit time, spectrum used per unit time per spatial multiplexing layer, spectrum used per unit time, spatial multiplexing layer, code, polarization, or propagation channel orthogonality, a total airtime of transmissions, a total number of active users, a total transmit power of transmissions, a total amount of data transmitted, or a transmission efficiency of the first vehicular radio communication technology to the second vehicular radio communication technology.

In Example 149, the subject matter of any one of Examples 139 to 148 can optionally include wherein the channel resource usage information indicates spectrum used, spectrum used per unit time, spectrum used per unit time per spatial multiplexing layer, spectrum used per unit time, spatial multiplexing layer, code, polarization, or propagation channel orthogonality, a total airtime of transmissions, a total number of active users, a total transmit power of transmissions, a total amount of data transmitted, or a transmission efficiency of the first vehicular radio communication technology and the second vehicular radio communication technology In Example 150, the subject matter of any one of Examples 139 to 149 can optionally include wherein the channel resource allocations assign one or more of channels, time slots, transmit powers, or spatial multiplexing layers to the one or more participating communication devices.

In Example 151, the subject matter of any one of Examples 139 to 150 can optionally further include, if the first vehicular radio communication technology uses more channel resources than the second vehicular radio communication technology, allocating more spectrum, more spectrum per unit time, more spectrum per unit time per spatial multiplexing layer, or more transmit power to the first vehicular radio communication technology than the second vehicular radio communication technology.

In Example 152, the subject matter of any one of Examples 139 to 151 can optionally include wherein determining the channel resource allocations includes allocating different channel resources to the first vehicular radio communication technology than the second vehicular radio communication technology.

In Example 153, the subject matter of any one of Examples 139 to 152 can optionally further include identifying a first set of channel resource usage information provided by a first set of the one or more reporting devices in a first geographic area, wherein determining the channel resource allocations includes determining the channel resource allocations for a first set of the one or more participating devices located in the first geographic area based on the first set of channel resource usage information.

In Example 154, the subject matter of Example 153 can optionally further include identifying a second set of channel resource usage information provided by a second set of the one or more reporting devices in a second geographic area, wherein determining the channel resource allocations includes determining the channel resource allocations for a second set of the one or more participating devices located in the second geographic area based on the second set of channel resource usage information.

In Example 155, the subject matter of any one of Examples 139 to 144 can optionally include wherein the one or more participating communication devices include one or more vehicular communication devices or one or more network access nodes.

In Example 156, the subject matter of any one of Examples 139 to 155 can optionally include wherein the one or more reporting communication devices include one or more vehicular communication devices or one or more network access nodes.

In Example 157, the subject matter of any one of Examples 139 to 156 can optionally include wherein at least some of the channel resource usage information is based on deterministic scheduling from a network access node of the one or more reporting communication devices.

In Example 158, the subject matter of any one of Examples 139 to 157 can optionally include wherein the first vehicular radio communication technology is a deterministic-scheduling vehicular radio communication technology and the second vehicular radio communication technology is a contention-based channel access vehicular radio communication technology.

In Example 159, the subject matter of any one of Examples 139 to 158 can optionally include wherein the one or more processors are configured to receive updated channel resource usage information, determine updated channel resource allocations based on the updated channel resource usage information, and transmit the updated channel resource allocations.

In Example 160, the subject matter of any one of Examples 139 to 159 can optionally include wherein determining the channel resource allocations based on whether the first vehicular radio communication technology uses more channel resources than the second vehicular radio communication technology includes gradually allocating more channel resources to the second vehicular radio communication technology than the first vehicular radio communication technology over an extended period of time.

In Example 161, the subject matter of any one of Examples 139 to 159 can optionally include wherein determining the channel resource allocations based on whether the first vehicular radio communication technology uses more channel resources than the second vehicular radio communication technology includes gradually allocating more channel resources to the second vehicular radio communication technology than the first vehicular radio communication technology over an extended period of time during which the second vehicular radio communication technology gradually uses more channel resources than the first vehicular radio communication technology.

In Example 162, the subject matter of Example 160 or 161 can optionally include wherein the channel resource allocations are short-term channel resource allocations for time periods of milliseconds, seconds, or minutes, and wherein the extended period of time is a time period of months or years.

In Example 163, the subject matter of any one of Examples 139 to 162 can optionally include wherein the first vehicular radio communication technology is a Dedicated Short-Range Communication (DSRC) technology and the second vehicular radio communication technology is a Long Term Evolution (LTE) Vehicle-to-Vehicle (V2X) or Vehicle-to-Everything (V2X) technology.

Example 164 is a non-transitory computer readable medium storing instructions that when executed by a processor cause the processor to perform the method of any one of Examples 139 to 163.

Example 165 is a communication device including means for receiving channel resource usage information from one or more reporting communication devices, wherein the channel resource usage information indicates relative channel resource usage by a first vehicular radio communication technology and a second vehicular radio communication technology, means for allocating different channel resources to the first vehicular radio communication technology and the second vehicular radio communication technology based on the channel resource usage information to obtain channel resource allocations, and means for transmitting the channel resource allocations to one or more communication devices.

Example 166 is a method for allocating channel resources to different vehicular radio communication technologies, the method including receiving channel resource usage information from one or more reporting communication devices, wherein the channel resource usage information indicates relative channel resource usage by a first vehicular radio communication technology and a second vehicular radio communication technology, allocating different channel resources to the first vehicular radio communication technology and the second vehicular radio communication technology based on the channel resource usage information to obtain channel resource allocations, and transmitting the channel resource allocations to one or more communication devices.

Example 167 is a communication device including means for receiving channel resource usage information for a first vehicular radio communication technology and a second vehicular radio communication technology from a plurality of reporting communication devices, means for aggregating the channel resource usage information to obtain first aggregated channel resource usage information for the first vehicular radio communication technology and second aggregated channel resource usage information for the second vehicular radio communication technology, means for allocating an available set of channel resources between the first vehicular radio communication technology and the second vehicular radio communication technology based on the first aggregated channel resource usage information and the second aggregated channel resource usage information.

Example 168 is a method for allocating channel resources to different vehicular radio communication technologies, the method including receiving channel resource usage information for a first vehicular radio communication technology and a second vehicular radio communication technology from a plurality of reporting communication devices, aggregating the channel resource usage information to obtain first aggregated channel resource usage information for the first vehicular radio communication technology and second aggregated channel resource usage information for the second vehicular radio communication technology, allocating an available set of channel resources between the first vehicular radio communication technology and the second vehicular radio communication technology based on the first aggregated channel resource usage information and the second aggregated channel resource usage information.

Example 169 is a control device for allocating channel resources to different vehicular radio communication technologies, the control device including a memory, one or more processors, and executable instructions stored in the memory and configured for execution by the one or more processors, the executable instructions including an interface subroutine to receive channel resource usage information from one or more reporting communication devices that indicates channel resource usage by a first vehicular radio communication technology and a second vehicular radio communication technology, and to transmit channel resource allocations to one or more participating communication devices, and an allocation subroutine to determine the channel resource allocations for the first vehicular radio communication technology and the second vehicular radio communication technology based on the channel resource usage information.

In Example 170, the subject matter of Example 169 can optionally further include interface circuitry, wherein the one or more processors are configured to, under the control of the interface subroutine, receive the channel resource usage information and transmit the channel resource allocations with the interface circuitry via a wired connection.

Example 171 is a control device for allocating channel resources to different vehicular radio communication technologies, the control device including a memory, and one or more processors, and executable instructions stored in the memory and configured for execution by the one or more processors, the executable instructions including an interface subroutine to receive channel resource usage information for a first vehicular radio communication technology and a second vehicular radio communication technology from a plurality of reporting communication devices, an evaluation subroutine to aggregate the channel resource usage information to obtain first aggregated channel resource usage information for the first vehicular radio communication technology and second aggregated channel resource usage information for the second vehicular radio communication technology, and an allocation subroutine to allocate an available set of channel resources between the first vehicular radio communication technology and the second vehicular radio communication technology based on the first aggregated channel resource usage information and the second aggregated channel resource usage information.

In Example 172, the subject matter of Example 171 can optionally further include interface circuitry, wherein the one or more processors are configured to, under the control of the interface subroutine, receive the channel resource usage information with the interface circuitry via a wired connection.

Example 173 is a communication device including means for receiving radio communication technology selection criteria associated with a plurality of vehicular communication devices, means for selecting a radio communication technology resource for the plurality of vehicular communication devices based on the received radio communication technology selection criteria, and means for transmitting a configuration message to at least one vehicular communication device of the plurality of vehicular communication devices, the configuration message including the selected radio communication technology resource for the plurality of vehicular communication devices.

Example 174 is a method for selecting a radio communication technology resource for a plurality of vehicular communication devices, the method including receiving radio communication technology selection criteria associated with a plurality of vehicular communication devices, selecting a radio communication technology resource for the plurality of vehicular communication devices based on the received radio communication technology selection criteria, and transmitting a configuration message to at least one vehicular communication device of the plurality of vehicular communication devices, the configuration message including the selected radio communication technology resource for the plurality of vehicular communication devices.

In Example 175, the subject matter of Example 174 can optionally include wherein the received radio communication technology selection criteria includes at least one parameter averaged among each of the plurality of vehicular communication devices.

In Example 176, the subject matter of Example 174 can optionally include wherein selecting the at least one radio communication technology resource for the plurality of vehicular communication devices includes comparing the received radio communication technology selection criteria to a predetermined threshold, and selecting the radio communication technology resource based on the comparison of the received radio communication technology selection criteria to the predetermined threshold.

In Example 177, the subject matter of Example 174 can optionally include wherein the selected radio communication technology resource for the plurality of vehicular communication devices is a radio communication technology resource candidate for the plurality of vehicular communication devices.

In Example 178, the subject matter of Example 174 can optionally include wherein the selected radio communication technology resource for the plurality of vehicular communication devices includes a plurality of radio communication technology resource candidates for the plurality of vehicular communication devices.

In Example 179, the subject matter of Example 174 can optionally include wherein the selected radio communication technology resource for the plurality of vehicular communication devices indicates a frequency channel, time slot, or radio communication technology, for each of the plurality of vehicular communication devices.

In Example 180, the subject matter of Example 174 can optionally include wherein the selected radio communication technology resource for the plurality of vehicular communication devices indicates a duration for which the selected radio communication technology resource is valid.

In Example 181, the subject matter of Example 174 can optionally further include identifying a plurality of radio communication technology resources available to the plurality of vehicular communication devices, wherein selecting the radio communication technology resource for the plurality of vehicular communication devices includes selecting the radio communication technology resource from the identified plurality of radio communication technology resources available to the plurality of vehicular communication devices.

In Example 182, the subject matter of Example 174 can optionally further include estimating an effect of the selected radio communication technology resource on the plurality of vehicular communication devices based on the received radio communication technology selection criteria.

In Example 183, the subject matter of Example 182 can optionally further include assigning a weighting factor to the selected radio communication technology resource for the plurality of vehicular communication devices based on the estimated effect on the plurality of vehicular communication devices.

In Example 184, the subject matter of Example 174 can optionally further include estimating a communication performance effect, for each of the plurality of radio communication technology resource candidates, on the plurality of vehicular communication devices based on the received radio communication technology selection criteria.

In Example 185, the subject matter of Example 184 can optionally further include assigning a weighting factor to each of the plurality of radio communication technology resource candidates based on the respective estimated communication performance effect on the plurality of vehicular communication devices.

In Example 186, the subject matter of Example 185 can optionally further include ranking each of the plurality of radio communication technology resource candidates based on the respective assigned weighting factors, wherein the configuration message includes the plurality of radio communication technology resource candidates in an order based on the respective rankings associated therewith.

In Example 187, the subject matter of Example 174 can optionally further include transmitting a request for the radio communication technology selection criteria associated with the plurality of vehicular communication devices.

In Example 188, the subject matter of Example 187 can optionally include wherein the transmitted request for the radio communication technology selection criteria includes a request that at least one vehicular communication device of the plurality of vehicular communication devices perform a measurement.

In Example 189, the subject matter of Example 174 can optionally further include receiving a radio communication technology resource candidate for the plurality of vehicular communication devices.

In Example 190, the subject matter of Example 189 can optionally include wherein selecting the radio communication technology resource for the plurality of vehicular communication devices is based on the received radio communication technology selection criteria and the received radio communication technology resource candidate.

In Example 191, the subject matter of Example 174 can optionally further include identifying an expected change in communication performance for at least one of the plurality of vehicular communication devices based on the received radio communication technology selection criteria.

In Example 192, the subject matter of Example 191 can optionally further include modifying at least one parameter within the received radio communication technology selection criteria based on the expected change in communication performance.

In Example 193, the subject matter of Example 192 can optionally include wherein selecting the radio communication technology resource for the plurality of vehicular communication devices includes selecting the radio communication technology resource based on the at least one modified parameter.

Example 194 is a communication device for selecting a radio communication technology resource for a plurality of vehicular communication devices, the communication device including a radio frequency transceiver configured to receive radio communication technology selection criteria associated with a plurality of vehicular communication devices, and a controller configured to select a radio communication technology resource for the plurality of vehicular communication devices based on the received radio communication technology selection criteria, and generate a configuration message including the selected radio communication technology resource for the plurality of vehicular communication devices.

In Example 195, the subject matter of Example 194 can optionally include wherein the received radio communication technology selection criteria includes at least one parameter averaged among each of the plurality of vehicular communication devices.

In Example 196, the subject matter of Example 194 can optionally include wherein the controller is further configured to compare the received radio communication technology selection criteria to a predetermined threshold, and select the radio communication technology resource based on the comparison of the received radio communication technology selection criteria to the predetermined threshold.

In Example 197, the subject matter of Example 194 can optionally include wherein the selected radio communication technology resource for the plurality of vehicular communication devices is a radio communication technology resource candidate for the plurality of vehicular communication devices.

In Example 198, the subject matter of Example 194 can optionally include wherein the selected radio communication technology resource for the plurality of vehicular communication devices includes a plurality of radio communication technology resource candidates for the plurality of vehicular communication devices.

In Example 199, the subject matter of Example 194 can optionally include wherein the selected radio communication technology resource for the plurality of vehicular communication devices indicates a frequency channel, time slot, or radio communication technology, for each of the plurality of vehicular communication devices.

In Example 200, the subject matter of Example 194 can optionally include wherein the selected radio communication technology resource for the plurality of vehicular communication devices indicates a duration for which the selected radio communication technology resource is valid.

In Example 201, the subject matter of Example 194 can optionally include wherein the controller is further configured to identify a plurality of radio communication technology resources available to the plurality of vehicular communication devices, and select the radio communication technology resource from the identified plurality of radio communication technology resources available to the plurality of vehicular communication devices.

In Example 202, the subject matter of Example 194 can optionally include wherein the controller is further configured to estimate an effect of the selected radio communication technology resource on the plurality of vehicular communication devices based on the received radio communication technology selection criteria.

In Example 203, the subject matter of Example 202 can optionally include wherein the controller is further configured to assign a weighting factor to the selected radio communication technology resource for the plurality of vehicular communication devices based on the estimated effect on the plurality of vehicular communication devices.

In Example 204, the subject matter of Example 194 can optionally include wherein the controller is further configured to estimate a communication performance effect, for each of the plurality of radio communication technology resource candidates, on the plurality of vehicular communication devices based on the received radio communication technology selection criteria.

In Example 205, the subject matter of Example 204 can optionally include wherein the controller is further configured to assign a weighting factor to each of the plurality of radio communication technology resource candidates based on the respective estimated communication performance effect on the plurality of vehicular communication devices.

In Example 206, the subject matter of Example 205 can optionally include wherein the controller is further configured to rank each of the plurality of radio communication technology resource candidates based on the respective assigned weighting factors, wherein the configuration message includes the plurality of radio communication technology resource candidates in an order based on the respective rankings associated therewith.

In Example 207, the subject matter of Example 203 can optionally include wherein the radio frequency transceiver is further configured to transmit a request for the radio communication technology selection criteria associated with the plurality of vehicular communication devices.

In Example 208, the subject matter of Example 207 can optionally include wherein the transmitted request for the radio communication technology selection criteria includes a request that at least one vehicular communication device of the plurality of vehicular communication devices perform a measurement.

In Example 209, the subject matter of Example 194 can optionally include wherein the radio frequency transceiver is further configured to receiving a radio communication technology resource candidate for the plurality of vehicular communication devices.

In Example 210, the subject matter of Example 209 can optionally include wherein the controller is further configured to select the radio communication technology resource for the plurality of vehicular communication devices is based on the received radio communication technology selection criteria and the received radio communication technology resource candidate.

In Example 211, the subject matter of Example 194 can optionally include wherein the controller is further configured to identify an expected change in communication performance for at least one of the plurality of vehicular communication devices based on the received radio communication technology selection criteria.

In Example 212, the subject matter of Example 211 can optionally include wherein the controller is further configured to modify at least one parameter within the received radio communication technology selection criteria based on the expected change in communication performance.

In Example 213, the subject matter of Example 212 can optionally include wherein the controller is further configured to select the radio communication technology resource based on the at least one modified parameter.

Example 214 is a computing device including one or more processors configured to perform the method of any one of Examples 174 to 193.

Example 215 is a processing circuit configured to perform the method of any one of Examples 174 to 193.

Example 216 is a non-transitory computer readable medium storing instructions that when executed by a processor cause the processor to perform the method of any one of Examples 174 to 193.

Example 217 is a non-transitory computer readable medium storing instructions that when executed by processing circuitry of a computing device cause the computing device to perform the method of any one of Examples 1 to 20.

Example 218 is a communication device including a carrier sensor configured to detect a transmission on a channel including wireless activity by one or more contention-based communication devices, a reservation manager configured to perform a reserving transmission on the channel before a sensing interval of the one or more contention-based communication devices lapses after the transmission, and a scheduler configured to transmit a channel resource allocation to one or more deterministic scheduling communication devices that allocates channel resources of the channel for an allocation period after the reserving transmission.

In Example 219, the subject matter of Example 218 can optionally include wherein the reservation manager is configured to perform the reserving transmission after a reservation interval lapses after the transmission.

In Example 220, the subject matter of Example 219 can optionally include wherein the reservation interval is longer than an acknowledgement interval of the one or more contention-based communication devices.

In Example 221, the subject matter of any one of Examples 218 to 220 can optionally include wherein the sensing interval is a Carrier-Sense Multiple Access with Collision Avoidance (CSMA/CA) sensing interval.

In Example 222, the subject matter of any one of Examples 218 to 221 can optionally include wherein the carrier sensor is configured to detect a most recent transmission on the channel as the transmission.

In Example 223, the subject matter of any one of Examples 218 to 222 can optionally include wherein the reserving transmission includes dummy noise.

In Example 224, the subject matter of any one of Examples 218 to 222 can optionally include wherein the reserving transmission includes a preamble of a radio communication technology of the one or more contention-based communication devices.

In Example 225, the subject matter of any one of Examples 218 to 224 can optionally include wherein the scheduler is configured to determine the channel resource allocation by allocating different channel resources to the one or more deterministic scheduling communication devices according to a multiple access scheme.

In Example 226, the subject matter of any one of Examples 218 to 225 can optionally include wherein the scheduler is configured to transmit the channel resource allocation by transmitting one or more channel resource allocation messages to the one or more deterministic scheduling communication devices that indicate the channel resource allocation.

In Example 227, the subject matter of any one of Examples 218 to 226 can optionally include wherein the carrier sensor is configured to perform carrier sensing on the channel to detect the transmission.

In Example 228, the subject matter of any one of Examples 218 to 227 can optionally include wherein the scheduler is configured to transmit a respective channel resource allocation to the one or more deterministic scheduling communication devices for each of a plurality of allocation periods.

In Example 229, the subject matter of Example 228 can optionally include wherein the scheduler is configured to suspend allocation of channel resources to the one or more deterministic scheduling communication devices during a silent period that is longer than the sensing interval.

In Example 230, the subject matter of Example 229 can optionally include wherein the scheduler is configured to resume allocation of channel resources to the one or more deterministic scheduling communication devices after the silent period.

In Example 231, the subject matter of Example 229 or 230 can optionally include wherein the reservation manager is configured to collect channel resource usage information for the one or more contention-based communication devices and the one or more deterministic scheduling communication devices, and to adjust the frequency or duration of one or more silent periods based on the channel resource usage information.

In Example 232, the subject matter of any one of Examples 218 to 231 can optionally include wherein the reservation manager is further configured to identify an intervening period between scheduled transmissions on the channel by the communication device and the one or more deterministic scheduling communication devices that is longer than the sensing interval, and to perform a transmission on the channel during the intervening period.

In Example 233, the subject matter of Example 232 can optionally include wherein the transmission during the intervening period is dummy noise.

In Example 234, the subject matter of Example 232 can optionally include wherein the transmission during the intervening period is a preamble of a radio communication technology of the one or more contention-based communication devices.

In Example 235, the subject matter of any one of Examples 232 to 234 can optionally include wherein the reservation manager is configured to identify the intervening period based on the channel resource allocation.

In Example 236, the subject matter of any one of Examples 218 to 235 can optionally include wherein the reservation manager is further configured to monitor the duration of an ongoing transmission break, and to perform a transmission on the channel if the duration of the ongoing transmission break persists longer than a triggering interval that is less than the sensing interval.

In Example 237, the subject matter of any one of Examples 218 to 236 can optionally include wherein the scheduler is configured to transmit the channel resource allocation to the one or more deterministic scheduling communication devices via a radio transceiver and one or more antennas.

In Example 238, the subject matter of any one of Examples 218 to 237 can optionally include wherein the carrier sensor is configured to detect the transmission on the channel by receiving baseband samples from a radio transceiver that represent wireless signals on the carrier, and to process the baseband samples to detect the transmission with carrier sensing.

In Example 239, the subject matter of any one of Examples 218 to 238 can optionally include wherein the reservation manager is configured to perform the transmission by a radio transceiver and one or more antennas.

In Example 240, the subject matter of any one of Examples 218 to 236 can optionally further include a radio transceiver and one or more antennas, and configured as a network access node.

In Example 241, the subject matter of any one of Examples 218 to 236 can optionally be configured as a communication subcomponent for a network access node.

Example 242 is a communication device including means for detecting a transmission on a channel including wireless activity by one or more contention-based communication devices, means for performing a reserving transmission on the channel before a sensing interval of the one or more contention-based communication devices lapses after the transmission, and means for transmitting a channel resource allocation to one or more deterministic scheduling communication devices that allocates channel resources of the channel for an allocation period after the reserving transmission.

Example 243 is a method of performing wireless communications, the method including detecting a transmission on a channel including wireless activity by one or more contention-based communication devices, performing a reserving transmission on the channel before a sensing interval of the one or more contention-based communication devices lapses after the transmission, and transmitting a channel resource allocation to one or more deterministic scheduling communication devices that allocates channel resources of the channel for an allocation period after the reserving transmission.

In Example 244, the subject matter of Example 243 can optionally include wherein the reservation manager is configured to perform the reserving transmission after a reservation interval lapses after the transmission.

In Example 245, the subject matter of Example 244 can optionally include wherein the reservation interval is longer than an acknowledgement interval of the one or more contention-based communication devices.

In Example 246, the subject matter of any one of Examples 243 to 245 can optionally include wherein the sensing interval is a Carrier-Sense Multiple Access with Collision Avoidance (CSMA/CA) sensing interval.

In Example 247, the subject matter of any one of Examples 243 to 246 can optionally include wherein the carrier sensor is configured to detect a most recent transmission on the channel as the transmission.

In Example 248, the subject matter of any one of Examples 243 to 247 can optionally include wherein the reserving transmission includes dummy noise.

In Example 249, the subject matter of any one of Examples 243 to 247 can optionally include wherein the reserving transmission includes a preamble of a radio communication technology of the one or more contention-based communication devices.

In Example 250, the subject matter of any one of Examples 243 to 249 can optionally include wherein further including determining the channel resource allocation by allocating different channel resources to the one or more deterministic scheduling communication devices according to a multiple access scheme.

In Example 251, the subject matter of any one of Examples 243 to 250 can optionally include wherein transmitting the channel resource allocation includes transmitting one or more channel resource allocation messages to the one or more deterministic scheduling communication devices that indicates the channel resource allocation.

In Example 252, the subject matter of any one of Examples 243 to 251 can optionally include wherein detecting the transmission on the channel includes performing carrier sensing on the channel.

In Example 253, the subject matter of any one of Examples 243 to 252 can optionally further include transmitting a respective channel resource allocation to the one or more deterministic scheduling communication devices for each of a plurality of allocation periods.

In Example 254, the subject matter of Example 253 can optionally further include suspending allocation of the channel resources to the one or more deterministic scheduling communication devices during a silent period that is longer than the sensing interval.

In Example 255, the subject matter of Example 254 can optionally further include resuming allocation of channel resources to the one or more deterministic scheduling communication devices after the silent period.

In Example 256, the subject matter of Example 253 or 254 can optionally further include collecting channel resource usage information for the one or more contention-based communication devices and the one or more deterministic scheduling communication devices, and adjusting the frequency or duration of one or more silent periods based on the channel resource usage information.

In Example 257, the subject matter of any one of Examples 243 to 255 can optionally further include identifying an intervening period between transmissions on the channel to or from the one or more deterministic scheduling communication devices that is longer than the sensing interval, and performing a transmission on the interval during the intervening period.

In Example 258, the subject matter of Example 257 can optionally include wherein the transmission during the intervening period is dummy noise.

In Example 259, the subject matter of Example 257 can optionally include wherein the transmission during the intervening period is a preamble of a radio communication technology of the one or more contention-based communication devices.

In Example 260, the subject matter of any one of Examples 257 to 259 can optionally further include identifying the intervening period based on the channel resource allocation.

In Example 261, the subject matter of any one of Examples 243 to 260 can optionally further include determining the duration of an ongoing transmission break, and performing a transmission on the channel if the duration of the ongoing transmission break persists longer than a triggering interval that is less than the sensing interval.

In Example 262, the subject matter of any one of Examples 243 to 261 can optionally include wherein transmitting the channel resource allocation to the one or more deterministic scheduling communication devices includes transmitting the channel resource allocation via a radio transceiver and one or more antennas.

In Example 263, the subject matter of any one of Examples 243 to 262 can optionally include wherein detecting the transmission on the channel includes receiving baseband samples from a radio transceiver that represent wireless signals on the carrier, and processing the baseband samples to detect the transmission with carrier sensing.

In Example 264, the subject matter of any one of Examples 243 to 263 can optionally include wherein performing the transmission includes performing the transmission by a radio transceiver and one or more antennas.

In Example 265, the subject matter of any one of Examples 243 to 264 can optionally include performing the method at a network access node.

Example 266 is a non-transitory computer readable medium storing instructions that when executed by a controller of a network access node cause the network access node to perform the method of any one of Examples 243 to 265.

Example 267 is a communication device including a memory, one or more processors, and instructions stored in the memory configured for execution by the one or more processors that cause the communication device to perform the method of any one of Examples 243 to 264.

Example 268 is a communication device including a carrier sensor configured to perform carrier sensing on a channel to determine when the channel is free, a reservation manager configured to perform a reserving transmission on the channel when the channel is free for at least a reservation interval, and a scheduler configured to transmit a channel resource allocation to one or more deterministic scheduling communication devices that allocates channel resources of the channel for an allocation period after the reserving transmission.

Example 269 is a communication device including a carrier sensor configured to perform carrier sensing on a channel to determine when the channel is free, a reservation manager configured to perform a reserving transmission on the channel before an earliest time that one or more contention-based communication devices can access the channel with carrier sensing, and a scheduler configured to transmit a channel resource allocation to one or more deterministic scheduling communication devices that allocates channel resources of the channel for an allocation period after the reserving transmission.

Example 270 is a communication device including means for performing carrier sensing on a channel to determine when the channel is free, means for performing a reserving transmission on the channel when the channel is free for at least a reservation interval, and means for transmitting a channel resource allocation to one or more deterministic scheduling communication devices that allocates channel resources of the channel for an allocation period after the reserving transmission.

Example 271 is a method for performing wireless communications, the method including performing carrier sensing on a channel to determine when the channel is free, performing a reserving transmission on the channel when the channel is free for at least a reservation interval, and transmitting a channel resource allocation to one or more deterministic scheduling communication devices that allocates channel resources of the channel for an allocation period after the reserving transmission.

Example 272 is a communication device including means for performing carrier sensing on a channel to determine when the channel is free, means for performing a reserving transmission on the channel before an earliest time that one or more contention-based communication devices can access the channel with carrier sensing, and means for transmitting a channel resource allocation to one or more deterministic scheduling communication devices that allocates channel resources of the channel for an allocation period after the reserving transmission.

Example 273 is a method for performing wireless communications, the method including performing carrier sensing on a channel to determine when the channel is free, performing a reserving transmission on the channel before an earliest time that one or more contention-based communication devices can access the channel with carrier sensing, and transmitting a channel resource allocation to one or more deterministic scheduling communication devices that allocates channel resources of the channel for an allocation period after the reserving transmission.

Example 274 is a communication device including a carrier sensor configured to detect a transmission on a channel including wireless activity by one or more contention-based communication devices, and a reservation manager configured to perform a reserving transmission on the channel before a sensing interval of the one or more contention-based communication devices lapses after the most recent transmission, and to subsequently notify a deterministic scheduling network access node that the channel is reserved for deterministic scheduling communications.

In Example 275, the subject matter of Example 274 can optionally include wherein the reservation manager is configured to notify the deterministic scheduling network access node that the channel is reserved for deterministic scheduling communications by transmitting a reservation message to the deterministic scheduling network access node that specifies a reservation window during which the channel is reserved.

In Example 276, the subject matter of Example 274 or 275 can optionally include wherein the reservation manager is further configured to monitor the duration of an ongoing transmission break on the channel when the channel is reserved, and to perform a transmission on the channel if the duration of the ongoing transmission break persists longer than a triggering interval that is less than the sensing interval.

In Example 277, the subject matter of any one of Examples 274 to 276 can optionally include wherein the reservation manager is configured to perform the reserving transmission after a reservation interval lapses after the transmission.

In Example 278, the subject matter of Example 277 can optionally include wherein the reservation interval is longer than an acknowledgement interval of the one or more contention-based communication devices.

In Example 279, the subject matter of any one of Examples 274 to 278 can optionally include the sensing interval is a Carrier-Sense Multiple Access with Collision Avoidance (CSMA/CA) sensing interval In Example 280, the subject matter of any one of Examples 274 to 279 can optionally include wherein the carrier sensor is configured to detect a most recent transmission on the channel as the transmission.

In Example 281, the subject matter of any one of Examples 274 to 280 can optionally include wherein the reserving transmission includes dummy noise.

In Example 282, the subject matter of any one of Examples 274 to 281 can optionally include wherein the reserving transmission includes a preamble of a radio communication technology of the one or more contention-based communication devices.

In Example 283, the subject matter of any one of Examples 274 to 282 can optionally include wherein the reservation manager is further configured to monitor the duration of an ongoing transmission break, and to perform a transmission on the channel if the duration of the ongoing transmission break persists longer than a triggering interval that is less than the sensing interval.

In Example 284, the subject matter of any one of Examples 274 to 283 can optionally include wherein the scheduler is configured to transmit the channel resource allocation to the one or more deterministic scheduling communication devices via a radio transceiver and one or more antennas.

In Example 285, the subject matter of any one of Examples 274 to 284 can optionally include wherein the carrier sensor is configured to detect the transmission on the channel by receiving baseband samples from a radio transceiver that represent wireless signals on the carrier, and to process the baseband samples to detect the transmission with carrier sensing.

In Example 286, the subject matter of any one of Examples 274 to 285 can optionally include wherein the reservation manager is configured to perform the transmission by a radio transceiver and one or more antennas.

In Example 287, the subject matter of any one of Examples 274 to 286 can optionally further include a radio transceiver and one or more antennas, and configured as a network access node.

In Example 288, the subject matter of any one of Examples 274 to 287 can optionally be configured as a communication subcomponent for a network access node.

Example 289 is a communication device including a carrier sensor configured to perform carrier sensing on a channel to determine when the channel is free, and a reservation manager configured to perform a reserving transmission on the channel when the channel is free for at least a reservation interval, and to notify a deterministic scheduling network access node that the channel is reserved for deterministic scheduling communications.

Example 290 is a communication device including a carrier sensor configured to perform carrier sensing on a channel to determine when the channel is free, and a reservation manager configured to perform a reserving transmission on the channel before an earliest time that one or more contention-based communication devices can access the channel with carrier sensing, and to subsequently notify a deterministic scheduling network access node that the channel is reserved for deterministic scheduling communications.

Example 291 is a communication device including means for performing carrier sensing on a channel to determine when the channel is free, means for performing a reserving transmission on the channel when the channel is free for at least a reservation interval, means for notifying a deterministic scheduling network access node after the reserving transmission that the channel is reserved for deterministic scheduling communications.

Example 292 is a method for performing wireless communications, the method including performing carrier sensing on a channel to determine when the channel is free, and performing a reserving transmission on the channel when the channel is free for at least a reservation interval, notifying a deterministic scheduling network access node after the reserving transmission that the channel is reserved for deterministic scheduling communications.

Example 293 is a communication device including means for detecting a transmission on a channel including wireless activity by one or more contention-based communication devices, means for performing a reserving transmission on the channel before a sensing interval of the one or more contention-based communication devices lapses after the most recent transmission, and means for notifying a deterministic scheduling network access node after the reserving transmission that the channel is reserved for deterministic scheduling communications.

Example 294 is a method for performing wireless communications, the method including detecting a transmission on a channel including wireless activity by one or more contention-based communication devices, performing a reserving transmission on the channel before a sensing interval of the one or more contention-based communication devices lapses after the most recent transmission, notifying a deterministic scheduling network access node after the reserving transmission that the channel is reserved for deterministic scheduling communications.

Example 295 is a communication device including means for performing carrier sensing on a channel to determine when the channel is free, means for performing a reserving transmission on the channel before an earliest time that one or more contention-based communication devices can access the channel with carrier sensing, and means for notifying a deterministic scheduling network access node after the reserving transmission that the channel is reserved for deterministic scheduling communications.

Example 296 is a method for performing wireless communications, the method including performing carrier sensing on a channel to determine when the channel is free, performing a reserving transmission on the channel before an earliest time that one or more contention-based communication devices can access the channel with carrier sensing, and notifying a deterministic scheduling network access node after the reserving transmission that the channel is reserved for deterministic scheduling communications.

Example 297 is a communication device including one or more antennas and a radio transceiver configured to transmit wireless signals on a channel shared with one or more contention-based communication devices, a reservation manager configured to receive a notification from a coexistence engine that the channel is reserved, and a scheduler configured to transmit a channel resource allocation to one or more deterministic scheduling communication devices that allocates channel resources of the channel for an allocation period after the channel is reserved.

In Example 298, the subject matter of Example 297 can optionally include wherein the notification received from the coexistence engine is a reservation message that indicates a reservation window during which the channel is reserved.

In Example 299, the subject matter of Example 298 can optionally include wherein the scheduler is configured to transmit a respective channel resource allocation to the one or more deterministic scheduling devices for each of a plurality of allocation periods in the reservation window.

In Example 300, the subject matter of Example 297 can optionally include wherein the reservation manager is configured to receive a notification from the coexistence engine that indicates a time when the channel is no longer reserved, and wherein the scheduler is configured to repeatedly transmit channel resource allocations to the one or more deterministic scheduling communication devices until the time when the channel is no longer reserved.

In Example 301, the subject matter of any one of Examples 297 to 300 can optionally include wherein the scheduler is configured to determine the channel resource allocation by allocating different channel resources to the one or more deterministic scheduling communication devices according to a multiple access scheme.

In Example 302, the subject matter of any one of Examples 297 to 301 can optionally include wherein the scheduler is configured to transmit the channel resource allocation by transmitting one or more channel resource allocation messages to the one or more deterministic scheduling communication devices that indicates the channel resource allocation.

Example 303 is a communication device including means for receiving a notification from a coexistence engine that a channel is reserved, where the channel includes wireless activity by one or more contention-based communication devices, and means for transmitting a channel resource allocation to one or more deterministic scheduling communication devices that allocates channel resources of the channel for an allocation period after the channel is reserved.

Example 304 is a method of performing wireless communications, the method including receiving a notification from a coexistence engine that a channel is reserved, where the channel includes wireless activity by one or more contention-based communication devices, and transmitting a channel resource allocation to one or more deterministic scheduling communication devices that allocates channel resources of the channel for an allocation period after the channel is reserved.

In Example 305, the subject matter of Example 304 can optionally include wherein the notification received from the coexistence engine is a reservation message that indicates a reservation window during which the channel is reserved.

In Example 306, the subject matter of Example 305 can optionally further include transmitting a respective channel resource allocation to the one or more deterministic scheduling devices for each of a plurality of allocation periods in the reservation window.

In Example 307, the subject matter of Example 304 can optionally further include receiving a notification from the coexistence engine that indicates a time when the channel is no longer reserved, the method further including repeatedly transmitting channel resource allocations to the one or more deterministic scheduling communication devices until the time when the channel is no longer reserved.

In Example 308, the subject matter of any one of Examples 304 to 307 can optionally include wherein determining the channel resource allocation includes allocating different channel resources to the one or more deterministic scheduling communication devices according to a multiple access scheme.

In Example 309, the subject matter of any one of Examples 304 to 308 can optionally include wherein transmitting the channel resource allocation includes transmitting one or more channel resource allocation messages to the one or more deterministic scheduling communication devices that indicates the channel resource allocation.

Example 310 is a communication device, including a short range radio communication technology transceiver, a cellular wide area radio communication technology transceiver, one or more processors configured to select a radio communication technology transceiver based on at least one cluster communication characteristic of a cluster of a plurality of communication devices, wherein the communication device is a member of the cluster.

In Example 311, the subject matter of Example 310 can optionally further include a receiver configured to receive a configuration message including at least one configuration parameter related to the radio communication technology transceiver to be selected by the communication device, wherein the one or more processors is configured to select the radio communication technology transceiver based on the at least one configuration parameter.

In Example 312, the subject matter of any one of Examples 310 or 311 can optionally further include a narrowband radio communication technology transceiver.

In Example 313, the subject matter of Example 312 can optionally include wherein the narrowband radio communication technology transceiver is configured based on a long term evolution technology.

In Example 314, the subject matter of Example 313 can optionally include wherein the narrowband radio communication technology transceiver is configured based on a long term evolution machine-type communication technology.

In Example 315, the subject matter of Example 313 can optionally include wherein the narrowband radio communication technology transceiver is configured based on a Narrowband Internet of Things communication technology.

In Example 316, the subject matter of any one of Examples 310 to 315 can optionally include wherein the short range radio communication technology transceiver is configured based on a dedicated short range communication technology.

In Example 317, the subject matter of any one of Examples 310 to 316 can optionally include wherein the cellular wide area radio communication technology transceiver is configured based on a long term evolution technology.

In Example 318, the subject matter of Example 317 can optionally include wherein the cellular wide area radio communication technology transceiver is configured based on a long term evolution V2V/V2x technology.

In Example 319, the subject matter of any one of Examples 310 to 318 can optionally include wherein the one or more processors is further configured to share, with other communication devices, synchronization information, scheduling resources, control data, and/or context.

In Example 320, the subject matter of any one of Examples 310 to 319 can optionally include wherein the one or more processors is further configured to select one radio communication technology transceiver for a communication with a communication device that is not a member of the cluster, and select another radio communication technology transceiver for a communication with a communication device that is a member of the cluster.

In Example 321, the subject matter of any one of Examples 310 to 320 can optionally include wherein the one or more processors is further configured to receive a trigger signal, and select the radio communication technology transceiver in response to the receipt of the trigger signal.

In Example 322, the subject matter of any one of Examples 310 to 321 can optionally include wherein the one or more processors is further configured to set communication parameters for the selected radio communication technology transceiver such that each of the plurality of communication devices of the cluster communicate using the set communication parameters.

In Example 323, the subject matter of any one of Examples 310 to 322 can optionally include wherein the at least one cluster communication characteristic includes at least one of an indication related to a quality of service desired for the communication within the cluster, and one or more communication parameters that are to be set within the selected radio communication technology for the communication within the cluster.

In Example 324, the subject matter of any one of Examples 310 to 323 can optionally include wherein the short range radio communication technology transceiver is configured to communicate based on a carrier sense multiple access technology, and wherein the one or more processors is further configured to select the short range radio communication technology circuit in one or more predefined windows of at least one of one or more frequency sub-bands or one or more time slots, In Example 325, the subject matter of any one of Examples 310 to 324 can optionally further include a location determiner configured to determine a geographic location of the communication device, wherein the one or more processors is further configured to select the radio communication technology based on the geographic location In Example 326, the subject matter of Example 325 can optionally include wherein the one or more processors is further configured to select the short range radio communication technology circuit or the cellular wide area radio communication technology circuit at a respectively determined location.

In Example 327, the subject matter of any one of Examples 310 to 326 can optionally further include a time determiner configured to determine a current time, wherein the one or more processors is further configured to select the radio communication technology based on the determined current time.

In Example 328, the subject matter of Example 327 can optionally include wherein the one or more processors is further configured to select the short range radio communication technology transceiver or the cellular wide area radio communication technology transceiver at a respectively determined time.

In Example 329, the subject matter of any one of Examples 310 to 328 can optionally further include one or more sensors configured to detect sensing signals to be transmitted to the one or more processors.

In Example 330, the subject matter of Example 329 can optionally include wherein the one or more processors is configured to generate a message including the sensing signals detected by the one or more sensors, and the communication device further including a transmitter configured to transmit the message to the other members of the cluster.

In Example 331, the subject matter of any one of Examples 310 to 330 can optionally further include one or more actuators driven by the circuitry.

In Example 332, the subject matter of Example 331 can optionally further include a receiver configured to receive a message including information from at least one other member of the cluster, wherein the one or more processors is configured to control the one or more actuators based on the received information.

Example 333 is a communication device, including a radio communication technology transceiver, a receiver configured to receive clustering information related to a plurality of communication devices, one or more processors configured to group at least some of the plurality of communication devices into a cluster, determine at least one cluster communication characteristic for the cluster, and generate a message including information related to the at least one cluster communication characteristic to instruct the plurality of communication devices of the cluster to select a radio communication technology transceiver from a short range radio communication technology transceiver or a cellular wide area radio communication technology transceiver to establish a cluster communication session, a transmitter configured to transmit the message to the plurality communication devices of the cluster.

In Example 334, the subject matter of Example 333 can optionally include wherein the one or more processors is further configured to change a member of the cluster during the cluster communication session, and wherein the transmitter is configured to transmit information related to the change to at least some members of the cluster.

In Example 335, the subject matter of any one of Examples 333 or 334 can optionally include wherein the message is a configuration message including at least one configuration parameter related to the radio communication technology transceiver to be selected by the communication device.

In Example 336, the subject matter of any one of Examples 333 to 335 can optionally include wherein the one or more processors is further configured to generate the message including information related to the at least one cluster communication characteristic to instruct the plurality of communication devices of the cluster to select a radio communication technology transceiver from a short range radio communication technology transceiver, a cellular wide area radio communication technology transceiver, and/or a narrowband radio communication technology transceiver to establish a cluster communication session, In Example 337, the subject matter of Example 336 can optionally include wherein the narrowband radio communication technology transceiver is configured based on a long term evolution technology.

In Example 338, the subject matter of Example 337 can optionally include wherein the narrowband radio communication technology transceiver is configured based on a long term evolution machine-type communication technology.

In Example 339, the subject matter of Example 337 can optionally include wherein the narrowband radio communication technology transceiver is configured based on a Narrowband Internet of Things communication technology.

In Example 340, the subject matter of any one of Examples 333 to 339 can optionally include wherein the short range radio communication technology transceiver is configured based on a dedicated short range communication technology.

In Example 341, the subject matter of any one of Examples 333 to 340 can optionally include wherein the cellular wide area radio communication technology transceiver is configured based on a long term evolution technology.

In Example 342, the subject matter of Example 341 can optionally include wherein the cellular wide area radio communication technology transceiver is configured based on a long term evolution V2V/V2x technology.

In Example 343, the subject matter of any one of Examples 333 to 342 can optionally include wherein the at least one cluster communication characteristic includes at least one of an indication related to a quality of service desired for the communication within the cluster, and one or more communication parameters that are to be set within the selected radio communication technology for the communication within the cluster.

In Example 344, the subject matter of any one of Examples 333 to 343 can optionally include wherein the radio communication technology transceiver of the communication device includes the short range radio communication technology transceiver, and/or the cellular wide area radio communication technology transceiver, and the generated message is sent to the plurality of communication devices using the selected transceiver.

In Example 345, the subject matter of Example 344 can optionally include wherein the radio communication technology transceiver of the communication device includes the narrowband radio communication technology circuit.

In Example 346, the subject matter of Example 344 or 345 can optionally include wherein the cluster includes the communication device.

Example 347 is a vehicle, including a communication device, including a short range radio communication technology circuit, a cellular wide area radio communication technology circuit, a circuitry configured to select a radio communication technology circuit based on at least one cluster communication characteristic of a cluster of a plurality of communication devices, wherein the communication device is a member of the cluster, and a motor to drive the vehicle.

Example 348 is a communication method for a communication device, the method including selecting a radio communication technology transceiver from a plurality of radio communication technology transceivers based on at least one cluster communication characteristic of a cluster of a plurality of communication devices, the plurality of radio communication technology transceivers including a short band radio communication technology transceiver and a cellular wide area radio communication technology transceiver, and transmitting a message with the selected radio communication technology transceiver.

In Example 349, the subject matter of Example 348 can optionally further include receiving a configuration message including at least one configuration parameter related to the radio communication technology to be selected by the communication device, wherein selecting the radio communication technology transceiver from the plurality of radio communication technology transceiver includes selecting the radio communication technology transceiver based on the at least one configuration parameter.

In Example 350, the subject matter of any one of Examples 348 or 349 can optionally include wherein the plurality of radio communication technology transceivers include a narrowband radio communication technology circuit.

In Example 351, the subject matter of Example 350 can optionally include wherein the narrowband radio communication technology transceiver is configured based on a long term evolution technology.

In Example 352, the subject matter of Example 351 can optionally include wherein the narrowband radio communication technology transceiver is configured based on a long term evolution machine-type communication technology.

In Example 353, the subject matter of Example 351 can optionally include wherein the narrowband radio communication technology circuit is configured based on a Narrowband Internet of Things communication technology.

In Example 354, the subject matter of any one of Examples 348 to 353 can optionally include wherein the short range radio communication technology transceiver is configured based on a dedicated short range communication technology.

In Example 355, the subject matter of any one of Examples 348 to 354 can optionally include wherein the cellular wide area radio communication technology transceiver is configured based on a long term evolution technology.

In Example 356, the subject matter of Example 355 can optionally include wherein the cellular wide area radio communication technology transceiver is configured based on a long term evolution V2V/V2x technology.

In Example 357, the subject matter of any one of Examples 348 to 356 can optionally further include sharing, with other communication devices, synchronization information, scheduling resources, control data, and/or context.

In Example 358, the subject matter of any one of Examples 348 to 357 can optionally further include selecting one radio communication technology transceiver for a communication with a communication device that is not a member of the cluster, and selecting radio communication technology transceiver for a communication with a communication device that is a member of the cluster.

In Example 359, the subject matter of any one of Examples 348 to 358 can optionally further include receiving a trigger signal, wherein selecting the radio communication technology transceiver from the plurality of radio communication technology transceiver includes selecting the radio communication technology transceiver in response to the receipt of the trigger signal.

In Example 360, the subject matter of any one of Examples 348 to 359 can optionally further include setting communication parameters for the selected radio communication technology transceiver such that each of the plurality of communication devices of the cluster communicate using the set communication parameters.

In Example 361, the subject matter of any one of Examples 348 to 360 can optionally include wherein the at least one cluster communication characteristic includes at least one of an indication related to a quality of service desired for the communication within the cluster, and one or more communication parameters that are to be set within the selected radio communication technology for the communication within the cluster.

In Example 362, the subject matter of any one of Examples 348 to 361 can optionally further include selecting the short range radio communication technology transceiver in one or more predefined windows of at least one of one or more frequency sub-bands or one or more time slots, wherein the short range radio communication technology transceiver is configured to communicate based on a carrier sense multiple access technology.

In Example 363, the subject matter of any one of Examples 348 to 362 can optionally further include determining a geographic location of the communication device, selecting the radio communication technology transceiver based on the geographic location.

In Example 364, the subject matter of Example 363 can optionally further include select the short range radio communication technology transceiver or the cellular wide area radio communication technology transceiver at a respectively determined location.

In Example 365, the subject matter of any one of Examples 348 to 364 can optionally further include determining a current time, and select the radio communication technology transceiver based on the determined current time.

In Example 366, the subject matter of Example 365 can optionally include wherein selecting the radio communication technology transceiver from the plurality of radio communication technology transceiver includes selecting the short range radio communication technology circuit or the cellular wide area radio communication technology circuit at a respectively determined time.

In Example 367, the subject matter of any one of Examples 348 to 366 can optionally further include detecting sensing signals to be transmitted to the circuitry.

In Example 368, the subject matter of Example 367 can optionally further include generating a message including the sensing signals detected by the one or more sensors, and transmitting the message to the other members of the cluster.

In Example 369, the subject matter of any one of Examples 348 to 368 can optionally further include driving one or more actuators.

In Example 370, the subject matter of Example 369 can optionally further include receiving a message including information from at least one other member of the cluster, and controlling the one or more actuators based on the received information.

Example 371 is a communication method for a communication device, including receiving clustering information related to a plurality of communication devices, grouping at least some of the plurality of communication devices into a cluster, determining at least one cluster communication characteristic for the cluster, generating a message including information related to the at least one cluster communication characteristic to instruct the plurality of communication devices of the cluster to select a radio communication technology transceiver from a short range radio communication technology transceiver or a cellular wide area radio communication technology transceiver to establish a cluster communication session, and transmitting the message to the plurality of communication devices of the cluster.

In Example 372, the subject matter of Example 371 can optionally further include changing a member of the cluster during the cluster communication session, and transmitting information related to the change of the member of the cluster to at least some members of the cluster.

In Example 373, the subject matter of any one of Examples 371 or 372 can optionally include wherein the message is a configuration message including at least one configuration parameter related to the radio communication technology transceiver to be selected by the communication device.

In Example 374, the subject matter of any one of Examples 371 to 373 can optionally further include generate the message including information related to the determined at least one cluster communication characteristic to instruct the communication devices of the cluster to select a radio communication technology transceiver from a short range radio communication technology transceiver, a cellular wide area radio communication technology transceiver, and a narrowband radio communication technology transceiver to establish a cluster communication session.

In Example 375, the subject matter of Example 374 can optionally include wherein the narrowband radio communication technology transceiver is configured based on a long term evolution technology.

In Example 376, the subject matter of Example 375 can optionally include wherein the narrowband radio communication technology transceiver is configured based on a long term evolution machine-type communication technology.

In Example 377, the subject matter of Example 375 can optionally include wherein the narrowband radio communication technology transceiver is configured based on a Narrowband Internet of Things communication technology.

In Example 378, the subject matter of any one of Examples 371 to 377 can optionally include wherein the short range radio communication technology transceiver is configured based on a dedicated short range communication technology.

In Example 379, the subject matter of any one of Examples 371 to 378 can optionally include wherein the cellular wide area radio communication technology transceiver is configured based on a long term evolution technology.

In Example 380, the subject matter of Example 379 can optionally include wherein the cellular wide area radio communication technology transceiver is configured based on a long term evolution V2V/V2x technology.

In Example 381, the subject matter of any one of Examples 371 to 380 can optionally include wherein the at least one cluster communication characteristic includes at least one of an indication related to a quality of service desired for the communication within the cluster, and one or more communication parameters that are to be set within the selected radio communication technology transceiver for the communication within the cluster.

In Example 382, the subject matter of any one of Examples 368 to 381 can optionally include wherein the radio communication technology transceiver of the communication device includes the short range radio communication technology transceiver, and/or the cellular wide area radio communication technology transceiver, and the generated message is sent to the plurality of communication devices using the selected transceiver.

In Example 383, the subject matter of Example 382 can optionally include wherein the radio communication technology transceiver of the communication device includes the narrowband radio communication technology circuit.

In Example 384, the subject matter of Example 382 or 383 can optionally include wherein the cluster includes the communication device.

Example 385 is a communication method for a communication device, the method including selecting a radio communication technology transceiver from a plurality of radio communication technology transceivers based on at least one cluster communication characteristic of a cluster of a plurality of communication devices, the plurality of radio communication technology transceivers from a short range communication technology transceiver and a cellular wide area radio communication technology transceiver, wherein the communication device is a member of the cluster.

Example 386 is a computing device including one or more processors configured to perform the method of any one of Examples 348 to 385.

Example 387 is a processing circuit configured to perform the method of any one of Examples 348 to 385.

Example 388 is a non-transitory computer readable medium storing instructions that when executed by a processor cause the processor to perform the method of any one of Examples 348 to 385.

Example 389 is a non-transitory computer readable medium storing instructions that when executed by processing circuitry of a computing device cause the computing device to perform the method of any one of Examples 348 to 385.

Example 390 is a communication device for wireless communications, the communication device including a position determiner configured to determine positions for a plurality of terminal devices including a first terminal device and a second terminal device, a coordination manager configured to select the first terminal device and the second terminal device from the plurality of terminal devices based on the position of the first terminal device and the position of the second terminal device, and a communication processor configured to transmit control signaling to the first terminal device or the second terminal device to instruct the first terminal device and the second terminal device to coordinate radio measurements with each other.

In Example 391, the subject matter of Example 390 can optionally include wherein the communication processor is configured to generate the control signaling to instruct the first terminal device to perform a radio measurement and transmit the radio measurement to the second terminal device.

In Example 392, the subject matter of Example 390 can optionally include wherein the communication processor is configured to generate the control signaling to instruct the first terminal device and the second terminal device to perform duplicate radio measurements and verify the duplicate radio measurements with each other.

In Example 393, the subject matter of any one of Examples 390 to 392 can optionally include wherein the position determiner is configured to determine the position of the first terminal device by receiving a position report from the first terminal device that specifies the position of the first terminal device.

In Example 394, the subject matter of any one of Examples 390 to 393 can optionally include wherein the position determiner is configured to determine the position of the second terminal device by processing signals received from the second terminal device and estimating the position of the second terminal device based on the processing.

In Example 395, the subject matter of any one of Examples 390 to 394 can optionally include wherein the coordination manager is configured to select the first terminal device and the second terminal device from the plurality of terminal devices based on the position of the first terminal device and the position of the second terminal device being within a predefined threshold of each other.

In Example 396, the subject matter of any one of Examples 390 to 394 can optionally include wherein the coordination manager is configured to select the first terminal device and the second terminal device from the plurality of terminal devices by determining that the position of the first terminal device and the position of the second terminal device are within a predefined threshold of each other.

In Example 397, the subject matter of Example 390 can optionally include wherein the communication processor is configured to generate the control signaling to instruct the first terminal device to perform a first set of measurement tasks and the second terminal device to perform a second set of measurement tasks, and to share one or more resulting radio measurements with each other.

In Example 398, the subject matter of Example 390 can optionally include wherein the communication processor is configured to generate the control signaling to assign the first terminal device and the second terminal device to a measurement coordination group.

In Example 399, the subject matter of any one of Examples 390 to 398 can optionally include wherein the communication processor is configured to transmit the control signaling as wireless signals via a transceiver and an antenna system.

In Example 400, the subject matter of any one of Examples 390 to 398 can optionally further include a transceiver and an antenna system, and configured as a terminal device.

In Example 401, the subject matter of any one of Examples 390 to 398 can optionally be configured as a component for a terminal device.

In Example 402, the subject matter of any one of Examples 390 to 398 can optionally be configured as a core network server or edge network server.

In Example 403, the subject matter of any one of Examples 390 to 398 can optionally further include a transceiver and an antenna system, and configured as a network access node.

Example 404 is a communication device including means for determining positions for a plurality of terminal devices including a first terminal device and a second terminal device, means for selecting the first terminal device and the second terminal device from the plurality of terminal devices based on the position of the first terminal device and the position of the second terminal device, and means for transmitting control signaling to the first terminal device or the second terminal device to instruct the first terminal device and the second terminal device to coordinate radio measurements with each other.

Example 405 is a method of performing wireless communications, the method including determining positions for a plurality of terminal devices including a first terminal device and a second terminal device, selecting the first terminal device and the second terminal device from the plurality of terminal devices based on the position of the first terminal device and the position of the second terminal device, and transmitting control signaling to the first terminal device or the second terminal device to instruct the first terminal device and the second terminal device to coordinate radio measurements with each other.

In Example 406, the subject matter of Example 405 can optionally further include generating the control signaling to instruct the first terminal device to perform a radio measurement and to transmit the radio measurement to the second terminal device.

In Example 407, the subject matter of Example 405 can optionally further include generating the control signaling to instruct the first terminal device and the second terminal device to perform duplicate radio measurements and to verify the duplicate radio measurements with each other.

In Example 408, the subject matter of any one of Examples 405 to 407 can optionally include wherein determining the position of the first terminal device includes receiving a position report from the first terminal device that specifies the position of the first terminal device.

In Example 409, the subject matter of any one of Examples 405 to 408 can optionally include wherein determining the position of the second terminal device includes processing signals received from the second terminal device and estimating the position of the second terminal device.

In Example 410, the subject matter of any one of Examples 405 to 409 can optionally include wherein selecting the first terminal device and the second terminal device from the plurality of terminal devices includes selecting the first terminal device and the second terminal device based on the position of the first terminal device and the position of the second terminal device are being within a predefined threshold of each other.

In Example 411, the subject matter of any one of Examples 405 to 409 can optionally include wherein selecting the first terminal device and the second terminal device from the plurality of terminal devices includes identifying that the position of the first terminal device and the position of the second terminal device are within a predefined threshold of each other.

In Example 412, the subject matter of Example 405 can optionally further include generating the control signaling to instruct the first terminal device to perform a first set of measurement tasks and the second terminal device to perform a second set of measurement tasks, and to share one or more resulting radio measurements with each other.

In Example 413, the subject matter of Example 405 can optionally further include generating the control signaling to assign the first terminal device and the second terminal device to a measurement coordination group.

In Example 414, the subject matter of any one of Examples 405 to 413 can optionally include wherein transmitting the control signaling includes transmitting the control signaling as wireless signals via a transceiver and an antenna system.

Example 415 is a non-transitory computer readable medium storing instructions for execution by a processor that define the method of any one of Examples 405 to 414.

Example 416 is a non-transitory computer readable medium storing instructions for execution by one or more processors of a terminal device or network access node cause the terminal device or network access node to perform the method of any one of Examples 405 to 414.

Example 417 is a communication device including a memory, one or more processors, and instructions stored in the memory that when executed by the one or more processors cause the one or more processors to perform the method of any one of Examples 405 to 414.

Example 418 is a communication device including means for receiving control signaling from the controlling device that instructs the terminal device to measure a first measurement target and to share a radio measurement of the first measurement target with a second terminal device, and means for measuring the first measurement target and transmitting the radio measurement of the first measurement target to the second terminal device.

Example 419 is a method of performing wireless communications at a terminal device, the method including receiving control signaling from the controlling device that instructs the terminal device to measure a first measurement target and to share a radio measurement of the first measurement target with a second terminal device, and measuring the first measurement target and transmitting the radio measurement of the first measurement target to the second terminal device.

In Example 420, the subject matter of Example 419 can optionally include wherein the first radio measurement is a cell-specific measurement.

In Example 421, the subject matter of Example 419 can optionally include wherein the first radio measurement is a wideband radio measurement.

In Example 422, the subject matter of Example 421 can optionally include wherein the first radio measurement is part of a scan-type radio measurement.

In Example 423, the subject matter of any one of Examples 419 to 422 can optionally further include receiving a second radio measurement of a second measurement target from the second terminal device.

In Example 424, the subject matter of Example 423 can optionally further include performing a cell selection, a handover, or measurement reporting with the second radio measurement.

In Example 425, the subject matter of any one of Examples 419 to 424 can optionally further include receiving a second radio measurement of the first measurement target from the second terminal device, and to compare the first radio measurement and the second radio measurement to verify the first and second radio measurements.

In Example 426, the subject matter of any one of Examples 419 to 425 can optionally further include reporting a position of the communication device to the controlling device.

Example 427 is a non-transitory computer readable medium storing instructions for execution by a processor that define the method of any one of Examples 419 to 426.

Example 428 is a non-transitory computer readable medium storing instructions for execution by one or more processors of a terminal device or network access node cause the terminal device or network access node to perform the method of any one of Examples 419 to 426.

Example 429 is a communication device including a memory, one or more processors, and instructions stored in the memory that when executed by the one or more processors cause the one or more processors to perform the method of any one of Examples 419 to 426.

Example 430 is a communication device for wireless communications, the communication device including a communication processor configured to receive control signaling from a controlling device that instructs the communication device to measure a first measurement target and to share a first radio measurement of the first measurement target with a terminal device, a measurement engine configured to measure the first measurement target to obtain the first radio measurement.

In Example 431, the subject matter of Example 430 can optionally include wherein the communication processor is configured to transmit the first radio measurement to the terminal device after the measurement engine obtains first the radio measurement.

In Example 432, the subject matter of Example 430 or 431 can optionally include wherein the first radio measurement is a cell-specific measurement.

In Example 433, the subject matter of Example 430 or 431 can optionally include wherein the first radio measurement is a wideband radio measurement.

In Example 434, the subject matter of Example 433 can optionally include wherein the first radio measurement is part of a scan-type radio measurement.

In Example 435, the subject matter of any one of Examples 430 to 434 can optionally include wherein the communication processor is configured to receive a second radio measurement of a second measurement target from the terminal device.

In Example 436, the subject matter of Example 435 can optionally include wherein the communication processor is configured to perform a cell selection, a handover, or measurement reporting with the second radio measurement.

In Example 437, the subject matter of any one of Examples 430 to 434 can optionally include wherein the communication processor is configured to receive a second radio measurement of the first measurement target from the terminal device, and to compare the first radio measurement and the second radio measurement to verify the first radio measurement and the second radio measurement.

In Example 438, the subject matter of any one of Examples 430 to 437 can optionally include wherein the communication processor is configured to report a position of the communication device to the controlling device.

In Example 439, the subject matter of any one of Examples 430 to 438 can optionally include wherein the communication processor is configured to transmit the control signaling as wireless signals via a transceiver and an antenna system.

In Example 440, the subject matter of any one of Examples 430 to 438 can optionally further include a transceiver and an antenna system, and configured as a terminal device.

In Example 441, the subject matter of any one of Examples 430 to 438 can optionally be configured as a component for a terminal device.

Example 442 is a communication device including means for reporting a current position of a terminal device to a controlling device, receiving control signaling from the controlling device that instructs the terminal device to verify radio measurement with a second terminal device, means for measuring a first measurement target to obtain a first measurement, receiving a second measurement of the first measurement target from the second terminal device, and means for comparing the first measurement to the second measurement to verify the first measurement and the second measurement.

Example 443 is a method of performing wireless communications, the method including reporting a current position of a terminal device to a controlling device, receiving control signaling from the controlling device that instructs the terminal device to verify radio measurement with a second terminal device, measuring a first measurement target to obtain a first measurement, receiving a second measurement of the first measurement target from the second terminal device, and comparing the first measurement to the second measurement to verify the first measurement and the second measurement.

Example 444 is a communication device including means for exchanging control signaling with a second terminal device to form a measurement coordination group with the second terminal device, means for negotiating with the second terminal device to instruct a first set of measurement tasks to the terminal device, means for performing the first set measurement tasks to obtain one or more radio measurements, and means for sharing the one or more radio measurements with the second terminal device.

Example 445 is a method of performing wireless communications at terminal device, the method including exchanging control signaling with a second terminal device to form a measurement coordination group with the second terminal device, negotiating with the second terminal device to instruct a first set of measurement tasks to the terminal device, performing the first set measurement tasks to obtain one or more radio measurements, and sharing the one or more radio measurements with the second terminal device.

Example 446 is a communication device including means for performing a radio measurement of one or more network access nodes, means for triggering a cell transfer based on the radio measurement, means for determining a position of a vehicular communication device moving with the vehicular communication device, and means for transmitting a notification of the cell transfer to the vehicular communication device that specifies a latency for a latency-controlled cell transfer of the vehicular communication device.

Example 447 is a method of performing wireless communications at a vehicular communication device, the method including performing a radio measurement of one or more network access nodes, triggering a cell transfer based on the radio measurement, determining a position of a vehicular communication device moving with the vehicular communication device, and transmitting a notification of the cell transfer to the vehicular communication device that specifies a latency for a latency-controlled cell transfer of the vehicular communication device.

Example 448 is a communication device including means for receiving a notification of a cell transfer from a leader vehicular communication device, means for determining a position of the vehicular communication device relative to the leader vehicular communication device, and means for triggering a latency-controlled cell transfer based on the position.

Example 449 is a method of performing wireless communications at a vehicular communication device, the method including receiving a notification of a cell transfer from a leader vehicular communication device, determining a position of the vehicular communication device relative to the leader vehicular communication device, and triggering a latency-controlled cell transfer based on the position.

Example 450 is a communication device including means for determining positions for a plurality of terminal devices including a first terminal device and a second terminal device, means for selecting the first terminal device and the second terminal device from the plurality of terminal devices based on the position of the first terminal device and the position of the second terminal device, and means for transmitting control signaling to the first terminal device or the second terminal device to instruct the first terminal device and the second terminal device to verify radio measurement with each other.

Example 451 is a method of performing wireless communications, the method including determining positions for a plurality of terminal devices including a first terminal device and a second terminal device, selecting the first terminal device and the second terminal device from the plurality of terminal devices based on the position of the first terminal device and the position of the second terminal device, transmitting control signaling to the first terminal device or the second terminal device to instruct the first terminal device and the second terminal device to verify radio measurement with each other.

Example 452 is a communication device including means for determining positions for a plurality of terminal devices including a first terminal device and a second terminal device, means for selecting the first terminal device and the second terminal device from the plurality of terminal devices based on the position of the first terminal device and the position of the second terminal device, and means for transmitting control signaling to the first terminal device that instructs the first terminal device to perform a radio measurement and to share the radio measurement with the second terminal device.

Example 453 is a method of performing wireless communications, the method including determining positions for a plurality of terminal devices including a first terminal device and a second terminal device, selecting the first terminal device and the second terminal device from the plurality of terminal devices based on the position of the first terminal device and the position of the second terminal device, transmitting control signaling to the first terminal device that instructs the first terminal device to perform a radio measurement and to share the radio measurement with the second terminal device.

Example 454 is a non-transitory computer readable medium storing instructions for execution by a processor that define the method of any one of Examples 443 to 453.

Example 455 is a non-transitory computer readable medium storing instructions for execution by one or more processors of a terminal device or network access node cause the terminal device or network access node to perform the method of any one of Examples 443 to 453.

Example 456 is a communication device including a memory, one or more processors, and instructions stored in the memory that when executed by the one or more processors cause the one or more processors to perform the method of any one of Examples 443 to 453.

Example 457 is a communication device for wireless communications, the communication device including a measurement engine configured to perform a radio measurement of a network access node, and a communication processor configured to perform a cell transfer based on the radio measurement, and to transmit a notification of the cell transfer to a terminal device moving with the communication device.

In Example 458, the subject matter of Example 457 can optionally further include a position determiner configured to determine a position of the communication device, wherein the communication processor is configured to transmit the position with the notification.

In Example 459, the subject matter of Example 457 can optionally further include a position determiner configured to determine a position of the terminal device relative to the communication device, wherein the communication processor is configured to determine a latency for the terminal device to use for a latency-controlled handover and to transmit the latency with the notification.

In Example 460, the subject matter of any one of Examples 457 to 459 can optionally include wherein the network access node is a serving network access node of the communication device, and wherein the communication processor is configured to perform the cell transfer from the serving network access node to a neighboring network access node.

In Example 461, the subject matter of any one of Examples 457 to 460 can optionally include wherein the communication processor is configured to perform the cell transfer based on the radio measurement by comparing the radio measurement to a triggering threshold and triggering the cell transfer based on whether the radio measurement is above or below the triggering threshold.

In Example 462, the subject matter of any one of Examples 457 to 460 can optionally include wherein the communication processor is configured to perform the cell transfer based on the radio measurement by reporting the radio measurement to a serving network access node and receiving a cell transfer command in response.

In Example 463, the subject matter of any one of Examples 457 to 462 can optionally further include a transceiver, antenna system, and steering and movement system, and configured as a vehicular communication device.

In Example 464, the subject matter of any one of Examples 457 to 462 can optionally be configured as a communication subsystem component for a vehicular communication device.

Example 465 is a communication device including means for performing a radio measurement of a network access node, means for performing a cell transfer based on the radio measurement, and means for transmitting a notification of the cell transfer to a second vehicular communication device moving with the vehicular communication device.

Example 466 is a method of performing wireless communications at a vehicular communication device, the method including performing a radio measurement of a network access node, performing a cell transfer based on the radio measurement, and transmitting a notification of the cell transfer to a second vehicular communication device moving with the vehicular communication device.

In Example 467, the subject matter of Example 466 can optionally further include determining a position of the vehicular communication device and transmitting the position with the notification.

In Example 468, the subject matter of Example 466 can optionally further include determining a position of the second vehicular communication device relative to the vehicular communication device, determining a latency for the second vehicular communication device to use for a latency-controlled handover, and transmitting the latency with the notification.

In Example 469, the subject matter of any one of Examples 466 to 468 can optionally include wherein the network access node is a serving network access node of the communication device, and wherein performing the cell transfer includes performing the cell transfer from the serving network access node to a neighboring network access node.

In Example 470, the subject matter of any one of Examples 466 to 469 can optionally include wherein performing the cell transfer includes comparing the radio measurement to a triggering threshold and triggering the cell transfer based on whether the radio measurement is above or below the triggering threshold.

In Example 471, the subject matter of any one of Examples 466 to 469 can optionally include wherein performing the cell transfer includes reporting the radio measurement to a serving network access node and receiving a cell transfer command in response.

Example 472 is a non-transitory computer readable medium storing instructions for execution by a processor that define the method of any one of Examples 466 to 471.

Example 473 is a non-transitory computer readable medium storing instructions for execution by one or more processors of a terminal device or network access node cause the terminal device or network access node to perform the method of any one of Examples 466 to 471.

Example 474 is a communication device including a memory, one or more processors, and instructions stored in the memory that when executed by the one or more processors cause the one or more processors to perform the method of any one of Examples 466 to 471.

Example 475 is a communication device including a communication processor configured to receive a first substream on a first wireless carrier operated by a first network operator and to a receive a second substream on a second wireless carrier operated by a second network operator, and a substream combiner configured to recombine the first substream and the second substream to recover a data stream originating from a data network.

In Example 476, the subject matter of Example 475 can optionally be configured as a communication subcomponent for a terminal device.

In Example 477, the subject matter of Example 475 can optionally further include a radio transceiver, one or more antennas, and configured as a terminal device.

In Example 478, the subject matter of Example 477 can optionally include wherein the radio transceiver and the one or more antennas are configured to receive wireless signals on multiple wireless carriers simultaneously.

In Example 479, the subject matter of Example 475 can optionally include wherein the communication processor is configured to receive the first substream and the second substream with a radio transceiver and one or more antennas.

In Example 480, the subject matter of any one of Examples 475 to 479 can optionally include wherein the data stream is data from a single data connection between the terminal device and the data network.

In Example 481, the subject matter of any one of Examples 475 to 480 can optionally include wherein the communication processor is configured to receive the first substream over a first data subconnection with the data network that includes the first wireless carrier, and to receive the second substream over a second data subconnection with a separation node that includes the second wireless carrier.

In Example 482, the subject matter of Example 481 can optionally include wherein the separation node is a control server in a core network of the first network operator.

In Example 483, the subject matter of Example 481 can optionally include wherein the separation node is a network access node of the first network operator or an edge server that interfaces with a network access node of the first network operator.

In Example 484, the subject matter of Example 481 can optionally include wherein the separation node is the data network.

In Example 485, the subject matter of Example 484 can optionally include wherein the first data subconnection is an end-to-end connection between the communication processor and the data network and the second data subconnection is an end-to-end connection between the communication processor and the data network.

In Example 486, the subject matter of any one of Examples 481 to 484 can optionally include wherein the first data subconnection is an end-to-end connection between the communication processor and the data network.

In Example 487, the subject matter of any one of Examples 475 to 486 can optionally include wherein the data network is a packet data network (PDN) that is external to the first network operator and the second network operator.

In Example 488, the subject matter of any one of Examples 475 to 487 can optionally include wherein the communication processor includes physical layer circuitry and a protocol processor.

In Example 489, the subject matter of any one of Examples 475 to 488 can optionally include wherein the communication processor is further configured to select the first wireless carrier and the second wireless carrier from a plurality of wireless carriers.

In Example 490, the subject matter of any one of Examples 475 to 489 can optionally include wherein the communication processor is configured to evaluate carrier characteristics of a plurality of wireless carriers in comparison to target characteristics of the data stream, and to select the first wireless carrier and the second wireless carrier from the plurality of wireless carriers based on the evaluation.

In Example 491, the subject matter of Example 490 can optionally include wherein the carrier characteristics include a wireless network of a wireless carrier, a frequency band of wireless carrier, a network load of a wireless carrier, radio access conditions of a wireless carrier, a radio access technology of a wireless carrier, a bandwidth of a wireless carrier, a geographic availability of a wireless carrier, a latency of a wireless carrier, or a reliability of a wireless carrier.

In Example 492, the subject matter of Example 489 or 490 can optionally include wherein the communication processor is configured to select the first wireless carrier as a primary carrier and to select the second wireless carrier as a secondary carrier.

In Example 493, the subject matter of any one of Examples 475 to 492 can optionally include wherein the communication processor is configured to request a visitor terminal identifier from the second network operator to use for inter-operator carrier aggregation.

In Example 494, the subject matter of any one of Examples 475 to 493 can optionally include wherein the communication processor is configured to recombine the first substream and the second substream at a protocol stack layer.

In Example 495, the subject matter of Example 494 can optionally include wherein the communication processor is configured to recombine the first substream and the second substream at the Media Access Control (MAC) layer.

In Example 496, the subject matter of any one of Examples 475 to 493 can optionally include wherein the communication processor is configured to recombine the first substream and the second substream at a transport layer.

In Example 497, the subject matter of any one of Examples 475 to 493 can optionally include wherein the communication processor is configured to recombine the first substream and the second substream at an application layer.

In Example 498, the subject matter of any one of Examples 475 to 493 can optionally include wherein the communication processor is configured to provide the data stream to an application layer of the communication device.

In Example 499, the subject matter of any one of Examples 475 to 498 can optionally include wherein the communication processor is configured to receive the first substream on the first wireless carrier from a first network access node operated by the first network operator, and to receive the second substream on the second wireless carrier from a second network access node operated by the second network operator.

Example 500 is a communication device including a substream separator configured to separate a data stream designated for a data network into a first substream and a second substream, a communication processor configured to transmit the first substream on a first wireless carrier operated by a first network operator and to transmit the second substream on a second wireless carrier operated by a second network operator.

In Example 501, the subject matter of Example 500 can optionally be configured as a communication subcomponent for a terminal device.

In Example 502, the subject matter of Example 500 can optionally further include a radio transceiver and one or more antennas and configured as a terminal device.

In Example 503, the subject matter of Example 502 can optionally include wherein the radio transceiver and the one or more antennas are configured to transmit wireless signals on multiple wireless carriers simultaneously.

In Example 504, the subject matter of Example 500 can optionally include wherein the communication processor is configured to transmit the first substream on the first wireless carrier and the second substream on the second wireless carrier with a radio transceiver and one or more antennas.

In Example 505, the subject matter of any one of Examples 500 to 504 can optionally include wherein the data stream is data from a single data connection between the terminal device and the data network.

In Example 506, the subject matter of any one of Examples 500 to 505 can optionally include wherein the communication processor is configured to transmit the first substream over a first data subconnection with the data network that includes the first wireless carrier, and to transmit the second substream over the second data subconnection with a separation node that includes second wireless carrier.

In Example 507, the subject matter of Example 506 can optionally include wherein the separation node is a control server in a core network of the first network operator.

In Example 508, the subject matter of Example 506 can optionally include wherein the separation node is a network access node of the first network operator or an edge server that interfaces with a network access node of the first network operator.

In Example 509, the subject matter of Example 506 can optionally include wherein the separation node is the data network.

In Example 510, the subject matter of Example 509 can optionally include wherein the first data subconnection is an end-to-end connection between the communication processor and the data network and the second data subconnection is an end-to-end connection between the communication processor and the data network.

In Example 511, the subject matter of any one of Examples 506 to 510 can optionally include wherein the first data subconnection is an end-to-end connection between the communication processor and the data network.

In Example 512, the subject matter of any one of Examples 500 to 511 can optionally include wherein the data network is a packet data network (PDN) that is external to the first network operator and the second network operator.

In Example 513, the subject matter of any one of Examples 500 to 512 can optionally include wherein the communication processor includes physical layer circuitry and a protocol processor.

In Example 514, the subject matter of any one of Examples 500 to 513 can optionally include wherein the communication processor is further configured to select the first wireless carrier and the second wireless carrier from a plurality of wireless carriers.

In Example 515, the subject matter of any one of Examples 500 to 514 can optionally include wherein the communication processor is configured to evaluate carrier characteristics of a plurality of wireless carriers in comparison to target characteristics of the data stream, and to select the first wireless carrier and the second wireless carrier from the plurality of wireless carriers based on the evaluation.

In Example 516, the subject matter of Example 515 can optionally include wherein the carrier characteristics include a wireless network of a wireless carrier, a frequency band of wireless carrier, a network load of a wireless carrier, radio access conditions of a wireless carrier, a radio access technology of a wireless carrier, a bandwidth of a wireless carrier, a geographic availability of a wireless carrier, a latency of a wireless carrier, or a reliability of a wireless carrier.

In Example 516, the subject matter of Example 516 or 517 can optionally include wherein the communication processor is configured to select the first wireless carrier as a primary carrier and to select the second wireless carrier as a secondary carrier.

In Example 518, the subject matter of any one of Examples 500 to 517 can optionally include wherein the communication processor is configured to request a visitor terminal identifier from the second network operator to use for inter-operator carrier aggregation.

In Example 519, the subject matter of any one of Examples 500 to 518 can optionally include wherein the communication processor is configured to separate the data stream into the first substream and the second substream at a protocol stack layer.

In Example 520, the subject matter of Example 519 can optionally include wherein the communication processor is configured to separate the data stream into the first substream and the second substream at the Media Access Control (MAC) layer.

In Example 521, the subject matter of any one of Examples 500 to 518 can optionally include wherein the communication processor is configured to separate the data stream into the first substream and the second substream at a transport layer.

In Example 522, the subject matter of any one of Examples 500 to 518 can optionally include wherein the communication processor is configured to separate the data stream into the first substream and the second substream at an application layer.

In Example 523, the subject matter of any one of Examples 500 to 518 can optionally include wherein the communication processor is configured to receive the data stream from an application layer of the communication device.

In Example 524, the subject matter of any one of Examples 500 to 523 can optionally include wherein the communication processor is configured to transmit the first substream on the first wireless carrier to a first network access node operated by the first network operator, and to transmit the second substream on the second wireless carrier to a second network access node operated by the second network operator.

Example 525 is a network communication device including a stream controller configured to separate a data stream designated for a terminal device into a first substream and a second substream, a routing processor configured to route the first substream to the terminal device via a first wireless network and to route the second substream to the terminal device via a second wireless network, where the first wireless network and the second wireless network are operated by different network operators.

In Example 526, the subject matter of Example 525 can optionally include wherein the routing processor is configured to route the first substream to the terminal device over a first data subconnection that includes a wireless carrier provided by the first wireless network, and to route the second substream to the terminal device over a second data subconnection that includes a wireless carrier provided by the second wireless network.

In Example 527, the subject matter of Example 526 can optionally include wherein the routing processor is further configured to establish the first and second data subconnections with the terminal device prior to routing the first and second substreams to the terminal device, determine first routing parameters for the first data subconnection and second routing parameters for the second data subconnection based on the establishment of the first and second data subconnections, and route the first and second substreams to the terminal device based on the first and second routing parameters.

In Example 528, the subject matter of Example 527 can optionally include wherein the first routing parameters indicate a node of the first wireless network that is part of the first data subconnection and wherein the routing processor is configured to transmit the first substream to the node.

In Example 529, the subject matter of Example 525 can optionally include wherein the routing processor is configured to route the first substream to a core network of the first wireless network and to route the second substream to a core network of the second wireless network.

In Example 530, the subject matter of Example 529 can optionally include wherein the stream controller is configured to separate the data stream into the first substream and the second substream at an application layer.

In Example 531, the subject matter of Example 529 can optionally include wherein the stream controller is configured to separate the data stream into the first substream and the second substream at a transport layer.

In Example 532, the subject matter of any one of Examples 529 to 531 can optionally include wherein the routing processor is configured to route the first substream to the terminal device via the first wireless network over a first end-to-end connection between the routing processor and the terminal device, and configured to route the second substream to the terminal device via the second wireless network over a second end-to-end connection between the routing processor and the terminal device.

In Example 533, the subject matter of Example 532 can optionally include wherein the first and second end-to-end connections are application layer connections.

In Example 534, the subject matter of Example 532 can optionally include wherein the first and second end-to-end connections are transport layer connections.

In Example 535, the subject matter of any one of Examples 532 to 534 can optionally include wherein the routing processor is configured to establish the first and second end-to-end connections with the terminal device prior to routing the first and second substreams to the terminal device, determine first routing parameters for the first end-to-end connection and second routing parameters for the second end-to-end connection based on the establishment of the first and second end-to-end connections, and route the first and second substreams to the terminal device based on the first and second routing parameters.

In Example 536, the subject matter of Example 535 can optionally include wherein the first routing parameters indicate a node of the first wireless network that is part of the first end-to-end connection and wherein the routing processor is configured to transmit the first substream to the node.

In Example 537, the subject matter of Example 525 can optionally include wherein the routing processor is configured to receive the data stream from a data network external to the first wireless network, and to route the first substream to a radio access network of the first wireless network and the second substream to a core network of the second wireless network.

In Example 538, the subject matter of Example 537 can optionally be configured as a core network control sever.

In Example 539, the subject matter of Example 537 or 538 can optionally include wherein the routing processor is configured to route the second substream to a control server in the core network of the second wireless network.

In Example 540, the subject matter of Example 539 can optionally include wherein the routing processor is configured to route the second substream to the control server in the core network of the second wireless network over a cross-bearer connecting the core network of the first wireless network with the core network of the second wireless network.

In Example 541, the subject matter of any one of Examples 537 to 540 can optionally include wherein the stream controller is configured to separate the data stream at a transport layer.

In Example 542, the subject matter of any one of Examples 537 to 540 can optionally include wherein the stream controller is configured to separate the data stream at a protocol stack layer.

In Example 543, the subject matter of any one of Examples 537 to 540 can optionally include wherein the routing processor is configured to route the first substream to the terminal device over a first data subconnection that includes a wireless carrier provided by the first wireless network, and to route the second substream to the terminal device over a second data subconnection that includes a wireless carrier provided by the second wireless network.

In Example 544, the subject matter of Example 543 can optionally include where the routing processor is configured to route the first substream to the terminal device by transmitting the first substream over the first data subconnection to a network access node of the first wireless network that provides the wireless carrier to the terminal device.

In Example 545, the subject matter of Example 525 can optionally include wherein the routing processor is configured to receive the data stream from a core network of the first wireless network, and to route the first substream to a first network access node of the first wireless network and to route the second substream to a second network access node of the second wireless network.

In Example 546, the subject matter of Example 545 can optionally include wherein the routing processor is configured to route the second substream to the second network access node by transmitting the second substream to the second network access node over a cross-bearer that connects the first wireless network and the second wireless network.

In Example 547, the subject matter of Example 545 or 546 can optionally include wherein the stream controller is configured to separate the data stream into the first substream and the second substream at a protocol stack layer.

In Example 548, the subject matter of Example 545 or 546 can optionally include wherein the stream controller is configured to separate the data stream into the first substream and the second stream at a Media Access Control (MAC) layer.

In Example 549, the subject matter of any one of Examples 545 to 548 can optionally include wherein the routing processor is configured to route the first substream to the terminal device over a first data subconnection that includes a wireless carrier provided by the first network access node, and to route the second substream to the terminal device over a second data subconnection that includes a wireless carrier provided by the second network access node.

In Example 550, the subject matter of any one of Examples 545 to 549 can optionally include wherein the network communication device is configured as a subcomponent for the first network access node.

In Example 551, the subject matter of Example 550 can optionally include wherein the routing processor is configured to provide the first substream to baseband layers of the first network access node.

In Example 552, the subject matter of any one of Examples 545 to 549 can optionally include wherein the network communication device is configured as an edge network server.

In Example 553, the subject matter of Example 525 can optionally further include a transceiver, one or more antennas, and configured as a network access node.

In Example 554, the subject matter of Example 553 can optionally include wherein the routing processor is configured to receive the data stream from a core network of the first wireless network, and to route the first substream to the terminal device by transmitting the first substream to the terminal device over a first wireless carrier with the transceiver and the one or more antennas.

In Example 555, the subject matter of Example 554 can optionally include wherein the routing processor is configured to route the second substream to a network access node of the second wireless network.

In Example 556, the subject matter of Example 555 can optionally include wherein the routing processor is configured to route the second substream to the network access node of the second wireless network over a cross-bearer between the network communication device and the network access node of the second wireless network.

Example 557 is a network communication device including a routing processor configured to receive a first substream from a terminal device via a first wireless network operated by a first network operator and to receive a second substream from the terminal device via a second wireless network operated by a second network operator, and a stream controller configured to recombine the first substream and the second substream to recover a data stream originating at the terminal device.

In Example 558, the subject matter of Example 557 can optionally include wherein the routing processor is configured to receive the first substream over a first data subconnection with the terminal device that includes a wireless carrier provided by the first wireless network, and to receive the second substream over a second data subconnection with the terminal device that includes a wireless carrier provided by the second wireless network.

In Example 559, the subject matter of Example 558 can optionally include wherein the routing processor is further configured to establish the first and second data subconnections with the terminal device prior to routing the first and second substreams to the terminal device, determine first routing parameters for the first data subconnection and second routing parameters for the second data subconnection based on the establishment of the first and second data subconnections, and receive the first and second substreams from the terminal device on the first and second data subconnections based on the first and second routing parameters.

In Example 560, the subject matter of Example 559 can optionally include wherein the first routing parameters indicate a node of the first wireless network that is part of the first data subconnection and wherein the routing processor is configured to receive the first substream from the node.

In Example 561, the subject matter of Example 558 can optionally include wherein the routing processor is configured to receive the first substream from the terminal device over a first data subconnection including a core network of the first wireless network, and to receive the second substream from the terminal device over a second data subconnection including a core network of the second wireless network.

In Example 562, the subject matter of Example 561 can optionally include wherein the stream controller is configured to recombine the first substream and the second substream at an application layer.

In Example 563, the subject matter of Example 561 can optionally include wherein the stream controller is configured to recombine the first substream and the second substream at a transport layer.

In Example 564, the subject matter of any one of Examples 561 to 563 can optionally include wherein the first data subconnection is an end-to-end connection between the routing processor and the terminal device over the first wireless network, and wherein the second data subconnection is an end-to-end connection between the routing processor and the terminal device over the second wireless network.

In Example 565, the subject matter of Example 564 can optionally include wherein the first and second data subconnections are application layer connections.

In Example 566, the subject matter of Example 564 can optionally include wherein the first and second data subconnections are transport layer connections.

In Example 567, the subject matter of any one of Examples 561 to 566 can optionally include wherein the routing processor is further configured to establish the first and second data subconnections with the terminal device prior to receiving the first and second substreams from the terminal device, determine first routing parameters for the first data subconnection and second routing parameters for the second data subconnection based on the establishment of the first and second data subconnections, and receive the first and second substreams from the terminal device via the first and second wireless networks based on the first and second routing parameters.

In Example 568, the subject matter of Example 567 can optionally include wherein the first routing parameters indicate a node of the first wireless network that is part of the first data subconnection, and wherein the routing processor is configured to receive the first substream from the node.

In Example 569, the subject matter of Example 557 can optionally include wherein the routing processor is configured to receive the first substream from a radio access network of the first wireless network and to receive the second substream from a radio access network of the second wireless network, and further configured to transmit the data stream to a data network external to the first wireless network.

In Example 570, the subject matter of Example 569 can optionally be configured as a core network control server.

In Example 571, the subject matter of Example 569 or 570 can optionally include wherein the routing processor is configured to receive the second substream from a control server in the core network of the second wireless network.

In Example 572, the subject matter of Example 571 can optionally include wherein the routing processor is configured to receive the second substream from the control server in the core network of the second wireless network over a cross-bearer connecting the core network of the first wireless network with the core network of the second wireless network.

In Example 573, the subject matter of any one of Examples 569 to 572 can optionally include wherein the stream controller is configured to recombine the first and second substreams to recover the data stream at a transport layer.

In Example 574, the subject matter of any one of Examples 569 to 572 can optionally include wherein the stream controller is configured to recombine the first and second substreams to recover the data stream at a protocol stack layer.

In Example 575, the subject matter of any one of Examples 569 to 572 can optionally include wherein the routing processor is configured to receive the first substream from the terminal device over a first data subconnection that includes a wireless carrier provided by the first wireless network, and to receive the second substream from the terminal device over a second data subconnection that includes a wireless carrier provided by the second wireless network.

In Example 576, the subject matter of Example 557 can optionally include wherein the routing processor is configured to receive the first substream from a first network access node of the first wireless network and to receive the second substream from a second network access node of the second wireless network, and further configured to transmit the data stream to a core network of the first wireless network.

In Example 577, the subject matter of Example 576 can optionally include wherein the routing processor is configured to receive the second substream from the second network access node by receiving the second substream from the second network access node over a cross-bearer that connects the first wireless network and the second wireless network.

In Example 578, the subject matter of Example 577 can optionally include wherein the stream controller is configured to recombine the first and second substreams to recover the data stream at a protocol stack layer.

In Example 579, the subject matter of Example 577 can optionally include wherein the stream controller is configured to recombine the first and second substreams to recover the data stream at a Media Access Control (MAC) layer.

In Example 580, the subject matter of any one of Examples 576 to 579 can optionally include wherein the routing processor is configured to receive the first substream from the terminal device over a first data subconnection that includes a wireless carrier provided by the first network access node, and to receive the second substream from the terminal device over a second subconnection that includes a wireless carrier provided by the second network access node.

In Example 581, the subject matter of any one of Examples 576 to 580 can optionally include wherein the network communication device is configured as a subcomponent for the first network access node.

In Example 582, the subject matter of Example 581 can optionally include wherein the routing processor is configured to receive the first substream from a baseband layer of the first network access node.

In Example 583, the subject matter of any one of Examples 576 to 580 can optionally be configured as an edge network server.

In Example 584, the subject matter of Example 557 can optionally further include a transceiver, one or more antennas, and configured as a network access node.

In Example 585, the subject matter of Example 584 can optionally include wherein the routing processor is configured to receive the data stream from the terminal device over a wireless carrier via the transceiver and the one or more antennas, and to provide the data stream to a core network of the first wireless network.

In Example 586, the subject matter of Example 585 can optionally include wherein the routing processor is configured to receive the second substream from a network access node of the second wireless network.

In Example 587, the subject matter of Example 586 can optionally include wherein the routing processor is configured to receive the second substream from the network access node of the second wireless network over a cross-bearer between the network communication device and the network access node of the second wireless network.

Example 588 is a communication device including means for receiving a first substream on a first wireless carrier operated by a first network operator, means for receiving a second substream on a second wireless carrier operated by a second network operator, and means for recombining the first substream and the second substream to recover a data stream originating from a data network.

Example 589 is a method of transporting data across wireless networks, the method including receiving a first substream on a first wireless carrier operated by a first network operator, receiving a second substream on a second wireless carrier operated by a second network operator, and recombining the first substream and the second substream to recover a data stream originating from a data network.

Example 590 is a communication device including means for separating a data stream designated for a data network into a first substream and a second substream, means for transmitting the first substream on a first wireless carrier operated by a first network operator, and means for transmitting the second substream on a second wireless carrier operated by a second network operator.

Example 591 is a method of transporting data across wireless networks, the method including separating a data stream designated for a data network into a first substream and a second substream, transmitting the first substream on a first wireless carrier operated by a first network operator, and transmitting the second substream on a second wireless carrier operated by a second network operator.

Example 592 is a communication device including means for separating a data stream designated for a terminal device into a first substream and a second substream, means for routing the first substream to a terminal device via a first wireless network, and means for routing the second substream to the terminal device via a second wireless network, wherein the first wireless network and the second wireless network are operated by different network operators.

Example 593 is a method of transporting data across wireless networks, the method including separating a data stream designated for a terminal device into a first substream and a second substream, routing the first substream to a terminal device via a first wireless network, and routing the second substream to the terminal device via a second wireless network, wherein the first wireless network and the second wireless network are operated by different network operators.

Example 594 is a communication device including means for receiving a first substream from a terminal device via a first wireless network operated by a first network operator, means for receiving a second substream from the terminal device via a second wireless network operated by a second network operator, and means for recombining the first substream and the second substream to recover a data stream originating at the terminal device.

Example 595 is a method of transporting data across wireless networks, the method including receiving a first substream from a terminal device via a first wireless network operated by a first network operator, receiving a second substream from the terminal device via a second wireless network operated by a second network operator, and recombining the first substream and the second substream to recover a data stream originating at the terminal device.

Example 596 is a non-transitory computer readable medium storing instructions for execution by a processor that define the method of any one of Examples 589 to 595.

Example 597 is a communication device including a memory, one or more processors, instructions stored in the memory that are executable by the one or more processors to perform the method of any one of Examples 589 to 595.

Example 598 is a communication device including a wideband processor configured to receive a composite signal including a wideband signal from a first communication device and a narrowband signal from a second communication device, and to process the composite signal to separate the wideband signal and the narrowband signal, a narrowband processor configured to recover narrowband data from the narrowband signal including coexistence information, and a coexistence controller configured to control the wideband processor to coordinate transmission or reception activity with the second communication device based on the coexistence information.

In Example 599, the subject matter of Example 598 can optionally include wherein the narrowband signal overlaps one or more subcarriers of the wideband signal.

In Example 600, the subject matter of Example 599 can optionally include wherein the narrowband signal overlaps one or more edge subcarriers or one or more Direct Current (DC) subcarriers of the wideband signal.

In Example 601, the subject matter of Example 599 can optionally include wherein the narrowband signal overlaps one or more null subcarriers of the wideband signal.

In Example 602, the subject matter of Example 598 can optionally include wherein the narrowband signal overlaps a subband of used spectrum of the wideband signal.

In Example 603, the subject matter of any one of Examples 598 to 602 can optionally further include a canceler configured to perform interference cancellation on the composite signal to remove the narrowband signal and obtain the wideband signal, and a separator configured to remove the wideband signal from the composite signal to obtain the narrowband signal.

In Example 604, the subject matter of Example 603 can optionally include wherein the canceler is configured to perform spurious interference mitigation to remove the narrowband signal from the composite signal.

In Example 605, the subject matter of Example 603 can optionally include wherein the wideband processor is configured to decode and error-correct the wideband signal to recover wideband data, and to reconstruct the wideband signal from the wideband data to obtain a reconstructed wideband signal, and wherein the separator is configured to remove the wideband signal from the composite signal to obtain the narrowband signal by removing the reconstructed wideband signal from the composite signal to obtain the narrowband signal.

In Example 606, the subject matter of Example 605 can optionally include wherein the narrowband processor and the wideband processor are configured to alternate between decoding and error-correcting, reconstructing, and removing the narrowband signal and the wideband signal from the composite signal as part of a Successive Interference Cancellation (SIC) procedure.

In Example 607, the subject matter of any one of Examples 598 to 605 can optionally include wherein the wideband processor is configured to identify narrowband spectrum of the narrowband signal within the composite signal based on narrowband control data, and to separate the wideband signal and the narrowband signal from the composite signal using the narrowband spectrum.

In Example 608, the subject matter of Example 607 can optionally include wherein the narrowband processor is configured to receive the narrowband control data from the second communication device before receipt of the composite signal.

In Example 609, the subject matter of Example 608 can optionally include wherein the narrowband processor is configured to receive the narrowband control data as a narrowband signal.

In Example 610, the subject matter of any one of Examples 598 to 609 can optionally include wherein the narrowband processor is configured to transmit narrowband control data to the second communication device that identifies spectrum to use for the narrowband signal or that includes a channel fading profile of the wideband signal.

In Example 611, the subject matter of any one of Examples 598 to 605 can optionally include wherein the wideband processor is configured to perform blind detection on the composite signal to search for an identifying sequence of the narrowband signal in the composite signal.

In Example 612, the subject matter of Example 611 can optionally include wherein the wideband processor is configured to identify narrowband spectrum of the narrowband spectrum based on the blind detection, and to process the composite signal to separate the wideband signal and the narrowband signal using the narrowband spectrum.

In Example 613, the subject matter of any one of Examples 598 to 612 can optionally include wherein the narrowband processor is configured to generate an outgoing narrowband signal with coexistence information from the wideband processor, and to transmit the outgoing narrowband signal to the second communication device.

In Example 614, the subject matter of any one of Examples 598 to 613 can optionally include wherein the coexistence information includes time or frequency synchronization information, a transmission or reception schedule, or channel estimation information.

In Example 615, the subject matter of any one of Examples 598 to 614 can optionally include wherein the coexistence information includes time or frequency synchronization information, and wherein the coexistence controller is configured to control the wideband processor to update a timing reference or a carrier frequency to synchronize with the second communication device.

In Example 616, the subject matter of any one of Examples 598 to 615 can optionally include wherein the coexistence information includes a transmission or reception schedule that specifies spectrum with which the second communication device is scheduled to transmit or receive, and wherein the coexistence controller is configured to control the wideband processor to schedule its transmission or reception activity based on the transmission or reception schedule.

In Example 617, the subject matter of any one of Examples 598 to 615 can optionally include wherein the coexistence information includes a transmission or reception schedule that specifies time points at which the second communication device is scheduled to transmit or receive, and wherein the coexistence controller is configured to control the wideband processor to schedule transmission or reception activity based on the transmission or reception schedule.

In Example 618, the subject matter of any one of Examples 598 to 617 can optionally include wherein the coexistence information includes channel estimation information, and wherein the coexistence controller is configured to control the wideband processor to schedule transmission or reception activity on spectrum based on the channel estimation information.

In Example 619, the subject matter of any one of Examples 598 to 618 can optionally include wherein the wideband processor is configured to transmit and receive with a different radio communication technology from the second communication device.

In Example 620, the subject matter of any one of Examples to 619, can optionally include the wideband processor and the narrowband processor are configured to transmit and receive signals via a radio transceiver and one or more antennas.

In Example 621, the subject matter of any one of Examples 598 to 620 can optionally further include a radio transceiver and one or more antennas, and configured as a terminal device or a network access node.

In Example 622, the subject matter of any one of Examples 598 to 620 can optionally be configured as a subcomponent for a terminal device or a network access node.

Example 623 is a communication device including a narrowband processor configured to select narrowband spectrum from a wideband signal frequency band of a communication device, and a coexistence controller configured to generate coexistence information based on transmission or reception activity of a wideband processor, the narrowband processor further configured to generate and transmit a narrowband signal including the coexistence information on the narrowband spectrum.

In Example 624, the subject matter of Example 623 can optionally include wherein the narrowband processor is configured to select one or more subcarriers of the wideband signal frequency band as the narrowband spectrum.

In Example 625, the subject matter of Example 623 can optionally include wherein the narrowband processor is configured to select one or more edge subcarriers or one or more Direct Current (DC) subcarriers of the wideband signal frequency band as the narrowband spectrum.

In Example 626, the subject matter of Example 623 can optionally include wherein the narrowband processor is configured to select one or more null subcarriers of the wideband signal frequency band as the narrowband spectrum.

In Example 627, the subject matter of any one of Examples 623 to 626 can optionally include wherein the narrowband processor is configured to receive narrowband control data including a channel fading profile of the wideband signal frequency band at the communication device, and to select spectrum of the wideband signal frequency band that exhibits deep fading as the narrowband spectrum.

In Example 628, the subject matter of any one of Examples 623 to 626 can optionally include wherein the narrowband processor is configured to receive narrowband control data identifying one or more subcarriers or a subband of the wideband signal frequency band, and to select the one or more subcarriers or the subband as the narrowband spectrum.

In Example 629, the subject matter of any one of Examples 623 to 626 can optionally include wherein the narrowband processor is configured to receive narrowband control data including a channel resource allocation of communication device, and to select one or more null subcarriers of the wideband signal frequency band as the narrowband spectrum based on the channel resource allocation.

In Example 630, the subject matter of any one of Examples 623 to 629 can optionally include wherein the coexistence information includes time or frequency synchronization information of the wideband processor, a transmission or reception schedule of the wideband processor, or channel estimation information of the wideband processor.

In Example 631, the subject matter of any one of Examples 623 to 630 can optionally include wherein the narrowband processor is configured to generate the narrowband signal to include an identifying sequence.

In Example 632, the subject matter of any one of Examples 623 to 631 can optionally include wherein the narrowband processor is configured to wirelessly transmit the narrowband signal via a radio transceiver and one or more antennas.

In Example 633, the subject matter of any one of Examples 623 to 632 can optionally further include a radio transceiver and one or more antennas, and configured as a terminal device or a network access node.

In Example 634, the subject matter of any one of Examples 623 to 633 can optionally be configured as subcomponent for a terminal device or a network access node.

Example 635 is a communication device including a narrowband processor configured to select narrowband spectrum from a wideband signal frequency band used by a communication device for wideband reception, generate a narrowband signal from narrowband data, and transmit the narrowband signal to the communication on the narrowband spectrum.

Example 636 is a communication device including a wideband processor configured to receive a composite signal including a wideband signal from a first communication device and a narrowband signal from a second communication device, a canceler configured to cancel the narrowband signal from the composite signal as interference to obtain the wideband signal, a separator configured to remove the wideband signal from the composite signal to obtain the narrowband signal, and a narrowband processor configured to process the narrowband signal to recover narrowband data from the second communication device.

Example 637 is a communication device including a wideband processor configured to receive a composite signal including a wideband signal from a first communication device and a narrowband signal from a second communication device, and to identify spectrum the narrowband signal occupies as narrowband spectrum, a separator configured to separate the narrowband signal and the wideband signal from the composite signal based on the narrowband spectrum, and a narrowband processor configured to process the narrowband signal to recover narrowband data from the second communication device.

Example 639 is a communication device including means for receiving a composite signal including a wideband signal from a first communication device and a narrowband signal from a second communication device, means for processing the composite signal to separate the wideband signal and the narrowband signal, means for recovering narrowband data from the narrowband signal including coexistence information, and means for performing wideband transmission or reception in coordination with the second communication device based on the coexistence information.

Example 638 is a method of performing wireless communications, the method including receiving a composite signal including a wideband signal from a first communication device and a narrowband signal from a second communication device, processing the composite signal to separate the wideband signal and the narrowband signal, recovering narrowband data from the narrowband signal including coexistence information, and performing wideband transmission or reception in coordination with the second communication device based on the coexistence information.

In Example 640, the subject matter of Example 638 can optionally include wherein the narrowband signal overlaps one or more subcarriers of the wideband signal.

In Example 640, the subject matter of Example 640 can optionally include wherein the narrowband signal overlaps one or more edge subcarriers or one or more Direct Current (DC) subcarriers of the wideband signal.

In Example 642, the subject matter of Example 640 can optionally include wherein the narrowband signal overlaps one or more null subcarriers of the wideband signal.

In Example 643, the subject matter of Example 638 can optionally include wherein the narrowband signal overlaps a subband of used spectrum of the wideband signal.

In Example 644, the subject matter of any one of Examples 638 to 643 can optionally include wherein processing the composite signal to separate the wideband signal and the narrowband signal includes performing interference cancellation on the composite signal to remove the narrowband signal and obtain the wideband signal, removing the wideband signal from the composite signal to obtain the narrowband signal.

In Example 645, the subject matter of Example 644 can optionally include wherein performing the interference cancellation on the composite signal to remove the narrowband signal and obtain the wideband signal includes performing spurious interference mitigation to remove the narrowband signal from the composite signal.

In Example 646, the subject matter of Example 644 can optionally include wherein removing the wideband signal from the composite signal to obtain the narrowband signal includes decoding and error-correcting the wideband signal to recover wideband data, and reconstructing the wideband signal from the wideband data to obtain a reconstructed wideband signal, and wherein removing the wideband signal from the composite signal to obtain the narrowband signal includes removing the reconstructed wideband signal from the composite signal to obtain the narrowband signal.

In Example 647, the subject matter of Example 646 can optionally further include alternating between decoding and error-correcting, reconstructing, and removing the narrowband signal and the wideband signal from the composite signal as part of a Successive Interference Cancellation (SIC) procedure.

In Example 648, the subject matter of any one of Examples 638 to 647 can optionally further include identifying narrowband spectrum of the narrowband signal within the composite signal based on narrowband control data, and wherein processing the composite signal to separate the wideband signal and the narrowband signal includes separating the wideband signal and the narrowband signal from the composite signal using the narrowband spectrum.

In Example 649, the subject matter of Example 648 can optionally further include receiving the narrowband control data from the second communication device before receiving the composite signal.

In Example 650, the subject matter of Example 649 can optionally include wherein receiving the narrowband control data from the second communication device includes receiving the narrowband control data as a narrowband signal.

In Example 651, the subject matter of any one of Examples 638 to 650 can optionally further include transmitting narrowband control data to the second communication device that identifies spectrum to use for the narrowband signal or that includes a channel fading profile of the wideband signal.

In Example 652, the subject matter of any one of Examples 638 to 647 can optionally further include performing blind detection on the composite signal to search for an identifying sequence of the narrowband signal in the composite signal.

In Example 653, the subject matter of Example 652 can optionally further include identifying narrowband spectrum based on the blind detection, wherein processing the composite signal to separate the wideband signal and the narrowband signal includes processing the composite signal to separate the wideband signal and the narrowband signal using the narrowband spectrum.

In Example 654, the subject matter of any one of Examples 638 to 653 can optionally further include generating an outgoing narrowband signal with coexistence information related to the wideband signal, and transmitting the outgoing narrowband signal to the second communication device.

In Example 655, the subject matter of any one of Examples 638 to 654 can optionally include wherein the coexistence information includes time or frequency synchronization information, a transmission or reception schedule, or channel estimation information.

In Example 656, the subject matter of any one of Examples 638 to 655 can optionally include wherein the coexistence information includes time or frequency synchronization information, and wherein performing wideband transmission or reception in coordination with the second communication device based on the coexistence information includes updating a timing reference or a carrier frequency to synchronize with the second communication device, and transmitting or receiving wideband signals with the updated timing reference or the updated carrier frequency.

In Example 657, the subject matter of any one of Examples 638 to 656 can optionally include wherein the coexistence information includes a transmission reception schedule that specifies spectrum with which the second communication device is scheduled to transmit or receive, and wherein performing wideband transmission or reception in coordination with the second communication device based on the coexistence information includes scheduling wideband transmission or reception based on the transmission or reception schedule.

In Example 658, the subject matter of any one of Examples 638 to 656 can optionally include wherein the coexistence information includes a transmission or reception schedule that specifies time points at which the second communication device is scheduled to transmit or receive, and wherein performing wideband transmission or reception in coordination with the second communication device based on the coexistence information includes scheduling wideband transmission or reception based on the transmission or reception schedule.

In Example 659, the subject matter of any one of Examples 638 to 658 can optionally include wherein the coexistence information includes channel estimation information, and wherein performing wideband transmission or reception in coordination with the second communication device based on the coexistence information includes scheduling wideband transmission or reception on spectrum based on the channel estimation information.

In Example 660, the subject matter of any one of Examples 638 to 659 can optionally include wherein receiving the composite signal includes receiving the composite signal via a radio transceiver and one or more antennas.

Example 662 is a communication device including means for receiving a composite signal including a wideband signal from a first communication device and a narrowband signal from a second communication device, means for canceling the narrowband signal from the composite signal as interference to obtain the wideband signal, means for removing the wideband signal from the composite signal to obtain the narrowband signal, and means for processing the narrowband signal to recover narrowband data from the second communication device.

Example 661 is a method of performing wireless communications, the method including receiving a composite signal including a wideband signal from a first communication device and a narrowband signal from a second communication device, canceling the narrowband signal from the composite signal as interference to obtain the wideband signal, removing the wideband signal from the composite signal to obtain the narrowband signal, and processing the narrowband signal to recover narrowband data from the second communication device.

Example 664 is a communication device including means for receiving a composite signal including a wideband signal from a first communication device and a narrowband signal from a second communication device, means for identifying spectrum that the narrowband signal occupies as narrowband spectrum, means for separating the narrowband signal and the wideband signal from the composite signal based on the narrowband spectrum, and means for processing the narrowband signal to recover narrowband data from the second communication device.

Example 663 is a method of performing wireless communications, the method including receiving a composite signal including a wideband signal from a first communication device and a narrowband signal from a second communication device, identifying spectrum that the narrowband signal occupies as narrowband spectrum, separating the narrowband signal and the wideband signal from the composite signal based on the narrowband spectrum, and processing the narrowband signal to recover narrowband data from the second communication device.

Example 666 is a communication device including means for selecting narrowband spectrum from a wideband signal frequency band of a communication device, means for generating coexistence information based on wideband transmission or reception activity, and means for generating and transmitting a narrowband signal including the coexistence information on the narrowband spectrum.

Example 665 is a method of performing wireless communications, the method including selecting narrowband spectrum from a wideband signal frequency band of a communication device, generating coexistence information based on wideband transmission or reception activity, and generating and transmitting a narrowband signal including the coexistence information on the narrowband spectrum.

Example 668 is a communication device including means for selecting narrowband spectrum from a wideband signal frequency band used by a communication device for wideband reception, means for generating a narrowband signal from narrowband data, and means for transmitting the narrowband signal to the communication device on the narrowband spectrum.

Example 667 is a method of performing wireless communications, the method including selecting narrowband spectrum from a wideband signal frequency band used by a communication device for wideband reception, generating a narrowband signal from narrowband data, and transmitting the narrowband signal to the communication device on the narrowband spectrum.

Example 669 is a subcomponent device for a network access node or a terminal device, the subcomponent device including one or more processors configured to perform the method of any one of Examples 638 to 667.

Example 670 is a non-transitory computer readable medium storing instructions that when executed by one or more processors cause the one or more processors to perform the method of any one of Examples 638 to 667.

Example 671 is a communication device including a memory, one or more processors, executable instructions stored on the memory and configured for execution by the one or more processors to cause the one or more processors to perform the method of any one of Examples 638 to 667.

Example 673 is a communication device including means for estimating a separation distance or a propagation delay between a terminal device and a target device, means for determining whether the separation distance or the propagation delay is less than a predefined threshold, and means for omitting a timing advance update or reducing an update frequency for timing advance updates if the separation distance or the propagation delay is less than the predefined threshold.

Example 674 is a method of performing wireless communications, the method including estimating a separation distance or a propagation delay between a terminal device and a target device, determining whether the separation distance or the propagation delay is less than a predefined threshold, and omitting a timing advance update or reducing an update frequency for timing advance updates if the separation distance or the propagation delay is less than the predefined threshold.

In Example 675, the subject matter of Example 674 can optionally include wherein estimating the separation distance or the propagation delay includes estimating the separation distance or the propagation delay between the terminal device and the target device with a radar sensor.

In Example 676, the subject matter of Example 674 can optionally include wherein estimating the separation distance or the propagation delay includes receiving a position report that includes a position of the target device, determining a position of the terminal device with a geopositional sensor, and comparing the position of the target device with the position of the terminal device to estimate the separation distance or the propagation delay.

In Example 677, the subject matter of Example 676 can optionally include wherein receiving the position report includes receiving the position report from the target device.

In Example 678, the subject matter of Example 676 can optionally include wherein receiving the position report includes receiving the position report from a position database.

In Example 679, the subject matter of any one of Examples 674 to 678 can optionally include wherein the target device is a network access node serving the terminal device.

In Example 680, the subject matter of any one of Examples 674 to 678 can optionally include wherein the target device is another terminal device.

In Example 681, the subject matter of any one of Examples 674 to 680 can optionally include wherein omitting the timing advance update includes determining when a timing advance update command is scheduled to be transmitted by the target device, and omitting reception of the timing advance update command from the target device.

In Example 682, the subject matter of any one of Examples 674 to 680 can optionally include wherein omitting the timing advance update includes receiving a timing advance update command from the target device, and discarding the timing advance update command without reading an updated timing advance from the timing advance update command.

In Example 683, the subject matter of any one of Examples 674 to 680 can optionally include wherein omitting the timing advance update includes receiving a timing advance update command from the target device instructing the terminal device to perform a timing advance update, and refraining from performing the timing advance update.

In Example 684, the subject matter of any one of Examples 674 to 680 can optionally include wherein reducing the update frequency for the timing advance updates includes reducing a scheduled update frequency at which timing advance updates are performed to a reduced update frequency.

In Example 685, the subject matter of Example 684 can optionally further include prior to estimating the separation distance or the propagation delay, performing a plurality of timing advance updates at the scheduled update frequency, and after reducing the scheduled updated frequency to the reduced update frequency, performing a plurality of timing advance updates at the reduced update frequency.

In Example 686, the subject matter of Example 684 or 685 can optionally include wherein the scheduled update frequency is a timing advance update frequency from a radio communication technology standard used by the terminal device and the target device.

In Example 687, the subject matter of any one of Examples 674 to 686 can optionally include wherein omitting the timing advance update or reducing the update frequency for timing advance updates if the separation distance or the propagation delay is less than the predefined threshold includes omitting the timing advance update or reducing the update frequency if the separation distance or the propagation delay is less than the threshold, and performing the timing advance update or maintaining the update frequency if the separation distance or the propagation deal is greater than the threshold.

In Example 688, the subject matter of Example 687 can optionally include wherein performing the timing advance update includes receiving a timing advance update command from the target device that includes an updated timing advance, and updating a timing advance for performing transmissions to the updated timing advance.

In Example 689, the subject matter of Example 687 can optionally include wherein performing the timing advance update includes receiving a synchronization pilot signal from the target device, comparing the received synchronization pilot signal to a local copy of the synchronization pilot signal, determining an updated timing advance based on the comparing, and updating a timing advance for performing transmissions to the updated timing advance.

In Example 690, the subject matter of any one of Examples 674 to 689 can optionally include wherein determining whether the separation distance or the propagation delay is less than the predefined threshold includes comparing the separation distance to a distance threshold.

In Example 691, the subject matter of any one of Examples 674 to 689 can optionally include wherein determining whether the separation distance or the propagation delay is less than the predefined threshold includes comparing the propagation delay to a delay threshold.

In Example 692, the subject matter of any one of Examples 674 to 691 can optionally include wherein omitting the timing advance update further includes omitting one or more additional timing advance updates according to a skip rate.

Example 693 is a communication device including means for estimating a mobility parameter of a terminal device, means for determining whether the mobility parameter is less than a predefined threshold, and means for, if the mobility parameter is less than the predefined threshold, omitting a timing advance update or reducing an update frequency for timing advance updates for a wireless connection with a target device.

Example 693 is a method of performing wireless communications, the method including estimating a mobility parameter of a terminal device, determining whether the mobility parameter is less than a predefined threshold, and if the mobility parameter is less than the predefined threshold, omitting a timing advance update or reducing an update frequency for timing advance updates for a wireless connection with a target device.

In Example 694, the subject matter of Example 693 can optionally include wherein estimating the mobility parameter includes estimating a velocity of the terminal device as the mobility parameter.

In Example 695, the subject matter of Example 693 can optionally include wherein estimating the mobility parameter includes estimating a distance travelled of the terminal device as the mobility parameter.

Example 696 is a communication device including means for estimating a performance parameter of a channel between a terminal device and a target device, means for determining whether the performance parameter is less than a predefined threshold, and means for omitting a timing advance update or reducing an update frequency for timing advance updates if the performance parameter is less than the predefined threshold.

Example 697 is a method of performing wireless communications, the method including estimating a performance parameter of a channel between a terminal device and a target device, determining whether the performance parameter is less than a predefined threshold, and omitting a timing advance update or reducing an update frequency for timing advance updates if the performance parameter is less than the predefined threshold.

In Example 698, the subject matter of Example 697 can optionally include wherein the performance parameter is a signal-to-noise ratio (SNR), signal-to-interference-plus-noise ratio (SINR), or an error rate.

Example 699 is a non-transitory computer readable medium storing instructions that when executed by one or more processors cause the one or more processors to perform the method of any one of Examples 674 to 698.

Example 700 is a non-transitory computer readable medium storing instructions that when executed by one or more processors of a terminal device cause the terminal device to perform the method of any one of Examples 674 to 698.

Example 701 is a communication device including one or more processors or dedicated hardware circuits configured to perform the method of any one of Examples 674 to 698.

Example 702 is a communication device including a memory, one or more processors, and instructions stored on the memory that, when executed by the one or more processors, cause the one or more processors to perform the method of any one of Examples 674 to 698.

In Example 703, the subject matter of Example 702 can optionally further include a radio transceiver and one or more antennas, and configured as a terminal device.

Example 704 is a communication device including a communication processor configured to control transmission timing to a target device according a timing advance, a timing advance determiner configured to perform timing advance updates, an estimator configured to estimate a separation distance or a propagation delay between the communication device and the network access node, a timing advance controller configured to determine whether the separation distance or the propagation delay is less than a predefined threshold, and to control the timing advance determiner to omit a timing advance update or to reduce an update frequency for the timing advance updates if the separation distance or the propagation delay is less than the predefined threshold.

In Example 705, the subject matter of Example 704 can optionally include wherein the estimator is configured to estimate the separation distance or the propagation delay between the communication device and the target device by estimating the separation distance or the propagation delay between the communication device and the target device with a radar sensor.

In Example 706, the subject matter of Example 704 can optionally include wherein the estimator is configured to estimate the separation distance or the propagation delay between the communication device and the target device by receiving a position report that includes a position of the target device, determining a position of the communication device with a geopositional sensor, and comparing the position of the target device with the position of the communication device to estimate the separation distance or the propagation delay.

In Example 707, the subject matter of Example 706 can optionally include wherein the estimator is configured to receive the position report by receiving the position report from the target device.

In Example 708, the subject matter of Example 706 can optionally include wherein the estimator is configured to receive the position report by receiving the position report from a position database.

In Example 709, the subject matter of any one of Examples 704 to 708 can optionally include wherein the target device is a network access node serving the communication device.

In Example 710, the subject matter of any one of Examples 704 to 708 can optionally include wherein the target device is a communication device.

In Example 711, the subject matter of any one of Examples 704 to 710 can optionally include wherein the timing advance controller is configured to omit the timing advance update by instructing the timing advance determiner to omit the timing advance update.

In Example 712, the subject matter of Example 711 can optionally include wherein the timing advance determiner is configured to, after receiving the instruction from the timing advance controller, to omit the timing advance update by omitting reception of a timing advance update command from the target device.

In Example 713, the subject matter of Example 711 can optionally include wherein the timing advance determiner is configured to receive a timing advance update command from the target device and, and after receiving the instruction from the timing advance controller, omitting the timing advance update by discarding the timing advance update command without reading an updated timing advance from the timing advance update command.

In Example 714, the subject matter of Example 711 can optionally include wherein the timing advance determiner is configured to receive a timing advance update command from the target device that including an instruction to perform a timing advance update and, and after receiving the instruction from the timing advance controller, omitting the timing advance update by refraining from performing the timing advance update.

In Example 715, the subject matter of any one of Examples 704 to 711 can optionally include wherein the timing advance controller is configured to reduce the update frequency for the timing advance updates by controlling the timing advance determiner to reduce a scheduled update frequency at which timing advances are performed to a reduced update frequency.

In Example 716, the subject matter of Example 715 can optionally include wherein the timing advance determiner is configured to, prior to the estimator estimating the separation distance or the propagation delay, perform a plurality of timing advance updates at the scheduled update frequency, and, after the timing advance controller reduces the scheduled update frequency to the reduced update frequency, performing a plurality of timing advance updates at the reduced update frequency.

In Example 717, the subject matter of Example 715 or 716 can optionally include wherein the scheduled update frequency is a timing advance update frequency from a radio communication technology standard used by the communication device and the target device.

In Example 718, the subject matter of any one of Examples 704 to 717 can optionally include wherein the timing advance controller is configured to omit the timing advance update or reduce the update frequency for timing advance updates if the separation distance or the propagation delay is less than the predefined threshold by controlling the timing advance determiner to omit the timing advance update or reducing the update frequency if the separation distance or the propagation delay is less than the threshold, and controlling the timing advance determiner to perform the timing advance update or maintaining the update frequency if the separation distance or the propagation deal is greater than the threshold.

In Example 719, the subject matter of Example 718 can optionally include wherein the timing advance determiner is configured to perform the timing advance update by receiving a timing advance update command from the target device that includes an updated timing advance, and providing the updated timing advance to the communication processor.

In Example 720, the subject matter of Example 718 can optionally include wherein the timing advance determiner is configured to perform the timing advance update by receiving a synchronization pilot signal from the target device, comparing the received synchronization pilot signal to a local copy of the synchronization pilot signal, determining an updated timing advance based on the comparing, and providing the updated timing advance to the communication processor.

In Example 721, the subject matter of any one of Examples 704 to 720 can optionally include wherein the timing advance controller is configured to determine whether the separation distance or the propagation delay is less than the predefined threshold by comparing the separation distance to a distance threshold.

In Example 722, the subject matter of any one of Examples 704 to 720 can optionally include wherein the timing advance controller is configured to determine whether the separation distance or the propagation delay is less than the predefined threshold by comparing the propagation delay to a delay threshold.

In Example 723, the subject matter of any one of Examples 704 to 722 can optionally include wherein the timing advance controller is configured to omit the timing advance update further by controlling the timing advance determiner to omit one or more additional timing advance updates according to a skip rate.

In Example 724, the subject matter of any one of Examples 704 to 723 can optionally further include a radio transceiver and one or more antennas, and configured as a terminal device.

In Example 725, the subject matter of any one of Examples 704 to 723 can optionally be configured as a communication chip arrangement for a terminal device.

Example 726 is a communication device including one or more processors configured to estimate a separation distance or a propagation delay between the communication device and a target device, determine whether the separation distance or the propagation delay is less than a predefined threshold, and omit a timing advance update or reduce an update frequency for timing advance updates if the separation distance or the propagation delay is less than the predefined threshold.

In Example 727, the subject matter of Example 726 can optionally include wherein the one or more processors are configured to estimate the separation distance or the propagation delay by estimating the separation distance or the propagation delay between the communication device and the target device with a radar sensor.

In Example 728, the subject matter of Example 726 can optionally include wherein the one or more processors are configured to estimate the separation distance or the propagation delay by receiving a position report that includes a position of the target device, determining a position of the communication device with a geopositional sensor, and comparing the position of the target device with the position of the communication device to estimate the separation distance or the propagation delay.

In Example 729, the subject matter of Example 728 can optionally include wherein the one or more processors are configured to receive the position report by receiving the position report from the target device.

In Example 730, the subject matter of Example 728 can optionally include wherein the one or more processors are configured to receive the position report by receiving the position report from a position database.

In Example 731, the subject matter of any one of Examples 726 to 730 can optionally include wherein the target device is a network access node serving the communication device.

In Example 732, the subject matter of any one of Examples 726 to 730 can optionally include wherein the target device is a terminal device.

In Example 733, the subject matter of any one of Examples 726 to 732 can optionally include wherein the one or more processors are configured to omit the timing advance update by determining when a timing advance update command is scheduled to be transmitted by the target device, and omitting reception of the timing advance update command from the target device.

In Example 734, the subject matter of any one of Examples 726 to 732 can optionally include wherein the one or more processors are configured to omit the timing advance update by receiving a timing advance update command from the target device, and discarding the timing advance update command without reading an updated timing advance from the timing advance update command.

In Example 735, the subject matter of any one of Examples 726 to 732 can optionally include wherein the one or more processors are configured to omit the timing advance update by receiving a timing advance update command from the target device instructing the communication device to perform a timing advance update, and refraining from performing the timing advance update.

In Example 736, the subject matter of any one of Examples 726 to 732 can optionally include wherein the one or more processors are configured to reduce the update frequency for the timing advance updates by reducing a scheduled update frequency at which timing advance updates are performed to a reduced update frequency.

In Example 737, the subject matter of Example 736 can optionally include wherein the one or more processors are further configured to prior to estimating the separation distance or the propagation delay, perform a plurality of timing advance updates at the scheduled update frequency, and after reducing the scheduled updated frequency to the reduced update frequency, perform a plurality of timing advance updates at the reduced update frequency.

In Example 738, the subject matter of Example 736 or 737 can optionally include wherein the scheduled update frequency is a timing advance update frequency from a radio communication technology standard used by the communication device and the target device.

In Example 739, the subject matter of any one of Examples 726 to 738 can optionally include wherein the one or more processors are configured to omit the timing advance update or reduce the update frequency for timing advance updates if the separation distance or the propagation delay is less than the predefined threshold by omitting the timing advance update or reducing the update frequency if the separation distance or the propagation delay is less than the threshold, and performing the timing advance update or maintaining the update frequency if the separation distance or the propagation deal is greater than the threshold.

In Example 740, the subject matter of Example 739 can optionally include wherein the one or more processors are configured to perform the timing advance update by receiving a timing advance update command from the target device that includes an updated timing advance, and updating a timing advance for performing transmissions to the updated timing advance.

In Example 741, the subject matter of Example 739 can optionally include wherein the one or more processors are configured to perform the timing advance update by receiving a synchronization pilot signal from the target device, comparing the received synchronization pilot signal to a local copy of the synchronization pilot signal, determining an updated timing advance based on the comparing, and updating a timing advance for performing transmissions to the updated timing advance.

In Example 742, the subject matter of any one of Examples 726 to 741 can optionally include wherein the one or more processors are configured to determine whether the separation distance or the propagation delay is less than the predefined threshold by comparing the separation distance to a distance threshold.

In Example 743, the subject matter of any one of Examples 726 to 741 can optionally include wherein the one or more processors are configured to determine whether the separation distance or the propagation delay is less than the predefined threshold by comparing the propagation delay to a delay threshold.

In Example 744, the subject matter of any one of Examples 726 to 743 can optionally include wherein the one or more processors are configured to omit the timing advance update further by omitting one or more additional timing advance updates according to a skip rate.

In Example 745, the subject matter of any one of Examples 726 to 744 can optionally further include a radio transceiver and one or more antennas, and configured as a terminal device.

In Example 746, the subject matter of any one of Examples 726 to 744 can optionally be configured as a communication chip arrangement for a terminal device.

Example 747 is a communication device including a communication processor configured to control transmission timing to a target device according a timing advance, a timing advance determiner configured to perform timing advance updates, an estimator configured to estimate a mobility parameter of the communication device, and a timing advance controller configured to determine whether the mobility parameter is less than a predefined threshold, and to control the timing advance determiner to omit a timing advance update or to reduce an update frequency for the timing advance updates if the mobility parameter is less than the predefined threshold.

In Example 748, the subject matter of Example 747 can optionally include wherein the estimator is configured to estimate the mobility parameter by estimating a velocity of the terminal device as the mobility parameter.

In Example 749, the subject matter of Example 747 can optionally include wherein the estimator is configured to estimate the mobility parameter by estimating a distance travelled of the terminal device as the mobility parameter.

Example 750 is a communication device including a communication processor configured to control transmission timing to a target device according a timing advance, a timing advance determiner configured to perform timing advance updates, an estimator configured to estimate a performance parameter of a channel between the communication device and the target device, and a timing advance controller configured to determine whether the performance parameter is less than a predefined threshold, and to control the timing advance determiner to omit a timing advance update or to reduce an update frequency for the timing advance updates if the performance parameter is less than the predefined threshold.

In Example 751, the subject matter of Example 750 can optionally include wherein the performance parameter is a signal-to-noise ratio (SNR), signal-to-interference-plus-noise ratio (SINR), or an error rate.

Example 752 is a communication device including one or more processors configured to estimate a mobility parameter of a terminal device, determine whether the separation distance or the propagation delay is less than a predefined threshold, and if the mobility parameter is less than the predefined threshold, omit a timing advance update or reduce an update frequency for timing advance updates for a wireless connection with a target device.

In Example 753, the subject matter of Example 752 can optionally include wherein the one or more processors are configured to estimate the mobility parameter by estimating a velocity of the terminal device as the mobility parameter.

In Example 754, the subject matter of Example 752 can optionally include wherein the one or more processors are configured to estimate the mobility parameter by estimating a distance travelled of the terminal device as the mobility parameter.

Example 755 is a communication device including one or more processors configured to estimate a performance parameter of a channel between a terminal device and a target device, determine whether the separation distance or the propagation delay is less than a predefined threshold, and omit a timing advance update or reduce an update frequency for timing advance updates if the performance parameter is less than the predefined threshold.

In Example 756, wherein the performance parameter is a signal-to-noise ratio (SNR), signal-to-interference-plus-noise ratio (SINR), or an error rate.

Example 757 is a communication device configured for use by a vehicular communication device in vehicular radio communications, including one or more processors configured to retrieve a certificate of a trusted authority, wherein the certificate indicates that data transmitted from the vehicular communication device is trusted, sign a message with a private key corresponding to a public key of the certificate to produce a signature for the message, and transmit the certificate, the message, and the signature to one or more other devices.

In Example 758, the subject matter of Example 757 can optionally include wherein the trusted authority is a vehicle manufacturer.

In Example 759, the subject matter of Example 757 can optionally include wherein the trusted authority is a service provider.

In Example 760, the subject matter of any one of Examples 757-759 can optionally include wherein the certificate is stored in a memory operatively coupled to the one or more processors.

In Example 761, the subject matter of any one of Examples 757-760 can optionally further include a trusted platform module (TPM) configured to store the private key.

In Example 762, the subject matter of any one of Examples 757-761 can optionally include wherein the one or more processors are configured to determine a specific device of the one or more other devices to selectively transmit the certificate to.

In Example 763, the subject matter of Example 762 can optionally include wherein the specific device is a cluster head of a cluster of vehicles including the vehicle.

In Example 764, the subject matter of any one of Examples 757-763 can optionally include the one or more processors further configured to identify at least a corresponding device from the one or more other devices as coming from the trusted authority.

In Example 765, the subject matter of Example 764 can optionally include the one or more processors further configured to exchange higher levels of data with the corresponding device.

In Example 766, the subject matter of Example 765 can optionally include wherein the higher levels of data include information related to the vehicle's dynamics.

In Example 767, the subject matter of Example 766 can optionally include wherein information related to the vehicle's dynamics includes engine operating parameters.

In Example 768, the subject matter of any one of Examples 766-767 can optionally include wherein information related to the vehicle's dynamics includes vehicle suspension information.

In Example 769, the subject matter of any one of Examples 766-768 can optionally include wherein information related to the vehicle's dynamics includes fuel usage parameters.

In Example 770, the subject matter of any one of Examples 766-768 can optionally include wherein information related to the vehicle's dynamics includes antenna parameters configured for wireless configurations.

In Example 771, the subject matter of any one of Examples 757-770 can optionally further include a digital signal processor, a radio transceiver, and one or more antennas, wherein the one or more processors are configured to transmit the certificate and the data in wireless radio signals with the digital signal processor, the radio transceiver, and the one or more antennas.

In Example 772, the subject matter of any one of Examples 757-771 can optionally include wherein the vehicle includes a steering and movement system.

Example 773 is a communication device configured for use by a vehicle in vehicular radio communications, including one or more processors configured to receive a certificate from a second communication device, verify whether the certificate establishes the second communication device as a trusted source in vehicular radio communications.

In Example 774, the subject matter of Example 773 can optionally include wherein the second device is established as a trusted source, the one or more processors configured to receive further communications from the second device.

In Example 775, the subject matter of Example 773 can optionally include wherein the second device is not established as a trusted source of data, blocking further communications from the second device.

In Example 776, the subject matter of any one of Examples 773-775 can optionally include wherein the one or more processors further configured to verify whether the certificate establishes the second communication device as a trusted source in vehicular radio communications by forwarding the certificate to a network.

In Example 777, the subject matter of Example 776 can optionally include wherein the one or more processors further configured to receive an instruction from the network, wherein the instruction establishes whether the second device is a trusted source of data or not.

In Example 778, the subject matter of any one of Examples 773-777 can optionally include wherein the one or more processors further configured to verify whether the certificate indicates that the second communication device is a trusted source in vehicular radio communications by checking it against a database stored in a memory operatively coupled to the one or more processors.

In Example 779, the subject matter of Example 778 can optionally include wherein the one or more processors configured to update the database by receiving updates from a network.

In Example 780, the subject matter of any one of Examples 778-779 can optionally include wherein the database includes at least one of an approval list including devices for which approval of further communications is authorized or a blacklist including devices to be blocked.

In Example 781, the subject matter of any one of Examples 778 to 780 can optionally further include receiving data and a signature for the data from the second communication device, and verifying whether the signature is a valid signature for the data with a public key of the certificate.

Example 782 is a communication device including means for sending a certificate from a first vehicular communication device to a second vehicular communication device, means for determining, by the second vehicular communication device, whether the certificate indicates that the first vehicular communication device is a trusted source, and means for receiving further communications from the first vehicular communication device if the first communication device is a trusted source, or blocking further communication from the first vehicular communication device if the first vehicular communication device is not a trusted source.

Example 783 is a method for vehicular radio communications, including sending a certificate from a first vehicular communication device to a second vehicular communication device, determining, by the second vehicular communication device, whether the certificate indicates that the first vehicular communication device is a trusted source, and receiving further communications from the first vehicular communication device if the first communication device is a trusted source, or blocking further communication from the first vehicular communication device if the first vehicular communication device is not a trusted source.

In Example 784, the subject matter of Example 783 can optionally further include transmitting the certificate from the second vehicular communication device to a network, wherein the network is configured to determine whether the first communication device is a trusted source by checking the certificate against a database accessible to the network.

In Example 785, the subject matter of any one of Examples 783-784 can optionally further include obtaining a list, at the second vehicular communication device, from a network.

In Example 786, the subject matter of Example 785 can optionally include wherein the list includes certificates from trusted sources.

In Example 787, the subject matter of any one of Examples 785-786 can optionally include wherein the list includes devices that are blacklisted from vehicular radio communications.

Example 788 is a non-transitory computer readable medium with program instructions, which when executed by one or more processors of a device, perform a method or realize a device as in any one of Examples 757 to 788.

Example 789 is a vehicular communication device including one or more processors configured to receive a plurality of certificates from a plurality of vehicular communication devices, determine whether the plurality of certificates are issued by a trusted authority, and exchange different types of information with plurality of vehicular communication devices based on whether the certificates provided by each of the plurality of vehicular communication devices is issued by the trusted authority.

In Example 790, the subject matter of Example 789 can optionally include wherein the one or more processors are configured to determine whether the plurality of certificates are issued by a trusted authority by transmitting the plurality of certificates to a gatekeeper authority, and receiving in response a confirmation or denial of whether each of the plurality of certificates was issued by the trusted authority.

In Example 791, the subject matter of Example 789 can optionally include wherein the one or more processors are configured to determine whether the plurality of certificates are issued by a trusted authority by checking a database of trusted certificates to determine whether the plurality of certificates are included in the database of trusted certificates, and determine that each of the plurality of certificates that is included in the database of trusted certificates was issued by the trusted authority and that each of the plurality of certificates that is not included in the database of trusted certificates was not issued by the trusted authority.

In Example 792, the subject matter of any one of Examples 789 to 791 can optionally include wherein the trusted authority is a manufacturer of the vehicular communication device.

In Example 793, the subject matter of any one of Examples 789 to 791 can optionally include wherein the trusted authority is a service provider of the vehicular communication device.

In Example 794, the subject matter of any one of Examples 789 to 792 can optionally include wherein the one or more processors are further configured to generate a signature for a message using a private key corresponding to a certificate of the vehicular communication device, and transmit the signature, the message, and the certificate to a first vehicular communication device of the plurality of vehicular communication devices.

In Example 795, the subject matter of Example 794 can optionally include wherein the private key corresponds to a public key included in the certificate.

In Example 796, the subject matter of Example 794 or 795 can optionally include wherein the certificate is issued by the trusted authority.

In Example 797, the subject matter of any one of Examples 789 to 796 can optionally include wherein the one or more processors are further configured to determine that a first certificate of the plurality of certificates provided by a first vehicular communication device of the plurality of vehicular communication devices is issued by the trusted authority, receive a message and a signature from the first vehicular communication device, and verify that the signature is a valid signature for the message using a public key included in the first certificate.

In Example 798, the subject matter of any one of Examples 789 to 796 can optionally include wherein the one or more processors are further configured to determine that a first certificate of the plurality of certificates provided by a first vehicular communication device of the plurality of vehicular communication devices is issued by the trusted authority, receive a message and a signature from the first vehicular communication device, verify whether the signature is a valid signature for the message using a public key included in the first certificate, and discard the message if the signature is determined to not be a valid signature.

Example 799 is a communication device including means for receiving a plurality certificates from a plurality of vehicular communication devices, means for determining whether the plurality of certificates are issued by a trusted authority, and means for exchanging different types of information with plurality of vehicular communication devices based on whether the certificates provided by each of the plurality of vehicular communication devices is issued by the trusted authority.

Example 800 is a method for performing wireless communications at a vehicular communication device, the method including receiving a plurality certificates from a plurality of vehicular communication devices, determining whether the plurality of certificates are issued by a trusted authority, and exchanging different types of information with plurality of vehicular communication devices based on whether the certificates provided by each of the plurality of vehicular communication devices is issued by the trusted authority.

In Example 801, the subject matter of Example 800 can optionally include wherein determining whether the plurality of certificates are issued by a trusted authority includes transmitting the plurality of certificates to a gatekeeper authority, and receiving in response a confirmation or denial of whether each of the plurality of certificates was issued by the trusted authority.

In Example 802, the subject matter of Example 800 can optionally include wherein determining whether the plurality of certificates are issued by a trusted authority includes referencing a database of trusted certificates to determine whether the plurality of certificates are included in the database of trusted certificates, and determining that each of the plurality of certificates that is included in the database of trusted certificates was issued by the trusted authority and that each of the plurality of certificates that is not included in the database of trusted certificates was not issued by the trusted authority.

In Example 803, the subject matter of any one of Examples 800 to 802 can optionally include wherein the trusted authority is a manufacturer of the vehicular communication device.

In Example 804, the subject matter of any one of Examples 800 to 802 can optionally include wherein the trusted authority is a service provider.

In Example 805, the subject matter of any one of Examples 800 to 803 can optionally further include generating a signature for a message using a private key corresponding to a certificate of the vehicular communication device, and transmitting the signature, the message, and the certificate to a first vehicular communication device of the plurality of vehicular communication devices.

In Example 806, the subject matter of Example 805 can optionally include wherein the private key corresponds to a public key included in the certificate.

In Example 807, the subject matter of Example 805 or 806 can optionally include wherein the certificate is issued by the trusted authority.

In Example 808, the subject matter of any one of Examples 800 to 807 can optionally further include determining that a first certificate of the plurality of certificates provided by a first vehicular communication device of the plurality of vehicular communication devices is issued by the trusted authority, receiving a message and a signature from the first vehicular communication device, and verifying that the signature is a valid signature for the message using a public key included in the first certificate.

In Example 809, the subject matter of any one of Examples 800 to 807 can optionally further include determining that a first certificate of the plurality of certificates provided by a first vehicular communication device of the plurality of vehicular communication devices is issued by the trusted authority, receiving a message and a signature from the first vehicular communication device, verifying whether the signature is a valid signature for the message using a public key included in the first certificate, and discarding the message if the signature is determined to not be a valid signature.

Example 810 is an interface device including one or more processors configured to acquire a certificate from a vehicular communication device, determine an authority which issued the certificate to the vehicular communication device, obtain data from the vehicular communication device, and provide a commodity to the vehicular communication device based on the obtained data.

In Example 811, the subject matter of Example 810 can optionally further include a connector configured to couple directly to the vehicular communication device.

In Example 812, the subject matter of Example 811 can optionally include wherein the connector is configured to acquire the certificate from the vehicular communication device.

In Example 813, the subject matter of any one of Examples 810-811 can optionally include wherein the connector includes a high-speed data link.

In Example 814, the subject matter of any one of Examples 810-813 can optionally include wherein the connector is further configured to provide the commodity to the vehicular communication device.

In Example 815, the subject matter of Example 810 can optionally include wherein the commodity is electricity.

In Example 816, the subject matter of any one of Examples 810-815 can optionally further include a wireless transceiver configured to acquire the certificate from the vehicular communication device via a wireless link.

In Example 817, the subject matter of any one of Examples 810-816 can optionally further include a data link to contact the authority.

In Example 818, the subject matter of any one of Examples 810-817 can optionally include the one or more processors further configured to evaluate the data obtained from the vehicular communication device.

In Example 818, the subject matter of Example 818 can optionally include wherein the evaluation of data includes determining whether the authority possesses the data.

In Example 820, the subject matter of any one of Examples 818-819 can optionally include wherein the evaluation of data includes determining whether the authority has access to the data without obtaining the data from the vehicular communication device.

In Example 821, the subject matter of any one of Examples 818-820 can optionally include wherein the evaluation of data includes determining a duration of the relevancy of the data.

In Example 822, the subject matter of any one of Examples 818-821 can optionally include wherein the evaluation of data includes using weighing parameters to assign a respective weight to a respective subset of the data.

In Example 823, the subject matter of any one of Examples 810-822 can optionally include the one or more processors further configured to calculate a balance of the commodity to be paid by a user of the vehicular communication device.

In Example 824, the subject matter of Example 823 can optionally include the balance determined as a difference between a total amount of the commodity supplied to the vehicular communication device and a quantity supplied on behalf of the authority based on the evaluation of the data.

In Example 825, the subject matter of any one of Examples 810 to 824 can optionally include wherein the one or more processors are further configured to determine whether the data is signed with a valid signature based on a public key in the certificate, and wherein the one or more processors are configured to provide the commodity to the vehicular communication device if the data is signed with a valid signature.

Example 826 is a device including means for acquiring a certificate, provided by a trusted authority to a vehicular communication device, from the vehicular communication device, means for identifying the trusted authority, obtaining data from the vehicular communication device, and means for providing the commodity to the vehicular communication device based on the obtained data.

Example 827 is a method for an interface device to provide a commodity to a vehicular communication device in exchange for data acquired by the vehicular communication device, the method including acquiring a certificate, provided by a trusted authority to the vehicular communication device, from the vehicular communication device, identifying the trusted authority, obtaining data from the vehicular communication device, and providing the commodity to the vehicular communication device based on the obtained data.

In Example 828, the subject matter of Example 827 can optionally further include coupling the vehicular communication device to the interface device via a physical link.

In Example 829, the subject matter of Example 828 can optionally include wherein the physical link provides the interface device with access to the certificate.

In Example 830, the subject matter of any one of Examples 828-829 can optionally include wherein the physical link is configured to provide the vehicular communication device with the commodity.

In Example 831, the subject matter of any one of Examples 827-830 can optionally further include coupling the vehicular communication device to the interface device via a wireless communication link.

In Example 832, the subject matter of Example 831 can optionally include wherein the wireless communication link provides the interface device with access to the certificate.

In Example 833, the subject matter of any one of Examples 827-832 can optionally further include contacting the authority via a communications link in order to inquire whether the authority is willing to accept the data in exchange for the interface device providing at least a portion of the commodity In Example 834, the subject matter of any one of Examples 827-832 can optionally further include checking the certificate against a database stored in a memory component of the interface device, wherein the database includes a list of devices to blacklist.

In Example 835, the subject matter of any one of Examples 827-834 can optionally further include evaluating the data provided by the vehicular communication device.

In Example 836, the subject matter of Example 835 can optionally include wherein the evaluating includes determining whether the authority possesses the data.

In Example 837, the subject matter of any one of Examples 835-836 can optionally include wherein the evaluating includes determining whether the authority has access to the data without obtaining the data from the vehicular communication device.

In Example 838, the subject matter of any one of Examples 835-837 can optionally include wherein the evaluating includes determining a duration of the relevancy of the data.

In Example 839, the subject matter of any one of Examples 835-838 can optionally include wherein the evaluating includes using weighing parameters to assign a respective weight to a respective subset of the data.

In Example 840, the subject matter of any one of Examples 827-839 can optionally further include calculating a balance of the commodity to be paid by a user of the vehicular communication device.

In Example 841, the subject matter of Example 840 can optionally include the balance determined as a difference between a total amount of the commodity supplied to the vehicular communication device and a quantity supplied on behalf of the authority based on the evaluation of the data.

In Example 842, the subject matter of any one of Examples 827 to 841 can optionally further include determining whether the data is signed with a valid signature based on a public key in the certificate, and wherein the providing the commodity to the vehicular communication device includes providing the commodity to the vehicular communication device if the data is signed with a valid signature.

Example 843 is a communication device configured for use by a vehicular communication device in radio communications, the communication device including one or more processors configured to acquire data including information on a surrounding area of the vehicular communication device, identify one or more objects based on the acquired data, and generate one or more beams based on the one or more identified objects.

In Example 844, the subject matter of Example 843 can optionally further include a digital signal processor, a radio transceiver, and one or more antennas, wherein the one or more processors are configured to generate the beams as wireless radio signals with the digital signal processor, the radio transceiver, and the one or more antennas.

In Example 845, the subject matter of Example 844 can optionally include wherein the one or more processors are configured to generate the one or beams to transmit via the one or more antennas.

In Example 846, the subject matter of any one of Examples 843-845 can optionally include wherein the vehicular communication device includes a steering and movement system.

In Example 847, the subject matter of any one of Examples 843-846 can optionally include the one or more processors operatively coupled to a data acquisition equipment of the vehicular communication device.

In Example 848, the subject matter of Example 847 can optionally include wherein the data is acquired by the data acquisition equipment.

In Example 849, the subject matter of any one of Examples 847-848 can optionally include the data acquisition equipment including video cameras configured to capture images of the vehicular communication device's surrounding area.

In Example 850, the subject matter of any one of Examples 847-849 can optionally include the data acquisition equipment including infrared cameras.

In Example 851, the subject matter of any one of Examples 847-850 can optionally include the data acquisition equipment including motion sensors.

In Example 852, the subject matter of any one of Examples 847-851 can optionally include the data acquisition equipment including radar equipment.

In Example 853, the subject matter of any one of Examples 847-852 can optionally include the data acquisition equipment including light detection and ranging (LIDAR) equipment.

In Example 854, the subject matter of any one of Examples 843-853 can optionally include wherein the one or more processors are configured to perform an image analysis of the data in order to identify the one or more objects.

In Example 855, the subject matter of any one of Examples 843-854 can optionally include wherein at least one of the one or more objects is a receiving device.

In Example 856, the subject matter of any one of Examples 843-855 can optionally include wherein at least one of the one or more objects is an obstacle.

In Example 857, the subject matter of Example 856 can optionally include wherein the one or more processors are configured to generate the one or more beams to avoid the obstacle.

In Example 858, the subject matter of any one of Examples 843-857 can optionally include wherein at least one of the one or more objects is a reflective surface.

In Example 859, the subject matter of Example 858 can optionally include wherein the one or more processors are configured to generate the one or more beams to bounce off the reflective surface in order to avoid an identified obstacle based on the acquired data.

In Example 860, the subject matter of any one of Examples 843-859 can optionally include wherein the one or more beams are generated by analog beamforming, wherein the one or more processors are configured to perform a precoding and combining of the one or more beams in radio frequency (RF) circuitry of the communication device.

In Example 861, the subject matter of any one of Examples 843-860 can optionally include wherein the one or more beams are generated by digital beamforming, wherein the one or more processors are configured to perform a precoding and combining of the one or more beams in digital baseband circuitry of the communication device.

In Example 862, the subject matter of any one of Examples 843-861 can optionally include wherein the one or more beams are generated by hybrid beamforming, wherein the one or more processors are configured to perform a precoding and combining of the one or more beams in radio frequency (RF) circuitry and digital baseband circuitry of the communication device.

Example 863 is a communication device for generating one or more beams for vehicular radio communications, the communication device including means for acquiring data including information on a surrounding area of a vehicular communication device, means for identifying one or more objects based on the acquired data, and means for generating one or more beams based on the one or more identified objects.

Example 864 is a method for a communication device to generate one or more beams for vehicular radio communications, the method including acquiring data including information on a surrounding area of a vehicular communication device, identifying one or more objects based on the acquired data, and generating the one or more beams based on the one or more identified objects.

In Example 865, the subject matter of Example 864 can optionally further include transmitting the one or more beams via one or more antennas.

In Example 866, the subject matter of any one of Examples 864-865 can optionally further include obtaining the data from a data acquisition equipment.

In Example 867, the subject matter of Example 866 can optionally include the data acquisition equipment including video cameras configured to capture images of the vehicular communication device's surrounding area.

In Example 868, the subject matter of any one of Examples 866-867 can optionally include the data acquisition equipment including infrared cameras.

In Example 869, the subject matter of any one of Examples 866-868 can optionally include the data acquisition equipment including motion sensors.

In Example 870, the subject matter of any one of Examples 866-869 can optionally include the data acquisition equipment including radar equipment.

In Example 871, the subject matter of any one of Examples 866-870 can optionally include the data acquisition equipment including light detection and ranging (LIDAR) equipment.

In Example 872, the subject matter of any one of Examples 864-871 can optionally further include performing an image analysis of the data in order to identify the one or more objects.

In Example 873, the subject matter of any one of Examples 864-872 can optionally include wherein at least one of the one or more objects is a receiving device.

In Example 874, the subject matter of any one of Examples 864-873 can optionally include wherein at least one of the one or more objects is an obstacle.

In Example 875, the subject matter of Example 874 can optionally further include generating the one or more beams to avoid the obstacle.

In Example 876, the subject matter of any one of Examples 864-875 can optionally include wherein at least one of the one or more objects is a reflective surface.

In Example 877, the subject matter of Example 876 can optionally further include generating the one or more beams to bounce off the reflective surface in order to avoid an identified obstacle based on the acquired data.

In Example 878, the subject matter of any one of Examples 864-877 can optionally further include generating the one or more beams by analog beamforming including precoding and combining of the one or more beams in radio frequency (RF) circuitry.

In Example 879, the subject matter of any one of Examples 864-878 can optionally further include generating the one or more beams by digital beamforming including precoding and combining of the one or more beams in digital baseband circuitry.

In Example 880, the subject matter of any one of Examples 864-879 can optionally further include generating the one or more beams by hybrid beamforming including precoding and combining of the one or more beams in radio frequency (RF) circuitry and digital baseband circuitry.

Example 881 is a communication device configured for use by a vehicular communication device in radio communications, the communication device including one or more processors configured to obtain a set of candidate beams for one or more locations, acquire data on the vehicular communication device's surroundings at each of the one or more locations, elect a beam to use from the candidate set of beams based on the acquired data at each of the one or more locations, and generate the elected beam at each of the one or more locations.

In Example 882, the subject matter of Example 881 can optionally further include a digital signal processor, a radio transceiver, and one or more antennas, wherein the one or more processors are configured to generate the elected beam as wireless radio signals with the digital signal processor, the radio transceiver, and the one or more antennas.

In Example 883, the subject matter of Example 882 can optionally include wherein the one or more processors are configured to generate the elected beam to transmit via the one or more antennas.

In Example 884, the subject matter of any one of Examples 881-883 can optionally include wherein the vehicular communication device includes a steering and movement system.

In Example 885, the subject matter of any one of Examples 881-884 can optionally include the one or more processors operatively coupled to a data acquisition equipment of the vehicular communication device.

In Example 886, the subject matter of Example 885 can optionally include wherein the data is acquired by the data acquisition equipment.

In Example 887, the subject matter of any one of Examples 885-886 can optionally include the data acquisition equipment including video cameras configured to capture images of the vehicular communication device's surrounding area.

In Example 888, the subject matter of any one of Examples 885-887 can optionally include the data acquisition equipment including infrared cameras.

In Example 889, the subject matter of any one of Examples 885-888 can optionally include data acquisition equipment including motion sensors.

In Example 890, the subject matter of any one of Examples 885-889 can optionally include the data acquisition equipment including radar equipment.

In Example 891, the subject matter of any one of Examples 885-890 can optionally include the data acquisition equipment including light detection and ranging (LIDAR) equipment.

In Example 892, the subject matter of any one of Examples 881-891 can optionally include wherein the one or more processors are configured to perform an image analysis of the data in order to identify the one or more objects.

In Example 893, the subject matter of any one of Examples 881-892 can optionally include wherein at least one of the one or more objects is a receiving device.

In Example 894, the subject matter of any one of Examples 881-893 can optionally include wherein at least one of the one or more objects is an obstacle.

In Example 895, the subject matter of Example 894 can optionally include wherein the one or more processors are configured to elect the beam from the candidate set of beams in order to avoid the obstacle.

In Example 896, the subject matter of any one of Examples 881-895 can optionally include wherein at least one of the one or more objects is a reflective surface.

In Example 897, the subject matter of Example 896 can optionally include wherein the one or more processors are configured to elect the beam from the candidate set of beams in order to bounce off the reflective surface to avoid an identified obstacle based on the acquired data.

In Example 898, the subject matter of any one of Examples 881-897 can optionally include wherein each of the candidate set of beams is acquired from a network or another communication device.

In Example 899, the subject matter of any one of Examples 881-898 can optionally include wherein one or more of the candidate set of beams includes a plurality of beams.

In Example 900, the subject matter of Example 899 can optionally include wherein each beam in the plurality of beams is assigned a priority in order of which beam to elect for generation.

In Example 901, the subject matter of any one of Examples 881-900 can optionally include wherein the one or more beams are generated by analog beamforming, wherein the one or more processors are configured to perform a precoding and combining of the one or more beams in radio frequency (RF) circuitry of the communication device.

In Example 902, the subject matter of any one of Examples 881-901 can optionally include wherein the one or more beams are generated by digital beamforming, wherein the one or more processors are configured to perform a precoding and combining of the one or more beams in digital baseband circuitry of the communication device.

In Example 903, the subject matter of any one of Examples 881-902 can optionally include wherein the one or more beams are generated by hybrid beamforming, wherein the one or more processors are configured to perform a precoding and combining of the one or more beams in radio frequency (RF) circuitry and digital baseband circuitry of the communication device.

Example 904 is a communication device for generating a beam for a vehicular communication device, the communication device including means for obtaining a set of candidate beams for one or more locations, means for acquiring data on the vehicular communication device's surroundings at each of the one or more locations, means for electing a beam to use from the candidate set of beams based on the acquired data, and means for generating the elected beam.

Example 905 is a method for a communication device to generate a beam for a vehicular communication device, the method including obtaining a set of candidate beams for one or more locations, acquiring data on the vehicular communication device's surroundings at each of the one or more locations, electing a beam to use from the candidate set of beams based on the acquired data, and generating the elected beam.

In Example 906, the subject matter of Example 905 can optionally further include transmitting the one or more beams via one or more antennas.

In Example 907, the subject matter of any one of Examples 905-906 can optionally further include obtaining the data from a data acquisition equipment.

In Example 908, the subject matter of Example 907 can optionally include the data acquisition equipment including video cameras configured to capture images of the vehicular communication device's surrounding area.

In Example 909, the subject matter of any one of Examples 907-908 can optionally include the data acquisition equipment including infrared cameras.

In Example 910, the subject matter of any one of Examples 907-909 can optionally include the data acquisition equipment including motion sensors.

In Example 911, the subject matter of any one of Examples 907-910 can optionally include the data acquisition equipment including radar equipment.

In Example 912, the subject matter of any one of Examples 907-911 can optionally include the data acquisition equipment including light detection and ranging (LIDAR) equipment.

In Example 913, the subject matter of any one of Examples 905-912 can optionally further include performing an image analysis of the data in order to identify the one or more objects.

In Example 914, the subject matter of any one of Examples 905-913 can optionally include wherein at least one of the one or more objects is a receiving device.

In Example 915, the subject matter of any one of Examples 905-914 can optionally include wherein at least one of the one or more objects is an obstacle.

In Example 916, the subject matter of Example 915 can optionally further include electing the beam from the candidate set of beams in order to avoid the obstacle.

In Example 917, the subject matter of any one of Examples 905-916 can optionally include wherein at least one of the one or more objects is a reflective surface.

In Example 918, the subject matter of Example 917 can optionally further include electing the beam from the candidate set of beams to bounce off the reflective surface in order to avoid an identified obstacle based on the acquired data.

In Example 919, the subject matter of any one of Examples 905-918 can optionally include wherein each of the candidate set of beams is acquired from a network or another communication device.

In Example 920, the subject matter of any one of Examples 905-919 can optionally include wherein one or more of the candidate set of beams includes a plurality of beams.

In Example 921, the subject matter of Example 920 can optionally include wherein each beam in the plurality of beams is assigned a priority in order of which beam to elect for generation.

In Example 922, the subject matter of any one of Examples 905-921 can optionally further include generating the elected beam by analog beamforming including precoding and combining of the one or more beams in radio frequency (RF) circuitry.

In Example 923, the subject matter of any one of Examples 905-922 can optionally further include generating the elected beam by digital beamforming including precoding and combining of the one or more beams in digital baseband circuitry.

In Example 924, the subject matter of any one of Examples 905-923 can optionally further include generating the elected beam by hybrid beamforming including precoding and combining of the one or more beams in radio frequency (RF) circuitry and digital baseband circuitry.

Example 925 is a non-transitory computer readable medium including executable instructions, which when executed by one or more processors, cause a device to perform a method or realize a device of any one of Examples 843 to 924.

Example 926 is a communication device for use in radio communications, including one or more integrated circuits coupled in configuration for use in radio communications, one or more bypass circuits, each bypass circuit configured to operatively couple an input and an output of one or more of the integrated circuits to a software reconfigurable chip, the software reconfigurable chip, configured to be programmed with a substitute functionality for at least one integrated circuit of the one or more integrated circuits, and one or more processors configured to route the input of the at least one integrated circuit to the software reconfigurable chip via a respective bypass circuit of the one or more bypass circuits, and route an output of the software reconfigurable chip, via the respective bypass circuit, to an output of the at least one integrated circuit to replace the at least one integrated circuit with the software reconfigurable chip.

In Example 927, the subject matter of Example 926 can optionally include wherein the at least one integrated circuit is included in a baseband circuitry of the communication device.

In Example 928, the subject matter of any one of Examples 926-927 can optionally include wherein the at least one integrated circuit is included in a radio frequency (RF) circuitry of the communication device.

In Example 929, the subject matter of any one of Examples 926-928 can optionally include wherein the at least one integrated circuit is included in an application processing circuitry of the communication device.

In Example 930, the subject matter of any one of Examples 926-929 can optionally include wherein at least one bypass circuit includes control logic configured to route data from the input of the at least one integrated circuit to the software reconfigurable chip.

In Example 931, the subject matter of any one of Examples 926-930 can optionally include wherein the at least one bypass circuit includes one or more buffers configured to temporarily hold data provided by another integrated circuit.

In Example 932, the subject matter of any one of Examples 926-931 can optionally include wherein the software reconfigurable chip includes a field programmable gate array (FPGA).

In Example 933, the subject matter of any one of Examples 926-932 can optionally include wherein the software reconfigurable chip includes a digital signal processor (DSP).

In Example 934, the subject matter of any one of Examples 926-933 can optionally include wherein the software reconfigurable chip includes a programmable logic array (PLA).

In Example 935, the subject matter of any one of Examples 926-934 can optionally include wherein the software reconfigurable chip is a component of a radio virtual machine (RVM) computing platform.

In Example 936, the subject matter of Example 935 can optionally include wherein the RVM computing platform is operatively coupled to a baseband circuitry of the communication device.

In Example 937, the subject matter of any one of Examples 935-936 can optionally include wherein the RVM computing platform is operatively coupled to a RF circuitry of the communication device.

In Example 938, the subject matter of any one of Examples 935-937 can optionally include wherein the RVM computing platform is operatively coupled to an application processor of the communication device.

In Example 939, the subject matter of any one of Examples 926-938 can optionally include wherein the one or more processors are configured to reallocate processing resources of the at least one integrated circuit, whose functionality has been replaced, to a pool of processing resources available for the software reconfigurable chip.

In Example 940, the subject matter of Example 939 can optionally include wherein the one or more processors are configured to program the processing resources to replace the functionality of a second integrated circuit of the one or more integrated circuits via a second bypass circuit.

In Example 941, the subject matter of any one of Examples 926-940 can optionally include wherein the one or more processors are configured to identify a respective idle period of the one or more integrated circuits during online operation of the communication device, and replace the one or more integrated circuits during their respective idle period.

Example 905 is a communication device including means for identifying one or more integrated circuits of the communication device, means for loading one or more replacement software instruction sets onto a software reconfigurable chip of the communication device, wherein the one or more software instruction sets are configured to replace at least one function of the identified one or more integrated circuits, and routing an input of the one or more integrated circuits to the software reconfigurable chip and an output of the software reconfigurable chip to an output of the one or more integrated circuits, wherein the software reconfigurable chip replaces the one or more integrated circuits with the one or more replacement software instruction sets.

Example 943 is a method for reconfiguring a communication device, the method including identifying one or more integrated circuits of the communication device, loading one or more replacement software instruction sets onto a software reconfigurable chip of the communication device, wherein the one or more software instruction sets are configured to replace at least one function of the identified one or more integrated circuits, and routing an input of the one or more integrated circuits to the software reconfigurable chip and an output of the software reconfigurable chip to an output of the one or more integrated circuits, wherein the software reconfigurable chip replaces the one or more integrated circuits with the one or more replacement software instruction sets.

In Example 944, the subject matter of Example 943 can optionally include wherein at least one of the one or more integrated circuits is included in a baseband circuitry of the communication device.

In Example 945, the subject matter of Example 943 or 944 can optionally include wherein at least one of the one or more integrated circuits is included in a radio frequency (RF) circuitry of the communication device.

In Example 946, the subject matter of any one of Examples 943-945 can optionally include wherein at least one of the one or more integrated circuits is included in an application processing circuitry of the communication device.

In Example 947, the subject matter of any one of Examples 943-946 can optionally include wherein the software reconfigurable chip includes a field programmable gate array (FPGA).

In Example 948, the subject matter of any one of Examples 943-947 can optionally include wherein the software reconfigurable chip includes a digital signal processor (DSP).

In Example 949, the subject matter of any one of Examples 943-948 can optionally further include providing an interface between the identified one or more integrated circuits and the software reconfigurable chip via a bypass circuit.

In Example 950, the subject matter of Example 949 can optionally include wherein the bypass circuit includes control logic configured to route data from the input of the identified one or more integrated circuits to the software reconfigurable chip.

In Example 951, the subject matter of any one of Examples 949-950 can optionally further include temporarily holding data provided to the input of the identified one or more integrated circuits in a buffer included in the bypass circuit.

In Example 952, the subject matter of any one of Examples 943-951 can optionally further include identifying one or supplementary processing resources of the one or more replaced integrated circuits.

In Example 953, the subject matter of Example 952 can optionally further include reallocating the one or more identified supplementary processing resources of the identified one or more integrated circuits to a pool of processing resources available to the software reconfigurable chip.

In Example 954, the subject matter of any one of Examples 952-953 can optionally include wherein at least one of the one or more of the identified supplementary processing resources is an FPGA.

In Example 955, the subject matter of any one of Examples 952-954 can optionally include wherein at least one of the one or more identified supplementary processing resources is a DSP.

In Example 956, the subject matter of any one of Examples 952-955 can optionally further include identifying a second integrated circuit in the communication device.

In Example 957, the subject matter of Example 956 can optionally further include programming the reallocated processing resource to replace the functionality of the second integrated circuit.

In Example 958, the subject matter of any one of Examples 943-957 can optionally include wherein the integrated circuit is selected from the group consisting of a modulator, a demodulator, a cell searcher, an encryption component, an interleaver, a de-interleaver, an encoder, a decoder, a mapper, and a demapper.

In Example 959, the subject matter of any one of Examples 943-958 can optionally further include removing power to the one or more identified integrated circuits.

In Example 960, the subject matter of any one of Examples 943-959 can optionally further include identifying a priority class of an additional software instruction set.

In Example 961, the subject matter of Example 960 can optionally further include identifying a priority class for each of a respective software instruction set loaded on the software reconfigurable chip.

In Example 962, the subject matter of Example 961 can optionally further include uninstalling one or more respective software instruction sets from the software reconfigurable chip with a lower priority class than the additional software instruction set.

In Example 963, the subject matter of any one of Examples 961-962 can optionally further include uninstalling one or more respective software instruction sets from the software reconfigurable resource with a lower priority class than the additional software instruction set In Example 964, the subject matter of any one of Examples 960-963 can optionally further include rejecting an installation of the additional software instruction set wherein processing resources of the software reconfigurable chip occupied by the respective software instruction sets with the lower priority class are insufficient for the installation of the additional replacement software instruction set.

In Example 965, the subject matter of any one of Examples 943-964 can optionally further include identifying a respective idle period of the one or more integrated circuits during online operation of the communication device, and replacing the one or more integrated circuits only during their respective idle period.

Example 966 is a communication device including means for identifying an integrated circuit of the communication device, means for transmitting a reconfiguration request to a network, means for receiving a reconfiguration grant from the network, wherein the reconfiguration grant includes a replacement software instruction set, means for installing the replacement software instruction set onto a software reconfigurable chip of the communication device, and means for reconfiguring the communication device so that the software reconfigurable chip replaces the identified integrated circuit via execution of the replacement software instruction set.

Example 967 is a method for reconfiguring hardware of a communication device, the method including identifying an integrated circuit of the communication device, transmitting a reconfiguration request to a network, receiving a reconfiguration grant from the network, wherein the reconfiguration grant includes a replacement software instruction set, installing the replacement software instruction set onto a software reconfigurable chip of the communication device, and reconfiguring the communication device so that the software reconfigurable chip replaces the identified integrated circuit via execution of the replacement software instruction set.

In Example 968, the subject matter of Example 967 can optionally include wherein the integrated circuit is a signal processing component of the communication device.

In Example 969, the subject matter of any one of Examples 967-968 can optionally further include providing an interface for a user to trigger the identifying of the integrated circuit.

In Example 970, the subject matter of any one of Examples 967-968 can optionally further include autonomously triggering the identification of the integrated circuit.

In Example 971, the subject matter of any one of Examples 967-970 can optionally include wherein the integrated circuit is in a radio frequency (RF) circuitry of the communication device.

In Example 972, the subject matter of any one of Examples 967-970 can optionally include wherein the integrated circuit is in a baseband circuitry of the communication device.

In Example 973, the subject matter of any one of Examples 967-970 can optionally include wherein the integrated circuit is in an application processing circuitry of the communication device.

In Example 974, the subject matter of any one of Examples 967-973 can optionally further include tracking communication device use behavior in order to identify the integrated circuit of the communication device.

In Example 975, the subject matter of any one of Examples 967-974 can optionally further include performing the reconfiguration during a discontinued reception (DRX) cycle when the integrated circuit is in a receiver of the communication device.

In Example 976, the subject matter of any one of Examples 967-974 can optionally further include performing the reconfiguration during a discontinued transmission (DTX) cycle when the integrated circuit is in a transmitter of the communication device.

Example 977 is a communication device for radio communication, the communication device including one or more processors configured to identify an integrated circuit of the communication device, transmit a reconfiguration request to a network, receive a reconfiguration grant from the network, wherein the reconfiguration grant includes a replacement software instruction set, install the replacement software instruction set onto a software reconfigurable chip of the communication device, and reconfigure the communication device so that the software reconfigurable chip replaces the identified integrated circuit via execution of the replacement software instruction set.

In Example 978, the subject matter of Example 977 can optionally include wherein the integrated circuit is in a signal processing module of the communication device.

In Example 979, the subject matter of any one of Examples 977-978 can optionally further include a user interface for a user to trigger the identifying of the integrated circuit.

In Example 980, the subject matter of any one of Examples 977-978 can optionally include the one or more processors further configured to autonomously trigger the identifying of the integrated circuit.

In Example 981, the subject matter of any one of Examples 977-980 can optionally include wherein the integrated circuit is in a radio frequency (RF) circuitry of the communication device.

In Example 982, the subject matter of any one of Examples 977-980 can optionally include wherein the integrated circuit is in a baseband circuitry of the communication device.

In Example 983, the subject matter of any one of Examples 977-980 can optionally include wherein the integrated circuit is in an application processor of the communication device.

In Example 984, the subject matter of any one of Examples 977-983 can optionally include the one or more processors further configured to track communication device use behavior in order to identify the integrated circuit of the communication device to be replaced.

In Example 985, the subject matter of any one of Examples 977-984 can optionally include the one or more processors further configured to perform the reconfiguration during a discontinued reception (DRX) cycle when the integrated circuit is in a receiver of the communication device.

In Example 986, the subject matter of any one of Examples 977-984 can optionally include the one or more processors further configured to perform the reconfiguration during a discontinued transmission (DTX) cycle when the integrated circuit is in a transmitter of the communication device.

Example 987 is a non-transitory computer readable medium including program instructions, which when executed by one or more processors, cause the one or more processors to realize a device or implement a method of any one of claims 926 to 987.

Example 988 is a device configured for use by a vehicle in vehicular radio communications, the device including a radio frequency (RF) lens applied to a structure of the vehicle, the RF lens configured to selectively transmit one or more RF signals based on their respective frequency, and an RF antenna subsystem configured for use with the RF lens, wherein the RF antenna subsystem is configured to receive an input signal and output the one or more RF signals to the RF lens.

In Example 989, the subject matter of Example 926 can optionally include wherein the structure is a lighting fixture of the vehicle.

In Example 990, the subject matter of Example 989 can optionally include wherein the lighting fixture is a headlight or a taillight.

In Example 991, the subject matter of any one of Examples 926-990 can optionally include wherein the structure is a glass surface of the vehicle.

In Example 992, the subject matter of Example 991 can optionally include wherein the glass surface is a front windshield, rear windshield, side window, sunroof, or moon roof.

In Example 993, the subject matter of any one of Examples 926-992 can optionally include wherein the RF lens includes lensing material configured to refract the one or more RF signals in a narrower beam.

In Example 994, the subject matter of any one of Examples 926-992 can optionally include wherein the RF lens includes lensing material configured to refract the one or more RF signals in a broader beam.

In Example 995, the subject matter of any one of Examples 993-994 can optionally include wherein the lensing material includes a first layered pattern of geometric shapes applied to a substrate.

In Example 996, the subject matter of Example 995 can optionally include wherein the periodic pattern of geometric shapes is composed of a material including a metal.

In Example 997, the subject matter of any one of Examples 995-996 can optionally include wherein the substrate includes a dielectric material.

In Example 998, the subject matter of Example 997 can optionally include wherein the dielectric material includes silicon.

In Example 999, the subject matter of any one of Examples 995-998 can optionally include wherein the lensing material further includes a second layered pattern of geometric shapes applied to the substrate.

In Example 1000, the subject matter of Example 999 can optionally include wherein the first layered pattern of geometric shapes is applied to a first side of the substrate and the second layered pattern of geometric shapes is applied to a second side of the substrate, wherein the first side is opposite to the second side.

In Example 1001, the subject matter of Example 999 or 1000 can optionally include wherein the first layered pattern of geometric shapes and the second layered pattern of geometric shapes are aligned.

In Example 1002, the subject matter of Example 999 or 1000 can optionally include wherein there is an offset between the first layered pattern of geometric shapes and the second layered pattern of geometric shapes.

In Example 1003, the subject matter of any one of Examples 926-1002 can optionally further include a biasing circuitry configured to apply a bias to the RF lens, wherein the applied bias is configured to alter the structure of the RF lens in order to modify the one or more RF signals transmitted through the RF lens.

In Example 1004, the subject matter of Example 1003 can optionally include the biasing circuitry configured to apply a voltage bias to the RF lens.

In Example 1005, the subject matter of Example 1003 can optionally include the biasing circuitry configured to apply a magnetic bias to the RF lens.

In Example 1006, the subject matter of any one of Examples 1003-1005 can optionally include wherein the bias is configured to alter a width of the substrate of the RF lens.

In Example 1007, the subject matter of any one of Examples 1003-1006 can optionally include wherein the bias is configured to alter an offset in two or more layered patterns of geometric shapes applied in the RF lens.

In Example 1008, the subject matter of any one of Examples 1003-1007 can optionally further include a controller operatively coupled to the biasing circuitry and configured to provide the biasing circuitry with a bias signal in order for the biasing circuitry to apply the bias to the RF lens.

In Example 1009, the subject matter of any one of Examples 926-1008 can optionally include wherein the device is operatively coupled to one or more processors of the vehicle, wherein the one or more processors provide the input signal to the RF antenna sub system.

In Example 1010, the subject matter of Example 1009 can optionally further include a high speed wired data bus configured to couple the device with the one or more processors.

In Example 1011, the subject matter of Example 1009 can optionally further include a high speed short-range wireless connection configured to couple the antenna subsystem with the one or more processors.

Example 1012 is a communication device for transmitting one or more radio frequency (RF) signals from a vehicle in vehicular radio communications, the communication device including means for receiving, from one or more processors, an input signal at an RF antenna subsystem, means for outputting, from the RF antenna subsystem, one or more RF signals to an RF lens applied to a structure of the vehicle, and means for selectively transmitting, via the RF lens, the one or more RF signals based on their respective frequency.

Example 1013 is a method for transmitting one or more radio frequency (RF) signals from a vehicle in vehicular radio communications, the method including receiving, from one or more processors, an input signal at an RF antenna subsystem, outputting, from the RF antenna subsystem, one or more RF signals to an RF lens applied to a structure of the vehicle, and selectively transmitting, via the RF lens, the one or more RF signals based on their respective frequency.

In Example 1014, the subject matter of Example 1013 can optionally include wherein the structure is a lighting fixture of the vehicle.

In Example 1015, the subject matter of Example 1014 can optionally include wherein the lighting fixture is a headlight or a taillight.

In Example 1016, the subject matter of any one of Examples 1013-1015 can optionally include wherein the structure is a glass surface of the vehicle.

In Example 1017, the subject matter of Example 1016 can optionally include wherein the glass surface is a front windshield, rear windshield, side window, sunroof, or moon roof.

In Example 1018, the subject matter of any one of Examples 1013-1017 can optionally include wherein the RF lens includes lensing material configured to refract the one or more RF signals to a narrower beam.

In Example 1019, the subject matter of any one of Examples 1013-1017 can optionally include wherein the RF lens includes lensing material configured to refract the one or more RF signals to a broader beam.

In Example 1020, the subject matter of any one of Examples 1007-1008 can optionally include wherein the lensing material includes a first layered pattern of geometric shapes applied to a substrate.

In Example 1021, the subject matter of Example 1020 can optionally include wherein the periodic pattern of geometric shapes is composed of a material including a metal.

In Example 1022, the subject matter of any one of Examples 1020-1021 can optionally include wherein the substrate includes a dielectric material.

In Example 1023, the subject matter of Example 1022 can optionally include wherein the dielectric material includes silicon.

In Example 1024, the subject matter of any one of Examples 1020-1023 can optionally include wherein the lensing material further includes a second layered pattern of geometric shapes applied to the substrate.

In Example 1025, the subject matter of Example 1024 can optionally include wherein the first layered pattern of geometric shapes is applied to a first side of the substrate and the second layered pattern of geometric shapes is applied to a second side of the substrate, wherein the first side is opposite to the second side.

In Example 1026, the subject matter of Example 1024 or 1025 can optionally include wherein the first layered pattern of geometric shapes and the second layered pattern of geometric shapes are aligned.

In Example 1027, the subject matter of Example 1024 or 1025 can optionally include wherein there is an offset between the first layered pattern of geometric shapes and the second layered pattern of geometric shapes.

In Example 1028, the subject matter of any one of Examples 1013-1027 can optionally further include applying a bias to the RF lens, wherein the bias is configured to alter the structure of the RF lens in order to modify the one or more RF signals transmitted through the RF lens.

In Example 1029, the subject matter of Example 1028 can optionally include wherein the bias is a voltage bias.

In Example 1030, the subject matter of Example 1028 can optionally include wherein the voltage is a magnetic bias.

In Example 1031, the subject matter of any one of Examples 1028-1030 can optionally include wherein the bias is configured to alter a width of the substrate of the RF lens.

In Example 1032, the subject matter of any one of Examples 1028-1031 can optionally include wherein the bias is configured to alter an offset in two or more layered patterns of geometric shapes applied in the RF lens.

In Example 1033, the subject matter of any one of Examples 1028-1032 can optionally further include providing, from a controller, the biasing circuitry with a bias signal in order for the biasing circuitry to apply the bias to the RF lens.

Example 1034 is a non-transitory computer readable medium, including program instructions, which when executed by one or more processors, implement a method or realize a device of any one of Examples 988 to 1033.

Example 1035 is a communication device for use in vehicular radio communications by a first vehicle, the communication device including one or more processors configured to estimate a relative velocity between the first vehicle and a second vehicle, determine a Doppler shift or a varied coherent time based on the estimated relative velocity, and equalize a signal scheduled for communication between the first vehicle and the second vehicle.

In Example 1036, the subject matter of Example 1035 can optionally include wherein the relative velocity is estimated based on an information provided by a Basic Safety Message (BSM).

In Example 1037, the subject matter of Example 1036 can optionally include wherein the information includes at least one of a position, velocity, or a speed of the second vehicle.

In Example 1038, the subject matter of Example 1035 can optionally include wherein the relative velocity is estimated from onboard equipment of the first vehicle.

In Example 1039, the subject matter of Example 1038 can optionally include wherein the onboard equipment is operatively coupled to the one or more processors.

In Example 1040, the subject matter of any one of Examples 1038-1039 can optionally include wherein the onboard equipment is at least one of a video camera or a radar sensor.

In Example 1041, the subject matter of any one of Examples 1035-1040 can optionally include wherein the Doppler shift is determined from pilot symbols transmitted between the first and the second vehicles.

In Example 1042, the subject matter of Example 1041 can optionally include wherein the one or more processors are configured to examine the pilot symbols received at one or more frequencies and determine a frequency shift across the one or more frequencies.

In Example 1043, the subject matter of any one of Examples 1035-1042 can optionally further include a memory, operatively coupled to the one or more processors, configured to store one or more look up tables (LUTs).

In Example 1044, the subject matter of Example 1043 can optionally include wherein the LUTs include a plurality of relative velocities and at least one of a corresponding Doppler shift or a corresponding coherent time value for each relative velocity of the plurality of relative velocities.

In Example 1045, the subject matter of any one of Examples 1035-1044 can optionally include wherein the signal to be communicated is transmitted from the second vehicle to the first vehicle.

In Example 1046, the subject matter of any one of Examples 1035-1044 can optionally include wherein the signal to be communicated is a received at the second vehicle from the first vehicle.

Example 1047 is a vehicle including means for estimating a relative velocity between the vehicle and a second vehicle, means for determining a Doppler shift or a varied coherent time based on the estimated relative velocity, and means for equalizing a signal to be communicated between the vehicle and the second vehicle.

Example 1048 is a method for vehicular radio communications in a first vehicle, the method including estimating a relative velocity between the first vehicle and a second vehicle, determining a Doppler shift or a varied coherent time based on the estimated relative velocity, and equalizing a signal to be communicated between the first vehicle and the second vehicle.

In Example 1049, the subject matter of Example 1048 can optionally include wherein the relative velocity is estimated based on an information provided by a Basic Safety Message (BSM).

In Example 1050, the subject matter of Example 1049 can optionally include wherein the information includes at least one of a position, velocity, or a speed of the second vehicle.

In Example 1051, the subject matter of Example 1048 can optionally include wherein the relative velocity is estimated from onboard equipment of the first vehicle.

In Example 1052, the subject matter of Example 1051 can optionally include wherein the onboard equipment is operatively coupled to the one or more processors.

In Example 1053, the subject matter of any one of Examples 1051-1052 can optionally include wherein the onboard equipment is at least one of a video camera or a radar sensor.

In Example 1054, the subject matter of any one of Examples 1048-1053 can optionally include wherein the Doppler shift is determined from pilot symbols transmitted between the first and the second vehicles.

In Example 1055, the subject matter of Example 1054 can optionally further include examining the pilot symbols received at one or more frequencies and determine a frequency shift across the one or more frequencies.

In Example 1056, the subject matter of any one of Examples 1048-1055 can optionally further include accessing one or more look up tables (LUTs) stored in a memory of the first vehicle.

In Example 1057, the subject matter of Example 1056 can optionally include wherein the LUTs include a plurality of relative velocities and at least one of a corresponding Doppler shift or a corresponding coherent time value for each relative velocity of the plurality of relative velocities.

In Example 1058, the subject matter of any one of Examples 1048-1057 can optionally include wherein the signal to be communicated is transmitted from the second vehicle to the first vehicle.

In Example 1059, the subject matter of any one of Examples 1048-1057 can optionally include wherein the signal to be communicated is a received at the second vehicle from the first vehicle.

Example 1060 is a non-transitory computer readable medium, including program instructions, which when executed by one or more processors, to realize the device of any one of Examples 1035-1046 or implement the method of any one of Examples 1048-1060.

Example 1062 is a non-transitory computer readable medium storing instructions that, when executed by one or more processors, cause the one or more processors to perform the method of any preceding example.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device, comprising:

a communication processor configured to:

receive a first substream on a first wireless carrier operated by a first network operator, and receive a second substream on a second wireless carrier operated by a second network operator; and a substream combiner configured to recombine the first substream and the second substream to recover a data stream originating from a data network, wherein the communication processor is further configured to:

evaluate carrier characteristics of a plurality of wireless carriers in comparison to target characteristics of the data stream, and select the first wireless carrier and the second wireless carrier from the plurality of wireless carriers based on the evaluation.

2. The communication device of claim 1, wherein the communication device is configured as a communication subcomponent for a terminal device.

3. The communication device of claim 2, wherein the data stream is data from a single data connection between the terminal device and the data network.

4. The communication device of claim 1, wherein the communication processor is configured to:

receive the first substream over a first data subconnection with the data network that comprises the first wireless carrier, and receive the second sub stream over a second data subconnection with a separation node that comprises the second wireless carrier.

5. The communication device of claim 4, wherein the separation node is a control server in a core network of the first network operator.

6. The communication device of claim 4, wherein the separation node is a network access node of the first network operator or an edge server that interfaces with a network access node of the first network operator.

7. The communication device of claim 4, wherein the separation node is the data network.

8. A communication device comprising:

a communication processor configured to control transmission timing to a target device according a timing advance;

a timing advance determiner configured to perform timing advance updates;

an estimator configured to estimate a separation distance or a propagation delay between the communication device and the target device; and a timing advance controller configured to:

determine whether the separation distance or the propagation delay is less than a predefined threshold, and control the timing advance determiner to omit a timing advance update, or reduce an update frequency for the timing advance updates if the separation distance or the propagation delay is less than the predefined threshold.

9. The communication device of claim 8, wherein the estimator is configured to estimate the separation distance or the propagation delay between the communication device and the target device by estimating the separation distance or the propagation delay between the communication device and the target device with a radar sensor.

10. The communication device of claim 8, wherein the estimator is configured to estimate the separation distance or the propagation delay between the communication device and the target device by:

receiving a position report that comprises a position of the target device;

determining a position of the communication device with a geopositional sensor; and comparing the position of the target device with the position of the communication device to estimate the separation distance or the propagation delay.

11. The communication device of claim 10, wherein the estimator is configured to receive the position report from a position database.

12. The communication device of claim 10, wherein the estimator is configured to receive the position report by receiving the position report from the target device.

13. The communication device of claim 8, wherein the target device is a network access node serving the communication device.

14. A device configured for use by a vehicle in vehicular radio communications, the device comprising:

a radio frequency (RF) lens applied to a structure of the vehicle, the RF lens being configured to selectively transmit one or more RF signals based on their respective frequency;

an RF antenna subsystem configured for use with the RF lens, the RF antenna subsystem being configured to receive an input signal and output the one or more RF signals to the RF lens; and biasing circuitry configured to apply a bias to the RF lens, wherein the applied bias is configured to alter the structure of the RF lens in order to modify the one or more RF signals transmitted through the RF lens.

15. The device of claim 14, wherein the structure is a lighting fixture of the vehicle.

16. The device of claim 14, wherein the RF lens comprises lensing material configured to refract the one or more RF signals in a narrower beam.

17. The device of claim 14, wherein the structure is a glass surface of the vehicle.

18. The device of claim 14, wherein the RF lens comprises lensing material configured to refract the one or more RF signals in a broader beam.

19. A communication device for vehicular communications, the communication device comprising:

a radio frequency (RF) antenna subsystem including:

a first RF antenna set at a first location of a first surface of a vehicle, the first RF antenna set including one or more first RF antennas, and a second RF antenna set at a second location of a second surface of the vehicle, the second RF antenna set including one or more second RF antennas; and an RF transceiver coupled to the RF antenna subsystem, wherein at least one antenna of the first RF antenna set is embedded in the first surface of the vehicle or the second RF antenna set is embedded in the second surface of the vehicle, and wherein the communication device is configured to simultaneously or concurrently communicate with two or more devices via the RF antenna subsystem and the RF transceiver.

20. The communication device of claim 19, wherein the RF antenna subsystem further includes:

a third RF antenna set at a third location of a third surface of a vehicle, the third RF antenna set including one or more third RF antennas, and a fourth RF antenna set at a fourth location of a fourth surface of the vehicle, the fourth RF antenna set including one or more fourth RF antennas.

21. The communication device of claim 20, wherein the first RF antenna set, the second RF antenna set, the third RF antenna set, and the fourth RF antenna set are collectively configured to provide 360 degree coverage for the communication device, and wherein the first surface of the vehicle, the second surface of the vehicle, the third surface of the vehicle, and the fourth surface of the vehicle are the same surface of the vehicle.

* * * * *